(12) United States Patent
Sturgill et al.

(10) Patent No.: US 7,833,331 B2
(45) Date of Patent: Nov. 16, 2010

(54) NON-TOXIC CORROSION-PROTECTION PIGMENTS BASED ON COBALT

(75) Inventors: Jeffrey Allen Sturgill, Fairborn, OH (US); Andrew Wells Phelps, Kettering, OH (US); Joseph Thomas Swartzbaugh, Phillipsburg, OH (US)

(73) Assignee: University of Dayton, Dayton, OH (US)

( * ) Notice: Subject to any disclaimer, the term of this patent is extended or adjusted under 35 U.S.C. 154(b) by 167 days.

(21) Appl. No.: 11/832,704

(22) Filed: Aug. 2, 2007

(65) Prior Publication Data

US 2009/0163628 A1 Jun. 25, 2009

(51) Int. Cl.
C09D 5/08 (2006.01)
C09K 3/00 (2006.01)

(52) U.S. Cl. .................. 106/14.05; 106/425; 106/440; 106/450; 106/479; 106/481; 106/499; 106/480; 252/387; 252/389.53

(58) Field of Classification Search ................ 106/480; 423/138–154
See application file for complete search history.

(56) References Cited

U.S. PATENT DOCUMENTS

| | | | |
|---|---|---|---|
| 1,078,788 A | 11/1913 | Kaplan | |
| 1,216,451 A | 2/1917 | Holmes | |
| 2,396,327 A | 3/1946 | Kyalnes et al. | |
| 2,649,383 A | 8/1953 | Killian et al. | |
| 2,765,300 A | 10/1956 | Hein et al. | |
| 2,791,513 A | 5/1957 | Siegel et al. | |
| 2,821,525 A | 1/1958 | Waitkins et al. | |
| 3,055,833 A | 9/1962 | Baltzer | |
| 3,440,254 A | 4/1969 | Lenoir et al. | |
| 3,615,810 A | 10/1971 | Holznagel et al. | |
| 3,725,102 A | 4/1973 | Hummel et al. | |
| 3,823,076 A | 7/1974 | Rushmere et al. | |
| 3,832,205 A | 8/1974 | Lowery et al. | |
| 3,879,523 A * | 4/1975 | Miyata et al. | 423/250 |
| 4,012,195 A | 3/1977 | Noack | |
| 4,024,036 A | 5/1977 | Nakamura et al. | |
| 4,028,372 A | 6/1977 | Crounse et al. | |
| 4,079,018 A | 3/1978 | Noack | |
| 4,096,090 A | 6/1978 | Noack | |
| 4,097,484 A | 6/1978 | von Zelewsky et al. | |
| 4,109,176 A | 8/1978 | Ernsthausen et al. | |
| 4,159,207 A | 6/1979 | Nuss | |
| 4,169,902 A | 10/1979 | De Long | |
| 4,285,726 A | 8/1981 | Hund et al. | |
| 4,340,430 A | 7/1982 | Roueche | |
| 4,349,671 A | 9/1982 | Iqbal et al. | |
| 4,366,312 A | 12/1982 | Iqbal | |
| 4,367,333 A | 1/1983 | Iqbal | |
| 4,385,174 A | 5/1983 | Iqbal et al. | |
| 4,388,118 A | 6/1983 | Eppler | |
| 4,388,160 A | 6/1983 | Rynne | |
| 4,417,007 A | 11/1983 | Salensky et al. | |
| 4,417,008 A | 11/1983 | Salensky et al. | |
| 4,420,340 A | 12/1983 | Mohr et al. | |
| 4,469,521 A | 9/1984 | Salensky | |
| 4,474,952 A | 10/1984 | Iqbal | |
| 4,479,917 A | 10/1984 | Rothgery et al. | |
| 4,480,064 A | 10/1984 | Chopra et al. | |
| 4,519,997 A | 5/1985 | Fuchs et al. | |
| 4,564,511 A | 1/1986 | Desmond et al. | |
| 4,612,014 A | 9/1986 | Felix | |
| 4,622,391 A | 11/1986 | Lorenz et al. | |
| 4,628,082 A | 12/1986 | Lorenz et al. | |
| 4,640,818 A | 2/1987 | Grierson et al. | |
| 4,670,486 A | 6/1987 | Cseh et al. | |
| 4,673,445 A | 6/1987 | Tuttle, Jr. et al. | |
| 4,696,700 A | 9/1987 | Fischer et al. | |
| 4,788,411 A | 11/1988 | Skinner | |
| 4,960,895 A | 10/1990 | Ohkawa | |
| 5,043,016 A | 8/1991 | Speer et al. | |
| 5,066,695 A | 11/1991 | Cseh et al. | |
| 5,144,014 A | 9/1992 | Sugamo et al. | |
| 5,188,993 A | 2/1993 | Takahashi et al. | |

(Continued)

FOREIGN PATENT DOCUMENTS

BE 893676 A1 10/1982

(Continued)

OTHER PUBLICATIONS

Chemical Abstract Registry citation 100687-47-6, Mar. 1986.

(Continued)

*Primary Examiner*—Jerry Lorengo
*Assistant Examiner*—Jared Wood
(74) *Attorney, Agent, or Firm*—Dinsmore & Shohl LLP

(57) ABSTRACT

Corrosion-inhibiting pigments based on cobalt are described that contain a trivalent or tetravalent cobalt/valence stabilizer complex. An inorganic or organic material is used to stabilize the trivalent or tetravalent cobalt ion to form a compound that is sparingly soluble in water. Specific stabilizers are chosen to control the release rate of trivalent or tetravalent cobalt during exposure to water and to tailor the compatibility of the powder when used as a pigment in a chosen binder system. Stabilizers may also modify the processing and handling characteristics of the formed powders. Cobalt/valence stabilizer combinations are chosen based on the well-founded principles of cobalt coordination chemistry. Many cobalt-valence stabilizer combinations are presented that can equal the performance of conventional hexavalent chromium systems.

20 Claims, No Drawings

U.S. PATENT DOCUMENTS

| | | |
|---|---|---|
| 5,226,956 A | 7/1993 | Askew et al. |
| 5,254,162 A | 10/1993 | Speer et al. |
| 5,298,092 A | 3/1994 | Schriever |
| 5,322,560 A | 6/1994 | DePue et al. |
| 5,330,588 A | 7/1994 | Gulley |
| 5,378,293 A | 1/1995 | Schriever |
| 5,411,606 A | 5/1995 | Schriever |
| 5,415,687 A | 5/1995 | Schriever |
| 5,468,307 A | 11/1995 | Schriever |
| 5,472,524 A | 12/1995 | Schriever |
| 5,487,949 A | 1/1996 | Schriever |
| 5,551,994 A | 9/1996 | Schriever |
| 5,587,059 A | 12/1996 | Yamoto et al. |
| 5,672,329 A | 9/1997 | Okada et al. |
| 5,735,939 A | 4/1998 | Glausch et al. |
| 5,753,019 A | 5/1998 | Stephen et al. |
| 5,871,866 A | 2/1999 | Barker et al. |
| 5,873,953 A | 2/1999 | Schriever |
| 6,004,476 A | 12/1999 | Verma et al. |
| 6,068,709 A | 5/2000 | Schapira et al. |
| 6,074,464 A | 6/2000 | Eddinger et al. |
| 6,080,232 A | 6/2000 | Sperlich et al. |
| 6,193,815 B1 | 2/2001 | Wada et al. |
| 6,200,672 B1 | 3/2001 | Tadokoro et al. |
| 6,291,018 B1 | 9/2001 | Dattilo |
| 6,383,980 B1 | 5/2002 | Hagihara et al. |
| 6,416,868 B1 | 7/2002 | Sullivan et al. |
| 6,432,225 B1 | 8/2002 | Schriever |
| 6,472,079 B2 | 10/2002 | Hayashi et al. |
| 6,500,276 B1 | 12/2002 | Minevski et al. |
| 6,582,814 B2 | 6/2003 | Swiler et al. |
| 2003/0221590 A1 | 12/2003 | Sturgill et al. |
| 2003/0230363 A1 | 12/2003 | Sturgill et al. |
| 2003/0234063 A1 | 12/2003 | Sturgill et al. |
| 2004/0011252 A1 | 1/2004 | Sturgill et al. |
| 2004/0016910 A1 | 1/2004 | Phelps et al. |
| 2004/0020568 A1 | 2/2004 | Phelps et al. |
| 2004/0104377 A1 | 6/2004 | Phelps et al. |
| 2004/0231754 A1 | 11/2004 | Phelps et al. |

FOREIGN PATENT DOCUMENTS

| | | |
|---|---|---|
| BE | 893677 A1 | 10/1982 |
| DE | 938147 | 1/1956 |
| DE | 1278644 | 9/1968 |
| DE | 2533958 | 2/1977 |
| DE | 2625401 A1 | 12/1977 |
| DE | 2642049 A1 | 3/1978 |
| DE | 2936748 A1 | 4/1981 |
| DE | 3309194 A1 | 10/1983 |
| DE | 3225897 A1 | 1/1984 |
| DE | 3712946 A1 | 10/1987 |
| DE | 3824454 A1 | 1/1990 |
| DE | 3935478 A1 | 5/1991 |
| DE | 4002564 A1 | 8/1991 |
| DE | 4131548 A1 | 3/1993 |
| DE | 19714881 A1 | 10/1998 |
| EP | 0342152 A2 | 11/1989 |
| EP | 0349809 A2 | 1/1990 |
| EP | 0368470 A1 | 5/1990 |
| EP | 0455018 A1 | 11/1991 |
| EP | 0458020 A1 | 11/1991 |
| EP | 0486778 B1 | 5/1992 |
| EP | 0488430 A2 | 6/1992 |
| EP | 0523288 A1 | 1/1993 |
| EP | 0634460 A2 | 1/1995 |
| EP | 0675173 A2 | 10/1995 |
| EP | 0842990 A2 | 5/1998 |
| EP | 1125989 A1 | 8/2001 |
| FR | 2348257 A1 | 11/1977 |
| GB | 565951 | 12/1944 |
| GB | 1064416 | 4/1967 |
| GB | 1117017 | 6/1968 |
| GB | 1123859 | 8/1968 |
| GB | 1483271 | 8/1977 |
| GB | 1528547 | 10/1978 |
| GB | 1532043 | 11/1978 |
| GB | 1534787 | 12/1978 |
| GB | 1546536 | 5/1979 |
| GB | 2101109 A | 1/1983 |
| GB | 2103218 A | 2/1983 |
| GB | 2113664 A | 8/1983 |
| GB | 2138796 A | 10/1984 |
| GB | 2139206 A | 11/1984 |
| JP | 61113780 A | 5/1986 |
| JP | 61188470 A | 8/1986 |
| JP | 249075 A | 2/1990 |
| JP | 2049075 A | 2/1990 |
| JP | 2076853 A | 3/1990 |
| JP | 3163169 A | 7/1991 |
| JP | 6099544 A | 4/1994 |
| JP | 6099545 A | 4/1994 |
| JP | 6126888 A | 5/1994 |
| JP | 1017795 A | 1/1998 |
| JP | 10017795 A | 1/1998 |
| RU | 472957 | 6/1975 |
| WO | 9305198 | 3/1993 |
| WO | 9400619 | 1/1994 |
| WO | 9514117 A1 | 5/1995 |
| WO | 9531093 | 11/1995 |
| WO | 9605335 | 2/1996 |
| WO | 9621753 | 7/1996 |
| WO | 9629448 | 9/1996 |
| WO | 9735928 | 10/1997 |
| WO | 9848075 | 10/1998 |
| WO | 9851841 | 11/1998 |
| WO | 03060192 A1 | 7/2003 |

OTHER PUBLICATIONS

Chemical Abstract Registry citation 256459-53-7, Feb. 2000.
US Notice of Allowance dated May 4, 2010 pertaining to U.S. Appl. No. 11/619,761.
US Office Action dated Mar. 1, 2010 pertaining to U.S. Appl. No. 11/619,761.
Office Action of U.S. Appl. No. 11/619,761 dated Apr. 14, 2008.
Office Action of U.S. Appl. No. 11/619,761 dated Jun. 8, 2009.
Office Action of U.S. Appl. No. 11/619,761 dated Aug. 13, 2007.
Office Action of U.S. Appl. No. 11/619,761 dated Oct. 20, 2008.
Abstract, Czech. 145,575 Dobrovolny, J., "Monoazo lacquers", Chemical Abstracts, vol. 78:137932k, 1973, p. 98.
Abstract, Czech. CS 221,701, Muzik, F. et al, "Azo pigments" Chemical Abstracts, vol. 104:20733k.
Abstract, Paintindia 1968, 18(6), 17-23, 52 (Eng), Potnis, S.P. et al, "Metallized azo pigments. IV. Pigments based on o-aminophenol and 8-hydroxyquinoline" Chemical Abstracts, vol. 70:30021v. 1969, p. 70.
Abstract, 1(1), 59-76 (Ger)., Roueche, A., "Metal salts of 5,5'-methinebis(barbituric acid) derivatives, their application as pigments" Chemical Abstracts, vol. 94:104876x, 1981, p. 80.
Abstract, Japan. Kokai 76,128,332, Hoshino, M. et al, "Nontoxic anticorrosive pigments for resin coatings" 42-Coatings, vol. 86:74537c, 1977.
Abstract, Japan. Kokai 76,128,331, Hoshino, M. et al, "Nontoxic anticorrosive pigments for resin coatings", 42-Coatings, vol. 86:74538d, 1977.
Abstract, Japan. Kokai 76 08,316, Takagi et al, "Metal-complexed azomethine pigments" 40-Dyes, vol. 84:181599e, 1976.
Abstract, Japan. Kokai Tokkyo Koho JP 60 23,451, Yamamoto Synthetic Chemical Co., Ltd., "Naphthalocyanine compounds" Chemical Abstracts, vol. 103:106304n, 1985, p. 74.

Suresh, E. et al, "Investigation of Manganese-Molybdenum-Diethyldithiocarbamate Complex as a Potential System for Solar Energy Conversion" International Journal of Energy Research, 23, pp. 229-233 (1999).

F. A. Cotton, G. Wilkinson, "Anorganische Chemie", 4th edition, pp. 789-799, Wiley & Sons, Inc. 1980.

International Preliminary Examination Report pertaining to International Application No. PCT/US2002/040084 dated May 5, 2004.

F.A. Cotton, et al., Anorganische Chemie, 4th edition, pp. 789-799, Wiley & Sons, Inc., 1980.

PCT Notification of Transmittal of the International Preliminary Examination Report, dated May 5, 2004, Appl. No. PCT/ US02/ 40084, pp. 2-6.

* cited by examiner

NON-TOXIC CORROSION-PROTECTION PIGMENTS BASED ON COBALT

CROSS-REFERENCE TO RELATED APPLICATIONS

This application is related to commonly assigned U.S. patent application Ser Nos.: 10/038,274 NON-TOXIC CORROSION-PROTECTION CONVERSION COATS BASED ON COBALT, filed Jan. 4, 2002 by Sturgill et al. and 10/038,150 NON-TOXIC CORROSION-PROTECTION RINSES AND SEALS BASED ON COBALT, filed Jan. 4, 2002 by Sturgill et al., the disclosures of which are incorporated herein by reference.

BACKGROUND OF THE INVENTION

This invention relates generally to compositions and methods for the formation of protective, corrosion-inhibiting pigments without the use of chromium in the hexavalent oxidation state. More particularly, this invention relates to non-toxic, corrosion-inhibiting pigments based on trivalent and tetravalent cobalt and methods of making and using the same.

Inhibiting the initiation, growth, and extent of corrosion is a significant part of component and systems design for the successful long-term use of metal objects. Uniform physical performance and safety margins of a part, a component, or an entire system can be compromised by corrosion. Aluminum, zinc, iron, magnesium, titanium and their alloys tend to corrode rapidly in the presence of water due to their low oxidation-reduction (redox) potentials. The high strength 2000 and 7000 series of aluminum alloys are used extensively in aircraft and are very sensitive to corrosive attack. Materials such as steels and carbon fibers with higher redox potentials will form a galvanic couple in water and promote corrosive attack when located near light metal alloys such as aluminum.

A bare metal surface or one that has been conversion coated, phosphated, sealed, rinsed, or otherwise treated will be protected by the application of a primer paint with a corrosion inhibiting pigment. As used herein, the term "pigment" means chemically active compounds with the ability to inhibit corrosion at a distance, rather than simple colorants or opacifiers. Oxidative compounds that are effective as corrosion inhibitors tend to be highly colored and/or opaque. An effective corrosion inhibiting pigment has throwing power and can protect exposed base metal in a scratch or flaw by oxidizing and passivating it at a distance during aqueous corrosion when dispersed in a suitable carrier phase. These compounds are usually solids or liquids that are typically dispersed in a liquid carrier or binder system such as a paint or wash. These compounds may also be used to help inhibit corrosion without a significant liquid carrier using an integral binder and/or a low-volatile application method. Barrier layer formers such as sol-gel coatings or polymeric films are also used, but they tend to have no inherent oxidizing character and no appreciable throwing power and fail to protect the metal surface when the film is breached.

Pigments that contain hexavalent chromium (CrVI) compounds are the de facto standard for high-performance corrosion inhibiting paints and coatings for metal protection and are a typical corrosion inhibitor used to protect aluminum, zinc, magnesium, iron, titanium, copper and their alloys. Zinc and strontium chromate pigments are typically used, although calcium and magnesium chromates have also seen some limited use as pigments. The coating vehicles of these pigments include alkyd-type primers, acrylic primers, and elastomeric sealants, among others. Some transition metal chromate pigments (e.g., complexed with copper, iron, manganese, or cobalt) and organic chromate pigments (e.g., bound with nitrogenous compounds such as guanidinium) have been used in protective coating systems. Barium or lead chromates have been used more as colorants than as corrosion inhibitors. Variations in chromate speciation (i.e., what the chromate ions are bound to) will result in significant differences in protection when used as corrosion-inhibiting pigments.

A clear correlation between performance and solubility of chromate pigments has been shown. However, oxidizing chromates can be dangerous to use as corrosion inhibitors if they are not delivered in sufficient quantity in a timely manner to the location of a coating breach. The chromate composition was far more important to the corrosion inhibiting performance of the primer film than the organic coating composition.

A principle use of zinc and strontium chromate pigments is in wash- or etch-primer formulations for aluminum protection. Wash- or etch-primers, which have been used since the 1940s, represent one of the harshest application conditions for chromate pigments. Wash-primers are applied to metal surfaces under acidic conditions where the primer is cured as a corrosion inhibiting film. Chromate pigment powders dispersed in an alcohol/resin base mixture are combined with an aqueous phosphoric acid diluent solution. The acid roughens the metal surface and initiates cross-linking of the resin to form a pigment-filled polymeric film. The chromate pigment may also be dispersed in other carriers that are not as harsh as the wash primer. However, if a corrosion-inhibiting pigment can survive the harsh conditions of acid diluent, then it can usually be successfully incorporated within other paint, polymeric, or barrier film systems for corrosion inhibition.

An important use of chromate pigments is in coil coating formulations for steel, zinc-coated steel, or aluminum sheet stock. Coil coatings can represent a challenging application environment for pigments in that cure temperatures for these paints can exceed 100° C. Corrosion-inhibiting pigments for these applications must exhibit both throwing power to inhibit corrosion and be thermally stable at elevated temperatures when incorporated into the paint.

Significant efforts have been made in government and industry to replace CrVI with other metals for corrosion-inhibiting applications due to toxicity, environmental, and regulatory considerations. An effective replacement for hexavalent chromate pigment needs to have throwing power for self-healing coating breeches. Throwing power is the ability of a highly oxidized compound, such as hexavalent chromium, to oxidize and passivate the exposed bare metal in a small scratch or flaw.

A number of materials have been introduced as corrosion-inhibiting replacement pigments for hexavalent chromium-based compounds. Commercially available corrosion inhibiting pigments including compounds such as molybdates, phosphates, silicates, cyanamides, and borates that have no inherent oxidizing character have been used as alternatives to chromate pigments. Coatings that contain these materials can effectively inhibit corrosion as barrier films until the coating is breached, as by a scratch or other flaw. Films or coatings that do not contain oxidizing species can actually enhance corrosion on a surface after failure due to the effects of crevice corrosion.

Cobalt is one non-toxic, non-regulated metal which has been considered as a chromium replacement. Cobalt (like chromium) exhibits more than one oxidation state ($Co^{+2}$, $Co^{+3}$, and $Co^{+4}$). In addition, the oxidation-reduction potential is comparable to that of CrVI in acidic solutions. For example, in acid solution:

$$Co^{+3} + e^- => Co^{+2} + 1.92\ V$$

$$Cr^{+6} + 3e^- => Cr^{+3} + 1.36\ V$$

The CoIII ion is a very good oxidizing species with an oxidation-reduction potential of +1.92 V (at pH 0). The hydroxyl and oxygen liberated from water when CoIII is reduced will oxidize nearby bare metal. This results in a passivated metal surface if sufficient oxygen is released. The potential required to reduce trivalent cobalt to divalent cobalt is only 0.26 volts greater than that needed to add three electrons to reduce CrVI to trivalent chromium (CrIII). CoII is formed during corrosion inhibition by the oxidation of base metal in the presence of CoIII and water. CoII is similar to CrIII in that neither is particularly effective as redox-based corrosion inhibitors.

A number of pigments using cobalt have been reported in the literature over the years, but none approach the general performance or utility of CrVI-based pigments. Trivalent cobalt oxide $Co_2O_3$ or $Co_3O_4$) and hydroxide ($Co(OH)_3$) pigments have been disclosed for corrosion protective coatings. However, the coatings formed provide only limited protection and do not approach the benefit derived from the use of hexavalent chromium.

A number of compounds have been described as corrosion-inhibiting agents, including organic mercapto and thio compounds, cyclic tetraaza compounds, aminophosphonic acid, and triazinedithiols and triazinetrithiols. Other compounds havebeen described as corrosion inhibiting when complexed with cobalt, typically in the divalent charge state. Among these compounds are porphyrin derivatives, tetraaza organic compounds, phosphoric and phosphonic acids, naphthenates, amidosulfonic acids, and amino acids. However, the pigments formed from these compounds provide only limited corrosion protection and do not approach the benefit derived from the use of hexavalent chromium.

In addition, the formation of cobalt-containing pigments in which the cobalt is complexed with ligands such as hydrazones, —O bidentates, azomethines, phthalocyanines, azo and disazo complexes, N—S bidentates, oximes, tetraaza complexes, porphyrins, 1,2-dithiolates, and semicarbazones, has also been described. However, these compounds do not use trivalent cobalt and are not used for anticorrosive applications.

U.S. Pat. Nos. 4,096,090 and 4,012,195 to Noack describe catalyzed hydrazine compositions that contain cobalt and act as corrosion inhibitors. For example, U.S. Pat. No. 4,096,090 describes compositions that contain: a) a hydrazine compound; b) a cobalt organometallic compound derived from the reaction of cobalt (II) hydroxide with unsubstituted and substituted orthodihydroxy aromatic compounds and unsubstituted and substituted ortho-aminohydroxy aromatic compounds. Noack observed that 25% of the dissolved oxygen was "removed" in 0.1 minutes, and 95% in 0.3 minutes. Likewise, U.S. Pat. No. 4,012,195 describes a composition containing: a) a hydrazine compound; b) an organometallic complex formed from the reaction of a salt of cobalt and one or more ligands selected from the group consisting of unsubstituted and substituted orthodiamino aromatic compounds, unsubstituted and substituted orthodihydroxy aromatic compounds and unsubstituted and substituted orthoaminohydroxy aromatic compounds. The cobalt is present in the divalent oxidation state. These compositions are also claimed to be oxygen scavengers. Although not specified in the Noack patents, this "oxygen scavenging" activity is the result of dissolved oxygen oxidizing the divalent cobalt to a higher oxidation state. While the combination of these organic compounds with divalent cobalt inhibited corrosion once they "scavenged oxygen", Noack failed to realize that the important constituent of these inhibitor compositions was a trivalent cobalt ion, stabilized by the organic additives.

European Patent Application EP 634,460 to Bamber, et al. describes the use of organic phosphoric or phosphonic acids optionally in conjunction with cobalt for anticorrosive pigments. Further, Bamber, et al. teach a desired solubility of 2 grams per liter or lower as needed at 20° C. The oxidation state of the cobalt is not specified, nor is there described any process that would increase the oxidation state of the cobalt to the trivalent or tetravalent oxidation state. Organic phosphonates or phosphorates are less desirable valence stabilizers for trivalent or tetravalent cobalt, because stabilization of these desired oxidation states are typically not possible using these agents by themselves. This means a resultant oxidation state of +2 for the cobalt and, therefore, pigments derived from these formulations will exhibit low anticorrosive properties.

UK Patent Applications GB 2,138,796 and 2,139,206, as well as German Patent DE 3,309,194 to Fuchs, et al. also describe the use of cobalt complexes in combination with hydrazine to "scavenge oxygen" in boiler feedwaters and therefore inhibit corrosion. These compositions utilize trivalent cobalt precursors such as $Na_3Co(NO_2)_6$ and $Co(NH_3)_5Cl_3$ as the cobalt source. German Patent DE 3,309,194 and UK Patent Application GB 2,139,206 utilize 2-acetamino-4-nitrophenol and/or 2-amino-4-nitrophenol as the third constituent of the compositions, whereas UK Patent Application GB 2,138,796 utilizes pyrogallol as the third constituent. These patents do not recognize the important corrosion-inhibiting properties of trivalent cobalt complexes. These compositions are also "oxygen scavengers", because reacting $Co^{+3}$ (in the precursors) with hydrazine (a strong reducing agent) in the presence of the third constutuent results in $Co^{+2}$ complexes.

Similarly, U.S. Pat. No. 4,479,917 to Rothgery and Manke describe the use of aminoguanidine compounds, optionally in conjunction with cobaltous (divalent cobalt) hydroxide for anticorrosion purposes. These compounds are also said to act as "oxygen scavengers". However, the use of trivalent cobalt in conjunction with this compound is not disclosed.

European Patent Application EP 675,173 to Glausch, et al. describes anticorrosive pigments that are derived from cobalt-containing phthalocyanine and tetraazatetradecane derivatives. However, these pigments are not reported to contain trivalent or tetravalent cobalt.

To date, no truly effective replacements have been developed for pigments based on CrVI. Accordingly, the need remains for improved corrosion-protective pigments composed of currently unregulated and/or nontoxic materials which have an effectiveness, ease of application, and performance comparable to current CrVI pigment formulations, and for methods of making and using the same.

SUMMARY OF THE INVENTION

This need is met by the present invention which represents a significant improvement in the formulation of non-toxic pigments through the use of trivalent cobalt. The trivalent cobalt pigments of the present invention have been demonstrated with accelerated corrosion testing to retard corrosion to a higher degree than prior art cobalt pigments and other alternatives to CrVI-based corrosion inhibiting pigments.

These pigments have been tested to inhibit corrosion to the same degree as zinc and strontium chromate-based CrVI pigments. The raw materials are not exotic, are relatively inexpensive, and do not require complicated synthesis methods.

The present invention utilizes "valency stabilization" of the trivalent (or tetravalent) cobalt ion in the as-formed pigments to achieve corrosion resistance comparable to chromate-based CrVI pigments. More specifically, in order to achieve a high degree of corrosion resistance, a CoIII-based or CoIV-based pigment must exhibit the following characteristics:

1) A corrosion inhibiting pigment must contain a suitable source of oxidizing species. These species quickly oxidize bare metal and form a protective surface if bare metal is exposed in a coating breach.

2) A valence stabilizer for the trivalent cobalt ion is necessary to ensure that the ion will not be reduced too quickly to the divalent state when released into solution or in the coating. The importance of stabilizing the cobalt ion in its trivalent charge state was not previously recognized as critical to the corrosion inhibiting function of a pigment.

3) The CoIII pigment powder must be a "sparingly soluble" compound in water when dispersed in its binder-carrier system. If the pigment is too insoluble in the selected coating system, an insufficient amount of corrosion inhibitor will be delivered to a flaw. A poorly formed, incomplete oxide layer produced by a pigment of too low solubility will not only fail to inhibit corrosion, but can promote crevice corrosion and result in locally enhanced corrosion rates.

The reservoir of oxidizing ions can be quickly flushed away if the pigment is too soluble, and typical corrosion will begin. Highly soluble pigments are also known to result in osmotic blistering of paint films and coatings. Trivalent cobalt pigments that are too soluble can also be responsible for osmotic blistering depending on the aqueous permeability the carrier film.

It is difficult to place specific solubility values to these optimum "sparingly soluble" pigment materials because there appear to be several variables associated with what makes an optimum anticorrosive pigment material (e.g. resin/binder system in which it is placed). It appears that if the trivalent or tetravalent cobalt pigment exhibits a solubility in water of between about $1 \times 10^{-4}$ and about $1 \times 10^{-1}$ moles per liter of trivalent or tetravalent cobalt, then appreciable corrosion inhibition will be observed. Pigments that incorporate stabilized trivalent or tetravalent cobalt compounds that fall outside of this particular range may also exhibit some corrosion inhibition. For example, pigments with solubilities as high as $1 \times 10^{0}$ moles per liter or as low as $1 \times 10^{-5}$ moles per liter of trivalent or tetravalent cobalt at standard temperature and pressure (about 25° C. and about 760 Torr) will exhibit some corrosion resistance in certain binder systems, although not as great as those compounds which fall within the optimum solubility range. The degree of effectiveness will depend on the particular compound itself. The solubility characteristics of the trivalent (or tetravalent) cobalt in the pigment must be controlled through the use of stabilizer materials that form compounds that fall within a desired solubility range. In this way, a "controlled release" of trivalent cobalt can be achieved, much as a "timed release" of hexavalent chromium is achieved in the "state-of-the-art" systems.

4) The "valence stabilizer" optionally helps establish an electrostatic barrier layer around the cation-stabilizer compound in aqueous solutions. The nature and character of the electrostatic double-layer surrounding the cation-stabilizer compound may be controlled and modified by careful selection of stabilizer species. In general, the electrostatic double layer formed acts to protect the cation from premature reaction with hydronium, hydroxide, and other ions in solution. The formation of electrostatic barrier layers also helps to impede the passage of corrosive ions through the binder phase to the metallic surface.

5) The trivalent or tetravalent cobalt pigment material may also exhibit ion exchange behavior towards corrosion promoting ions, particularly alkali species. This optional consideration can be important because alkali ions are aggressive aqueous corrosion enhancers in alloys which contain metals such as aluminum, magnesium, or zinc.

6) The cobalt/valence stabilizer complex can optionally exhibit a color change between the trivalent and divalent cobalt oxidation states. This color change can act as a metric to determine when the "throwing power" associated with the pigments is no longer available, and when the paint system in which it is contained needs to be replaced. For this reason, it is also optionally important that the color of these pigments that exhibit a color change between divalent and trivalent oxidation states that is light-fast (i.e., not changed by strong light).

The effectiveness of an oxidizing species is a function of its individual oxidation-reduction potential, and more highly oxidized species exhibit greater corrosion protection, although lower stability. A stabilizer is necessary to provide a timed release of the inhibitor ion, as well as being needed to ensure that the oxidative strength will not be reduced too rapidly. Thus, a valence stabilizer is required for the trivalent cobalt ion because of its reactivity and to produce controlled trivalent cobalt solubilities. The corrosion resistance of a number of aluminum alloys as tested using both ASTM B-117 and ASTM G-85 has been enhanced through the use of stabilized trivalent cobalt pigments. Not only do these optimized pigments retard corrosion to a higher degree than other prior art trivalent cobalt pigments, but their corrosion resistance is comparable to that of hexavalent chromium systems.

In one aspect, the invention comprises a mechanistic and chemical approach to the production of corrosion-inhibiting pigments using trivalent cobalt. This approach uses stabilizer materials which form compounds with trivalent cobalt that are sparingly soluble in aqueous solution typically in a range of approximately $1 \times 10^{-1}$ to $1 \times 10^{-4}$ moles/liter of trivalent cobalt. This solubility range provides a release of trivalent cobalt at a rate slow enough that most binder systems will provide protection for an extended period of time and fast enough to inhibit corrosion during conventional accelerated corrosion testing methods such as ASTM B-117 and G-85. Compounds that fall slightly outside of this solubility range (as high as $1 \times 10^{0}$ to as low as $5 \times 10^{-5}$ moles/liter of trivalent cobalt) may also provide some corrosion-inhibiting activity under certain conditions and binder systems. However, pigment compounds with aqueous solubilities far outside of the target range are likely to be inefficient corrosion inhibitors. Solubility control can be achieved using organic or inorganic stabilizer materials.

In an optional aspect, the invention is the achievement of corrosion-resistant pigments using trivalent cobalt by the use of stabilizer materials which form compounds that exhibit electrostatic dipoles to form electrostatic barrier layers composed of ions such as hydronium ($H_3O^+$) or hydroxide ($OH^-$) in the presence of water. The formation of these electrostatic barrier layers through the use of stabilizer materials can be achieved using organic or inorganic materials.

In an optional aspect, the invention is the achievement of corrosion-resistant pigments using trivalent cobalt by the use of stabilizer materials which form compounds that exhibit ion exchange behavior towards alkali ions. The formation of this ion exchange behavior can be achieved through the use of organic or inorganic materials.

In another optional aspect, the decomposition temperature of the trivalent cobalt/valence stabilizer complex upon which the pigment is based should be above 100° C. In addition, the melting temperature of the complex is typically above 50° C., although lower-melting complexes may have some applications.

In another optional aspect, the cobalt/valence stabilizer complex upon which the pigment is based should exhibit a color change between the trivalent and divalent oxidation states. This allows for a visual metric of when the pigment has lost its "throwing power", and the binder system within which it is contained must be replaced. Therefore, it is desirable that the color of these pigments be light-fast (unchanged by exposure to strong light).

These CoIII compounds represent a substantial performance improvement over prior art related to pigment alternatives (including those based on cobalt) used to replace CrVI-based corrosion inhibiting pigments. They also provide a capability to tailor the corrosion inhibiting pigment to the carrier system. This allows current binder/resin systems used for chromates to be used for CoIII based systems without modification. Likewise, new binder/carrier/resin systems with improved physical properties can be developed without the restriction of compatibility with zinc or strontium chromate.

The raw materials needed for the solutions used to form these coatings are relatively inexpensive. The pigments do not use exotic materials or require complicated synthesis methods.

Accordingly, it is an object of the present invention to provide non-toxic, corrosion-protective pigments based on trivalent or tetravalent cobalt and for methods of making and using the same. These and other objects and advantages of the present invention will become apparent from the following detailed description and claims.

DETAILED DESCRIPTION OF THE INVENTION

A. Starting Materials

Four general starting materials are used for the preparation of trivalent or tetravalent cobalt corrosion-inhibiting pigments. These include a cobalt source, an oxidation source (if the precursor is a divalent cobalt salt), a valence stabilizer source, and optional additional solubility control agents.

1) Cobalt Source a) Trivalent Cobalt

Cobalt is a nontoxic, non-regulated replacement metal for chromium that exhibits more than one oxidation state (CoII, CoIII, and CoIV). The oxidation-reduction potential for CoIII-CoII is comparable to that of the CrVI-CrIII couple. Important characteristics of the CoIII ion which are relevant to its use in pigment applications include: (1) its valence is fairly stable in solution, but is less stable on drying; (2) its compounds typically have large aqueous solubilities; (3) its compounds are more stable in acidic or neutral pH aqueous solutions than in basic solutions; and (4) its ionic radius of 61 pm is slightly larger than the CrVI ion (44 pm), and it will have a correspondingly lower charge density (electrostatic field) per ion. Forming a compound with the aqueous solubility required of a corrosion inhibiting pigment is problematic because of the need to retain its oxidation state on drying and later during exposure to the corrosive environment.

Cobalt precursors can be nearly any water, alcohol, or hydrocarbon soluble cobalt compound in which the cobalt has either a divalent or trivalent oxidation state. Water-soluble precursors are typically used. Inorganic divalent cobalt precursor compounds include, but are not limited to, cobalt nitrate, cobalt sulfate, cobalt perchlorate, cobalt chloride, cobalt fluoride, cobalt bromide, cobalt iodide, cobalt bromate, cobalt chlorate, and complex fluorides such as cobalt fluosilicate, cobalt fluotitanate, cobalt fluozirconate, cobalt fluoborate, and cobalt fluoaluminate. Organometallic divalent cobalt precursor compounds include, but are not limited to, cobalt formate, cobalt acetate, cobalt propionate, cobalt butyrate, cobalt benzoate, cobalt glycolate, cobalt lactate, cobalt tartronate, cobalt malate, cobalt tartrate, cobalt citrate, cobalt benzenesulfonate, cobalt thiocyanate, and cobalt acetylacetonate. Complex divalent cobalt precursor compounds include, but are not limited to, ammonium cobalt sulfate, ammonium cobalt nitrate, ammonium cobalt chloride, and ammonium cobalt bromide.

The cobalt precursor may also be a compound with cobalt already in the trivalent oxidation state. These compounds include, but are not restricted to, hexaaminecobalt chloride, hexaaminecobalt bromide, hexaaminecobalt nitrate, pentaaminecobalt chloride, pentaaminecobalt bromide, pentaaminecobalt nitrate, lithium cobaltinitrite, sodium cobaltinitrite, tris(ethylenediamine)cobalt chloride, tris(ethylenediamine) cobalt nitrate, bipyridine compounds of trivalent cobalt, phenanthroline compounds of trivalent cobalt, cobalt III acetylacetonate, cobalticarbonates, cobalt III acetate, cobalt III chloride, and cobalt III sulfate. However, trivalent cobalt precursor compounds for pigment applications are not preferred for several reasons. First, the present-day cost of trivalent cobalt precursor compounds is several orders of magnitude greater than divalent cobalt precursor compounds. In addition, some can generate large quantities of gas (e.g., cobaltinitrite=$NO_2$, and cobalticarbonate=$CO_2$) when placed in acidic solutions. Finally, they can lead to lower corrosion protection because they are sometimes stabilized with additional materials (e.g., acetylacetonate) to increase their water solubility.

CoIII is capable of providing corrosion protection at a distance to a metal surface in the presence of coating flaws such as scrapes, scratches, and holes because of its throwing power. The solubility of the CoIII compound needs to be tailored to suit the needs of the protection system and must be neither too high, nor too low in that system. The protective system includes the binder phase, assorted modifiers, and under- and over-coatings. The system needs to be performance matched to its intended usage environment. Timely release and throwing power of the inhibitor are critical to protective performance, but controlled tailoring of these has not been taught in prior art. Likewise, the body of systematic chemistry data required to control these properties has not been readily available in a form useful to help design coatings. The present invention outlines how to stabilize CoIII with a variety of materials so the CoIII may be adapted to a multitude of pigment applications with specific compatibility requirements.

b) Tetravalent Cobalt

The tetravalent cobalt ion (CoIV) is an even better oxidizing species than CoIII. It has a radius of 53 picometers, carries a charge of +4, and has a redox potential over 2.0 V. However, it has a correspondingly lower stability both in and out of solution. Therefore, valence stabilization of this ion is required in order to use it effectively as an anticorrosive pigment. Its very large redox potential makes it prone to rapid reduction, and few materials will effectively valence stabilize it in a sparingly soluble complex, which makes its routine application problematic. The presence of both trivalent and tetravalent cobalt in these coatings can be determined by their magnetic behavior. A combination of CoIII and CoIV is reportedly paramagnetic. Tetravalent cobalt can be made using chemical or electrolytic oxidation, as can trivalent cobalt. While it is not a preferred species because of its difficulty of formation and stabilization, tetravalent cobalt can be incorporated either alone or in conjunction with trivalent cobalt by using tailored valence stabilization.

2) Oxidation Source

An oxidizing species will typically be included in the synthesis solution if divalent cobalt compounds are used as precursors for CoIII. Otherwise, a post-precipitation oxidation step will be required. Additional amounts of oxidizer may be added to help control and maintain a desired amount of CoIII in the pigment solution by reoxidizing CoIII that has become reduced. The trivalent cobalt ion is an exceptionally good oxidizing species with an oxidation-reduction potential of +1.92 V at a pH of 0 for the CoIII-CoII couple in water. Strong oxidizers are required because of the high potential of their redox reaction. The oxidizers may be gases, liquids, or solids. Solid oxidizers are typically used for this application due to ease of handling and reagent measurement. Other starting materials (cobalt source and stabilizer source) will also frequently be solids. Liquid oxidizers may be used, but handling and accurate process metering have proven difficult. Gaseous oxidizers may be the most cost effective and chemically efficient on a large scale, but are also the most problematic due to handling and venting concerns.

Oxidizers suited for the purpose of producing and maintaining the cobalt ion in the trivalent charge state include but are not restricted to peroxides and peroxo compounds (including superoxides, persulfates, perborates, permitrates, perphosphates, percarbonates, persilicates, peraluminates, pertitanates, perzirconates, permolybdates, pertungstates, pervanadates, and organic peroxyacid derivatives), ozone, hypochlorites, chlorates, perchlorates, nitrates, nitrites, vanadates, iodates, hypobromites, chlorites, bromates, permanganates, periodates, and dissolved gases such as oxygen, fluorine, or chlorine. Inorganic and organic derivatives of these compounds may be used. Typical oxidizers for this use are peroxides, persulfates, perbenzoates, periodates, bromates, hypochlorites, gaseous dissolved oxygen, and even the oxygen content of air. In general, any inorganic, organic, or combination species with an oxidation potential of +1.5V or greater (at a pH of 1) will be capable of oxidizing divalent cobalt to the trivalent, or in some instances the tetravalent, oxidation state.

Oxidized cobalt may also be produced in solution by electrolytic oxidation. However, this approach may not be economically feasible due to the energy costs associated with electrolytic oxidation. Chemical oxidation, such as that described above, currently offers the best-value approach for oxidizing cobalt to the trivalent state.

It is also possible to produce a divalent cobalt/valence stabilizer complex, and then apply an oxidizer to oxidize divalent cobalt to trivalent cobalt. This, however, is less typical because the percentage of trivalent cobalt will decrease from the outside to the interior of the pigment particle.

3) Valence Stabilizers

Cobalt is effective as an oxidative corrosion inhibitor if it can be supplied in sufficient quantities in the trivalent charge-state when brought into contact with unprotected bare metal. Corrosion resistance comparable to that of CrVI can be achieved by the use of valence stabilized CoIII oxidizer ions in pigment compounds. Valence stabilizers are materials that, when assembled, modify the rate of reduction and the solubility of the CoIII ion. Valence stabilization has not been previously recognized as an important consideration in the development of effective corrosion inhibiting pigments. Stabilization helps avoid reduction and premature conversion of the ion to the divalent charge-state during compound formation, carrier incorporation, application, and exposure to a corrosive environment. Stabilizers control solubility, mobility, ion exchange, binder compatibility, and the degree of surface wetting. The exact solubility of this compound may be modified by species released into solution by the dissolving metal surface or by the subsequent addition of solubility control agents. A variety of inorganic and organic stabilizers are available that can serve to control solubility. The stabilizer may also act as an ion-exchange host and/or trap for alkali or halide ions in solution.

The need for "valence stabilization" of trivalent (or tetravalent) cobalt for corrosion inhibition has only been indirectly noted in the general corrosion literature as a synergistic enhancement. Corrosion inhibition behavior of nitrogen-containing organics such as aniline or pyridine has been reported to be enhanced with the addition of cobalt. The exact nature of this "synergistic enhancement" has never been adequately explained. These "synergistic" mixtures of nitrogen-containing organics and cobalt have also been described as being "oxygen-scavengers", and the organics are frequently observed to "chemisorb" onto the substrate piece being protected.

This enhancement can be explained by the "valence stabilization" model of corrosion inhibition by trivalent (or tetravalent) cobalt outlined here. Nitrogen-containing organics and cobalt result in the formation of an organometallic complex where the central cobalt ion can be stabilized in a higher oxidation state. The observed "oxygen-scavenging" phenomenon associated with dissolved oxygen in aqueous solutions is easily explained by the oxidation of stabilized divalent cobalt to the trivalent state. "Sparingly soluble" CoIII complexes containing these organics are responsible for the corrosion-inhibiting activity, and these organics will appear to be "adsorbed" or "chemisorbed" from solution onto the metal piece being protected due to precipitation.

The key to providing a useful source of trivalent cobalt at a metal surface is the creation of a sparingly soluble compound in which the CoIII ion is shielded from premature reduction during and after pigment formation. The formation of pigments with the proper release rate of CoIII ions is problematic because of the instability of CoIII out of solution. A valence stabilizer must assemble around CoIII to form a sparingly soluble compound in order to produce the active corrosion-inhibiting component in a pigment. It is difficult to place specific solubility values to these optimum sparingly soluble pigments because of the wide range of binder systems in which corrosion-inhibiting pigments are used.

A CoIII-stabilized compound with a solubility in water of between about $1 \times 10^{-4}$ and about $1 \times 10^{-1}$ moles per liter of trivalent (or tetravalent) cobalt should exhibit appreciable corrosion inhibition when used as a primer pigment. This solubility range provides a release of trivalent cobalt at a rate slow enough that protection will be provided for an extended period of time and fast enough to inhibit corrosion during conventional accelerated corrosion testing methods such as ASTM B-117 and G-85 for coatings that contain these pigments. Cobalt compounds that fall outside of this particular solubility range may exhibit a small degree of corrosion inhibition. For example, compositions with solubilities as high as $1\times10^0$ moles per liter or as low as $5\times10^{-5}$ moles per liter of trivalent (or tetravalent) cobalt will exhibit some corrosion resistance, although they will not be as effective as those compounds within the optimum solubility range. The more common CoIII compounds, such as the acetate, sulfate, and acetylacetonate are generally too soluble to provide effective corrosion inhibition if incorporated into a binder system such as a paint. Other compounds, such as $CO_2O_3$ or $CO_3O_4$, as described in the prior art, would not serve as effective corrosion inhibiting pigments because they are too insoluble. (The respective solubility of these materials in water is approximately $1\times10^{-5}$ moles per liter of trivalent cobalt).

The needed solubility will be strongly dependent on the net aqueous solubility of overlying paints and coatings and their usage environment. For example, solubility tailoring would be useful in a situation where a protected substrate is suddenly immersed in seawater, or where a rubber sealant allows only limited water penetration. Adequate corrosion protection could be achieved through the formation of a trivalent cobalt pigment compound that exhibits a higher solubility in water (e.g., $1\times10^0$ to $1\times10^{-3}$ moles per liter CoIII). A rapid release of protective trivalent cobalt ions would happen at the expense of depleting the cobalt quickly from the coating. Trivalent cobalt pigments of lower solubilities (e.g., $5\times10^{-5}$ to $1\times10^{-3}$ moles per liter CoIII) may also be useful in some situations (e.g., as paints in nearly pure deoxygenated water). The number and range of compound solubilities offered by valence stabilized CoIII compounds allows the development of protective coating systems with broad performance and application ranges. This feature is not presently available even for CrVI based corrosion inhibiting pigments.

Any material in the synthesis bath which complexes with trivalent cobalt (whether inorganic or organic) and which results in the formation of a CoIII-containing compound that exhibits solubilities within or near this solubility range can serve as a valence stabilizer for trivalent cobalt. The assembly of a protective shell around the highly charged CoIII and its associated oxygen and hydroxyl species can help control the rate at which the cobalt is reduced and its oxygen is released. Proper selection of materials for forming the protective shell will allow solubility tailoring of the entire assembly to its intended application environment. Valence stabilizers described above may need some type of additional solubility control to optimize the performance of the trivalent cobalt-valence stabilizer compound. Additional solubility control agents may be in the form of inorganic or organic compounds. Their use is optional rather than a requirement for effective valence stabilization and solubility control.

Several variables are associated with making optimized pigments. If the pigment is too insoluble, then insufficient trivalent cobalt is available to inhibit corrosion. Low solubility compounds that do not provide a sufficient amount of oxidation quickly enough to a coating breach may produce an incomplete oxide layer and thus an ineffective barrier film. If the cobalt pigment is too soluble, it will be washed away quickly, and an incomplete thin oxide film will form that will not provide long-term corrosion protection, or osmotic blistering of the paint system may result. The formation of spotty or patchy oxides can promote localized crevice corrosion and can result in enhanced corrosion rates at the breach.

The traditional chromate pigments are used not only in alkyd resin systems (e.g., DoD-P-15328D Wash Primers), but also in acrylic systems (e.g., MIL-P-28577B Water-Borne Acrylic Primers), and even in sulfonated rubber sealants (e.g., MIL-PRF-81733D Sealing and Coating Compound). Fortunately, it is possible to tailor the CoIII-valence stabilizer compound pigment systems themselves to specific binder/solvent systems using solubility (cohesion) parameters. Solubility parameters define how well an inorganic or organometallic complex will disperse in a given resin/binder system. This represents a radical departure from traditional paint systems, in which the paint systems are configured to specific pigments.

The formation of an electrostatic double layer can be important for the effectiveness of a corrosion inhibitor once it is released into solution during corrosion. There are differences in anodic and cathodic polarization, solubility, and the saturated pH of aqueous solutions of various chromate pigments. The formation of an electrostatic double layer around the pigment while in its carrier film will not be as important as when the species is in solution. For this reason, the development of an electrostatic double layer around the pigment is an optional consideration. For example, zinc chromate pigment-filled paint does not exhibit electrochemical inhibiting behavior. The carrier film typically behaves as a water impermeable barrier and will muffle the polar character of the pigment. The hexavalent chromium pigments $SrCrO_4$ and $ZnCrO_4$ have very small barrier layers associated with them, but they are effective as corrosion-inhibiting pigments. Optimized solubility for CoIII-valence stabilizer compounds alone can result in corrosion resistance comparable to the state-of-the-art chromium pigments. The degree of polarization exhibited by the CoIII ion will be less than the CrVI ion because of its larger ionic radius and lower charge-state, and it will not be as efficient in forming electrostatic double layers in aqueous solution. The valence stabilization of trivalent cobalt should be optimized to achieve the highest degree of efficiency in both solubility control and polar character, in order to further enhance the corrosion resistance.

The nature and character of the "electrostatic double layer" surrounding the trivalent cobalt/valence stabilizer compound may be controlled and modified by careful selection of organic or inorganic stabilizers. Characteristics such as the electrical dipole moment and the shape/conformation (for steric effects) of the stabilizer were found to influence the performance of the corrosion-inhibiting pigment. These stabilizer ions establish a protective electrostatic shell around the cation-stabilizer compound and gather additional layers of ions such as hydronium ($H_3O^+$) or hydroxide ($OH^-$) about them. The size of the electrostatic double layer is a function of the electrostatic potential at the compound surface and is inversely proportional to the ionic strength of the surrounding solution. An electrostatic double layer will likely form in aqueous solution for compounds that can carry a charge, have a natural electrostatic dipole, or can have an induced dipole. However, these compounds do not normally act as corrosion inhibitors because they have not been optimized for that purpose.

The melting point and decomposition temperature of the pigment material are important. Trivalent cobalt-valence stabilizer compounds that decompose below about 100° C. limit both their useful lifetimes and range of use. The melting temperature should be above about 50° C. to ensure that the liquid phase does not form during normal handling procedures. An additive may be needed for pigments with melting temperatures below about 50° C. Inert solid addendum materials need not have any inherent corrosion-inhibiting capability and are used to provide a base (support) that the pigment can absorb on or into. Oxides, phosphates, borates, silicates, and polymers are examples of support compounds that can be used. Low melting temperature pigments (below about 50° C.) can be used, but they require handling and processing different from higher melting temperature pigments. Liquid-phase corrosion inhibitors based on CoIII and CrVI pigments have been demonstrated to provide excellent performance as corrosion inhibitors in primer paint systems.

The corrosion-inhibiting pigments of the present invention can optionally exhibit a color change between trivalent species and divalent species. The implications of these color changes from an applications standpoint are significant. Color changes in the pigment material in use can be used as a metric to determine when the pigment no longer exhibits corrosion-inhibiting action as a result of depleting the oxidized ion. Changes in hue of the pigment can be used to determine how much service life remains for that pigment in terms of corrosion-inhibiting capacity. Valence based color change is an attribute that conventional chromate pigments do not exhibit. The color change associated with their redox reaction of chromate pigments is insignificant as the pigments are reduced and "depleted" of their corrosion-inhibitive capability. Thus, trivalent cobalt/valence stabilizer combinations that exhibit these color changes are superior to chromium in terms of providing an easily measured, easily observed metric to gauge remaining service life of the pigment. However, this color change should not be initiated by exposure to strong light. Light-fast pigments are therefore desirable for these indicator pigments.

The incorporation of the valence stabilizer (inorganic or organic) may optionally result in the formation of a CoIII-valence stabilizer compound that also exhibits ion exchange behavior towards alkali ions. This is not a requirement of the CoIII-valence stabilizer compound, and pigments that do not exhibit this phenomenon have been successfully demonstrated to inhibit corrosive attack. However, it is a desirable characteristic for enhanced corrosion resistance. Existing CrVI-based pigment systems do not exhibit this behavior to any significant degree.

The design of suitable CoIII-valence stabilizer compounds allows typical and less typical stabilizers to be identified. The general classes of compounds described below represent only a first approximation of whether a specific coordination compound will provide favorable or unfavorable properties in a CoIII-valence stabilizer compound. Property tailoring can also take place through selection of specific anions or cations bound to the CoIII-valence stabilizer coordination compound. The "physiology" of inorganic stabilizers is simple because of the limited number of atoms and structural arrangements involved in their formation. The "physiology" of organic stabilizers is not as simple. An organically stabilized cobalt compound may have one or more organic ligands that may have one or more bonding sites that can interact with the CoIII ion/oxide cluster. The bonding groups can be the same or different atoms or functional groups on an individual or a variety of ligands. An organic stabilizer ligand can be modified in an unlimited number of ways to tailor its physical behavior with respect to such properties as chemical reactivity, solubility, electrostatic and polar character, and functional behavior.

It is possible to fine tune the electronic and structural characteristics of a CoIII-valence stabilizer compound further via substituent groups on the coordinating ligand, and/or by the selection of cations or anions to complete the charge balance of the CoIII-valence stabilizer compound. For example, some substituent groups have large dipole moments associated with them, which will increase the electrostatic barrier layers associated with the cobalt/valence stabilizer complexes. These include: ketones (=C=O), thioketones (=C=S), amides (—C[=O]—$NR_2$), thioamides (—C[=S]—$NR_2$), nitriles or cyano groups, (—CN), isocyanides (—NC), nitroso groups (—N=O), thionitroso groups (—N=S), nitro groups (—$NO_2$), azido groups (—$N_3$), cyanamide or cyanonitrene groups (=N—CN), cyanate groups (—O—CN), isocyanate groups (—N=C=O), thiocyanate groups (—S—CN), isothiocyanate groups (—N=C=S), nitrosamine groups (=N—N=O), thionitrosamine groups (=N—N=S), nitramine groups (=N—$NO_2$), thionitramine groups (=N—$NS_2$), carbonylnitrene groups (—CO—N), thiocarbonylnitrene groups (—CS—N), sulfenyl halides (—S—X), sulfoxides (=S=O), sulfones (=S[=O]$_2$), sulfinyl groups (—N=S=O), thiosulfinyl groups (—N=S=S), sulfenyl thiocyanato groups (—S—S—CN), sulfenyl cyanato groups (—S—O—CN), sulfodiimine groups (=S[=NH]$_2$), sulfur dihaloimido groups (—N=S$X_2$), sulfur oxide dihaloimido groups (—N=S[=O]$X_2$), aminosulfur oxide trihalide groups (=N—S[=O]$X_3$), sulfonyl azide groups (—S[=O]$_2$$N_3$), sulfonyl thiocyanate groups (—S[=O]$_2$SCN), sulfonyl cyanate groups (—S[=O]$_2$OCN), sulfonyl cyanide groups (—S[=O]$_2$CN), halosulfonate groups (—S[=O]$_2$OX), phosphonyl thiocyanate groups (—P[=O]OHSCN), phosphonyl cyanate groups (—P[=O]OHOCN), and phosphonyl cyanide groups (—P[=O]OHCN). In this way, the characteristics of less typical coordinating ligands may be adjusted so that the resultant CoIII-valence stabilizer compound does exhibit some degree of corrosion inhibition. Conversely, the physical characteristics of typical coordination compounds can be adjusted so that they are no longer suitable as a corrosion inhibitor.

Valence stabilizers can be either organic or inorganic compounds. Cobalt coordination chemistry, which has been the subject of numerous scientific studies for almost 100 years, identifies chemical binding preferences, structure stability, and the physical properties of the resulting compounds. Producing effective CoIII-valence stabilizer compounds requires understanding the electrostatic and structural influence of candidate species on the compound. The solubility of the valence stabilized CoIII-compound scales roughly with the inverse of its diameter. The CoIII ion and its layer of negatively charged hydroxyl ions are very small, which results in a high degree of aqueous solubility. The field strength of the complex also scales with the inverse of its physical diameter. Large compounds with an optimal degree of solubility will not necessarily be ideal with respect to the size of their electrostatic double layer. The size of the ligand must therefore be balanced against the desired electrical properties. The CoIII ion generally favors complexation either in the tetrahedral (coordination number 4) or octahedral (coordination number 6) arrangements, although it will occasionally be found in a trigonal bipyramid or square planar arrangement. Valence stabilizers (and stabilizer combinations) should be selected with the goal of achieving these coordinations.

Stabilizers can be designed that result in cobalt compounds with the necessary physical, electrical, and chemical properties to perform as corrosion inhibitors with this information. The nature of a particular valence stabilizer shell surrounding the cobalt ion, or combination of valence stabilizers, can be further manipulated by the selection of appropriate "shaping groups" and heteroatoms at the binding site. Inorganic valence stabilizers are typically oxygen-containing coordinations. Therefore, manipulation of different sized octahedra, tetrahedra, etc. around the CoIII ion is best controlled through adjustment of the heteroatoms (e.g., Mo, W, Te, etc.) within these "polymerized" oxygen-containing ligands.

For organic compounds, the physical geometry of the binding sites is important to the stability of the CoIII-stabilizer compound. The influence of site geometry becomes evident when the solvation shell of a CoIII ion is replaced by the ligand donor atoms as when pigments are formed. The number of available ligand binding sites should be at least equal to the standard coordination number of the CoIII ion. The balance between solvation of the ligand and CoIII and their complexation where CoIII is solvated by a specific ligand is critical in maintaining stability. CoIII-ligand attraction increases with the number of available binding sites on the ligand. However, with an increasing number of binding sites, site-site repulsions will also increase, resulting in lower stability.

The number of binding sites available on the complexing ligand is important to the resulting CoIII-stabilizer's properties. Several ligands are required to effectively stabilize CoIII if the chosen ligand has only one binding site. For example, six $NH_3$ ligands are needed to octahedrally coordinate CoIII in a hexaaminecobalt(III) compound because $NH_3$ has only one binding site. Bulky ligands with only one binding site, like pyridine, can be sterically hindered from packing tightly around the ion and will result in decreased compound stability. Conversely, macrocyclic organic and polymeric inorganic ligands can have many suitable binding sites. However, instability will result if a CoIII ion is not completely embraced by all of the multiple macromolecular bonding sites on the ligand. For example, if a macromolecule surrounding the CoIII ion has an insufficient number of binding sites available for charge balance, then the CoIII-stabilizer compound will be much less stable than a macromolecule that contains an adequate number of sites.

The stability of the CoIII-organic compound is strongly influenced by the charge, charge sign, and degree of polarizability of specific binding sites. Factors influencing compound stability include: 1) ion-pair interactions for charged ligands and CoIII; 2) ion-dipole and ion-induced dipole interactions for neutral ligands; 3) hydrogen bonding; and 4) the hard-soft acid-base (HSAB) rules convention of coordination chemistry. HSAB rules help identify functional groups on ligands that might be effective as binding sites. Optimum binding for organic valence stabilizers to CoIII will be with ligands with soft bonding species such as those that contain sulfur or phosphorus. Certain coordination complexes of the hard base nitrogen are also effective for binding with CoIII. HSAB rules can also help identify groups that might provide a degree of polarization to the stabilizer because of their large dipole moments. The nature of bonding between the CoIII ion/oxide cluster and the stabilizer ligand can be altered by using a substituent group to modify the stabilizer. Specific interactions between the ligand and CoIII can be tailored by substituent group selection coupled with altering the size or geometry of the complexing ligand. Some substituent groups, such as carbonyls (ketones, amides, ureas), nitro groups, cyano groups, and azido groups have large dipole moments. The polarization of the CoIII-stabilizer can therefore be optimized via evaluation of the effect of ligand type and substituents.

Finally, the size of the valence stabilizer plays an important role in solubility control of the resultant CoIII-valence stabilizer compound. As the ligand increases in size, it becomes more difficult to keep it in solution, therefore lowering the solubility. However, this must be balanced against the fact that as ligands are increased in size, it also becomes more difficult to establish the necessary dipoles at the compound/water interface. The size of the ligand must therefore be balanced against the desired electrical properties. The addition (or subtraction) of functional groups on organic valence stabilizers can be used to modify the solubility of the formed $Co^{+3}$/valence stabilizer species. For example, the addition of sulfonated groups ($—SO_3^-$) to organic valence stabilizers will significantly increase the solubility in water. Other substituent groups that will increase the solubility in water include: carboxyl groups ($—CO_2—$), hydroxyl groups ($—OH$), ester groups ($—CO_3—$), carbonyl groups ($=C=O$), amine groups ($—NH_2$), nitrosamine groups ($=N—N=O$), carbonylnitrene groups ($—CO—N$), sulfoxide groups ($=S=O$), sulfone groups ($=S[=O]_2$), sulfinyl groups ($—N=S=O$), sulfodiimines ($=S[=NH]_2$), sulfonyl halide groups ($—S[=O]_2X$), sulfonamide groups ($—S[=O]_2 NH_2$), monohalosulfonamide groups ($—S[=O]_2 NHX$), dihalosulfonamide groups ($—S[=O]_2MX_2$), halosulfonate groups ($—S[=O]_2OX$), halosulfonate amide groups ($=N—S[=O]_2X$), aminosulfonate groups ($=N—S[=O]_2 OH$), iminodisulfonate groups ($—N[SO_3^-]_2$), phosphonate groups ($—PO_3^{-2}$), phosphonamide groups ($—PO_2NH_2^-$), phosphondiamide groups ($—PO[NH_2]_2$), aminophosphonate groups ($=N—PO_3^{-2}$), and iminodiphosphonate groups ($—N[PO_3^{-2}]_2$). Conversely, the addition of nitro groups ($—NO_2$), perfluoroalkyl groups ($—C_xF_{2x+1}$), perchloroalkyl groups ($—C_xCl_{2x+1}$), nitramine groups ($=N—NO_2$), thioketone groups ($=C=S$), sulfenyl halide groups ($—S—X$), and sulfur dihaloimide groups ($—N=SX_2$) to organic valence stabilizers will decrease the solubility in water. In this way, the solubility characteristics of valence stabilizers can be "tailored" to meet specific binder/resin needs.

Valence stabilizers and combinations of stabilizers can be manipulated by the selection of "shaping groups" and heteroatoms positioned at the binding site. Saturated organic chains can form flexible ligands that wrap around CoIII and can enhance its stability. Unsaturated organics typically have less freedom to bend and contort and are less likely to be a ligand that can wrap around the CoIII ion. Addition of substituents onto an organic ligand may further restrict its freedom to flex. For example, the attachment of a phenyl group onto an organic valence stabilizer that contains two or more binding sites will likely restrict the ability of that ligand to flex around the CoIII ion so as to tetrahedrally or octahedrally coordinate it.

The physical, chemical, and electrostatic requirements for the design of effective pigments based on CoIII-stabilizer compounds result in lists of stabilizers that may be divided into wide band or narrow band stabilizer classes for CoIII. Wide band valence stabilizers can be used under a wide variety of service conditions (e.g., corroding specie, temperature, etc.) to achieve a high degree of corrosion resistance. Wide band physical properties (stability, solubility, and polarization) can be achieved by both inorganic or organic valence stabilizers. The desirable physical property of ion exchange can also be achieved with both inorganic and organic coordination compounds. "Narrow band" valence stabilizers result in satisfactory pigments only under limited applications.

The compounds listed here are general guides for the initial selection of a coordination compound and do not represent a complete list. Tailoring substituent groups and the selection of cations or anions for charge balance can influence whether a particular CoIII-stabilizer compound will have wide band or narrow band corrosion inhibiting characteristics. Both inorganic or organic valence stabilizers may form compounds with the necessary physical properties of stability, solubility, and polarization to be effective corrosion inhibiting pigments.

3a) Wide Band Inorganic Valence Stabilizers

Wide band inorganic valence stabilizers are formed around the CoIII ion by "polymerizing" in synthesis solution. Inorganic wide band valence stabilizers for CoIII include molybdates ($Mo^{+6}$, $Mo^{+5}$, or $Mo^{+4}$, for example $[Co^{+3}Mo_6O_{18}(OH)_6]^{3-}$ and $[Co^{+3}_2Mo_{10}O_{34}(OH)_4]^{6-}$), tungstates ($W^{+6}$, $W^{+5}$, or $W^{+4}$, for example $[Co^{+3}W_{12}O_{40}]^{5-}$), vanadates ($V^{+5}$ and $V^{+4}$, for example $[Co^{+3}V_{10}O_{28}]^{3-}$), niobates ($Nb^{+5}$ and $Nb^{+4}$, for example $[Co^{+3}Nb_4O_{12}(OH)_2]^{3-}$), tantalates ($Ta^{+5}$ and $Ta^{+4}$, for example $[Co^{+3}Ta_4O_{12}(OH)_2]^{3-}$), tellurates ($Te^{+6}$ and $Te^{+4}$), periodates ($I^{+7}$), iodates ($I^{+5}$, for example $[Co^{+3}(IO_3)_4]^{1-}$), carbonates ($C^{+4}$, for example $[Co^{+3}(CO_3)_3]^{3-}$), antimonates ($Sb^{+5}$ and $Sb^{+3}$), and stannates ($Sn^{+4}$). Many of these inorganics form octahedral and tetrahedral heteropolymetallate structures on precipitation from solution. For example, tellurate ions begin to polymerize near pH 5 in water and will complex with CoIII ions in basic solution pH's. Therefore, as the pH is raised in the pigment synthesis bath, the tellurate ion polymerizes to polymorphs, which then complex the CoIII ion.

The general structural aspects of heteropolymetallates are well understood, and the stability of heteropolymetallates as a function of composition and structure is also well-characterized. The relatively unstable CoIII ion is protected and stabilized within the surrounding octahedral and tetrahedral groups, although specific configurations of the heteropolymetallate anions differ from stabilizer to stabilizer (i.e., from molybdate to periodate to carbonate). The dimensions of the octahedra and tetrahedra are controlled by the size of the heteroatom (e.g., Mo, W, Te) around which they are assembled.

A CoIII ion trapped by the precipitation of these heteropolymetallates and its resulting "ion within a cage" structure can exhibit an even greater apparent volume due to the development of a large electrostatic double layer. This will influence both the valence stabilization of the CoIII, as well as the solubility of the assembled compound. These compounds are reported to be excellent ion exchange agents for alkali ions. This caging structure serves to lower the solubility of the CoIII because the chemical elements typically associated with these valence stabilizers (e.g., I, Te, Mo, W) are all inherently less soluble in water than CoIII. These materials can also establish oriented dipoles with the interior CoIII ion and form an electrostatic double layer during aqueous corrosion. Finally, the elements associated with these valence stabilizers themselves can contain high valence ions (such as $V^{+5}$, $Te^{+6}$, $Mo^{+6}$), which will also serve somewhat in corrosion protection, although not to the degree of CoIII (or CrVI), due to their lower redox potential.

Water-soluble precursors for these materials are generally used so that the synthesis can be carried out from aqueous solution. Many elements associated with these stabilizers (e.g., Mo, W, Te) do not typically form water-soluble compounds so the identification of suitable precursors can be difficult.

Complex, partially-polymerized salts such as para- or meta-polymorphs for each compound may also be used as precursors. These polymorphs typically exhibit slightly lower solubilities in water than the simple salts. Peroxo-salts of these compounds, especially percarbonates, permolybdates, pertungstates, and pervanadates may also be used as precursors. Formation of the chosen heteropolymetallates from precursors such as the fluorides, chlorides, bromides, nitrates, and perchlorates (e.g., $SnCl_4$ to form heterostannates and $SbF_5$ to form heteroantimonates) can be difficult, but may be acceptable in certain circumstances. A valence stabilizer can be a cross between two or more of the wide-band inorganic valence stabilizers listed above. For example, a valence stabilizer composed of a periodate and a molybdate may be desirable in some situations. During the synthesis process, both of these materials will polymerize to form a mixed periodate/molybdate valence stabilizer out of the pigment solution.

3b) Wide Band Organic Valence Stabilizers

A variety of organic compounds meet the criteria to be typical wide band valence stabilizers for CoIII. These coordination ligands produce CoIII valence stabilized compounds that fulfill the general requirements of a CoIII pigment material. Organic compounds can be very effective cobalt stabilizers and provide the greatest degree of freedom in designing new cobalt-stabilizer compounds with new functionalities. More possible organic valence stabilizer species exist than inorganic valence stabilizers because of the immense number of organic compounds and functionalities from which to choose. Water-soluble precursors for the organic valence stabilizers are generally used so that pigment synthesis can be carried out in aqueous solution. However, alcohol or hydrocarbon soluble species can also be used.

The number of wide band (and narrow band) organic compounds that are acceptable as valence stabilizers for trivalent cobalt is limited. Common organic compounds such as alcohols, aldehydes, ketones, esters, ethers, alkyl or aromatic halides, most carboxylic acids, anhydrides, phenols, sulfonic acids, phosphonic acids, carbohydrates, waxes, fats, sugars, and oils are not as effective as the structural types described in these Tables to stabilize the trivalent cobalt ion. At best, some of the organic types described in these Tables may presently be used for other industrial applications, but their incorporation into corrosion-inhibiting blends to stabilize trivalent cobalt has heretofore been unrecognized.

The choice of substituent functional groups on these general classes of valence stabilizers will affect the physicochemical properties of the CoIII-containing compound and the corrosion resistance achieved using that compound. For example, the addition of $-NH_2$ or $=O$ substituents increases the net polarization of the overall net CoIII/valence stabilizer compound, but will also increase its water solubility. Careful molecular design of CoIII compounds is necessary in order to achieve desired performance characteristics.

In general, the bonding atoms in typical organic valence stabilizers are nitrogen, phosphorus, or sulfur, with oxygen being acceptable in some circumstances. Oxygen is complexed with $Co^{+3}$ most frequently in association with at least one of the other three. Bonding atoms such as carbon, silicon, tin, arsenic, and antimony are much less desirable due to problems with valence stability, toxicity, or solubility. Other stable coordinations (like octahedral) are known, even though these particular agents are shown in tetrahedral coordination with $Co^{+3}$. These valence stabilizers all serve to stabilize the $Co^{+3}$ ion within a sparingly soluble complex that can exhibit a polar character in aqueous solution.

TABLE 1

Wide Band Organic Valence Stabilizers for the $Co^{+3}$ Ion

| General Structural Name (Type of Organic) | Structural Representation |
|---|---|
| N Valence Stabilizer #1: Monoamines (N Monodentates) | $NH_3$, $NH_2R$, $NHR_2$, and $NR_3$ where R represents H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #2: Diamines (N—N Bidentates) | R'—N—R—N—R", where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #3: Triamines (either N—N Bidentates or N—N Tridentates) | R—N—R'—N—R"—N—R''', where R, R', R", and R''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #4: Tetramines (N—N Bidentates, N—N Tridentates, or N—N Tetradentates) | R—N—R'—N—R"—N—R'''—N—R'''', where R, R', R", R''', and R'''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #5: Pentamines (N—N Bidentates, N—N Tridentates, or N—N Tetradentates) | R—N—R'—N—R"—N—R'''—N—R''''—N—R''''', where R, R', R", R''', R'''', and R''''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #6: Hexamines (N—N Bidentates, N—N Tridentates, N—N Tetradentates, or N—N Hexadentates) | R—N—R'—N—R"—N—R'''—N—R''''—N—R'''''—N—R'''''', where R, R', R", R''', R'''', R''''', and R'''''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #7: Five-Membered Heterocyclic Rings containing One, Two, Three, or Four Nitrogen Atoms wherein at least one Nitrogen Atom is a Binding Site (N Monodentates or N—N Bidentates) | Five membered heterocyclic ring containing one, two, three, or four nitrogen atoms, all of which may or may not function as binding sites. Can include other ring systems bound to this heterocyclic ring, but they do not coordinate with the stabilized, high valence metal ion. Ring can also contain O, S, or P atoms. This 5-membered ring and/or attached, uncoordinating rings may or may not have halogen or polarizing or water-insolubilizing/solubilizing groups attached. |
| N Valence Stabilizer #8: Six-Membered Heterocyclic Rings containing One, Two, Three, or Four Nitrogen Atoms wherein at least one Nitrogen Atom is a Binding Site (N Monodentates or N—N Bidentates) | Six membered heterocyclic ring containing one, two, three, or four nitrogen atoms, all of which may or may not function as binding sites. Can include other ring systems bound to this heterocyclic ring, but they do not coordinate with the stabilized, high valence metal ion. Ring can also contain O, S, or P atoms. This 6-membered ring and/or attached, uncoordinating rings may or may not have halogen or polarizing or water-insolubilizing/solubilizing groups attached. |
| N Valence Stabilizer #9: Five-Membered Heterocyclic Rings containing One, Two, Three, or Four Nitrogen Atoms and having at least one additional Nitrogen Atom Binding Site not | Five membered heterocyclic ring(s) containing one, two, three, or four nitrogen atoms. In addition, ligand contains additional nitrogen-containing substituents (usually amines) that constitute N binding sites. Can include other |

TABLE 1-continued

Wide Band Organic Valence Stabilizers for the $Co^{+3}$ Ion

| General Structural Name (Type of Organic) | Structural Representation |
|---|---|
| in a Ring (N Monodentates, N—N Bidentates, N Tridentates, N—N Tetradentates, or N—N Hexadentates) | ring systems bound to the heterocyclic ring or to the N-containing substituent, but they do not coordinate with the stabilized, high valence metal ion. Ring(s) can also contain O, S, or P atoms. This 5-membered ring(s) and/or attached, uncoordinating rings and/or N-containing substituent(s) may or may not have halogen or polarizing or water-insolubilizing/solubilizing groups attached. |
| N Valence Stabilizer #10: Six-Membered Heterocyclic Rings containing One, Two, Three, or Four Nitrogen Atoms at least one additional Nitrogen Atom Binding Site not in a Ring (N Monodentates, N—N Bidentates, N—N Tridentates, N—N Tetradentates, or N—N Hexadentates) | Six membered heterocyclic ring(s) containing one, two, three, or four nitrogen atoms. In addition, ligand contains additional nitrogen-containing substituents (usually amines) that constitute N binding sites. Can include other ring systems bound to the heterocyclic ring or to the N-containing substituent, but they do not coordinate with the stabilized, high valence metal ion. Ring(s) can also contain O, S, or P atoms. This 6-membered ring(s) and/or attached, uncoordinating rings and/or N-containing substituent(s) may or may not have halogen or polarizing or water-insolubilizing/solubilizing groups attached. |
| N Valence Stabilizer #11: Five-Membered Heterocyclic Rings containing One, Two, Three, or Four Nitrogen Atoms at least one additional Nitrogen Atom Binding Site in a Separate Ring (N Monodentates, N—N Bidentates, N—N Tridentates, N—N Tetradentates) | Five membered heterocyclic ring(s) containing one, two, three, or four nitrogen atoms. In addition, ligand contains additional nitrogen-containing rings that constitute N binding sites. Can include other ring systems bound to the N-containing heterocyclic rings, but they do not coordinate with the stabilized, high valence metal ion. Ring(s) can also contain O, S, or P atoms. This 5-membered ring(s) and/or additional N-containing ring(s) and/or attached, uncoordinating rings may or may not have halogen or polarizing or water-insolubilizing/solubilizing groups attached. |
| N Valence Stabilizer #12: Six-Membered Heterocyclic Rings containing One, Two, Three, or Four Nitrogen Atoms at least one additional Nitrogen Atom Binding Site in a Separate Ring (N Monodentates, N—N Bidentates, N—N Tridentates, N—N Tetradentates) | Six membered heterocyclic ring(s) containing one, two, three, or four nitrogen atoms. In addition, ligand contains additional nitrogen-containing rings that constitute N binding sites. Can include other ring systems bound to the N-containing heterocyclic rings, but they do not coordinate with the stabilized, high valence metal ion. Ring(s) can also contain O, S, or P atoms. This 6-membered ring(s) and/or additional N-containing ring(s) and/or attached, uncoordinating rings may or may not have halogen or polarizing or water-insolubilizing/solubilizing groups attached. |
| N Valence Stabilizer #13: Two-, Three-, Four-, Six-, Eight-, and Ten-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) and are not contained in Component Heterocyclic Rings (N—N Bidentates, N—N Tridentates, N—N Tetradentates, and N—N Hexadentates) | Macrocyclic ligands containing two, three, four, six, eight, or ten nitrogen binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N Valence Stabilizer #14: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen and are contained in Component 5-Membered Heterocyclic Rings (N—N Bidentates, N—N Tridentates, N—N Tetradentates, or N—N Hexadentates) | Macrocyclic ligands containing a total of four, six, eight, or ten five-membered heterocyclic rings containing nitrogen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #15: Four-, Six-, Eight-, or Ten-Membered Macrocyclics, Macrobicyclics, and Macropolycyclics (including Catapinands, | Macrocyclic ligands containing at least one 5-membered heterocyclic ring. These heterocyclic rings provide nitrogen binding sites to valence stabilize the central metal ion. Other |

TABLE 1-continued

Wide Band Organic Valence Stabilizers for the $Co^{+3}$ Ion

| General Structural Name (Type of Organic) | Structural Representation |
|---|---|
| Cryptands, Cyclidenes, and Sepulchrates) wherein all Binding Sites are composed of Nitrogen and are contained in a Combination of 5-Membered Heterocyclic Rings and Amine or Imine Groups (N—N Bidentates, N—N Tridentates, N—N Tetradentates, or N—N Hexadentates) | amine or imine binding sites can also be included in the macrocyclic ligand, so long as the total number of binding sites is four, six, eight, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #16: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen and are contained in Component 6-Membered Heterocyclic Rings (N—N Bidentates, N—N Tridentates, N—N Tetradentates, or N—N Hexadentates) | Macrocyclic ligands containing a total of four, six, eight, or ten six-membered heterocyclic rings containing nitrogen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #17: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen and are contained in a Combination of 6-Membered Heterocyclic Rings and Amine or Imine Groups (N—N Bidentates, N—N Tridentates, N—N Tetradentates, or N—N Hexadentates) | Macrocyclic ligands containing at least one 6-membered heterocyclic ring. These heterocyclic rings provide nitrogen binding sites to valence stabilize the central metal ion. Other amine or imine binding sites can also be included in the macrocyclic ligand, so long as the total number of binding sites is four, six, eight, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #18: Amidines and Diamidines (N—N Bidentates and N—N Tetradentates) | R'—NH—C(—R)=N—R", where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #19: Biguanides (Imidodicarbonimidic Diamides or Dihydrazides), Biguanidines, Imidotricarbonimidic Diamides or Dihydrazides, Imidotetracarbonimidic Diamides or Dihydrazides, Dibiguanides, Bis(biguanidines), Polybiguanides, and Poly(biguanidines) (N—N Bidentates, N—N Tridentates, N—N Tetradentates, and N—N Hexadentates) | RR'—N—C(=NH)—NR"—C(=NH)—NR'"R"" for biguanides, RR'—N—C(=NH)—NR"—NH—C(=NH)—NR'"R"" for biguanidines, where R, R', R", R'", and R"" represent H, $NH_2$, or any organic functional group wherein the number of carbon atoms ranges from 0 to 40, halogen or polarizing or water-insolubilizing/solubilizing groups attached. Ligand can also contain nonbinding N, O, S, or P atoms. |
| N Valence Stabilizer #20: Diamidinomethanes, Bis(amidinomethanes), and Poly(amidinomethanes) (N—N Bidentates, N—N Tridentates, N—N Tetradentates, and N—N Hexadentates) | RR'—N—C(=NH)—CR"R'"—C(=NH)—NR""R""', where R, R', R", R'", R"", and R""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #21: Imidoylguanidines, Amidinoguanidines, Bis(imidoylguanidines), Bis(amidinoguanidines), Poly(imidoylguanidines), and Poly(amidinoguanidines) (N—N Bidentates, N—N Tridentates, N—N Tetradentates) | RR'—N—C(=NH)—NR"—C(=NH)—R'" for imidoylguanidines, and RR'—N—C(=NH)—NR"—NH—C(=NH)—R'" for amidinoguanidines, where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #22: Diformamidine oxides (Dicarbonimidic Diamides or Dihydrazides), | RR'—N—C(=NH)—O—C(=NH)—NR"R'", where R, R', R", and R'" represent H, $NH_2$, or any organic functional group wherein the number of |

TABLE 1-continued

Wide Band Organic Valence Stabilizers for the $Co^{+3}$ Ion

| General Structural Name (Type of Organic) | Structural Representation |
|---|---|
| Tricarbonimidic Diamides or Dihydrazides, Tetracarbonimidic Diamides or Dihydrazides, Bis(diformamidine oxides), and Poly(diformamidine oxides) (N—N Bidentates, N—N Tridentates, N—N Tetradentates) | carbon atoms ranges from 0 to 40, optionally having halogen or polarizing or water-insolubilizing/solubilizing groups attached. Ligand can also contain nonbinding N, O, S, or P atoms. |
| N Valence Stabilizer #23: Diformamidine Sulfides (Thiodicarbonimidic Diamides or Dihydrazides), Thiotricarbonimidic Diamides or Dihydrazides, Thiotetracarbonimidic Diamides or Dihydrazides, Bis(diformamidine sulfides), and Poly(diformamidine sulfides) (N—N Bidentates, N—N Tridentates, N—N Tetradentates) | RR'—N—C(=NH)—S—C(=NH)—NR"R"', where R, R', R", and R"' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #24: Imidodicarbonimidic Acids, Diimidodicarbonimidic Acids, Imidotricarbonimidic Acids, Imidotetracarbonimidic Acids, and derivatives thereof (N—N Bidentates, N—N Tridentates, N—N Tetradentates, and N—N Hexadentates) | R—O—C(=NH)—NR'—C(=NH)—O—R" for imidodicarbonimidic acids, and R—O—C(=NH)—NR'—NH—C(=NH)—O—R" for diimidodicarbonimidic acids, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #25: Thioimidodicarbonimidic Acids, Thiodiimidodicarbonimidic Acids, Thioimidotricarbonimidic Acids, Thioimidotetracarbonimidic Acids, and derivatives thereof (N—N Bidentates, N—N Tridentates, N—N Tetradentates, and N—N Hexadentates) | R—S—C(=NH)—NR'—C(=NH)—S—R" for thioimidodicarbonimidic acids, and R—S—C(=NH)—NR'—NH—C(=NH)—S—R" for thiodiimidodicarbonimidic acids, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #26: Diimidoylimines, Diimidoylhydrazides, Bis(diimidoylimines), Bis(diimidoylhydrazides), Poly(diimidoylimines), and Poly(diimidoylhydrazides) (N—N Tridentates and N—N Hexadentates) | R—C(=NH)—NR'—C(=NH)—R" for diimidoylimines, and R—C(=NH)—NR'—NH—C(=NH)—R" for diimidoylhydrazides, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #27: Imidosulfamides, Diimidosulfamides, Bis(imidosulfamides), Bis(diimidosulfamides), Poly(imidosulfamides), and Poly(diimidosulfamides) (N—N Bidentates, N—N Tridentates, N—N Tetradentates, and N—N Hexadentates) | RR'—N—S(=NH)(=O)—OR" or RR'—N—S(=NH)(=O)—N—R"R"' for imidosulfamides, and RR'—N—S(=NH)(=NH)—OR" or RR'—N—S(=NH)(=NH)—N—R"R"' for diimidosulfamides, where R, R', R", and R"' represent H, $NH_2$, or any organic functional group wherein the number of carbon atoms ranges from 0 to 40, optionally having halogen or polarizing or water-insolubilizing/solubilizing groups attached. Ligand can also contain nonbinding N, N, O, S, or P atoms. |
| N Valence Stabilizer #28: Phosphoramidimidic Triamides, Bis(phosphoramidimidic triamides), and Poly(phosphoramidimidic triamides) and derivatives thereof (N—N Bidentates, N—N Tridentates, N—N Tetradentates, and N—N Hexadentates) | (NH=)P(—NRR')(—NR"R"')(—NR""R"""), where R, R', R", R"', R"", and R""" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #29: Phosphoramidimidic Acid, Phosphorodiamidimidic Acid, Bis(Phosphoramidimidic Acid), Bis(Phosphorodiamidimidic Acid), Poly(Phosphoramidimidic Acid), | (NH=)P(—NRR')(OH)$_2$ for phosphoramidimidic acid, and (NH=)P(—NRR')(—NR"R"')(OH) for phosphorodiamidimidic acid, where R, R', R", and R"' represent H, $NH_2$, or any organic functional group wherein the number of carbon atoms ranges from 0 to 40, optionally having |

TABLE 1-continued

Wide Band Organic Valence Stabilizers for the $Co^{+3}$ Ion

| General Structural Name (Type of Organic) | Structural Representation |
|---|---|
| Poly(Phosphorodiamidimidic Acid), and derivatives thereof (N—N Bidentates, N—N Tridentates, N—N Tetradentates, and N—N Hexadentates) | halogen or polarizing or water-insolubilizing/solubilizing groups attached. Ligand can also contain nonbinding N, O, S, or P atoms. |
| N Valence Stabilizer #30: Phosphoramidimidodithioic Acid, Phosphorodiamidimidothioic Acid, Bis(Phosphoramidimidodithioic Acid), Bis(Phosphorodiamidimidothioic Acid), Poly(Phosphoramidimidodithioic Acid), Poly(Phosphorodiamidimidothioic Acid), and derivatives thereof (N—N Bidentates, N—N Tridentates, N—N Tetradentates, and N—N Hexadentates) | (NH=)P(—NRR')(SH)$_2$ for phosphoramidimidodithioic acid, and (NH=)P(—NRR')(—NR"R"')(SH) for phosphorodiamidimidothioic acid, where R, R', R", and R'" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #31: Azo compounds including triazenes with amino, imino, oximo, diazeno, or hydrazido substitution at the ortho- (for aryl) or alpha- or beta- (for alkyl) positions, Bis[o-(H$_2$N—) or alpha- or beta-(H$_2$N—)azo compounds], or Poly[o-(H$_2$N—) or alpha- or beta-(H$_2$N—)azo compounds) (N—N Bidentates, N—N Tridentates, N—N Tetradentates, or N—N Hexadentates) | R—N=N—R' for azo compounds, R—N=N—NH—R' for triazenes, where R, and R' represent H or any organic functional group wherein the number of carbon atoms ranges from 0 to 40, optionally having halogen or polarizing or water-insolubilizing/solubilizing groups attached. (Must include ortho-amino, imino, oximo, diazeno, or hydrazido substituted aryl azo compounds, and alpha- or beta-amino, imino, oximo, diazeno, or hydrazido alkyl azo compounds.) Ligand can also contain nonbinding N, O, S, or P atoms. |
| N Valence Stabilizer #32: Diazeneformimidamides (Diazeneamidines), Diazeneacetimidamides (Diazene-alpha-amidinoalkanes(alkenes)), Bis(diazeneformimidamides), Bis(diazeneacetimidamides), Poly(diazeneformimidamides), and Poly(diazeneacetimidamides) (N—N Bidentates, N—N Tetradentates, and N—N Hexadentates) | R—N=N—C(=NH)—NR'R" for diazeneformimidamides, and R—N=N—CR'R"—C(=NH)—NR'"R"" for diazeneacetimidamides, where R, R', R", R'", and R"" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #33: Diazeneformimidic Acid, Diazeneacetimidic Acid, Bis(diazeneformimidic acid), Bis(diazeneacetimidic acid), Poly(diazeneformimidic acid), Poly(diazeneacetimidic acid), and derivatives thereof (N—N Bidentates, N—N Tetradentates, and N—N Hexadentates) | R—N=N—C(=NH)—OR' for diazeneformimidic acid, and R—N=N—CR'R"—C(=NH)—OR'" for diazeneacetimidic acid, where R, R', R", and R'" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #34: Diazeneformimidothioic Acid, Diazeneacetimidothioic Acid, Bis(diazeneformimidothioic acid), Bis(diazeneacetimidothioic acid), Poly(diazeneformimidothioic acid), Poly(diazeneacetimidothioic acid), and derivatives thereof (N—N Bidentates, N—N Tetradentates, and N—N Hexadentates) | R—N=N—C(=NH)—SR' for diazeneformimidothioic acid, and R—N=N—CR'R"—C(=NH)—SR'" for diazeneacetimidothioic acid, where R, R', R", and R'" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #35: Imidoyldiazenes, Bis(imidoyldiazenes), and Poly(imidoyldiazenes), (N—N Bidentates, N—N Tetradentates and N—N Hexadentates) | R—N=N—C(=NH)—R' or R—N=N—CR'R"—C(=NH)—R'", where R, R', R", and R'" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #36: Diazenediformimidamides (1,2-Diazenediamidines), Diazenediacetimidamides (1,2-Diazene-di-alpha-amidinoalkanes(alkenes)), Bis(diazenediformimidamides), | RR'—N—C(=NH)—N=N—C(=NH)—NR"R'" for diazenediformimidamides, and RR'—N—C(=NH)—CR"R'"—N=N—CR""R'""—C(=NH)—NR""'R"""" for diazenediacetimidamides, where R, R', R", R'", R"", R""', and R"""" represent H, NH$_2$, or any organic functional group wherein the number of carbon |

TABLE 1-continued

Wide Band Organic Valence Stabilizers for the $Co^{+3}$ Ion

| General Structural Name (Type of Organic) | Structural Representation |
|---|---|
| Bis(diazenediacetimidamides), Poly(diazenediformimidamides), and Poly(diazenediacetimidamides) (N—N Tridentates and N—N Hexadentates) | atoms ranges from 0 to 40, optionally having halogen or polarizing or water-insolubilizing/solubilizing groups attached. Ligand can also contain nonbinding N, O, S, or P atoms. |
| N Valence Stabilizer #37: Diazenediformimidic Acid, Diazenediacetimidic Acid, Bis(diazenediformimidic acid), Bis(diazenediacetimidic acid), Poly(diazenediformimidic acid) and Poly(diazenediacetimidic acid), and derivatives thereof (N—N Tridentates and N—N Hexadentates) | RO—C(=NH)—N=N—C(=NH)—OR' for diazenediformimidic acid, and RO—C(=NH)—CR'R''—N=N—CR'''R''''—C(=NH)—OR''''' for diazenediacetimidic acid, where R, R', R'', R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #38: Diazenediformimidothioic Acid, Diazenediacetimidothioic Acid, Bis(diazenediformimidothioic acid), Bis(diazenediacetimidothioic acid), Poly(diazenediformimidothioic acid), and Poly(diazenediacetimidothioic acid), and derivatives thereof (N—N Tridentates and N—N Hexadentates) | RS—C(=NH)—N=N—C(=NH)—SR' for diazenediformimidothioic acid, and RS—C(=NH)—CR'R''—N=N—CR'''R''''—C(=NH)—SR''''' for diazenediacetimidothioic acid, where R, R', R'', R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #39: Diimidoyldiazenes, Bis(diimidoyldiazenes), and Poly(diimidoyldiazenes), (N—N Tridentates and N—N Hexadentates) | R—C(=NH)—N=N—C(=NH)—R'' or R—C(=NH)—CR'R''—N=N—CR'''R''''—C(=NH)—R''''', where R, R', R'', R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #40: Ortho-amino (or -hydrazido) Substituted Formazans, Bis(o-amino or -hydrazido substituted formazans), and Poly(o-amino or -hydrazido substituted formazans) (N—N Bidentates, N—N Tridentates, N—N Tetradentates, and N—N Hexadentates) | R—N=N—CR'=N—NR''R''', where R, R', R'', and R''' represent H, or any organic functional group wherein the number of carbon atoms ranges from 0 to 40, optionally having halogen or polarizing or water-insolubilizing/solubilizing groups attached. (Must include ortho-amine or hydrazide substituted aryl R derivatives, and beta-amine or hydrazide substituted alkyl R derivatives.) Ligand can also contain nonbinding N, O, S, or P atoms. |
| N Valence Stabilizer #41: Ortho-amino (or -hydrazido) Substituted Azines (including ketazines), Bis(o-amino or hydrazido substituted azines), and Poly(o-amino or hydrazido substituted azines) (N—N Bidentates, N—N Tridentates, N—N Tetradentates, and N—N Hexadentates) | RR'C=N—N=CR''R''' or RR'C=N—NR''R''' (for ketazines), where R, R', R'', and R''' represent H, or any organic functional group wherein the number of carbon atoms ranges from 0 to 40, optionally having halogen or polarizing or water-insolubilizing/solubilizing groups attached. (Must include ortho-amine or hydrazide substituted aryl R derivatives, and beta-amine or hydrazide substituted alkyl R derivatives.) Ligand can also contain nonbinding N, O, S, or P atoms. |
| N Valence Stabilizer #42: Schiff Bases with one Imine (C=N) Group and with ortho- or alpha- or beta-amino or imino or oximo or diazeno or hydrazido substitution (N—N Bidentates, N—N Tridentates, N—N Tetradentates, N—N Pentadentates, or N—N Hexadentates). Also includes hydrazones with ortho-N substitution. | RR'C=N—R'', where R, R', and R'' represent H, or any organic functional group wherein the number of carbon atoms ranges from 0 to 40, optionally having halogen or polarizing or water-insolubilizing/solubilizing groups attached. (Must contain ortho- or alpha- or beta-amino or imino or oximo or diazeno or hydrazido substitution.) Ligand can also contain nonbinding N, O, S, or P atoms. |
| N Valence Stabilizer #43: Schiff Bases with two Imine (C=N) Groups and without ortho- (for aryl constituents) or alpha- or beta- (for alkyl constituents) hydroxy, carboxy, carbonyl, thiol, mercapto, thiocarbonyl, amino, imino, oximo, diazeno, or hydrazido substitution | RR'C=N—R''—N=CR'''R'''' or R—N=C—R'—C=N—R' or RC=N—R'—N=CR'', where R, R', R'', R''', and R'''' represent H, or any organic functional group wherein the number of carbon atoms ranges from 0 to 40, optionally having halogen or polarizing or water-insolubilizing/solubilizing groups attached. |

TABLE 1-continued

Wide Band Organic Valence Stabilizers for the $Co^{+3}$ Ion

| General Structural Name (Type of Organic) | Structural Representation |
|---|---|
| (N—N Bidentates). Also includes dihydrazones. | (Not including ortho-, alpha-, or beta-hydroxy, carboxy, carbonyl, thiol, mercapto, thiocarbonyl, amino, imino, oximo, diazeno, or hydrazido substitution.) Ligand can also |
| S Valence Stabilizer #2: Macrocyclic, Macrobicyclic, and Macropolycyclic Dithiolenes (including Catapinands, Cryptands, Cyclidenes, and Sepulchrates) wherein all Binding Sites are composed of alpha, alpha dithiols (meaning two thiol groups on a single carbon atom in the ring) (S—S Bidentates, S—S Tetradentates, and S—S Hexadentates) | Macrocyclic ligands containing two, four, six, or eight 1,1-dithiolene binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| S Valence Stabilizer #3: Dithioimidodialdehydes, Dithiohydrazidodialdehydes (thioacyl thiohydrazides), Bis(dithioimidodialdehydes), Bis(dithiohydrazidodialdehydes), Poly(dithioimidodialdehydes), and Poly(dithiohydrazidodialdehydes) (S—S Bidentates, S—S Tridentates, S—S Tetradentates) | RC(=S)—NR'—C(=S)—R" for dithioimidodialdehydes, and RC(=S)—NR'—NH—C(=S)—R" for dithiohydrazidodialdehydes (thioacyl thiohydrazides), where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #4: Dithioimidodicarbonic acids, Dithiohydrazidodicarbonic acids, Bis(dithioimidodicarbonic acids), Bis(dithiohydrazidodicarbonic acids), Poly(dithioimidodicarbonic acids), Poly(dithiohydrazidodicarbonic acids) and derivatives thereof (S—S Bidentates, S—S Tridentates, S—S Tetradentates) | R—O—C(=S)—NR'—C(=S)—O—R" or R—S—C(=S)—NR'—C(=S)—S—R" for dithioimidodicarbonic acids, and R—O—C(=S)—NR'—NH—C(=S)—O—R" or R—S—C(=S)—NR'—NH—C(=S)—S—R" for dithiohydrazidodicarbonic acids, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #5: 1,3-Dithioketones (Dithio-beta-ketonates), 1,3,5-Trithioketones, Bis(1,3-Dithioketones), and Poly(1,3-Dithioketones) (S—S Bidentates, S—S Tridentates, S—S Tetradentates) | R—C(=S)—CR'R"—C(=S)—R''' where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #6: 1,2-Dithioketones (Dithiolenes, Dithio-alpha-ketonates), 1,2,3-Trithioketones, Dithiotropolonates, ortho-Dithioquinones, Bis(1,2-Dithioketones), and Poly(1,2-Dithioketones) (S—S Bidentates, S—S Tridentates, S—S Tetradentates) | R—C(=S)—C(=S)—R' where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #7: Dithiomalonamides (Dithiomalonodiamides), Bis(dithiomalonamides), and Polydithiomalonamides (S—S Bidentates, S—S Tridentates, S—S Tetradentates) | RR'—N—C(=S)—CR"R'''—C(=S)—N—R''''R''''' where R, R', R", R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #8: 2-Thioacylthioacetamides, Bis(2-thioacylthioacetamides), and Poly(2-thioacylthioacetamides) (S—S Bidentates, S—S Tridentates, S—S Tetradentates) | RR'—N—C(=S)—CR"R'''—C(=S)—R'''' where R, R', R", R''', and R'''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #9: Dithioacyl sulfides, Bis(dithioacyl sulfides), and Poly(dithioacyl sulfides) (S—S Bidentates, S—S Tridentates, S—S | R—C(=S)—S—C(=S)—R' where R and R' represent H or any organic functional group wherein the number of carbon atoms ranges from 0 to 40, optionally having halogen or polarizing or |

TABLE 1-continued

Wide Band Organic Valence Stabilizers for the $Co^{+3}$ Ion

| General Structural Name (Type of Organic) | Structural Representation |
|---|---|
| Tetradentates) | water-insolubilizing/solubilizing groups attached. Ligand can also contain nonbinding N, O, S, or P atoms. |
| S Valence Stabilizer #10: Trithiodicarbonic Diamides, Bis(trithiodicarbonic diamides), and Poly(trithiodicarbonic diamides) (S—S Bidentates, S—S Tridentates, S—S Tetradentates) | RR'—N—C(═S)—S—C(═S)—N—R"R'" where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #11: Pentathio-, Tetrathio-, or Trithiodicarbonic Acids, Bis(pentathio-, tetrathio-, or trithiodicarbonic acids), Poly(pentathio-, tetrathio-, or trithiodicarbonic acids), and derivatives thereof (S—S Bidentates, S—S Tridentates, S—S Tetradentates) | R—S—C(═S)—S—C(═S)—S—R' for pentathiodicarbonic acids, R—O—C(═S)—S—C(═S)—S—R' for tetrathiodicarbonic acids, and R—O—C(═S)—S—C(═S)—O—R' for pentathiodicarbonic acids, where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #12: Dithiohypophosphoric Acids, Bis(dithiohypophosphoric acids), and Poly(dithiohypophosphoric acids), and derivatives thereof (S—S Bidentates, S—S Tridentates, S—S Tetradentates) | (R—O—)(R'—O—)P(═S)—P(═S)(—O—R")(—O—R'"); (R—O—)(R'—S—)P(═S)—P(═S)(—S—R")(—O—R'"); or (R—S—)(R'—S—)P(═S)—P(═S)(—S—R")(—S—R'"), where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R"R'"P(═O) which are very reducing and therefore unacceptable for stabilization of high valence states in metal ions. |
| S Valence Stabilizer #13: Dithiohypophosphoramides, Bis(dithiohypophosphoramides), and Poly(dithiohypophosphoramides) (S—S Bidentates, S—S Tridentates, S—S Tetradentates) | (RR'—N—)(R"R'"—N—)P(═S)—P(═S)(—N—R""R""')(—N—R""""R"""""), where R, R', R", R'", R"", R""', R"""", and R""""" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R"R'"P(═O) which are very reducing and therefore unacceptable for stabilization of high valence states in metal ions. |
| S Valence Stabilizer #14: Dithioimidodiphosphoric Acids, Dithiohydrazidodiphosphoric Acids, Bis(dithioimidodiphosphoric Acids), Bis(dithiohydrazidodiphosphoric Acids), Poly(dithioimidodiphosphoric Acids), Poly(dithiohydrazidodiphosphoric Acids), and derivatives thereof (S—S Bidentates, S—S Tridentates, S—S Tetradentates) | (R—O—)(R'—O—)P(═S)—NH—P(═S)(—O—R")(—O—R'"); (R—O—)(R'—S—)P(═S)—NH—P(═S)(—S—R")(—O—R'"); or (R—S—)(R'—S—)P(═S)—NH—P(═S)(—S—R")(—S—R'") for dithioimidodiphosphoric acids, and —NH—NH—derivatives for dithiohydrazidodiphosphoric acids, where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #15: Dithioimidodiphosphoramides, Dithiohydrazidodiphosphoramides, Bis(dithioimidodiphosphoramides), Bis(dithiohydrazidodiphosphoramides), Poly(dithioimidodiphosphoramides), Poly(dithiohydrazidodiphosphoramides) (S—S Bidentates, S—S Tridentates, S—S | (RR'—N—)(R"R'"—N—)P(═S)—NH—P(═S)(—N—R""R""')(—N—R""""R""""") for dithioimidodiphosphoramides, and (RR'—N—)(R"R'"—N—)P(═S)—NH—NH—P(═S)(—N—R""R""')(—N—R""""R""""") for and dithiohydrazidodiphosphoramides, where R, R', R", R'", R"", R""', and R"""" represent H, $NH_2$ or any organic functional group wherein the number of carbon atoms ranges from 0 to |

TABLE 1-continued

Wide Band Organic Valence Stabilizers for the $Co^{+3}$ Ion

| General Structural Name (Type of Organic) | Structural Representation |
|---|---|
| Tetradentates) | 40, optionally having halogen or polarizing or water-insolubilizing/solubilizing groups attached. Ligand can also contain nonbinding N, O, S, or P atoms. |
| S Valence Stabilizer #16: Dithiodiphosphoramides, Bis(dithioiphosphoramides), and Poly(dithiodiphosphoramides) (S—S Bidentates, S—S Tridentates, S—S Tetradentates) | (RR'—N—)(R"R'"—N—)P(=S)—S—P(=S)(—N—R""R""")(—N—R""""R"""""), or (RR'—N—)(R"R'"—N—)P(=S)—O—P(=S)(—N—R""R""")(—N—R""""R"""""), where R, R', R", R'", R"", R""", R"""", and R""""" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #17: Dithiodiphosphoric Acids, Bis(dithioiphosphoric Acids), Poly(dithiodiphosphoric Acids), and derivatives thereof (S—S Bidentates, S—S Tridentates, S—S Tetradentates) | (R—O—)(R'—O—)P(=S)—O—P(=S)(—O—R")(—O—R'"); (R—O—)(R'—O—)P(=S)—O—P(=S)(—O—R")(—O—R'"); (R—O—)(R'—S—)P(=S)—O—P(=S)(—S—R")(—O—R'"); (R—O—)(R'—S—)P(=S)—S—P(=S)(—S—R")(—O—R'"); or (R—S—)(R'—S—)P(=S)—S—P(=S)(—S—R")(—S—R'"), where R, R', R", R'", R"", R""", R"""", and R""""" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #18: Trithiophosphoric Acids (Phosphorotrithioic Acids), Bis(trithiophosphoric acids), Poly(trithiophosphoric acids), and derivatives thereof (S—S Bidentates, S—S Tridentates, S—S Tetradentates) | (O=)P(—S—R)(—S—R')(—S—R") or (S=)P(—S—R)(—S—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #19: Dithiophosphoric Acids (Phosphorodithioic Acids), Bis(dithiophosphoric acids), Poly(dithiophosphoric acids), and derivatives thereof (S—S Bidentates, S—S Tridentates, S—S Tetradentates) | (O=)P(—S—R)(—S—R')(—O—R") or (S=)P(—S—R)(—O—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #20: Tetrathiophosphoric Acids (Phosphorotetrathioic Acids), Bis(tetrathiophosphoric acids), Poly(tetrathiophosphoric acids), and derivatives thereof (S—S Bidentates, S—S Tridentates, S—S Tetradentates) | (S=)P(—S—R)(—S—R')(—S—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #21: Phosphoro(dithioperoxo)dithioic Acids, Bis[phosphoro(dithioperoxo)dithioic Acids], Poly[phosphoro(dithioperoxo)dithioic Acids], and derivatives thereof (S—S Bidentates, S—S Tridentates, S—S Tetradentates) | (O=)P(—S—S—R)(—S—R')(—S—R") or (S=)P(—S—S—R)(—S—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #22: Phosphoro(dithioperoxo)thioic Acids, Bis[phosphoro(dithioperoxo)thioic Acids], Poly[phosphoro(dithioperoxo)thioic Acids], and derivatives thereof (S—S Bidentates, S—S Tridentates, S—S Tetradentates) | (O=)P(—S—S—R)(—S—R')(—O—R") or (S=)P(—S—S—R)(—O—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 1-continued

Wide Band Organic Valence Stabilizers for the $Co^{+3}$ Ion

| General Structural Name (Type of Organic) | Structural Representation |
|---|---|
| S Valence Stabilizer #23: Phosphoro(dithioperoxo)trithioic Acids, Bis[phosphoro(dithioperoxo)trithioic Acids], Poly[phosphoro(dithioperoxo)trithioic Acids], and derivatives thereof (S—S Bidentates, S—S Tridentates, S—S Tetradentates) | (S=)P(—S—S—R)(—S—R')(—S—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #24: Beta-Mercaptothioketones, Beta-Mercaptothioaldehydes, Bis(beta-mercaptothioketones), Bis(beta-mercaptothioaldehydes), Poly(beta-mercaptothioketones), and Poly(beta-mercaptothioaldehydes) (S—S Bidentates, S—S Tridentates, S—S Tetradentates) | R—CR'(—SH)—$CH_2$—C(=S)—R", where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #25: N-(Aminomethylthiol)thioureas [N-(Aminomercaptomethyl)thioureas], Bis[N-(aminomethylthiol)thioureas], and Poly[N-(aminomethylthiol)thioureas] (S—S Bidentates, S—S Tridentates, S—S Tetradentates) | RR'—N—CH(—SH)—NR"—C(=S)—NR'"R"", where R, R', R", R'", and R"" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #26: Dithiooxamides, Bis(dithiooxamides), and Poly(dithiooxamides) (S—S Bidentates, S—S Tridentates, S—S Tetradentates) | RR'—N—C(=S)—C(=S)—N—R"R'", where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #27: 1,1-Dithiolates, Bis(1,1-dithiolates), and Poly(1,1-dithiolates) (S—S Bidentates and S—S Tetradentates) | RR'—C=C(—$S^-$)(—$S^-$), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #28: Dithiomonocarboxylic Acids, Tri- and Tetrathiodicarboxylic Acids, Bis(dithiomonocarboxylic Acids), Bis(tri- and tetrathiodicarboxylic acids), Poly(dithiomonocarboxylic acids), Poly(tri- and tetrathiodicarboxylic acids), and derivatives thereof (S—S Bidentates and S—S Tetradentates) | R—C(=S)(—S—R') for dithiomonocarboxylic acids, and (R—S—)(S=)C—R'—C(=S)(—S—R") for tri- and tetrathiodicarboxylic acids, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #29: Perthiomonocarboxylic Acids, Perthiodicarboxylic Acids, Bis(perthiomonocarboxylic acids), Bis(perthiodicarboxylic acids), Poly(perthiomonocarboxylic acids), Poly(perthiodicarboxylic acids), and derivatives thereof (S—S Bidentates and S—S Tetradentates) | R—C(=S)(—S—S—R') for perthiomonocarboxylic acids, and (R—S—S—)(S=)C—R'—C(=S)(—S—S—R") for perthiodicarboxylic acids, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #30: Dithiocarbonates, Trithiocarbonates, Perthiocarbonates, Bis(dithiocarbonates), Bis(trithiocarbonates), and Bis(perthiocarbonates) (S—S Bidentates and S—S Tetradentates) | R—S—C(=S)—O—R' or R—S—C(=O)—S—R' for dithiocarbonates, R—S—C(=S)—S—R' for trithiocarbonates, and R—S—S—C(=S)—S—R' for perthiocarbonates, where R, and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #31: Dithiocarbamates, Bis(dithiocarbamates), and Poly(dithiocarbamates) (including N- | $RR'N^+$=C(SH)(SH), where R and R' represent H, OH, SH, OR" (R" = $C_1$-$C_{30}$ alkyl or aryl), SR" (R" = $C_1$-$C_{30}$ alkyl or aryl), $NH_2$ or any |

TABLE 1-continued

Wide Band Organic Valence Stabilizers for the $Co^{+3}$ Ion

| General Structural Name (Type of Organic) | Structural Representation |
|---|---|
| hydroxydithiocarbamates and N-mercaptodithiocarbamates) (S—S Bidentates, S—S Tridentates, and S—S Tetradentates) | organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #32: Dithiocarbazates (Dithiocarbazides), Bis(dithiocarbazates), and Poly(dithiocarbazates) (S—S Bidentates, S—S Tridentates, and S—S Tetradentates; or possibly N—S Bidentates, N—S Tridentates, and N—S Tetradentates) | RR'N—NR"—C(=S)(SH), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #1: Diformamidine Disulfides (Thioperoxydicarbonimidic Diamides or Dihydrazides), Thioperoxytricarbonimidic Diamides or Dihydrazides, Thioperoxytetracarbonimidic Diamides or Dihydrazides, Bis(diformamidine disulfides), and Poly(diformamidine disulfides) (N—S Bidentates, N—S Tridentates, N—S Tetradentates) | RR'—N—C(=NH)—S—S—C(=NH)—NR"R"', where R, R', R", and R"' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #2: S-Amidinodithiocarbamates, Bis(S-amidinodithiocarbamates), and Poly(S-amidinodithiocarbamates) (N—S Bidentates and N—S Tetradentates) | RR'—N—C(=NH)—S—CS—NR"R"', where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #3: O-Amidinothiocarbamates, Bis(O-amidinothiocarbamates), and Poly(O-amidinothiocarbamates) (N—S Bidentates and N—S Tetradentates) | RR'—N—C(=NH)—O—CS—NR"R"', where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #4: S-Amidinoperoxythiocarbamates, Bis(S-amidinoperoxythiocarbamates), and Poly(S-amidinoperoxythiocarbamates) (N—S Bidentates and N—S Tetradentates) | RR'—N—C(=NH)—S—S—CS—NR"R"', where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #5: Phosphorimidothioic Acid; Phosphorimidodithioic Acid; Phosphorimidotrithioic Acid; Bis(Phosphorimidothioic Acid); Bis(Phosphorimidodithioic Acid); Bis(Phosphorimidotrithioic Acid); Poly(Phosphorimidothioic Acid); Poly(Phosphorimidodithioic Acid); Poly(Phosphorimidotrithioic Acid); and derivatives thereof (N—S Bidentates and N—S Tetradentates) | (NH=)P(—SR)(—OR')(—OR") for phosphorimidothioic acid, (NH=)P(—SR)(—SR')(—OR") for phosphorimidodithioic acid, (NH=)P(—SR)(—SR')(—SR") for phosphorimidotrithioic acid, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #6: Phosphorothioic Triamides, Bis(phosphorothioic triamides), and Poly(phosphorothioic triamides) (N—S Bidentates and N—S Tetradentates) | (S=)P(—NRR')(—NR"R"')(—NR""R""'), where R, R', R", R"', R"" and R""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #7: Phosphoramidotrithioic Acid, Phosphorodiamidodithioic Acid, Bis(phosphoramidotrithioic acid), Bis(phosphorodiamidodithioic acid), poly(phosphoramidotrithioic acid), | (S=)P(—NRR')(—SR")(—SR"') for phosphoramidotrithioic acid, and (S=)P(—NRR')(—NR"R"')(—SR"") for phosphorodiamidodithioic acid, where R, R', R", R"', and R"" represent H, $NH_2$ or any organic functional group wherein the number of |

TABLE 1-continued

Wide Band Organic Valence Stabilizers for the $Co^{+3}$ Ion

| General Structural Name (Type of Organic) | Structural Representation |
|---|---|
| poly(phosphorodiamidodithioic acid), and derivatives thereof (N—S Bidentates and N—S Tetradentates) | carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #8: Phosphoramidothioic Acid, Phosphoramidodithioic Acid, Phosphorodiamidothioic Acid, Bis(Phosphoramidothioic Acid), Bis(Phosphoramidodithioic Acid), Bis(Phosphorodiamidothioic Acid), Poly(Phosphoramidothioic Acid), Poly(Phosphoramidodithioic Acid), and Poly(Phosphorodiamidothioic Acid) (N—S Bidentates and N—S Tetradentates) | (O═)P(—NRR')(—SR")(—OR''') or (S═)P(—NRR')(—OR")(—OR''') for phosphoramidothioic acid; (O═)P(—NRR')(—SR")(—SR''') or (S═)P(—NRR')(—SR")(—OR''') for phosphoramidodithioic acid; (O═)P(—NRR')(—NR"R''')(—SR'''') or (S═)P(—NRR')(—NR"R''')(—OR'''') for phosphorodiamidothioic acid, where R, R', R", R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #9: N-Thioacyl 7-Aminobenzylidenimines (N—S Bidentates or N—S Tetradentates) | R'—C(═S)—N═C(—R)(—NHR"), where R is an aromatic derivative (i.e. —$C_6H_5$), and R' and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #10: Thiohydroxamates (Thiohydroxylamines), Bis(thiohydroxamates), and Poly(thiohydroxamates) (N—S Bidentates, N—S Tetradentates, and N—S Hexadentates) | R—C(═S)—NR'—OH or R—C(—SH)═N—OH, where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #11: Alpha- or ortho-Aminothiocarboxylic Acids, and alpha- or ortho-Aminothiodicarboxylic Acids, and derivatives thereof (N—S Bidentates, N—S Tridentates, and N—S Tetradentates) | R—CH(—NHR')—C(═S)(—OH) or R—CH(—NHR')—C(═S)(—SH) for aminothiocarboxylic acids, and (HO—)(S═)C—CH(—NHR)—R'—CH(—NHR")—C(═S)(—OH) or (HS—)(S═)C—CH(—NHR)—R'—CH(—NHR")—C(═S)(—SH) for aminothiodicarboxylic acids, where R, R', and R" represent any organic functional group wherein the number of carbon atoms ranges from 1 to 40, optionally having halogen or polarizing or water-insolubilizing/solubilizing groups attached. Ligand can also contain nonbinding N, O, S, or P atoms. |
| N—S Valence Stabilizer #12: Thiosemicarbazones, Bis(thiosemicarbazones), and Poly(thiosemicarbazones) (N—S Bidentates, N—S Tetradentates, and N—S Hexadentates) | RR'—N—C(═S)—NR"—N═CR'''R'''', where R, R', R", R''', and R'''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #13: Thioacyl hydrazones, Bis(thioacyl hydrazones), and Poly(thioacyl hydrazones) (N—S Bidentates, N—S Tetradentates, and N—S Hexadentates) | R—C(═S)—NR'—N═CR"R''', where R, R', R", and R''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #14: Thiocarbazones (Diazenecarbothioic hydrazides), Bis(thiocarbazones), and Poly(thiocarbazones) (N—S Bidentates, N—S Tetradentates, and N—S Hexadentates) | R—N═N—C(═S)—NR'—NR"R''', where R, R', R", and R''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #15: Azo compounds including triazenes with thiol or mercapto or thiocarbonyl | R—N═N—R' for azo compounds, R—N═N—NH—R' for triazenes, where R, and R' represent H or any organic functional group wherein the |

TABLE 1-continued

Wide Band Organic Valence Stabilizers for the $Co^{+3}$ Ion

| General Structural Name (Type of Organic) | Structural Representation |
|---|---|
| substitution at the ortho- (for aryl) or alpha- or beta- (for alkyl) positions, Bis[o-(HS—) or alpha- or beta-(HS—)azo compounds], or Poly[o-(HS—) or alpha- or beta-(HS—)azo compounds] (N—S Bidentates, N—S Tridentates, N—S Tetradentates, or N—S Hexadentates) | number of carbon atoms ranges from 0 to 40, optionally having halogen or polarizing or water-insolubilizing/solubilizing groups attached. (Must include ortho-thio, mercapto, or thiocarbonyl substituted aryl azo compounds, and alpha- or beta-thio, mercapto, or thiocarbonyl alkyl azo compounds.) Ligand can also contain nonbinding N, O, S, or P atoms. |
| N—S Valence Stabilizer #16: Diazeneformothioamides, Diazeneacetothioamides, Bis(diazeneformothioamides), Bis(diazeneacetothioamides), Poly(diazeneformothioamides), and Poly(diazeneacetothioamides) (N—S Bidentates, N—S Tetradentates, and N—S Hexadentates) | R—N=N—C(=S)—NR'R" for diazeneformothioamides, and R—N=N—CR'R"—C(=S)—NR'''R"" for diazeneacetothioamides, where R, R', R", R''', and R"" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #17: Diazenecarbothioic acids, Diazenecarbodithioic acids, Bis(diazenecarbothioic acids), Bis(diazenecarbodithioic acids), Poly(diazenecarbothioic acids), Poly(diazenecarbodithioic acids) and derivatives thereof (N—S Bidentates, N—S Tetradentates, N—S Hexadentates) | R—N=N—C(=S)—O—R' or R—N=N—CR'R"—C(=S)—O—R''' for diazenecarbothioic acids, and R—N=N—C(=S)—S—R' or R—N=N—CR'R"—C(=S)—S—R''' for diazenecarbodithioic acids, where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #18: Diazeneformothioaldehydes, Diazeneacetothioaldehydes, Bis(diazeneformothioaldehydes), Bis(diazeneacetothioaldehydes), Poly(diazeneformothioaldehydes), and Poly(diazeneacetothioaldehydes) (N—S Bidentates, N—S Tetradentates and N—S Hexadentates) | R—N=N—C(=S)—R' for diazeneformothioaldehydes, and R—N=N—CR'R"—C(=S)—R''' for diazeneacetothioaldehydes, where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #19: Diazenediformothioamides, Diazenediacetothioamides, Bis(diazenediformothioamides), Bis(diazenediacetothioamides), Poly(diazenediformothioamides), and Poly(diazenediacetothioamides) (N—S Tridentates and N—S Hexadentates) | RR'—N—C(=S)—N=N—C(=S)—NR"R''' or RR'—N—C(=S)—N=N—C(=O)—NR"R''' for diazenediformothioamides, and RR'—N—C(=S)—CR"R'''—N=N—CR""R'''''—C(=S)—NR"""R"""" or RR'—N—C(=S)—CR"R'''—N=N—CR""R'''''—C(=O)—NR"""R"""" for diazenediacetothioamides, where R, R', R", R''', R"", R''''', and R"""" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #20: Diazenedicarbothioic acids, Diazenedicarbodithioic acids, Bis(diazenedicarbothioic acids), Bis(diazenedicarbodithioic acids), Poly(diazenedicarbothioic acids), Poly(diazenedicarbodithioic acids) and derivatives thereof (N—S Tridentates and N—S Hexadentates) | R—O—C(=S)—N=N—C(=S)—O—R', R—O—C(=S)—CR'R"—N=N—CR'''R""—C(=S)—O—R''''', R—O—C(=S)—N=N—C(=O)—O—R', or R—O—C(=S)—CR'R"—N=N—CR'''R""—C(=O)—O—R''''' for diazenedicarbothioic acids, and R—S—C(=S)—N=N—C(=S)—S—R' or R—S—C(=S)—CR'R"—N=N—CR'''R""—C(=S)—S—R''''' for diazenedicarbodithioic acids, where R, R', R", R''', R"", and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #21: Diazenediformothioaldehydes, Diazenediacetothioaldehydes, Bis(diazenediformothioaldehydes), Bis(diazenediacetothioaldehydes), | RC(=S)—N=N—C(=S)—R' or RC(=S)—N=N—C(=O)—R' for diazenediformothioaldehydes, and RC(=S)—CR'R"—N=N—CR'''R""—C(=S)—R''''' or RC(=S)—CR'R"—N=N—CR'''R""—C(=O)—R''''' for diazenediacetothioaldehydes, where R, R', |

TABLE 1-continued

Wide Band Organic Valence Stabilizers for the $Co^{+3}$ Ion

| General Structural Name (Type of Organic) | Structural Representation |
|---|---|
| Poly(diazenediformothioaldehydes), and Poly(diazenediacetothioaldehydes) (N—S Tridentates and N—S Hexadentates) | R", R'", R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #22: Ortho-thio (or -mercapto) Substituted Formazans, Bis(o-thio or -mercapto substituted formazans), and Poly(o-thio or -mercapto substituted formazans) (N—S Bidentates, N—S Tridentates, N—S Tetradentates, and N—S Hexadentates) | R—N=N—CR'=N—NR"R''', where R, R', R", and R''' represent H, or any organic functional group wherein the number of carbon atoms ranges from 0 to 40, optionally having halogen or polarizing or water-insolubilizing/solubilizing groups attached. (Must include ortho-thio or mercapto substituted aryl R derivatives, and beta-thio or mercapto substituted alkyl R derivatives.) Ligand can also contain nonbinding N, O, S, or P atoms. |
| N—S Valence Stabilizer #23: Ortho-thio (or -mercapto) Substituted Azines (including ketazines), Bis(o-thio or mercapto substituted azines), and Poly(o-thio or mercapto substituted azines) (N—S Bidentates, N—S Tridentates, N—S Tetradentates, and N—S Hexadentates) | RR'C=N—N=CR"R''' or RR'C=N—NR"R''' (for ketazines), where R, R', R", and R''' represent H, or any organic functional group wherein the number of carbon atoms ranges from 0 to 40, optionally having halogen or polarizing or water-insolubilizing/solubilizing groups attached. (Must include ortho-thio or mercapto substituted aryl R derivatives, and beta-thio or mercapto substituted alkyl R derivatives.) Ligand can also contain nonbinding N, O, S, or P atoms. |
| N—S Valence Stabilizer #24: Schiff Bases with one Imine (C=N) Group and with ortho- or alpha- or beta-thio or mercapto or thiocarbonyl substitution (N—S Bidentates, N—S Tridentates, N—S Tetradentates, N—S Pentadentates, or N—S Hexadentates). Also includes Schiff Bases derived from the reaction of carbonyl compounds with dithiocarbazates, and hydrazones with ortho-S substitution. | RR'C=N—R", where R, R', and R" represent H, or any organic functional group wherein the number of carbon atoms ranges from 0 to 40, optionally having halogen or polarizing or water-insolubilizing/solubilizing groups attached. (Must contain ortho- or alpha- or beta-thio or mercapto or thiocarbonyl substitution.) Ligand can also contain nonbinding N, O, S, or P atoms. |
| N—S Valence Stabilizer #25: Schiff Bases with two Imine (C=N) Groups and with ortho- or alpha- or beta-thio or mercapto or thiocarbonyl substitution (N—S Tridentates, N—S Tetradentates, N—S Pentadentates, or N—S Hexadentates). Also includes Schiff Bases derived from the reaction of carbonyl compounds with dithiocarbazates, and hydrazones with ortho-S substitution. | RR'C=N—R"—N=CR'''R'''' or R—N=C—R'—C=N—R' or RC=N—R'—N=CR", where R, R', R", R''', and R'''' represent H, or any organic functional group wherein the number of carbon atoms ranges from 0 to 40, optionally having halogen or polarizing or water-insolubilizing/solubilizing groups attached. (Must contain ortho- or alpha- or beta-thio or mercapto or thiocarbonyl substitution.) Ligand can also contain nonbinding N, O, S, or P atoms. |
| N—S Valence Stabilizer #26: Schiff Bases with three Imine (C=N) Groups and with ortho- or alpha- or beta-thio or mercapto or thiocarbonyl substitution (N—S Tetradentates, N—S Pentadentates, or N—S Hexadentates). Also includes Schiff Bases derived from the reaction of carbonyl compounds with dithiocarbazates, and hydrazones with ortho-S substitution. | $N(-R-N=CR'R")_3$, where R, R', and R" represent H, or any organic functional group wherein the number of carbon atoms ranges from 0 to 40, optionally having halogen or polarizing or water-insolubilizing/solubilizing groups attached. (Must contain ortho- or alpha- or beta-thio or mercapto or thiocarbonyl substitution.) Ligand can also contain nonbinding N, O, S, or P atoms. |
| N—S Valence Stabilizer #27: Thioalkyl Amines (Aminothiols or Aminodisulfides) and Thioalkyl Imines (Iminothiols or Iminodisulfides) (N—S Bidentates, N—S Tridentates, N—S Tetradentates, and N—S Hexadentates) | $[R-CR'(-NR"R''')]_x-R''''-[C(-SR''''')R''''''R''''''']_y$, $[R-CR'(-NR"R''')]_x-R''''-[C(-S-S-R''''')R''''''R''''''']_y$, or $[R-CR'(-NR"R''')]_x-R''''-[C(=S)R''''']_y$ for thioalkyl amines; and $[R-C(=NR')]_x-R"-[C(-SR''')R''''R''''']_y$, $[R-C(=NR')]_x-R"-[C(-S-SR''')R''''R''''']_y$, or $[R-C(=NR')]_x-R"-[C(=S)R''']_y$ for thioalkyl imines, where R, R', R", R''', R'''', R''''', and R'''''' represent H, $NH_2$, or any organic functional group wherein the number of carbon atoms ranges from 0 to 40, optionally having halogen or |

TABLE 1-continued

Wide Band Organic Valence Stabilizers for the $Co^{+3}$ Ion

| General Structural Name (Type of Organic) | Structural Representation |
|---|---|
| | polarizing or water-insolubilizing/solubilizing groups attached, and x and y = 1-6. Ligand can also contain nonbinding N, O, S, or P atoms. |
| N—S Valence Stabilizer #28: Thioaryl Amines and Thioaryl Imines (N—S Bidentates, N—S Tridentates, N—S Tetradentates, and N—S Hexadentates) | $[R(-NR'R'')(-SR''')], [R(-NR'R'')(-S-S-R''')], [R(-NR'R'')(-C(=S)R''')], [R(-NR'R'')_x]_2S, [R(-NR'R'')_x]_{2-3}R'''(-SR'''')_y, [R(-SR')_x]_{2-3}R''(-NR'''R'''')_y, [R(-NR'R'')_x]_2S_2,$ and $[R(-NR'R'')_x]_2R'''(C(=S))_yR''''$ for thioaryl amines; and $[R(-SR')_x]_2NH$ or $[R(-SR')_x]_2NHNH$ for thioaryl imines, where R, R', R", R''', and R'''' represent H, $NH_2$, or any organic functional group wherein the number of carbon atoms ranges from 0 to 40, optionally having halogen or polarizing or water-insolubilizing/solubilizing groups attached, and x = 0-2 and y = 1-4. Ligand can also contain nonbinding N, O, S, or P atoms. |
| N—S Valence Stabilizer #29: Five-Membered Heterocyclic Rings containing One, Two, Three, or Four Nitrogen Atoms at least one additional Sulfur Atom Binding Site not in a Ring (N—S Bidentates, N—S Tridentates, N—S Tetradentates, or N—S Hexadentates) | Five membered heterocyclic ring(s) containing one, two, three, or four nitrogen atoms. In addition, ligand contains additional sulfur-containing substituents (usually thiols, mercaptans, disulfides, or thiocarbonyls) that constitute S binding sites. Can include other ring systems bound to the heterocyclic ring or to the S-containing substituent, but they do not coordinate with the stabilized, high valence metal ion. Ring(s) can also contain O, S, or P atoms. This 5-membered ring(s) and/or attached, uncoordinating rings and/or S-containing substituent(s) may or may not have halogen or polarizing or water-insolubilizing/solubilizing groups attached. |
| N—S Valence Stabilizer #30: Six-Membered Heterocyclic Rings containing One, Two, Three, or Four Nitrogen Atoms at least one additional Sulfur Atom Binding Site not in a Ring (N—S Bidentates, N—S Tridentates, N—S Tetradentates, or N—S Hexadentates) | Six membered heterocyclic ring(s) containing one, two, three, or four nitrogen atoms. In addition, ligand contains additional sulfur-containing substituents (usually thiols, mercaptans, disulfides, or thiocarbonyls) that constitute S binding sites. Can include other ring systems bound to the heterocyclic ring or to the S-containing substituent, but they do not coordinate with the stabilized, high valence metal ion. Ring(s) can also contain O, S, or P atoms. This 6-membered ring(s) and/or attached, uncoordinating rings and/or S-containing substituent(s) may or may not have halogen or polarizing or water-insolubilizing/solubilizing groups attached. |
| N—S Valence Stabilizer #31: Five-Membered Heterocyclic Rings containing One or Two Sulfur Atoms at least one additional Nitrogen Atom Binding Site not in a Ring (N—S Bidentates, N—S Tridentates, N—S Tetradentates, or N—S Hexadentates) | Five membered heterocyclic ring(s) containing one or two sulfur atoms. In addition, ligand contains additional nitrogen-containing substituents (usually amines, imines, or hydrazides) that constitute N binding sites. Can include other ring systems bound to the heterocyclic ring or to the N-containing substituent, but they do not coordinate with the stabilized, high valence metal ion. Ring(s) can also contain O, S, or P atoms. This 5-membered ring(s) and/or attached, uncoordinating rings and/or N-containing substituent(s) may or may not have halogen or polarizing or water-insolubilizing/solubilizing groups attached. |
| N—S Valence Stabilizer #32: Six-Membered Heterocyclic Rings containing One or Two Sulfur Atoms at least one additional Nitrogen Atom Binding Site not in a Ring (N—S Bidentates, N—S Tridentates, N—S Tetradentates, or N—S Hexadentates) | Six membered heterocyclic ring(s) containing one or two sulfur atoms. In addition, ligand contains additional nitrogen-containing substituents (usually amines, imines, or hydrazides) that constitute N binding sites. Can include other ring systems bound to the heterocyclic ring or to the N-containing substituent, but they do not coordinate with the stabilized, high valence metal ion. Ring(s) can also contain O, S, or P atoms. This 6-membered ring(s) and/or attached, uncoordinating rings and/or N-containing |

TABLE 1-continued

Wide Band Organic Valence Stabilizers for the Co$^{+3}$ Ion

| General Structural Name (Type of Organic) | Structural Representation |
|---|---|
|  | substituent(s) may or may not have halogen or polarizing or water-insolubilizing/solubilizing groups attached. |
| N—S Valence Stabilizer #33: Five-Membered Heterocyclic Rings containing One, Two, Three, or Four Nitrogen Atoms at least one additional Sulfur Atom Binding Site in a Separate Ring (N—S Bidentates, N—S Tridentates, N—S Tetradentates) | Five membered heterocyclic ring(s) containing one, two, three, or four nitrogen atoms. In addition, ligand contains additional sulfur-containing rings that constitute S binding sites. Can include other ring systems bound to the N- or S-containing heterocyclic rings, but they do not coordinate with the stabilized, high valence metal ion. Ring(s) can also contain O, S, or P atoms. This 5-membered ring(s) and/or additional S-containing ring(s) and/or attached, uncoordinating rings may or may not have halogen or polarizing or water-insolubilizing/solubilizing groups attached. |
| N—S Valence Stabilizer #34: Six-Membered Heterocyclic Rings containing One, Two, Three, or Four Nitrogen Atoms at least one additional Sulfur Atom Binding Site in a Separate Ring (N—S Bidentates, N—S Tridentates, N—S Tetradentates) | Six membered heterocyclic ring(s) containing one, two, three, or four nitrogen atoms. In addition, ligand contains additional sulfur-containing rings that constitute S binding sites. Can include other ring systems bound to the N- or S-containing heterocyclic rings, but they do not coordinate with the stabilized, high valence metal ion. Ring(s) can also contain O, S, or P atoms. This 6-membered ring(s) and/or additional S-containing ring(s) and/or attached, uncoordinating rings may or may not have halogen or polarizing or water-insolubilizing/solubilizing groups attached. |
| N—S Valence Stabilizer #35: Two-, Three-, Four-, Six-, Eight-, and Ten-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) or Sulfur (usually thiols, mercaptans, or thiocarbonyls) and are not contained in Component Heterocyclic Rings (N—S Bidentates, N—S Tridentates, N—S Tetradentates, and N—S Hexadentates) | Macrocyclic ligands containing two, three, four, six, eight, or ten binding sites composed of nitrogen and sulfur to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N—S Valence Stabilizer #36: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen or Sulfur and are contained in Component Heterocyclic Rings (N—S Bidentates, N—S Tridentates, N—S Tetradentates, or N—S Hexadentates) | Macrocyclic ligands containing a total of four, six, eight, or ten heterocyclic rings containing nitrogen or sulfur binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—S Valence Stabilizer #37: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen or Sulfur and are contained in a Combination of Heterocyclic Rings and Amine, Imine, Thiol, Mercapto, or Thiocarbonyl Groups (N—S Bidentates, N—S Tridentates, N—S Tetradentates, or N—S Hexadentates) | Macrocyclic ligands containing at least one heterocyclic ring. These heterocyclic rings provide nitrogen or sulfur binding sites to valence stabilize the central metal ion. Other amine, imine, thiol, mercapto, or thiocarbonyl binding sites can also be included in the macrocyclic ligand, so long as the total number of binding sites is four, six, eight, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—O Valence Stabilizer #1: N-Hydroxy(or N,N'-dihydroxy)amidines and N-Hydroxy(or N,N'-dihydroxy)diamidines (N—O Bidentates, N—O Tridentates, or N—O Tetradentates) | R'—N(—OH)—C(—R)=N—R", where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 1-continued

Wide Band Organic Valence Stabilizers for the $Co^{+3}$ Ion

| General Structural Name (Type of Organic) | Structural Representation |
|---|---|
| N—O Valence Stabilizer #2: Guanylureas, Guanidinoureas, Bis(guanylureas), Bis(guanidinoureas), Poly(guanylureas), and Poly(guanidinoureas) (N—O Bidentates and N—O Tetradentates) | RR'—N—C(=NH)—NR"—CO—NR'''R'''' for guanylureas, and RR'—N—C(=NH)—NR"—NH—CO—NR'''R'''' for guanidinoureas, where R, R', R", R''', and R'''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #3: Amidinoamides, Guanidinoamides, Bis(amidinoamides), Bis(guanidinoamides), Poly(amidinoamides), and Poly(guanidinoamides) (including both N-amidinoamides and 2-amidinoacetamides) (N—O Bidentates and N—O Tetradentates) | RR'—N—C(=NH)—NR"—CO—R''' for N-amidinoamides, or RR'—N—C(=NH)—CR"R'''—CO—N—R''''R''''' for 2-amidinoacetamides, and RR'—N—C(=NH)—NR"—NH—CO—R''' for guanidinoamides, where R, R', R", R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #4: Imidoylamides, Bis(imidoylamides), and Poly(imidoylamides) (N—O Bidentates and N—O Tetradentates) | R—C(=NH)—NR'—CO—R", where R, R', and R", represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #5: O-Amidinocarbamates, Bis(O-amidinocarbamates), and Poly(O-amidinocarbamates) (N—O Bidentates and N—O Tetradentates) | RR'—N—C(=NH)—O—CO—NR"R''', where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #6: S-Amidinothiocarbamates, Bis(S-amidinothiocarbamates), and Poly(S-amidinothiocarbamates) (N—O Bidentates and N—O Tetradentates) | RR'—N—C(=NH)—S—CO—NR"R''', where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #7: Diimidosulfuric Acid, Bis(diimidosulfuric acid), and derivatives thereof (N—O Bidentates and N—O Tetradentates) | (NH=)(NH=)P(OR)(OR'), where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #8: Phosphorimidic Acid, Bis(phosphorimidic acid); and Poly(phosphorimidic acid), and derivatives thereof (N—O Bidentates) | (NH=)P(—OR)(—OR')(—OR"), where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #9: Phosphoric Triamides, Bis(phosphoric triamides), and Poly(phosphoric triamides) (N—O Bidentates and N—O Tetradentates) | (O=)P(—NRR')(—NR"R''')(—NR''''R'''''), where R, R', R", R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #10: Phosphoramidic Acid, Phosphorodiamidic Acid, Bis(phosphoramidic acid), Bis(phosphorodiamidic acid), | (O=)P(—NRR')(—OR")(—OR''') for phosphoramidic acid and (O=)P(—NRR')(—NR"R''')(—OR'''') for phosphorodiamidic acid, where R, R', R", R''', and R'''' represent H, |

TABLE 1-continued

Wide Band Organic Valence Stabilizers for the $Co^{+3}$ Ion

| General Structural Name (Type of Organic) | Structural Representation |
|---|---|
| Poly(phosphoramidic acid), Poly(phosphorodiamidic acid), and derivatives thereof (N—O Bidentates and N—O Tetradentates) | $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #11: N-Acyl 7-Aminobenzylidenimines (N—O Bidentates or N—O Tetradentates) | R'—C(=O)—N=C(—R)(—NHR''), where R is an aromatic derivative (i.e. —$C_6H_5$), and R' and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #12: Oximes, Dioximes, and Poly(oximes) (N—O Bidentates, N—O Tridentates, and N—O Tetradentates) | R—C(=NOH)—R' for oximes, and R—C(=NOH)—C(=NOH)—R' for dioximes, where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #13: Carbonyl oximes, Bis(carbonyl oximes), and Poly(carbonyl oximes) (N—O Bidentates, N—O Tridentates, and N—O Tetradentates) | R—C(=O)—C(=NOH)—R', where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #14: Imine oximes, Bis(imine oximes), and Poly(imine oximes) (including 2-nitrogen heterocyclic oximes) (N—O Bidentates, N—O Tridentates, N—O Tetradentates, and N—O Hexadentates) | R—C(=N—R'')—C(=NOH)—R', where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #15: Hydroxy oximes, Bis(hydroxy oximes), and Poly(hydroxy oximes) (including 2-oxygen heterocyclic oximes) (N—O Bidentates, N—O Tridentates, N—O Tetradentates, and N—O Hexadentates) | R—CH(—OH)—C(=NOH)—R', where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #16: Amino oximes, Bis(amino oximes), and Poly(amino oximes) (N—O Bidentates, N—O Tridentates, N—O Tetradentates, and N—O Hexadentates) | RR'—C(—NH—R'')—C(=NOH)—R''', where R, R', R'', and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #17: Amido oximes, Bis(amido oximes), and Poly(amido oximes) (N—O Bidentates, N—O Tridentates, N—O Tetradentates, and N—O Hexadentates) | RR'—N—C(=NOH)—R'', where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #18: Azo oximes, Bis(azo oximes), and Poly(azo oximes) (N—O Bidentates, N—O Tridentates, N—O Tetradentates, and N—O Hexadentates). Also includes hydrazone oximes. | R—N=N—C(=NOH)—R' or RR'C=N—NR''—C(=NOH)—R''', where R, R', R'', and R''' represent H, $NH_2$, or any organic functional group wherein the number of carbon atoms ranges from 0 to 40, optionally having halogen or polarizing or water-insolubilizing/solubilizing groups attached. (R is typically an aryl group.) Ligand can also contain nonbinding N, O, S, or P atoms. |

TABLE 1-continued

Wide Band Organic Valence Stabilizers for the $Co^{+3}$ Ion

| General Structural Name (Type of Organic) | Structural Representation |
|---|---|
| N—O Valence Stabilizer #19: 2-Nitrosophenols (o-Quinone monoximes) (N—O Bidentates) | o-(ON—)(HO—)Ar, where Ar represents an aromatic group or heterocyclic wherein the number of carbon atoms ranges from 6 to 40, optionally having halogen or polarizing or water-insolubilizing/solubilizing groups attached. Ligand can also contain nonbinding N, O, S, or P atoms. |
| N—O Valence Stabilizer #20: 2-Nitrophenols (N—O Bidentates) | o-($O_2N$—)(HO—)Ar, where Ar represents an aromatic group or heterocyclic wherein the number of carbon atoms ranges from 6 to 40, optionally having halogen or polarizing or water-insolubilizing/solubilizing groups attached. Ligand can also contain nonbinding N, O, S, or P atoms. |
| N—O Valence Stabilizer #21: Hydroxamates (Hydroxylamines), Bis(hydroxamates), and Poly(hydroxamates) (N—O Bidentates, N—O Tetradentates, and N—O Hexadentates) | R—C(═O)—NR'—OH or R—C(—OH)═N—OH, where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #22: N-Nitrosohydroxylamines, Bis(N-nitrosohydroxylamines), and Poly(N-nitrosohydroxylamines) (N—O Bidentates, N—O Tetradentates, and N—O Hexadentates) | R—N(—NO)—OH, where R represents any organic functional group wherein the number of carbon atoms ranges from 1 to 40, optionally having halogen or polarizing or water-insolubilizing/solubilizing groups attached. (R is typically an aryl or heterocyclic group.) Ligand can also contain nonbinding N, O, S, or P atoms. |
| N—O Valence Stabilizer #23: Amino Acids and ortho-Aminocarboxylic Acids, Peptides, Polypeptides, and Proteins [N—O Bidentates, N—O Tridentates, and N—O Tetradentates; possibly S—O dentates for sulfur-contg. examples such as penicillamine and cystine] | R—CH(—NHR')—C(═O)(—OH) for amino acids and ortho-aminocarboxylic acids, and R—CH(—NHR')—C(═O)—(NR''')—CH(—R''')—C(═O)(—OH) for peptides, where R, R', R'', and R''' represent any organic functional group wherein the number of carbon atoms ranges from 1 to 40, optionally having halogen or polarizing or water-insolubilizing/solubilizing groups attached. Ligand can also contain nonbinding N, O, S, or P atoms. |
| N—O Valence Stabilizer #24: Amides, Bis(amides), and Poly(amides), including lactams (N—O Bidentates, N—O Tridentates, and N—O Tetradentates) | RCONR'R'', where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, N, O, S, or P atoms. |
| N—O Valence Stabilizer #25: Semicarbazones, Bis(semicarbazones), and Poly(semicarbazones) (N—O Bidentates, N—O Tetradentates, and N—O Hexadentates) | RR'—N—C(═O)—NR''—N═CR'''R'''', where R, R', R'', R''', and R'''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #26: Acyl hydrazones, Bis(acyl hydrazones), and Poly(acyl hydrazones) (N—O Bidentates, N—O Tetradentates, and N—O Hexadentates) | R—C(═O)—NR'—N═CR''R''', where R, R', R'', and R''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #27: Carbazones (Diazenecarboxylic hydrazides), Bis(carbazones), and Poly(carbazones) (N—O Bidentates, N—O Tetradentates, and N—O Hexadentates) | R—N═N—C(═O)—NR'—N—R''R''', where R, R', R'', and R''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #28: Azo compounds including triazenes with hydroxyl or carboxy or carbonyl substitution at the ortho- (for aryl) or alpha- | R—N═N—R' for azo compounds, R—N═N—NH—R' for triazenes, where R, and R' represent H or any organic functional group wherein the number of carbon atoms ranges from 0 to 40, |

TABLE 1-continued

Wide Band Organic Valence Stabilizers for the $Co^{+3}$ Ion

| General Structural Name (Type of Organic) | Structural Representation |
|---|---|
| or beta- (for alkyl) positions, Bis[o-(HO—) or alpha- or beta- (HO—)azo compounds], or Poly[o-(HO—) or alpha- or beta- (HO—)azo compounds) (N—O Bidentates, N—O Tridentates, N—O Tetradentates, or N—O Hexadentates) | optionally having halogen or polarizing or water-insolubilizing/solubilizing groups attached. (Must include ortho-hydroxy or carboxy or carbonyl substituted aryl azo compounds, and alpha- or beta-hydroxy or carboxy or carbonyl alkyl azo compounds.) Ligand can also contain nonbinding N, O, S, or P atoms. |
| N—O Valence Stabilizer #29: Diazeneformamides, Diazeneacetamides, Bis(diazeneformamides), Bis(diazeneacetamides), Poly(diazeneformamides), and Poly(diazeneacetamides) (N—O Bidentates, N—O Tetradentates, and N—O Hexadentates) | R—N=N—C(=O)—NR'R" for diazeneformamides, and R—N=N—CR'R"—C(=O)—NR'"R"" for diazeneacetamides, where R, R', R", R'", and R"" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #30: Diazeneformic acids, Diazeneacetic acids, Bis(diazeneformic acids), Bis(diazeneacetic acids), Poly(diazeneformic acids), Poly(diazeneacetic acids), and derivatives thereof (N—O Bidentates, N—O Tetradentates, N—O Hexadentates) | R—N=N—C(=O)—O—R' for diazeneformic acid, and R—N=N—CR'R"—C(=O)—O—R'" for diazeneacetic acid, where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #31: Diazeneformaldehydes, Diazeneacetaldehydes, Bis(diazeneformaldehydes), Bis(diazeneacetaldehydes), Poly(diazeneformaldehydes), and Poly(diazeneacetaldehydes) (N—O Bidentates, N—O Tetradentates and N—O Hexadentates) | R—N=N—C(=O)—R' for diazeneformaldehydes, and R—N=N—CR'R"—C(=O)—R'" for diazeneacetaldehydes, where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #32: Diazenediformamides, Diazenediacetamides, Bis(diazenediformamides), Bis(diazenediacetamides), Poly(diazenediformamides), and Poly(diazenediacetamides) (N—O Tridentates and N—O Hexadentates) | RR'—N—C(=O)—N=N—C(=O)—NR"R'" for diazenediformamides, and RR'—N—C(=O)—CR"R'"—N=N—CR""R'""—C(=O)—NR""'R""" for diazenediacetamides, where R, R', R", R'", R"", R""', R"""', and R""""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #33: Diazenediformic acids, Diazenediacetic acids, Bis(diazenediformic acids), Bis(diazenediacetic acids), Poly(diazenediformic acids), Poly(diazenediacetic acids) and derivatives thereof (N—O Tridentates and N—O Hexadentates) | R—O—C(=O)—N=N—C(=O)—O—R' for diazenediformic acid, and R—O—C(=O)—CR'R"—N=N—CR'"R""—C(=O)—O—R""' for diazenediacetic acid, where R, R', R", R'", R"", and R""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #34: Diazenediformaldehydes, Diazenediacetaldehydes, Bis(diazenediformaldehydes), Bis(diazenediacetaldehydes), Poly(diazenediformaldehydes), and Poly(diazenediacetaldehydes) (N—O Tridentates and N—O Hexadentates) | RC(=O)—N=N—C(=O)—R' for diazenediformaldehydes, and RC(=O)—CR'R"—N=N—CR'"R""—C(=O)—R""' for diazenediacetaldehydes, where R, R', R", R'", R"", and R""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #35: Ortho-hydroxy (or -carboxy) Substituted | R—N=N—CR'=N—NR"R'", where R, R', R", and R'" represent H, or any organic functional |

TABLE 1-continued

Wide Band Organic Valence Stabilizers for the $Co^{+3}$ Ion

| General Structural Name (Type of Organic) | Structural Representation |
|---|---|
| Formazans, Bis(o-hydroxy or -carboxy substituted formazans), and Poly(o-hydroxy or -carboxy substituted formazans) (N—O Bidentates, N—O Tridentates, N—O Tetradentates, and N—O Hexadentates) | group wherein the number of carbon atoms ranges from 0 to 40, optionally having halogen or polarizing or water-insolubilizing/solubilizing groups attached. (Must include ortho-hydroxy or carboxy substituted aryl R derivatives, and beta-hydroxy or carboxy substituted alkyl R derivatives.) Ligand can also contain nonbinding N, O, S, or P atoms. |
| N—O Valence Stabilizer #36: Ortho-hydroxy (or -carboxy) Substituted Azines (including ketazines), Bis(o-hydroxy or carboxy substituted azines), and Poly(o-hydroxy or carboxy substituted azines) (N—O Bidentates, N—O Tridentates, N—O Tetradentates, and N—O Hexadentates) | RR'C=N—N=CR"R'" or RR'C=N—NR"R'" (for ketazines), where R, R', R", and R'" represent H, or any organic functional group wherein the number of carbon atoms ranges from 0 to 40, optionally having halogen or polarizing or water-insolubilizing/solubilizing groups attached. (Must include ortho-hydroxy or carboxy substituted aryl R derivatives, and beta-hydroxy or carboxy substituted alkyl R derivatives.) Ligand can also contain nonbinding N, O, S, or P atoms. |
| N—O Valence Stabilizer #37: Schiff Bases with one Imine (C=N) Group and with ortho- or alpha- or beta-hydroxy or carboxy or carbonyl substitution (N—O Bidentates, N—O Tridentates, N—O Tetradentates, N—O Pentadentates, or N—O Hexadentates). Also includes hydrazones with ortho-O substitution. | RR'C=N—R", where R, R', and R" represent H, or any organic functional group wherein the number of carbon atoms ranges from 0 to 40, optionally having halogen or polarizing or water-insolubilizing/solubilizing groups attached. (Must contain ortho- or alpha- or beta-hydroxy or carboxy or carbonyl substitution.) Ligand can also contain nonbinding N, O, S, or P atoms. |
| N—O Valence Stabilizer #38: Schiff Bases with two Imine (C=N) Groups and with ortho- or alpha- or beta-hydroxy or carboxy or carbonyl substitution (N—O Tridentates, N—O Tetradentates, N—O Pentadentates, or N—O Hexadentates). Also includes hydrazones with ortho-O substitution. | RR'C=N—R"—N=CR"'R"" or R—N=C—R'—C=N—R' or RC=N—R'—N=CR", where R, R', R", R'", and R"" represent H, or any organic functional group wherein the number of carbon atoms ranges from 0 to 40, optionally having halogen or polarizing or water-insolubilizing/solubilizing groups attached. (Must contain ortho- or alpha- or beta-hydroxy or carboxy or carbonyl substitution.) Ligand can also contain nonbinding N, O, S, or P atoms. |
| N—O Valence Stabilizer #39: Schiff Bases with three Imine (C=N) Groups and with ortho- or alpha- or beta-hydroxy or carboxy or carbonyl substitution (N—O Tetradentates, N—O Pentadentates, or N—O Hexadentates). Also includes hydrazones with ortho-O substitution. | $N(-R-N=CR'R")_3$, where R, R', and R" represent H, or any organic functional group wherein the number of carbon atoms ranges from 0 to 40, optionally having halogen or polarizing or water-insolubilizing/solubilizing groups attached. (Must contain ortho- or alpha- or beta-hydroxy or carboxy or carbonyl substitution.) Ligand can also contain nonbinding N, O, S, or P atoms. |
| N—O Valence Stabilizer #40: Silylaminoalcohols (N—O Bidentates, N—O Tridentates, N—O Tetradentates, and N—O Hexadentates) | $[R-C(NR'R")]_x-R"-[Si(-OR''')_zR''''_{3-z}]_y$, where R, R', R", R'", and R"" represent H, $NH_2$, or any organic functional group wherein the number of carbon atoms ranges from 0 to 40, optionally having halogen or polarizing or water-insolubilizing/solubilizing groups attached, and x and y = 1-6, z = 1-3. Ligand can also contain nonbinding N, O, S, or P atoms. |
| N—O Valence Stabilizer #41: Hydroxyalkyl Imines (Imino Alcohols) (N—O Bidentates, N—O Tridentates, N—O Tetradentates, and N—O Hexadentates) | $[R-C(=NR')]_x-R"-[C(-OR''')R''''R''''']_y$ or $[R-C(=NR')]_x-R"-[C(=O)R''']_y$, where R, R', R", R'", R"", and R""' represent H, $NH_2$, or any organic functional group wherein the number of carbon atoms ranges from 0 to 40, optionally having halogen or polarizing or water-insolubilizing/solubilizing groups attached, and x and y = 1-6. Ligand can also contain nonbinding N, O, S, or P atoms. |
| N—O Valence Stabilizer #42: Hydroxyaryl Amines and Hydroxyaryl Imines (N—O Bidentates, N—O Tridentates, N—O Tetradentates, and N—O Hexadentates) | $[R(-NR'R")(-OR''')]$, $[R(-NR'R")(-C(=O)R''')]$, $[R(-NR'R")_x]_2O$, $[R(-NR'R")_x]_{2-3}R'''(-OR'''')_y$, $[R(-OR')_x]_{2-3}R"(-NR'''R'''')_y$, and $[R(-NR'R")_x]_2R"(C(=O))_yR''''$ for hydroxyaryl amines; and $[R(-OR')_x]_2NH$ or $[R(-OR')_x]_2NHNH$ for hydroxyaryl imines, where R, R', R", R'", and R"" represent H, $NH_2$, or any organic functional group wherein the |

TABLE 1-continued

Wide Band Organic Valence Stabilizers for the Co$^{+3}$ Ion

| General Structural Name (Type of Organic) | Structural Representation |
|---|---|
| | number of carbon atoms ranges from 0 to 40, optionally having halogen or polarizing or water-insolubilizing/solubilizing groups attached, and x = 0-2 and y = 1-4. Ligand can also contain nonbinding N, O, S, or P atoms. |
| N—O Valence Stabilizer #43: Five-Membered Heterocyclic Rings containing One, Two, Three, or Four Nitrogen Atoms at least one additional Oxygen Atom Binding Site not in a Ring (N—O Bidentates, N—O Tridentates, N—O Tetradentates, or N—O Hexadentates) | Five membered heterocyclic ring(s) containing one, two, three, or four nitrogen atoms. In addition, ligand contains additional oxygen-containing substituents (usually hydroxy, carboxy or carbonyl groups) that constitute O binding sites. Can include other ring systems bound to the heterocyclic ring or to the O-containing substituent, but they do not coordinate with the stabilized, high valence metal ion. Ring(s) can also contain O, S, or P atoms. This 5-membered ring(s) and/or attached, uncoordinating rings and/or O-containing substituent(s) may or may not have halogen or polarizing or water-insolubilizing/solubilizing groups attached. |
| N—O Valence Stabilizer #44: Six-Membered Heterocyclic Rings containing One, Two, Three, or Four Nitrogen Atoms at least one additional Oxygen Atom Binding Site not in a Ring (N—O Bidentates, N—O Tridentates, N—O Tetradentates, or N—O Hexadentates) | Six membered heterocyclic ring(s) containing one, two, three, or four nitrogen atoms. In addition, ligand contains additional oxygen-containing substituents (usually hydroxy, carboxy, or carbonyl groups) that constitute O binding sites. Can include other ring systems bound to the heterocyclic ring or to the O-containing substituent, but they do not coordinate with the stabilized, high valence metal ion. Ring(s) can also contain O, S, or P atoms. This 6-membered ring(s) and/or attached, uncoordinating rings and/or O-containing substituent(s) may or may not have halogen or polarizing or water-insolubilizing/solubilizing groups attached. |
| N—O Valence Stabilizer #45: Five-Membered Heterocyclic Rings containing One or Two Oxygen Atoms at least one additional Nitrogen Atom Binding Site not in a Ring (N—O Bidentates, N—O Tridentates, N—O Tetradentates, or N—O Hexadentates) | Five membered heterocyclic ring(s) containing one or two oxygen atoms. In addition, ligand contains additional nitrogen-containing substituents (usually amines, imines, or hydrazides) that constitute N binding sites. Can include other ring systems bound to the heterocyclic ring or to the N-containing substituent, but they do not coordinate with the stabilized, high valence metal ion. Ring(s) can also contain O, S, or P atoms. This 5-membered ring(s) and/or attached, uncoordinating rings and/or N-containing substituent(s) may or may not have halogen or polarizing or water-insolubilizing/solubilizing groups attached. |
| N—O Valence Stabilizer #46: Six-Membered Heterocyclic Rings containing One or Two Oxygen Atoms at least one additional Nitrogen Atom Binding Site not in a Ring (N—O Bidentates, N—O Tridentates, N—O Tetradentates, or N—O Hexadentates) | Six membered heterocyclic ring(s) containing one or two oxygen atoms. In addition, ligand contains additional nitrogen-containing substituents (usually amines, imines, or hydrazides) that constitute N binding sites. Can include other ring systems bound to the heterocyclic ring or to the N-containing substituent, but they do not coordinate with the stabilized, high valence metal ion. Ring(s) can also contain O, S, or P atoms. This 6-membered ring(s) and/or attached, uncoordinating rings and/or N-containing substituent(s) may or may not have halogen or polarizing or water-insolubilizing/solubilizing groups attached. |
| N—O Valence Stabilizer #47: Five-Membered Heterocyclic Rings containing One, Two, Three, or Four Nitrogen Atoms at least one additional Oxygen Atom Binding Site in a Separate Ring (N—O Bidentates, N—O Tridentates, N—O Tetradentates) | Five membered heterocyclic ring(s) containing one, two, three, or four nitrogen atoms. In addition, ligand contains additional oxygen-containing rings that constitute O binding sites. Can include other ring systems bound to the N- or O-containing heterocyclic rings, but they do not coordinate with the stabilized, high valence metal ion. Ring(s) can also contain O, S, or P atoms. This 5-membered ring(s) and/or |

TABLE 1-continued

Wide Band Organic Valence Stabilizers for the $Co^{+3}$ Ion

| General Structural Name (Type of Organic) | Structural Representation |
|---|---|
| | additional O-containing ring(s) and/or attached, uncoordinating rings may or may not have halogen or polarizing or water-insolubilizing/solubilizing groups attached. |
| N—O Valence Stabilizer #48: Six-Membered Heterocyclic Rings containing One, Two, Three, or Four Nitrogen Atoms at least one additional Oxygen Atom Binding Site in a Separate Ring (N—O Bidentates, N—O Tridentates, N—O Tetradentates) | Six membered heterocyclic ring(s) containing one, two, three, or four nitrogen atoms. In addition, ligand contains additional oxygen-containing rings that constitute O binding sites. Can include other ring systems bound to the N- or O-containing heterocyclic rings, but they do not coordinate with the stabilized, high valence metal ion. Ring(s) can also contain O, S, or P atoms. This 6-membered ring(s) and/or additional O-containing ring(s) and/or attached, uncoordinating rings may or may not have halogen or polarizing or water-insolubilizing/solubilizing groups attached. |
| N—O Valence Stabilizer #49: Two-, Three-, Four-, Six-, Eight-, and Ten-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) or Oxygen (usually hydroxy, carboxy, or carbonyl groupss) and are not contained in Component Heterocyclic Rings (N—O Bidentates, N—O Tridentates, N—O Tetradentates, and N—O Hexadentates) | Macrocyclic ligands containing two, three, four, six, eight, or ten binding sites composed of nitrogen and oxygen to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N—O Valence Stabilizer #50: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen or Oxygen and are contained in Component Heterocyclic Rings (N—O Bidentates, N—O Tridentates, N—O Tetradentates, or N—O Hexadentates) | Macrocyclic ligands containing a total of four, six, eight, or ten heterocyclic rings containing nitrogen or oxygen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—O Valence Stabilizer #51: Four-, Six-, Eight-, or Ten-Membered Macrocyclics, Macrobicyclics, and Macropolycyclics (including Catapinands, Cryptands, Cyclidenes, and Sepulchrates) wherein all Binding Sites are composed of Nitrogen or Oxygen and are contained in a Combination of Heterocyclic Rings and Amine, Imine, Hydroxy, Carboxy, or Carbonyl Groups (N—O Bidentates, N—O Tridentates, N—O Tetradentates, or N—O Hexadentates) | Macrocyclic ligands containing at least one heterocyclic ring. These heterocyclic rings provide nitrogen or oxygen binding sites to valence stabilize the central metal ion. Other amine, imine, hydroxy, carboxy, or carbonyl binding sites can also be included in the macrocyclic ligand, so long as the total number of binding sites is four, six, eight, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S—O Valence Stabilizer #1: 1,3-Monothioketones (Monothio-beta-ketonates), 1,3,5-Monothioketones, 1,3,5-Dithioketones, Bis(1,3-Monothioketones), and Poly(1,3-Monothioketones) (S—O Bidentates, S—O Tridentates, S—O Tetradentates) | R—C(=S)—CR'R''—C(=O)—R''' where R, R', R'', and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #2: Thiomalonamides (Thiomalonodiamides), Bis(thiomalonamides), and Polythiomalonamides (S—O Bidentates, S—O Tridentates, S—O Tetradentates) | RR'—N—C(=S)—CR''R'''—C(=O)—N—R''''R''''' where R, R', R'', R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #3: 2-Thioacylacetamides, 2-Acylthioacetamides, Bis(2-thioacylacetamides), | RR'—N—C(=O)—CR''R'''—C(=S)—R'''' for 2-thioacylacetamides, and RR'—N—C(=S)—CR''R'''—C(=O)—R'''' for 2-acylthioacetamides, where R, R', R'', R''', and R'''' represent H, $NH_2$, or any |

TABLE 1-continued

Wide Band Organic Valence Stabilizers for the $Co^{+3}$ Ion

| General Structural Name (Type of Organic) | Structural Representation |
|---|---|
| Bis(2acylthioacetamides), Poly(2-thioacylacetamides), and Poly(2-Acylthioacetamides) (S—O Bidentates, S—O Tridentates, S—O Tetradentates) | organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #4: Dithiodicarbonic Diamides, Bis(dithiodicarbonic diamides), and Poly(dithiodicarbonic diamides) (S—O Bidentates, S—O Tridentates, S—O Tetradentates) | RR'—N—C(=S)—S—C(=O)—N—R''R''' where R, R', R'', and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #5: Monothiohypophosphoric Acids, Bis(monothiohypophosphoric acids), and Poly(monothiohypophosphoric acids), and derivatives thereof (S—O Bidentates, S—O Tridentates, S—O Tetradentates) | (R—O—)(R'—O—)P(=S)—P(=O)(—O—R'')(—O—R'''); (R—O—)(R'—S—)P(=S)—P(=O)(—S—R'')(—O—R'''); or (R—S—)(R'—S—)P(=S)—P(=O)(—S—R'')(—S—R'''), where R, R', R'', and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R''R'''P(=O) which are very reducing and therefore unacceptable for stabilization of high valence states in metal ions. |
| S—O Valence Stabilizer #6: Monothiohypophosphoramides, Bis(monothiohypophosphoramides), and Poly(monothiohypophosphoramides) (S—O Bidentates, S—O Tridentates, S—O Tetradentates) | (RR'—N—)(R''R'''—N—)P(=S)—P(=O)(—N—R''''R''''')(—N—R''''''R'''''''), where R, R', R'', R''', R'''', R''''', R'''''', and R''''''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R''R'''P(=O) which are very reducing and therefore unacceptable for stabilization of high valence states in metal ions. |
| S—O Valence Stabilizer #7: Monothioimidodiphosphoric Acids, Monothiohydrazidodiphosphoric Acids, Bis(monothioimidodiphosphoric Acids), Bis(monothiohydrazidodiphosphoric Acids), Poly(monothioimidodiphosphoric Acid), Poly(monothiohydrazidodiphosphoric Acids), and derivatives thereof (S—O Bidentates, S—O Tridentates, S—O Tetradentates) | (R—O—)(R'—O—)P(=S)—NH—P(=O)(—O—R'')(—O—R'''); (R—O—)(R'—S—)P(=S)—NH—P(=O)(—S—R'')(—O—R'''); or (R—S—)(R'—S—)P(=S)—NH—P(=O)(—S—R')(—S—R''') for monothioimidodiphosphoric acids, and —NH—NH—derivatives for monothiohydrazidodiphosphoric acids, where R, R', R'', and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #8: Monothioimidodiphosphoramides, Monothiohydrazidodiphosphoramides, Bis(monothioimidodiphosphoramides), Bis(monothiohydrazidodiphosphoramides), Poly(monothioimidodiphosphoramides), and Poly(monothiohydrazidodiphosphoramides) (S—O Bidentates, S—O Tridentates, S—O Tetradentates) | (RR'—N—)(R''R'''—N—)P(=S)—NH—P(=O)(—N—R''''R''''')(—N—R''''''R''''''') for monothioimidodiphosphoramides, and —NH—NH—derivatives for monothiohydrazidodiphosphoramides, where R, R', R'', R''', R'''', R''''', R'''''', and R''''''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #9: Monothiodiphosphoramides, Bis(monothiodiphosphoramides), and Poly(monothiodiphosphoramides) (S—O Bidentates, S—O Tridentates, S—O | (RR'—N—)(R''R'''—N—)P(=S)—S—P(=O)(—N—R''''R''''')(—N—R''''''R'''''''), or (RR'—N—)(R''R'''—N—)P(=S)—O—P(=O)(—N—R''''R''''')(—N—R''''''R'''''''), where R, R', R'', R''', R'''', R''''', R'''''', and R''''''' represent H, $NH_2$ or any organic functional group wherein the number of |

TABLE 1-continued

Wide Band Organic Valence Stabilizers for the Co$^{+3}$ Ion

| General Structural Name (Type of Organic) | Structural Representation |
|---|---|
| Tetradentates) | carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #10: Monothiodiphosphoric Acids, Bis(monothioiphosphoric Acids), Poly(monothiodiphosphoric Acids), and derivatives thereof (S—O Bidentates, S—O Tridentates, S—O Tetradentates) | (R—O—)(R'—O—)P(=S)—O—P(=O)(—O—R")(—O—R'"); (R—O—)(R'—O—)P(=S)—S—P(=O)(—O—R")(—O—R'"); (R—O—)(R'—S—)P(=S)—O—P(=O)(—S—R")(—O—R'"); (R—O—)(R'—S—)P(=S)—S—P(=O)(—S—R")(—O—R'"); or (R—S—)(R'—S—)P(=S)—S—P(=O)(—S—R")(—S—R'"), where R, R', R", R'", R"", R""', and R"""' represent H, NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #11: Monothiocarbamates, Bis(monothiocarbamates), and Poly(monothiocarbamates) (including N-hydroxymonothiocarbamates and N-mercaptomonothiocarbamates) (S—O Bidentates, S—O Tridentates, and S—O Tetradentates) | RR'N$^+$=C(OH)(SH), where R and R' represent H, OH, SH, OR" (R"=C$_1$-C$_{30}$ alkyl or aryl), SR" (R"=C$_1$-C$_{30}$ alkyl or aryl), NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |

N Valence Stabilizer #1: Examples of monoamines (N monodentates) that meet the requirements for use as "wide band" valence stabilizers for Co$^{+3}$ include, but are not limited to: ammonia; ethylamine; n-dodecylamine; octylamine; phenylamine; cyclohexylamine; diethylamine; dioctylamine; diphenylamine; dicyclohexylamine; azetidine; hexamethylenetetramine (Urotropin); aziridine; azepine; pyrrolidine; benzopyrrolidine; dibenzopyrrolidine; naphthopyrrolidine; piperidine; benzopiperidine; dibenzopiperidine; naphthopiperidine; azacycloheptane (hexamethyleneimine); aminonorbornane; adamantanamine; aniline; benzylamine; toluidine; phenethylamine; xylidine; cumidine; naphthylamine; polyalkylamines; polyanilines; and fluorenediamine.

N Valence Stabilizer #2: Examples of diamines (N-N bidentates) that meet the requirements for use as "wide band" valence stabilizers for Co$^{+3}$ include, but are not limited to: hydrazine; phenyihydrazine; 1,1-diphenyihydrazine; 1,2-diphenylhydrazine (hydrazobenzene); methanediamine; ethylenediamine (1,2-ethanediamine, en); trimethylenediamine (1,3-propanediamine); putrescine (1,4-butanediamine); cadaverine (1,5-pentanediamine); hexamethylenediamine (1,6-hexanediamine); 2,3-diaminobutane; stilbenediamine (1,2-diphenyl-1,2-ethanediamine); cyclohexane-1,2-diamine; cyclopentane-1,2-diamine; 1,3-diazacyclopentane; 1,3-diazacyclohexane; piperazine; benzopiperazine; dibenzopiperazine; naphthopiperazine; diazepine; thiadiazepine; oxodiazepine; sparteine (lupinidine); 2-(aminomethyl)azacyclohexane; 2-(aminomethyl)piperidine; 2-(aminomethyl)pyrrolidine; 2-(aminomethyl)azetidine; 2-(2-aminoethyl)aziridine; 1,2-diaminobenzene; benzidine; bis(2,2'-piperazino)-1,2-ethene; 1,4-diazabicyclo[2.2.2]octane; naphthylethylenediamine; and 1,2-dianilinoethane.

N Valence Stabilizer #3: Examples of triamines (N-N bidentates or N-N tridentates) that meet the requirements for use as "wide band" valence stabilizers for Co$^{+3}$ include, but are not limited to: N-(2-aminoethyl)-1,2-ethanediamine (dien, 2,2-tri); N-(2-aminoethyl)-1,3 -propanediamine (2,3-tri); N-(3aminopropyl)- 1,3-propanediamine (3,3-tri, dpt); N-(3-aminopropyl)-1,4-butanediamine (3,4-tri, spermidine); N-(2-aminoethyl)-1,4-butanediamine (2,4-tri); N-(6-hexyl)-1,6-hexanediamine (6,6-tri); 1,3,5-triaminocyclohexane (tach); 2-(aminomethyl)-1,3-propanediamine (tamm); 2-(aniinomethyl)-2-methyl- 1,3-propanediamine (tame); 2-(aminomethyl)-2-ethyl- 1,3-propanediamine (tamp); 1,2,3-tniaminopropane (tap); 2,3-(2-aminoethyl)aziridine; 2,4-(aminomethyl)azetidine; 2,5-(aminomethyl)pyrrolidine; 2,6-(aminomethyl)pipenidine; di(2-aminobenzyl)amine; hexahydro-1,3,5-triazine; hexahydro-2,4,6-trimethyl-1,3,5-triazine; and 1,3,5-tris(aminomethyl)benzene.

N Valence Stabilizer #4: Examples of tetramines (N-N bidentates, N-N tridentates, or N-N tetnadentates) that meet the requirements for use as "wide band" valence stabilizers for Co$^{+3}$ include, but are not limited to: N,N'-(2-aminoethyl)-1,2-ethanediamine (2,2,2-tet, trien (triethylenetetramine)); N,N'-(2-aminoethyl)- 1,3-propanediamine (2,3,2-tet, entnen); N,N'-(3-aminopropyl)-1,2-ethanediamine (3,2,3-tet, tnentn); N-(2-aminoethyl)-N'-(3-aminopropyl)- 1,2-ethanediamine (2,2,3-tet); N-(2-aminoethyl)-N'-(3-aminopropyl)-1,3-propanediamine (3,3,2-tet); N,N'-(3-aminopropyl)- 1,3-propanediamine (3,3,3-tet); N,N'-(3-aminopropyl)-1,4-butanediamine (3,4,3-tet, spermine); tri(aminomethyl)amine (tren); tri(2-aminoethyl)amine (trtn); tni(3-aminopropyl)amine (trbn); 2,2-aminomethyl-1,3-propanediamine (tam); 1,2,3,4-tetraaminobutane (tab); N,N'-(2-aminophenyl)- 1,2-ethanediamine; and N,N'-(2-aminophenyl)- 1,3-propanediamine.

N Valence Stabilizer #5: Examples of pentamines (N-N bidentates, N-N tnidentates, or N-N tetradentates) that meet the requirements for use as "wide band" valence stabilizers for Co$^{+3}$ include, but are not limited to: N-[N-(2-aminoethyl)-

2-aminoethyl]-N'-(2-aminoethyl)- 1,2-thanediamine (2,2,2,2-pent, tetren); N-[N-(3-aminopropyl)-2-aminoethyl]-N'-(3-aminopropyl)1,2-ethanediamine (3,2,2,3-pent); N-[N-(3-aminopropyl)-3-aminopropyl]-N'-(3-aminopropyl)- 1,3-propanediamine (3,3,3,3-pent, caldopentamine); N-[N-(2-aminobenzyl)-2-aminoethyl]-N'-(2-aminopropyl)- 1,2-ethanediamine; N-[N-(2-aminoethyl)-2-aminoethyl]-N,N-(2-aminoethyl)amine (trenen); and N-[N-(2-aminopropyl)-2-aminoethyl]-N,N-(2-aminoethyl)amine (4-Me-trenen).

N Valence Stabilizer #6: Examples of hexamines (N-N bidentates, N-N tridentates, N-N tetradentates, or N-N-N-N-N hexadentates) that meet the requirements for use as "wide band" valence stabilizers for $Co^{+3}$ include, but are not limited to: N,N'-[N-(2-aminoethyl)-2-aminoethyl]-1,2-ethanediamine (2,2,2,2,2-hex, linpen); N,N'-[N-(2-aminoethyl)-3-aminopropyl]-1,2-ethanediamine (2,3,2,3,2-hex); N,N,N',N'-(2-aminoethyl)- 1,2-ethanediamine (penten, ten); N,N,N',N'-(2-aminoethyl)-1-methyl-1,2-ethanediamine (tpn, R-5-Me-penten); N,N,N',N'-(2-aminoethyl)- 1,3-propanediamine (ttn); N,N,N',N'-(2-aminoethyl)- 1,4-butanediamine (tbn); N,N,N',N'-(2-aminoethyl)- 1,3-dimethyl- 1,3-propanediamine (R,R-tptn, R,S-tptn); N-(2-aminoethyl)-2,2-[N-(2-aminoethyl)aminomethyl- 1-propaneamine (sen); and N-(3-aminopropyl)-2,2-[N-(3-aminopropyl)aminomethyl-1-propaneamine (stn).

N Valence Stabilizer #7a: Examples of 5-membered heterocyclic rings containing one nitrogen atom (N monodentates) that meet the requirements for use as "wide band" valence stabilizers for $Co^{+3}$ include, but are not limited to: 1-pyrroline, 2-pyrroline, 3-pyrroline, pyrrole, oxazole, isoxazole, thiazole, isothiazole, azaphosphole, benzopyrroline, benzopyrrole (indole), benzoxazole, benzisoxazole, benzothiazole, benzisothiazole, benzazaphosphole, dibenzopyrroline, dibenzopyrrole (carbazole), dibenzoxazole, dibenzisoxazole, dibenzothiazole, dibenzisothiazole, naphthopyrroline, naphthopyrrole, naphthoxazole, naphthisoxazole, naphthothiazole, naphthisothiazole, naphthazaphosphole, and polypyrroles.

N Valence Stabilizer #7b: Examples of 5-membered heterocyclic rings containing two nitrogen atoms (N monodentates or N-N bidentates) that meet the requirements for use as "wide band" valence stabilizers for $Co^{+3}$ include, but are not limited to: pyrazoline, imidazoline, imidazole (ia), pyrazole, oxadiazole, thiadiazole, diazaphosphole, benzopyrazoline, benzimidazoline, benzimidazole (azindole)(bia)(bz), benzopyrazole (indazole), benzothiadiazole (piazthiole), benzoxadiazole (benzofurazan), naphthopyrazoline, naphthimidazoline, naphthimidazole, naphthopyrazole, naphthoxadiazole, naphthothiadiazole, polybenzimidazole, and polyimidazoles (e.g. polyvinylimidazole (pvi)).

N Valence Stabilizer #7c: Examples of 5-membered heterocyclic rings containing three nitrogen atoms (N monodentates, N-N bidentates) that meet the requirements for use as "wide band" valence stabilizers for $Co^{+3}$ include, but are not limited to: triazole, oxatriazole, thiatriazole, benzotriazole (bta), tolyltriazole (tt), naphthotriazole, and triazolophthalazine.

N Valence Stabilizer #7d: Examples of 5-membered heterocyclic rings containing four nitrogen atoms (N monodentates or N-N bidentates) that meet the requirements for use as "wide band" valence stabilizers for $Co^{+3}$ include, but are not limited to: tetrazole.

N Valence Stabilizer #8a: Examples of 6-membered heterocyclic rings containing one nitrogen atom (N monodentates) that meet the requirements for use as "wide band" valence stabilizers for $Co^{+3}$ include, but are not limited to: pyridine, picoline, lutidine, y-collidine, oxazine, thiazine, azaphosphorin, quinoline, isoquinoline, benzoxazine, benzothiazine, benzazaphosphorin, acridine, phenanthridine, phenothiazine (dibenzothiazine), dibenzoxazine, dibenzazaphosphorin, benzoquinoline (naphthopyridine), naphthoxazine, naphthothiazine, naphthazaphosphorin, and polypyridines.

N Valence Stabilizer #8b: Examples of 6-membered heterocyclic rings containing two nitrogen atoms (N monodentates or N-N bidentates) that meet the requirements for use as "wide band" valence stabilizers for $Co^{+3}$ include, but are not limited to: pyrazine, pyridazine, pyrimidine, oxadiazine, thiadi azine, diazaphosphorin, quinoxaline (benzopyrazine), cinnoline (benzo[c]pyridazine), quinazoline (benzopyrimidine), phthalazine (benzo[d]pyridazine), benzoxadiazine, benzothi adiazine, phenazine (dibenzopyrazine), dibenzopyridazine, naphthopyrazine, naphthopyridazine, naphthopyrimidine, naphthoxadiazine, naphthothiadiazine, and polyquinoxalines.

N Valence Stabilizer #8c: Examples of 6-membered heterocyclic rings containing three nitrogen atoms (N monodentates or N-N bidentates) that meet the requirements for use as "wide band" valence stabilizers for $Co^{+3}$ include, but are not limited to: 1,3,5-triazine, 1,2,3-triazine, benzo1-1,2,3-triazine, naphtho-1,2,3-triazine, oxatriazine, thiatriazine, melamine, and cyanuric acid.

N Valence Stabilizer #8d: Examples of 6-membered heterocyclic rings containing four nitrogen atoms (N monodentates or N-N bidentates) that meet the requirements for use as "wide band" valence stabilizers for $Co^{+3}$ include, but are not limited to: tetrazine.

N Valence Stabilizer #9a: Examples of 5-membered heterocyclic rings containing one nitrogen atom and having at least one additional nitrogen atom binding site not contained in a ring (N Monodentates, N-N Bidentates, N-N Tridentates, N-N Tetradentates, or N-N Hexadentates) that meet the requirements for use as "wide band" valence stabilizers for $Co^{+3}$ include, but are not limited to: 2-(aminomethyl)-3-pyrroline; 2,5-(aminomethyl)-3-pyrroline; 2-(aminomethyl)pyrrole; 2,5-(aminomethyl)pyrrole; 3-(aminomethyl)isoxazole; 2-(aminomethyl)thiazole; 3-(aminomethyl)isothiazole; 2-(aminomethyl)indole; 2-aminobenzoxazole; 2-aminobenzothiazole (abt); 1,8-diaminocarbazole; 2-amino-6-methylbenzothiazole (amebt); 2-amino-6-methoxybenzothiazole (ameobt), and 1,3-diiminoisoindoline.

N Valence Stabilizer #9b: Examples of 5-membered heterocyclic rings containing two nitrogen atoms at least one additional nitrogen atom binding site not contained in a ring (N Monodentates, N-N Bidentates, N-N Tridentates, N-N Tetradentates, or N-N Hexadentates) that meet the requirements for use as "wide band" valence stabilizers for $Co^{+3}$ include, but are not limited to: 2-aminoimidazoline; 1-(3-aminopropyl)imidazoline; 2-aminoimidazole; 1-(3-aminopropyl)imidazole; 4-(2-aminoethyl)imidazole [histamine]; 1-alkyl-4-(2-aminoethyl)imidazole; 3-(2-aminoethyl)pyrazole; 3,5-(2-aminoethyl)pyrazole; 1-(aminomethyl)pyrazole; 2-aminobenzimidazole; 7-(2-aminoethyl)benzimidazole; 1-(3 -aminopropyl)benzimidazole; 3-(2- aminoethyl)indazole; 3,7-(2-aminoethyl)indazole; 1-(aminomethyl)indazole; 7-aminobenzothiadiazole; 4-(2-aminoethyl)benzothiadiazole; 7-aminobenzoxadiazole; 4-(2-aminoethyl)benzoxadiazole; ethylenediaminetetra(1 -pyrazolylmethane) [edtp]; methylenenitrilotris(2-(1-methyl)benzimidazole) [mntb]

[tris(1-methyl-2- benzimidazolylmethane)amine]; bis(alkyl-1-pyrazolylmethane)amine; bis(alkyl-2-(1-pyrazolyl)ethane)amine; bis(N,N-(2-benzimidazolyl)-2-aminoethane) (2- benzimidazolylmethane)amine; bis(1-(3,5-dimethyl) pyrazolylmethane)phenylamine; tris(2-(1-(3,5- dimethyl) pyrazolyl)ethane)amine; 5-(dimethylamino)pyrazole; 5-(dimethylaminomethyl)pyrazole; 2-amino-1,3,4-thiadiazole; and 1-(2-aminoethyl)imidazoline.

N Valence Stabilizer #9c: Examples of 5-membered heterocyclic rings containing three nitrogen atoms at least one additional nitrogen atom binding site not contained in a ring (N Monodentates, N-N Bidentates, N-N-N Tridentates, N-N-N-N Tetradentates, or N-N-N-N-N-N Hexadentates) that meet the requirements for use as "wide band" valence stabilizers for $Co^{+3}$ include, but are not limited to: 3-amino-1,2,4-triazole (ata); 3,5-diamino-1,2,4-triazole (dat); 5-amino-1,2,4-triazole; 3-(2-aminoethyl)-1,2,4-triazole; 5-(2-aminoethyl)-1,2,4-triazole; 3,5-(2-aminoethyl)-1,2,4-triazole; 1-(aminomethyl)- 1,2,4-triazole; 3,5-(aminomethyl)-4-amino-1,2,4-triazole; 4-(2-aminoethyl)-1,2,3-triazole; 5-(2-aminoethyl)-1,2,3-triazole; 7-aminobenzotriazole; 1-(aminomethyl)-1,2,3-triazole; 1-(2-aminoethyl)-1,2,3-triazole; 4-(3-aminopropyl)benzotriazole; N-(benzotriazolylalkyl)amine; dibenzotriazole-1-ylalkylamine; bis(5-amino-1,2,4-triazol-3-yl); bis(5-amino-1,2,4-triazol-3-yl)alkanes; and 1-(aminomethyl)benzotriazole.

N Valence Stabilizer #9d: Examples of 5-membered heterocyclic rings containing four nitrogen atoms at least one additional nitrogen atom binding site not contained in a ring (N Monodentates, N-N Bidentates, N-N-N Tridentates, N-N Tetradentates, or N-N Hexadentates) that meet the requirements for use as "wide band" valence stabilizers for $Co^{+3}$ include, but are not limited to: 5-(2-aminoethyl)-1H-tetrazole; 1-(aminomethyl)-1H-tetrazole; and 1-(2-aminoethyl)-1H-tetrazole.

N Valence Stabilizer #10a: Examples of 6-membered heterocyclic rings containing one nitrogen atom and having at least one additional nitrogen atom binding site not contained in a ring (N Monodentates, N-N Bidentates, N-N-N Tridentates, N-N Tetradentates, or N-N Hexadentates) that meet the requirements for use as "wide band" valence stabilizers for $Co^{+3}$ include, but are not limited to: 2-aminopyridine; 2,6-diaminopyridine; 2-(aminomethyl)pyridine; 2,6-(aminomethyl)pyridine; 2,6-(aminoethyl)pyridine; 2-amino-4-picoline; 2,6-diamino-4-picoline; 2-amino-3,5-lutidine; 2-aminoquinoline; 8-aminoquinoline; 2-aminoisoquinoline; acriflavine; 4-aminophenanthridine; 4,5-(aminomethyl)phenothiazine; 4,5-(aminomethyl)dibenzoxazine; 10-amino-7,8-benzoquinoline; bis(2-pyridylmethane)amine; tris(2-pyridyl)amine; bis(4-(2-pyridyl)-3-azabutane)amine; bis(N,N-(2-(2-pyridyl)ethane)aminomethane)amine; 4-(N,N-dialkylaminomethyl)morpholine; 6-aminonicotinic acid; 8-aminoacridine; and 2-hydrazinopyridine.

N Valence Stabilizer #10b: Examples of 6-membered heterocyclic rings containing two nitrogen atoms at least one additional nitrogen atom binding site not contained in a ring (N Monodentates, N-N Bidentates, N-N-N Tridentates, N-N Tetradentates, or N-N Hexadentates) that meet the requirements for use as "wide band" valence stabilizers for $Co^{+3}$ include, but are not limited to: 2-aminopyrazine; 2,6-diaminopyrazine; 2-(aminomethyl)pyrazine; 2,6-(aminomethyl)pyrazine; 3-(aminomethyl)pyridazine; 3,6-(aminomethyl)pyridazine; 3,6-(2-aminoethyl)pyridazine; 1-aminopyridazine; 1-(aminomethyl)pyridazine; 2-aminopyrimidine; 1-(2-aminoethyl)pyrimidine; 2-aminoquinoxaline; 2,3-diaminoquinoxaline; 2-aminocinnoline; 3-aminocinnoline; 3-(2-aminoethyl)cinnoline; 3,8-(2-aminoethyl)cinnoline; 2-aminoquinazoline; 1-(2-aminoethyl)quinazoline; 1-aminophthalazine; 1,4-(2-aminoethyl)phthalazine; 1,8-(aminomethyl)phenazine; 2-amino-4,6-dimethylpyrimidine (admp); dihydralazine; and hydralazine.

N Valence Stabilizer #10c: Examples of 6-membered heterocyclic rings containing three nitrogen atoms at least one additional nitrogen atom binding site not contained in a ring (N Monodentates, N-N Bidentates, N-N Tridentates, N-N Tetradentates, or N-N Hexadentates) that meet the requirements for use as "wide band" valence stabilizers for $Co^{+3}$ include, but are not limited to: 2-amino-1,3,5-triazine; 2-(aminomethyl)-1,3,5-triazine; 2,6-(aminomethyl)- 1,3,5-triazine; 1-(3-aminopropyl)-1,3,5-triazine; 1,5-(3-aminopropyl)- 1,3,5-triazine, polymelamines; melamine; and altretamine.

N Valence Stabilizer #10d: Examples of 6-membered heterocyclic rings containing four nitrogen atoms at least one additional nitrogen atom binding site not contained in a ring (N Monodentates, N-N Bidentates, N-N Tridentates, N-N Tetradentates, or N-N Hexadentates) that meet the requirements for use as "wide band" valence stabilizers for $Co^{+3}$ include, but are not limited to: 3,6-(2-aminoethyl)-1,2,4,5-tetrazine; 3,6-(1,3-diamino-2-propyl)-1,2,4,5-tetrazine; and 4,6-(aminomethyl)-1,2,3,5-tetrazine.

N Valence Stabilizer #11a: Examples of 5-membered heterocyclic rings containing one nitrogen atom and having at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 2,2'-bi-3-pyrroline; 2,2'-bi-2-pyrroline; 2,2'-bi-1-pyrroline; 2,2'-bipyrrole; 2,2',2"'-tripyrrole; 3,3'-biisoxazole; 2,2'-bioxazole; 3,3'-biisothiazole; 2,2'-bithiazole; 2,2'-biindole; 2,2'-bibenzoxazole; 2,2'-bibenzothiazole; bilirubin; biliverdine; and 7-azaindole.

N Valence Stabilizer #11b: Examples of 5-membered heterocyclic rings containing two nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 2,2'-bi-2-imidazoline [2,2'-bi-2-imidazolinyl] [bimd]; 2,2'-biimidazole [2,2'-biimidazolyl] [biimH2]; 5,5'-bipyrazole; 3,3'-bipyrazole; 4,4'-bipyrazole [4,4'-bipyrazolyl] [bpz]; 2,2'-bioxadiazole; 2,2'-bithiadiazole; 2,2'-bibenzimidazole; 7,7'-biindazole; 5,5'-bibenzofurazan; 5,5'-bibenzothiadiazole; bis-1,2-(2-benzimidazole)ethane; bis(2-benzimidazole)methane; 1,2-(2-imidazolyl)benzene; 2-(2-thiazolyl)benzimidazole; 2-(2-imidazolyl)benzimidazole; benzimidazotriazine; 4-azabenzimidazole; and 2,6-bis(2-benzimidazolyl)pyridine.

N Valence Stabilizer #11c: Examples of 5-membered heterocyclic rings containing three nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 5,5'-bi-1,2,4-triazole [btrz]; 3,3'-bi-1,2,4-triazole; 1,1'-bi-1,2,4-triazole; 1,1'-bi-1,2,3-triazole; 5,5'-bi-1,2,3-triazole; 7,7'-bibenzotriazole; 1,1'-bibenzotriazole; bis(pyridyl)aminotriazole (pat); and 8-azaadenine.

N Valence Stabilizer #11d: Examples of 5-membered heterocyclic rings containing four nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 5,5'-bi-1H-tetrazole; and 1,1'-bi-1H-tetrazole.

N Valence Stabilizer #12a: Examples of 6-membered heterocyclic rings containing one nitrogen atom and having at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 2,2'-bipyridine [bipy]; 2,2',2"-tripyridine [terpyridine] [terpy]; 2,2',2",2"'-tetrapyridine [tetrapy]; 6,6'-bi-2-picoline; 6,6'-bi-3-picoline; 6,6'-bi-4-picoline; 6,6'-bi-2,3-lutidine; 6,6'-bi-2,4-lutidine; 6,6'-bi-3,4-lutidine; 6,6'-bi-2,3,4-collidine; 2,2'-biquinoline; 2,2'-biisoquinoline; 3,3'-bibenzoxazine; 3,3'-bibenzothiazine; 1,10-phenanthroline [phen]; 1,8-naphthyridine; bis-1,2-(6-(2,2'-bipyridyl))ethane; bis-1,3-(6-(2,2'-bipyridyl))propane; 3,5-bis(3-pyridyl)pyrazole; 3,5-bis(2-pyridyl)triazole; 1,3-bis(2-pyridyl)-1,3,5-triazine; 1,3-bis(2-pyridyl)-5-(3-pyridyl)-1,3,5-triazine; 2,7-(N,N'-di-2-pyridyl)diaminobenzopyrroline; 2,7-(N,N'-di-2-pyridyl)diaminophthalazine; 2,6-di-(2-benzothiazolyl)pyridine; triazolopyrimidine; 2-(2-pyridyl)imidazoline; 7-azaindole; 1-(2-pyridyl)pyrazole; (1-imidazolyl)(2-pyridyl)methane; 4,5-bis(N,N'-(2-(2-pyridyl)ethyl)iminomethyl)imidazole; bathophenanthroline; 4-(2-benzimidazolyl)quinoline; 1,2-bis(2-pyridyl)ethane; 4,4'-diphenyl-2,2'-dipyridyl; neocuproine; nicotine; and nornicotine.

N Valence Stabilizer #12b: Examples of 6-membered heterocyclic rings containing two nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 2,2'-bipyrazine; 2,2',2"-tripyrazine; 6,6'-bipyridazine; bis(3-pyridazinyl)methane; 1,2-bis(3-pyridazinyl)ethane; 2,2'-bipyrimidine; 2,2'-biquinoxaline; 8,8'-biquinoxaline; bis(3-cinnolinyl)methane; bis(3-cinnolinyl)ethane; 8,8'-bicinnoline; 2,2'-biquinazoline; 4,4'-biquinazoline; 8,8'-biquinazoline; 2,2'-biphthalazine; 1,1'-biphthalazine; 2-(2-pyridyl)benzimidazole; 8-azapurine; purine; adenine; guanine; hypoxanthine; 2,6-bis(N,N'-(2-(4-imidazolyl)ethyl)iminomethyl)pyridine; 2-(N-(2-(4-5 imidazolyl)ethyl)iminomethyl)pyridine; adenine (aminopurine); purine; and 2,3-bis(2-pyridyl)pyrazine.

N Valence Stabilizer #12c: Examples of 6-membered heterocyclic rings containing three nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 2,2'-bi-1,3,5-triazine; 2,2',2"-tri-1,3,5-triazine; 4,4'-bi-1,2,3-triazine; and 4,4'-bibenzo-1,2,3-triazine; 2,4,6-tris(2-pyridyl)-1,3,5-triazine; and benzimidazotriazines.

N Valence Stabilizer #12d: Examples of 6-membered heterocyclic rings containing four nitrogen atoms at least one additional nitrogen atom binding site contained in a ring (N Monodentates, N-N Bidentates, N-N Tridentates, N-N Tetradentates) that meet the requirements for use as "wide band" valence stabilizers for $Co^{+3}$ include, but are not limited to: 3,3'-bi-1,2,4,5-tetrazine; and 4,4'-bi-1,2,3,5-tetrazine.

N Valence Stabilizer #13a: Examples of two-membered macrocyclics, macrobicyclics, and macropolycyclics (including catapinands, cryptands, cyclidenes, and sepulchrates) wherein both binding sites are composed of nitrogen (usually amine or imine groups) and are not contained in component heterocyclic rings (N-N Bidentates) that meet the requirements for use as "wide band" valence stabilizers for $Co^{+3}$ include, but are not limited to: diazacyclobutane ([4]ane$N_2$); diazacyclopentane ([5]ane$N_2$); diazacyclohexane ([6]ane$N_2$); diazacycloheptane ([7]ane$N_2$); diazacyclooctane ([8]ane$N_2$); piperazine; benzopiperazine; diazacyclobutene ([4]ene$N_2$); diazacyclopentene ([5]ene$N_2$); diazacyclohexene ([6]ene$N_2$); diazacycloheptene ([7]ene$N_2$); diazacyclooctene ([8]ene$N_2$); diazacyclobutadiene ([4]diene$N_2$); diazacyclopentadiene ([5]diene$N_2$); diazacyclohexadiene ([6]diene$N_2$); diazacycloheptadiene ([7]diene$N_2$); and diazacyclooctadiene ([8]diene$N_2$).

N Valence Stabilizer #13b: Examples of three-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates) that meet the requirements for use as "wide band" valence stabilizers for $Co^{+3}$ include, but are not limited to: triazacyclohexane (including hexahydro1-1,3,5-triazine)([6]ane$N_3$); triazacycloheptane ([7]ane$N_3$); triazacyclooctane ([8]ane$N_3$); triazacyclononane ([9]ane$N_3$); triazacyclodecane ([10]ane$N_3$); triazacycloundecane ([11]ane$N_3$); triazacyclododecane ([12]ane$N_3$); triazacyclohexene ([6]ene$N_3$); triazacycloheptene ([7]ene$N_3$); triazacyclooctene ([8]ene$N_3$); triazacyclononene ([9]ene$N_3$); triazacyclodecene ([10]ene$N_3$); triazacycloundecene ([11]ene$N_3$); triazacyclododecene ([12]ene$N_3$); triazacyclohexatriene ([6]triene$N_3$); triazacycloheptatriene ([7]triene$N_3$); triazacyclooctatriene ([8]triene$N_3$); triazacyclononatriene ([9]triene$N_3$); triazacyclodecatriene ([10]triene$N_3$); triazacycloundecatriene ([11]triene$N_3$); and triazacyclododecatriene ([12]triene$N_3$).

N Valence Stabilizer #13c: Examples of four-membered macrocyclics, macrobicyclics, and macropolycyclics (including catapinands, cryptands, cyclidenes, and sepulcbrates) wherein all binding sites are composed of nitrogen (usually amine or imine groups) and are not contained in component heterocyclic rings (N-N Tetradentates) that meet the requirements for use as "wide band" valence stabilizers for $Co^{+3}$ include, but are not limited to: tetraazacyclooctane ([8]ane$N_4$); tetraazacyclononane ([9]ane$N_4$); tetraazacyclodecane ([10]ane$N_4$); tetraazacycloundecane ([11]ane$N_4$); tetraazacyclododecane ([12]ane$N_4$); tetraazacyclotridecane ([13]ane$N_4$); tetraazacyclotetradecane ([14]ane$N_4$); tetraazacyclopentadecane ([15]ane$N_4$); tetraazacyclohexadecane ([16]ane$N_4$); tetraazacycloheptadecane ([17]ane$N_4$); tetraazacyclooctadecane ([18]ane$N_4$); tetraazacyclononadecane ([19]ane$N_4$); tetraazacycloeicosane ([20]ane$N_4$); tetraazacyclooctadiene ([8]diene$N_4$); tetraazacyclononadiene ([9]diene$N_4$); tetraazacyclodecadiene ([10]diene$N_4$); tetraazacycloundecadiene ([11]diene$N_4$); tetraazacyclododecadiene ([12]diene$N_4$); tetraazacycl otridecadiene ([13]diene$N_4$); tetraazacyclotetradecadiene ([14]diene$N_4$); tetraazacyclopentadecadiene ([15]diene$N_4$); tetraazacyclohexadecadiene ([16]diene$N_4$); tetraazacycloheptadecadiene ([17]diene$N_4$); tetraazacyclooctadecadiene ([18]diene$N_4$); tetraazacyclononadecadiene ([19]diene$N_4$); tetraazacycloeicosadiene ([20]diene$N_4$); tetraazacyclooctatetradiene ([8]tetradiene$N_4$); tetraazacyclononatetradiene ([9]tetradieneN$_4$); tetraazacyclodecatetradiene ([10]tetradiene$N_4$); tetraazacycloundecatetradiene ([11]tetradiene$N_4$); tetraazacyclododecatetradiene ([12]tetradiene$N_4$); tetraazacyclotridecatetradiene ([13]tetradieneN$_4$); tetraazacyclotetradecatetradiene ([14]tetradieneN$_4$); tetraazacyclopentadecatetradiene ([15]tetradieneN$_4$); tetraazacyclohexadecatetradiene ([16]tetradieneN$_4$); tetraazacycloheptadecatetradiene ([17]tetradieneN4); tetraazacyclooctadecatetradiene ([18]tetradieneN$_4$); tetraazacyclononadecatetradiene ([19]tetradieneN$_4$); and tetraazacycloeicosatetradiene ([20]tetradieneN$_4$).

N Valence Stabilizer #13d: Examples of six-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates, N-N Tetradentates, or N-N Hexadentates) that meet the requirements for use as "wide band" valence stabilizers for Co$^{+3}$ include, but are not limited to: hexaazacyclododecane ([12]aneN$_6$); hexaazacyclotridecane ([13]aneN$_6$); hexaazacyclotetradecane ([14]aneN$_6$); hexaazacyclopentadecane ([15]aneN$_6$); hexaazacyclohexadecane ([16]aneN$_6$); hexaazacycloheptadecane ([17]aneN$_6$); hexaazacyclooctadecane ([18]aneN$_6$); hexaazacyclononadecane ([19]aneN$_6$); hexaazacycloeicosane ([20]aneN$_6$); hexaazacycloheneicosane ([21]aneN$_6$); hexaazacyclodocosane ([22]aneN$_6$); hexaazacyclotricosane ([23]aneN$_6$); hexaazacyclotetracosane ([24]aneN$_6$); hexaazacyclododecatriene ([12]trieneN$_6$); hexaazacyclotridecatriene ([13]trieneN$_6$); hexaazacyclotetradecatriene ([14]trieneN$_6$); hexaazacyclopentadecatriene ([15]trieneN$_6$); hexaazacyclohexadecatriene ([16]trieneN$_6$); hexaazacycloheptadecatriene ([17]trieneN$_6$); hexaazacyclooctadecatriene ([18]trieneN$_6$); hexaazacyclononadecatriene ([19]trieneN$_6$); hexaazacycloeicosatriene ([20]trieneN$_6$); hexaazacycloheneicosatriene ([21]trieneN$_6$); hexaazacyclodocosatriene ([22]trieneN$_6$); hexaazacyclotricosatriene ([23]trieneN$_6$); and hexaazacyclotetracosatriene ([24]trieneN$_6$).

N Valence Stabilizer #13e: Examples of eight-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates, N-N Tetradentates, or N-N Hexadentates) that meet the requirements for use as "wide band" valence stabilizers for Co$^{+3}$ include, but are not limited to: octaazacyclohexadecane ([16]aneN$_8$); octaazacycloheptadecane ([17]aneN$_8$); octaazacyclooctadecane ([18]aneN$_8$); octaazacyclononadecane ([19]aneN$_8$); octaazacycloeicosane ([20]aneN$_8$); octaazacycloheneicosane ([21]aneN$_8$); octaazacyclodocosane ([22]aneN$_8$); octaazacyclotricosane ([23]aneN$_8$); octaazacyclotetracosane ([24]aneN$_8$); octaazacyclohexadecatetradiene ([16]tetradieneN$_8$); octaazacycloheptadecatetradiene ([17]tetradieneN$_8$); octaazacyclooctadecatetradiene ([18]tetradieneN$_8$); octaazacyclononadecatetradiene ([19]tetradieneN$_8$); octaazacycloeicosatetradiene ([20]tetradieneN$_8$); octaazacycloheneicosatetradiene ([2l]tetradieneN$_8$); octaazacyclodocosatetradiene ([22]tetradieneN$_8$); octaazacyclotricosatetradiene ([23]tetradieneN$_8$); and octaazacyclotetracosatetradiene ([24]tetradieneN$_8$).

N Valence Stabilizer #13f: Examples of ten-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates, N-N Hexadentates) that meet the requirements for use as "wide band" valence stabilizers for Co$^{+3}$ include, but are not limited to: decaazacycloeicosane ([20]aneN$_{10}$); decaazacycloheneicosane ([21]aneN$_{10}$); decaazacyclodocosane ([22]aneN$_{10}$); decaazacyclotricosane ([23]aneN$_{10}$); decaazacyclotetracosane ([24]aneN$_{10}$); decaazacyclopentacosane ([25]aneN$_{10}$); decaazacyclohexacosane ([26]aneN$_{10}$); decaazacycloheptacosane ([27]aneN$_{10}$); decaazacyclooctacosane ([28]aneN$_{10}$); decaazacyclononacosane ([29]aneN$_{10}$); decaazacyclotriacontane ([30]aneN$_{10}$); decaazacycloeicosapentadiene ([20]pentadieneN$_{10}$); decaazacycloheneicosapentadiene ([21]pentadieneN$_{10}$); decaazacyclodocosapentadiene ([22]pentadieneN$_{10}$); decaazacyclotricosapentadiene ([23]pentadieneN$_{10}$); decaazacyclotetracosapentadiene ([24]pentadieneN$_{10}$); decaazacyclopentacosapentadiene ([25]pentadieneN$_{10}$); decaazacyclohexacosapentadiene ([26]pentadieneN$_{10}$); decaazacycloheptacosapentadiene ([27]pentadieneN$_{10}$); decaazacyclooctacosapentadiene ([28]pentadieneN$_{10}$); decaazacyclononacosapentadiene ([29]pentadieneN$_{10}$); and decaazacyclotriacontapentadiene ([30]pentadieneN$_{10}$).

N Valence Stabilizer #14a: Examples of four-membered macrocyclics, macrobicyclics, and macropolycyclics (including catapinands, cryptands, cyclidenes, and sepulchrates) wherein all four binding sites are composed of nitrogen and are contained in component 5-membered heterocyclic rings (N-N Tetradentates) that meet the requirements for use as "wide band" valence stabilizers for Co$^{+3}$ include, but are not limited to: porphyrins (including tetraphenylporphine (tpp); "picket fence" porphyrins, "picket tail" porphyrins, "bispocket" porphyrins, "capped" porphyrins, cyclophane porphyrins, "pagoda" porphyrins, "pocket" porphyrins, "pocket tail" porphyrins, cofacial diporphyrins, "strapped" porphyrins, "hanging base" porphyrins, bridged porphyrins, chelated mesoporphyrins, homoporphyrins, chlorophylls, and pheophytins); porphodimethanes; porphyrinogens; chlorins; bacteriochlorins; isobacteriochlorins; corroles; corrins and corrinoids; didehydrocorrins; tetradehydrocorrins; hexadehydrocorrins; octadehydrocorrins; tetraoxazoles; tetraisooxazoles; tetrathiazoles; tetraisothiazoles; tetraazaphospholes; tetraimidazoles; tetrapyrazoles; tetraoxadiazoles; tetrathiadiazoles; tetradiazaphospholes; tetratriazoles; tetraoxatriazoles; tetrathiatriazoles; coproporphyrin; etioporphyrin; and hematoporphyrin.

N Valence Stabilizer #14b: Examples of six-membered macrocyclics, macrobicyclics, and macropolycyclics (including catapinands, cryptands, cyclidenes, and sepulchrates) wherein all six binding sites are composed of nitrogen and are contained in component 5-membered heterocyclic rings (N-N Tridentates, N-N Tetradentates, or N-N Hexadentates) that meet the requirements for use as "wide band" valence stabilizers for Co$^{+3}$ include, but are not limited to: hexaphyrins (hexapyrroles); hexaoxazoles; hexaisooxazoles; hexathiazoles; hexaisothiazoles; hexaazaphospholes; hexaimidazoles; hexapyrazoles; hexaoxadiazoles; hexathiadiazoles; hexadiazaphospholes; hexatriazoles; hexaoxatriazoles; and hexathiatriazoles.

N Valence Stabilizer #14c: Examples of eight-membered macrocyclics, macrobicyclics, and macropolycyclics (including catapinands, cryptands, cyclidenes, and sepulchrates) wherein all eight binding sites are composed of nitrogen and are contained in component 5-membered heterocyclic rings (N-N Tridentates, N-N Tetradentates, or N-N Hexadentates) that meet the requirements for use as "wide band" valence stabilizers for Co$^{+3}$ include, but are not limited to: octaphyrins (octapyrroles); octaoxazoles; octaisooxazoles; octathiazoles; octaisothiazoles; octaazaphospholes; octaimidazoles; octapyrazoles; octaoxadiazoles; octathiadiazoles; octadiazaphospholes; octatriazoles; octaoxatriazoles; and octathiatriazoles.

N Valence Stabilizer #14d: Examples of ten-membered macrocyclics, macrobicyclics, and macropolycyclics (including catapinands, cryptands, cyclidenes, and sepulchrates) wherein all ten binding sites are composed of nitrogen and are contained in component 5-membered heterocyclic rings (N-N Tridentates, N-N Tetradentates, or N-N Hexadentates) that meet the requirements for use as "wide band" valence stabilizers for $Co^{+3}$ include, but are not limited to: decaphyrins (decapyrroles); decaoxazoles; decaisooxazoles; decathiazoles; decaisothiazoles; decaazaphospholes; decaimidazoles; decapyrazoles; decaoxadiazoles; decathiadiazoles; decadiazaphospholes; decatriazoles; decaoxatriazoles; and decathiatriazoles.

N Valence Stabilizer #15a: Examples of four-membered macrocyclics, macrobicyclics, and macropolycyclics (including catapinands, cryptands, cyclidenes, and sepulchrates) wherein all four binding sites are composed of nitrogen and are contained in a combination of 5-membered heterocyclic rings and amine or imine groups (N-N Tetradentates) that meet the requirements for use as "wide band" valence stabilizers for $Co^{+3}$ include, but are not limited to: porphyrazines; octahydrodiazaporphyrins; phthalocyanines; naphthalocyanines; anthracocyanines; and tetraazaporphyrins N Valence Stabilizer #15b: Examples of six-membered macrocyclics, macrobicyclics, and macropolycyclics (including catapinands, cryptands, cyclidenes, and sepulchrates) wherein all six binding sites are composed of nitrogen and are contained in a combination of 5-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazahexaphyrins; tetraazahexaphyrins; hexaazahexaphyrins; diazahexapyrazoles; tetraazahexapyrazoles; hexaazahexapyrazoles; diazahexaimidazoles; tetraazahexaimidazoles; and hexaazahexaimidazoles.

N Valence Stabilizer #15c: Examples of eight-membered macrocyclics, macrobicyclics, and macropolycyclics (including catapinands, cryptands, cyclidenes, and sepulchrates) wherein all eight binding sites are composed of nitrogen and are contained in a combination of 5-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazaoctaphyrins; tetraazaoctaphyrins; hexaazaoctaphyrins; octaazaoctaphyrins; diazaoctapyrazoles; tetraazaoctapyrazoles; hexaazaoctapyrazoles; octaazaoctapyrazoles; diazaoctaimidazoles; tetraazaoctaimidazoles; hexaazaoctaimidazoles; and octaazaoctaimidazoles.

N Valence Stabilizer #15d: Examples of ten-membered macrocyclics, macrobicyclics, and macropolycyclics (including catapinands, cryptands, cyclidenes, and sepulchrates) wherein all ten binding sites are composed of nitrogen and are contained in a combination of 5-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazadecaphyrins; tetraazadecaphyrins; hexaazadecaphyrins; octaazadecaphyrins; decaazadecaphyrins; diazadecapyrazoles; tetraazadecapyrazoles; hexaazadecapyrazoles; octaazadecapyrazoles; decaazadecapyrazoles; diazadecaimidazoles; tetraazadecaimidazoles; hexaazadecaimidazoles; octaazadecaimidazoles; and decaazadecaimidazoles.

N Valence Stabilizer #16a: Examples of four-membered macrocyclics, macrobicyclics, and macropolycyclics (including catapinands, cryptands, cyclidenes, and sepulchrates) wherein all four binding sites are composed of nitrogen and are contained in component 6-membered heterocyclic rings (N-N Tetradentates) that meet the requirements for use as "wide band" valence stabilizers for $Co^{+3}$ include, but are not limited to: cyclotetrapyridines; cyclotetraoxazines; cyclotetrathiazines; cyclotetraphosphorins; cyclotetraquinolines; cyclotetrapyrazines; cyclotetrapyridazines; cyclotetrapyrimidines; cyclotetraoxadiazines; cyclotetrathiadiazines; cyclotetradiazaphosphorins; cyclotetraquinoxalines; cyclotetratriazines; cyclotetrathiatriazines; and cyclotetraoxatriazines.

N Valence Stabilizer #16b: Examples of six-membered macrocyclics, macrobicyclics, and macropolycyclics (including catapinands, cryptands, cyclidenes, and sepulchrates) wherein all six binding sites are composed of nitrogen and are contained in component 6-membered heterocyclic rings (N-N Tridentates, N-N Tetradentates, or N-N Hexadentates) that meet the requirements for use as "wide band" valence stabilizers for $Co^{+3}$ include, but are not limited to: cyclosexipyridines; cyclosexioxazines; cyclosexithiazines; cyclosexiphosphorins; cyclosexiquinolines; cyclosexipyrazines; cyclosexipyridazines; cyclosexipyrimidines; cyclosexioxadiazines; cyclosexithiadiazines; cyclosexidiazaphosphorins cyclosexiquinoxalines; cyclosexitriazines; cyclosexithiatriazines; and cyclosexioxatriazines.

N Valence Stabilizer #16c: Examples of eight-membered macrocyclics, macrobicyclics, and macropolycyclics (including catapinands, cryptands, cyclidenes, and sepulchrates) wherein all six binding sites are composed of nitrogen and are contained in component 6-membered heterocyclic rings (N-N Tridentates, N-N Tetradentates, or N-N Hexadentates) that meet the requirements for use as "wide band" valence stabilizers for $Co^{+3}$ include, but are not limited to: cyclooctapyridines; cyclooctaoxazines; cyclooctathiazines; cyclooctaphosphorins; cyclooctaquinolines; cyclooctapyrazines; cyclooctapyridazines; cyclooctapyrimidines; cyclooctaoxadiazines; cyclooctathiadiazines; cyclooctadiazaphosphorins; cyclooctaquinoxalines; cyclooctatriazines; cyclooctathiatriazines; and cyclooctaoxatriazines.

N Valence Stabilizer #6d: Examples of ten-membered macrocyclics, macrobicyclics, and macropolycyclics (including catapinands, cryptands, cyclidenes, and sepulchrates) wherein all six binding sites are composed of nitrogen and are contained in component 6-membered heterocyclic rings (N-N Tridentates, N-N Tetradentates, or N-N Hexadentates) that meet the requirements for use as "wide band" valence stabilizers for $Co^{+3}$ include, but are not limited to: cyclodecapyridines; cyclodecaoxazines; cyclodecathi azines; cyclodecaphosphorins; cyclodecaquinolines; cyclodecapyrazines; cyclodecapyridazines; cyclodecapyrimidines; cyclodecaoxadiazines; cyclodecathiadiazines; cyclodecadiazaphosphorins; cyclodecaquinoxalines; cyclodecatriazines; cyclodecathiatriazines; and cyclodecaoxatriazines.

N Valence Stabilizer #17a: Examples of four-membered macrocyclics, macrobicyclics, and macropolycyclics (including catapinands, cryptands, cyclidenes, and sepulchrates) wherein all four binding sites are composed of nitrogen and are contained in a combination of 6-membered heterocyclic rings and amine or imine groups (N-N Tetradentates) that meet the requirements for use as "wide band" valence stabilizers for $Co^{+3}$ include, but are not limited to: diazacyclotetrapyridines; tetraazacyclotetrapyridines; diazacyclotetraquinolines; tetraazacyclotetraquinolines; diazacyclotetrapyrazines; tetraazacyclotetrapyrazines; diazacyclotetrapyridazines; tetraazacyclotetrapyridazines; diazacyclotetrapyrimidines; tetraazacyclotetrapyrimidines; diazacyclotetratriazines; and tetraazacyclotetratriazines.

N Valence Stabilizer #17b: Examples of six-membered macrocyclics, macrobicyclics, and macropolycyclics (including catapinands, cryptands, cyclidenes, and sepulchrates) wherein all six binding sites are composed of nitrogen and are contained in a combination of 6-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazacyclosexipyridines; triazacyclosexipyridines; diazacyclosexiquinolines; triazacyclosexiquinolines; diazacyclosexipyrazines; triazacyclosexipyrazines; diazacyclosexipyridazines; triazacyclosexipyridazines; diazacyclosexipyrimidines; triazacyclosexipyrimidines; diazacyclosexitriazines; and triazacyclosexitriazines.

N Valence Stabilizer #17c: Examples of eight-membered macrocyclics, macrobicyclics, and macropolycyclics (including catapinands, cryptands, cyclidenes, and sepulchrates) wherein all eight binding sites are composed of nitrogen and are contained in a combination of 6-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazacyclooctapyridines; tetraazacyclooctapyridines; diazacyclooctaquinolines; tetraazacyclooctaquinolines; diazacyclooctapyrazines; tetraazacyclooctapyrazines; diazacyclooctapyridazines; tetraazacyclooctapyridazines; diazacyclooctapyrimidines; tetraazacyclooctapyrimidines; diazacyclooctatriazines; and tetraazacyclooctatriazines.

N Valence Stabilizer #17d: Examples of ten-membered macrocyclics, macrobicyclics, and macropolycyclics (including catapinands, cryptands, cyclidenes, and sepulchrates) wherein all ten binding sites are composed of nitrogen and are contained in a combination of 6-membered heterocyclic rings and amine or imine groups (N-N Tridentates, N-N Tetradentates, or N-N Hexadentates) that meet the requirements for use as "wide band" valence stabilizers for $Co^{+3}$ include, but are not limited to: diazacyclodecapyridines; pentaazacyclodecapyridines; diazacyclodecaquinolines; pentaazacyclodecaquinolines; diazacyl odecapyrazines; pentaazacyclodecapyrazines; diazacyclodecapyridazines; pentaazacyclodecapyridazines; diazacyclodecapyrimidines; pentaazacyclodecapyrimidines; diazacyclodecatriazines; and pentaazacyclodecatriazines.

N Valence Stabilizer #18: Examples of amidines and diamidines (N-N bidentates or N-N Tetradentates) that meet the requirements for use as "wide band" valence stabilizers for $Co^{+3}$ include, but are not limited to: N,N'-dimethylformamidine; N,N'-diethylformamidine; N,N'-diisopropylformamidine; N,N'-dibutylformamidine; N,N'-diphenylformamidine; N,N'-dibenzylformamidine; N,N'-dinaphthylformamidine; N,N'-dicyclohexylformamidine; N,N'-dinorbornylformamidine; N,N'-diadamantylformamidine; N,N'-dianthraquinonylfomiamidine; N,N'-dimethylacetamidine; N,N'-diethylacetamidine; N,N'-diisopropylacetamidine; N,N'-dibutylacetamidine; N,N'-diphenylacetamidine; N,N'-dibenzylacetamidine; N,N'-dinaphthylacetamidine; N,N'-dicyclohexylacetamidine; N,N'-dinorbomylacetamidine; N,N'-diadamantylacetamidine; N,N'-dimethylbenzamidine; N,N'-diethylbenzamidine; N,N'-diisopropylbenzamidine; N,N'-dibutylbenzamidine; N,N'-diphenylbenzamidine; N,N'-dibenzylbenzamidine; N,N'-dinaphthylbenzamidine; N,N'-dicyclohexylbenzamidine; N,N'-dinorbornylbenzamidine; N,N'-diadamantylbenzamidine; N,N'-dimethyltoluamidine; N,N'-diethyltoluamidine; N,N'-diisopropyltoluamidine; N,N'-dibutyltoluamidine; N,N'-diphenyltoluamidine; N,N'-dibenzyltoluamidine; N,N'-dinaphthyltoluamidine; N,N'-dicyclohexyltoluamidine; N,N'-dinorbomyltoluamidine; N,N'-diadamantyltoluamidine; oxalic diamidine; malonic diamidine; succinic diamidine; glutaric diamidine; adipic diamidine; pimelic diamidine; suberic diamidine; phthalic diamidine; terephthalic diamidine; isophthalic diamidine; piperazine diamidine; 2-iminopyrrolidine; 2-iminopiperidine; amidinobenzamide; benzamidine; chioroazodin; and debrisoquin.

N Valence Stabilizer #19: Examples of biguanides (imidodicarbonimidic diamides), biguanidines, imidotricarbonimidic diamides, imidotetracarbonimidic diamides, dibiguanides, bis(biguanidines), polybiguanides, and poly(biguanidines) (N-N bidentates, N-N tridentates, N-N tetradentates, and N-N hexadentates) that meet the requirements for use as "wide band" valence stabilizers for $Co^{+3}$ include, but are not limited to: biguanide (bigH); biguanidine, methylbiguanide; ethylbiguanide; isopropylbiguanide; butylbiguanide; benzylbiguanide; phenylbiguanide; tolylbiguanide; naphthylbiguanide; cyclohexylbiguanide; norbornylbiguanide; adamantylbiguanide; dimethylbiguanide; diethylbiguanide; diisopropylbiguanide; dibutylbiguanide; dibenzylbiguanide; diphenylbiguanide; ditolylbiguanide; dinaphthylbiguanide; dicyclohexylbiguanide; dinorbomylbiguanide; diadamantylbiguanide; ethylenedibiguanide; propylenedibiguanide; tetramethylenedibiguanide; pentamethylenedibiguanide; hexamethylenedibiguanide; heptamethylenedibiguanide; octamethylenedibiguanide; phenylenedibiguanide; piperazinedibiguanide; oxalyldibiguanide; malonyldibiguanide; succinyldibiguanide; glutaryldibiguanide; adipyldibiguanide; pimelyldibiguanide; suberyldibiguanide; phthalyldibiguanide; paludrine; polyhexamethylene biguanide; 2-guanidinothiazole; 2-guartidinooxazole; 2-guanidinoimidazole; 3-guanidinopyrazole; 3-guanidino-1,2,4-triazole; 5-guanidinotetrazole; alexidine; buformin; and moroxydine.

N Valence Stabilizer #20: Examples of diamidinomethanes, bis(diamidinomethanes), and poly(diamidinomethanes) (N-N bidentates, N-N tridentates, N-N tetradentates, and N-N hexadentates) that meet the requirements for use as "wide band" valence stabilizers for $Co^{+3}$ include, but are not limited to: diamidinomethane; N-methyldiamidinomethane; N-ethyldiamidinomethane; N-isopropyldiamidinomethane; N-butyldiamidinomethane; N-benzyldiamidinomethane; N-phenyldiamidinomethane; N-tolyldiamidinomethane; N-naphthyldiamidinomethane; N-cyclohexyldiamidinomethane; N-norbomyldiamidinomethane; N-adamantyldiamidinomethane; dimethyldiamidinomethane; diethyldiamidinomethane; diisopropyldiamidinomethane; dibutyldiamidinomethane; dibenzyldiamidinomethane; diphenyldiamidinomethane; ditolyldiamidinomethane; dinaphthyldiamidinomethane; dicyclohexyldiamidinomethane; dinorbornyldiamidinomethane; diadamantyldiamidinomethane; ethylenebisdiamidinomethane; propylenebisdiamidinomethane;

tetramethylenebisdiamidinomethane; pentamethylenebisdiamidinomethane; hexamethylenebisdiamidinomethane; heptamethylenebisdiamidinomethane; octamethylenebisdiamidinomethane; phenylenebisdiamidinomethane; piperazinebisdiamidinomethane; oxalylbisdiamidinomethane; malonylbisdiamidinomethane; succinylbisdiamidinomethane; glutarylbisdiamidinomethane; phthalylbisdiamidinomethane; 2-amidinomethyithiazole; 2-amidinomethyloxazole; 2-amidinomethylimidazole; 3-amidinomethylpyrazole; 3-amidinomethyl-1,2,4-triazole; and 5-amidinomethyltetrazole.

N Valence Stabilizer #21: Examples of imidoylguanidines, amidinoguanidines, bis(imidoylguanidines), bis(amidinoguanidines), poly(imidoylguanidines), and poly(amidinoguanidines) (N-N bidentates, N-N tridentates, N-N tetradentates, and N-N hexadentates) that meet the requirements for use as "wide band" valence stabilizers for $Co^{+3}$ include, but are not limited to: acetimidoylguanidine; amidinoguanidine, benzimidoylguanidine; cyclohexylimidoylguanidine; pentafluorobenzimidoylgiianidine; 2-N-imidoylaminothiazole; 2-N-imidoylaminooxazole; 2-N-imidoylaminoimidazole; 3-N-imidoylaminopyrazole; 3-N-imidoylamino-1,2,4-triazole; and 5-N-imidoylaminotetrazole.

N Valence Stabilizer #22: Examples of diformamidine oxides (dicarbonimidic diamides), tricarbonimidic diamides, tetracarbommidic diamides, bis(diformamidine oxides), and poly(diformamidine oxides) (N-N bidentates, N-N tridentates, or N-N tetradentates) that meet the requirements for use as "wide band" valence stabilizers for $Co^{+3}$ include, but are not limited to: diformamidine oxide; methyldiformamidine oxide; ethyldiformamidine oxide; isopropyldiformamidine oxide; butyldiformamidine oxide; benzyldiformamidine oxide; phenyldiformamidine oxide; tolyldiformamidine oxide; naphthyldiformamidine oxide; cyclohexyldiformamidine oxide; norbornyldiformamidine oxide; adamantyldiformamidine oxide; dimethyldiformamidine oxide; diethyldiformamidine oxide; diisopropyldiformamidine oxide; dibutyldiformamidine oxide; dibenzyldiformamidine oxide; diphenyldiformamidine oxide; ditolyldiformamidine oxide; dinaphthyldiformamidine oxide; dicyclohexyldiformamidine oxide; dinorbomyldiformamidine oxide; diadamantyldiformamidine oxide; 2-O-amidinohydroxytbiazole; 2-O-amidinohydroxyoxazole; 2-O-amidinohydroxyimidazole; 3-O-amidinohydroxypyrazole; 3-O-amidinohydroxy-1,2,4-triazole; and 5-O-amidinohydroxytetrazole.

N Valence Stabilizer #23: Examples of diformamidine sulfides (thiodicarbonimidic diamides), thiotricarbonimidic diamides, thiotetracarbonimidic diamides, bis(diformamidine sulfides), and poly(diformamidine sulfides) (N-N bidentates, N-N tridentates, or N-N tetradentates) that meet the requirements for use as "wide band" valence stabilizers for $Co^{+3}$ include, but are not limited to: diformamidine sulfide; methyldiformamidine sulfide; ethyldiformamidine sulfide; isopropyldiformamidine sulfide; butyldiformamidine sulfide; benzyldiformamidine sulfide; phenyldiformamidine sulfide; tolyldiformamidine sulfide; naphthyldiformamidine sulfide; cyclohexyldiformamidine sulfide; norbornyldiformamidine sulfide; adamantyldiformamidine sulfide; dimethyldiformamidine sulfide; diethyldiformamidine sulfide; diisopropyldiformamidine sulfide; dibutyldiformamidine sulfide; dibenzyldiformamidine sulfide; diphenyldiformamidine sulfide; ditolyldiformamidine sulfide; dinaphthyldiformamidine sulfide; dicyclohexyldiformamidine sulfide; dinorbornyldiformamidine sulfide; diadamantyldiformamidine sulfide; phenyithiobisformamidine; 2-S-amidinomercaptothiazole; 2-S-amidinomercaptooxazole; 2-S-amidinomercaptoimidazole; 3-S-amidinomercaptopyrazole; 3-S-amidinomercapto-1,2,4-triazole; and 5-S-amidinomercaptotetrazole.

N Valence Stabilizer #24: Examples of imidodicarbonimidic acids, diimidodicarbonimidic acids, imidotricarbonimidic acids, imidotetracarbonimidic acids, and derivatives thereof (N-N Bidentates, N-N Tridentates, N-N Tetradentates, and N-N Hexadentates) that meet the requirements for use as "wide band" valence stabilizers for $Co^{+3}$ include, but are not limited to: imidodicarbonimidic acid, diimidodicarbonimidic acid, imidotricarbonimidic acid, imidotetracarbonimidic acid; O-methylimidodicarbonimidic acid; O-ethylimidodicarbonimidic acid; O-isopropylimidodicarbonimidic acid; O-phenylimidodicarbonimidic acid; O-benzylimidodicarbonimidic acid; O-cyclohexylimidodicarbonimidic acid; O-naphthylimidodicarbonimidic acid; O-norbornylimidodicarbonimidic acid; O-adamantylimidodicarbonimidic acid; O,O'-dimethylimidodicarbonimidic acid; O,O'-diethylimidodicarbonimidic acid; O,O'-diisopropylimidodicarbonimidic acid; O,O'-diphenylimidodicarbonimidic acid; O,O'-dibenzylimidodicarbonimidic acid; O,O'-dicyclohexylimidodicarbonimidic acid; O,O'-dinaphthylimidodicarbonimidic acid; O,O'-dinorbornylimidodicarbonimidic acid; and O,O'-diadamantylimidodicarbonimidic acid.

N Valence Stabilizer #25: Examples of thioimidodicarbonimidic acids, thiodiimidodicarbonimidic acids, thioimidotricarbonimidic acids, thioimidotetracarbonimidic acids, and derivatives thereof (N-N Bidentates, N-N Tridentates, N-N Tetradentates, and N-N Hexadentates) that meet the requirements for use as "wide band" valence stabilizers for $Co^{+3}$ include, but are not limited to: thioimidodicarbonimidic acid, thiodiimidodicarbonimidic acid, thioimidotricarbonimidic acid, thioimidotetracarbonimidic acid; O-methylthioimidodicarbonimidic acid; O-ethylthioimidodicarbonimidic acid; O-isopropylthioimidodicarbonimiclic acid; O-phenylthioimidodicarbonimidic acid; O-benzylthioimidodicarbonimidic acid; O-cyclohexylthioimidodicarbonimidic acid; O-naphthylthioimidodicarbonimidic acid; O-norbornylthioimidodicarbonimidic acid; O-adamantylthioimidodicarbonimidic acid; O,O'-dimethylthioimidodicarbonimidic acid; O,O'-diethylthioimidodicarbonimidic acid; O,O'-diisopropylthioimidodicarbonimidic acid; O,O'-diphenylthioimidodicarbonimidic acid; O,O'-dibenzylthioimidodicarbonimidic acid; O,O'-dicyclohexylthioimidodicarbonimidic acid; O,O'-dinaphthylthioimidodicarbonimidic acid; O,O'-dinorbomylthioimidodicarbonimidic acid; and O,O'-diadamantylthioimidodicarbonimidic acid.

N Valence Stabilizer #26: Examples of diimidoylimines, diimidoylhydrazides, bis(diimidoylimines), bis(diimidoylhydrazides), poly(diimidoylimines), and poly(diimidoylhydrazides) (N-N Tridentates and N-N Hexadentates) that meet the requirements for use as "wide band" valence stabilizers for $Co^{+3}$ include, but are not limited to: diacetimidoylimine; dibenzimidoylimine; and dicyclohexylimidoylimine.

N Valence Stabilizer #27: Examples of imidosulfamides, diimidosulfamides, bis(imidosulfamides), bis(diimidosulfamides), poly(imidosulfamides), and poly(diimidosulfamides) (N-N Bidentates, N-N Tridentates, N-N Tetradentates, and N-N Hexadentates) that meet the requirements for use as "wide band" valence stabilizers for $Co^{+3}$ include, but are not limited to: imidosulfamidic acid, diimidosulfamidic acid; O-phenylimidosulfamide; O-benzylimidosulfamide; N-phenylimidosulfamide; N-benzylimidosulfamide; O-phenyldiimidosulfamide; O-benzyldiimidosulfamide; N-phenyldiimidosulfamide; and N-benzyldiimidosulfamide.

N Valence Stabilizer #28: Examples of phosphoramidimidic triamides, bis(phosphoramidimidic triamides), and poly(phosphoramidimidic triamides) and derivatives thereof (N-N Bidentates, N-N 15 Tridentates, N-N Tetradentates, and N-N Hexadentates) that meet the requirements for use as "wide band" valence stabilizers for $Co^{+3}$ include, but are not limited to: phosphoramidimidic triamide; N-phenylphosphoramidimidic triamide; N-benzylphosphoramidimidic triamide; N-naphthylphosphoramidimidic triamide; N-cyclohexylphosphoramidimidic triamide; N-norbornyiphosphoramidimidic triamide; N,N'-diphenyiphosphoramidimidic triamide; N,N'-dibenzylphosphoramidimidic triamide; N,N'-dinaphthylphosphoramidimidic triamide; N,N'-dicyclohexyiphosphoramidimidic triamide; and N,N'-dinorbornyiphosphoramidimidic triamide.

N Valence Stabilizer #29: Examples of phosphoramidimidic acid, phosphorodiamidimidic acid, bis(phosphoramidimidic acid), bis(phosphorodiamidimidic acid), poly(phosphoramidimidic acid), poly(phosphorodiamidimidic acid), and derivatives thereof (N-N Bidentates, N-N Tridentates, N-N Tetradentates, and N-N Hexadentates) that meet the requirements for use as "wide band" valence stabilizers for $Co^{+3}$ include, but are not limited to: phosphoramidimidic acid, phosphorodiamidimidic acid, O-phenyiphosphoramidimidic acid; O-benzylphosphoramidimidic acid; O-naphthylphosphoramidimidic acid; O-cyclohexyiphosphoramidimidic acid; O-norbornyiphosphoramidimidic acid; O,O'-diphenylphosphoramidimidic acid; O,O'-dibenzylphosphoramidimidic acid; O,O'-dinaphthylphosphoramidimidic acid; O,O'-dicyclohexyiphosphoramidimidic acid; and O,O'-dinorbornyiphosphoramidimidic acid.

N Valence Stabilizer #30: Examples of phosphoramidimidodithioic acid, phosphorodiamidimidothioic acid, bis(phosphoramidimidodithioic acid), bis(phosphorodiamidimidothioic acid), poly(phosphoramidimidodithioic acid), poly(phosphorodiamidimidothioic acid), and derivatives thereof (N-N Bidentates, N-N Tridentates, N-N Tetradentates, and N-N Hexadentates) that meet the requirements for use as "wide band" valence stabilizers for $Co^{+3}$ include, but are not limited to: phosphoramidimidodithioic acid, phosphorodiamidimidothioic acid, S-phenylphosphoramidimidodithioic acid; S-benzylphosphoramidimidodithoic acid; S-naphthylphosphoramidimidodithioic acid; S-cyclohexylphosphoramidimidodithioic acid; S-norbomylphosphoramidimidodithioic acid; S,S'-diphenylphosphoramidimidodithioic acid; S,S'-dibenzylphosphoramidimidodithioic acid; S,S'-dinaphthylphosphoramidimidodithioic acid; S,S'-dicyclohexylphosphoramidimidodithioic acid; and S,S'-dinorbomylphosphoramidimidodithioic acid.

N Valence Stabilizer #31: Examples of azo compounds with amino, imino, oximo, diazeno, or hydrazido substitution at the ortho- (for aryl) or alpha- or beta- (for alkyl) positions, bis[o-($H_2N$-) or alpha- orbeta-($H_2N$-)azo compounds], or poly[o-($H_2N$-) or alpha- orbeta-($H_2N$-)azo compounds) (N-N Bidentates, N-N Tridentates, N-N Tetradentates, or N-N Hexadentates) that meet the requirements for use as "wide band" valence stabilizers for $Co^{+3}$ include, but are not limited to: o-aminoazobenzene; o,o'-diaminoazobenzene; (2-pyridine)azobenzene; 1-phenylazo-2-naphthylamine; pyridineazo-2-naphthol (PAN); pyridineazoresorcinol (PAR); o-hydroxy-o'-(beta-aminoethylamino)azobenzene; Benzopurpurin 4B; Congo Red; Fat Brown RR; benzopurpurin; Congo Red; Direct Red 75; Mordant Brown 48; Nitro Red; 2-imidazolylazobenzene; 2-benzimidazolylazobenzene; 3-pyrazolylazobenzene; 3-(1,2,4-triazolyl)azobenzene; 2-pyridylazobenzene; 2-pyrazinylazobenzene; and 2-pyrimidinylazobenzene.

N Valence Stabilizer #32: Examples of diazeneformimidamides (diazeneamidines), diazeneacetimidamides (diazene-alpha-amidinoalkanes(alkenes)), bis(diazeneformimidamides), bis(diazeneacetimidamides), poly(diazeneformimidamides), and poly(diazeneacetimidamides) (N-N Bidentates, N-N Tetradentates, and N-N Hexadentates) that meet the requirements for use as "wide band" valence stabilizers for $Co^{+3}$ include, but are not limited to: diazeneformimidamide (diazeneamidine); diazeneacetimidamide (diazene-alpha-amidinomethane); phenyldiazeneformimidamide; triphenyldiazeneformimidamide; phenyldiazeneacetimidamide; and triphenyldiazeneacetimidamide.

N Valence Stabilizer #33: Examples of diazeneformimidic acid, diazeneacetimidic acid, bis(diazeneformimidic acid), bis(diazeneacetimidic acid), poly(diazeneformimidic acid), poly(diazeneacetimidic acid), and derivatives thereof (N-N Bidentates, N-N Tetradentates, and N-N Hexadentates) that meet the requirements for use as "wide band" valence stabilizers for $Co^{+3}$ include, but are not limited to: diazeneformimidic acid, diazeneacetimidic acid, phenyldiazeneformimidic acid, diphenyldiazeneformimidic acid, phenyldiazeneacetimidic acid, and diphenyldiazeneacetimidic acid.

N Valence Stabilizer #34: Examples of diazeneformimidothioic acid, diazeneacetimidothioic acid, bis(diazeneforinimidothioic acid), bis(diazeneacetimidothioic acid), poly(diazeneformimidothioic acid), poly(diazeneacetimidothioic acid), and derivatives thereof (N-N Bidentates, N-N Tetradentates, and N-N Hexadentates) that meet the requirements for use as "wide band" valence stabilizers for $Co^{+3}$ include, but are not limited to: diazeneformimidothioic acid, diazeneacetimidothioic acid, phenyldiazeneformimidothioic acid, diphenyldiazeneformimidothioic acid, phenyldiazeneacetimidothioic acid, and diphenyldiazeneacetimidothioic acid.

N Valence Stabilizer 190 35: Examples of imidoyldiazenes, bis(imidoyldiazenes), and poly(imidoyldiazenes), (N-N Tridentates and N-N Hexadentates) that meet the requirements for use as "wide band" valence stabilizers for $Co^{+3}$ include, but are not limited to: acetimidoyldiazene; benzimidoyldiazene; and cyclohexylimidoyldiazene.

N Valence Stabilizer #36: Examples of diazenediformimidamides (1,2-diazenediamidines), diazenediacetimidamides (1,2-diazene-di-alpha-amidinoalkanes(alkenes)), bis(diazenediformimidamides), bis(diazenediacetimidamides), poly(diazenediformimidamides), and poly(diazenediacetimidamides) (N-N Tridentates and N-N Hexadentates) that meet the requirements for use as "wide band" valence stabilizers for $Co^{+3}$ include, but are not limited to: diazenediformimidamide (1,2-diazenediamidine), diazenediacetimidamide (1,2-diazene-di-alpha-amidinomethane); diphenyldiazenediforinimidamide; tetraphenyldiazenediformimidamide; diphenyldiazenediacetimidamide; and tetraphenyldiazenediacetimidamide.

N Valence Stabilizer #37: Examples of diazenediformimidic acid, diazenediacetimidic acid, bis(diazenediformimidic acid), bis(diazenediacetimidic acid), poly(diazenediformimidic acid), and poly(diazenediacetimidic acid), and derivatives thereof (N-N Tridentates and N-N Hexadentates) that meet the requirements for use as "wide band" valence stabilizers for $Co^{+3}$ include, but are not limited to: diazenediformimidic acid, diazenediacetimidic acid, diphenyldiazenediformimidic acid, and diphenyldiazenediacetimidic acid.

N Valence Stabilizer #38: Examples of diazenediformimidothioic acid, diazenediacetimidothioic acid, bis(diazenediformimidothioic acid), bis(diazenediacetimidothioic acid), poly(diazenediformimidothioic acid), and poly(diazenediacetimidothioic acid), and derivatives thereof (N-N Tridentates and N-N Hexadentates) that meet the requirements for use as "wide band" valence stabilizers for $Co^{+3}$ include, but are not limited to: diazenediformimidothioic acid, diazenediacetimidothioic acid, diphenyldiazenediformimidothioic acid, and diphenyldiazenediacetimidothioic acid.

N Valence Stabilizer #39: Examples of diimidoyldiazenes, bis(diimidoyldiazenes), and poly(diimidoyldiazenes), (N-N Tridentates and N-N Hexadentates) that meet the requirements for use as "wide band" valence stabilizers for $Co^{+3}$ include, but are not limited to: diacetimidoyldiazene; dibenzimidoyldiazene; and dicyclohexylimidoyldiazene.

N Valence Stabilizer #40: Examples of ortho-amino (or -hydrazido) substituted formazans, bis(o-amino or -hydrazido substituted formazans), and poly(o-amino or -hydrazido substituted formazans) (N-N Bidentates, N-N Tridentates, N-N Tetradentates, and N-N Hexadentates) that meet the requirements for use as "wide band" valence stabilizers for $Co^{+3}$ include, but are not limited to: 1-(2-aminophenyl)-3,5-diphenylformazan; and 1,5-bis(2-aminophenyl)-3-phenylformazan.

N Valence Stabilizer #41: Examples of ortho-amino (or-hydrazido) substituted azines (including ketazines), bis(o-amino or hydrazido substituted azines), and poly(o-amino or hydrazido substituted azines) (N-N Bidentates, N-N Tridentates, N-N Tetradentates, and N-N Hexadentates) that meet the requirements for use as "wide band" valence stabilizers for $Co^{+3}$ include, but are not limited to: 2-amino-1-benzalazine; 2-amino-1-naphthalazine; and 2-amino-1-cyclohexanonazine.

N Valence Stabilizer #42: Examples of Schiff Bases with one Imine (C=N) Group and with ortho- or alpha- or beta-amino or imino or oximo or diazeno or hydrazido substitution (N-N Bidentates, N-N Tridentates, N-N Tetradentates, N-N Pentadentates, or N-N Hexadentates) that meet the requirements for use as "wide band" valence stabilizers for $Co^{+3}$ include, but are not limited to: N-(2-Aminobenzaldehydo)isopropylamine; N-(2-Pyridinecarboxaldehydo)isopropylamine; N-(2-Pyrrolecarboxaldehydo)isopropylamine; N-(2-Acetylpyridino)isopropylamine; N-(2-Acetylpyrrolo)isopropyiamine; N-(2-Aminoacetophenono)isopropyiamine; N-(2-Aminobenzaidehydo)cyclohexylamine; N-(2-Pyridinecarboxaidehydo)cyclohexyiamine; N-(2-Pyrrolecarboxaldehydo)cyclohexylamine; N-(2-Acetylpyridino)cyclohexylamine; N-(2-Acetylpyrroio)cyciohexylamine; N-(2-Aminoacetophenono)cyclohexylamine; N-(2-Aminobenzaldehydo)aniline; N-(2-Pyridinecarboxaldehydo)aniiine; N-(2-Pyrroiecarboxaidehydo)aniline; N-(2-Acetylpyridino)aniline; N-(2-Acetylpyrrolo)aniline; N-(2-Aminoacetophenono)aniline; N-(2-Aminobenzaldehydo)aminonorbornane; N-(2-Pyridinecarboxaldehydo)aminonorbornane; N-(2-Pyrrolecarboxaldehydo)aminonorbornane; N-(2-Acetylpyridino)aminonorbornane; N-(2-Acetylpyrrolo)aminonorbornane; N-(2-Aminoacetophenono)aminonorbornane; 2-pyrroiecarboxaldehyde phenyihydrazone; 2-pyrrolecarboxaldehyde 2-pyridyl hydrazone; 2-aminobenzaldehyde phenyihydrazone (nitrin); and 2-aminobenzaldehyde 2-pyridyl hydrazone. Also includes hydrazones with ortho-N substitution.

N Valence Stabilizer #43: Examples of Schiff Bases with two Imine (C=N) Groups and without ortho- (for aryl constituents) or alpha- or beta- (for aikyl constituents) hydroxy, carboxy, carbonyl, thiol, mercapto, thiocarbonyl, amino, imino, oximo, diazeno, or hydrazido substitution (N-N Bidentates) that meet the requirements for use as "wide band" valence stabilizers for $Co^{+3}$ include, but are not limited to: N,N'-(Glyoxalo)diisopropyiamine; N,N'-(Glyoxalo)dicyclohexylamine; N,N'-(Glyoxalo)dianiline; N,N'-(Giyoxalo)di-aminonorbornane; N,N'-(Maiondialdehydo)diisopropyiamine; N,N'-(Malondiaidehydo)dicyciohexylamine; N,N'-(Malondialdehydo)dianiline; N,N'-(Maiondialdehydo)di-aminonorbornane; N,N'-(Phthalicdialdehydo)diisopropylamine; N,N'-(Phthalicdialdehydo)dicyclohexyiamine; N,N'-(Phthalicdialdehydo)dianiline; N,N'-(Phthalicdialdehydo)di-aminonorbornane; N,N'-(Formylcamphoro)diisopropylamine; N,N'-(Formyicamphoro)dicyclohexylamine; N,N'-(Formyicamphoro)dianiiine; N,N'-(Formylcamphoro)di-aminonorbornane; N,N'-(Acetyiacetonato)diisopropylamine; N,N'-(Acetylacetonato)dicyclohexylamine; N,N'-(Acetylacetonato)dianiline; N,N'-(Acetyiacetonato)di-aminonorbornane; N,N'-(Diacetyibenzeno)diisopropyiamine; N,N'-(Diacetylbenzeno)dicyclohexylamine; N,N'-(Diacetylbenzeno)dianiline; N,N'-(Diacetylbenzeno)di-aminonorbornane; N,N'-(1,2-Cyclohexanono)diisopropylamine; N,N'-(1,2-Cyciohexanono)dicyclohexyiamine; N,N'-(1,2-Cyclohexanono)dianiline; N,N'-(1,2-Cyclohexanono)di-aminonorbornane; N,N'-(Camphorquinono)diisopropylamine; N,N'-(Camphorquinono)dicyclohexyl amine; N,N'-(Camphorquinono)dianiline; N,N'-(Camphorquinono)di-aminonorbornane; N,N'-(Benzaldehydo)ethylenediamine; N,N'-(Naphthaldehydo)ethylenediamine; N,N'-(Acetophenono)ethylenediamine; N,N'-(Benzaldehydo)trimethylenediamine; N,N'-(Naphthaldehydo)trimethylenediamine; N,N'-(Acetophenono)trimethylenediamine; ; N,N'-(Benzaldehydo)cyclohexane-1,2-diamine; N,N'-(Naphthaldehydo)cyclohexane-1,2-diamine; N,N'-(Acetophenono)cyclohexane-1,2-diamine; N,N'-(Benzaldehydo)-1,2-diaminobenzene; N,N'-(Naphthaldehydo)-1,2-diaminobenzene; N,N'-(Acetophenono)-1,2-diaminobenzene; N,N'-(Acetylacetonato)ethylenediamine; N,N'-(Acetylacetonato)-1,2-cyclohexylenediamine; N,N'-(Acetylacetonato)-1,2-propylenediamine; N,N'-(Glyoxalo)-o-phenylenediamine; and N,N'-(Glyoxalo)ethylenediamine. Also includes dihydrazones.

N Valence Stabilizer #44: Examples of Schiff Bases with two Imine (C=N) Groups and with ortho- or alpha- or beta-amino or imino or oximo or diazeno or hydrazido substitution (N-N Bidentates, N-N Tridentates, N-N Tetradentates, N-N Pentadentates, or N-N Hexadentates) that meet the requirements for use as "wide band" valence stabilizers for $Co^{+3}$ include, but are not limited to: N,N'-(2,6-Pyridinedicarboxaldehydo)diisopropylamine; N,N'-(2,6-Pyridinedicarboxaldehydo)dicyclohexylamine; N,N'-(2,6-Pyridinedicarboxaldehydo)dianiline; N,N'-(2,6-Pyridinedicarboxaldehydo)di-aminonorbornane; N,N'-(2,5-Pyrroledicarboxaldehydo)diisopropylamine; N,N'-(2,5-Pyrroledicarboxaldehydo)dicyclohexylamine; N,N'-(2,5-Pyrroledicarboxaldehydo)dianiline; N,N'-(2,5-Pyrroledicarboxaldehydo)di-aminonorbornane; N,N'-(o-Aminophthalicdialdehydo)diisopropylamine; N,N'-(o-Aminophthalicdialdehydo)dicyclohexylamine N,N'-(o-Aminophthalicdialdehydo)dianiline; N,N'-(o-Aminophthalicdialdehydo)di-aminonorbornane; N,N'-(o-Aminoformylcamphoro)diisopropylamine N,N'-(o-Aminoformylcamphoro)dicyclohexylamine; N,N'-(o-Aminoformylcamphoro)dianiline; N,N'-(o-Aminoformylcamphoro)di-aminonorbornane; N,N'-(2,6-Diacetylpyridino)diisopropylamine; N,N'-(2,6-Diacetylpyridino)dicyclohexylamine; N,N'-(2,6-Diacetylpyridino)dianiline; N,N'-(2,6-Diacetylpyridino)di-aminonorbornane; N,N'-(o-Aminodiacetylbenzeno)diisopropylamine; N,N'-(o-Aminodiacetylbenzeno)dicyclohexylamine; N,N'-(o-Aminodiacetylbenzeno)dianiline; N,N'-(o-Aminodiacetylbenzeno)di-aminonorbomane; N,N'-(3,6-Diamino-1,2-cyclohexanono)diisopropylamine; N,N'-(3,6-Diamino-1,2-cyclohexanono)dicyclohexylamine; N,N'-(3,6-Diamino-1,2-cyclohexanono)dianiline; N,N'-(3,6-Diamino-1,2-cyclohexanono)di-aminonorbornane; N,N'-(2,5-Diacetylpyrrolo)diisopropylamine; N,N'-(2,5-Diacetylpyrrolo)dicyclohexylamine; N,N'-(2,5-Diacetylpyrrolo)dianiline; N,N'-(2,5-Diacetylpyrrolo)di-aminonorbornane; N,N'-(o-Aminobenzaldehydo)ethylenediamine; N,N'-(o-Aminonaphthaldehydo)ethylenediamine; N,N'-(o-Aminoacetophenono)ethylenediamine; N,N'-(o-Aminobenzaldehydo)trimethylenediamine; N,N'-(o-Aminonaphthaldehydo)trimethylenediamine; N,N'-(o-Aminoacetophenono)trimethylenediamine; N,N'-(o-Aminobenzaldehydo)cyclohexane-1,2-diamine; N,N'-(o-Aminonaphthaldehydo)cyclohexane-1,2-diamine; N,N'-(o-Aminoacetophenono)cyclohexane 1,2-diamine; N,N'-(o-Aminobenzaldehydo)-1,2-diaminobenzene; N,N'-(o-Aminonaphthaldehydo)-1,2-diaminobenzene; and N,N'-(o-Aminoacetophenono)- 1,2-diaminobenzene. Also includes hydrazones with ortho-N substitution.

N Valence Stabilizer #45: Examples of Schiff Bases with three Imine (C═N) Groups and without ortho- (for aryl constituents) or alpha- or beta- (for alkyl constituents) hydroxy, carboxy, carbonyl, thiol, mercapto, thiocarbonyl, amino, imino, oximo, diazeno, or hydrazido substitution (N-N Tridentates) that meet the requirements for use as "wide band" valence stabilizers for $Co^{+3}$ include, but are not limited to: N,N',N'''-(Benzaldehydo)tris(2-aminoethyl)amine; N,N',N'''-(Naphthaldehydo)tris(2-aminoethyl)amine; and N,N',N'''-(Acetophenono)tris(2-aminoethyl)amine. Also includes trihydrazones.

N Valence Stabilizer #46: Examples of Schiff Bases with three Imine (C═N) Groups and with ortho- or alpha- or beta-amino or imino or oximo or diazeno or hydrazido substitution (N-N Tridentates, N-N Tetradentates, N-N Pentadentates, or N-N Hexadentates) that meet the requirements for use as "wide band" valence stabilizers for $Co^{+3}$ include, but are not limited to: N,N',N'''-(o-Aminobenzaldehydo)tris(2-aminoethyl)amine; N,N',N'''-Aminonaphthaldehydo)tris(2-aminoethyl)amine; and N,N',N'''-(o-Aminoacetophenono)tris(2-aminoethyl)amine.

S Valence Stabilizer #1: Examples of macrocyclic, macrobicyclic, and macropolycyclic oligothioketones (including catapinands, cryptands, cyclidenes, and sepulchrates) wherein all binding sites are composed of thioketones (especially in the beta position) (S-S Bidentates, S-S Tetradentates, and S-S Hexadentates) that meet the requirements for use as "wide band" valence stabilizers for $Co^{+3}$ include, but are not limited to: hexathioketocyclotetracosane ([24]ane(═S)$_6$); hexathioketocycloheneicosane ([21]ane(═S)$_6$); hexathioketocyclooctadecane ([18]ane(═S)$_6$); hexathioketocyclopentadecane ([15]ane(═S)$_6$); tetrathioketocycloeicosane ([20]ane(═S)$_4$); tetrathioketocyclooctadecane ([18]ane(═S)$_4$); tetrathioketocyclohexadecane ([16]ane(═S)$_4$); tetrathioketocyclotetradecane ([14]ane(═S)$_4$); tetrathioketocyclododecane ([12]ane(═S)$_4$); dithioketocyclohexadecane ([16]ane(═S)$_2$); dithioketocyclotetraadecane ([14]ane(═S)$_2$); dithioketocyclododecane ([12]ane(═S)$_2$); dithioketocyclodecane ([10]ane(═S)$_2$); and dithioketocyclooctane ([8]ane(═S)$_2$).

S Valence Stabilizer #2: Examples ofmacrocyclic, macrobicyclic, and macropolycyclic dithiolenes (including catapinands, cryptands, cyclidenes, and sepulchrates) wherein all binding sites are composed of alpha-, alpha-dithiolenes (meaning two thiol groups on a single carbon atom in the ring) (S-S Bidentates, S-S Tetradentates, and S-S Hexadentates) that meet the requirements for use as "wide band" valence stabilizers for $Co^{+3}$ include, but are not limited to: hexathiolocyclotetracosane ([24]ane(—SH)$_6$); hexathiolocycloheneicosane ([21]ane(—SH)$_6$); hexathiolocyclooctadecane ([18]ane(—SH)$_6$); hexathiolocyclopentadecane ([15]ane(—SH)$_6$); tetrathiolocycloeicosane ([20]ane(—SH)$_4$); tetrathiolocyclooctadecane ([18]ane(—SH)$_4$); tetrathiolocyclohexadecane ([16]ane(—SH)$_4$); tetrathiolocyclotetradecane ([14]ane(—SH)$_4$); tetrathiolocyclododecane ([12]ane(—SH)$_4$); dithiolocyclohexadecane ([16]ane(—SH)$_2$); dithiolocyclotetraadecane ([14]ane(—SH)$_2$); dithiolocyclododecane ([12]ane(—SH)$_2$); dithiolocyclodecane ([10]ane(—SH)$_2$); and dithiolocyclooctane ([8]ane(—SH)$_2$).

S Valence Stabilizer #3: Examples of dithioimidodialdehydes, dithiohydrazidodialdehydes (thioacyl thiohydrazides), bis(dithioimidodialdehydes), bis(dithiohydrazidodialdehydes), poly(dithioimidodialdehydes), and poly(dithiohydrazidodialdehydes) (S-S Bidentates, S-S Tridentates, S-S Tetradentates) that meet the requirements for use as "wide band" valence stabilizers for $Co^{+3}$ include, but are not limited to: dithiodiacetamide, dithiodipropanamide, dithiodibutanamide, dithiodibenzamide, and dithiodicyclohexamide.

S Valence Stabilizer #4: Examples of dithioimidodicarbonic acids, dithiohydrazidodicarbonic acids, bis(dithioimidodicarbonic acids), bis(dithiohydrazidodicarbonic acids), poly(dithioimidodicarbonic acids), poly(dithiohydrazidodicarbonic acids) and derivatives thereof (S-S Bidentates, S-S Tridentates, S-S Tetradentates) that meet the requirements for use as "wide band" valence stabilizers for $Co^{+3}$ include, but are not limited to: dithioimidodicarbonic acid, dithiohydrazidodicarbonic acid, O-phenyldithioimidodicarbonic acid, O-benzyldithioimidodicarbonic acid, O-cyclohexyldithioimidodicarbonic acid, O-norbomyldithioimidodicarbonic acid, O,O'-diphenyldithioimidodicarbonic acid, O,O'-dibenzyldithioimidodicarbonic acid, O,O'-dicyclohexyldithioimidodicarbonic acid, and O,O'-norbornyldithioimidodicarbonic acid.

S Valence Stabilizer #5: Examples of 1,3-dithioketones (dithio-beta-ketonates), 1,3,5-trithioketones, bis(1,3-dithioketones), and poly(1,3-dithioketones) (S-S Bidentates, S-S Tridentates, S-S Tetradentates) that meet the requirements for use as "wide band" valence stabilizers for $Co^{+3}$ include, but are not limited to: hexafluoropentanedithione; 1,3-diphenyl-1,3-propanedithione; thiobenzoylthiopinacolone; dithiocyclohexoylmethane; diphenylpentanetrithionate; tetramethylnonanetrithionate; hexafluoroheptanetrithionate; trifluoroheptanetrithionate; 1-(2-thienyl)-1,3- butanedithione, 1-(2-naphthyl)-1,3-butanedithione, trifluorothioacetylthiocamphor; and 1,3-indandithione.

S Valence Stabilizer #6: Examples of 1,2-dithioketones (dithiolenes, dithio-alpha-ketonates), 1,2,3-trithioketones, dithiotropolonates, o-dithioquinones, bis(1,2-dithioketones), and poly(1,2-dithioketones) (S-S Bidentates, S-S Tridentates, S-S Tetradentates) that meet the requirements for use as "wide band" valence stabilizers for $Co^{+3}$ include, but are not limited to: dithiotropolone; 1,2-dithiobenzoquinone (o-dithioquinone)(o-benzenedithiolate)(bdt); di-tert-butyl-1,2-dithiobenzoquinone; hexafluoro-1,2-dithiobenzoquinone; 1,2-dithionaphthoquinone; 9,10-dithiophenanthroquinone; ethylenedithiolene (edt); maleonitriledithiolene (mnt); trifluoromethyldithiolene (tfd); carbomethoxydithiolene (cmt); trithionedithiolene (dmit); toluenedithiolate (tdt); dithiomanaldehyde (propenethionethiolate)(ptt); dithioacetylacetonate (SacSac); dijulolidinedithiolene; 2,3-piperazinedithiolate; di(4-aminophenyl)dithiolene; dimercaptoisotrithione (dmit); (4-octylphenyl)dithiolene; benzenetetrathiol; tetrathiosquaric acid; trithiodeltic acid; pentathiocroconic acid; dithiocroconic acid; hexathiorhodizonic acid; dithiorhodizonic acid; ethylenetetrathiol; trans-butadienetetrathiolate; tetrathiooxalic acid; 1,2-indanditbione; naphthothioquinone; acenapthenethioquinone; aceanthrenethioquinone; and indole-2,3-dithione (thioisatin).

S Valence Stabilizer #7: Examples of dithiomalonamides (dithiomalonodiamides), bis(dithiomalonamides), and polydithiomalonamides (S-S Bidentates, S-S Tridentates, S-S Tetradentates) that meet the requirements for use as "wide band" valence stabilizers for $Co^{+3}$ include, but are not limited to: dithiomalonamide, N-phenyldithiomalonamide, N-benzyldithiomalonamide, N-pentafluorophenyldithiomalonamide, N-cyclohexyldithiomalonamide, N-norbomyldithiomalonamide, N,N'-diphenyldithiomalonamide, N,N'-dibenzyldithiomalonamide, N,N'-dipentafluorophenyldithiomalonamide, N,N'-dicyclohexyldithiomalonamide, and N,N'-norbornyldithiomalonamide.

S Valence Stabilizer #8: Examples of 2-thioacylthioacetamides, bis(2-thioacylthioacetamides), and poly(2-thioacylthioacetamides) (S-S Bidentates, S-S Tridentates, S-S Tetradentates) that meet the requirements for use as "wide band" valence stabilizers for $Co^{+3}$ include, but are not limited to: 2-thioacetothioacetamide, N-phenyl-2-thioacetothioacetamide, N-pentafluorophenyl-2-thioacetothioacetamide, N-benzyl-2-thioacetothioacetamide, N-cyclohexyl-2-thioacetothioacetamide, N-norbornyl-2-thioacetothioacetamide, N-phenyl-2-thiobenzothioacetamide, N-pentafluorophenyl-2-pentafluorothiobenzothioacetamide, and N-cyclohexyl-2-thiocyclohexothioacetamide.

S Valence Stabilizer #9: Examples of dithioacyl sulfides, bis(dithioacyl sulfides), and poly(dithioacyl sulfides), (S-S Bidentates, S-S Tridentates, S-S Tetradentates) that meet the requirements for use as "wide band" valence stabilizers for $Co^{+3}$ include, but are not limited to: dithioacetyl sulfide; dithiopropanoyl sulfide; dithiobenzoyl sulfide; and dithiopentafluorobenzoyl sulfide.

S Valence Stabilizer #10: Examples of trithiodicarbonic diamides, bis(trithiodicarbonic diamides), and poly(trithiodicarbonic diamides) (S-S Bidentates, S-S Tridentates, S-S Tetradentates) that meet the requirements for use as "wide band" valence stabilizers for $Co^{+3}$ include, but are not limited to: trithiodicarbonic diamide; N-phenyltrithiodicarbonic diamide; N-pentafluorophenyltrithiodicarbonic diamide; N-benzyltrithiodicarbonic diamide; N-cyclohexyltrithiodicarbonic diamide; N-norbornyltrithiodicarbonic diamide; N,N'diphenyltrithiodicarbonic diamide; N,N'-dipentafluorophenyltrithiodicarbonic diamide; N,N'-dibenzyltrithiodicarbonic diamide; N,N'-dicyclohexyltrithiodicarbonic diamide; and N,N'-dinorbomyltrithiodicarbonic diamide.

S Valence Stabilizer #11: Examples of pentathio-, tetrathio-, or trithiodicarbonic acids, bis(pentathio-, tetrathio-, or trithiodicarbonic acids), poly(pentathio-, tetrathio-, or trithiodicarbonic acids), and derivatives thereof (S-S Bidentates, S-S Tridentates, S-S Tetradentates) that meet the requirements for use as "wide band" valence stabilizers for $Co^{+3}$ include, but are not limited to: pentathiodicarbonic acid, tetrathiodicarbonic acid, trithiodicarbonic acid, O-phenyltrithiodicarbonic acid, O-benzyltrithiodicarbonic acid, O-cyclohexyltrithiodicarbonic acid, O-norbornyltrithiodicarbonic acid, O,O'-diphenyltrithiodicarbonic acid, O,O'-dibenzyltrithiodicarbonic acid, O,O'-dicyclohexyltrithiodicarbonic acid, and O,O'-dinorbornyltrithiodicarbonic acid.

S Valence Stabilizer #12: Examples of dithiohypophosphoric acids, bis(dithiohypophosphoric acids), poly(dithiohypophosphoric acids), and derivatives thereof (S-S Bidentates, S-S Tridentates, S-S Tetradentates) that meet the requirements for use as "wide band" valence stabilizers for $Co^{+3}$ include, but are not limited to: dithiohypophosphoric acid, methyldithiohypophosphoric acid, isopropyldithiohypophosphoric acid, tert-butyldithiohypophosphoric acid, phenyldithiohypophosphoric acid, pentafluorophenyldithiohypophosphoric acid, benzyldithiohypophosphoric acid, cyclohexyldithiohypophosphoric acid, norbornyldithiohypophosphoric acid, dimethyldithiohypophosphoric acid, diisopropyldiothiohypophosphoric acid, di-tert-butyldithiohypophosphoric acid, diphenyldithiohypophosphoric acid, di-pentafluorophenyldithiohypophosphoric acid, dibenzyldithiohypophosphoric acid, di cyclohexyldithiohypophosphoric acid, and dinorbomyldithiohypophosphoric acid.

S Valence Stabilizer #13: Examples of dithiohypophosphoramides, bis(dithiohypophosphoramides), and poly(dithiohypophosphoramides) (S-S Bidentates, S-S Tridentates, S-S Tetradentates) that meet the requirements for use as "wide band" valence stabilizers for $Co^{+3}$ include, but are not limited to: dithiohypophosphoramide, N-methyldithiohypophosphoramide, N-isopropyldithiohypophosphoramide, N-tert-butyldithiohypophosphoramide, N-phenyldithiohypophosphoramide, N-pentafluorophenyldithiohypophosphoramide, N-benzyldithiohypophosphoramide, N-cyclohexyldithiohypophosphoramide, N-norbornyldithiohypophosphoramide, N,N'''-dimethyldithiohypophosphoramide, N,N'''-diisopropyldithiohypophosphoramide, N,N'''-di-tert-butyldithiohypophosphoramide, N,N'''-diphenyldithiohypophosphoramide, N,N'''-dipentafluorophenyldithiohypophosphommide, N,N'''-dibenzyldithiohypophosphoramide, N,N'''-dicyclohexyldithiohypophosphoramide, and N,N'''-dinorbornyldithiohypophosphoramide.

S Valence Stabilizer #14: Examples of dithioimidodiphosphoric acids, dithiohydrazidodiphosphoric acids, bis(dithioimidodiphosphoric acids), bis(dithiohydrazidodiphosphoric acids), poly(dithioimidodiphosphoric acids), poly(dithiohydrazidodiphosphoric acids), and derivatives thereof (S-S Bidentates, S-S Tridentates, S-S Tetradentates) that meet the requirements for use as "wide band" valence stabilizers for $Co^{+3}$ include, but are not limited to: dithioimidodiphosphoric acid, methyldithioimidodiphosphoric acid, isopropyldithioimidodiphosphoric acid, tert-butyldithioimidodiphosphoric acid, phenyldithioimidodiphosphoric acid, pentafluorophenyldithioimidodiphosphoric acid, benzyldithioimidodiphosphoric acid, cyclohexyldithioimidodiphosphoric acid, norbornyldithioimidodiphosphoric acid, dimethyldithioimidodiphosphoric acid, diisopropyldiothioimidodiphosphoric acid, di-tert-butyldithioimidodiphosphoric acid, diphenyldithioimidodiphosphoric acid, di-pentafluorophenyldithioimidodiphosphoric acid, dibenzyldithioimidodiphosphoric acid, dicyclohexyldithioimidodiphosphoric acid, and dinorbornyldithioimidodiphosphoric acid.

S Valence Stabilizer #15: Examples of dithioimidodiphosphoramides, dithiohydrazidodiphosphoramides, bis(dithioimidodiphosphoramides), bis(dithiohydrazidodiphosphoramides), poly(dithioimidodiphosphoramides), and poly(dithiohydrazidodiphosphoramides) (S-S Bidentates, S-S Tridentates, S-S Tetradentates) that meet the requirements for use as "wide band" valence stabilizers for $Co^{+3}$ include, but are not limited to: dithioimidodiphosphoramide, N-methyldithioimidodiphosphoramide, N-isopropyldithioimidodiphosphoramide, N-tert-butyldithioimidodiphosphoramide, N-phenyldithioimidodiphosphoramide, N-pentafluorophenyldithioimidodiphosphoramide, N-benzyldithioimidodiphosphoramide, N-cyclohexyldithioimidodiphosphoramide, N-norbornyldithioimidodiphosphoramide, N,N'''-dimethyldithioimidodiphosphoramide, N,N'''-diisopropyldithioimidodiphosphoramide, N,N'''-di-tert-butyldithioimidodiphosphoramide, N,N'''-diphenyldithioimidodiphosphoramide, N,N'''-dipentafluorophenyldithioimidodiphosphoramide, N,N'''-dibenzyldithioimidodiphosphoramide, N,N'''-dicyclohexyldithioimidodiphosphoramide, and N,N'''-dinorbornyldithioimidodiphosphoramide.

S Valence Stabilizer #16: Examples of dithiodiphosphoramides, bis(dithiodiphosphoramides), and poly(dithiodiphosphoramides) (S-S Bidentates, S-S Tridentates, S-S Tetradentates) that meet the requirements for use as "wide band" valence stabilizers for $Co^{+3}$ include, but are not limited to: dithiodiphosphoramide, N-methyldithiodiphosphoramide, N-isopropyldithiodiphosphoramide, N-tert-butyldithiodiphosphoramide, N-phenyldithiodiphosphoramide, N-pentafluorophenyldithiodiphosphoramide, N-benzyldithiodiphosphoramide, N-cyclohexyldithiodiphosphoramide, N-norbornyldithiodiphosphoramide, N,N'''-dimethyldithiodiphosphoramide, N,N'''-diisopropyldithiodiphosphoramide, N,N'''-di-tert-butyldithiodiphosphoramide, N,N'''-diphenyldithiodiphosphoramide, N,N'''-dipentafluorophenyldithiodiphosphoramide, N,N'''-dibenzyldithiodiphosphoramide, N,N'''-dicyclohexyldithiodiphosphoramide, and N,N'''-dinorbornyldithiodiphosphoramide.

S Valence Stabilizer #17: Examples of dithiodiphosphoric acids, bis(dithiodiphosphoric acids), poly(dithiodiphosphoric acids), and derivatives thereof (S-S Bidentates, S-S Tridentates, S-S Tetradentates) that meet the requirements for use as "wide band" valence stabilizers for $Co^{+3}$ include, but are not limited to: dithiodiphosphoric acid, methyldithiodiphosphoric acid, isopropyldithiodiphosphoric acid, tert-butyldithiodiphosphoric acid, phenyldithiodiphosphoric acid, pentafluorophenyldithiodiphosphoric acid, benzyldithiodiphosphoric acid, cyclohexyldithiodiphosphoric acid, norbornyldithiodiphosphoric acid, dimethyldithiodiphosphoric acid, diisopropyldiothiodiphosphoric acid, di-tert-butyldithiodiphosphoric acid, diphenyldithiodiphosphoric acid, di-pentafluorophenyldithiodiphosphoric acid, dibenzyldithiodiphosphoric acid, dicyclohexyldithiodiphosphoric acid, and dinorbornyldithiodiphosphoric acid.

S Valence Stabilizer #18: Examples of trithiophosphoric acids (phosphorotrithioic acids), bis(trithiophosphoric acids), poly(trithiophosphoric acids), and derivatives thereof (S-S Bidentates, S-S Tridentates, S-S Tetradentates) that meet the requirements for use as "wide band" valence stabilizers for $Co^{+3}$ include, but are not limited to: trithiophosphoric acid, O-phenyltrithiophosphoric acid, O-benzyltrithiophosphoric acid, O-cyclohexyltrithiophosphoric acid, O-norbornyltrithiophosphoric acid, O,S-diphenyltrithiophosphoric acid, O,S-dibenzyltrithiophosphoric acid, O,S-dicyclohexyltrithiophosphoric acid, and O,S-dinorbornyltrithiophosphoric acid.

S Valence Stabilizer #19: Examples of dithiophosphoric acids (phosphorodithioic acids), bis(dithiophosphoric acids), poly(dithiophosphoric acids), and derivatives thereof (S-S Bidentates, S-S Tridentates, S-S Tetradentates) that meet the requirements for use as "wide band" valence stabilizers for $Co^{+3}$ include, but are not limited to: dithiophosphoric acid, O-phenyldithiophosphoric acid, O-benzyldithiophosphoric acid, O-cyclohexyldithiophosphoric acid, O-norbornyldithiophosphoric acid, O,O-diphenyldithiophosphoric acid, O,O-dibenzyldithiophosphoric acid, O,O-dicyclohexyldithiophosphoric acid, and O,O-dinorbornyldithiophosphoric acid.

S Valence Stabilizer #20: Examples of tetrathiophosphoric acids (phosphorotetrathioic acids), bis(tetrathiophosphoric acids), poly(tetrathiophosphoric acids), and derivatives thereof (S-S Bidentates, S-S Tridentates, S-S Tetradentates) that meet the requirements for use as "wide band" valence stabilizers for $Co^{+3}$ include, but are not limited to: tetrathiophosphoric acid, S-phenyltetrathiophosphoric acid, S-benzyltetrathiophosphoric acid, S-cyclohexyltetrathiophosphoric acid, S-norbornyltetrathiophosphoric acid, S,S-diphenyltetrathiophosphoric acid, S,S-dibenzyltetrathiophosphoric acid, S,S-dicyclohexyltetrathiophosphoric acid, and S,S-dinorbornyltetrathiophosphoric acid.

S Valence Stabilizer #21: Examples of phosphoro(dithioperoxo)dithioic acids, bis[phosphoro(dithioperoxo)dithioic acids], poly[phosphoro(dithioperoxo)dithioic acids], and derivatives thereof (S-S Bidentates, S-S Tridentates, S-S Tetradentates) that meet the requirements for use as "wide band" valence stabilizers for $Co^{+3}$ include, but are not limited to: phosphoro(dithioperoxo)dithioic acid, O-phenylphosphoro(dithioperoxo)dithioic acid, O-benzylphosphoro(dithioperoxo)dithioic acid, O-cyclohexylphosphoro(dithioperoxo)dithioic acid, O-norbornylphosphoro(dithioperoxo)dithioic acid, O,S-diphenylphosphoro(dithioperoxo)dithioic acid, O,S-dibenzylphosphoro(dithioperoxo)dithioic acid, O,S-dicyclohexylphosphoro(dithioperoxo)dithioic acid, and O,S-dinorbornylphosphoro(dithioperoxo)dithioic acid.

S Valence Stabilizer #22: Examples of phosphoro(dithioperoxo)thioic acids, bis[phosphoro(dithioperoxo)thioic acids], poly[phosphoro(dithioperoxo)thioic acids], and derivatives thereof (S-S Bidentates, S-S Tridentates, S-S Tetradentates) that meet the requirements for use as "wide band" valence stabilizers for $Co^{+3}$ include, but are not limited to: phosphoro(dithioperoxo)thioic acid, O-phenylphosphoro(dithioperoxo)thioic acid, O-benzylphosphoro(dithioperoxo)thioic acid, O-cyclohexylphosphoro(dithioperoxo)thioic acid, O-norbornylphosphoro(dithioperoxo)thioic acid, O,S-diphenylphosphoro(dithioperoxo)thioic acid, O,S-dibenzylphosphoro(dithioperoxo)thioic acid, O,S-dicyclohexylphosphoro (dithioperoxo)thioic acid, and O,S-dinorbornylphosphoro (dithioperoxo)thioic acid.

S Valence Stabilizer #23: Examples of phosphoro(dithioperoxo)trithioic acids, bis[phosphoro(dithioperoxo)trithioic acids], poly[phosphoro(dithioperoxo)trithioic acids], and derivatives thereof (S-S Bidentates, S-S Tridentates, S-S Tetradentates) that meet the requirements for use as "wide band" valence stabilizers for $Co^{+3}$ include, but are not limited to: phosphoro(dithioperoxo)trithioic acid, O-phenylphosphoro (dithioperoxo)trithioic acid, O-benzylphosphoro(dithioperoxo)trithioic acid, O-cyclohexylphosphoro(dithioperoxo) trithioic acid, O-norbomylphosphoro(dithioperoxo)trithioic acid, O,S-diphenylphosphoro(dithioperoxo)trithioic acid, O,S-dibenzylphosphoro(dithioperoxo)trithioic acid, O,S-dicyclohexylphosphoro(dithioperoxo)trithioic acid, and O,S-dinorbornylphosphoro(dithioperoxo)tnthioic acid.

S Valence Stabilizer #24: Examples of beta-mercaptothioketones, beta-mercaptothioaldehydes, bis(beta-mercaptothioketones), bis(beta-mercaptothioaldehydes), poly(beta-mercaptothioketones), and poly(beta-mercaptothioaldehydes) (S-S Bidentates, S-S Tridentates, S-S Tetradentates) that meet the requirements for use as "wide band" valence stabilizers for $Co^{+3}$ include, but are not limited to: 4-mercaptopentan-2-thione; 1,3-diphenyl-3-mercaptopropanethioaldehyde; 1,3-dibenzyl-3-mercaptopropanethioaldehyde; 1,3-dicyclohexyl-3-mercaptopropanethioaldehyde; 1,3-dinorbornyl-3-mercaptopropanethioaldehyde; 1,3-di(2-thienyl)-3-mercaptopropanethioaldehyde; 1,3-di(2-furyl)-3-mercaptopropanethioaldehyde; o-mercaptothioacetophenone; 5-mercapto-1,4-dithionaphthoquinone; 1-mercaptothioacridone; 1-mercaptodithioanthraquinone; 1,8-dimercaptodithioanthraquinone; and beta-mercaptothiobenzophenone.

S Valence Stabilizer #25: Examples of N-(aminomethylthiol) thioureas [N-(aminomercaptomethyl)thioureas], bis [N-(aminomethylthiol)thioureas], and poly[N-(aminomethylthiol)thioureas] (S-S Bidentates, S-S Tridentates, S-S Tetradentates) that meet the requirements for use as "wide band" valence stabilizers for $Co^{+3}$ include, but are not limited to: N'-(aminomercaptomethyl)thiourea; N,N"-dimethyl-N'-(aminomercaptomethyl)thiourea; N,N'-diethyl-N'-(aminomercaptomethyl)thiourea; N,N'-isopropyl-N'-(aminomercaptomethyl)thiourea; N,N"-diphenyl-N'-(aminomercaptomethyl)thiourea; N,N"-dibenzyl-N'-(aminonercaptomethyl)thiourea; N,N"-dicyclohexyl-N'-(aminomercaptomethyl)thiourea; and N,N"'-dinorbornyl-N'-(aminomercaptomethyl)thiourea.

S Valence Stabilizer #26: Examples of dithiooxamides, bis (dithiooxamides), and poly(dithiooxamides) (S-S Bidentates, S-S Tridentates, S-S Tetradentates) that meet the requirements for use as "wide band" valence stabilizers for $Co^{+3}$ include, but are not limited to: dithiooxamide (rubeanic acid), N-methyldithiooxamide; N-ethyldithiooxamide; N-isopropyldithiooxamide; N-phenyldithiooxamide; N-benzyldithiooxamide; N-cyclohexyldithiooxamide; N-norbornyldithiooxamide; N,N'-dimethyldithiooxamide; N,N'-diethyldithiooxamide; N,N'-diisopropyldithiooxamide; N,N'-diphenyldithiooxamide; N,N'-dibenzyldithiooxamide; N,N'-dicyclohexyldithiooxamide; and N,N'-dinorbornyldithiooxamide.

S Valence Stabilizer #27: Examples of 1,1-dithiolates, bis(1, 1-dithiolates), and poly(1,1-dithiolates) (S-S Bidentates and S-S Tetradentates) that meet the requirements for use as "wide band" valence stabilizers for $Co^{+3}$ include, but are not limited to: 1,1-dicyano-2,2-ethylene dithiolate (i-mnt); 1,1-dicarboalkoxy-2,2-ethylene dithiolate (DED); 1,1-di(trifluoromethyl)-2,2-ethylene dithiolate; 1,1-di(pentafluorophenyl)-2,2-ethylene dithiolate; 1-pentamethylene-2,2-ethylene dithiolate; and 1-nitroethylene dithiolate.

S Valence Stabilizer #28: Examples of dithiomonocarboxylic acids, tri- and tetrathiodicarboxylic Acids, bis(dithiomonocarboxylic acids), bis(tri- and tetrathiodicarboxylic acids), poly(dithiomonocarboxylic acids), poly(tri- and tetrathiodicarboxylic acids), and derivatives thereof (S-S Bidentates and S-S Tetradentates) that meet the requirements for use as "wide band" valence stabilizers for $Co^{+3}$ include, but are not limited to: dithioacetic acid; dithiopropionic acid; dithiobenzoic acid (dtb); dithiophenylacetic acid (dtpa); dithiocyclohexanoic acid; dithiofuroic acid; dithionaphthoic acid; phenyl dithioacetate; phenyl dithiopropionate; phenyl dithiobenzoate; phenyl dithiocyclohexanoate; phenyl dithiofuroate; phenyl dithionaphthoate; tetrathiooxalic acid; tetrathiomalome acid; tetrathiosuccinic acid; tnthiooxalic acid; trithiomalonic acid; trithiosuccinic acid; diphenyl tetrathiooxalate; diphenyl tetrathiomalonate; diphenyl tetrathiosuccinate; diphenyl ththiooxalate; diphenyl trithiomalonate; diphenyl trithiosuccinate; pyridine dithiocarboxylic acid; pyrrole dithiocarboxylic acid; thiophene dithiocarboxylic acid; dithionaphthoic acid; and tetrathiocamphonic acid.

S Valence Stabilizer #29: Examples of perthiomonocarboxylic acids, perthiodicarboxylic acids, bis(perthiomonocarboxylic acids), bis(perthiodicarboxylic acids), poly(perthiomonocarboxylic acids), poly(perthiodicarboxylic acids), and derivatives thereof (S-S Bidentates and S-S Tetradentates) that meet the requirements for use as "wide band" valence stabilizers for $Co^{+3}$ include, but are not limited to: perthioacetic acid; perthiopropionic acid; perthiobenzoic acid; perthiophenylacetic acid; perthiocyclohexanoic acid; perthiofuroic acid; perthionaphthoic acid; phenyl penthioacetate; phenyl perthiopropionate; phenyl perthiobenzoate; phenyl perthiocyclohexanoate; phenyl perthiofuroate; phenyl perthionaphthoate; perthiooxalic acid; perthiomalonic acid; perthiosuccinic acid; diphenyl penthiooxalate; diphenyl penthiomalonate; diphenyl perthiosuccinate; dithiole-3-thione (dithione-3-thione); and benzodithiole-3-thione (benzodithione-3-thione).

S Valence Stabilizer #30: Examples of dithiocarbonates, trithiocarbonates, perthiocarbonates, bis(dithiocarbonates), bis(trithiocarbonates), and bis(perthiocarbonates) (S-S Bidentates and S-S Tetradentates) that meet the requirements for use as "wide band" valence stabilizers for $Co^{+3}$ include, but are not limited to: S,S-diethyldithiocarbonate; S,S-diisopropyldithiocarbonate; S,S-diphenyldithiocarbonate; S,S-dibenzyldithiocarbonate; S,S-dicyclohexyldithiocarbonate; S,S-dinorbornyldithiocarbonate; diethyltrithiocarbonate; diisopropyltrithiocarbonate; diphenyltrithiocarbonate; dibenzyltrithiocarbonate; dicyclohexyltrithiocarbonate; and dinorbornyltnthiocarbonate.

S Valence Stabilizer #31: Examples of dithiocarbamates, bis (dithiocarbamates), and poly(dithiocarbamates) (including N-hydroxydithiocarbamates and N-mercaptodithiocarbamates) (S-S Bidentates, S-S Tridentates, and S-S Tetradentates) that meet the requirements for use as "wide band" valence stabilizers for $Co^{+3}$ include, but are not limited to: dimethyldithiocarbamate (dmdtc); di(trifluorodimethyl)dithiocarbamate; diethyldithiocarbamate (dedtc); dipropyldithiocarbamate; diisopropyldithiocarbamate; dibutyldithiocarbamate; ditertbutyldithiocarbamate; dicyanamidodithiocarbamate; azidothioformates; diphenyldithiocarbamate; di(pentafluorophenyl)dithiocarbamate; dibenzyldithiocarbamate; dinaphthyldithiocarbamate; dicyclohexyldithiocarbamate; dinorbornyldithiocarbamate; diadamantyldithiocarbamate; pyrrolidinodithiocarbamate (pyrdtc); piperidinodithiocarbamate (pipdtc); morpholinodithiocarbamate (mordtc); thiamorpholinodithiocarbamate; 3-pyrrolinodithiocarbamate; pyrrolodithiocarbamate; oxazolodithiocarbamate; isoxazolodithiocarbamate; thiazolodithiocarbamate; isothiazolodithiocarbamate; indolodithiocarbamate; carbazolodithiocarbamate; pyrazolinodithiocarbamate; imidazolinodithiocarbamate; pyrazolodithiocarbamate; imidazolodithiocarbamate; indazolodithiocarbamate; and triazolodithiocarbamate.

S Valence Stabilizer #32: Examples of dithiocarbazates (dithiocarbazides), bis(dithiocarbazates), and poly(dithiocarbazates) (S-S Bidentates, S-S Tridentates, and S-S Tetradentates; or possibly N-S Bidentates, N-S Tridentates, and N-S Tetradentates) that meet the requirements for use as "wide band" valence stabilizers for $Co^{+3}$ include, but are not limited to: N,N'-dimethyldithiocarbazate; N,N'-di(trifluoromethyl)dithiocarbazate; N,N'-diethyldithiocarbazate; N,N'-diphenyldithiocarbazate; N,N'-dibenzyldithiocarbazate; N,N'-di(pentafluorophenyl)dithiocarbazate; N,N'-dicyclohexyldithiocarbazate; and N,N'-dinorbornyldithiocarbazate.

N-S Valence Stabilizer #1: Examples of diformamidine disulfides (thioperoxydicarbonimidic diamides), thioperoxytricarbonimidic diamides, thioperoxytetracarbonimidic diamides, bis(diformamidine disulfides), and poly (diformamidine disulfides) (N-S bidentates, N-N-S tridentates, or N-S tetradentates) that meet the requirements for use as "wide band" valence stabilizers for $Co^{+3}$ include, but are not limited to: diformamidine disulfide; methyldiformamidine disulfide; ethyldiformamidine disulfide; isopropyldiformamidine disulfide; butyldiformamidine disulfide; benzyldiformamidine disulfide; phenyldiformamidine disulfide; tolyldiformamidine disulfide; naphthyldiformamidine disulfide; cyclohexyldiformamidine disulfide; norbornyldiformamidine disulfide; adamantyldiformamidine disulfide; dimethyldiformamidine disulfide; diethyldiformamidine disulfide; diisopropyldiformamidine disulfide; dibutyldiformamidine disulfide; dibenzyldiformamidine disulfide; diphenyldiformamidine disulfide; ditolyldiformamidine disulfide; dinaphthyldiformamidine disulfide; dicyclohexyldiformamidine disulfide; dinorbornyldiformamidine disulfide; diadamantyldiformamidine disulfide; 2-S-amidinodisulfidothiazole; 2-S-amidinodisulfidooxazole; 2-S-amidinodisulfidoimidazole; 3-S-amidinodisulfidopyrazole; 3-S-amidinodisulfido-1,2,4-triazole; and 5-S-amidinodisulfidotetrazole.

N-S Valence Stabilizer #2: Examples of S-amidinodithiocarbamates, bis(S-amidinodithiocarbamates), and poly(S-amidinodithiocarbamates) (N-S Bidentates and N-S Tetradentates) that meet the requirements for use as "wide band" valence stabilizers for $Co^{+3}$ include, but are not limited to: S-amidinodithiocarbamate; N-methyl-S-amidinodithiocarbamate; N-ethyl-S-amidinodithiocarbamate; N-isopropyl-S-amidinodithiocarbamate; N-butyl-S-amidinodithiocarbamate; N-benzyl-S-amidinodithiocarbamate; N-phenyl-S-amidinodithiocarbamate; N-tolyl-S-amidinodithiocarbamate; N-naphthyl-S-amidinodithiocarbamate; N-cyclohexyl-S-amidinodithiocarbamate; N-norbornyl-S-amidinodithiocarbamate; N-adamantyl-S-amidinodithiocarbamate; N,N'-dimethyl-S-amidinodithiocarbamate; N,N'-diethyl-S-amidinodithiocarbamate; N,N'-diisopropyl-S-amidinodithiocarbamate; N,N'-dibutyl-S-amidinodithiocarbamate; N,N'-dibenzyl-S-amidinodithiocarbamate; N,N'-diphenyl-S-amidinodithiocarbamate; N,N'-ditolyl-S-amidinodithiocarbamate; N,N'-dinaphthyl-S-amidinodithiocarbamate; N,N'-dicyclohexyl-S-amidinodithiocarbamate; N,N'-dinorbornyl-S-amidinodithiocarbamate; N,N'-diadamantyl-S-amidinodithiocarbamate; ethylenebis(S-amidinodithiocarbamate); propylenebis(S-amidinodithiocarbamate); phenylenebis(S-amidinodithiocarbamate); piperazinebis(S-amidinodithiocarbamate); oxalylbis(S-amidinodithiocarbamate); malonylbis(S-amidinodithiocarbamate); succinylbis(S-amidinodithiocarbamate); phthalylbis(S-amidinodithiocarbamate); 2-S-dithiocarbamatothiazole; 2-S-dithiocarbamatooxazole; 2-S-dithiocarbamatoimidazole; 3-S-dithiocarbamatopyrazole; 3-5-dithiocarbamato-1,2,4-triazole; and 5-S-dithiocarbamatotetrazole.

N-S Valence Stabilizer #3: Examples of O-amidinothiocarbamates, bis(O-amidinothiocarbamates), and poly(O-amidinothiocarbamates) (N-S Bidentates and N-S Tetradentates) that meet the requirements for use as "wide band" valence stabilizers for $Co^{+3}$ include, but are not limited to: O-amidinothiocarbamate; N-methyl-O-amidinothiocarbamate; N-ethyl-O-amidinothiocarbamate; N-isopropyl-O-amidinothiocarbamate; N-butyl-O-amidinothio carbamate; N-benzyl-O-amidinothiocarbamate; N-phenyl-O-amidinothiocarbamate; N-tolyl-O-amidinothiocarbamate; N-naphthyl-O-amidinothiocarbamate; N-cyclohexyl-O-amidinothiocarbamate; N-norbornyl-O-amidinothiocarbamate; N-adamantyl-O-amidinothiocarbamate; N,N'-dimethyl-O-amidinothiocarbamate; N,N'-diethyl-O-amidinothiocarbamate; N,N'-diisopropyl-O-amidinothiocarbamate; N,N'-dibutyl-O-amidinothiocarbamate; N,N'-dibenzyl-O-amidinothiocarbamate; N,N'-diphenyl-O-amidinothiocarbamate; N,N'-ditolyl-O-amidinothiocarbamate; N,N'-dinaphthyl-O-amidinothiocarbamate; N,N'-dicyclohexyl-O-amidinothiocarbamate; N,N'-dinorbornyl-O-midinothiocarbamate; N,N'-diadamantyl-O-amidinothiocarbamate ethylenebis(O-amidinothiocarbamate); propylenebis(O-amidinothiocarbamate); phenylenebis(O-amidinothiocarbamate); piperazinebis(O-amidinothiocarbamate); oxalylbis(O-amidinothiocarbamate); malonylbis(O-amidinothiocarbamate); succinylbis(O-amidinothiocarbamate); phthalylbis(O-amidinothiocarbamate); 2-O-monothiocarbamatothiazole; 2-O-monothiocarbamatooxazole; 2-O-monothiocarbamatoimidazole; 3-O-monothiocarbamatopyrazole; 3-O-monothiocarbamato-1,2,4-triazole; and 5-0-monothiocarbamatotetrazole.

N-S Valence Stabilizer #4: Examples of S-amidinoperoxythiocarbamates, bis(S-amidinoperoxythiocarbamates), and poly(S-amidinoperoxythiocarbamates) (N-S Bidentates and N-S Tetradentates) that meet the requirements for use as "wide band" valence stabilizers for $Co^{+3}$ include, but are not limited to: S-amidinoperoxythiocarbamate; N-methyl-S-amidinoperoxythiocarbamate; N-ethyl-S-amidinoperoxythiocarbamate; N-isopropyl-S-amidinoperoxythiocarbamate; N-butyl-S-amidinoperoxythiocarbamate; N-benzyl-S-amidinoperoxythiocarbamate; N-phenyl-S-amidinoperoxythiocarbamate; N-tolyl-S-amidinoperoxythiocarbamate; N-naphthyl-S-amidinoperoxythiocarbamate; N-cyclohexyl-S-amidinoperoxythiocarbamate; N-norbornyl-S-amidinoperoxythiocarbamate; N-adamantyl-S-amidinoperoxythiocarbamate; N,N'-dimethyl-S-amidinoperoxythiocarbamate; N,N'-diethyl-S-amidinoperoxythiocarbamate; N,N'-diisopropyl-S-amidinoperoxythiocarbamate; N,N'-dibutyl-S-amidinoperoxythiocarbamate; N,N'-dibenzyl-S-amidinoperoxythiocarbamate; N,N'-diphenyl-S-amidinoperoxythiocarbamate; N,N'-ditolyl-S-amidinoperoxythiocarbamate; N,N'-dinaphthyl-S-amidinoperoxythiocarbamate; N,N'-dicyclohexyl-S-amidinoperoxythiocarbamate; N,N'-dinorbornyl-S-amidinoperoxythiocathamate; N,N'-diadamantyl-S-amidinoperoxythiocarbamate; ethylenebis(S-amidinoperoxythiocarbamate); propylenebis(S-amidinoperoxythiocarbamate); phenylenebis(S-amidinoperoxythiocarbamate); piperazinebis(S-amidinoperoxythiocarbamate); oxalylbis(S-amidinoperoxythiocarbamate); malonylbis(S-amidinoperoxythiocarbamate); succinylbis(S-amidinoperoxythiocarbamate); and phthalylbis(S-amidinoperoxythiocarbamate).

N-S Valence Stabilizer #5: Examples of phosphorimidothioic acid; phosphorimidodithioic acid; phosphorimidotrithioic acid; bis(phosphorimidothioic acid); bis(phosphorimidodithioic acid); bis(phosphorimidotrithioic acid); poly(phosphorimidothioic acid); poly(phosphorimidodithioic acid); poly(phosphorimidotrithioic acid); and derivatives thereof (N-S Bidentates and N-S Tetradentates) that meet the requirements for use as "wide band" valence stabilizers for $Co^{+3}$ include, but are not limited to: phosphorimidothioic acid; phosphorimidodithioic acid; phosphorimidotrithioic acid; O-phenylphosphorimidothioic acid; O-benzylphosphorimidothioic acid; O-cyclohexylphosphorimidothioic acid; O-norbornylphosphorimidothioic acid; O,O'-diphenylphosphorimidothioic acid; O,O'-dibenzylphosphorimidothioic acid; O,O'-dicyclohexylphosphorimidothioic acid; and O,O'-dinorbornylphosphorimidothioic acid.

N-S Valence Stabilizer #6: Examples of phosphorothioic triamides, bis(phosphorothioic triamides), and poly(phosphorothioic triamides) (N-S Bidentates and N-S Tetradentates) that meet the requirements for use as "wide band" valence stabilizers for $Co^{+3}$ include, but are not limited to: phosphorothioic triamide; phosphorothioic trihydrazide; phosphoramidothioic dihydrazide; N-phenylphosphorothioic triamide; N-benzylphosphorothioic triamide; N-cyclohexylphosphorothioic triamide; N-norbornylphosphorothioic triamide; N,N'-diphenylphosphorothioic triamide; N,N'-dibenzylphosphorothioic triamide; N,N'-dicyclohexylphosphorothioic triamide; and N,N'-dinorbornylphosphorothioic triamide.

N-S Valence Stabilizer #7: Examples of phosphoramidotrithioic acid, phosphorodiamidodithioic acid, bis(phosphoramidotrithioic acid), bis(phosphorodiamidodithioic acid), poly(phosphoramidotrithioic acid), poly(phosphorodiamidodithioic acid), and derivatives thereof (N-S Bidentates and N-S Tetradentates) that meet the requirements for use as "wide band" valence stabilizers for $Co^{+3}$ include, but are not limited to: phosphoramidotrithioic acid, phosphorodiamidodithioic acid, S-phenylphosphoramidotrithioic acid, S-benzylphosphoramidotrithioic acid, S-cyclohexylphosphoramidotrithioic acid, S-norbornylphosphoramidotrithioic acid, S,S'-diphenylphosphoramidotrithioic acid, S,S'-dibenzylphosphoramidotrithioic acid, S,S'-dicyclohexylphosphoramidotrithioic acid, and S,S'-dinorbornylphosphoramidotrithioic acid.

N-S Valence Stabilizer #8: Examples of phosphoramidothioic acid, phosphoramidodithioic acid, phosphorodiamidothioic acid, bis(phosphoramidothioic acid), bis(phosphoramidodithioic acid), bis(phosphorodiamidothioic acid), poly(phosphoramidothioic acid), poly(phosphoramidodithioic acid), and poly(phosphorodiamidothioic acid) (N-S Bidentates and N-S Tetradentates) that meet the requirements for use as "wide band" valence stabilizers for $Co^{+3}$ include, but are not limited to: phosphoramidothioic acid, phosphoramidodithioic acid, phosphorodiamidothioic acid, phosphorohydrazidothioic acid, phosphorohydrazidodithioic acid, phosphorodihydrazidothioic acid, phosphoramidohydrazidothioic acid, O-phenylphosphoramidothioic acid, O-benzylphosphoramidothioic acid, O-cyclohexylphosphoramidothioic acid, O-norbornylphosphoramidothioic acid, S-phenylphosphoramidodithioic acid, S-benzylphosphoramidodithioic acid, S-cyclohexylphosphoramidodithioic acid, and S-norbornylphosphoramidodithioic acid.

N-S Valence Stabilizer #9: Examples of N-thioacyl 7-aminobenzylidenimines (N-S Bidentates or N-S Tetradentates) that meet the requirements for use as "wide band" valence stabilizers for $Co^{+3}$ include, but are not limited to: N-thioacetyl 7-methylaminobenzylidenimine; N-thioacetyl 7-phenylaminobenzylidenimine; N-thiobenzoyl 7-methylaminobenzylidenimine; and N-thiobenzoyl 7-phenylaminobenzylidenimine.

N-S Valence Stabilizer #10: Examples of thiohydroxamates (thiohydroxylamines), bis(thiohydroxamates), and poly(thiohydroxamates) (N-S Bidentates, N-S Tetradentates, and N-S Hexadentates) that meet the requirements for use as "wide band" valence stabilizers for $Co^{+3}$ include, but are not limited to: acetothiohydroxamic acid; propianothiohydroxamic acid; butyrothiohydroxamic acid; crotonothiohydroxamic acid; sorbothiohydroxamic acid; benzothiohydroxamic acid; toluicthiohydroxamic acid; salicyithiohydroxamic acid; phenylacetothiohydroxamic acid; anthranilthiohydroxamic acid; nicotinethiohydroxamic acid; picolinethiohydroxamic acid; cyclohexanethiohydroxamic acid; quinoline 8-thiohydroxamic acid; cinnamyithiohydroxamic acid; oxaldithiohydroxamic acid; succinylbis-N-phenylthiohydroxamic acid; adipylbis-N-phenylthiohydroxamic acid; glyoxaithiohydroxamic acid; 2-thiophenethiocarbohydroxamic acid; thenoylthiohydroxamic acid; N-phenylbenzothiohydroxamic acid; N-tolylbenzothiohydroxamic acid; N-phenylacetothiohydroxamic acid; N-phenyl-2-thenoylthiohydroxamic acid; and N-tolyl-2-thenoylthiohydroxamic acid.

N-S Valence Stabilizer #11: Examples of alpha- or ortho-aminothiocarboxylic acids, and alpha- or ortho-aminothiodicarboxylic acids, and derivatives thereof (N-S Bidentates, N-S Tridentates, and N-S Tetradentates) that meet the requirements for use as "wide band" valence stabilizers for $Co^{+3}$ include, but are not limited to: 2-pyridinethiocarboxylic acid (thiopicolinic acid); 2-pyrazinethiocarboxylic acid; o-aminothiobenzoic acid; o-aminothionaphthoic acid; and 3,6-diaminothiophthalic acid.

N-S Valence Stabilizer #12: Examples of thiosemicarbazones, bis(thiosemicarbazones), and poly(thiosemicarbazones) (N-S Bidentates, N-S Tetradentates, and N-S Hexadentates) that meet the requirements for use as "wide band" valence stabilizers for $Co^{+3}$ include, but are not limited to: acetaldehyde thiosemicarbazone; acetone thiosemicarbazone; pinacolone thiosemicarbazone; benzaldehyde thiosemicarbazone; naphthaldehyde thiosemicarbazone; norbornanone thiosemicarbazone; camphor thiosemicarbazone; nopinone thiosemicarbazone; 2-pyridinaldehyde thiosemicarbazone; salicylaldehyde thiosemicarbazone; quinolinaldehyde thiosemicarbazone; isatin dithiosemicarbazone; camphorquinone dithiosemicarbazone; camphorquinone dithiosemicarbazone; picolinaldehyde thiosemicarbazone; dipyridyl glyoxal dithiosemicarbazone; di-2-pyridyl ketone thiosemicarbazone; methyl-2-pyridyl ketone thiosemicarbazone; glyoxal dithiosemicarbazone; acetophenone thiosemicarbazone; biacetyl monoxime thiosemicarbazone; acetamidobenzaldehyde thiosemicarbazone; thymolaldothiosemicarbazone; thiophene-2-aldehyde thiosemicarbazone; phthalaldehyde dithiosemicarbazone; phthalimide dithiosemicarbazone; furaldehyde thiosemicarbazone; naphthoquinone thiosemicarbazone; phenanthrequinone thiosemicarbazone; cyclohexanedione dithiosemicarbazone; ionone thiosemicarbazone; bisthiosemicarbazone of diethyl-3,4-dioxadioate; pyridoxal alkyithiosemicarbazones; benzylidene phenyithiosemicarbazones; lawsone thiosemicarbazone; and 1-benzoin-4-phenylthiosemicarbazone (bps).

N-S Valence Stabilizer #13: Examples of thioacyl hydrazones, bis(thioacyl hydrazones), and poly(thioacyl hydrazones) (N-S Bidentates, N-S Tetradentates, and N-S Hexadentates) that meet the requirements for use as "wide band" valence stabilizers for $Co^{+3}$ include, but are not limited to: acetaldehyde N-thioformylhydrazone; acetaldehyde N-thiobenzoylhydrazone; acetone N-thioformyihydrazone; acetone N-thiobenzoylhydrazone; pinacolone N-thioformylhydrazone; pinacolone N-thiobenzoylhydrazone; benzaldehyde N-thioformylhydrazone; benzaldehyde N-thiobenzoylhydrazone; naphthaldehyde N-thioformyihydrazone; naphthaidehyde N-thiobenzoylhydrazone; norbornanone N-thioformylhydrazone; norbornanone N-thiobenzoylhydrazone; camphor N-thioformylhydrazone; camphor N-thiobenzoylhydrazone; nopinone N-thioformyihydrazone; nopinone N-thiobenzoyihydrazone; 2-pyridinaldehyde N-thioformyihydrazone; 2-pyridinaldehyde N-thiobenzoylhydrazone; saucylaldehyde N-thioformyihydrazone; salicylaldehyde N-thiobenzoylhydrazone; quinolinaldehyde N-thioformyihydrazone; quinolinaldehyde N-thiobenzoylhydrazone; thiophene-2-aldehyde N-thioformyihydrazone; thiophene-2-aldehyde N-thiobenzoyihydrazone; naphthoquinone N-thioformylhydrazone; naphthoquinone N-thiobenzoylhydrazone; ionone N-thioformylhydrazone; ionone N-thiobenzoylhydrazone; benzaldehyde benzothiazolehydrazone; lawsone N-thioformyihydrazone; and lawsone N-thiobenzoylhydrazone.

N-S Valence Stabilizer #14: Examples of thiocarbazones (diazenecarbothioic hydrazides), bis(thiocarbazones), and poly(thiocarbazones) (N-S Bidentates, N-S Tetradentates, and N-S Hexadentates) that meet the requirements for use as "wide band" valence stabilizers for $Co^{+3}$ include, but are not limited to: diphenyithiocarbazone (dithizone); 2-phenyithiocarbazone; dinaphthylthiocarbazone; 2-naphthylthiocarbazone; and ambazone.

N-S Valence Stabilizer #15: Examples of azo compounds with thiol or mercapto or thiocarbonyl substitution at the ortho- (for aryl) or alpha- or beta- (for alkyl) positions, Bis [o-(HS-) or alpha- or beta-(HS-)azo compounds], or Poly[o-(HS-) or alpha- or beta-(HS-)azo compounds] (N-S Bidentates, N-S Tridentates, N-S Tetradentates, or N-S Hexadentates) that meet the requirements for use as "wide band" valence stabilizers for $Co^{+3}$ include, but are not limited to: 2-thiolazobeazene [1-Qthenylazo)-2-thiophenol]; 2,2'-dithioazobenzene; (2-thiophene)azobenzene; 1-(4-nitrophenylazo)-2-thionaphthol; 2-thiazolylazobenzene; and 2-benzothiazolylazoberizene.

N-S Valence Stabilizer #16: Examples of diazeneformothioamides, diazeneacetothioamides, bis(diazeneformothioamides), bis(diazeneacetothioamides), poly(diazeneformothioamides), and poly(diazeneacetothioamides) (N-S Bidentates, N-S Tetradentates, and N-S Hexadentates) that meet the requirements for use as "wide band" valence stabilizers for $Co^{+3}$ include, but are not limited to: diazeneformothioamide, diazeneacetothioamide, phenyldiazeneformothioamide, diphenyldiazeneformothioamide, phenyldiazeneacetothioamide, and diphenyldiazeneacetothioamide.

N-S Valence Stabilizer #17: Examples of diazenecarbothioic acids, diazenecarbodithioic acids, bis(diazenecarbothioic acids), bis(diazenecarbodithioic acids), poly(diazenecarbothioic acids), poly(diazenecarbodithioic acids) and derivatives thereof (N-S Bidentates, N-S Tetradentates, N-S Hexadentates) that meet the requirements for use as "wide band" valence stabilizers for $Co^{+3}$ include, but are not limited to: diazeneformothioic acid, diazeneacetothioic acid, phenyldiazeneformothioic acid, diphenyldiazeneformothioic acid, phenyldiazeneacetothioic acid, and diphenyldiazeneacetothioic acid.

N-S Valence Stabilizer #18: Examples of diazeneformothioaldehydes, diazeneacetothioaldehydes, bis(diazeneformothioaldehydes), bis(diazeneacetothioaidehydes), poly(diazeneformothioaldehydes), and poly(diazeneacetothioaldehydes) (N-S Bidentates, N-S Tetradentates and N-S Hexadentates) that meet the requirements for use as "wide band" valence stabilizers for $Co^{+3}$ include, but are not limited to: diazeneformothioaldehyde, diazeneacetothioaldehyde, phenyldiazeneformothioaldehyde, diphenyldiazeneformothioaldehyde, phenyidiazeneacetothioaldehyde, and diphenyldiazeneacetothioaldehyde.

N-S Valence Stabilizer #19: Examples of diazenediformothioamides, diazenediacetothioamides, bis(diazenediformothioamides), bis(diazenediacetothioamides), poly(diazenediformothioamides), and poly(diazenediacetothioamides) (N-S Triclentates and N-S Hexadentates) that meet the requirements for use as "wide band" valence stabilizers for $Co^{+3}$ include, but are not limited to: diazenediformodithioamide, diazenediacetodithioamide, diphenyldiazenediformodithioamide, tetraphenyldiazenediformodithioamide, diphenyldiazenediacetodithioamide, and tetraphenyldiazenediacetodithioamide.

N-S Valence Stabilizer #20: Examples of diazenedicarbothioic acids, diazenedicarbodithioic acids, bis(diazenedicarbothioic acids), bis(diazenedicarbodithioic acids), poly(diazenedicarbothioic acids), poly(diazenedicarbodithioic acids) and derivatives thereof (N-S Tridentates and N-S Hexadentates) that meet the requirements for use as "wide band" valence stabilizers for $Co^{+3}$ include, but are not limited to: diazenediformothioic acid, diazenediacetodithioic acid, phenyldiazenediformothioic acid, diphenyldiazenediformothioic acid, phenyldiazenediacetodithioic acid, and diphenyldiazenediacetodithioic acid.

N-S Valence Stabilizer #21: Examples of diazenediformothioaldehydes, diazenediacetothioaldehydes, bis(diazenediformothioaldehydes), bis(diazenediacetothioaldehydes), poly(diazenediformothioaldehydes), and poly(diazenediacetothioaldehydes) (N-S Tridentates and N-S Hexadentates) that meet the requirements for use as "wide band" valence stabilizers for $Co^{+3}$ include, but are not limited to: diazenediformothioaldehyde, diazenediacetothioaldehyde, diphenyldiazenediformothioaldehyde, and diphenyldiazenediacetothioaldehyde.

N-S Valence Stabilizer #22: Examples of ortho-thio (or -mercapto) substituted formazans, bis(o-thio or-mercapto substituted formazans), and poly(o-thio or-mercapto substituted formazans) (N-S Bidentates, N-S Tridentates, N-S Tetradentates, and N-S Hexadentates) that meet the requirements for use as "wide band" valence stabilizers for $Co^{+3}$ include, but are not limited to: 1-(2-thiophenyl)-3,5-diphenylformazan; 1-(2-methylmercaptophenyl)-3,5-diphenylformazan; 1,5-bis(2-thiophenyl)-3-phenylformazan; and 5-bis(2-methylmercaptophenyl)-3-phenylformazan.

N-S Valence Stabilizer #23: Examples of ortho-thio (or -mercapto) substituted azines (including ketazines), bis(o-thio or mercapto substituted azines), and poly(o-thio or mercapto substituted azines) (N-S Bidentates, N-S Tridentates, N-S Tetradentates, and N-S Hexadentates) that meet the requirements for use as "wide band" valence stabilizers for $Co^{+3}$ include, but are not limited to: 2-mercapto-1-benzalazine; 2-mercapto-1-naphthalazine; and 2-mercapto-1-cyclohexanonazine.

N-S Valence Stabilizer #24: Examples of Schiff Bases with one Imine (C=N) Group and with ortho- or alpha- or beta-thio or mercapto or thiocarbonyl substitution (N-S Bidentates, N-S Tridentates, N-S Tetradentates, N-S Pentadentates, or N-S Hexadentates) that meet the requirements for use as "wide band" valence stabilizers for $Co^{+3}$ include, but are not limited to: N-(Thiosalicylaldehydo)isopropylamine; N-(2-thiophenecarboxaldehydo)isopropylamine; N-(2-Acetylthiopheno)isopropylamine; N-(2-Thioacetophenono)isopropylamine; N-(Thiosalicylaldehydo)cyclohexylamine; N-(2-Thiophenecarboxaldehydo)cyclohexylamine; N-(2-Acetylthiopheno)cyclohexylamine; N-(2-Thioacetophenono)cyclohexylamine; N(Thiosalicylaldehydo)aniline; N-(2-Thiophenecarboxaldehydo)aniline; N-(2-Acetylthiopheno)aniline; N-(2-Thioacetophenono)aniline; N-(Thiosalicylaldehydo)aminonorbornane; N-(2-Thiocarboxaldehydo)aminonorbornane; N-(2-Acetylthiopheno)aminonorbornane; N-(2-Thioacetophenono)aminonorbornane; 4-aminobenzylidene-3-propyl-5-mercapto-1,2,4-triazole; 4-aminocinnamalidene-3-propyl-5-mercapto-1,2,4-triazole (acpmt); 4-aminosalicylidene-3-propyl-5-mercapto-1,2,4-triazole (aspmt); 4-aminovanillidene-3-propyl-5-mercapto-1,2,4-triazole; 4-aminodimethylaminobenzylidene-3-propyl-5-mercapto-1,2,4-triazole (adpmt); cinnamylideneaminophenylthiazole; N-(2-mercaptophenyl)salicylideneimine; 2-thiophenecarboxaldehyde phenylhydrazone; 2-thiophenecarboxaldehyde 2-pyridyl hydrazone; 2-mercaptobenzaldehyde phenylhydrazone; and 2-mercaptobenzaldehyde 2-pyridyl hydrazone. Also includes Schiff Bases derived from the reaction of carbonyl compounds with dithiocarbazates, and hydrazones with ortho-S substitution.

N-S Valence Stabilizer #25: Examples of Schiff Bases with two Imine (C=N) Groups and with ortho- or alpha- or beta-thio or mercapto or thiocarbonyl substitution (N-S Tridentates, N-S Tetradentates, N-S Pentadentates, or N-S Hexadentates) that meet the requirements for use as "wide band" valence stabilizers for $Co^{+3}$ include, but are not limited to: N,N'-(2,5-Thiophenedicarboxaldehydo)diisopropylamine; N,N'-(2,5-Thiophenedicarboxaldehydo)dicyclohexylamine; N,N'-(2,5-Thiophenedicarboxaldehydo)dianiline; N,N'-(2,5-Thiophenedicarboxaldehydo)di-aminonorbornane; N,N'-(o-Thiophthalicdialdehydo)diisopropylamine; N,N'-(o-Thiophthalicdialdehydo)dicyclohexylamine; N,N'-(o-Thiophthalicdialdehydo)dianiline; N,N'-(o-Thiophthalicdialdehydo)di-aminonorbornane; N,N'-(o-Thioformylcamphoro)diisopropylamine; N,N'-(o-Thioformylcamphoro)dicyclohexylamine; N,N'-(o-Thioformylcamphoro)dianiline; N,N'-(o-Thioformylcamphoro)di-aminonorbornane; N,N'-(o-Thiodiacetylbenzeno)diisopropylamine; N,N'-(o-Thiodiacetylbenzeno)dicyclohexylamine; N,N'-(o-Thiodiacetylbenzeno)dianiline; N,N'-(o-Thiodiacetylbenzeno)di-aminonorbornane; N,N'-(3,6-Dithio-1,2-cyclohexanono)diisopropylamine; N,N'-(3,6-Dithio-1,2-cyclohexanono)dicyclohexylamine; N,N'-(3,6-Dithio-1,2-cyclohexanono)dianiline; N,N'-(3,6-Dithio-1,2-cyclohexanono)di-aminonorbornane; N,N'-(2,5-Diacetylthiopheno)diisopropylamine; N,N'-(2,5-Diacetylthiopheno)dicyclohexylamine; N,N'-(2,5-Diacetylthiopheno)dianiline; N,N'-(2,5-Diacetylthiopheno)di-aminonorbornane; N,N'-(Thiosalicylaldehydo)ethylenediamine; N,N'-(o-Thionaphthaldehydo)ethylenediamine; N,N'-(o-Thioacetophenono)ethylenediamine; N,N'-(Thiosalicylaldehydo)trimethylenediamine; N,N'-(o-Thionaphthaldehydo)trimethylenediamine; N,N'-(o-Thioacetophenono)trimethylenediamine; N,N'-(Thiosalicylaldehydo)cyclohexane-1,2-diamine; N,N'-(o-Thionaphthaldehydo)cyclohexane-1,2-diamine; N,N'-(o-Thioacetophenono)cyclohexane-1,2-diamine; N,N'-(Thiosalicylaldehydo)-1,2-diaminobenzene; N,N'-(o-Thionaphthaldehydo)-1,2-diaminobenzene; and N,N'-(o-Thioacetophenono)-1,2-diaminobenzene. Also includes Schiff Bases derived from the reaction of carbonyl compounds with dithiocarbazates, and hydrazones with ortho-S substitution.

N-S Valence Stabilizer #26: Examples of Schiff Bases with three Imine (C=N) Groups and with ortho- or alpha- or beta-thio or mercapto or thiocarbonyl substitution (N-S Tetradentates, N-S Pentadentates, or N-S Hexadentates) that meet the requirements for use as "wide band" valence stabilizers for $Co^{+3}$ include, but are not limited to: N,N',N"-(Thiosalicylaldehydo)tris(2-aminoethyl)amine; N,N',N"-(o-Thionaphthaldehydo)tris(2-aminoethyl)amine; and N,N',N"-(o-Thioacetophenono)tris(2-aminoethyl)amine. Also includes Schiff Bases derived from the reaction of carbonyl compounds with dithiocarbazates, and hydrazones with ortho-S substitution.

N-S Valence Stabilizer #27: Examples of thioalkyl amines (aminothiols or aminodisulfides) and thioalkyl imines (iminothiols or iminodisulfides) (N-S Bidentates, N-S Tridentates, N-S Tetradentates, and N-S Hexadentates) that meet the requirements for use as "wide band" valence stabilizers for $Co^{+3}$ include, but are not limited to: 2-mercapto-1-aminoethane; 2-methylmercapto-1-aminoethane; 3-mercapto-1-aminopropane; 1-mercapto-2-amino-2-methylpropane; 2-mercaptocyclohexylamine; 3-mercapto-2-aminonorbornane; 1,3-dimercapto-2-aminopropane; 1,5-dimercapto-3-aminopentane; 2,2'-diaminodiethyl sulfide; 3,3'-diaminodipropyl sulfide; 2,2'-diaminodicyclohexyl sulfide; 1,6-dimercapto-3,4-diaminohexane; 1,7-dimercapto-3,5-diaminoheptane; 1,6-diamino-3,4-dimercaptohexane; 1,7-diamino-3,5-dimercaptoheptane; tri(mercaptomethyl)amine; tri(2-mercaptoethyl) amine; dithiooxamide (rubeanic acid); 2,2'-diaminodiethyl disulfide; 3,3'-diaminodipropyl disulfide; 2,2'-diaminodicyclohexyl disulfide; 3-amino-1,5-pentanedithioclialdehyde; 3,4-diamino-1,6-hexanedithiodialdehyde; 3,5-diamino-1,7-heptanedithioclialdehyde; iminobisacetic acid; iminobispropionic acid; and bis(hydroxyethyl)aminoalkyl sulfide.

N-S Valence Stabilizer #28: Examples of thioaryl amines and thioaryl imines (N-S Bidentates, N-S Tridentates, N-S Tetradentates, and N-S Hexadentates) that meet the requirements for use as "wide band" valence stabilizers for $Co^{+3}$ include, but are not limited to: 2-aminothiophenol (2-aminobenzenethiol); 2-aminothiobenzoic acid (thioanthranilic acid); 2-aminothioanisole; 2-(methanamine)benzyl mercaptan [(2-aminomethyl)-alpha-toluenethiol] [(2-mercaptomethyl)-alpha-aminotoluene]; 1-amino-2-naphthalenethiol; 2-amino-1-naphthalenethiol; 2-amino-1-(methyldisulfido)benzene; 2,2'-di(aminomethyl)diphenylthioketone; di(2-amino)phenyl sulfide; di(2-amino)phenyl disulfide (di-ortho-aminophenyl disulfide (doapd)); 1,3-di(2-amino)phenyl-2-mercaptopropane; 1,3-di(3-amino)phenyl-2-mercaptopropane; 1,3-di(2-mercapto)phenyl-2-aminopropane; 1,3-di(3-mercapto) phenyl-2-aminopropane; 2,2'-dimercaptoiminodibenzyl; 2,2'-iminodibenzothioic acid; 2,2'-dimercaptoiminostilbene; and poly(o-aminothiophenol).

N-S Valence Stabilizer #29: Examples of five-membered heterocyclic rings containing one, two, three, or four nitrogen atoms at least one additional sulfur atom binding site not in a ring (N-S Bidentates, N-S Tridentates, N-S Tetradentates, or N-S Hexadentates) that meet the requirements for use as "wide band" valence stabilizers for $Co^{+3}$ include, but are not limited to: 2-mercaptopyrrole; 2-(methylthio)methylpyrrole; 2,5-(thiomethyl)pyrrole; 2,5-(methylthiomethyl)pyrrole; 2,6-(methyldisulfidomethyl)pyrrole; imidazoline-2-thione (2-mercaptoimidazole); 2-mercaptothiazoline; 2-mercaptobenzimidazole; 2-mercaptobenzothiazole; 2-mercaptobenzoxazole; 2-thiohydantoin; di-2-pyridylthioglyoxal (2,2'-thiopyridil); bis((1-pyrazolyl)methane)sulfide; bis((1-pyrazolyl)methane)disulfide; bis(2-(1-pyrazolyl)ethane) sulfide; bis(2-(1-pyrazolyl)ethane)disulfide; bis (benzimidazolylmethane)sulfide; bis(benzimidazolylethane) sulfide; bis(benzimidazolylmethane) disulfide; bis(benzimidazolylethane) disulfide; tris(imidazolyl) methanethiol; tris (imidazolylmethane)methanethiol; N-thiomethyl-N,N-(benzimidazolylmethane)amine; N-(2-thioethyl)-N,N-(benzimidazolylmethane)amine; N,N'-di (benzimidazolylmethane)-1,3-diamino-2-mercaptopropane; N,N,N',N"-tetrakis(benzimidazolylmethane)-1,3-diamino-2-mercaptopropane; bis(N,N-((4-imidazolyl)methane)2-amino ethane)sulfide; bis(N,N-((4-imidazolyl)methane)2-aminoethane)disulfide; 2-aminobenzothiazole (abt); 2-phenylaminothiazole; thiohydantoin; thioxohydropyrazole; 2-mercaptobenzothiazole (mbt); 2-mercapto-1,3,4-thiadiazole; 2,5-dimercapto-1,3,4-thiadiazole (bismuthiol); 2,5-bis(alkylthio)-1,3,4-thiadiazole; 2-amino-5-mercapto-1,3,4-thiadiazole (amt); 5-mercaptotetrazole; 1-phenyl-5-mercaptotetrazole (pmt)(5-mptt); 5-mercaptotriazole; 3-mercaptotriazole; (2-benzothiazolyl)thioacetic acid; (2-benzothiazolyl)thiopropionic acid; (alkylthio)benzotriazoles; (arylthio)benzotriazoles; 2-mercaptopyrimidine; bis(5-mercapto-1,2,4-triazol-3-yl); bis(5-mercapto-1,2,4-triazol-3-yl)alkanes; 2-aminothiazolidine; thiazolidine-2-thione; 2-mercaptothiazolidine; 1-(2-mercaptoethyl)imidazoline; imidazolidine-2-thione; 4,5-dihydroxyimidazolidine-2-thione; 4-amino-5-mercapto-1,2,4-triazole; (2-benzimidazolylthio)carboxylic acids; (2-benzoxazolylthio)carboxylic acids; (2-benzothiazolylthio)carboxylic acids; (2-benzimidazolylthio)hydroxyalkyl(aryl)s; (2-benzoxazolylthio)hydroxyalkyl(aryl)s; (2-benzothiazolylthio)hydroxyalkyl(aryl) s; 2-(phenylmethylthio)benzothiazole; 2,5-bis (hydrocarbyldithio)-1,3,4-thiadiazoles; 2-(hydrocarbyldithio)-5-mercapto-1,3,4-thiadiazoles; bis (dithiobisthiadiazole); benzothiazolethione; 3-hydrazino-5-thio-1,2,4-triazole; imidazolidine-2,4-dithione; dimercaptobenzothiazole; 2-aminothiazole (atz); thiadiazole-2-thione; 5-mercaptothiadiazole-2-thione; 1,1-thiocarbonyldiimidazole; phosphosphonomethylenethio-1,3-benzothiazole (pmtbt); 4,5-dihydroxyimidazolidine-2-thione; imidazolidine-2-thione; 1,1'-thiocarbonyldiimidazole; 2,2'-dithiobis (benzothiazole); and 5,5'-dithiobis(tetrazole).

N-S Valence Stabilizer #30: Examples of six-membered heterocyclic rings containing one, two, three, or four nitrogen atoms at least one additional sulfur atom binding site not in a ring (N-S Bidentates, N-S Tridentates, N-S Tetradentates, or N-S Hexadentates) that meet the requirements for use as "wide band" valence stabilizers for $Co^{+3}$ include, but are not limited to: 4-aminomethyl-3-pyridinemethanethiol (including thiopyridoxamine); 2-mercaptopyridine; 2-(methylthio) methylpyridine; 2-(2-(methylthio)ethyl)pyridine; 2,6-(thiomethyl)pyridine; 2,6-(methylthiomethyl)pyridine; 2,6-(methyldisulfidomethyl)pyridine; 2-mercaptopyrimidine; 2-dithiomethylpyrimidine; 2-mercaptoquinoline; 8-mercaptoquinoline (thioxine); 8-methyithioquinoline; 2-mercaptoquinazoline; thioorotic acid (1,2,3,6-tetrahydro-2,6-dithiono-4-pyrimidinecarboxylic acid) (6-thiouracilcarboxylic acid); 1-methylpyrimidine-2-thione; 2-thiouracil; 2,4-dithiouracil; 6-mercaptopurine; bis(N,N,N', N'-tetra(2-(2-pyridyl)ethane)aminomethane)sulfide; bis(N, N,N',N'-tetra(2-(2-pyridyl)ethane)aminomethane)disulfide; bis(N,N,N',N'-tetra(2-(2-pyridyl)ethane)aminoethane)sulfide; bis(N,N,N',N'-tetra(2-(2-pyridyl)ethane)aminoethane) disulfide; 1,3,5-triazine-6-thione; 2-benzylmercapto-1,3,5-triazine; triazine dithiols [i.e. 6-(phenylamino)-1,3,5-triazine-2,4-dithiol (ptd); 6-aniline-1,3,5-triazine-2,4-dithiol (atd); and 2-(N,N-dialkylamino)-1,3,5-triazine-4,6-dithiol]; 2-thioquinazoline; 2-thioquinazolin-4-one; thiomorpholin-3-thione; [2-(aminomethyl)thio]pyridine; 6-mercaptopurine; dithiouracil; and 2,2'-dithiodipyridine (2,2'-dipyridyl disulfide).

N-S Valence Stabilizer #31: Examples of five-membered heterocyclic rings containing one or two sulfur atoms at least one additional nitrogen atom binding site not in a ring (N-S Bidentates, N-S Tridentates, N-S Tetradentates, or N-S Hexadentates) that meet the requirements for use as "wide band" valence stabilizers for $Co^{+3}$ include, but are not limited to: 2-aminothiophene; 2,5-diaminothiophene; 2-aminomethylthiophene; 2,5-di(aminomethyl)thiophene; 2-aminobenzothiophene; and 2-iminothiolane.

N-S Valence Stabilizer #32: Examples of six-membered heterocyclic rings containing one or two sulfur atoms at least one additional nitrogen atom binding site not in a ring (N-S Bidentates, N-S Tridentates, N-S Tetradentates, or N-S Hexadentates) that meet the requirements for use as "wide band" valence stabilizers for $Co^{+3}$ include, but are not limited to: 2-aminothiopyran; 2,6-diaminothiopyran; 2-aminomethylthiopyran; 2,6-di(aminomethyl)thiopyran; and 2-aminobenzothiopyran.

N-S Valence Stabilizer #33: Examples of five-membered heterocyclic rings containing one, two, three, or four nitrogen atoms at least one additional sulfur atom binding site in a separate ring (N-S Bidentates, N-S Tridentates, N-S Tetradentates) that meet the requirements for use as "wide band" valence stabilizers for $Co^{+3}$ include, but are not limited to: 2-(2-thiophene)pyrrole; 2,5-di(2-thiophene)pyrrole; 2-(2-tbiopyran)pyrrole; 2,5-di(2-thiopyran)pyrrole; 2,5-di(2-pyrrole)thiophene; 2,6-di(2-pyrrole)thiopyran; and 3,5-bis(2-thienyl)-4-amino-1,2,4-triazole (2-tat).

N-S Valence Stabilizer #34: Examples of six-membered heterocyclic rings containing one, two, three, or four nitrogen atoms at least one additional sulfur atom binding site in a separate ring (N-S Bidentates, N-S Tridentates, N-S Tetradentates) that meet the requirements for use as "wide band" valence stabilizers for $Co^{+3}$ include, but are not limited to: 2-(2-thiadiazolyl)benzimidazole; 2-(2-thiophene)pyridine; 2,6-di(2-thiophene)pyridine; 2-(2-thiopyran)pyridine; 2,6-di(2-thiopyran)pyridine; 2,5-di(2-pyridyl)thiophene; 2,6-di(2-pyridyl)thiopyran; and 2-(4-thiazolyl)benzimidazole.

N-S Valence Stabilizer #35: Examples of two-, three-, four-, six-, eight-, and ten-membered macrocyclics, macrobicyclics, and macropolycyclics (including catapinands, cryptands, cyclidenes, and sepulchrates) wherein all binding sites are composed of nitrogen (usually amine or imine groups) or sulfur (usually thiols, mercaptans, or thiocarbonyls) and are not contained in component heterocyclic rings (N-S Bidentates, N-S Tridentates, N-S Tetradentates, and N-S Hexadentates) that meet the requirements for use as "wide band" valence stabilizers for $Co^{+3}$ include, but are not limited to: azathiacyclobutane ([4]aneNS); azathiacyclopentane ([5]aneNS); azathiacyclohexane ([6]aneNS); azathiacycloheptane ([7]aneNS); azathiacyclooctane ([8]aneNS); azathiacyclobutene ([4]eneNS); azatbiacyclopentene ([5]eneNS); azathiacyclohexene ([6]eneNS); azathiacycloheptene ([7]eneNS); azathiacyclooctene ([8]eneNS); azathiacyclobutadiene ([4]dieneNS); azathiacyclopentadiene ([5]dieneNS); azathiacyclohexadiene ([6]dieneNS); azathiacycloheptadiene ([7]dieneNS); azathiacyclooctadiene ([8]dieneNS); diazathiacyclohexane ([6]ane$SN_2$); diazathiacycloheptane ([7]ane$SN_2$); diazathiacyclooctane ([8]ane$SN_2$); diazathiaclononane ([9]ane$SN_2$); diazathiacyclodecane ([10]ane$SN_2$); diazatbiacycloundecane ([11]ane$SN_2$); diazathiacyclododecane ([12]ane$SN_2$); diazathiacyclohexene ([6]ene$SN_2$); diazathiacycloheptene ([7]ene$SN_2$); diazathiacyclooctene ([8]ene$SN_2$); diazathiacyclononene ([9]ene$SN_2$); diazathiacyclodecene ([10]ene$SN_2$); diazathiacycloundecene ([11]ene$SN_2$); diazathiacyclododecene ([12]ene$SN_2$); diazadithiacyclooctane ([8]ane$S_2N_2$); diazadithiacyclononane ([9]ane$S_2N_2$); diazadithiacyclodecane ([10]ane$S_2N_2$); diazadithiacycloundecane ([11]ane$S_2N_2$); diazadithiacyclododecane ([12]ane$S_2N_2$); diazadithiacyclotridecane ([13]ane$S_2N_2$); diazadithiacyclotetradecane ([14]ane$S_2N_2$); diazadithiacyclopentadecane ([15]ane$S_2N_2$); diazadithiacyclohexadecane ([16]ane$S_2N_2$); diazadithiacycloheptadecane ([17]ane$S_2N_2$); diazadithiacyclooctadecane ([18]ane$S_2N_2$); diazadithiacyclononadecane ([19]ane$S_2N_2$); diazadithiacycloeicosane ([20]ane$S_2N_2$); diazadithiacyclooctadiene ([8]diene$S_2N_2$); diazadithiacyclononadiene ([9]diene$S_2N_2$); diazadithiacyclodecadiene ([10]diene$S_2N_2$); diazadithiacycloundecadiene ([11]diene$S_2N_2$); diazadithiacyclododecadiene ([12]diene$S_2N_2$); diazadithiacyclotridecadiene ([13]diene$S_2N_2$); diazadithiacyclotetradecadiene ([14]diene$S_2N_2$); diazadithiacyclopentadecadiene ([15]diene$S_2N_2$); diazadithiacyclohexadecadiene ([16]diene$S_2N_2$); diazadithiacycloheptadecadiene ([17]diene$S_2N_2$); diazadithiacyclooctadecadiene ([18]diene$S_2N_2$); diazadithiacyclononadecadiene ([19]diene$S_2N_2$); diazadithiacycloeicosadiene ([20]diene$S_2N_2$); and tetramethyldithiahexaazacyclobidecanehexaene (mtab).

N-S Valence Stabilizer #36: Examples of four-, six-, eight-, or ten-membered macrocyclics, macrobicyclics, and macropolycyclics (including catapinands, cryptands, cyclidenes, and sepulchrates) wherein all binding sites are composed of nitrogen or sulfur and are contained in component heterocyclic rings (N-S Bidentates, N-S Tridentates, N-S Tetradentates, or N-S Hexadentates) that meet the requirements for use as "wide band" valence stabilizers for $Co^{+3}$ include, but are not limited to: dithiopyrandipyridines; dithiophenedipyrroles; trithiopyrantripyridines; trithiophenetripyrroles; tetrathiopyrantetrapyridines; and tetrathiophenetetrapynDles.

N-S Valence Stabilizer #37: Examples of four-, six-, eight-, or ten-membered macrocyclics, macrobicyclics, and macropolycyclics (including catapinands, cryptands, cyclidenes, and sepulchrates) wherein all binding sites are composed of nitrogen or sulfur and are contained in a combination of heterocyclic rings and amine, imine, thiol, mercapto, or thiocarbonyl groups (N-S Bidentates, N-S Tridentates, N-S Tetradentates, or N-S Hexadentates) that meet the requirements for use as "wide band" valence stabilizers for $Co^{+3}$ include, but are not limited to: azathiatetraphyrins; diazadithiatetraphyrins; azathiahexaphyrins; diazadithiahexaphyrins; and triazatrithiahexaphyrins.

N-O Valence Stabilizer #1: Examples of N-hydroxy(or N,N'-dihydroxy)amidines and N-hydroxy(or N,N'-dihydroxy)diamidines (N-O bidentates, N-O tridentates, or N-O tetradentates) that meet the requirements for use as "wide band" valence stabilizers for $Co^{+3}$ include, but are not limited to: N-hydroxy-N,N'-dimethylformamidine; N-hydroxy-N,N'-diethylformamidine; N-hydroxy-N,N'-diisopropylformamidine; N-hydroxy-N,N'-dibutylformamidine; N-hydroxy-N,N'-diphenylformamidine; N-hydroxy-N,N'-dibenzylformamidine; N-hydroxy-N,N'-dinaphthylformamidine; N-hydroxy-N,N'-dicyclohexylformamidine; N-hydroxy-N,N'-dinorbornylformamidine; N-hydroxy-N,N'-diadamantylformamidine; N-hydroxy-N,N'-dianthraquinonylformamidine; N-hydroxy-N,N'-dimethylacetamidine; N-hyclroxy-N,N'-diethylacetamidine; N-hydroxy-N,N'-diisopropylacetamidine; N-hydroxy-N,N'dibutylacetamidine; N-hydroxy-N,N'-diphenylacetamidine; N-hydroxy-N,N'-diberizylacetamidine; N-hydroxy-N,N'-dinaphthylacetamidine; N-hydroxy-N,N'-dicyclohexylacetamidine; N-hydroxy-N,N'-dinorbornylacetamidine; N-hydroxy-N,N'-diadamantylacetamidine; N-hydroxy-N,N'-dimethylbenzamidine; N-hydroxy-N,N'-diethylbenzamidine; N-hydroxy-N,N'-diisopropylbenzamidine; N-hydroxy-N,N'-dibutylbenzamidine; N-hydroxy-N,N'-diphenylbenzamidine; N-hydroxy-N,N'-dibenzylbenzamidine; N-hydroxy-N,N'-dinaphthylbenzamidine; N-hydroxy-N,N'-dicyclohexylbenzamidine; N-hydroxy-N,N'-dinorbornylbenzamidine; N-hydroxy-N,N'-diadamantylbenzamidine; N-hydroxy-N,N'-dimethyltoluamidine; N-hydroxy-N,N'-diethyltoluamidine; N-hydroxy-N,N'-diisopropyltoluamidine; N-hydroxy-N,N'-dibutyltoluamidine; N-hydroxy-N,N'-diphenyltoluamidine; N-hydroxy-N,N'-dibenzyltoluamidine; N-hydroxy-N,N'-dinaphthyltoluamidine; N-hydroxy-N,N'-dicyclohexyltoluamidine; N-hydroxy-N,N'-dinorbornyltoluamidine; N-hydroxy-N,N'-diadamantyltoluamidine; N,N-dihydroxyoxalic diamidine; N,N'-dihydroxymalonic diamidine; N,N'-dihydroxysuccinic diamidine; N,N'-dihydroxyglutaric diamidine;

N,N'-dihydroxyadipic diamidine; N,N'-dihydroxypimelic diamidine; N,N'-dihydroxysuberic diamidine; N,N'-dihydroxyphthalic diamidine; N,N'-dihydroxyterephthalic diamidine; N,N'-dihydroxyisophthalic diamidine; N,N'-dihydroxypiperazine diamidine.

N-O Valence Stabilizer #2: Examples of guanylureas, guanidinoureas, bis(guanylureas), bis(guanidinoureas), poly(guanylureas), and poly(guanidinoureas) (N-O Bidentates and N-O Tetradentates) that meet the requirements for use as "wide band" valence stabilizers for $Co^{+3}$ include, but are not limited to: guanylurea (amidinourea)(dicyandiamidine); guanidinourea; methylguanylurea; ethylguanylurea; isopropylguanylurea; butylguanylurea; benzylguanylurea; phenylguanylurea; tolylguanylurea; naphthylguanylurea; cyclohexylguanylurea; norbornylguanylurea; adamantylguanylurea; dimethylguanylurea; diethylguanylurea; diisopropylguanylurea; dibutylguanylurea; dibenzylguanylurea; diphenylguanylurea; ditolylguanylurea; dinaphthylguanylurea; dicyclohexylguanylurea; dinorbornylguanylurea; diadamantylguanylurea; ethylenebis(guanylurea); propylenebis(guanylurea); phenylenebis(guanylurea); piperazinebis(guanylurea); oxalylbis(guanylurea); malonylbis(guanylurea); succinylbis(guanylurea); phthalylbis(guanylurea); 2-ureidothiazole; 2-ureidooxazole; 2-ureidoimidazole; 3-ureidopyrazole; 3-ureido-1,2,4-triazole; and 5-ureidotetrazole.

N-O Valence Stabilizer #3: Examples of amidinoamides, guanidinoamides, bis(amidinoamides), bis(guanidinoamides), poly(amidinoamides), and poly(guanidinoamides) (including both N-amidinoamides and 2-amidinoacetamides) (N-O Bidentates, N-O Tridentates, and N-O Tetradentates) that meet the requirements for use as "wide band" valence stabilizers for $Co^{+3}$ include, but are not limited to: amidinoacetamide (1-acetylguanidine); guanidinoacetamide; amidinopropanamide; amidinobutanamide; amidinobenzamide; amidinotoluamide; amidinocyclohexamide; N-methylamidinoacetamide; N-ethylamidinopropanamide; N-propylamidinobutanamide; N-phenylamidinobenzamide; N-tolylamidinotoluamide; N-cyclohexylamidinocyclohexamide; bis(amidinooxamide); bis(amidinomalonamide); bis(amidinosuccinamide); bis(amidinophthalamide); 2-amidinoacetamide (malonamamidine); N-methyl-2-amidinoacetamide; N-ethyl-2-amidinoacetamide; N-phenyl-2-amidinoacetamide; N-benzyl-2-amidinoacetamide; N-cyclohexyl-2-amidinoacetamide; N,N'-dimethyl-2-amidinoacetamide; N,N'-diethyl-2-amidinoacetamide; N,N'-diphenyl-2-amidinoacetamide; N,N'dibenzyl-2-amidinoacetamide; N,N'-dicyclohexyl-2-amidinoacetamide; 2-N-acylaminothiazole; 2-N-acylaminooxazole; 2-N-acylaminoimidazole; 3-N-acylaminopyrazole; 3-N-acylamino-1,2,4-triazole; and 5-N-acylaminotetrazole.

N-O Valence Stabilizer #4: Examples of imidoylamides, bis(imidoylamides), and poly(imidoylamides) (N-O Bidentates, N-O Tridentates, and N-O Tetradentates) that meet the requirements for use as "wide band" valence stabilizers for $Co^{+3}$ include, but are not limited to: acetimidoylacetamide; acetimidoylpropanamide; acetimidoylbutanamide; acetimidoylbenzamide; acetimidolytoluamide; acetimidoylcyclohexamide; propimidoylpropanamide; butimidoylbutanamide; benzimidoylbenzamide; ethylenebis(acetimidoylacetamide); propylenebis(acetimidoylacetamide); and phenylenebis(acetimidoylacetamide).

N-O Valence Stabilizer #5: Examples of O-amidinocarbamates, bis(O-amidinocarbamates), and poly(O-amidinocarbamates) (N-O Bidentates and N-O Tetradentates) that meet the requirements for use as "wide band" valence stabilizers for $Co^{+3}$ include, but are not limited to: O-amidinocarbamate; N-methyl-O-amidinocarbamate; N-ethyl-O-amidinocarbamate; N-isopropyl-O-amidinocarbamate; N-butyl-O-amidinocarbamate; N-benzyl-O-amidinocarbamate; N-phenyl-O-amidinocarbamate; N-tolyl-O-amidinocarbamate; N-naphthyl-O-amidinocarbamate; N-cyclohexyl-O-amidinocarbamate; N-norbornyl-O-amidinocarbamate; N-adamantyl-O-amidinocarbamate; N,N'-dimethyl-O-amidinocarbamate; N,N'-diethyl-O-amidinocarbamate; N,N'-diisopropyl-O-amidinocarbamate; N,N'-dibutyl-O-amidinocarbamate; N,N'-dibenzyl-O-amidinocarbamate; N,N'-diphenyl-O-amidinocarbamate; N,N'-ditolyl-O-amidinocarbamate; N,N'-dinaphthyl-O-amidinocarbamate; N,N'-dicyclohexyl-O-amidinocarbamate; N,N'-dinorbornyl-O-amidinocarbamate; N,N'-diadamantyl-O-amidinocarbamate; ethylenebis(O-amidinocarbamate); propylenebis(O-amidinocarbamate); phenylenebis(O-amidinocarbamate); piperazinebis(O-amidinocarbamate); oxalylbis(O-amidinocarbamate); malonylbis(O-amidinocarbamate); succinylbis(O-amidinocarbamate); phthalylbis(O-amidinocarbamate); 2-O-carbamatothiazole; 2-O-carbamatooxazole; 2-O-carbamatoimidazole; 3-O-carbamatopyrazole; 3-O-carbamato-1,2,4-triazole; and 5-carbamatotetrazole.

N-O Valence Stabilizer #6: Examples of S-amidinothiocarbamates, bis(S-amidinothiocarbamates), and poly(S-amidinothiocarbamates) (N-O Bidentates and N-O Tetradentates) that meet the requirements for use as "wide band" valence stabilizers for $Co^{+3}$ include, but are not limited to: S-amidinothiocarbamate; N-methyl-S-amidinothiocarbamate; N-ethyl-S-amidinothiocarbamate; N-isopropyl-S-amidinothiocarbamate; N-butyl-S-amidinothiocarbamate; N-benzyl-S-amidinothiocarbamate; N-phenyl-S-amidinothiocarbamate; N-tolyl-S-amidinothiocarbamate; N-naphthyl-S-amidinothiocarbamate; N-cyclohexyl-S-amidinothiocarbamate; N-norbornyl-S-amidinothiocarbamate; N-adamantyl-S-amidinothiocarbamate; N,N'-dimethyl-S-amidinothiocarbamate; N,N'-diethyl-S-amidinothiocarbamate; N,N'-diisopropyl-S-amidinothiocarbamate; N,N'-dibutyl-S-amidinothiocarbamate; N,N'-dibenzyl-S-amidinothiocarbamate; N,N'-diphenyl-S-amidinothiocarbamate; N,N'-ditolyl-S-amidinothiocarbamate; N,N'-dinaphthyl-S-amidinothiocarbamate; N,N'-dicyclohexyl-S-amidinothiocarbamate; N,N'-dinorbornyl-S-amidinothiocarbamate; N,N'-diadamantyl-S-amidinothiocarbamate; ethylenebis(S-amidinothiocarbamate); propylenebis(S-amidinothiocarbamate); phenylenebis(S-amidinothiocarbamate); piperazinebis(S-amidinothiocarbamate); oxalylbis(S-amidinothiocarbamate); malonylbis(S-amidinothiocarbamate); succinylbis(S-amidinothiocarbamate); phthalylbis(S-amidinothiocarbamate); 2-O-monothiocarbamatotbiazole; 2-O-monothiocarbamatooxazole; 2-O-monothiocarbamatoimidazole; 3-O-monothiocarbamatopyrazole; 3-O-monothiocarbamato-1,2,4-triazole; and 5-O-monothiocarbamatotetrazole.

N-O Valence Stabilizer #7: Examples of diimidosulfuric acid, bis(diimidosulfuric acid), and derivatives thereof (N-O Bidentates and N-O Tetradentates) that meet the requirements for use as "wide band" valence stabilizers for $Co^{+3}$ include, but are not limited to: diimidosulfuric acid; O-phenyldiimidosulfuric acid; O-benzyldiimidosulfuric acid, O-cyclohexyldiimidosulfuric acid, O-norbornyldiimidosulfuric acid, O,O'-diphenyldiimidosulfuric acid; O,O'-dibenzyldiimidosulfuric acid, O,O'-dicyclohexyldiimidosulfuric acid, and O,O'-dinorbornyldiimidosulfuric acid.

N-O Valence Stabilizer #8: Examples of phosphorimidic acid, bis(phosphorimidic acid); and poly(phosphorimidic acid), and derivatives thereof(N-O Bidentates, N-O Tetradentates) that meet the requirements for use as "wide band" valence stabilizers for $Co^{+3}$ include, but are not limited to: phosphorimidic acid; O-phenyiphosphorimidic acid; O-benzylphosphorimidic acid; O-cyclohexyiphosphorimidic acid; O-norbornyiphosphorimidic acid; O,O'-diphenylphosphorimidic acid; O,O'-dibenzylphosphorimidic acid; O,O'-dicyclohexylphosphorimidic acid; and O,O'-dinorbomyiphosphorimidic acid.

N-O Valence Stabilizer #9: Examples of phosphoric triamides, bis(phosphoric triamides), and poly(phosphoric triamides) (N-O Bidentates and N-O Tetradentates) that meet the requirements for use as "wide band" valence stabilizers for $Co^{+3}$ include, but are not limited to: phosphoric triamide; phosphoramidic dihydrazide; N-phenylphosphoric triamide, N-benzylphosphoric triamide; N-cyclohexylphosphoric triamide; N-norbornylphosphoric triamide; N,N'-diphenylphosphoric triamide, N,N'-dibenzylphosphoric triamide; N,N'-dicyclohexyiphosphoric triamide; and N,N'-dinorbornylphosphoric triamide.

N-O Valence Stabilizer #10: Examples of phosphoramidic acid, phosphorodiamidic acid, bis(phosphoramidic acid), bis(phosphorodiamidic acid), poly(phosphoramidic acid), poly(phosphorodiamidic acid), and derivatives thereof (N-O Bidentates and N-O Tetradentates) that meet the requirements for use as "wide band" valence stabilizers for $Co^{+3}$ include, but are not limited to: phosphoramidic acid, phosphorodiamidic acid, phosphoramidohydrazidic acid; phosphorohydrazidic acid; phosphorodihydrazidic acid; O-phenylphosphoramidic acid; O-benzylphosphoramidic acid; O-cyclohexylphosphoramidic acid; O-norbornyiphosphoramidic acid; O,O'-diphenylphosphoramidic acid; O,O'-dibenzylphosphoramidic acid; O,O'-dicyclohexyiphosphoramidic acid; and O,O'-dinorbomylphosphoramidic acid.

N-O Valence Stabilizer #11: Examples of N-acyl 7-aminobenzylidenimines (N-O Bidentates or N-O Tetradentates) that meet the requirements for use as "wide band" valence stabilizers for $Co^{+3}$ include, but are not limited to: N-acetyl 7-methylaminobenzylidenimine; N-acetyl 7-phenylaminobenzylidenimine; N-benzoyl 7-methylaminobenzylidenimine; and N-benzoyl 7-phenylaminobenzylidenimine.

N-O Valence Stabilizer #12: Examples of oximes, dioximes, and poly(oximes) (N-O Bidentates, N-O Tridentates, and N-O Tetradentates) that meet the requirements for use as "wide band" valence stabilizers for $Co^{+3}$ include, but are not limited to: acetaldoxime (Hado); acetoxime (acetone oxime) (Hato); butanone oxime; pentanone oxime; hexanone oxime; pinacolone oxime; heptanone oxime; octanone oxime; cyclopentanone oxime; cyclohexanone oxime; cycloheptanone oxime; cyclooctanone oxime; cyclopentanedione dioxime; cyclohexanedione dioxime; cycloheptanedione dioxime; cyclooctanedione dioxime; isatin dioxime; benzaldehyde oxime; naphthaldehyde oxime; norbomanone oxime; camphor oxime; dimethylglyoxime ($H_2DMG$); diethylglyoxime; diisopropylglyoxime; ditertbutylglyoxime; dicyanoglyoxime; dicyanamidoglyoxime; diphenyiglyoxime (Hdfg); dibenzylglyoxime; dicyclohexylglyoxime; dinorbornylglyoxime; camphorquinone dioxime (Hcqd); nopinoquinone dioxime (Hnqd); butyraldoxime; propionaldoxime; furildioxime; and thienyldioxime.

N-O Valence Stabilizer #13: Examples of carbonyl oximes, bis(carbonyl oximes), and poly(carbonyl oximes) (N-O Bidentates, N-O Tridentates, and N-O Tetradentates) that meet the requirements for use as "wide band" valence stabilizers for $Co^{+3}$ include, but are not limited to: diacetyl monoxime (2,3-butanedione monoxime); benzil monoxime (1,2-diphenylethanedione monoxime); 1,2-dicyclohexylethanedione monoxime; 1,2-(trifluoromethyl) ethanedione monoxime; 1,2-dinorbomylethanedione monoxime; cyclopentanedione monoxime; cyclohexanedione monoxime; cycloheptanedione monoxime; cyclooctanedione monoxime; camphorquinone oxime; 3-hydroxyiminopentane-2,4-dione; and 4-isonitrosopyralozone.

N-O Valence Stabilizer #14: Examples of imine oximes, bis (imine oximes), and poly(imine oximes) (including 2-nitrogen heterocyclic oximes) (N-O Bidentates, N-O Tridentates, N-O Tetradentates, and N-O Hexadentates) that meet the requirements for use as "wide band" valence stabilizers for $Co^{+3}$ include, but are not limited to: 3-(methylimino)butan-2-one oxime; 4-(methylimino)hexan-3-one oxime; 1,2-diphenyl-2-(methylimino)ethan-1-one oxime; 1,2-diphenyl-2-(phenylimino)ethan-1-one oxime; 1,2-dicyclohexyl-2-(methylimino)ethan-1-one oxime; 1,2-dicyclohexyl-2-(cyclohexylimino)ethan-1-one oxime; 1,2-dinorbornyl-2-(methylimino)ethan-1-one oxime; N,N'-methylenebis-(3-iminobutan-2-one oxime); N,N'-methylenebis-(4-iminohexan-3-one oxime); N,N'-methylenebis-(1,2-diphenyl-2-iminoethan-1-one oxime); N,N'-methylenebis-(1,2-dicyclohexyl-2-iminoethan-1-one oxime); N,N'-methylenebis-(1,2-dinorbornyl-2-iminoethan-1-one oxime); N,N'-ethylenebis-(3-iminobutan-2-one oxime); N,N'-ethylenebis-(4-iminohexan-3-one oxime); N,N'-ethylenebis-(1,2-diphenyl-2-iminoethan-1-one oxime); N,N'-ethylenebis-(1,2-dicyclohexyl-2-iminoethan-1-one oxime); N,N'-ethylenebis-(1,2-dinorbornyl-2-iminoethan-1-one oxime); N,N'-propylenebis-(3-iminobutan-2-one oxime); N,N'-propylenebis-(4-iminohexan-3-one oxime); N,N'-propylenebis-(1,2-diphenyl-2-iminoethan-1-one oxime); N,N'-propylenebis-(1,2-dicyclohexyl-2-iminoethan-1-one oxime); N,N'-propylenebis-(1,2-dinorbomyl-2-iminoethan-1-one oxime); diacetylazine oxime (Hazio); 2-pyridinaldoxime (Hpao); methyl 2-pyridyl ketone oxime; ethyl 2-pyridyl ketoxime; phenyl 2-pyridyl ketone oxime (Hppk); benzyl 2-pyridyl ketoxime; di(2-pyridyl) ketone oxime; methyl 2-pyrrolyl ketone oxime; ethyl 2-pyrrolyl ketone oxime; phenyl 2-pyrrolyl ketone oxime; di(2-pyrrolyl) ketone oxime; and tris(2-aldoximo-6-pyndyl)phosphine.

N-O Valence Stabilizer #15: Examples of hydroxy oximes, bis(hydroxy oximes), and poly(hydroxy oximes) (including 2-oxygen heterocyclic oximes) (N-O Bidentates, N-O Tridentates, N-O Tetradentates, and N-O Hexadentates) that meet the requirements for use as "wide band" valence stabilizers for $Co^{+3}$ include, but are not limited to: 3-hydroxybutan-2-one oxime; 4-hydroxyhexan-3-one oxime; benzoin oxime (bo)(1,2-diphenyl-2-hydroxyethanone oxime); 1,2-di(trifluoromethyl)-2-hydroxyethanone oxime; 1,2-dicyclohexyl-2-hydroxyethanone oxime; 1,2-dinorbomyl-2-hydroxyethanone oxime; salicylaldoxime (so)(saldox); 2-hydroxy-1-naphthaldehyde oxime; 2-furanaldoxime; furildioxime; methyl 2-furanyl ketone oxime; ethyl 2-furanyl ketoxime; phenyl 2-furanyl ketone oxime; benzyl 2-furanyl ketoxime; di(2-furanyl) ketone oxime; and 2,5-(oximinomethyl)phenol.

N-O Valence Stabilizer #16: Examples of amino oximes, bis(amino oximes), and poly(amino oximes) (N-O Bidentates, N-O Tridentates, N-O Tetradentates, and N-O Hexadentates) that meet the requirements for use as "wide band" valence stabilizers for $Co^{+3}$ include, but are not limited to: 3-(methylamino)butan-2-one oxime (HMeabo); 4-(methylamino)hexan-3-one oxime (HEtabo); 1,2-diphenyl-2-(methylamino)ethanone oxime (HPhabo); 1,2-diphenyl-2-(phenylamino)ethanone oxime; 1,2-dicyclohexyl-2-(methylamino)ethanone oxime (HcyHxabo); 1,2-dicyclohexyl-2-(cyclohexylamino)ethanone oxime; 1,2-di(trifluoromethyl)-2-(methylamino)ethanone oxime; 1,2-dinorbornyl-2-(methylamino)ethanone oxime (HNorbabo); N,N'-ethylenebis-(3-aminobutan-2-one oxime)(Habopn); N,N'-ethylenebis-(4-aminohexan-3-one oxime); N,N'-ethylenebis-(1,2-diphenyl-2-aminoethanone oxime); N,N'-ethylenebis-(1,2-dicyclohexyl-2-aminoethanone oxime); N,N'ethylenebis-(1,2-di(trifluoromethyl)-2-aminoethanone oxime); N,N'-ethylenebis-(1,2-dinorbornyl-2-aminoethanone oxime); N,N'-propylenebis-(3-aminobutan-2-one oxime)(Habopn); N,N'-propylenebis-(4-aminohexan-3 -one oxime); N,N'-propylenebis-(1,2-diphenyl-2-aminoethanone oxime); N,N'-propylenebis-(1,2-dicyclohexyl-2-aminoethanone oxime); N,N'-propylenebis-(1,2-di(trifluoromethyl)-2-aminoethanone oxime); N,N'-propylenebis-(1,2-dinorbornyl-2-aminoethanone oxime); 2,2'-iminobis(acetamidoxime); 1-diethylamino-3-butanoxime; and di-2-pyridyl ketone oxime.

N-O Valence Stabilizer #17: Examples of amido oximes, bis(amido oximes), and poly(amido oximes) (N-O Bidentates, N-O Tridentates, N-O Tetradentates, and N-O Hexadentates) that meet the requirements for use as "wide band" valence stabilizers for $Co^{+3}$ include, but are not limited to: formamide oxime; acetamide oxime; propanamide oxime; butanamide oxime; benzamide oxime (Hbamox); naphthamide oxime; diformamide dioxime; salicylamide oxime; and 4-imidazolamide oxime.

N-O Valence Stabilizer #18: Examples of azo oximes, bis(azo oximes), and poly(azo oximes) (N-O Bidentates, N-O Tridentates, N-O Tetradentates, and N-O Hexadentates) that meet the requirements for use as "wide band" valence stabilizers for $Co^{+3}$ include, but are not limited to: acetaldehyde phenyihydrazone oxime; propionaldehyde phenylhydrazone oxime; and benzaldehyde phenylhydrazone oxime. Also includes hydrazone oximes.

N-O Valence Stabilizer #19: Examples of 2-nitrosophenols (o-quinone monoximes) (N-O Bidentates) that meet the requirements for use as "wide band" valence stabilizers for $Co^{+3}$ include, but are not limited to: 2-nitrosophenol; 1-nitroso-2-naphthol (Honn); 2-nitroso-1-naphthol (Htnn); 3-nitrosopyrocatechol; 3,6-dinitrosopyrocatechol; 2-nitrosoresorcinol; 2,4-dinitrosoresorcinol; 2,4,6-trinitrosoresorcinol; 2-nitrosohydroquinone; 2,6-dinitrosohydroquinone; 2,3,5,6-tetranitrosohydroquinone; 4-nitrosopyrogallol; 4,6-dinitrosopyrogallol; 2-nitrosophloroglucinol; 2,4,6-trinitrosophloroglucinol; 7-nitroso-6-hydroxyindazole; Pigment Green 12 (C.I. 10020); Naphthol Green; and nitroso-R-salt.

N-O Valence Stabilizer #20: Examples of 2-nitrophenols (N-O Bidentates) that meet the requirements for use as "wide band" valence stabilizers for $Co^{+3}$ include, but are not limited to: 2-nitrophenol; 2,3-dinitrophenol; 2,4-dinitrophenol; 2,5-dinitrophenol; 2,6-dinitrophenol; 2,4,6-trinitrophenol (picric acid); 2-amino-4,6-dinitrophenol (picramic acid); 1-nitro-2-naphthol; 2-nitro-1-naphthol; 3-nitropyrocatechol; 3,6-dinitropyrocatechol; 2-nitroresorcinol; 2,4-dinitroresorcinol; 2,4,6-trinitroresorcinol (styphnic acid); 2-nitrohydroquinone; 2,6-dinitrohydroquinone; 2,3,5,6-tetranitrohydroquinone; 4-nitropyrogallol; 4,6-dinitropyrogallol; 2-nitrophioroglucinol; 2,4,6-trinitrophioroglucinol; dinitrocresol; 7-nitro-6-hydroxyindazole; Dinoseb; Eosin; Naphthol Yellow; and Martius Yellow.

N-O Valence Stabilizer #21: Examples of hydroxamates (hydroxylamines), bis(hydroxamates), and poly(hydroxamates) (N-O Bidentates, N-O Tetradentates, and N-O Hexadentates) that meet the requirements for use as "wide band" valence stabilizers for $Co^{+3}$ include, but are not limited to: acetohydroxamic acid; propianohydroxamic acid; butyrohydroxamic acid; crotonohydroxamic acid; sorbohydroxamic acid; benzohydroxamic acid ($BH_2$); toluichydroxamic acid; salicyihydroxamic acid ($SH_2$); phenylacetohydroxamic acid ($PhH_2$); anthranilhydroxamic acid ($AnH_2$); nicotinehydroxamic acid ($NicH_2$); picolinehydroxamic acid; cyclohexanehydroxamic acid ($CH_2$); quinoline 8-hydroxamic acid ($QH_2$); cinnamylhydroxamic acid ($CnH_2$); oxaldihydroxamic acid ($OxalH_2$); succinylbis-N-phenylhydroxamic acid ($SuH_2$); adipylbis-N-phenylhydroxamic acid ($AdH_2$); glyoxalhydroxamic acid ($GH_2$); 2-thiophenecarbohydroxamic acid; thenoylhydroxamic acid; N-phenylbenzohydroxamic acid; N-tolylberizohydroxamic acid; N-phenylacetohydroxamic acid; N-phenyl-2-thenoylhydroxamic acid; N-tolyl-2-thenoylhydroxamic acid; and polyhydroxamic acids.

N-O Valence Stabilizer #22: Examples of N-nitrosohydroxylamines, bis(N-nitrosohydroxylamines), and poly(N-nitrosohydroxylamines) (N-O Bidentates, N-O Tetradentates, and N-O Hexadentates) that meet the requirements for use as "wide band" valence stabilizers for $Co^{+3}$ include, but are not limited to: N-nitrosophenylhydroxylamine (cupferron); N-nitrosonaphthylhydroxylamine (neocupferron); N-nitrosoanthracylhydroxylamine; N-nitroso(2-pyridyl)hydroxylamine; and N-nitroso(2-thiophenyl)hydroxylamine.

N-O Valence Stabilizer #23: Examples of amino acids, ortho-aminocarboxylic acids, peptides, polypeptides, and proteins [N-O Bidentates, N-O Tridentates, and N-O Tetradentates; possibly S-O dentates for sulfur-contg. examples such as penicillamine and cystine] that meet the requirements for use as "wide band" valence stabilizers for $Co^{+3}$ include, but are not limited to: alanine (Ala); arginine (Arg); asparagine (Asn); aspartic acid (Asp); cysteine (Cys); cystine (Cys or Cys.Cys); dihydroxyphenylalanine (Dopa); glutamic acid (Glu); glutamine (Gln); glycine (Gly); histidine (His); isoleucine (Ile); leucine (Leu); lysine (Lys); methionine (Met); penicillamine (Pen); phenylalanine (Phe); tolylalanine (tala); proline (Pro); sarcosine; serine (Ser); threonine (Thr); tryptophan (Trp); tyrosine (Tyr); and valine (Val) as amino acid examples; 2-pyridinecarboxylic acid (picolinic acid), 2-pyrazinecarboxylic acid, 2,3-dicarboxypyrazine, and anthranilic acid as ortho-aminocarboxylic acid examples; Gly-GluO; Hgly-Gly; Gly-MetO; Met-GlyO; Gly-TyrO; Ala-HisO; Gly-His-GlyO; Gly-Gly-His; Gly-Leu-TyrO; penta-GlyO; His-His; triaminoisobutyrate; tetra-GlyO; Pro-Gly; and Gly-Met as peptide examples; and azurin, carbonic anhydrase C; carboxypeptidase; concanavalin A; cytochrome b; cytochrome c; erythrocruorin; ferredoxin; haemerythrin; haemoglobin; myoglobin; parvalbumin; albumin; plastocyanin; rubredoxin; superoxide dismutase; thermolysin; and trysin as protein examples; N-acylamino acids; aminocaproic acid; and 3,5-diiodotyrosine.

N-O Valence Stabilizer #24: Examples of amides, bis(amides), and poly(amides), including lactams (N-O bidentates, N-O tridentates, and N-O tetradentates) that meet the requirements for use as "narrow band" valence stabilizers for $Co^{+3}$ include, but are not limited to: acetamide; propionamide; butanamide; benzamide (benzoylamide)(1-phenylformamide); 1-naphthylformamide; toluamide; 1-cyclohexylformamide); 1-norbornylformamide; 1-adamantylformamide; N,N-dimethylformamide (DMF) (DMFA); N,N-dimethylacetamide (DMAC); N,N-dimethylbenzamide; N,N-diethylformamide; N,N-diethylacetamide; decanamide; dodecanamide; tetradecanamide; hexadecanamide; octadecanamide; lactobionic acid amide; (hydroxyalkylthio)succinamides; (mercaptoalkoxy)succinamides; polycaproamides; glycinamide; aminoalkylanilides; amidopolyamines (apa); bis(1-phenylethylamide); oxalic semiamide; malonic semiamide; succinic semiamide; bis(1,1'-benzotriazolyl)dicarboxamide; nicotinamide; acetanilide (N-phenylacetamide); formanilide (N-phenylformamide); benzanilide (N-phenylbenzamide); N-methylformanilide; acetanilide; nicotinanilide; 4'-hydroxyacetanilide (acetaminophen); 2-pyrrolidone; methyl-2-pyrrolidone (NMP); 2-piperidone (valerolactam); caprolactam; polymethylenepolyamine dipropionamide; polyacrylamides; polypyrrolidones [including polyvinylpyrrolidone (povidone)(PVP)]; pyrazolidinones; pyrazolones; diazepinones; N-alkylazaalkene lactams; and N-(2-hydroxyalkyl)azaalkene lactams.

N-O Valence Stabilizer #25: Examples of semicarbazones, bis(semicarbazones), and poly(semicarbazones) (N-O Bidentates, N-O Tetradentates, and N-O Hexadentates) that meet the requirements for use as "wide band" valence stabilizers for $Co^{+3}$ include, but are not limited to: acetaldehyde semicarbazone; acetone semicarbazone; pinacolone semicarbazone; benzaldehyde semicarbazone; naphthaldehyde semicarbazone; norbornanone semicarbazone; camphor semicarbazone; nopinone semicarbazone; 2-pyridinaldehyde semicarbazone; salicylaldehyde semicarbazone; quinolinaldehyde semicarbazone; isatin disemicarbazone; camphorquinone disemicarbazone; camphorquinone disemicarbazone; picolinaldehyde semicarbazone; dipyridyl glyoxal disemicarbazone; di-2-pyridyl ketone semicarbazone; methyl-2-pyridyl ketone semicarbazone; glyoxal disemicarbazone; acetophenone semicarbazone; biacetyl monoxime semicarbazone; acetamidobenzaldehyde semicarbazone; thymolaldosemicarbazone; thiophene-2-aldehyde semicarbazone; phthalaldehyde disemicarbazone; phthalimide disemicarbazone; furaldehyde semicarbazone; naphthoquinone semicarbazone; phenanthrequinone semicarbazone; cyclohexanedione disemicarbazone; ionone semicarbazone; bis-semicarbazone of diethyl-3,4-dioxadioate; and lawsone semicarbazone.

N-O Valence Stabilizer #26: Examples of acyl hydrazones, bis(acyl hydrazones), and poly(acyl hydrazones) (N-O Bidentates, N-O Tetradentates, and N-O Hexadentates) that meet the requirements for use as "wide band" valence stabilizers for $Co^{+3}$ include, but are not limited to: acetaldehyde N-formylhydrazone; acetaldehyde N-benzoylhydrazone; acetone N-formylhydrazone; acetone N-benzoylhydrazone; pinacolone N-formylhydrazone; pinacolone N-benzoylhydrazone; benzaldehyde N-formylhydrazone; benzaldehyde N-benzoylhydrazone; naphthaldehyde N-formylhydrazone; naphthaldehyde N-benzoylhydrazone; norbomanone N-formylhydrazone; norbomanone N-benzoylhydrazone; camphor N-formylhydrazone; camphor N-benzoylhydrazone; nopinone N-formylhydrazone; nopinone N-benzoylhydrazone; 2-pyridinaldehyde N-formyihydrazone; 2-pyridinaldehyde N-benzoylhydrazone; salicylaldehyde N-formylhydrazone; salicylaldehyde N-benzoylhydrazone; quinolinaldehyde N-formylhydrazone; quinolinaldehyde N-benzoylhydrazone; furan-2-aldehyde N-formylhydrazone; furan-2-aldehyde N-benzoylhydrazone; naphthoquinone N-formylhydrazone; naphthoquinone N-benzoylhydrazone; ionone N-formyihydrazone; ionone N-benzoylhydrazone; lawsone N-formylhydrazone; and lawsone N-benzoylhydrazone.

N-O Valence Stabilizer #27: Examples of carbazones (diazenecarboxylic hydrazides), bis(carbazones), and poly(carbazones) (N-O Bidentates, N-O Tetradentates, and N-O Hexadentates) that meet the requirements for use as "wide band" valence stabilizers for $Co^{+3}$ include, but are not limited to: diphenylcarbazone; 2-phenylcarbazone; dinaphthylcarbazone; and 2-naphthylcarbazone.

N-O Valence Stabilizer #28: Examples of azo compounds with hydroxyl or carboxy or carbonyl substitution at the ortho- (for aryl) or alpha- or beta- (for alkyl) positions, Bis [o-(HO-) or alpha- or beta-(HO-)azo compounds], or Poly[o-(HO-) or alpha- or beta-(HO-)azo compounds) (N-O Bidentates, N-O Tridentates, N-O Tetradentates, or N-O Hexadentates) that meet the requirements for use as "wide band" valence stabilizers for $Co^{+3}$ include, but are not limited to: 2-hydroxyazobenzene [1-(phenylazo)-2-phenol]; 2,2-dihydroxyazobenzene (o,o'dihydroxyazobenzene); (2-furan) azobenzene; Direct Blue 2B; 1-(4-nitrophenylazo)-2-naphthol; 1-(2-hydroxyphenylazo)-2-naphthol; 1-(2-methoxyphenylazo)-2-naphthol; pyridineazo-2-naphthol (PAN); pyridineazoresorcinol (PAR); 1-phenyl-4-(2-hydroxypheriylazo)-5-pyrazolone; 1-phenyl-4-(2-methoxyphenylazo)-5-pyrazolone; o-hydroxy-o'-(beta-aminoethylamino) azobenzene; 2-hydroxy-2'-methoxymethylemoxyazobenzene; methyl red; turquoise blue (reactive blue); sunset yellow; amaranth; tartrazine; Eriochrome Black T; tropeolins; Allura Red; amaranth; Acid Alizarin Violet N; Acid Blue 29; Acid Orange 8, 63, and 74; Acid Red 1, 4, 8, 37, 88, 97, 114, 151, and 183; Acid Violet 7; Acid Yellow 25,29, 34, 42, 76, and 99; Brilliant Black BN; Brilliant Crocein; Bordeaux R; Calcion; Chicago Sky Blue; Chromotrope; Cibacron Brilliant Red; Cibacron Brilliant Yellow; Crocein Orange; Crystal Scarlet; Calmagite; Direct Blue 71; Direct Red 23, 80, and 81; Direct Violet 51; Direct Yellow 8 and 27; Fast Black; Flavazin; Mordant Blue 9; Mordant Brown 1 and 33; Napthol Blue Black; New Coccine; Nitrazine Yellow; Nitrosulfonazo III; Orange II; Orange G, OT, and B; Ponceau 3R and SX; Polar Yellow; 2-oxazolylazobenzene; and 2-benzoxazolylazobenzene.

N-O Valence Stabilizer #29: Examples of diazeneformamides, diazeneacetamides, bis(diazeneformamides), bis(diazeneacetamides), poly(diazeneformamides), and poly(diazeneacetamides) (N-O Bidentates, N-O Tetradentates, and N-O Hexadentates) that meet the requirements for use as "wide band" valence stabilizers for $Co^{+3}$ include, but are not limited to: diazeneformamide, diazeneacetamide, phenyldiazenefonnamide, diphenyldiazeneformamide, phenyldiazeneacetamide, and diphenyldiazeneacetamide.

N-O Valence Stabilizer #30: Examples of diazeneformic acids, diazeneacetic acids, bis(diazeneformic acids), bis(diazeneacetic acids), poly(diazeneformic acids), poly(diazeneacetic acids) and derivatives thereof (N-O Bidentates, N-O Tetradentates, N-O Hexadentates) that meet the requirements for use as "wide band" valence stabilizers for $Co^{+3}$ include, but are not limited to: diazeneformic acid, diazeneacetic acid, phenyldiazeneformic acid, diphenyldiazeneformic acid, phenyldiazeneacetic acid, and diphenyldiazeneacetic acid.

N-O Valence Stabilizer #31: Examples of diazeneformaldehydes, diazeneacetaldehydes, bis(diazeneformaldehydes), bis(diazeneacetaldehydes), poly(diazeneformaldehydes), and poly(diazeneacetaldehydes) (N-O Bidentates, N-O Tetradentates and N-O Hexadentates) that meet the requirements for use as "wide band" valence stabilizers for $Co^{+3}$ include, but are not limited to: diazeneformaldehyde, diazeneacetaldehyde, phenyldiazeneformaldehyde, diphenyldiazeneformaldehyde, phenyldiazeneacetaldehyde, and diphenyldiazeneacetaldehyde.

N-O Valence Stabilizer #32: Examples of diazenediformamides, diazenediacetamides, bis(diazenediformamides), bis(diazenediacetamides), poly(diazenediformamides), and poly(diazenediacetamides) (N-O Tridentates and N-O Hexadentates) that meet the requirements for use as "wide band" valence stabilizers for $Co^{+3}$ include, but are not limited to: diazenediformamide, diazenediacetamide, diphenydiazenediformamide, tetraphenyldiazenediformamide, diphenyldiazenediacetamide, and tetraphenyldiazenediacetamide.

N-O Valence Stabilizer #33: Examples of diazenediformic acids, diazenediacetic acids, bis(cliazenediformic acids), bis(diazenediacetic acids), poly(diazenediformic acids), poly(diazenediacetic acids) and derivatives thereof (N-O Tridentates and N-O Hexadentates) that meet the requirements for use as "wide band" valence stabilizers for $Co^{+3}$ include, but are not limited to: diazenediformic acid, diazenediacetic acid, phenyldiazenediformic acid, diphenyldiazenediformic acid, phenyldiazenediacetic acid, and diphenyldiazenediacetic acid.

N-O Valence Stabilizer #34: Examples of diazenediformaldehydes, diazenediacetaldehydes, bis(diazenediformaldehydes), bis(diazenediacetaldehydes), poly(diazenediformaldehydes), and poly(diazenediacetaldehydes) (N-O Tridentates and N-O Hexadentates) that meet the requirements for use as "wide band" valence stabilizers for $Co^{+3}$ include, but are not limited to: diazenediformaldehyde, diazenediacetaldehyde, diphenyldiazenediformaldehyde, and diphenyldiazenediacetaldehyde.

N-O Valence Stabilizer #35: Examples of ortho-hydroxy (or -carboxy) substituted formazans, bis(o-hydroxy or -carboxy substituted formazans), and poly(o-hydroxy or -carboxy substituted formazans) (N-O Bidentates, N-O Tridentates, N-O Tetradentates, and N-O Hexadentates) that meet the requirements for use as "wide band" valence stabilizers for $Co^{+3}$ include, but are not limited to: 1-(2-hydroxyphenyl)-3,5-diphenylformazan; 1-(2-methoxyphenyl)-3,5-diphenylformazan; 1,5-bis(2-hydroxyphenyl)-3-phenylformazan; and 5-bis(2-methoxyphenyl)-3-phenylformazan.

N-O Valence Stabilizer #36: Examples of ortho-hydroxy (or -carboxy) substituted azines (including ketazines), bis(o-hydroxy or carboxy substituted azines), and poly(o-hydroxy or carboxy substituted azines) (N-O Bidentates, N-O Tridentates, N-O Tetradentates, and N-O Hexadentates) that meet the requirements for use as "wide band" valence stabilizers for $Co^{+3}$ include, but are not limited to: 2-hydroxy-l-benzalazine; 2-hydroxy-1-naphthalazine; and 2-hydroxy-l-cyclohexanonazine.

N-O Valence Stabilizer #37: Examples of Schiff Bases with one Imine (C=N) Group and with ortho- or alpha- or beta-hydroxy or carboxy or carbonyl substitution (N-O Bidentates, N-O Tridentates, N-O Tetradentates, N-O Pentadentates, or N-O Hexadentates) that meet the requirements for use as "wide band" valence stabilizers for $Co^{+3}$ include, but are not limited to: N-(Salicylaldehydo)isopropylamine; N-(2-Furfuralo)isopropylamine; N-(2-Acetylfurano)isopropylamine; N-(2-Hydroxyacetophenono)isopropylamine; N-(Pyridoxalo)isopropylamine; N-(Salicylaldehydo)cyclohexylamine; N-(2-Furfuralo)cyclohexylamine; N-(2-Acetylfurano)cyclohexylamine; N-(2-Hydroxyacetophenono)cyclohexylamine; N-(Pyridoxalo)cyclohexylamine; N-(Salicylaldehydo)aniline; N-(2-Furfuralo)aniline (Stenhauz salt); N-(2-Acetylfurano)aniline; N-(2-Hydroxyacetophenono)aniline; N-(Pyridoxalo)aniline; N-(Salicylaldehydo)aminonorbornane; N-(2-Furfuralo)aminonorbornane; N-(2-Acetylfurano)aminonorbornane; N-(2-Hydroxyacetophenono)aminonorbornane; N-(Pyridoxalo)aminonorbornane; (Salicylaldehydo)anisidine; 2-salicylideneiminobenzothiazole; (Salicylaldehydo)sulfamethazine; and N'-histidine-3-methoxysalicylidenimine (V-his); N-(o-carboxybenzaldehydo)-2-aminophenol; N-(salicylaldehydo)isatin; N-(2-furfuralo)isatin; N-(2-acetylfurano)isatin; N-pyridoxalo)isatin; N-(2-hydroxyacetophenono)isatin; hydrofuraniide; 2-furancarboxaldehyde phenylhydrazone; 2-furancarboxaldehyde 2-pyridyl hydrazone; salicylaldehyde phenylhydrazone; and salicylaldehyde 2-pyridyl hydrazone. Also includes hydrazones with ortho-O substitution.

N-O Valence Stabilizer #38: Examples of Schiff Bases with two Imine (C=N) Groups and with ortho- or alpha- or beta-hydroxy or carboxy or carbonyl substitution (N-O Tridentates, N-O Tetradentates, N-O Pentadentates, or N-O Hexadentates) that meet the requirements for use as "wide band" valence stabilizers for $Co^{+3}$ include, but are not limited to: N,N'-(2,5-Furandicarboxaldehydo)diisopropylamine; N,N'-(2,5-Furandicarboxaldehydo)dicyclohexylamine; N,N'-(2,5-Furandicarboxaldehydo)dianiline; N,N'-(2,5-Furandicarboxaldehydo)di-aminonorbornane; N,N'-(o-Hydroxyphthalicdialdehydo)diisopropylamine; N,N'-(o-Hydroxyphthalicdialdehydo)dicyclohexylamine; N,N'-(o-Hydroxyphthalicdialdehydo)dianiline; N,N'-(o-Hydroxyphthalicdialdehydo)di-aminonorbornane; N,N'-(o-Hydroxyformylcamphoro)diisopropylamine; N,N'-(o-Hydroxyformylcamphoro)dicyclohexylamine; N,N'-(o-Hydroxyformylcamphoro)dianiline; N,N'-(o-Hydroxyformylcamphoro)di-aminonorbornane; N,N'-(o-Hydroxydiacetylbenzeno)diisopropylamine; N,N'-(o-Hydroxydiacetylbenzeno)dicyclohexylamine; N,N'-(o-Hydroxydiacetylbenzeno)dianiline; N,N'-(o-Hydroxydiacetylbenzeno)di-aminonorbornane; N,N'-(3,6-Dihydroxy-1,2-cyclohexanono)diisopropylamine; N,N'-(3,6-Dihydroxy-1,2-cyclohexanono)dicyclohexylamine; N,N'-(3,6-Dihydroxy-1,2-cyclohexanono)dianiline; N,N'-(3,6-Dihydroxy-1,2-cyclohexanono)di-aminonorbornane; N,N'-(2,5-Diacetylfurano)diisopropylamine; N,N'-(2,5-Diacetylfurano)dicyclohexylamine; N,N'-(2,5-Diacetylfurano)dianiline; N,N'-(2,5-Diacetylfurano)di-aminonorbornane; N,N'-(Salicylaldehydo)ethylenediamine; N,N'-(o-Hydroxynaphtaldehydo)ethylenediamine; N,N'-(o-Hydroxyacetophenono)ethylenediamine; N,N'-(Salicylaldehydo)trimethylenediamine; N,N'-(o-Hydroxynaphthaldehydo)trimethylenediamine; N,N'-(o-Hydroxyacetophenono)trimethylenediamine; N,N'-(Salicylaldehydo)cyclohexane-1,2-diamine; N,N'-(o-Hydroxynaphthaldehydo)cyclohexane-1,2-diamine; N,N'-(o-Hydroxyacetophenono)

cyclohexane-1,2-diamine; N,N'-(Salicylaldehydo)-1,2-diaminobenzene; N,N'-(o-Hydroxynaphthaldehydo)-1,2-diaminobenzene; N,N'-(o-Hydroxyacetophenono)-1,2-diaminobenzene; N,N'-bis(salicylaldehydo)-1,12-diaminododecane (Saldn); N,N'-bis(3-methoxysalicylaldehydo)-o-phenyldiamine; N,N'-bis(3,4-difluorobenzaldehydo)-4,4'-benzidine; and N,N'-phenylenebis(3-methoxysalicylidenimine) (V-ph-V). Also includes hydrazones with ortho-O substitution.

N-O Valence Stabilizer #39: Examples of Schiff Bases with three Imine (C=N) Groups and with ortho- or alpha- or beta-hydroxy or carboxy or carbonyl substitution (N-O Tetradentates, N-O Pentadentates, or N-O Hexadentates) that meet the requirements for use as "wide band" valence stabilizers for $Co^{+3}$ include, but are not limited to: N,N',N"-(Salicylaldehydo)tris(2-aminoethyl)amine; N,N',N"-(o-Hydroxynaphthaldehydo)tris(2-aminoethyl)amine; and N,N',N"-(o-Hydroxyacetophenono)tris(2-aminoethyl)amine. Also includes hydrazones with ortho-O substitution.

N-O Valence Stabilizer #40: Examples of silylaminoalcohols (N-O Bidentates, N-O Tridentates, N-O Tetradentates, and N-O Hexadentates) that meet the requirements for use as "wide band" valence stabilizers for $Co^{+3}$ include, but are not limited to: silatranes.

N-O Valence Stabilizer #41: Examples of hydroxyalkyl imines (imino alcohols) (N-O Bidentates, N-O Tridentates, N-O Tetradentates, and N-O Hexadentates) that meet the requirements for use as "wide band" valence stabilizers for $Co^{+3}$ include, but are not limited to: 2-hydroxycyclohexylimine; 3-hydroxy-2-iminonorbornane; 2,2'-diiminodicyclohexyl ether; oxamide; 3-imino-1,5-pentanedialdehyde; iminodiacetic acid; and iminodipropionic acid.

N-O Valence Stabilizer #42: Examples of hydroxyaryl amines and hydroxyaryl imines (N-O Bidentates, N-O Tridentates, N-O Tetradentates, and N-O Hexadentates) that meet the requirements for use as "wide band" valence stabilizers for $Co^{+3}$ include, but are not limited to: 2-aminophenol; 2-aminobenzoic acid (anthranilic acid); 2-aminoanisole; o-phenetidine; o-anisidine; 2-hydroxymethyl)-aipha-aminotoluene; 1-amino-2-naphthol; 2-amino-1-naphthol; 2,2'-di(aminomethyl)diphenylketone; isophoronediamine; tris-2,4,6-dimethylaminomethyl phenol; di(2-amino)phenyl ether; 1,3-di(2-amino)phenyl-2-hydroxypropane; 1,3-di(3-amino)phenyl-2-hydroxypropane; 1,3-di(2-hydroxy)phenyl-2-aminopropane; 1,3-di(3-hydroxy)phenyl-2-aminopropane; 2,2'-dihydroxyiminodibenzyl; 2,2'-iminodibenzoic acid; 2,2'-dihydroxyiminostilbene; poly(o-phenetidine); poly(o-aminophenol); poly(o-anisidine); and 3-(anilino)propionamide.

N-O Valence Stabilizer #43: Examples of five-membered heterocyclic rings containing one, two, three, or four nitrogen atoms at least one additional oxygen atom binding site not in a ring (N-O Bidentates, N-O Tridentates, N-O Tetradentates, or N-O Hexadentates) that meet the requirements for use as "wide band" valence stabilizers for $Co^{+3}$ include, but are not limited to: 2-hydroxypyrrole; 2-(methylhydroxy)methylpyrrole; 2,5-(hydroxymethyl)pyrrole; 2,5-(methylhydroxymethyl)pyrrole; imidazoline-2-one (2-hydroxyimidazole); 2-hydroxythiazoline; 2-hydroxybenzimidazole; 2-hydroxybenzothiazole; 2-hydroxybenzoxazole; 2-hydantoin; di-2-pyridyiglyoxal (2,2'-pyridil); bis((1-pyrazolyl)methane) ether; bis(2-(1-pyrazolyl)ethane)ether; bis(benzimidazolylmethane)ether; bis(benzimidazolylethane) ether; tris(imidazolyl)methanol; tris(imidazoiylmethane) methanol; N-hydroxymethyl-N,N-(benzimidazolylmethane)amine; N-(2-hydroxyethyl)-N,N-(benzimidazolylmethane)amine; N,N'-di(benzimidazolylmethane)-1,3-diamino-2-hydroxypropane; N,N,N',N'-tetrakis(benzimidazolylmethane)-1,3-diamino-2-hydroxypropane; bis(N,N-((4-imidazolyl)methane)2-aminoethane)ether; 4-carboxybenzotriazole; antipyrine; 4-aminoantipyrine (aap); hydantoin; aminoalkyihydantoins; 2,5-oxazolidinedione; benzyldibenzoyltriazole (bdbt); 5-hydroxymethylimidazole; dicarboxyalkylbenzotriazoles; bis(hyclroxyphenyi)aminotriazoles; pyrrole-2-carboxaldehyde; (oxopyrrolidinylalkyl)triazoies; alkoxybenzotriazoles; aryioxybenzotriazoles; 3-salicylamido-4,5-dihydro-1,2,4-triazoie; 5-(alkoxy)benzotriazole; (polyoxyalkylene)oxazolidines; 1-(dialkylaminomethyl)-5-carboxyalkylbenzotriazole; 1-(2-hydroxyethyi)imidazoline; 1-acetoxyimidazole; 1-acetylimidazole; benzotriazolecarboxylic acid; poly(oxyalkylated)pyrazoles; poly(oxyalkylated)thiadiazoles; 1,2,4-triazole-3-carboxylic acid; 5-hydroxypyrazole; 3-phenyl-1,2,4-triazol-5-one (ptr); 1-acetylbenzimidazole; 1-[(acetoxy)ethyl]benzimidazole; creatinine; indole-2-carboxylic acid; pyrrole-2-carboxylic acid; imidazole-2-carboxylic acid; pyrazole-2-carboxylic acid; and 1,1'-oxalyldiimidazole.

N-O Valence Stabilizer #44: Examples of six-membered heterocyclic rings containing one, two, three, or four nitrogen atoms at least one additional oxygen atom binding site not in a ring (N-O Bidentates, N-O Tridentates, N-O Tetradentates, or N-O Hexadentates) that meet the requirements for use as "wide band" valence stabilizers for $Co^{+3}$ include, but are not limited to: 4-aminomethyl-3-pyridinemethanol (including pyridoxamine); 2-hydroxypyridine; 2-(methylhydroxy)methylpyridine; 2-(2-(methylhydroxy)ethyl)pyridine; 2,6-(hydroxymethyl)pyridine; 2,6-(methylhydroxymethyl)pyridine; 2-hydroxypyrimidine; 2-dihydroxymethylpyrimidine; 2-hydroxyquinoline; 8-hydroxyquinoline (oxine); 8-methyihydroxyquinoline; 2-hydroxyquinazoline; orotic acid (1,2,3,6-tetrahydro-2,6-dioxo-4-pyrimidmecarboxylic acid) (6-uracilcarboxylic acid); 1-methylpyrimidine-2-one; uracil; 6-hydroxypurine; bis(N,N,N',N'-tetra(2-(2-pyridyl)ethane)aminomethane)ether; bis(N,N,N',N'-tetra(2-(2-pyridyl)ethane)aminoethane)ether; quinazol-4-one; quinazol-2-one; 5-azathymine; 2-hydroxybenzimidazole (2-hbz); guanine; 1,3,5-triazin-6-one; 6-hydroxy-1,3,5-triazine; 4,6-dihydroxy-1,3,5-triazine; triazine carboxylic acids; 2,3-dihydroxypyridine; thiomorpholin-3-one; hydroxytetrahydropyrimidines; 2-piperazinones; 2-piperidinones; dilituric acid; actinoquinol; caffeine; citrazinic acid; picolinic acid; 2-quinolol; 2,6-dimethoxypyridine; quinoxaiine-2-carboxylic acid; flucytosine; hypoxanthine; hexamethylolmelamine; hydroorotic acid; isoorotic acid; xanthine; leucopterin; nitroorotic acid; 8-azaguanine; and cyanuric acid.

N-O Valence Stabilizer #45: Examples of five-membered heterocyclic rings containing one or two oxygen atoms at least one additional nitrogen atom binding site not in a ring (N-O Bidentates, N-O Tridentates, N-O Tetradentates, or N-O Hexadentates) that meet the requirements for use as "wide band" valence stabilizers for $Co^{+3}$ include, but are not limited to: 2-aminofuran; 2,5-diaminofuran; 2-aminomethylfuran; 2,5-di(aminomethyl)furan; 2-aminobenzofuran; and 2-amino-1,3-dioxolane.

N-O Valence Stabilizer #46: Examples of six-membered heterocyclic rings containing one or two oxygen atoms at least one additional nitrogen atom binding site not in a ring (N-O Bidentates, N-O Tridentates, N-O Tetradentates, or N-O Hexadentates) that meet the requirements for use as "wide band" valence stabilizers for $Co^{+3}$ include, but are not limited to: 2-aminopyran; 2,6-diaminopyran; 2-aminomethylpyran; 2,6-di(aminomethyl)pyran; and 2-aminobenzopyran.

N-O Valence Stabilizer #47: Examples of five-membered heterocyclic rings containing one, two, three, or four nitrogen atoms at least one additional oxygen atom binding site in a separate ring (N-O Bidentates, N-O Tridentates, N-O Tetradentates) that meet the requirements for use as "wide band" valence stabilizers for $Co^{+3}$ include, but are not limited to: 2-(2-furan)pyrrole; 2,5-di(2-furan)pyrrole; 2-(2-pyran)pyrrole; 2,5-di(2-pyran)pyrrole; 2,5-di(2-pyrrole)furan; and 2,6-di(2-pyrrole)pyran.

N-O Valence Stabilizer #48: Examples of six-membered heterocyclic rings containing one, two, three, or four nitrogen atoms at least one additional oxygen atom binding site in a separate ring (N-O Bidentates, N-O Tridentates, N-O Tetradentates) that meet the requirements for use as "wide band" valence stabilizers for $Co^{+3}$ include, but are not limited to: 2-(2-furan)pyridine; 2,6-di(2-furan)pyridine; 2-(2-pyran)pyridine; 2,6-di(2-pyran)pyridine; 2,5-di(2-pyridyl)furan; 2,6-di(2-pyridyl)pyran; and drometrizole.

N-O Valence Stabilizer #49: Examples of two-, three-, four-, six-, eight-, and ten-membered macrocyclics, macrobicyclics, and macropolycyclics (including catapinands, cryptands, cyclidenes, and sepulchrates) wherein all binding sites are composed of nitrogen (usually amine or imine groups) or oxygen (usually hydroxy, carboxy, or carbonyl groups) and are not contained in component heterocyclic rings (N-O Bidentates, N-O Tridentates, N-O Tetradentates, and N-O Hexadentates) that meet the requirements for use as "wide band" valence stabilizers for $Co^{+3}$ include, but are not limited to: azaoxacyclobutane ([4]aneNO); azaoxacyclopentane ([5]aneNO); azaoxacyclohexane ([6]aneNO); azaoxacycloheptane ([7]aneNO); azaoxacyclooctane ([8]aneNO); azaoxacyclobutene ([4]eneNO); azaoxacyclopentene ([5]eneNO); azaoxacyclohexene ([6]eneNO); azaoxacycloheptene ([7]eneNO); azaoxacyclooctene ([8]eneNO); azaoxacyclobutadiene ([4]dieneNO); azaoxacyclopentadiene ([5]dieneNO); azaoxacyclohexadiene ([6]dieneNO); azaoxacycloheptadiene ([7]dieneNO); azaoxacyclooctadiene ([8]dieneNO); diazaoxacyclohexane ([6]aneON$_2$); diazaoxacycloheptane ([7]aneON$_2$); diazaoxacyclooctane ([8]aneON$_2$); diazaoxacyclononane ([9]aneON$_2$); diazaoxacyclodecane ([10]aneON$_2$); diazaoxacycloundecane ([11]aneON$_2$); diazaoxacyclododecane ([12]aneON$_2$); diazaoxacyclohexene ([6]eneON$_2$); diazaoxacycloheptene ([7]eneON$_2$); diazaoxacyclooctene ([8]eneON$_2$); diazaoxacyclononene ([9]eneON$_2$); diazaoxacyclodecene ([10]eneON$_2$); diazaoxacycloundecene ([11]eneON$_2$); diazaoxacyclododecene ([12]eneON$_2$); diazadioxacyclooctane ([8]aneO$_2$N$_2$); diazadioxacyclononane ([9]aneO$_2$N$_2$); diazadioxacyclodecane ([10]aneO$_2$N$_2$); diazadioxacycloundecane ([11]aneO$_2$N$_2$); diazadioxacyclododecane ([12]aneO$_2$N$_2$); diazadioxacyclotridecane ([13]aneO$_2$N$_2$); diazadioxacyclotetradecane ([14]aneO$_2$N$_2$); diazadioxacyclopentadecane ([15]aneO$_2$N$_2$); diazadioxacyclohexadecane ([16]aneO$_2$N$_2$); diazadioxacycloheptadecane ([17]aneO$_2$N$_2$); diazadioxacyclooctadecane ([18]aneO$_2$N$_2$); diazadioxacyclononadecane ([19]aneO$_2$N$_2$); diazadioxacycloeicosane ([20]aneO$_2$N$_2$); diazadioxacyclooctadiene ([8]dieneO$_2$N$_2$); diazadioxacyclononadiene ([9]dieneO$_2$N$_2$); diazadioxacyclodecadiene ([10]dieneO$_2$N$_2$); diazadioxacycloundecadiene ([11]dieneO$_2$N$_2$); diazadioxacyclododecadiene ([12]dieneO$_2$N$_2$); diazadioxacyclotridecadiene ([13]dieneO$_2$N$_2$); diazadioxacyclotetradecadiene ([14]dieneO$_2$N$_2$); diazadioxacyclopentadecadiene ([15]dieneO$_2$N$_2$); diazadioxacyclohexadecadiene ([16]dieneO$_2$N$_2$); diazadioxacycloheptadecadiene ([17]dieneO$_2$N$_2$); diazadioxacyclooctadecadiene ([18]dieneO$_2$N$_2$); diazadioxacyclononadecadiene ([19]dieneO$_2$N$_2$); and diazadioxacycloeicosadiene ([20]dieneO$_2$N$_2$).

N-O Valence Stabilizer #50: Examples of four-, six-, eight-, or ten-membered macrocyclics, macrobicyclics, and macropolycyclics (including catapinands, cryptands, cyclidenes, and sepulchrates) wherein all binding sites are composed of nitrogen or oxygen and are contained in component heterocyclic rings (N-O Bidentates, N-O Tridentates, N-O Tetradentates, or N-O Hexadentates) that meet the requirements for use as "wide band" valence stabilizers for $Co^{+3}$ include, but are not limited to: dipyrandipyridines; difurandipyrroles; tripyrantripyridines; trifurantripyrroles; tetrapyrantetrapyridines; and tetrafurantetrapyrroles.

N-O Valence Stabilizer #51: Examples of four-, six-, eight-, or ten-membered macrocyclics, macrobicyclics, and macropolycyclics (including catapinands, cryptands, cyclidenes, and sepulchrates) wherein all binding sites are composed of nitrogen or oxygen and are contained in a combination of heterocyclic rings and amine, imine, hydroxy, carboxy, or carbonyl groups (N-O Bidentates, N-O Tridentates, N-O Tetradentates, or N-O Hexadentates) that meet the requirements for use as "wide band" valence stabilizers for $Co^{+3}$ include, but are not limited to: azaoxatetraphyrins; diazadioxatetraphyrins; azaoxahexaphyrins; diazadioxahexaphyrins; and triazatrioxahexaphyrins.

S-O Valence Stabilizer #1: Examples of 1,3-monothioketones (monothio-beta-ketonates), 1,3,5-monothioketones, 1,3,5-dithioketones, bis(1,3-monothioketones), and poly(1,3-monothioketones) (S-O Bidentates, S-O Tridentates, S-O Tetradentates) that meet the requirements for use as "wide band" valence stabilizers for $Co^{+3}$ include, but are not limited to: hexafluoropenta-2-thione-4-ketone; 1,3-diphenyl-1,3-propana-1-thione-3-ketone; benzoylthiopinacolone; cyclohexoylthiocyclohexoylmethane; diphenylpentanedithionate; tetramethylnonanedithionate; hexafluoroheptanedithionate; trifluoroheptanedithionate; 1-(2-thienyl)-butan-1-thione-3-ketone, 1-(2-naphthyl)-butan-1-thione-3-ketone, and trifluoroacetyithiocamphor.

S-O Valence Stabilizer #2: Examples of thiomalonamides (thiomalonodiamides), bis(thiomalonamides), and polythiomalonamides (S-O Bidentates, S-O Tridentates, S-O Tetradentates) that meet the requirements for use as "wide band" valence stabilizers for $Co^{+3}$ include, but are not limited to: thiomalonamide, N-phenylthiomalonamide, N-benzylthiomalonamide, N-pentafluorophenylthiomalonamide, N-cyclohexylthiomalonamide, N-norbornylthiomalonamide, N,N'-diphenylthiomalonamide, N,N'-dibenzylthiomalonamide, N,N'-dipentafluorophenyithiomalonamide, N,N'-dicyclohexyithiomalonamide, and N,N'-norbornyithiomalonamide.

S-O Valence Stabilizer #3: Examples of 2-thioacylacetamides, 2-acylthioacetamides, bis(2-thioacylacetamides), bis(2acylthioacetamides), poly(2-thioacylacetamides), and poly (2-Acylthioacetamides) (S-O Bidentates, S-O Tridentates, S-O Tetradentates) that meet the requirements for use as "wide band" valence stabilizers for $Co^{+3}$ include, but are not limited to: 2-acetothioacetamide, 2-thioacetoacetamide, N-phenyl-2-acetothioacetamide, N-pentafluorophenyl-2-acetothioacetamide, N-benzyl-2-acetothioacetamide, N-cyclohexyl-2-acetothioacetamide, N-norbornyl-2-acetothioacetamide, N-phenyl-2-benzothioacetamide, N-pentafluorophenyl-2-pentafluorobenzothioacetamide, and N-cyclohexyl-2-cyclohexothioacetamide.

S-O Valence Stabilizer #4: Examples of dithiodicarbonic diamides, bis(dithiodicarbonic diamides), and poly(dithiodicarbonic diamides) (S-O Bidentates, S-O Tridentates, S-O Tetradentates) that meet the requirements for use as "wide band" valence stabilizers for $Co^{+3}$ include, but are not limited to: dithiodicarbonic diamide; N-phenyldithiodicarbonic diamide; N-pentafluorophenyldithiodicarbonic diamide; N-benzyldithiodicarbonic diamide; N-cyclohexyldithiodicarbonic diamide; N-norbornyldithiodicarbonic diamide; N,N'-diphenyldithiodicarbonic diamide; N,N'-dipentafluorophenyldithiodicarbonic diamide; N,N'-dibenzyldithiodicarbonic diamide; N,N'-dicyclohexyldithiodicarbonic diamide; and N,N'-dinorbornyldithiodicarbonic diamide.

S-O Valence Stabilizer #5: Examples of monothiohypophosphoric acids, bis(monothiohypophosphoric acids), poly(monothiohypophosphoric acids), and derivatives thereof (S-O Bidentates, S-O Tridentates, S-O Tetradentates) that meet the requirements for use as "wide band" valence stabilizers for $Co^{+3}$ include, but are not limited to: monothiohypophosphoric acid, methylmonothiohypophosphoric acid, isopropylmonothiohypophosphoric acid, tert-butylmonothiohypophosphoric acid, phenylmonothiohypophosphoric acid, pentafluorophenylmonothiohypophosphoric acid, benzylmonothiohypophosphoric acid, cyclohexylmonothiohypophosphoric acid, norbornylmonothiohypophosphoric acid, dimethylmonothiohypophosphoric acid, diisopropylmonothiohypophosphoric acid, di-tert-butylmonothiohypophosphoric acid, diphenylmonothiohypophosphoric acid, di-pentafluorophenylmonothiohypophosphoric acid, dibenzylmonothiohypophosphoric acid, dicyclohexylmonothiohypophosphoric acid, and dinorbornylmonothiohypophosphoric acid.

S-O Valence Stabilizer #6: Examples of monothiohypophosphoramides, bis(monothiohypophosphoramides), and poly(monothiohypophosphoramides) (S-O Bidentates, S-O Tridentates, S-O Tetradentates) that meet the requirements for use as "wide band" valence stabilizers for $Co^{+3}$ include, but are not limited to: monothiohypophosphoramide, N-methylmonothiohypophosphoramide, N-isopropyimonothiohypophosphoramide, N-tert-butylmonothiohypophosphoramide, N-phenylmonothiohypophosphoramide, N-pentafluorophenylmonothiohypophosphoramide, N-benzylmonothiohypophosphoramide, N-cyclohexylmonothiohypophosphoramide, N-norbornylmonothiohypophosphoramide, N,N'''-dimethylmonothiohypophosphoramide, N,N'''-diisopropylmonothiohypophosphoramide, N,N'''-di-tert-butylmonothiohypophosphoramide, N,N'''-diphenylmonothiohypophosphoramide, N,N'''-dipentafluorophenylmonothiohypophosphoramide, N,N'''-dibenzylmonothiohypophosphoramide, N,N'''-dicyclohexylmonothiohypophosphoramide, and N,N'''-dinorbornylmonothiohypophosphoramide.

S-O Valence Stabilizer #7: Examples of monothioimidodiphosphoric acids, monothiohydrazidodiphosphoric acids, bis(monothioimidodiphosphoric acids), bis(monothiohydrazidodiphosphoric acids), poly(monothioimidodiphosphoric acids), poly(monothiohydrazidodiphosphoric acids), and derivatives thereof (S-O Bidentates, S-O Tridentates, S-O Tetradentates) that meet the requirements for use as "wide band" valence stabilizers for $Co^{+3}$ include, but are not limited to: monothioimidodiphosphoric acid, methylmonothioimidodiphosphoric acid, isopropylmonothioimidodiphosphoric acid, tert-butylmonothioimidodiphosphoric acid, phenylmonothioimidodipho sphoric acid, pentafluorophenylmonothioimidodiphosphoric acid, benzylmonothioimidodiphosphoric acid, cyclohexylmonothioimidodiphosphoric acid, norbornylmonothioimidodiphosphoric acid, dimethylmonothioimidodiphosphoric acid, diisopropyimonothioimidodiphosphoric acid, di-tert-butylmonothioimidodiphosphoric acid, diphenyimonothioimidodiphosphoric acid, di-pentafluorophenyimonothioimidodiphosphoric acid, dibenzylmonothioimidodiphosphoric acid, dicyclohexyimonothioimidodiphosphoric acid, and dinorbornylmonothioimidodiphosphoric acid.

S-O Valence Stabilizer #8: Examples of monothioimidodiphosphoramides, monothiohydrazidodiphosphoramides, bis(monothioimidodiphosphoramides), bis(monothiohydrazidodiphosphoramides), poly(monothioimidodiphosphoramides), and poly(monothiohydrazidodiphosphoramides) (S-O Bidentates, S-O Tridentates, S-O Tetradentates) that meet the requirements for use as "wide band" valence stabilizers for $Co^{+3}$ include, but are not limited to: monothioimidodiphosphoramide, N-methylmonothioimidodiphosphoramide, N-isopropylmonothioimidodiphosphoramide, N-tert-butylmonothioimidodiphosphoramide, N-phenylmonothioimidodiphosphoramide, N-pentafluorophenylmonothioimidodiphosphoramide, N-benzylmonothioimidodiphosphoramide, N-cyclohexylmonothioimidodiphosphoramide, N-norbornylmonothioimidodiphosphoramide, N,N'''-dimethylmonothioimidodiphosphoramide, N,N'''-diisopropylmonothioimidodiphosphoramide, N,N'''-di-tert-butylmonotbioimidodiphosphoramide, N,N'''-diphenylmonothioimidodiphosphoramide, N,N'''-dipentafluorophenylmonothioimidodiphosphoramide, N,N'''-dibenzylmonothioimidodiphosphoramide, N,N'''-dicyclohexylmonothioimidodiphosphoramide, and N,N'''-dinorbornylmonothioimidodiphosphoramide.

S-O Valence Stabilizer #9: Examples of monothiodiphosphoramides, bis(monothiodiphosphoramides), and poly(monothiodiphosphoramides) (S-O Bidentates, S-O Tridentates, S-O Tetradentates) that meet the requirements for use as "wide band" valence stabilizers for $Co^{+3}$ include, but are not limited to: monothiodiphosphoramide, N-methylmonothiodiphosphoramide, N-isopropylmonothiodiphosphoramide, N-tert-butylmonothiodiphosphoramide, N-phenylmonothiodiphosphoramide, N-pentafluorophenylmonothiodiphosphoramide, N-benzylmonothiodiphosphoramide, N-cyclohexylmonothiodiphosphoramide, N-norbornylmonothiodiphosphoramide, N,N'''-dimethylmonothiodiphosphoramide, N,N'''-diisopropylmonothiodiphosphoramide, N,N'''-di-tert-butylmonothiodiphosphoramide, N,N'''-diphenylmonothiodiphosphoramide, N,N'''-di-pentafluorophenylmonothiodiphosphoramide, N,N'''-dibenzylmonothiodiphosphoramide, N,N'''-dicyclohexylmonothiodiphosphoramide, and N,N'''-dinorbornylmonothiodiphosphoramide.

S-O Valence Stabilizer #10: Examples of monothiodiphosphoric acids, bis(monothiodiphosphoric acids), poly(monothiodiphosphoric acids), and derivatives thereof (S-O Bidentates, S-O Tridentates, S-O Tetradentates) that meet the requirements for use as "wide band" valence stabilizers for $Co^{+3}$ include, but are not limited to: monothiodiphosphoric acid, methylmonothiodiphosphoric acid, isopropylmonothiodiphosphoric acid, tert-butylmonothiodiphosphoric acid, phenylmonothiodiphosphoric acid, pentafluorophenylmonothiodiphosphoric acid, benzylmonothiodiphosphoric acid, cyclohexylmonothiodiphosphoric acid, norbornylmonothiodiphosphoric acid, dimethylmonothiodiphosphoric acid, diisopropylmonothiodiphosphoric acid, di-tert-butylmonothiodiphosphoric acid, diphenylmonothiodiphosphoric acid, di-pentafluorophenylmonothiodiphosphoric acid, dibenzylmonothiodiphosphoric acid, dicyclohexylmonothiodiphosphoric acid, and dinorbornylmonothiodiphosphoric acid.

S-O Valence Stabilizer #11: Examples of monothiocarbamates, bis(monothiocarbamates), and poly(monothiocarbamates) (including N-hydroxymonothiocarbamates and N-mercaptomonothiocarbamates) (S-O Bidentates, S-O Tridentates, and S-O Tetradentates) that meet the requirements for use as "wide band" valence stabilizers for $Co^{+3}$ include, but are not limited to: dimethylmonothiocarbamate (dmmtc); di(trifluorodimethyl)monothiocarbamate; diethylmonothiocarbamate (demtc); dipropylmonothiocarbamate; diisopropylmonothiocarbamate; dibutylmonothiocarbamate; ditertbutylmonothiocarbamate; dicyanamidomonothiocarbamate; diphenylmonothiocarbamate; di(pentafluorophenyl)monothiocarbamate; dibenzylmonothiocarbamate; dinaphthylmonothiocarbamate; dicyclohexylmonothiocarbamate; dinorbornylmonothiocarbamate; diadamantylmonothiocarbamate; pyrrolidinomonothiocarbamate (pyrmtc); piperidinomonothiocarbamate (pipmtc); morpholinomonothiocarbamate (mormtc); thiamorpholinomonothiocarbamate; 3-pyrrolinomonothiocarbamate; pyrrolomonothiocarbamate; oxazolomonothiocarbamate; isoxazolomonothiocarbamate; thiazolomonothiocarbamate; isothiazolomonothiocarbamate; indolomonothiocarbamate; carbazolomonothiocarbamate; pyrazolinomonothiocarbamate; imidazolinomonothiocarbamate; pyrazolomonothiocarbamate; imidazolomonothiocarbamate; indazolomonothiocarbamate; and triazolomonothiocarbamate.

As with the inorganic valence stabilizers, crosses between two or more organic stabilizers can be used. For example, in some instances it may be desirable to form a valence stabilizer out of a nitrogen-containing heterocyclic and an amine ligand. During the synthesis process, both of these materials will complex with the CoIII ion to produce a mixed nitrogen heterocyclic/amine valence stabilizer compound from the pigment solution.

3c) Narrow Band Inorganic Valence Stabilizers

Additional valence stabilizers can be used in conjunction with the CoIII ion for corrosion protection. However, these less typical stabilizers suffer from disadvantages that make their selection over the previously mentioned wide band valence stabilizers less desirable. For this reason, we term them "narrow band" valence stabilizers because of their limited applications. Narrow band stabilizers exhibit some limitation in their use when compared to wide band stabilizers. Narrow band inorganic stabilizers may be toxic or may complex CoIII only with difficulty. These narrow band stabilizers include, but are not limited to, bismuthates, germanates, arsenates, titanates, zirconates, and hafnates. For example, valence stabilizers using arsenate are less desirable because their inherent toxicity is very large (greater than CrVI), although they may be very effective at inhibiting corrosion when used with CoIII. Arsenates could be used as CoIII valence stabilizers in situations where the toxicity of the pigment is not a factor in its use.

Other narrow band stabilizers may result in CoIII-stabilizer compounds with limited stability, an undesirable solubility range, or limited electrostatic characteristics, and they would be useful only in limited applications. Formation of a protective shell of octahedra and tetrahedra around the CoIII ion is difficult but possible with phosphates ($P^{+5}$), borates ($B^{+3}$), aluminates ($Al^{+3}$), and silicates ($Si^{+4}$). Combinations of these materials, such as phosphosilicates, aluminosilicates, or borosilicates may also function as narrow band inorganic valence stabilizers. These compounds are known to form octahedra or tetrahedra, but tend to polymerize in chain-like structures when precipitated from aqueous solution under ambient conditions. The narrow band valence stabilizers can provide some degree of corrosion protection when complexed with CoIII. However, they do not achieve the high efficiency of wide band valence stabilizers when used by themselves. They can be used in combination with the wide band inorganic stabilizers described above to provide significant corrosion protection.

Conversely, modifications of wide band inorganic valence stabilizers can result in a complex with reduced corrosion inhibition. For example, heteropolymetallates can contain ions in addition to the desired $Co^{+3}$ ion. The central cavity of the heteropolymetallates can contain ions in addition to the desired $Co^{+3}$ ion. For example, the use of silicomolybdates, phosphomolybdates, silicotungstates, and phosphotungstates is possible. In these $Co^{+3}$-valence stabilizer complexes, $Si^{+4}$ or $P^{+5}$ ions also occupy the central cavity of the complex with the $Co^{+3}$ ion. The inclusion of additional ions in the central cavity reduces the stability of the complex, and thereby leads to lower corrosion protection. Nonetheless, these complexes also demonstrate some corrosion inhibiting activity. The additional ions that can be included within the central cavity of the heteropolymetallates described above depend upon the size of the central cavity, which in turn depends upon the specific chemistry exhibited by an inorganic valence stabilizer (e.g., moltbdate, tungstate, periodate, carbonate, etc.) In general, these additional ions must also be small so as to ensure the stability of the formed $Co^{+3}$-valence stabilized complex. Examples of small additional ions include, but are not limited to: $B^{+3}$, $Al^{+3}$, $Si^{+4}$, $P^{+5}$, $Ti^{+4}$, $V^{+5}$, $V^{+4}$, $Cr^{+6}$, $Cr^{+3}$, $Mn^{+4}$, $Mn^{+3}$, $Mn^{+2}$, $Fe^{+3}$, $Fe^{+2}$, $Co^{+2}$, $Ni^{+2}$, $Ni^{+3}$, $Ni^{+4}$, $Cu^{+2}$, $Cu^{+3}$, $Zn^{+2}$, $Ga^{+3}$, $Ge^{+4}$, $As^{+5}$, $As^{+3}$, $Z^{+4}$, and $Ce^{+4}$.

Water-soluble precursors for these materials are desirable. Typically, the free acids (e.g., silicomolybdic acid, phosphotungstic acid, borotungstic acid, etc.) offer the most water-soluble precursors for these materials.

3d) Narrow Band Organic Valence Stabilizers

Narrow band organic valence stabilizers include those general classes of chemical compounds that result in CoIII-valence stabilizer compounds that are either less stable, more soluble in water, or more toxic than the wide band organic stabilizers.

TABLE 2

Narrow Band Organic Valence Stabilizers for the $Co^{+3}$ Ion

| General Structural Name (Type of Organic) | Structural Representation |
|---|---|
| N Valence Stabilizer #1: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) and are not contained in Component Heterocyclic Rings (N—N Tridentates, N—N Tetradentates, and N—N Hexadentates) | Macrocyclic ligands containing five, seven, or nine nitrogen binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N Valence Stabilizer #2: Five-, or Seven-Membered Macrocyclics, Macrobicyclics, and Macropolycyclics (including Catapinands, Cryptands, Cyclidenes, and Sepulchrates) wherein all Binding Sites are composed of Nitrogen and are contained in Component 5-Membered Heterocyclic Rings (N—N Tridentates, N—N Tetradentates, or N—N Hexadentates) | Macrocyclic ligands containing a total of five or seven five-membered heterocyclic rings containing nitrogen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #3: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen and are contained in a Combination of 5-Membered Heterocyclic Rings and Amine or Imine Groups (N—N Tridentates, N—N Tetradentates, or N—N Hexadentates) | Macrocyclic ligands containing at least one 5-membered heterocyclic ring. These heterocyclic rings provide nitrogen binding sites to valence stabilize the central metal ion. Other amine or imine binding sites can also be included in the macrocyclic ligand, so long as the total number of binding sites is five, seven, or nine. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #4: Five- or Seven-Membered Macrocyclics, Macrobicyclics, and Macropolycyclics (including Catapinands, Cryptands, Cyclidenes, and Sepulchrates) wherein all Binding Sites are composed of Nitrogen and are contained in Component 6-Membered Heterocyclic Rings (N—N Tridentates, N—N Tetradentates, or N—N Hexadentates) | Macrocyclic ligands containing a total of five or seven six-membered heterocyclic rings containing nitrogen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #5: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen and are contained in a Combination of 6-Membered Heterocyclic Rings and Amine or Imine Groups (N—N Tridentates, N—N Tetradentates, or N—N Hexadentates) | Macrocyclic ligands containing at least one 6-membered heterocyclic ring. These heterocyclic rings provide nitrogen binding sites to valence stabilize the central metal ion. Other amine or imine binding sites can also be included in the macrocyclic ligand, so long as the total number of binding sites is five, seven, or nine. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N Valence Stabilizer #6: Silylamines and Silazanes, including Macrocyclic Derivatives, wherein at least one Nitrogen Atom is a Binding Site (N Monodentates, N—N Bidentates, N—N Tridentates, N—N Tetradentates, and N—N Hexadentates) | $N(SiR_3)_3$, $R'N(SiR_3)_2$, or $R'R''N(SiR_3)$ for silylamines; and $[RR''Si—NR']_x$ (x = 1-10) for silazanes where R, R', and R" represents H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| N Valence Stabilizer #7: Guanidines, Diguanidines, and Polyguanidines (N—N Bidentates, N—N Tridentates, N—N Tetradentates, and N—N Hexadentates) | $RR'—N—C(=NH)NR''R'''$, where R, R', R", and R''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| N Valence Stabilizer #8: Phosphonitrile Amides, and Bis(phosphonitrile amides) (N—N Bidentates, N—N Tetradentates) | RR'—N—P(=N)—N—R"R"', where R, R', R", and R"' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #9: Phosphonimidic Diamides, Bis(Phosphonimidic Diamides), and Poly(Phosphonimidic Diamides) (N—N Bidentates, N—N Tetradentates) | (NH=)PR""(—NRR')(—NR"R"'), where R, R', R", R"', and R"" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #10: Phosphonamidimidic Acid, Phosphonamidimidothioic Acid, Bis(Phosphonamidimidic Acid), Bis(Phosphonamidimidothioic Acid), Poly(Phosphonamidimidic Acid), Poly(Phosphonamidimidothioic Acid), and derivatives thereof (N—N Bidentates, and N—N Tetradentates) | (NH=)PR"'(—NRR')(—OR") for phosphonamidimidic acid and (NH=)PR"'(—NRR')(—SR") for phosphonamidimidothioic acid, where R, R', R", and R"' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #11: Pyridinaldimines, Bis(pyridinaldimines), and Poly(pyridinaldimines) (N—N Bidentates, N—N Tridentates, and N—N Tetradentates) | $C_5H_5N$—CR=NR', where $C_5H_5N$ is a pyridine derivative, R is typically an aromatic constituent (i.e. —$C_6H_5$), and R' represents H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N Valence Stabilizer #12: Hydrazones, Bis(hydrazones), and Poly(hydrazones) (N Monodentates, N—N Bidentates, N—N Tridentates, and N—N Tetradentates) | R—NH—N=R', where R and R' represent H or any organic functional group wherein the number of carbon atoms ranges from 0 to 40, optionally having halogen or polarizing or water-insolubilizing/solubilizing groups attached. (Either R or R' is typically an aryl group.) Ligand can also contain nonbinding N, O, S, or P atoms. |
| N Valence Stabilizer #13: Azo compounds including triazenes without chelate substitution at the ortho- (for aryl) or alpha- or beta-(for alkyl) positions, Bis(azo compounds), or Poly(azo compounds) (N Monodentates, N—N Bidentates, or N—N—N Tridentates) | R—N=N—R' for azo compounds, R—N=N—NH—R' for triazenes, where R, and R' represent H or any organic functional group wherein the number of carbon atoms ranges from 0 to 40, optionally having halogen or polarizing or water-insolubilizing/solubilizing groups attached. (Not including ortho-chelate substituted aryl azo compounds, and alpha- or beta-substituted alkyl azo compounds.) Ligand can also contain nonbinding N, O, S, or P atoms. |
| N Valence Stabilizer #14: Formazans, Bis(formazans), and Poly(formazans) without ortho-hydroxy, carboxy, thiol, mercapto, amino, or hydrazido substitution (N—N Bidentates, N—N Tetradentates, and N—N Hexadentates) | R—N=N—CR'=N—NR"R"', where R, R', R", and R"' represent H, or any organic functional group wherein the number of carbon atoms ranges from 0 to 40, optionally having halogen or polarizing or water-insolubilizing/solubilizing groups attached. (Not including ortho-hydroxy, carboxy, thiol, mercapto, amino, or hydrazido substitution.) Ligand can also contain nonbinding N, O, S, or P atoms. |
| N Valence Stabilizer #15: Hydramides (N—N Bidentates) | R—CH=N—CHR'—N=CHR", where R, R', and R" represent H, or any organic functional group wherein the number of carbon atoms ranges from 0 to 40, optionally having halogen or polarizing or water-insolubilizing/solubilizing groups attached. (R, R', and R" are typically aryl derivatives.) Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| N Valence Stabilizer #16: Azines (including ketazines), Bis(azines), and Poly(azines) without ortho-hydroxy, carboxy, thiol, mercapto, amino, or hydrazido substitution (N—N Bidentates, N—N Tetradentates, and N—N Hexadentates) | RR'C=N—N=CR"R'" or RR'C=N—NR"R'" (for ketazines), where R, R', R", and R'" represent H, or any organic functional group wherein the number of carbon atoms ranges from 0 to 40, optionally having halogen or polarizing or water-insolubilizing/solubilizing groups attached. (Not including ortho-hydroxy, carboxy, thiol, mercapto, amino, or hydrazido substitution.) Ligand can also contain nonbinding N, O, S, or P atoms. |
| N Valence Stabilizer #17: Schiff Bases with one Imine (C=N) Group and without ortho-(for aryl constituents) or alpha- or beta-(for alkyl constituents) hydroxy, carboxy, carbonyl, thiol, mercapto, thiocarbonyl, amino, imino, oximo, diazeno, or hydrazido substitution (N Monodentates) | RR'C=N—R", where R, R', and R" represent H, or any organic functional group wherein the number of carbon atoms ranges from 0 to 40, optionally having halogen or polarizing or water-insolubilizing/solubilizing groups attached. (Not including ortho-, alpha-, or beta-hydroxy, carboxy, carbonyl, thiol, mercapto, thiocarbonyl, amino, imino, oximo, diazeno, or hydrazido substitution.) Ligand can also contain nonbinding N, O, S, or P atoms. |
| N Valence Stabilizer #18: Isocyanide and Cyanamide and related ligands (N Monodentates) | Isocyanides, cyanamides, and related ligands where the nitrogen atom is directly complexed to the high valence metal ion. |
| N Valence Stabilizer #19: Nitrosyl and Nitrite and related ligands (N Monodentates) | Nitrosyl, nitrite, and related ligands where the nitrogen atom is bound directly to the high valence metal ion. |
| N Valence Stabilizer #20: Nitriles, Dinitriles, and Polynitriles (N Monodentates, N—N Bidentates, and N—N—N Tridentates) | R—CN, R—(CN)$_2$, R—(CN)$_x$, etc. where R represents H or any organic functional group wherein the number of carbon atoms ranges from 0 to 40, optionally having halogen or polarizing or water-insolubilizing/solubilizing groups attached. |
| N Valence Stabilizer #21: Azide ligands (N Monodentates, or N—N Bidentates) | Azide (—N$_3$) ligands bound directly to the high valence metal ion. Also includes organoazide derivatives (R—N$_3$), triazenido compounds (R—N$_3$—R'), phosphonyl azides (R—PO$_2$H—N$_3$), phosphoryl azides (O—PO$_2$H—N3), and sulfonyl azides (R—SO$_2$—N$_3$) where R and R' represent H or any organic functional group wherein the number of carbon atoms ranges from 0 to 35, optionally having halogen or polarizing or water-insolubilizing/solubilizing groups attached |
| S Valence Stabilizer #1: Monothioethers (S Monodentates) wherein at least one Sulfur Atom is a Binding Site | SH$_2$, SHR, SR$_2$, where R represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| S Valence Stabilizer #2: Disulfides (S Monodentates) wherein at least one Sulfur Atom is a Binding Site | R—S—S—R', where R and R' represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| S Valence Stabilizer #3: Dithioethers (S—S Bidentates) wherein at least one Sulfur Atom is a Binding Site | R—S—R'—S—R", where R, R', and R" represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| S Valence Stabilizer #4: Trithioethers (S—S Bidentates or S—S Tridentates) wherein at least one Sulfur Atom is a Binding Site | R—S—R'—S—R"—S—R'", where R, R', R", and R'" represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |

TABLE 2-continued

Narrow Band Organic Valence Stabilizers for the $Co^{+3}$ Ion

| General Structural Name (Type of Organic) | Structural Representation |
|---|---|
| S Valence Stabilizer #5: Tetrathioethers (S—S Bidentates, S—S Tridentates, or S—S Bidentates) wherein at least one Sulfur Atom is a Binding Site | R—S—R'—S—R"—S—R'"—S—R"", where R, R', R", R'", and R"" represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| S Valence Stabilizer #6: Hexathioethers (S—S Bidentates, S—S Tridentates, S—S Tetradentates, or S—S Hexadentates) wherein at least one Sulfur Atom is a Binding Site | R—S—R'—S—R"—S—R'"—S—R""—S—R""'—S—R""", where R, R', R", R'", R"", R""', and R""" represents H or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| S Valence Stabilizer #7: Five-Membered Heterocyclic Rings containing One or Two Sulfur Atoms wherein at least one Sulfur Atom is a Binding Site (S Monodentates or S—S Bidentates) | Five membered heterocyclic ring containing one or two sulfur atoms, both of which may function as binding sites. Can include other ring systems bound to this heterocyclic ring, but they do not coordinate with the stabilized, high valence metal ion. Ring can also contain O, N, P, As, or Se atoms. This 5-membered ring and/or attached, uncoordinating rings may or may not have halogen or polarizing or water-insolubilizing/solubilizing groups attached. |
| S Valence Stabilizer #8: Six-Membered Heterocyclic Rings containing One or Two Sulfur Atoms wherein at least one Sulfur Atom is a Binding Site (S Monodentates or S—S Bidentates) | Six membered heterocyclic ring containing just one or two sulfur atoms, both of which may function as binding sites. Can include other ring systems bound to this heterocyclic ring, but they do not coordinate with the stabilized, high valence metal ion. Ring can also contain O, N, P, As, or Se atoms. This 5-membered ring and/or attached, uncoordinating rings may or may not have halogen or polarizing or water-insolubilizing/solubilizing groups attached. |
| S Valence Stabilizer #9: Five-Membered Heterocyclic Rings containing One or Two Sulfur Atoms at least one additional Sulfur Atom Binding Site not in a Ring (S Monodentates, S—S Bidentates, S—S Tridentates, S—S Tetradentates, or S—S Hexadentates) | Five membered heterocyclic ring(s) containing one or two sulfur atoms. In addition, ligand contains additional sulfur-containing substituents (usually thiols or thioethers) that constitute S binding sites. Can include other ring systems bound to the heterocyclic ring or to the S-containing substituent, but they do not coordinate with the stabilized, high valence metal ion. Ring(s) can also contain O, N, P, As or Se atoms. This 5-membered ring(s) and/or attached, uncoordinating rings and/or S-containing substituent(s) may or may not have halogen or polarizing or water-insolubilizing/solubilizing groups attached. |
| S Valence Stabilizer #10: Six-Membered Heterocyclic Rings containing One or Two Sulfur Atoms at least one additional Sulfur Atom Binding Site not in a Ring (S Monodentates, S—S Bidentates, S—S Tridentates, S—S Tetradentates, or S—S Hexadentates) | Six membered heterocyclic ring(s) containing one or two sulfur atoms. In addition, ligand contains additional sulfur-containing substituents (usually thiols or thioethers) that constitute S binding sites. Can include other ring systems bound to the heterocyclic ring or to the S-containing substituent, but they do not coordinate with the stabilized, high valence metal ion. Ring(s) can also contain O, N, P, As or Se atoms. This 6-membered ring(s) and/or attached, uncoordinating rings and/or S-containing substituent(s) may or may not have halogen or polarizing or water-insolubilizing/solubilizing groups attached. |
| S Valence Stabilizer #11: Five-Membered Heterocyclic Rings containing One or Two Sulfur Atoms at least one additional Sulfur Atom Binding Site in a separate Ring (S Monodentates, S—S Bidentates, S—S Tridentates, S—S Tetradentates, or S—S Hexadentates) | Five membered heterocyclic ring(s) containing one or two sulfur atoms. In addition, ligand contains additional sulfur-containing rings that constitute S binding sites. Can include other ring systems bound to the S-containing heterocyclic rings, but they do not coordinate with the stabilized, high valence metal ion. Ring(s) can also contain O, N, P, As, or Se atoms. This 5-membered ring(s) and/or additional S-containing ring(s) and/or attached, |

TABLE 2-continued

Narrow Band Organic Valence Stabilizers for the Co$^{+3}$ Ion

| General Structural Name (Type of Organic) | Structural Representation |
|---|---|
| | uncoordinating rings may or may not have halogen or polarizing or water-insolubilizing/solubilizing groups attached. |
| S Valence Stabilizer #12: Six-Membered Heterocyclic Rings containing One or Two Sulfur Atoms at least one additional Sulfur Atom Binding Site in a separate Ring (S Monodentates, S—S Bidentates, S—S Tridentates, S—S Tetradentates, or S—S Hexadentates) | Six membered heterocyclic ring(s) containing one or two sulfur atoms. In addition, ligand contains additional sulfur-containing rings that constitute S binding sites. Can include other ring systems bound to the S-containing heterocyclic rings, but they do not coordinate with the stabilized, high valence metal ion. Ring(s) can also contain O, N, P, As, or Se atoms. This 6-membered ring(s) and/or additional S-containing ring(s) and/or attached, uncoordinating rings may or may not have halogen or polarizing or water-insolubilizing/solubilizing groups attached. |
| S Valence Stabilizer #13: Two-, Three-, Four-, Five-, Six-, Seven-, Eight-, Nine-, and Ten-Membered Macrocyclics, Macrobicyclics, and Macropolycyclics (including Catapinands, Cryptands, Cyclidenes, and Sepulchrates) wherein all Binding Sites are composed of Sulfur (usually thiol or thioether groups) and are not contained in Component Heterocyclic Rings (S—S Bidentates, S—S Tridentates, S—S Tetradentates, and S—S Hexadentates) | Macrocyclic ligands containing two to ten sulfur binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| S Valence Stabilizer #14: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur and are contained in Component 5-Membered Heterocyclic Rings (S—S Tridentates, S—S Tetradentates or S—S Hexadentates) | Macrocyclic ligands containing a total of four to ten five-membered heterocyclic rings containing sulfur binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S Valence Stabilizer #15: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur and are contained in a Combination of 5-Membered Heterocyclic Rings and Thiol, Thioether, or Thioketo Groups (S—S Tridentates, S—S Tetradentates, or S—S Hexadentates) | Macrocyclic ligands containing at least one 5-membered heterocyclic ring. These heterocyclic rings provide sulfur binding sites to valence stabilize the central metal ion. Other thiol, thioether, or thioketo binding sites can also be included in the macrocyclic ligand, so long as the total number of binding sites is four to ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S Valence Stabilizer #16: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur and are contained in Component 6-Membered Heterocyclic Rings (S—S Tridentates, S—S Tetradentates, or S—S Hexadentates) | Macrocyclic ligands containing a total of four to ten six-membered heterocyclic rings containing sulfur binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S Valence Stabilizer #17: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur and are contained in a Combination of 6-Membered Heterocyclic Rings and Thiol, | Macrocyclic ligands containing at least one 6-membered heterocyclic ring. These heterocyclic rings provide sulfur binding sites to valence stabilize the central metal ion. Other thiol, thioether, or thioketo binding sites can also be included in the macrocyclic ligand, so long as the total number of binding sites is four to ten. Can include other hydrocarbon/ring systems bound to this macrocyclic ligand, but |

TABLE 2-continued

Narrow Band Organic Valence Stabilizers for the $Co^{+3}$ Ion

| General Structural Name (Type of Organic) | Structural Representation |
|---|---|
| Thioether, or Thioketo Groups (S—S Tridentates, S—S Tetradentates, or S—S Hexadentates) | they do not coordinate with the stabilized, high valence metal ion. This ligand and/or attached, uncoordinating hydrocarbon/rings may or may not have halogen or polarizing or water-insolubilizing groups attached. |
| S Valence Stabilizer #18: Dithiobiurets (Dithioimidodicarbonic Diamides), Dithioisobiurets, Dithiobiureas, Trithiotriurets, Trithiotriureas, Bis(dithiobiurets), Bis(dithioisobiurets), Bis(dithiobiureas), Poly(dithiobiurets), Poly(dithioisobiurets), and Poly(dithiobiureas) (S—S Bidentates, S—S Tridentates, S—S Tetradentates) | RR'—N—C(=S)—NR"—C(=S)—NR'"R"" for dithiobiurets, and RR'—N—C(=S)—NR"—NH—C(=S)—NR'"R"" for dithiobiureas, where R, R', R", R'", and R"" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #19: Thioacylthioureas, Thioaroylthioureas, Bis(thioacylthioureas), Bis(thioaroylthioureas), Poly(thioacylthioureas), and Poly(thioaroylthioureas) (S—S Bidentates, S—S Tridentates, S—S Tetradentates) | RR'—N—C(=S)—NR"—C(=S)—R'" where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #20: Dithioacyl disulfides, Bis(dithioacyl disulfides), and Poly(dithioacyl disulfides) (S—S Bidentates, S—S Tridentates, S—S Tetradentates) | R—C(=S)—S—S—C(=S)—R' where R, and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #21: Tetrathioperoxydicarbonic Diamides, Bis(tetrathioperoxydicarbonic diamides), and poly(tetrathioperoxydicarbonic diamides) (S—S Bidentates, S—S Tridentates, S—S Tetradentates) | RR'—N—C(=S)—S—S—C(=S)—N—R"R'" where R, R', R", R'" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #22: Hexathio-, Pentathio-, and Tetrathioperoxydicarbonic Acids, Bis(hexathio-, pentathio-, and tetrathioperoxydicarbonic acids), poly(hexathio-, pentathio-, and tetrathioperoxydicarbonic acids), and derivatives thereof (S—S Bidentates, S—S Tridentates, S—S Tetradentates) | R—S—C(=S)—S—S—C(=S)—S—R' for hexathioperoxydicarbonic acids, R—O—C(=S)—S—S—C(=S)—S—R' for pentathioperoxydicarbonic acids, and R—O—C(=S)—S—S—C(=S)—O—R' for tetrathioperoxydicarbonic acids, where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #23: Dithioperoxydiphosphoramide, Bis(dithioperoxyphosphoramide), and Poly(dithioperoxydiphosphoramide) (S—S Bidentates, S—S Tridentates, S—S Tetradentates) | (RR'—N—)(R"R'"—N—)P(=S)—S—S—P(=S)(—N—R""R""')(—N—R"""R""""), where R, R', R", R'", R"", R""', R"""', and R""""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #24: Dithioperoxydiphosphoric Acids, Bis(dithioperoxyphosphoric Acids), Poly(dithioperoxydiphosphoric Acids), and derivatives thereof (S—S Bidentates, S—S Tridentates, S—S Tetradentates) | (R—O—)(R'—O—)P(=S)—S—S—P(=S)(—O—R")(—O—R'"); (R—O—)(R'—S—)P(=S)—S—S—P(=S)(—S—R")(—O—R'"); or (R—S—)(R'—S—)P(=S)—S—S—P(=S)(—S—R")(—S—R'"), where R, R', R", R'", R"", R""', R"""', and R""""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #25: Dithioimidodiphosphonic Acids, Dithiohydrazidodiphosphonic Acids, Bis(dithioimidodiphosphonic acids), | (R—O—)(R'—)P(=S)—NH—P(=S)(—R")(—O—R'"); (R—S—)(R'—)P(=S)—NH—P(=S)(—R")(—O—R'"); or (R—S—)(R'—)P(=S)—NH—P(=S)(—R")(—S—R'") for |

TABLE 2-continued

Narrow Band Organic Valence Stabilizers for the $Co^{+3}$ Ion

| General Structural Name (Type of Organic) | Structural Representation |
|---|---|
| Bis(dithiohydrazidodiphosphonic acids), Poly(dithioimidodiphosphonic acids), Poly(dithiohydrazidodiphosphonic acids), and derivatives thereof (S—S Bidentates, S—S Tridentates, and S—S Tetradentates) | dithioimidodiphosphonic acids, and —NH—NH— derivatives for dithiohydrazidodiphosphonic acids, where R, R', R", and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #26: Dithioimidodiphosphonamides, Dithiohydrazidodiphosphonamides, Bis(dithioimidodiphosphonamides), Bis(dithiohydrazidodiphosphonamides), Poly(dithioimidodiphosphonamides), and Poly(dithiohydrazidodiphosphonamides) (S—S Bidentates, S—S Tridentates, S—S Tetradentates) | (RR'—N—)(R"—)P(=S)—NH—P(=S)(—R''')(—N—R''''R''''') for dithioimidodiphosphonamides, and (RR'—N—)(R"—)P(=S)—NH—NH—P(=S)(—R''')(—N—R''''R''''') for dithiohydrazidodiphosphonamides, where R, R', R", R''', R'''', and R''''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #27: Dithiodiphosphonamides, Bis(dithiophosphonamides), and Poly(dithiodiphosphonamides) (S—S Bidentates, S—S Tridentates, S—S Tetradentates) | (RR'—N—)(R"—)P(=S)—S—P(=S)(—R''')(—N—R''''R'''''), or (RR'—N—)(R"—)P(=S)—O—P(=S)(—R''')(—N—R''''R'''''), where R, R', R", R''', R'''', and R''''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #28: Dithiodiphosphonic Acids, Bis(dithioiphosphonic Acids), Poly(dithiodiphosphonic Acids), and derivatives thereof (S—S Bidentates, S—S Tridentates, S—S Tetradentates) | (R—O—)(R'—)P(=S)—O—P(=S)(—R")(—O—R'''); (R—O—)(R'—)P(=S)—S—P(=S)(—R")(—O—R'''); (R—S—)(R'—)P(=S)—O—P(=S)(—R")(—S—R'''); or (R—S—)(R'—)P(=S)—S—P(=S)(—R")(—S—R'''); where R, R', R", and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #29: Dithioperoxydiphosphonamide, Bis(dithioperoxyphosphonamide), and Poly(dithioperoxydiphosphonamide) (S—S Bidentates, S—S Tridentates, S—S Tetradentates) | (RR'—N—)(R"—)P(=S)—S—S—P(=S)(—R''')(—N—R''''R'''''), where R, R', R", R''', R'''', and R''''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #30: Dithioperoxydiphosphonic Acids, Bis(dithioperoxyphosphonic Acids), Poly(dithioperoxyphosphonic Acids), and derivatives thereof (S—S Bidentates, S—S Tridentates, S—S Tetradentates) | (R—O—)(R'—)P(=S)—S—S—P(=S)(—R")(—O—R'''); or (R—S—)(R'—)P(=S)—S—S—P(=S)(—R")(—S—R'''), where R, R', R", and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #31: Dithiophosphonic Acids (Phosphonodithioic Acids), Bis(dithiophosphonic Acids), Poly(dithiophosphonic Acids), and derivatives thereof (S—S Bidentates, S—S Tridentates, S—S Tetradentates) | (O=)PR(—S—R')(—S—R") or (S=)PR(—S—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #32: Trithiophosphonic Acids (Phosphonotrithioic Acids), Bis(trithiophosphonic Acids), Poly(trithiophosphonic Acids), and derivatives thereof (S—S Bidentates, S—S | (S=)PR(—S—R')(—S—R"), where R, R', and R" represent H, $NH_2$ or any organic functional group wherein the number of carbon atoms ranges from 0 to 40, optionally having halogen or polarizing or water-insolubilizing/solubilizing groups attached. |

TABLE 2-continued

Narrow Band Organic Valence Stabilizers for the $Co^{+3}$ Ion

| General Structural Name (Type of Organic) | Structural Representation |
|---|---|
| Tridentates, S—S Tetradentates) | Ligand can also contain nonbinding N, O, S, or P atoms. |
| S Valence Stabilizer #33: Phosphono(dithioperoxo)thioic Acids), Bis[phosphono(dithioperoxo)thioic Acids], Poly[phosphono(dithioperoxo)thioic Acids], and derivatives thereof (S—S Bidentates, S—S Tridentates, S—S Tetradentates) | (O═)PR(—S—S—R')(—S—R") or (S═)PR(—S—S—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #34: Phosphono(dithioperoxo)dithioic Acids), Bis[phosphono(dithioperoxo)dithioic Acids], Poly[phosphono(dithioperoxo)dithioic Acids], and derivatives thereof (S—S Bidentates, S—S Tridentates, S—S Tetradentates) | (S═)PR(—S—S—R')(—S—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #35: S-(Alkylthio)thiocarboxylic Acids, S-(Arylthio)thiocarboxylic Acids, and S,S-thiobisthiocarboxylic Acids (S—S Bidentates and S—S Tridentates) | R—S—R'CSOH or R—S—R'CSSH for S-(alkylthio)thiocarboxylic and S-(arylthio)thiocarboxylic acids, and HSOCR—S—R'COSH or HSSCR—S—R'CSSH for S,S-thiobisthiocarboxylic acids, where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #36: S-(Alkyldisulfido)thiocarboxylic Acids, S-(Aryldisulfido)thiocarboxylic Acids, and S,S'-Disulfidobisthiocarboxylic Acids (S—S Bidentates and S—S Tridentates) | R—S—S—R'CSOH or R—S—S—R'CSSH for S-(alkyldisulfido)thiocarboxylic and S-(aryldisulfido)thiocarboxylic acids, and HSOCR—S—S—R'COSH or HSSCR—S—S—R'CSSH for S,S'-disulfidobisthiocarboxylic acids, where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #37: 1,2-Dithiolates, Bis(1,2-dithiolates), and Poly(1,2-dithiolates) (S—S Bidentates, S—S Tridentates, S—S Tetradentates) | R—CH(—SR")—CH(—SR''')—R', and R—C(—SR")═C(—SR''')—R', where R, R', R", and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #38: Rhodanines and Bis(rhodanines) (S—S Bidentates and S—S Tetradentates) | RN—C(═O)—CHR'—S—C(═S) for rhodanines, and R—[N—C(═O)—CHR'—S—C(═S)]$_2$ for bis(rhodanines), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #39: Dithiocarbimates, Bis(dithiocarbimates), and Poly(dithiocarbimates) (S—S Bidentates, S—S Tridentates, and S—S Tetradentates) | RN═C(SH)(SH), where R represents H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #40: Thioxanthates, Bis(thioxanthates), and Poly(thioxanthates) (S—S Bidentates and S—S Tetradentates) | $RS^+$═C(SH)(SH) or RS—C(═S)(SH), where R represents H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| S Valence Stabilizer #41: Xanthates, Bis(xanthates), and Poly(xanthates) (S—S Bidentates and S—S Tetradentates) | $RO^+$=C(SH)(SH) or RO—C(=S)(SH), where R represents H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #42: Phosphinodithioformates (S—S Bidentates) | Typically RR'R"P=C(SH)(SH) [pentavalent P], although RR'P—C(=S)(SH) [trivalent P] may be acceptable in some situations, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #43: Alkyl- and Aryl-Dithioborates, Trithioborates, Perthioborates, Bis(dithioborates), Bis(trithioborates), and Bis(perthioborates) (S—S Bidentates and S—S Tetradentates) | R—S—C(—S—R")—O—R' for dithioborates, R—S—C(—S—R")—S—R' for trithioborates, and R—S—S—C(—S—R")—S—R' for perthioborates, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #44: Alkyl- and Aryl-Dithioboronates, and Bis(dithioboronates) (S—S Bidentates and S—S Tetradentates) | R—C(—S—R")—S—R', where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #45: Trithioarsonic Acids (Arsonotrithioic Acids), Dithioarsonic Acids (Arsonodithioic Acids), Tetrathioarsonic Acids (Arsonotetrathioic Acids), and derivatives thereof (S—S Bidentates, S—S Tridentates, S—S Tetradentates) | (O=)As(—S—R)(—S—R')(—S—R") or (S=)As(—S—R)(—S—R')(—O—R") for trithioarsonic acid; (O=)As(—O—R)(—S—R')(—S—R") or (S=)As(—S—R)(—O—R')(—O—R") for dithioarsonic acid, or (S=)As(—S—R)(—S—R')(—S—R") for tetrathioarsonic acid, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #46: Trithioantimonic Acids (Stibonotrithioic Acids), Dithioantimonic Acids (Stibonodithioic Acids), Tetrathioantimonic Acids (Stibonotetrathioic Acids), and derivatives thereof (S—S Bidentates, S—S Tridentates, S—S Tetradentates) | (O=)Sb(—S—R)(—S—R')(—S—R") or (S=)Sb(—S—R)(—S—R')(—O—R") for trithioantimonic acid; (O=)Sb(—O—R)(—S—R')(—S—R") or (S=)Sb(—S—R)(—O—R')(—O—R") for dithioantimonic acid, or (S=)Sb(—S—R)(—S—R')(—S—R") for tetrathioantimonic acid, where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S Valence Stabilizer #47: Phosphine P-sulfides and Amino-substituted Phosphine sulfides (S Monodentates) | RR'R"P=S for phosphine P-sulfides, and (RR'N)(R"R"'N)(R""R""'N)P=S for amino-substituted phosphine sulfides, where R, R', R", R''', R"", and R""' represent H, Cl, Br, $NH_2$ or any organic functional group wherein the number of carbon atoms ranges from 0 to 40, optionally having halogen or polarizing or water-insolubilizing/solubilizing groups attached. (Rs are typically aromatic or heterocyclic for phosphine P-sulfides.) Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| S Valence Stabilizer #48: Arsine As-sulfides and Amino-substituted Arsine sulfides (S Monodentates) | RR'R"As=S for arsine As-sulfides, and (RR'N)(R"R"'N)(R""R""'N)As=S for amino-substituted arsine sulfides, where R, R', R", R'", R"", and R""' represent H, Cl, Br, $NH_2$ or any organic functional group wherein the number of carbon atoms ranges from 0 to 40, optionally having halogen or polarizing or water-insolubilizing/solubilizing groups attached. (Rs are typically aromatic or heterocyclic for arsine As-sulfides.) Ligand can also contain nonbinding N, O, S, or P atoms. |
| S Valence Stabilizer #49: Thiocyanate ligands (S Monodentates) | Thiocyanates bound directly to the high valence metal ion. |
| S Valence Stabilizer #50: Thiolates (S Monodentates) | Thiols (HS—R, HS—R—SH, etc.), where R and R' represent H or any organic functional group wherein the number of carbon atoms ranges from 0 to 35, optionally having halogen or polarizing or water-insolubilizing/solubilizing groups attached. |
| S Valence Stabilizer #51: Sulfide ligands (S Monodentates) | Sulfide (—$S^{2-}$) ligands bound directly to the high valence metal ion. |
| P Valence Stabilizer #1: Monophosphines (P Monodentates) wherein at least one Phosphorus Atom is a Binding Site | $PH_3$, $PH_2R$, $PHR_2$, and $PR_3$ where R represents H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #2: Diphosphines (a P—P Bidentate) wherein at least one Phosphorus Atom is a Binding Site | R'—P—R—P—R", where R, R', and R" represent H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #3: Triphosphines (either P—P Bidentates or P—P—P Tridentates) wherein at least one Phosphorus Atom is a Binding Site | R—P—R'—P—R"—P—R'", where R, R', R", and R'" represent H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #4: Tetraphosphines (P—P Bidentates, P—P Tridentates, or P—P Tetradentates) wherein at least one Phosphorus Atom is a Binding Site | R—P—R'—P—R"—P—R'"—P—R"", where R, R', R", R'", and R"" represent H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #5: Pentaphosphines (P—P Bidentates, P—P Tridentates, or P—P Tetradentates) wherein at least one Phosphorus Atom is a Binding Site | R—P—R'—P—R"—P—R'"—P—R""—P—R""', where R, R', R", R'", R"", and R""' represent H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #6: Hexaphosphines (P—P Bidentates, P—P Tridentates, P—P Tetradentates, or P—P Hexadentates) wherein at least one Phosphorus Atom is a Binding Site | R—P—R'—P—R"—P—R'"—P—R""—P—R""'—P—R"""', where R, R', R", R'", R"", R""', and R"""' represent H or any organic functional group wherein the number of carbon atoms ranges from 0 to 35, optionally having halogen or polarizing or water-insolubilizing/solubilizing groups attached. Ligand can also contain nonbinding N, P, As, O, S, or Se atoms. |
| P Valence Stabilizer #7: Five-Membered Heterocyclic Rings containing One, Two, or Three Phosphorus | Five membered heterocyclic ring containing one, two, or three phosphorus atoms, all of which may or may not function as binding sites. |

TABLE 2-continued

Narrow Band Organic Valence Stabilizers for the $Co^{+3}$ Ion

| General Structural Name (Type of Organic) | Structural Representation |
|---|---|
| Atoms wherein at least one Phosphorus Atom is a Binding Site (P Monodentates or P—P Bidentates) | Can include other ring systems bound to this heterocyclic ring, but they do not coordinate with the stabilized, high valence metal ion. Ring can also contain O, S, N, As, or Se atoms. This 5-membered ring and/or attached, uncoordinating rings may or may not have halogen or polarizing or water-insolubilizing/solubilizing groups attached. |
| P Valence Stabilizer #8: Six-Membered Heterocyclic Rings containing One, Two, or Three Phosphorus Atoms wherein at least one Phosphorus Atom is a Binding Site (P Monodentates or P—P Bidentates) | Six membered heterocyclic ring containing one, two, or three phosphorus atoms, all of which may or may not function as binding sites. Can include other ring systems bound to this heterocyclic ring, but they do not coordinate with the stabilized, high valence metal ion. Ring can also contain O, S, N, As, or Se atoms. This 6-membered ring and/or attached, uncoordinating rings may or may not have halogen or polarizing or water-insolubilizing/solubilizing groups attached. |
| P Valence Stabilizer #9: Five-Membered Heterocyclic Rings containing One, Two, or Three Phosphorus Atoms at least one additional Phosphorus Atom Binding Site not in a Ring (P Monodentates, P—P Bidentates, P—P Tridentates, P—P Tetradentates, or P—P Hexadentates) | Five membered heterocyclic ring(s) containing one, two, or three phosphorus atoms. In addition, ligand contains additional phosphorus-containing substituents (usually phosphines) that constitute P binding sites. Can include other ring systems bound to the heterocyclic ring or to the P-containing substituent, but they do not coordinate with the stabilized, high valence metal ion. Ring(s) can also contain O, N, S, As or Se atoms. This 5-membered ring(s) and/or attached, uncoordinating rings and/or P-containing substituent(s) may or may not have halogen or polarizing or water-insolubilizing/solubilizing groups attached. |
| P Valence Stabilizer #10: Six-Membered Heterocyclic Rings containing One, Two, or Three Phosphorus Atoms at least one additional Phosphorus Atom Binding Site not in a Ring (P Monodentates, P—P Bidentates, P—P Tridentates, P—P Tetradentates, or P—P Hexadentates) | Six membered heterocyclic ring(s) containing one, two, or three phosphorus atoms. In addition, ligand contains additional phosphorus-containing substituents (usually phosphines) that constitute P binding sites. Can include other ring systems bound to the heterocyclic ring or to the P-containing substituent, but they do not coordinate with the stabilized, high valence metal ion. Ring(s) can also contain O, N, S, As or Se atoms. This 6-membered ring(s) and/or attached, uncoordinating rings and/or P-containing substituent(s) may or may not have halogen or polarizing or water-insolubilizing/solubilizing groups attached. |
| P Valence Stabilizer #11: Five-Membered Heterocyclic Rings containing One, Two, or Three Phosphorus Atoms at least one additional Phosphorus Atom Binding Site in a separate Ring (P Monodentates, P—P Bidentates, P—P Tridentates, P—P Tetradentates, or P—P Hexadentates) | Five membered heterocyclic ring(s) containing one, two, or three phosphorus atoms. In addition, ligand contains additional phosphorus-containing rings that constitute P binding sites. Can include other ring systems bound to the P-containing heterocyclic rings, but they do not coordinate with the stabilized, high valence metal ion. Ring(s) can also contain O, N, S, As, or Se atoms. This 5-membered ring(s) and/or additional P-containing ring(s) and/or attached, uncoordinating rings may or may not have halogen or polarizing or water-insolubilizing/solubilizing groups attached. |
| P Valence Stabilizer #12: Six-Membered Heterocyclic Rings containing One, Two, or Three Phosphorus Atoms at least one additional Phosphorus Atom Binding Site in a separate Ring (P Monodentates, P—P Bidentates, P—P Tridentates, P—P Tetradentates, or P—P Hexadentates) | Six membered heterocyclic ring(s) containing one, two, or three phosphorus atoms. In addition, ligand contains additional phosphorus-containing rings that constitute P binding sites. Can include other ring systems bound to the P-containing heterocyclic rings, but they do not coordinate with the stabilized, high valence metal ion. Ring(s) can also contain O, N, S, As, or Se atoms. This 6-membered ring(s) and/or additional P-containing ring(s) and/or attached, |

TABLE 2-continued

Narrow Band Organic Valence Stabilizers for the $Co^{+3}$ Ion

| General Structural Name (Type of Organic) | Structural Representation |
|---|---|
| P Valence Stabilizer #13: Two-, Three-, Four-, Five-, Six-, and Eight-Membered Macrocyclics, Macrobicyclics, and Macropolycyclics (including Catapinands, Cryptands, Cyclidenes, and Sepulchrates) wherein all Binding Sites are composed of Phosphorus and are not contained in Component Heterocyclic Rings (P—P Bidentates, P—P Tridentates, P—P Tetradentates, and P—P Hexadentates) | uncoordinating rings may or may not have halogen or polarizing or water-insolubilizing/solubilizing groups attached. Macrocyclic ligands containing two, three, four, five, six, or eight phosphorus binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| P Valence Stabilizer #14: Four-, Six-, or Eight-Membered Macrocyclics, Macrobicyclics, and Macropolycyclics (including Catapinands, Cryptands, Cyclidenes, and Sepulchrates) wherein all Binding Sites are composed of Phosphorus and are contained in Component 5-Membered Heterocyclic Rings (P—P Tridentates, P—P Tetradentates, or P—P Hexadentates) | Macrocyclic ligands containing a total of four, six, or eight five-membered heterocyclic rings containing phosphorus binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| P Valence Stabilizer #15: Four-, Six-, or Eight-Membered Macrocyclics, Macrobicyclics, and Macropolycyclics (including Catapinands, Cryptands, Cyclidenes, and Sepulchrates) wherein all Binding Sites are composed of Phosphorus and are contained in a Combination of 5-Membered Heterocyclic Rings and Phosphine Groups (P—P Tridentates, P—P Tetradentates, or P—P Hexadentates) | Macrocyclic ligands containing at least one 5-membered heterocyclic ring. These heterocyclic rings provide phosphorus binding sites to valence stabilize the central metal ion. Other phosphine binding sites can also be included in the macrocyclic ligand, so long as the total number of binding sites is four, six, or eight. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| P Valence Stabilizer #16: Four-, Six-, or Eight-Membered Macrocyclics, Macrobicyclics, and Macropolycyclics (including Catapinands, Cryptands, Cyclidenes, and Sepulchrates) wherein all Binding Sites are composed of Phosphorus and are contained in Component 6-Membered Heterocyclic Rings (P—P Tridentates, P—P Tetradentates, or P—P Hexadentates) | Macrocyclic ligands containing a total of four, six, or eight six-membered heterocyclic rings containing phosphorus binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| P Valence Stabilizer #17: Four-, Six-, or Eight-Membered Macrocyclics, Macrobicyclics, and Macropolycyclics (including Catapinands, Cryptands, Cyclidenes, and Sepulchrates) wherein all Binding Sites are composed of Phosphorus and are contained in a Combination of 6-Membered Heterocyclic Rings and Phosphine Groups (P—P Tridentates, P—P Tetradentates, or P—P Hexadentates) | Macrocyclic ligands containing at least one 6-membered heterocyclic ring. These heterocyclic rings provide phosphorus binding sites to valence stabilize the central metal ion. Other phosphine binding sites can also be included in the macrocyclic ligand, so long as the total number of binding sites is four, six, or eight. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| O Valence Stabilizer #1: Biurets (Imidodicarbonic Diamides), Isobiurets, Biureas, Triurets, Triureas, Bis(biurets), Bis(isobiurets), Bis(biureas), Poly(biurets), Poly(isobiurets), and Poly(biureas) (O—O Bidentates, O—O Tridentates, O—O Tetradentates) | RR'—N—C(=O)—NR''—C(=O)—NR'''R'''' for biurets, and RR'—N—C(=O)—NR''—NH—C(=O)—NR'''R'''' for biureas, where R, R', R'', R''', and R'''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| O Valence Stabilizer #2: Acylureas, Aroylureas, Bis(acylureas), Bis(aroylureas), Poly(acylureas), and Poly(aroylureas) (O—O Bidentates, O—O Tridentates, O—O Tetradentates) | RR'—N—C(=O)—NR"—C(=O)—R'" where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #3: Imidodialdehydes, Hydrazidodialdehydes (Acyl hydrazides), Bis(imidodialdehydes), Bis(hydrazidodialdehydes), Poly(imidodialdehydes), and Poly(hydrazidodialdehydes) (O—O Bidentates, O—O Tridentates, O—O Tetradentates) | RC(=O)—NR'—C(=O)—R" for imidodialdehydes, and RC(=O)—NR'—NH—C(=O)—R" for hydrazidodialdehydes (acyl hydrazides), where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #4: Imidodicarbonic acids, Hydrazidodicarbonic acids, Bis(imidodicarbonic acids), Bis(hydrazidodicarbonic acids), Poly(imidodicarbonic acids), Poly(hydrazidodicarbonic acids) and derivatives thereof (O—O Bidentates, O—O Tridentates, O—O Tetradentates) | R—O—C(=O)—NR'—C(=O)—O—R" for imidodicarbonic acids, and R—O—C(=O)—NR'—NH—C(=O)—O—R" for hydrazidodicarbonic acids, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #5: Imidodisulfamic Acid, Imidodisulfuric Acid, Bis(Imidodisulfamic Acid), Bis(Imidodisulfuric Acid), Poly(Imidodisulfamic Acid), and Poly(Imidodisulfuric Acid) and derivatives thereof (O—O Bidentates, O—O Tridentates, O—O Tetradentates) | RR'—N—S(=O)(=O)—NR"—S(=O)(=O)—NR'"R"" for imidodisulfamic acid, and R—O—S(=O)(=O)—NR'—S(=O)(=O)—OR" for imidosulfuric acid, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #6: 1,3-Diketones (Beta-Diketonates), 1,3,5-Triketones, Bis(1,3-Diketones), and Poly(1,3-Diketones), all with a Molecular Weight Greater than 125 (O—O Bidentates, O—O Tridentates, O—O Tetradentates) | R—C(=O)—CR'R"—C(=O)—R'" where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. If these ligands exhibit a molecular weight less than or equal to 125, the solubility of the resultant $Co^{+3}$-diketonate complex will be too high. |
| O Valence Stabilizer #7: 1,2-Diketones (Alpha-Diketonates), 1,2,3-Triketones, Tropolonates, ortho-Quinones, Bis(1,2-Diketones), and Poly(1,2-Diketones), all with a Molecular Weight Greater than 100 (O—O Bidentates, O—O Tridentates, O—O Tetradentates) | R—C(=O)—C(=O)—R' where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. If these ligands exhibit a molecular weight less than or equal to 100, the solubility of the resultant $Co^{+3}$-diketonate complex will be too high. |
| O Valence Stabilizer #8: Malonamides (Malonodiamides), Bis(malonamides), and Polymalonamides (O—O Bidentates, O—O Tridentates, O—O Tetradentates) | RR'—N—C(=O)—CR"R'"—C(=O)—N—R""R""' where R, R', R", R'", R"", and R""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #9: 2-Acylacetamides, Bis(2-acylacetamides), and Poly(2-acylacetamides) (O—O | RR'—N—C(=O)—CR"R'"—C(=O)—R"" where R, R', R", R'", and R"" represent H, $NH_2$, or any organic functional group wherein the number of |

TABLE 2-continued

Narrow Band Organic Valence Stabilizers for the $Co^{+3}$ Ion

| General Structural Name (Type of Organic) | Structural Representation |
|---|---|
| Bidentates, O—O Tridentates, O—O Tetradentates) | carbon atoms ranges from 0 to 40, optionally having halogen or polarizing or water-insolubilizing/solubilizing groups attached. Ligand can also contain nonbinding N, O, S, or P atoms. |
| O Valence Stabilizer #10: Monothiodicarbonic Diamides, Bis(monothiodicarbonic diamides), and Poly(monothiodicarbonic diamides) (O—O Bidentates, O—O Tridentates, O—O Tetradentates) | RR'—N—C(=O)—S—C(=O)—N—R"R"' where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #11: Monothiodicarbonic Acids, Bis(monothiodicarbonic acids), Poly(monothiodicarbonic acids), and derivatives thereof (O—O Bidentates, O—O Tridentates, O—O Tetradentates) | R—O—C(=O)—S—C(=O)—O—R', where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #12: Dithioperoxydicarbonic Acids, Bis(dithioperoxydicarbonic acids), poly(dithioperoxydicarbonic acids), and derivatives thereof (O—O Bidentates, O—O Tridentates, O—O Tetradentates) | R—O—C(=O)—S—S—C(=O)—O—R', where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #13: Trithionic acid, Bis(trithionic acid), Poly(trithionic acid), and derivatives thereof (O—O Bidentates, O—O Tridentates, O—O Tetradentates) | R—O—S(=O)(=O)—S—S(=O)(=O)—O—R', where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #14: Hypophosphoric Acids, Bis(hypophosphoric acids), and Poly(hypophosphoric acids), and derivatives thereof (O—O Bidentates, O—O Tridentates, O—O Tetradentates) | (R—O—)(R'—O—)P(=O)—P(=O)(—O—R")(—O—R"'), where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R"R"'P(=O) which are very reducing and therefore unacceptable for stabilization of high valence states in metal ions. |
| O Valence Stabilizer #15: Hypophosphoramides, Bis(hypophosphoramides), and Poly(hypophosphoramides) (O—O Bidentates, O—O Tridentates, O—O Tetradentates) | (RR'—N—)(R"R"'—N—)P(=O)—P(=O)(—N—R""R""')(—N—R""""R""""'), where R, R', R", R"', R"", R""", R"""", and R""""" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. Note: these ligands are not to be confused with hypophosphorous acid derivatives (hypophosphites) (R—O—)R"R"'P(=O) which are very reducing and therefore unacceptable for stabilization of high valence states in metal ions. |
| O Valence Stabilizer #16: Imidodiphosphoric Acids, Hydrazidodiphosphoric Acids, Bis(imidodiphosphoric Acids), Bis(hydrazidodiphosphoric Acids), Poly(imidodiphosphoric Acids), Poly(hydrazidodiphosphoric Acids), and derivatives thereof (O—O Bidentates, O—O Tridentates, O—O Tetradentates) | (R—O—)(R'—O—)P(=O)—NH—P(=O)(—O—R")(—O—R"') for imidodiphosphoric acids, and (R—O—)(R'—O—)P(=O)—NH—NH—P(=O)(—O—R")(—O—R"') for hydrazidodiphosphoric acids; where R, R', R", and R"' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| O Valence Stabilizer #17: Imidodiphosphoramides, Hydrazidodiphosphoramides, Bis(imidodiphosphoramides), Bis(hydrazidodiphosphoramides), Poly(imidodiphosphoramides), and Poly(hydrazidodiphosphoramides) (O—O Bidentates, O—O Tridentates, O—O Tetradentates) | (RR'—N—)(R"R'"—N—)P(=O)—NH—P(=O)(—N—R""R""')(—N—R""'"R"""') for imidodiphosphoramides, and —NH—NH— derivatives for hydrazidodiphosphoramides, where R, R', R", R'", R"", R""', R""'", and R"""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #18: Diphosphoramides, Bis(diphosphoramides), and Poly(diphosphoramides) (O—O Bidentates, O—O Tridentates, O—O Tetradentates) | (RR'—N—)(R"R'"—N—)P(=O)—O—P(=O)(—N—R""R""')(—N—R""'"R"""'), where R, R', R", R'", R"", R""', R""'", and R"""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #19: Imidodiphosphonic Acids, Hydrazidodiphosphonic Acids, Bis(imidodiphosphonic Acids), Bis(hydrazidodiphosphonic Acids), Poly(imidodiphosphonic Acids), Poly(hydrazidodiphosphonic Acids), and derivatives thereof (O—O Bidentates, O—O Tridentates, O—O Tetradentates) | (R—O—)(R'—)P(=O)—NH—P(=O)(—R")(—O—R'") for imidodiphosphonic acids, and (R—O—)(R'—)P(=O)—NH—NH—P(=O)(—R")(—O—R'") for hydrazidodiphosphonic acids; where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #20: Imidodiphosphonamides, Hydrazidodiphosphonamides, Bis(imidodiphosphonamides), Bis(hydrazidodiphosphonamides), Poly(imidodiphosphonamides), and Poly(hydrazidodiphosphonamides) (O—O Bidentates, O—O Tridentates, O—O Tetradentates) | (RR'—N—)(R"—)P(=O)—NH—P(=O)(—R'")(—N—R""R""') for imidodiphosphonamides, and —NH—NH—derivatives for hydrazidodiphosphonamides, where R, R', R", R'", R"", and R""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #21: Diphosphonamides, Bis(diphosphonamides), and Poly(diphosphonamides) (O—O Bidentates, O—O Tridentates, O—O Tetradentates) | (RR'—N—)(R"—)P(=O)—O—P(=O)(—R'")(—N—R""R""'), where R, R', R", R'", R"", and R""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #22: Beta-Hydroxyketones, Beta-Hydroxyaldehydes, Bis(beta-hydroxyketones), Bis(beta-hydroxyaldehydes), Poly(beta-hydroxyketones), and Poly(beta-hydroxyaldehydes) (O—O Bidentates, O—O Tridentates, O—O Tetradentates) | R—CR'(—OH)—$CH_2$—C(=O)—R", where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #23: N-(Aminomethylol)ureas [N-(Aminohydroxymethyl)ureas], Bis[N-(aminomethylol)ureas], and Poly[N-(aminomethylol)ureas] (O—O Bidentates, O—O Tridentates, O—O Tetradentates) | RR'—N—CH(—OH)—NR"—C(=O)—NR'"R"", where R, R', R", R'", and R"" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #24: Oxamides, Bis(oxamides), and Poly(oxamides) (O—O Bidentates, O—O Tridentates, O—O Tetradentates) | RR'—N—C(=O)—C(=O)—N—R"R'", where R, R', R", and R'" represent H, $NH_2$ or any organic functional group wherein the number of carbon atoms ranges from 0 to 40, optionally having halogen or polarizing or water-insolubilizing/solubilizing groups attached. |

TABLE 2-continued

Narrow Band Organic Valence Stabilizers for the $Co^{+3}$ Ion

| General Structural Name (Type of Organic) | Structural Representation |
|---|---|
| O Valence Stabilizer #25: Squaric Acids and derivatives thereof (O—O Bidentates) | Ligand can also contain nonbinding N, O, S, or P atoms. —C(—OH)═C(—OH)—, where the two carbon atoms supporting the hydroxy groups are included within a cyclic hydrocarbon moiety, optionally having halogen or polarizing or water-insolubilizing/solubilizing groups attached. Ligand can also contain nonbinding N, O, S, or P atoms. |
| O Valence Stabilizer #26: Dicarboxylic Acids, Bis(dicarboxylic acids), Poly(dicarboxylic acids), and derivatives thereof (O—O Bidentates and O—O Tetradentates) | (R—O—)(O═)C—R'—C(═O)(—O—R''), where R, R', and R'' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #27: Carbonates and Bis(carbonates) (O—O Bidentates and O—O Tetradentates) | R—O—C(═O)—O—R', where R, and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #28: Carbamates, Bis(carbamates), and Poly(carbamates) (including N-hydroxycarbamates and N-mercaptocarbamates) (O—O Bidentates, O—O Tridentates, and O—O Tetradentates) | RR'$N^+$═C(OH)(OH), where R and R' represent H, OH, SH, OR'' (R'' = $C_1$-$C_{30}$ alkyl or aryl), SR'' (R'' = $C_1$-$C_{30}$ alkyl or aryl), $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #29: Carbazates (carbazides), Bis(carbazates), and Poly(carbazates) (O—O Bidentates, O—O Tridentates, and O—O Tetradentates; or possibly N—O Bidentates, N—O Tridentates, and N—O Tetradentates) | RR'N—NR''—C(═O)(OH), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #30: Carbimates, Bis(carbimates), and Poly(carbimates) (O—O Bidentates, O—O Tridentates, and O—O Tetradentates) | RN═C(OH)(OH), where R represents H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #31: Arsonic Acids, Bis(arsonic acids), Poly(arsonic acids), and derivatives thereof (O—O Bidentates, O—O Tridentates, O—O Tetradentates) | (O═)As(—O—R)(—O—R')(—O—R''), where R, R', and R'' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #32: Alkyl- and Aryl-Borates and Bis(borates) (O—O Bidentates and O—O Tetradentates) | R—O—C(—O—R'')—O—R', where R, R', and R'' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| O Valence Stabilizer #33: Alkyl- and Aryl-Boronates and Bis(boronates) (O—O Bidentates and O—O Tetradentates) | R—C(—O—R'')—O—R', where R, R', and R'' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the $Co^{+3}$ Ion

| General Structural Name (Type of Organic) | Structural Representation |
|---|---|
| O Valence Stabilizer #34: Phosphine P-oxides and Amino-substituted Phosphine oxides (O Monodentates) | RR'R"P=O for phosphine P-oxides, and (RR'N)(R"R'"N)(R""R""'N)P=O for amino-substituted phosphine oxides, where R, R', R", R'", R"", and R""' represent H, Cl, Br, $NH_2$ or any organic functional group wherein the number of carbon atoms ranges from 0 to 40, optionally having halogen or polarizing or water-insolubilizing/solubilizing groups attached. (Rs are typically aromatic or heterocyclic for phosphine P-oxides.) Ligand can also contain nonbinding N, O, S, or P atoms. |
| O Valence Stabilizer #35: Arsine As-oxides and Amino-substituted Arsine oxides (O Monodentates) | RR'R"As=O for arsine As-oxides, and (RR'N)(R"R'"N)(R""R""'N)As=O for amino-substituted arsine oxides, where R, R', R", R'", R"", and R""' represent H, Cl, Br, $NH_2$ or any organic functional group wherein the number of carbon atoms ranges from 0 to 40, optionally having halogen or polarizing or water-insolubilizing/solubilizing groups attached. (Rs are typically aromatic or heterocyclic for arsine As-oxides.) Ligand can also contain nonbinding N, O, S, or P atoms. |
| O Valence Stabilizer #36: Cyanate ligands (O Monodentates) | Cyanates bound directly to the high valence metal ion. |
| N—S Valence Stabilizer #1: Thioimidates, Dithioimidates, Polythioimidates, and Derivatives of Thioimidic Acid (N—S Bidentates and N—S Tetradentates) | RC(=NH)SR', where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #2: Thioguanylureas, Guanidinothioureas, Bis(thioguanylureas), Bis(guanidinothioureas), Poly(thioguanylureas), and Poly(guanidinothioureas) (N—S Bidentates and N—S Tetradentates) | RR'—N—C(=NH)—NR"—CS—NR'"R"" for thioguanylureas, and RR'—N—C(=NH)—NR"—NH—CS—NR'"R"" for guanidinothioureas, where R, R', R", R'", and R"" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #3: Amidinothioamides, Guanidinothioamides, Bis(amidinothioamides), Bis(guanidinothioamides), Poly(amidinothioamides), and Poly(guanidinothioamides) (including both N-amidinothioamides and 2-amidinothioacetamides) (N—S Bidentates and N—S Tetradentates) | RR'—N—C(=NH)—NR"—CS—R'" for N-amidinothioamides, or RR'—N—C(=NH)—CR'"R""—CS—N—R""'R""" for 2-amidinothioacetamides, and RR'—N—C(=NH)—NR"—NH—CS—R'" for guanidinothioamides, where R, R', R", R'", R"", and R""' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #4: Imidoylthioamides, Bis(imidoylthioamides), and Poly(imidoylthioamides) (N—S Bidentates and N—S Tetradentates) | R—C(=NH)—NR'—CS—R", where R, R', and R", represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #5: Thioureas, Bis(thioureas), and Poly(thioureas), including Thiourylene Complexes (N—S Bidentates, N—S Tridentates, and N—S Tetradentates) | RR'NCSNR"R'", where R, R', R", and R'" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #6: Thiocarboxamides, Bis(thiocarboxamides), and Poly(thiocarboxamides) (N—S | RCSNR'R", where R, R', and R" represent H, $NH_2$, or any organic functional group wherein the number of carbon atoms ranges from 0 to |

TABLE 2-continued

Narrow Band Organic Valence Stabilizers for the $Co^{+3}$ Ion

| General Structural Name (Type of Organic) | Structural Representation |
|---|---|
| Bidentates, N—S Tridentates, and N—S Tetradentates) | 40, optionally having halogen or polarizing or water-insolubilizing/solubilizing groups attached. Ligand can also contain nonbinding N, O, S, or P atoms. |
| N—S Valence Stabilizer #7: Imidosulfurous Diamides and Bis(imidosulfurous diamides) (N—S Bidentates, N—S Tridentates, and N—S Tetradentates) | RR'—N—S(=NH)—N—R''R''', where R, R', R'', and R''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #8: Sulfurdiimines, Bis(sulfurdiimines), and Poly(sulfurdiimines) (N—S Bidentates, N—S Tridentates, and N—S Tetradentates) | R—N=S=N—R', where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #9: Phosphonimidothioic Acid, Phosphonimidodithioic Acid, Bis(Phosphonimidothioic acid); Bis(Phosphonimidodithioic acid), and derivatives thereof (N—S Bidentates, N—S Tetradentates) | (NH=)PR(OR')(SR'') for phosphonimidothioic acid and (NH=)PR(SR')(SR'') for phosphonimidodithioic acid, where R, R', and R'' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #10: Phosphonothioic Diamides, Bis(phosphonothioic diamides), and Poly(phosphonothioic diamides) (N—S Bidentates and N—S Tetradentates) | (S=)PR(—NR'R'')(—NR'''R''''), where R, R', R'', R''', and R'''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #11: Phosphonamidothioic Acid, Phosphonamidimidodithioic Acid, Bis(phosphonamidothioic acid), Bis(phosphonamidimidodithioic acid), poly(phosphonamidothioic acid), and poly(phosphonamidimidodithioic acid), and derivatives thereof (N—S Bidentates and N—S Tetradentates) | (S=)PR(—NR'R'')(—OR''') or (O=)PR(—NR'R'')(—SR''') for phosphonamidothioic acid, (S=)PR(—NR'R'')(—SR''') for phosphonamidimidodithioic acid, where R, R', R'', and R''' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #12: Beta-Aminothiones (N-Substituted 3-amino-2-propenethioaldehydes), Bis(beta-aminothiones), and Poly(beta-aminothiones) (N—S Bidentates and N—S Tetradentates) | R—C(=S)—CR'=CR''—NHR''', where R, R', R'', and R''' represent H, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #13: 3-Aminothioacrylamides (3-Amino-2-thiopropenamides), 3,3-Diaminothioacrylamides, Bis(3-aminothioacrylamides), Bis(3,3-diaminoacrylamides), Poly(3-aminothioacrylamides), and Poly(3,3-diaminothioacrylamides) (N—S Bidentates and N—S Tetradentates) | RR'—N—C(=S)—CR''=C(—NHR''')R'''' for 3-aminothioacrylamides, and RR'—N—C(=S)—CR''=C(—NHR''')(—NR''''R''''') for 3,3-diaminothioacrylamides, where R, R', R'', R''', R'''', R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #14: 3-Aminothioacrylic Acids (3-Amino-2-thiopropenoic acids), 3-Mercapto-3-aminothioacrylic acids, Bis(3-aminothioacrylic acids), Bis(3-Hydroxy-3-aminothioacrylic acids), Poly(3-aminothioacrylic acids), and Poly(3-Hydroxy-3-aminothioacrylic acids), and derivatives thereof (N—S Bidentates and N—S | R—O—C(=S)—CR'=C(—NHR'')R''' or R—S—C(=S)—CR'=C(—NHR'')R''' for 3-aminothioacrylic acids, and R—O—C(=S)—CR'=C(—NHR'')(—S—R''') or R—S—C(=S)—CR'=C(—NHR'')(—S—R''') for 3-mercapto-3-aminothioacrylic acids, where R, R', R'', and R''' represent H, $NH_2$, or any organic functional group wherein the number of carbon atoms ranges from 0 to 40, optionally having halogen or polarizing or water- |

TABLE 2-continued

Narrow Band Organic Valence Stabilizers for the $Co^{+3}$ Ion

| General Structural Name (Type of Organic) | Structural Representation |
|---|---|
| Tetradentates) | insolubilizing/solubilizing groups attached. Ligand can also contain nonbinding N, O, S, or P atoms. |
| N—S Valence Stabilizer #15: N-Thioacyl Benzylidenimines, Bis(N-thioacyl benzylidenimines), and Poly(N-thioacyl benzylidenimines) (N—S Bidentates and N—S Tetradentates) | R—C(=S)—N=CHR', where R' represents an aromatic derivative (i.e. —$C_6H_5$), and R represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #16: Thiocarbonyl oximes, Bis(thiocarbonyl oximes), and Poly(thiocarbonyl oximes) (N—S Bidentates, N—S Tridentates, and N—S Tetradentates) | R—C(=S)—C(=NOH)—R', where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #17: Mercapto oximes, Bis(mercapto oximes), and Poly(mercapto oximes) (including 2-sulfur heterocyclic oximes) (N—S Bidentates, N—S Tridentates, N—S Tetradentates, and N—S Hexadentates) | R—CH(—SH)—C(=NOH)—R', where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #18: 2-Nitrothiophenols (2-nitrobenzenethiols) (N—S Bidentates) | o-($O_2N$—)(HS—)Ar, where Ar represents an aromatic group or heterocyclic wherein the number of carbon atoms ranges from 6 to 40, optionally having halogen or polarizing or water-insolubilizing/solubilizing groups attached. Ligand can also contain nonbinding N, O, S, or P atoms. |
| N—S Valence Stabilizer #19: 2-Nitrilothiophenols (N—S Bidentates) | o-(NC—$(CH_2)_{0-1}$)(HS—)Ar, where Ar represents an aromatic group or heterocyclic wherein the number of carbon atoms ranges from 6 to 40, optionally having halogen or polarizing or water-insolubilizing/solubilizing groups attached. Ligand can also contain nonbinding N, O, S, or P atoms. |
| N—S Valence Stabilizer #20: Thiohydrazides, Bis(thiohydrazides), and Poly(thiohydrazides) (N—S Bidentates and N—S Tetradentates) | R—C(=S)—NHNR'R", where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #21: Thiosemicarbazides, Bis(thiosemicarbazides), and Poly(thiosemicarbazides) (N—S Bidentates, N—S Tetradentates, and N—S Hexadentates) | RR'—N—C(=S)—NHNR"R''', where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—S Valence Stabilizer #22: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) or Sulfur (usually thiols, mercaptans, or thiocarbonyls) and are not contained in Component Heterocyclic Rings (N—S Tridentates, N—S Tetradentates, and N—S Hexadentates) | Macrocyclic ligands containing five, seven, or nine binding sites composed of nitrogen and sulfur to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N—S Valence Stabilizer #23: Five-, or Seven-Membered Macrocyclics, Macrobicyclics, and Macropolycyclics (including Catapinands, Cryptands, | Macrocyclic ligands containing a total of five or seven heterocyclic rings containing nitrogen or sulfur binding sites. Can include other hydrocarbon/ring systems bound to this |

TABLE 2-continued

Narrow Band Organic Valence Stabilizers for the $Co^{+3}$ Ion

| General Structural Name (Type of Organic) | Structural Representation |
|---|---|
| Cyclidenes, and Sepulchrates) wherein all Binding Sites are composed of Nitrogen or Sulfur and are contained in Component Heterocyclic Rings (N—S Tridentates, N—S Tetradentates, or N—S Hexadentates) | macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—S Valence Stabilizer #24: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen or Sulfur and are contained in a Combination of Heterocyclic Rings and Amine, Imine, Thiol, Mercapto, or Thiocarbonyl Groups (N—S Tridentates, N—S Tetradentates, or N—S Hexadentates) | Macrocyclic ligands containing at least one heterocyclic ring. These heterocyclic rings provide nitrogen or sulfur binding sites to valence stabilize the central metal ion. Other amine, imine, thiol, mercapto, or thiocarbonyl binding sites can also be included in the macrocyclic ligand, so long as the total number of binding sites is five, seven, or nine. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—O Valence Stabilizer #1: Imidates, Diimidates, Polyimidates, and Derivatives of Imidic Acid (N—O Bidentates and N—O Tetradentates) | RC(═NH)OR', where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #2: Pseudoureas, bis(pseudoureas), and poly(pseudoureas) (N—O Bidentates and N—O Tetradentates) | RR'NC(═NH)OR'', where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #3: 2-Amidinoacetates, Bis(2-amidinoacetates), and Poly(2-amidinoacetates) (N—O Bidentates and N—O Tetradentates) | RR'NC(═NH)CR''R'''(CO)OR'''', where R, R', R'', R''', and R'''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #4: Ureas, Bis(ureas), and Poly(ureas), including Urylene Complexes (N—O Bidentates, N—O Tridentates, and N—O Tetradentates) | RR'NCONR''R''', where R, R', R'', and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #5: Phosphonimidic Acid, Bis(phosphonimidic acid), Poly(phosphonimidic acid), and derivatives thereof (N—O Bidentates and N—O Tetradentates) | (NH═)PR(OR')(OR''), where R, R', and R'' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #6: Phosphonamidic Acid, Phosphonic Diamide, Bis(Phosphonamidic Acid), Bis(Phosphonic Diamide), Poly(phosphonamidic acid), poly(phosphonic diamide), and derivatives thereof (N—O Bidentates and N—O Tetradentates) | (O═)PR(—NR'R'')(—OR''') for phosphonamidic acid and (O═)PR(—NR'R'')(—NR'''R'''') for phosphonic diamide, where R, R', R'', R''', and R'''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #7: Beta-Ketoamines (N-Substituted 3-amino-2-propenals), Bis(beta-ketoamines), and | R—C(═O)—CR'═C(—NHR'')R''', where R, R', R'', and R''' represent H, or any organic functional group wherein the number of carbon atoms |

TABLE 2-continued

Narrow Band Organic Valence Stabilizers for the $Co^{+3}$ Ion

| General Structural Name (Type of Organic) | Structural Representation |
|---|---|
| Poly(beta-ketoamines) (N—O Bidentates and N—O Tetradentates) | ranges from 0 to 40, optionally having halogen or polarizing or water-insolubilizing/solubilizing groups attached. Ligand can also contain nonbinding N, O, S, or P atoms. |
| N—O Valence Stabilizer #8: 3-Aminoacrylamides (3-Amino-2-propenamides), 3,3-Diaminoacrylamides, Bis(3-aminoacrylamides), Bis(3,3-diaminoacrylamides), Poly(3-aminoacrylamides), and Poly(3,3-diaminoacrylamides) (N—O Bidentates and N—O Tetradentates) | RR'—N—C(=O)—CR''=C(—NHR''')R'''' for 3-aminoacrylamides, and RR'—N—C(=O)—CR''=C(—NHR''')(—NR''''R''''') for 3,3-diaminoacrylamides, where R, R', R'', R''', R'''', and R''''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #9: 3-Aminoacrylic Acids (3-Amino-2-propenoic acids), 3-Hydroxy-3-aminoacrylic acids, Bis(3-aminoacrylic acids), Bis(3-Hydroxy-3-aminoacrylic acids), Poly(3-aminoacrylic acids), and Poly(3-Hydroxy-3-aminoacrylic acids), and derivatives thereof (N—O Bidentates and N—O Tetradentates) | R—O—C(=O)—CR'=C(—NHR'')R''' for 3-aminoacrylic acids, and R—O—C(=O)—CR'=C(—NHR'')(—O—R''') for 3-hydroxy-3-aminoacrylic acids, where R, R', R'', and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #10: N-Acyl Benzylidenimines, Bis(N-acyl benzylidenimines), and Poly(N-acyl benzylidenimines) (N—O Bidentates and N—O Tetradentates) | R—C(=O)—N=CHR', where R' represents an aromatic derivative (i.e. —$C_6H_5$), and R represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #11: 2-Nitroanilines (N—O Bidentates) | o-($O_2$N—)(RR'N—)Ar, where Ar represents an aromatic group or heterocyclic wherein the number of carbon atoms ranges from 6 to 40, and R and R' represent H, $NH_2$, or alkyl or aryl hydrocarbon groups wherein the number of carbon atoms range from 0 to 25, optionally having halogen or polarizing or water-insolubilizing/solubilizing groups attached. Ligand can also contain nonbinding N, O, S, or P atoms. |
| N—O Valence Stabilizer #12: 2-Nitrilophenols (N—O Bidentates). Also includes acylcyanamides. | o-(NC—$(CH_2)_{0-1}$)(HO—)Ar, where Ar represents an aromatic group or heterocyclic wherein the number of carbon atoms ranges from 6 to 40, optionally having halogen or polarizing or water-insolubilizing/solubilizing groups attached. Ligand can also contain nonbinding N, O, S, or P atoms. |
| N—O Valence Stabilizer #13: Amine N-Oxides and Diazine N-Oxides (Azoxy componds) (N—O Bidentates, N—O Tridentates, and N—O Tetradentates) | $HetN^+$—$O^-$ for amine N-oxides, and R—N=$N^+$(—$O^-$)—R' for diazine N-oxides (azoxy compounds), where Het represents a nitrogen-containing heterocyclic derivative wherein the number of carbon atoms ranges from 4 to 40, and R and R' represent separate or the same aromatic functionalities, both Het and R,R' optionally having halogen or polarizing or water-insolubilizing/solubilizing groups attached. Ligand can also contain nonbinding N, O, S, or P atoms. |
| N—O Valence Stabilizer #14: Hydrazides, Bis(hydrazides), and Poly(hydrazides) (N—O Bidentates and N—O Tetradentates) | R—C(=O)—NHNR'R'', where R, R', and R'' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |

TABLE 2-continued

Narrow Band Organic Valence Stabilizers for the Co$^{+3}$ Ion

| General Structural Name (Type of Organic) | Structural Representation |
|---|---|
| N—O Valence Stabilizer #15: Semicarbazides, Bis(semicarbazides), and Poly(semicarbazides) (N—O Bidentates, N—O Tetradentates, and N—O Hexadentates) | RR'—N—C(=O)—NHNR"R"', where R, R', and R" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| N—O Valence Stabilizer #16: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) or Oxygen (usually hydroxy, carboxy, or carbonyl groups) and are not contained in Component Heterocyclic Rings (N—O Tridentates, N—O Tetradentates, and N—O Hexadentates) | Macrocyclic ligands containing five, seven, or nine binding sites composed of nitrogen and oxygen to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N—O Valence Stabilizer #17: Five-, or Seven-Membered Macrocyclics, Macrobicyclics, and Macropolycyclics (including Catapinands, Cryptands, Cyclidenes, and Sepulchrates) wherein all Binding Sites are composed of Nitrogen or Oxygen and are contained in Component Heterocyclic Rings (N—O Tridentates, N—O Tetradentates, or N—O Hexadentates) | Macrocyclic ligands containing a total of five or seven heterocyclic rings containing nitrogen or oxygen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—O Valence Stabilizer #18: Five-, Seven-, or Nine-Membered Macrocyclics, Macrobicyclics, and Macropolycyclics (including Catapinands, Cryptands, Cyclidenes, and Sepulchrates) wherein all Binding Sites are composed of Nitrogen or Oxygen and are contained in a Combination of Heterocyclic Rings and Amine, Imine, Hydroxy, Carboxy, or Carbonyl Groups (N—O Tridentates, N—O Tetradentates, or N—O Hexadentates) | Macrocyclic ligands containing at least one heterocyclic ring. These heterocyclic rings provide nitrogen or oxygen binding sites to valence stabilize the central metal ion. Other amine, imine, hydroxy, carboxy, or carbonyl binding sites can also be included in the macrocyclic ligand, so long as the total number of binding sites is five, seven, or nine. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S—O Valence Stabilizer #1: Thiobiurets (Thioimidodicarbonic Diamides), Thioisobiurets, Thiobiureas, Thiotriurets, Thiotriureas, Bis(thiobiurets), Bis(thioisobiurets), Bis(thiobiureas), Poly(thiobiurets), Poly(thioisobiurets), Poly(thiobiureas) (S—O Bidentates, S—O Tridentates, S—O Tetradentates), and (3-formamidino thiocarbamides) | RR'—N—C(=S)—NR"—C(=O)—NR"'R"" for thiobiurets, and RR'—N—C(=S)—NR"—NH—C(=O)—NR"'R"" for thiobiureas, where R, R', R", R"', and R"" represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #2: Acylthioureas, Aroylthioureas, Thioacylureas, Thioaroylureas, Bis(acylthioureas), Bis(aroylthioureas), Bis(thioacylureas), Bis(thioaroylureas), Poly(thioacylthioureas), Poly(thioaroylthioureas), Poly(thioacylureas), and Poly(thioaroylureas) (S—O Bidentates, S—O Tridentates, S—O Tetradentates) | RR'—N—C(=S)—NR"—C(=O)—R"' for acyl- and aroylthioureas, and RR'—N—C(=O)—NR"—C(=S)—R"' for thioacyl- and thioaroylureas, where R, R', R", and R"' represent H, NH$_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #3: Thioimidodialdehydes, Thiohydrazidodialdehydes (thioacyl hydrazides), Bis(thioimidodialdehydes), Bis(thiohydrazidodialdehydes), Poly(thioimidodialdehydes), and Poly(thiohydrazidodialdehydes) (S—O Bidentates, S—O Tridentates, S—O | RC(=S)—NR'—C(=O)—R" for thioimidodialdehydes, and RC(=S)—NR'—NH—C(=O)—R" for thiohydrazidodialdehydes (thioacyl hydrazides), where R, R', and R" represent H, NH$_2$, or any organic functional group wherein the number of carbon atoms ranges from 0 to 40, optionally having halogen or polarizing or water- |

TABLE 2-continued

Narrow Band Organic Valence Stabilizers for the $Co^{+3}$ Ion

| General Structural Name (Type of Organic) | Structural Representation |
|---|---|
| Tetradentates) | insolubilizing/solubilizing groups attached. Ligand can also contain nonbinding N, O, S, or P atoms. |
| S—O Valence Stabilizer #4: Thioimidodicarbonic acids, Thiohydrazidodicarbonic acids, Bis(thioimidodicarbonic acids), Bis(thiohydrazidodicarbonic acids), Poly(thioimidodicarbonic acids), Poly(thiohydrazidodicarbonic acids) and derivatives thereof (S—O Bidentates, S—O Tridentates, S—O Tetradentates) | R—O—C(=S)—NR'—C(=O)—O—R" or R—S—C(=S)—NR'—C(=O)—S—R" for thioimidodicarbonic acids, and R—O—C(=S)—NR'—NH—C(=O)—O—R" or R—S—C(=S)—NR'—NH—C(=O)—S—R" for thiohydrazidodicarbonic acids, where R, R', and R" represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #5: 1,2-Monothioketones (Monothiolenes, Monothio-alpha-ketonates), 1,2,3-Monothioketones, 1,2,3-Dithioketones, Monothiotropolonates, ortho-Monothioquinones, Bis(1,2-Monothioketones), and Poly(1,2-Monothioketones) (S—O Bidentates, S—O Tridentates, S—O Tetradentates) | R—C(=S)—C(=O)—R' where R and R' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #6: Trithioperoxydicarbonic Diamides, Dithioperoxydicarbonic Diamides, Bis(trithioperoxydicarbonic diamides), Bis(dithioperoxydicarbonic diamides), poly(trithioperoxydicarbonic diamides) and poly(dithioperoxydicarbonic diamides) (S—O Bidentates, S—O Tridentates, S—O Tetradentates) | RR'—N—C(=S)—S—S—C(=O)—N—R"R'" for trithioperoxydicarbonic diamides, and RR'—N—C(=O)—S—S—C(=O)—N—R"R'" for dithioperoxydicarbonic diamides, where R, R', R", R'" represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #7: Diithiodicarbonic Acids, Bis(dithiodicarbonic acids), Poly(dithiodicarbonic acids), and derivatives thereof (S—O Bidentates, S—O Tridentates, S—O Tetradentates) | R—O—C(=S)—S—C(=O)—O—R', where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #8: Trithioperoxydicarbonic Acids, Bis(trithioperoxydicarbonic acids), poly(trithioperoxydicarbonic acids), and derivatives thereof (S—O Bidentates, S—O Tridentates, S—O Tetradentates) | R—O—C(=S)—S—S—C(=O)—O—R', where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #9: Monothioperoxydiphosphoramide, Bis(monothioperoxyphosphoramide), and Poly(monothioperoxydiphosphoramide) (S—O Bidentates, S—O Tridentates, S—O Tetradentates) | (RR'—N—)(R"R'"—N—)P(=S)—S—S—P(=O)(—N—R""R""')(—N—R"""'R""""), where R, R', R", R'", R"", R""', R"""', and R""""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #10: Monothioperoxydiphosphoric Acids, Bis(monothioperoxyphosphoric Acids), Poly(monothioperoxydiphosphoric Acids), and derivatives thereof (S—O Bidentates, S—O Tridentates, S—O Tetradentates) | (R—O—)(R'—O—)P(=S)—S—S—P(=O)(—O—R")(—O—R'"); (R—O—)(R'—S—)P(=S)—S—S—P(=O)(—S—R")(—O—R'"); or (R—S—)(R'—S—)P(=S)—S—S—P(=O)(—S—R")(—S—R'"), where R, R', R", R'", R"", R""', R"""', and R""""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #11: Monothioimidodiphosphonic Acids, Monothiohydrazidodiphosphonic Acids, | (R—O—)(R'—)P(=S)—NH—P(=O)(—R")(—O—R'"); (R—S—)(R'—)P(=S)—NH—P(=O)(—R")(—O—R'"); or (R—S—)(R'—)P(=S)—NH—P(=O)(—R")(—S—R'") for |

TABLE 2-continued

Narrow Band Organic Valence Stabilizers for the $Co^{+3}$ Ion

| General Structural Name (Type of Organic) | Structural Representation |
|---|---|
| Bis(monothioimidodiphosphonic Acids), Bis(monothiohydrazidodiphosphonic Acids), Poly(monothioimidodiphosphonic Acid), Poly(monothiohydrazidodiphosphonic Acids), and derivatives thereof (S—O Bidentates, S—O Tridentates, S—O Tetradentates) | monothioimidodiphosphonic acids, and —NH—NH— derivatives for monothiohydrazidodiphosphonic acids, where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #12: Monothioimidodiphosphonamides, Monothiohydrazidodiphosphonamides, Bis(monothioimidodiphosphonamides), Bis(monothiohydrazidodiphosphonamides) Poly(monothioimidodiphosphonamides), and Poly(monothiohydrazidodiphosphonamides) (S—O Bidentates, S—O Tridentates, S—O Tetradentates) | (RR'—N—)(R"—)P(═S)—NH—P(═O)(—R'")(—N—R""R""') for monothioimidodiphosphonamides, and —NH—NH— derivatives for monothiohydrazidodiphosphonamides, where R, R', R", R'", R"", and R""', represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #13: Monothiodiphosphonamides, Bis(monothioiphosphonamides), and Poly(monothiodiphosphonamides) (S—O Bidentates, S—O Tridentates, S—O Tetradentates) | (RR'—N—)(R"—)P(═S)—S—P(═O)(—R'")(—N—R""R""'), or (RR'—N—)(R"—)P(═S)—O—P(═O)(—R'")(—N—R""R""'), where R, R', R", R'", R"", and R""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #14: Monothiodiphosphonic Acids, Bis(monothioiphosphonic Acids), Poly(monothiodiphosphonic Acids), and derivatives thereof (S—O Bidentates, S—O Tridentates, S—O Tetradentates) | (R—O—)(R'—)P(═S)—O—P(═O)(—R")(—O—R'"); (R—O—)(R'—)P(═S)—S—P(═O)(—R")(—O—R'"); (R—S—)(R'—)P(═S)—O—P(═O)(—R")(—S—R'"); or (R—S—)(R'—)P(═S)—S—P(═O)(—R")(—S—R'"), where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #15: Monothioperoxydiphosphonamide, Bis(monothioperoxyphosphonamide), and Poly(monothioperoxydiphosphonamide) (S—O Bidentates, S—O Tridentates, S—O Tetradentates) | (RR'—N—)(R"—)P(═S)—S—S—P(═O)(—R'")(—N—R""R""'), where R, R', R", R'", R"", and R""' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #16: Monothioperoxydiphosphonic Acids, Bis(monothioperoxyphosphonic Acids), Poly(monothioperoxydiphosphonic Acids), and derivatives thereof (S—O Bidentates, S—O Tridentates, S—O Tetradentates) | (R—O—)(R'—)P(═S)—S—S—P(═O)(—R")(—O—R'"); or (R—S—)(R'—)P(═S)—S—S—P(═O)(—R")(—S—R'"), where R, R', R", and R'" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #17: Monothiophosphoric Acids (Phosphorothioic Acids), Bis(monothiophosphoric acids), Poly(monothiophosphoric acids), and derivatives thereof (S—O Bidentates, S—O Tridentates, S—O Tetradentates) | (O═)P(—S—R)(—O—R')(—O—R") or (S═)P(—O—R)(—O—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #18: Phosphoro(dithioperoxoic) Acids, Bis[phosphoro(dithioperoxoic) acids], Poly[phosphoro(dithioperoxoic) acids], and derivatives thereof (S—O Bidentates, S—O | (O═)P(—S—S—R)(—O—R')(—O—R"), where R, R', and R" represent H, $NH_2$ or any organic functional group wherein the number of carbon atoms ranges from 0 to 40, optionally having halogen or polarizing or water- |

TABLE 2-continued

Narrow Band Organic Valence Stabilizers for the $Co^{+3}$ Ion

| General Structural Name (Type of Organic) | Structural Representation |
|---|---|
| Tridentates, S—O Tetradentates) | insolubilizing/solubilizing groups attached. Ligand can also contain nonbinding N, O, S, or P atoms. |
| S—O Valence Stabilizer #19: Monothiophosphonic Acids (Phosphonothioic Acids), Bis(monothiophosphonic Acids), Poly(monothiophosphonic Acids), and derivatives thereof (S—O Bidentates, S—O Tridentates, S—O Tetradentates) | (O═)PR(—S—R')(—O—R") or (S═)PR(—O—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #20: Phosphono(dithioperoxoic) Acids, Bis[phosphono(dithioperoxoic) Acids], Poly[phosphono(dithioperoxoic) Acids], and derivatives thereof (S—O Bidentates, S—O Tridentates, S—O Tetradentates) | (O═)PR(—S—S—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #21: Beta-Hydroxythioketones, Beta-Hydroxythioaldehydes, Bis(beta-hydroxythioketones), Bis(beta-hydroxythioaldehydes), Poly(beta-hydroxythioketones), and Poly(beta-hydroxythioaldehydes) (S—O Bidentates, S—O Tridentates, S—O Tetradentates) | R—CR'(—OH)—$CH_2$—C(═S)—R", where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #22: Beta-Mercaptoketones, Beta-Mercaptoaldehydes, Bis(beta-mercaptoketones), Bis(beta-mercaptoaldehydes), Poly(beta-mercaptoketones), and Poly(beta-mercaptoaldehydes) (S—O Bidentates, S—O Tridentates, S—O Tetradentates) | R—CR'(—SH)—$CH_2$—C(═O)—R", where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #23: N-(Aminomethylol)thioureas [N-(Aminohydroxymethyl)thioureas], Bis[N-(aminomethylol)thioureas], and Poly[N-(aminomethylol)thioureas] (S—O Bidentates, S—O Tridentates, S—O Tetradentates) | RR'—N—CH(—OH)—NR"—C(═S)—NR'''R'''', where R, R', R", R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #24: N-(Aminomethylthiol)ureas [N-(Aminomercaptomethyl)ureas], Bis[N-(aminomethylthiol)ureas], and Poly[N-(aminomethylthiol)ureas] (S—O Bidentates, S—O Tridentates, S—O Tetradentates) | RR'—N—CH(—SH)—NR"—C(═O)—NR'''R'''', where R, R', R", R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #25: Monothiooxamides, Bis(monothiooxamides), and Poly(monothiooxamides) (S—O Bidentates, S—O Tridentates, S—O Tetradentates) | RR'—N—C(═S)—C(═O)—N—R"R''', where R, R', R", and R''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #26: Beta-Mercapto Carboxylic Acids, Bis(Beta-Mercapto Carboxylic Acids), Poly(Beta-Mercapto Carboxylic Acids), and derivatives thereof (S—O Bidentates, S—O Tridentates, S—O Tetradentates) | R—CR'(—SH)—CR"R'''—C(═O)(—O—R''''), where R, R', R", R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #27: Beta-Mercapto Thiocarboxylic Acids, Bis(Beta-Mercapto Thiocarboxylic Acids), Poly(Beta-Mercapto Thiocarboxylic | R—CR'(—SH)—CR"R'''—C(═O)(—S—R''''), where R, R', R", R''', and R'''' represent H, $NH_2$ or any organic functional group wherein the number of carbon atoms ranges from 0 to 40, optionally |

TABLE 2-continued

Narrow Band Organic Valence Stabilizers for the $Co^{+3}$ Ion

| General Structural Name (Type of Organic) | Structural Representation |
|---|---|
| Acids), and derivatives thereof (S—O Bidentates, S—O Tridentates, S—O Tetradentates) | having halogen or polarizing or water-insolubilizing/solubilizing groups attached. Ligand can also contain nonbinding N, O, S, or P atoms. |
| S—O Valence Stabilizer #28: Beta-Hydroxy Thiocarboxylic Acids, Bis(Beta-Hydroxy Thiocarboxylic Acids), Poly(Beta-Hydroxy Thiocarboxylic Acids), and derivatives thereof (S—O Bidentates, S—O Tridentates, S—O Tetradentates) | R—CR'(—OH)—CR''R'''—C(=O)(—S—R''''), where R, R', R'', R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #29: Beta-Mercapto Carboxamides, Bis(Beta-Mercapto Carboxamides), Poly(Beta-Mercapto Carboxamides), and derivatives thereof (S—O Bidentates, S—O Tridentates, S—O Tetradentates) | R—CR'(—SH)—CR''R'''—C(=O)(—NH—R''''), where R, R', R'', R''', and R'''' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #30: S-Alkylthiocarboxylic Acids, S-Arylthiocarboxylic Acids, and S,S-thiobiscarboxylic Acids (S—O Bidentates and S—O Tridentates) | R—S—R'COOH for S-alkylthiocarboxylic and S-arylthiocarboxylic acids, and HOOCR—S—R'COOH for S,S-thiobiscarboxylic acids, where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #31: S-Alkyldisulfidocarboxylic Acids, S-Aryldisulfidocarboxylic Acids, and S,S'-Disulfidobiscarboxylic Acids (S—O Bidentates and S—O Tridentates) | R—S—S—R'COOH for S-alkyldisulfidocarboxylic and S-aryldisulfidocarboxylic acids, and HOOCR—S—S—R'COOH for S,S'-disulfidobiscarboxylic acids, where R and R' represent H or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #32: Monothiomonocarboxylic Acids, Dithiodicarboxylic Acids, Bis(monothiomonocarboxylic Acids), Bis(dithiodicarboxylic acids), Poly(monothiomonocarboxylic acids), Poly(dithiodicarboxylic acids), and derivatives thereof (S—O Bidentates and S—O Tetradentates) | R—C(=O)(—S—R') for monothiomonocarboxylic acids, and (R—S—)(O=)C—R'—C(=O)(—S—R'') or (R—S—)(O=)C—R'—C(=O)(—O—R'') for dithiodicarboxylic acids, where R, R', and R'' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #33: Monothiocarbonates and Bis(monothiocarbonates) (S—O Bidentates and S—O Tetradentates) | R—O—C(=S)—O—R', where R, and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #34: Monothiocarbazates (Monothiocarbazides), Bis(monothiocarbazates), and Poly(monothiocarbazates) (S—O Bidentates, S—O Tridentates, and S—O Tetradentates; or possibly N—S Bidentates, N—S Tridentates, and N—S Tetradentates) | RR'N—NR''—C(=O)(SH), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #35: Mercapto Alcohols and Silylmercaptoalcohols, Bis(mercapto alcohols and silylmercaptoalcohols), and Poly(mercapto alcohols and silylmercaptoalcohols) (S—O Bidentates, S—O | R—CH(—SH)—CH(—OH)—R' for alpha-mercapto alcohols, R—CH(—SH)—Si(—OR')$_x$—R''$_{3-x}$ for alpha-silylmercaptoalcohols, R—CH(—SH)—R'—CH(—OH)—R'' for beta-mercapto alcohols, and R—CH(—SH)—R'—Si(—OR'')$_x$—R'''$_{3-x}$ for beta-silylmercaptoalcohols, etc., where R, R', R'', |

TABLE 2-continued

Narrow Band Organic Valence Stabilizers for the Co$^{+3}$ Ion

| General Structural Name (Type of Organic) | Structural Representation |
|---|---|
| Tridentates, S—O Tetradentates) | and R''' represent H, NH$_2$ or any organic functional group wherein the number of carbon atoms ranges from 0 to 40, optionally having halogen or polarizing or water-insolubilizing/solubilizing groups attached. x = 1-3. Ligand can also contain nonbinding N, O, S, or P atoms. |
| S—O Valence Stabilizer #36: Monothiocarbimates, Bis(monothiocarbimates), and Poly(monothiocarbimates) (S—O Bidentates, S—O Tridentates, and S—O Tetradentates) | RN=C(OH)(SH), where R represents H, NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #37: Alkyl- and Aryl-Monothioborates and Bis(monothioborates) (S—O Bidentates and S—O Tetradentates) | R—O—C(—S—R'')—O—R', where R, R', and R'' represent H, NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #38: Alkyl- and Aryl-Monothioboronates and Bis(monothioboronates) (S—O Bidentates and S—O Tetradentates) | R—C(—S—R'')—O—R', where R, R', and R'' represent H, NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #39: Monothioarsonic Acids (Arsonothioic Acids), Bis(monothioarsonic acids), Poly(monothioarsonic acids), and derivatives thereof (S—O Bidentates, S—O Tridentates, S—O Tetradentates) | (O=)As(—S—R)(—O—R')(—O—R'') or (S=)As(—O—R)(—O—R')(—O—R''), where R, R', and R'' represent H, NH$_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| S—O Valence Stabilizer #40: Heterocyclic Rings containing One or Two Sulfur Atoms at least one additional Oxygen Atom Binding Site not in a Ring (S—O Bidentates, S—O Tridentates, S—O Tetradentates, or S—O Hexadentates) | Heterocyclic ring(s) containing one or two sulfur atoms. In addition, ligand contains additional oxygen-containing substituents (usually hydroxy, carboxy, or carbonyl groups) that constitute O binding sites. Can include other ring systems bound to the heterocyclic ring or to the O-containing substituent, but they do not coordinate with the stabilized, high valence metal ion. Ring(s) can also contain O, N, P, As or Se atoms. This 5-membered ring(s) and/or attached, uncoordinating rings and/or O-containing substituent(s) may or may not have halogen or polarizing or water-insolubilizing/solubilizing groups attached. |
| S—O Valence Stabilizer #41: Heterocyclic Rings containing One or Two Oxygen Atoms at least one additional Sulfur Atom Binding Site not in a Ring (S—O Bidentates, S—O Tridentates, S—O Tetradentates, or S—O Hexadentates) | Heterocyclic ring(s) containing one or two oxygen atoms. In addition, ligand contains additional sulfur-containing substituents (usually thio, mercapto, or thiocarbonyl groups) that constitute S binding sites. Can include other ring systems bound to the heterocyclic ring or to the S-containing substituent, but they do not coordinate with the stabilized, high valence metal ion. Ring(s) can also contain O, N, P, As or Se atoms. This 5-membered ring(s) and/or attached, uncoordinating rings and/or S-containing substituent(s) may or may not have halogen or polarizing or water-insolubilizing/solubilizing groups attached. |
| S—O Valence Stabilizer #42: Heterocyclic Rings containing One or Two Sulfur Atoms at least one additional Oxygen Atom Binding Site in a separate Ring (S—O Bidentates, S—O Tridentates, S—O Tetradentates, or S—O Hexadentates) | Heterocyclic ring(s) containing one or two sulfur atoms. In addition, ligand contains additional oxygen-containing rings that constitute O binding sites. Can include other ring systems bound to the O-containing heterocyclic rings, but they do not coordinate with the stabilized, high valence metal ion. |

TABLE 2-continued

Narrow Band Organic Valence Stabilizers for the $Co^{+3}$ Ion

| General Structural Name (Type of Organic) | Structural Representation |
|---|---|
| | Ring(s) can also contain O, N, P, As, or Se atoms. This 5-membered ring(s) and/or additional O-containing ring(s) and/or attached, uncoordinating rings may or may not have halogen or polarizing or water-insolubilizing/solubilizing groups attached. |
| S—O Valence Stabilizer #43: Two-, Three-, Four-, Five-, Six-, Seven-, Eight-, Nine-, and Ten-Membered Macrocyclics, Macrobicyclics, and Macropolycyclics (including Catapinands, Cryptands, Cyclidenes, and Sepulchrates) wherein all Binding Sites are composed of Sulfur (usually thiol, mercapto, or thiocarbonyl groups) or Oxygen (hydroxy, carboxy, or carbonyl groups) and are not contained in Component Heterocyclic Rings (S—O Bidentates, S—O Tridentates, S—O Tetradentates, and S—O Hexadentates) | Macrocyclic ligands containing two to ten sulfur or oxygen binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| S—O Valence Stabilizer #44: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur or Oxygen and are contained in Component 5-Membered Heterocyclic Rings (S—O Tridentates, S—O Tetradentates or S—O Hexadentates) | Macrocyclic ligands containing a total of four to ten five-membered heterocyclic rings containing sulfur or oxygen binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S—O Valence Stabilizer #45: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur or Oxygen and are contained in a Combination of Heterocyclic Rings and Thiol, Mercapto, Thiocarbonyl, Hydroxy, Carboxy, and Carbonyl Groups (S—O Tridentates, S—O Tetradentates, or S—O Hexadentates) | Macrocyclic ligands containing at least one heterocyclic ring. These heterocyclic rings provide sulfur or oxygen binding sites to valence stabilize the central metal ion. Other thiol, mercapto, thiocarbonyl, hydroxy, carboxy, or carbonyl binding sites can also be included in the macrocyclic ligand, so long as the total number of binding sites is four to ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| S—O Valence Stabilizer #46: Sulfoxides (S—O Bidentates) | Sulfoxides (R—SO—R'), where R and R' represent H or any organic functional group wherein the number of carbon atoms ranges from 0 to 35, optionally having halogen or polarizing or water-insolubilizing/solubilizing groups attached. |
| S—O Valence Stabilizer #47: Sulfones (S—O Bidentates) | Sulfones (R—$SO_2$—R'), where R and R' represent H or any organic functional group wherein the number of carbon atoms ranges from 0 to 35, optionally having halogen or polarizing or water-insolubilizing/solubilizing groups attached. |
| S—O Valence Stabilizer #48: Sulfur dioxide ($SO_2$) ligands (S—O Bidentates) | Sulfur dioxide ligands (—$SO_2$) bound directly to the high valence metal ion. |
| N—P Valence Stabilizer #1: Aminoaryl Phosphines and Iminoaryl Phosphines (N—P Bidentates, N—P Tridentates, and N—P Tetradentates) | [R(—NR'R")(—PR'''R'''')], [R(—NR'R")$_x$]$_{1-3}$P, [R(—NR'R")$_x$]$_{1-3}$PX, or [R(—PR'R")$_x$]$_{1-3}$N, where X = O or S and R, R', R", R''', and R'''' represents H, $NH_2$ or any organic functional group wherein the number of carbon atoms ranges from 0 to 35, optionally having halogen or polarizing or water-insolubilizing/solubilizing groups attached. Ligand can also contain nonbinding N, P, O, S, or Se atoms. |
| N—P Valence Stabilizer #2: Heterocyclic Rings containing One, Two, Three, or Four Nitrogen Atoms at least one additional Phosphorus Atom Binding Site not in a Ring (N—P Bidentates, N—P | Five membered heterocyclic ring(s) containing one, two, three, or four nitrogen atoms. In addition, ligand contains additional phosphorus-containing substituents that constitute P binding sites. Can include other |

TABLE 2-continued

Narrow Band Organic Valence Stabilizers for the $Co^{+3}$ Ion

| General Structural Name (Type of Organic) | Structural Representation |
|---|---|
| Tridentates, N—P Tetradentates, or N—P Hexadentates) | ring systems bound to the heterocyclic ring or to the P-containing substituent, but they do not coordinate with the stabilized, high valence metal ion. Ring(s) can also contain O, S, or P atoms. This ring(s) and/or attached, uncoordinating rings and/or P-containing substituent(s) may or may not have halogen or polarizing or water-insolubilizing/solubilizing groups attached. |
| N—P Valence Stabilizer #3: Heterocyclic Rings containing One, Two, or Three Phosphorus Atoms at least one additional Nitrogen Atom Binding Site not in a Ring (N—P Bidentates, N—P Tridentates, N—P Tetradentates, or N—P Hexadentates) | Five membered heterocyclic ring(s) containing one, two, or three phosphorus atoms. In addition, ligand contains additional nitrogen-containing substituents (usually amines, imines, or hydrazides) that constitute N binding sites. Can include other ring systems bound to the heterocyclic ring or to the N-containing substituent, but they do not coordinate with the stabilized, high valence metal ion. Ring(s) can also contain O, S, or P atoms. This ring(s) and/or attached, uncoordinating rings and/or N-containing substituent(s) may or may not have halogen or polarizing or water-insolubilizing/solubilizing groups attached. |
| N—P Valence Stabilizer #4: Heterocyclic Rings containing One, Two, Three, or Four Nitrogen Atoms at least one additional Phosphorus Atom Binding Site in a Separate Ring (N—P Bidentates, N—P Tridentates, N—P Tetradentates) | Heterocyclic ring(s) containing one, two, three, or four nitrogen atoms. In addition, ligand contains additional phosphorus-containing rings that constitute P binding sites. Can include other ring systems bound to the N- or P-containing heterocyclic rings, but they do not coordinate with the stabilized, high valence metal ion. Ring(s) can also contain O, S, or P atoms. This ring(s) and/or additional P-containing ring(s) and/or attached, uncoordinating rings may or may not have halogen or polarizing or water-insolubilizing/solubilizing groups attached. |
| N—P Valence Stabilizer #5: Two-, Three-, Four-, Five-, Six-, Seven-, Eight-, Nine-, and Ten-Membered Macrocyclics, Macrobicyclics, and Macropolycyclics (including Catapinands, Cryptands, Cyclidenes, and Sepulchrates) wherein all Binding Sites are composed of Nitrogen (usually amine or imine groups) or Phosphorus and are not contained in Component Heterocyclic Rings (N—P Bidentates, N—P Tridentates, N—P Tetradentates, and N—P Hexadentates) | Macrocyclic ligands containing two, three, four, five, six, seven, eight, nine, or ten binding sites composed of nitrogen and phosphorus to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| N—P Valence Stabilizer #6: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Nitrogen or Phosphorus and are contained in Component Heterocyclic Rings (N—P Bidentates, N—P Tridentates, N—P Tetradentates, or N—P Hexadentates) | Macrocyclic ligands containing a total of four, five, six, seven, eight, nine, or ten heterocyclic rings containing nitrogen or phosphorus binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| N—P Valence Stabilizer #7: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Nitrogen or Phosphorus and are contained in a Combination of Heterocyclic Rings and Amine, Imine, and Phosphine Groups (N—P Bidentates, N—P Tridentates, N—P | Macrocyclic ligands containing at least one heterocyclic ring. These heterocyclic rings provide nitrogen or phosphorus binding sites to valence stabilize the central metal ion. Other amine, imine, or phosphine binding sites can also be included in the macrocyclic ligand, so long as the total number of binding sites is four, five, six, seven, eight, nine, or ten. Can include other hydrocarbon/ring systems bound to this macrocyclic ligand, but they do not coordinate with the stabilized, high valence metal ion. |

TABLE 2-continued

Narrow Band Organic Valence Stabilizers for the $Co^{+3}$ Ion

| General Structural Name (Type of Organic) | Structural Representation |
|---|---|
| Tetradentates, or N—P Hexadentates) | This ligand and/or attached, uncoordinating hydrocarbon/rings may or may not have halogen or polarizing or water-insolubilizing groups attached. |
| S—P Valence Stabilizer #1: Thioaryl Phosphines (S—P Bidentates, S—P Tridentates, and S—P Tetradentates) | $[R(\text{—SR'})_x]_{1\text{-}3}P$, $[R(\text{—SR'})_x]_{1\text{-}3}PX$, $[R(\text{—PR'R''})(\text{—SR'''})]$, $[R(\text{—PR'R''})(\text{—S—S—R'''})]$, $[R(\text{—PR'R''})(\text{—C(=S)R'''}]$, $[R(\text{—PR'R''})_x]_2S$, $[R(\text{—PR'R''})_x]_{2\text{-}3}R'''(\text{—SR''''})_y$, $[R(\text{—SR'})_x]_{2\text{-}3}R''(\text{—PR'''R''''})_y$, $[R(\text{—PR'R''})_x]_2S_2$, and $[R(\text{—PR'R''})_x]_2R'''(C(=S))_yR''''$, where X = O or S, and R, R', R'', R''', and R'''' represent H, $NH_2$, or any organic functional group wherein the number of carbon atoms ranges from 0 to 40, optionally having halogen or polarizing or water-insolubilizing/solubilizing groups attached, and x = 1-2 and y = 1-4. Ligand can also contain nonbinding N, O, S, or P atoms. |
| S—P Valence Stabilizer #2: Heterocyclic Rings containing One or Two Sulfur Atoms at least one additional Phosphorus Atom Binding Site not in a Ring (P—S Bidentates, P—S Tridentates, P—S Tetradentates, or P—S Hexadentates) | Heterocyclic ring(s) containing one or two sulfur atoms. In addition, ligand contains additional phosphorus-containing substituents that constitute P binding sites. Can include other ring systems bound to the heterocyclic ring or to the P-containing substituent, but they do not coordinate with the stabilized, high valence metal ion. Ring(s) can also contain O, S, or P atoms. This ring(s) and/or attached, uncoordinating rings and/or P-containing substituent(s) may or may not have halogen or polarizing or water-insolubilizing/solubilizing groups attached. |
| S—P Valence Stabilizer #3: Heterocyclic Rings containing One, Two, or Three Phosphorus Atoms at least one additional Sulfur Atom Binding Site not in a Ring (S—P Bidentates, S—P Tridentates, S—P Tetradentates, or S—P Hexadentates) | Heterocyclic ring(s) containing one, two, or three phosphorus atoms. In addition, ligand contains additional sulfur-containing substituents (usually thiol, mercapto, or thiocarbonyl groups) that constitute S binding sites. Can include other ring systems bound to the heterocyclic ring or to the S-containing substituent, but they do not coordinate with the stabilized, high valence metal ion. Ring(s) can also contain O, S, or P atoms. This ring(s) and/or attached, uncoordinating rings and/or S-containing substituent(s) may or may not have halogen or polarizing or water-insolubilizing/solubilizing groups attached. |
| S—P Valence Stabilizer #4: Heterocyclic Rings containing One or Two Sulfur Atoms at least one additional Phosphorus Atom Binding Site in a Separate Ring (S—P Bidentates, S—P Tridentates, S—P Tetradentates) | Heterocyclic ring(s) containing one or two sulfur atoms. In addition, ligand contains additional phosphorus-containing rings that constitute P binding sites. Can include other ring systems bound to the S- or P-containing heterocyclic rings, but they do not coordinate with the stabilized, high valence metal ion. Ring(s) can also contain O, S, or P atoms. This ring(s) and/or additional P-containing ring(s) and/or attached, uncoordinating rings may or may not have halogen or polarizing or water-insolubilizing/solubilizing groups attached. |
| S—P Valence Stabilizer #5: Two-, Three-, Four-, Five-, Six-, Seven-, Eight-, Nine-, and Ten-Membered Macrocyclics, Macrobicyclics, and Macropolycyclics (including Catapinands, Cryptands, Cyclidenes, and Sepulchrates) wherein all Binding Sites are composed of Sulfur (usually thiol, mercapto, or thiocarbonyl groups) or Phosphorus and are not contained in Component Heterocyclic Rings (S—P Bidentates, S—P Tridentates, S—P Tetradentates, and S—P Hexadentates) | Macrocyclic ligands containing two, three, four, five, six, seven, eight, nine, or ten binding sites composed of sulfur and phosphorus to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| S—P Valence Stabilizer #6: Four-, Five-, Six-, Seven-, Eight-, Nine-, or Ten-Membered Macrocyclics, Macrobicyclics, and Macropolycyclics (including Catapinands, Cryptands, | Macrocyclic ligands containing a total of four, five, six, seven, eight, nine, or ten heterocyclic rings containing sulfur or phosphorus binding sites. Can include other hydrocarbon/ring systems bound to this macrocyclic ligand, but |

TABLE 2-continued

Narrow Band Organic Valence Stabilizers for the $Co^{+3}$ Ion

| General Structural Name (Type of Organic) | Structural Representation |
|---|---|
| Cyclidenes, and Sepulchrates) wherein all Binding Sites are composed of Sulfur or Phosphorus and are contained in Component Heterocyclic Rings (S—P Bidentates, S—P Tridentates, S—P Tetradentates, or S—P Hexadentates) | they do not coordinate with the stabilized, high valence metal ion. This ligand and/or attached, uncoordinating hydrocarbon/rings may or may not have halogen or polarizing or water-insolubilizing groups attached. |
| S—P Valence Stabilizer #7: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Sulfur or Phosphorus and are contained in a Combination of Heterocyclic Rings and Thiol, Mercapto, Thiocarbonyl or Phosphine Groups (S—P Bidentates, S—P Tridentates, S—P Tetradentates, or S—P Hexadentates) | Macrocyclic ligands containing at least one heterocyclic ring. These heterocyclic rings provide sulfur or phosphorus binding sites to valence stabilize the central metal ion. Other thiol, mercapto, or thiocarbonyl, or phosphine binding sites can also be included in the macrocyclic ligand, so long as the total number of binding sites is four, five, six, seven, eight, nine, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| P—O Valence Stabilizer #1: Hydroxyaryl Phosphines (P—O Bidentates, P—O Tridentates, and P—O Tetradentates) | $[R(-OR')_x]_{1-3}P$, $[R(-OR')_x]_{1-3}PX$, $[R(-PR'R'')(-OR''')]$, $[R(-PR'R'')(-C(=O)R''')]$, $[R(-PR'R'')_x]_2O$, $[R(-PR'R'')_x]_{2-3}R'''(-OR'''')_y$, $[R(-OR')_x]_{2-3}R'''(-PR'''R'''')_y$, and $[R(-PR'R'')_x]_2R'''(C(=O))_yR''''$, where X = O or S, and R, R', R'', R''', and R'''' represent H, $NH_2$, or any organic functional group wherein the number of carbon atoms ranges from 0 to 40, optionally having halogen or polarizing or water-insolubilizing/solubilizing groups attached, and x = 1-2 and y = 1-4. Ligand can also contain nonbinding N, O, S, or P atoms. |
| P—O Valence Stabilizer #2: Heterocyclic Rings containing One or Two Oxygen Atoms at least one additional Phosphorus Atom Binding Site not in a Ring (P—O Bidentates, P—O Tridentates, P—O Tetradentates, or P—O Hexadentates) | Heterocyclic ring(s) containing one or two oxygen atoms. In addition, ligand contains additional phosphorus-containing substituents that constitute P binding sites. Can include other ring systems bound to the heterocyclic ring or to the P-containing substituent, but they do not coordinate with the stabilized, high valence metal ion. Ring(s) can also contain O, S, or P atoms. This ring(s) and/or attached, uncoordinating rings and/or P-containing substituent(s) may or may not have halogen or polarizing or water-insolubilizing/solubilizing groups attached. |
| P—O Valence Stabilizer #3: Heterocyclic Rings containing One, Two, or Three Phosphorus Atoms at least one additional Oxygen Atom Binding Site not in a Ring (P—O Bidentates, P—O Tridentates, P—O Tetradentates, or P—O Hexadentates) | Heterocyclic ring(s) containing one, two, or three phosphorus atoms. In addition, ligand contains additional oxygen-containing substituents (usually hydroxy, carboxy, or carbonyl groups) that constitute O binding sites. Can include other ring systems bound to the heterocyclic ring or to the O-containing substituent, but they do not coordinate with the stabilized, high valence metal ion. Ring(s) can also contain O, S, or P atoms. This ring(s) and/or attached, uncoordinating rings and/or O-containing substituent(s) may or may not have halogen or polarizing or water-insolubilizing/solubilizing groups attached. |
| P—O Valence Stabilizer #4: Heterocyclic Rings containing One or Two Oxygen Atoms at least one additional Phosphorus Atom Binding Site in a Separate Ring (P—O Bidentates, P—O Tridentates, P—O Tetradentates) | Heterocyclic ring(s) containing one or two oxygen atoms. In addition, ligand contains additional phosphorus-containing rings that constitute P binding sites. Can include other ring systems bound to the O- or P-containing heterocyclic rings, but they do not coordinate with the stabilized, high valence metal ion. Ring(s) can also contain O, S, or P atoms. This ring(s) and/or additional P-containing ring(s) and/or attached, uncoordinating rings may or may not have halogen or polarizing or water-insolubilizing/solubilizing groups attached. |

TABLE 2-continued

Narrow Band Organic Valence Stabilizers for the $Co^{+3}$ Ion

| General Structural Name (Type of Organic) | Structural Representation |
|---|---|
| P—O Valence Stabilizer #5: Two-, Three-, Four-, Five-, Six-, Seven-, Eight-, Nine-, and Ten-Membered Macrocyclics, Macrobicyclics, and Macropolycyclics (including Catapinands, Cryptands, Cyclidenes, and Sepulchrates) wherein all Binding Sites are composed of Oxygen (usually hydroxy, carboxy, or carbonyl groups) or Phosphorus and are not contained in Component Heterocyclic Rings (P—O Bidentates, P—O Tridentates, P—O Tetradentates, and P—O Hexadentates) | Macrocyclic ligands containing two, three, four, five, six, seven, eight, nine, or ten binding sites composed of oxygen and phosphorus to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| P—O Valence Stabilizer #6: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Oxygen or Phosphorus and are contained in Component Heterocyclic Rings (P—O Bidentates, P—O Tridentates, P—O Tetradentates, or P—O Hexadentates) | Macrocyclic ligands containing a total of four, five, six, seven, eight, nine, or ten heterocyclic rings containing oxygen or phosphorus binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| P—O Valence Stabilizer #7: Four-, Five-, Six-, Seven-, Eight-, Nine-, or Ten-Membered Macrocyclics, Macrobicyclics, and Macropolycyclics (including Catapinands, Cryptands, Cyclidenes, and Sepulchrates) wherein all Binding Sites are composed of Oxygen or Phosphorus and are contained in a Combination of Heterocyclic Rings and Hydroxy, Carboxy, Carbonyl or Phosphine Groups (P—O Bidentates, P—O Tridentates, P—O Tetradentates, or P—O Hexadentates) | Macrocyclic ligands containing at least one heterocyclic ring. These heterocyclic rings provide oxygen or phosphorus binding sites to valence stabilize the central metal ion. Other hydroxy, carboxy, carbonyl, or phosphine binding sites can also be included in the macrocyclic ligand, so long as the total number of binding sites is four, five, six, seven, eight, nine, or ten. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| As Valence Stabilizer #1: Monoarsines (As Monodentates) wherein at least one Arsenic Atom is a Binding Site | $AsH_3$, $AsH_2R$, $AsHR_2$, where R represents H or any organic functional group wherein the number of carbon atoms ranges from 0 to 25, optionally having halogen or polarizing or water-insolubilizing/solubilizing groups attached. Ligand can also contain nonbinding N, P, As, O, S, or Se atoms. |
| As Valence Stabilizer #2: Diarsines (an As—As Bidentate) wherein at least one Arsenic Atom is a Binding Site | R'—As—R—As—R", where R, R', and R" represent H or any organic functional group wherein the number of carbon atoms ranges from 0 to 25, optionally having halogen or polarizing or water-insolubilizing/solubilizing groups attached. Ligand can also contain nonbinding N, P, As, O, S, or Se atoms. |
| As Valence Stabilizer #3: Triarsines (either As—As Bidentates or As—As Tridentates) wherein at least one Arsenic Atom is a Binding Site | R—As—R'—As—R"—As—R''', where R, R', R", and R''' represent H or any organic functional group wherein the number of carbon atoms ranges from 0 to 25, optionally having halogen or polarizing or water-insolubilizing/solubilizing groups attached. Ligand can also contain nonbinding N, P, As, O, S, or Se atoms. |
| As Valence Stabilizer #4: Tetraarsines (As—As Bidentates, As—As Tridentates, or As—As Tetradentates) wherein at least one Arsenic Atom is a Binding Site | R—As—R'—As—R"—As—R'''—As—R'''', where R, R', R", R''', and R'''' represent H or any organic functional group wherein the number of carbon atoms ranges from 0 to 25, optionally having halogen or polarizing or water-insolubilizing/solubilizing groups attached. Ligand can also contain nonbinding N, P, As, O, S, or Se atoms. |
| As Valence Stabilizer #5: Pentaarsines (As—As Bidentates, As—As Tridentates, or As—As Tetradentates) wherein at least one Arsenic Atom is a | R—As—R'—As—R"—As—R'''—As—R''''—As—R''''', where R, R', R", R''', R'''', and R''''' represent H or any organic functional group wherein the number of carbon atoms ranges from 0 to 25, |

TABLE 2-continued

Narrow Band Organic Valence Stabilizers for the $Co^{+3}$ Ion

| General Structural Name (Type of Organic) | Structural Representation |
|---|---|
| Binding Site | optionally having halogen or polarizing or water-insolubilizing/solubilizing groups attached. Ligand can also contain nonbinding N, P, As, O, S, or Se atoms. |
| As Valence Stabilizer #6: Hexaarsines (As—As Bidentates, As—As Tridentates, As—As Tetradentates, or As—As Hexadentates) wherein at least one Arsenic Atom is a Binding Site | R—As—R'—As—R''—As—R'''—As—R''''—As—R'''''—As—R'''''', where R, R', R'', R''', R'''', R''''', and R'''''' represent H or any organic functional group wherein the number of carbon atoms ranges from 0 to 25, optionally having halogen or polarizing or water-insolubilizing/solubilizing groups attached. Ligand can also contain nonbinding N, P, As, O, S, or Se atoms. |
| As Valence Stabilizer #7: Five-Membered Heterocyclic Rings containing One Arsenic Atom wherein the Arsenic Atom is the Binding Site (As Monodentates) | Five membered heterocyclic ring containing just one arsenic binding site. Can include other ring systems bound to this heterocyclic ring, but they do not coordinate with the stabilized, high valence metal ion. Ring can also contain O, S, N, P, or Se atoms. This 5-membered ring and/or attached, uncoordinating rings may or may not have halogen or polarizing or water-insolubilizing/solubilizing groups attached. |
| As Valence Stabilizer #8: Six-Membered Heterocyclic Rings containing One Arsenic Atom wherein the Arsenic Atom is the Binding Site (As Monodentates) | Six membered heterocyclic ring containing just one arsenic binding site. Can include other ring systems bound to this heterocyclic ring, but they do not coordinate with the stabilized, high valence metal ion. Ring can also contain O, S, N, P, or Se atoms. This 6-membered ring and/or attached, uncoordinating rings may or may not have halogen or polarizing or water-insolubilizing/solubilizing groups attached. |
| As Valence Stabilizer #9: Five-Membered Heterocyclic Rings containing One Arsenic Atom and having at least one additional Arsenic Atom Binding Site not in a Ring (As Monodentates, As—As Bidentates, As—As Tridentates, As—As Tetradentates, or As—As Hexadentates) | Five membered heterocyclic ring(s) containing one arsenic atom. In addition, ligand contains additional arsenic-containing substituents (usually arsines) that constitute As binding sites. Can include other ring systems bound to the heterocyclic ring or to the As-containing substituent, but they do not coordinate with the stabilized, high valence metal ion. Ring(s) can also contain O, N, S, P or Se atoms. This 5-membered ring(s) and/or attached, uncoordinating rings and/or As-containing substituent(s) may or may not have halogen or polarizing or water-insolubilizing/solubilizing groups attached. |
| As Valence Stabilizer #10: Six-Membered Heterocyclic Rings containing One Arsenic Atom and having at least one additional Arsenic Atom Binding Site not in a Ring (As Monodentates, As—As Bidentates, As—As Tridentates, As—As Tetradentates, or As—As Hexadentates) | Six membered heterocyclic ring(s) containing one arsenic atom. In addition, ligand contains additional arsenic-containing substituents (usually arsines) that constitute As binding sites. Can include other ring systems bound to the heterocyclic ring or to the As-containing substituent, but they do not coordinate with the stabilized, high valence metal ion. Ring(s) can also contain O, N, S, P or Se atoms. This 6-membered ring(s) and/or attached, uncoordinating rings and/or As-containing substituent(s) may or may not have halogen or polarizing or water-insolubilizing/solubilizing groups attached. |
| As Valence Stabilizer #11: Five-Membered Heterocyclic Rings containing One Arsenic Atom and having at least one additional Arsenic Atom Binding Site in a separate Ring (As Monodentates, As—As Bidentates, As—As Tridentates, As—As Tetradentates, or As—As Hexadentates) | Five membered heterocyclic ring(s) containing one arsenic atom. In addition, ligand contains additional arsenic-containing rings that constitute As binding sites. Can include other ring systems bound to the As-containing heterocyclic rings, but they do not coordinate with the stabilized, high valence metal ion. Ring(s) can also contain O, N, S, P, or Se atoms. This 5-membered ring(s) and/or additional As-containing ring(s) and/or attached, uncoordinating rings may or may not have halogen or polarizing or water-insolubilizing/solubilizing groups attached. |

TABLE 2-continued

Narrow Band Organic Valence Stabilizers for the $Co^{+3}$ Ion

| General Structural Name (Type of Organic) | Structural Representation |
|---|---|
| As Valence Stabilizer #12: Six-Membered Heterocyclic Rings containing One Arsenic Atom and having at least one additional Arsenic Atom Binding Site in a separate Ring (As Monodentates, As—As Bidentates, As—As Tridentates, As—As Tetradentates, or As—As Hexadentates) | Six membered heterocyclic ring(s) containing one arsenic atom. In addition, ligand contains additional arsenic-containing rings that constitute As binding sites. Can include other ring systems bound to the As-containing heterocyclic rings, but they do not coordinate with the stabilized, high valence metal ion. Ring(s) can also contain O, N, S, P, or Se atoms. This 6-membered ring(s) and/or additional As-containing ring(s) and/or attached, uncoordinating rings may or may not have halogen or polarizing or water-insolubilizing/solubilizing groups attached. |
| As Valence Stabilizer #13: Two-, Three-, Four-, and Six-Membered Macrocyclics, Macrobicyclics, and Macropolycyclics (including Catapinands, Cryptands, Cyclidenes, and Sepulchrates) wherein all Binding Sites are composed of Arsenic and are not contained in Component Heterocyclic Rings (As—As Bidentates, As—As Tridentates, As—As Tetradentates, and As—As Hexadentates) | Macrocyclic ligands containing two, three, four, or six arsenic binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| As Valence Stabilizer #14: Four-, or Six-Membered Macrocyclics, Macrobicyclics, and Macropolycyclics (including Catapinands, Cryptands, Cyclidenes, and Sepulchrates) wherein all Binding Sites are composed of Arsenic and are contained in Component 5-Membered Heterocyclic Rings (As—As Tridentates, As—As Tetradentates, or As—As Hexadentates) | Macrocyclic ligands containing a total of four or six five-membered heterocyclic rings containing arsenic binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| As Valence Stabilizer #15: Four-, or Six-Membered Macrocyclics, Macrobicyclics, and Macropolycyclics (including Catapinands, Cryptands, Cyclidenes, and Sepulchrates) wherein all Binding Sites are composed of Arsenic and are contained in a Combination of 5-Membered Heterocyclic Rings and Arsine Groups (As—As Tridentates, As—As Tetradentates, or As—As Hexadentates) | Macrocyclic ligands containing at least one 5-membered heterocyclic ring. These heterocyclic rings provide arsenic binding sites to valence stabilize the central metal ion. Other arsine binding sites can also be included in the macrocyclic ligand, so long as the total number of binding sites is four or eight. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| As Valence Stabilizer #16: Four-, or Six-Membered Macrocyclics, Macrobicyclics, and Macropolycyclics (including Catapinands, Cryptands, Cyclidenes, and Sepulchrates) wherein all Binding Sites are composed of Arsenic and are contained in Component 6-Membered Heterocyclic Rings (As—As Tridentates, As—As Tetradentates, or As—As Hexadentates) | Macrocyclic ligands containing a total of four or six six-membered heterocyclic rings containing arsenic binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| As Valence Stabilizer #17: Four-, or Six-Membered Macrocyclics, Macrobicyclics, and Macropolycyclics (including Catapinands, Cryptands, Cyclidenes, and Sepulchrates) wherein all Binding Sites are composed of Arsenic and are contained in a Combination of 6-Membered Heterocyclic Rings and Arsine Groups (As—As Tridentates, As—As Tetradentates, or As—As Hexadentates) | Macrocyclic ligands containing at least one 6-membered heterocyclic ring. These heterocyclic rings provide arsenic binding sites to valence stabilize the central metal ion. Other arsine binding sites can also be included in the macrocyclic ligand, so long as the total number of binding sites is four or six. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| Se Valence Stabilizer #1: Monoselenoethers (Se Monodentates) wherein at least one Selenium Atom is a | $SeH_2$, $SeHR$, $SeR_2$, where R represents H or any organic functional group wherein the number of carbon atoms ranges from 0 to 25, optionally |

TABLE 2-continued

Narrow Band Organic Valence Stabilizers for the $Co^{+3}$ Ion

| General Structural Name (Type of Organic) | Structural Representation |
|---|---|
| Binding Site | having halogen or polarizing or water-insolubilizing/solubilizing groups attached. Ligand can also contain nonbinding N, P, O, S, or Se atoms. |
| Se Valence Stabilizer #2: Diselenoethers (Se—Se Bidentates) wherein at least one Selenium Atom is a Binding Site | R—Se—R'—Se—R", where R, R', and R" represents H or any organic functional group wherein the number of carbon atoms ranges from 0 to 25, optionally having halogen or polarizing or water-insolubilizing/solubilizing groups attached. Ligand can also contain nonbinding N, P, O, S, or Se atoms. |
| Se Valence Stabilizer #3: Triselenoethers (Se—Se Bidentates or Se—Se Tridentates) wherein at least one Selenium Atom is a Binding Site | R—Se—R'—Se—R"—Se—R"', where R, R', R", and R"' represents H or any organic functional group wherein the number of carbon atoms ranges from 0 to 25, optionally having halogen or polarizing or water-insolubilizing/solubilizing groups attached. Ligand can also contain nonbinding N, P, O, S, or Se atoms. |
| Se Valence Stabilizer #4: Tetraselenoethers (Se—Se Bidentates, Se—Se Tridentates, or Se—Se Tetradentates) wherein at least one Selenium Atom is a Binding Site | R—Se—R'—Se—R"—Se—R"'—Se—R"", where R, R', R", R"', and R"" represents H or any organic functional group wherein the number of carbon atoms ranges from 0 to 25, optionally having halogen or polarizing or water-insolubilizing/solubilizing groups attached. Ligand can also contain nonbinding N, P, O, S, or Se atoms. |
| Se Valence Stabilizer #5: Five-Membered Heterocyclic Rings containing One or Two Selenium Atoms wherein at least one Selenium Atom is a Binding Site (Se Monodentates or Se—Se Bidentates) | Five membered heterocyclic ring containing one or two selenium atoms, both of which may function as binding sites. Can include other ring systems bound to this heterocyclic ring, but they do not coordinate with the stabilized, high valence metal ion. Ring can also contain O, N, P, As, or S atoms. This 5-membered ring and/or attached, uncoordinating rings may or may not have halogen or polarizing or water-insolubilizing/solubilizing groups attached. |
| Se Valence Stabilizer #6: Six-Membered Heterocyclic Rings containing One or Two Selenium Atoms wherein at least one Selenium Atom is a Binding Site (Se Monodentates or Se—Se Bidentates) | Six membered heterocyclic ring containing one or two selenium atoms, both of which may function as binding sites. Can include other ring systems bound to this heterocyclic ring, but they do not coordinate with the stabilized, high valence metal ion. Ring can also contain O, N, P, As, or S atoms. This 5-membered ring and/or attached, uncoordinating rings may or may not have halogen or polarizing or water-insolubilizing/solubilizing groups attached. |
| Se Valence Stabilizer #7: Five-Membered Heterocyclic Rings containing One Selenium Atom and having at least one additional Selenium Atom Binding Site not in a Ring (Se Monodentates, Se—Se Bidentates, Se—Se Tridentates, Se—Se Tetradentates, or Se—Se Hexadentates) | Five membered heterocyclic ring(s) containing one selenium atom. In addition, ligand contains additional selenium-containing substituents (usually selenols or selenoethers) that constitute Se binding sites. Can include other ring systems bound to the heterocyclic ring or to the Se-containing substituent, but they do not coordinate with the stabilized, high valence metal ion. Ring(s) can also contain O, N, P, As or S atoms. This 5-membered ring(s) and/or attached, uncoordinating rings and/or Se-containing substituent(s) may or may not have halogen or polarizing or water-insolubilizing/solubilizing groups attached. |
| Se Valence Stabilizer #8: Six-Membered Heterocyclic Rings containing One Selenium Atom and having at least one additional Selenium Atom Binding Site not in a Ring (Se Monodentates, Se—Se Bidentates, Se—Se Tridentates, Se—Se Tetradentates, or Se—Se Hexadentates) | Six membered heterocyclic ring(s) containing one selenium atom. In addition, ligand contains additional selenium-containing substituents (usually selenols or selenoethers) that constitute Se binding sites. Can include other ring systems bound to the heterocyclic ring or to the Se-containing substituent, but they do not coordinate with the stabilized, high valence metal ion. Ring(s) can also contain O, N, P, As or S atoms. This 6-membered ring(s) and/or |

TABLE 2-continued

Narrow Band Organic Valence Stabilizers for the Co$^{+3}$ Ion

| General Structural Name (Type of Organic) | Structural Representation |
|---|---|
| | attached, uncoordinating rings and/or Se-containing substituent(s) may or may not have halogen or polarizing or water-insolubilizing/solubilizing groups attached. |
| Se Valence Stabilizer #9: Five-Membered Heterocyclic Rings containing One Selenium Atom and having at least one additional Selenium Atom Binding Site in a separate Ring (Se Monodentates, Se—Se Bidentates, Se—Se Tridentates, Se—Se Tetradentates, or Se—Se Hexadentates) | Five membered heterocyclic ring(s) containing one selenium atom. In addition, ligand contains additional selenium-containing rings that constitute Se binding sites. Can include other ring systems bound to the Se-containing heterocyclic rings, but they do not coordinate with the stabilized, high valence metal ion. Ring(s) can also contain O, N, P, As, or S atoms. This 5-membered ring(s) and/or additional Se-containing ring(s) and/or attached, uncoordinating rings may or may not have halogen or polarizing or water-insolubilizing/solubilizing groups attached. |
| Se Valence Stabilizer #10: Six-Membered Heterocyclic Rings containing One Selenium Atom and having at least one additional Selenium Atom Binding Site in a separate Ring (Se Monodentates, Se—Se Bidentates, Se—Se Tridentates, Se—Se Tetradentates, or Se—Se Hexadentates) | Six membered heterocyclic ring(s) containing one selenium atom. In addition, ligand contains additional selenium-containing rings that constitute Se binding sites. Can include other ring systems bound to the Se-containing heterocyclic rings, but they do not coordinate with the stabilized, high valence metal ion. Ring(s) can also contain O, N, P, As, or S atoms. This 6-membered ring(s) and/or additional Se-containing ring(s) and/or attached, uncoordinating rings may or may not have halogen or polarizing or water-insolubilizing/solubilizing groups attached. |
| Se Valence Stabilizer #11: Two-, Three-, Four-, or Six-Membered Macrocyclics, Macrobicyclics, and Macropolycyclics (including Catapinands, Cryptands, Cyclidenes, and Sepulchrates) wherein all Binding Sites are composed of Selenium (usually selenol or selenoether groups) and are not contained in Component Heterocyclic Rings (Se—Se Bidentates, Se—Se Tridentates, Se—Se Tetradentates, or Se—Se Hexadentates) | Macrocyclic ligands containing two, three, four, or six selenium binding sites to valence stabilize the central metal ion. Can include other hydrocarbon or ring systems bound to this macrocyclic ligand, but they do not coordinate with the stabilized, high valence metal ion. This ligand and/or attached, uncoordinating hydrocarbons/rings may or may not have halogen or polarizing or water-insolubilizing/solubilizing groups attached. |
| Se Valence Stabilizer #12: Four-, or Six-Membered Macrocyclics, Macrobicyclics, and Macropolycyclics (including Catapinands, Cryptands, Cyclidenes, and Sepulchrates) wherein all Binding Sites are composed of Selenium and are contained in Component 5-Membered Heterocyclic Rings (Se—Se Tridentates, Se—Se Tetradentates or Se—Se Hexadentates) | Macrocyclic ligands containing a total of four or six five-membered heterocyclic rings containing selenium binding sites. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| Se Valence Stabilizer #13: Four-, or Six-Membered Macrocyclics, Macrobicyclics, and Macropolycyclics (including Catapinands, Cryptands, Cyclidenes, and Sepulchrates) wherein all Binding Sites are composed of Selenium and are contained in a Combination of 5-Membered Heterocyclic Rings and Selenol or Selenoether Groups (Se—Se Tridentates, Se—Se Tetradentates, or Se—Se Hexadentates) | Macrocyclic ligands containing at least one 5-membered heterocyclic ring. These heterocyclic rings provide selenium binding sites to valence stabilize the central metal ion. Other selenol or selenoether binding sites can also be included in the macrocyclic ligand, so long as the total number of binding sites is four or six. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| Se Valence Stabilizer #14: Four-, or Six-Membered Macrocyclics, Macrobicyclics, and Macropolycyclics (including Catapinands, Cryptands, Cyclidenes, and Sepulchrates) wherein all Binding Sites are composed of Selenium and are contained in Component 6-Membered Heterocyclic Rings (Se—Se | Macrocyclic ligands containing a total of four or six six-membered heterocyclic rings containing selenium binding sites. Can include other hydrocarbon/ring systems bound to this macrocyclic ligand, but they do not coordinate with the stabilized, high valence metal ion. This ligand and/or attached, uncoordinating hydrocarbon/rings may or may not have |

TABLE 2-continued

Narrow Band Organic Valence Stabilizers for the $Co^{+3}$ Ion

| General Structural Name (Type of Organic) | Structural Representation |
|---|---|
| Tridentates, Se—Se Tetradentates, or Se—Se Hexadentates) | halogen or polarizing or water-insolubilizing groups attached. |
| Se Valence Stabilizer #15: Four-, or Six-Membered Macrocyclics, Macrobicyclics, and Macropolycyclics (including Catapinands, Cryptands, Cyclidenes, and Sepulchrates) wherein all Binding Sites are composed of Selenium and are contained in a Combination of 6-Membered Heterocyclic Rings and Selenol or Selenoether Groups (Se—Se Tridentates, Se—Se Tetradentates, or Se—Se Hexadentates) | Macrocyclic ligands containing at least one 6-membered heterocyclic ring. These heterocyclic rings provide selenium binding sites to valence stabilize the central metal ion. Other selenol or selenoether binding sites can also be included in the macrocyclic ligand, so long as the total number of binding sites is four or six. Can include other hydrocarbon/ring systems bound to this macrocyclic ligand, but they do not coordinate with the stabilized, high valence metal ion. This ligand and/or attached, uncoordinating hydrocarbon/rings may or may not have halogen or polarizing or water-insolubilizing groups attached. |
| Se Valence Stabilizer #16: 1,3-Diselenoketones (Diseleno-beta-ketonates), 1,3,5-Triselenoketones, Bis(1,3-Diselenoketones), and Poly(1,3-Diselenoketones) (S—S Bidentates, S—S Tridentates, S—S Tetradentates) | R—C(=Se)—CR'R"—C(=Se)—R''' where R, R', R", and R''' represent H, $NH_2$, or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #17: 1,1-Diselenolates, Bis(1,1-diselenolates), and Poly(1,1-diselenolates) (Se—Se Bidentates and Se—Se Tetradentates) | RR'—C=C(—Se$^-$)(—Se$^-$), where R and R' represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #18: Diselenocarbamates, Bis(diselenocarbamates), and Poly(diselenocarbamates) (including N-hydroxydiselenocarbamates and N-mercaptodiselenocarbamates) (Se—Se Bidentates, Se—Se Tridentates, and Se—Se Tetradentates) | RR'N$^+$=C(SeH)(SeH), where R and R' represent H, OH, SH, OR" (R" = $C_1$-$C_{30}$ alkyl or aryl), SR" (R" = $C_1$-$C_{30}$ alkyl or aryl), $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #19: Triselenophosphoric Acids (Phosphorotriselenoic Acids), Bis(triselenophosphoric acids), Poly(triselenophosphoric acids), and derivatives thereof (Se—Se Bidentates, Se—Se Tridentates, Se—Se Tetradentates) | (O=)P(—Se—R)(—Se—R')(—Se—R") or (Se=)P(—Se—R)(—Se—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #20: Diselenophosphoric Acids (Phosphorodiselenoic Acids), Bis(diselenophosphoric acids), Poly(diselenophosphoric acids), and derivatives thereof (Se—Se Bidentates, Se—Se Tridentates, Se—Se Tetradentates) | (O=)P(—Se—R)(—Se—R')(—O—R") or (Se=)P(—Se—R)(—O—R')(—O—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #21: Tetraselenophosphoric Acids (Phosphorotetraselenoic Acids), Bis(tetraselenophosphoric acids), Poly(tetraselenophosphoric acids), and derivatives thereof (Se—Se Bidentates, Se—Se Tridentates, Se—Se Tetradentates) | (Se=)P(—Se—R)(—Se—R')(—Se—R"), where R, R', and R" represent H, $NH_2$ or any organic functional group wherein the number of carbon atoms ranges from 0 to 40, optionally having halogen or polarizing or water-insolubilizing/solubilizing groups attached. Ligand can also contain nonbinding N, O, S, or P atoms. |
| Se Valence Stabilizer #22: Diselenocarbonates, Triselenocarbonates, Bis(diselenocarbonates), and Bis(triselenocarbonates), (Se—Se Bidentates and Se—Se Tetradentates) | R—Se—C(=Se)—O—R' or R—Se—C(=O)—Se—R' for diselenocarbonates, and R—Se—C(=Se)—Se—R' for triselenocarbonates, where R, and R' represent H, $NH_2$ or any organic functional group wherein the number of carbon atoms ranges from 0 to 40, optionally having halogen or polarizing or |

TABLE 2-continued

Narrow Band Organic Valence Stabilizers for the $Co^{+3}$ Ion

| General Structural Name (Type of Organic) | Structural Representation |
|---|---|
| | water-insolubilizing/solubilizing groups attached. Ligand can also contain nonbinding N, O, S, or P atoms. |
| Se Valence Stabilizer #23: Selenocyanates (Se Monodentates) | Selenocyanates bound directly to the high valence metal ion. |
| Se Valence Stabilizer #24: Selenolates (Se Monodentates) | Selenolates (HSe—R, HSe—R—SeH, etc.), where R and R' represent H or any organic functional group wherein the number of carbon atoms ranges from 0 to 35, optionally having halogen or polarizing or water-insolubilizing/solubilizing groups attached. |
| Miscellaneous Valence Stabilizer #1: Diene or bicyclic or tricyclic hydrocarbon ligands | Dialkenes or bicyclic or tricyclic hydrocarbons bound directly to the high valence metal ion. |
| Miscellaneous Valence Stabilizer #2: Cyanide and related ligands | Cyanide and cyanate and related ligands bound directly to the high valence metal ion. |
| Miscellaneous Valence Stabilizer #3: Carbonyl ligands | Carbonyl (—CO) ligands bound directly to the high valence metal ion. |
| Miscellaneous Valence Stabilizer #4: Halogen ligands | Halogen (X) atoms bound directly to the high valence metal ion. |
| Miscellaneous Valence Stabilizer #5: Hydroxo and Oxo Ligands | Hydroxo and oxo ligands bound directly to the high valence metal ion. |

N Valence Stabilizer #1a: Examples of five-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates or N-N Tetradentates) that meet the requirements for use as "narrow band" valence stabilizers for $Co^{+3}$ include, but are not limited to: pentaazacyclodecane ([10]aneN$_5$); pentaazacycloundecane ([11]aneN$_5$); pentaazacyclododecane ([12]aneN$_5$); pentaazacyclotridecane ([13]aneN$_5$); pentaazacyclotetradecane ([14]aneN$_5$); pentaazacyclopentadecane ([15]aneN$_5$); pentaazacyclodecatriene ([10]trieneN$_5$); pentaazacycloundecatriene ([11]trieneN$_5$); pentaazacyclododecatriene ([12]trieneN$_5$); pentaazacyclotridecatriene ([13]trieneN$_5$); pentaazacyclotetradecatriene ([14]trieneN$_5$); and pentaazacyclopentadecatriene ([15]trieneN$_5$).

N Valence Stabilizer #1b: Examples of seven-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates, N-N Tetradentates, or N-N Hexadentates) that meet the requirements for use as "narrow band" valence stabilizers for $Co^{+3}$ include, but are not limited to: heptaazacyclotetradecane ([14]aneN$_7$); heptaazacyclopentadecane ([$_{15}$]aneN$_7$); heptaazacyclohexadecane ([16]aneN$_7$); heptaazacycloheptadecane ([17]aneN$_7$); heptaazacyclooctadecane ([18]aneN$_7$); heptaazacyclononadecane ([19]aneN$_7$); heptaazacycloeicosane ([20]aneN$_7$); heptaazacycloheneicosane ([21]aneN$_7$); heptaazacyclotetradecatriene ([14]trieneN$_7$); heptaazacyclopentadecatriene ([15]trieneN$_7$); heptaazacyclohexadecatriene ([16]trieneN$_7$); heptaazacycloheptadecatriene ([17]trieneN$_7$); heptaazacyclooctadecatriene ([18]trieneN$_7$); heptaazacyclononadecatriene ([19]trieneN$_7$); heptaazacycloeicosatriene ([20]trieneN$_7$); and heptaazacycloheneicosatriene ([21]trieneN$_7$).

N Valence Stabilizer #1c: Examples of nine-membered macrocyclics, macrobicyclics, and macropolycyclics (including catapinands, cryptands, cyclidenes, and sepulchrates) wherein all binding sites are composed of nitrogen (usually amine or imine groups) and are not contained in component heterocyclic rings (N-N Tridentates, N-N Tetradentates, or N-N Hexadentates) that meet the requirements for use as "narrow band" valence stabilizers for $Co^{+3}$ include, but are not limited to: nonaazacyclooctadecane ([18]aneN$_9$); nonaazacyclononadecane ([19]aneN$_9$); nonaazacycloeicosane ([20]aneN$_9$); nonaazacycloheneicosane ([21]aneN$_9$); nonaazacyclodocosane ([22]aneN$_9$); nonaazacyclotricosane ([23]aneN$_9$); nonaazacyclotetracosane ([24]aneN$_9$); nonaazacyclopentacosane ([25]aneN$_9$); nonaazacyclohexacosane ([26]aneN$_9$); nonaazacycloheptacosane ([27]aneN$_9$); nonaazacyclooctadecatetradiene ([18]tetradieneN$_9$); nonaazacyclononadecatetradiene ([19]tetradieneN$_9$); nonaazacycloeicosatetradiene ([20]tetradieneN$_9$); nonaazacycloheneicosatetradiene ([21]tetradieneN$_9$); nonaazacyclodocosatetradiene ([22]tetradieneN$_9$); nonaazacyclotricosatetradiene ([23]tetradieneN$_9$); nonaazacyclotetracosatetradiene ([24]tetradieneN$_9$); nonaazacyclopentacosatetradiene ([25]tetradieneN$_9$); nonaazacyclohexacosatetradiene ([26]tetradieneN$_9$); and nonaazacycloheptacosatetradiene ([27]tetradieneN$_9$).

N Valence Stabilizer #2a: Examples of five-membered macrocyclics, macrobicyclics, and macropolycyclics (including catapinands, cryptands, cyclidenes, and sepulchrates) wherein all five binding sites are composed of nitrogen and are contained in component 5-membered heterocyclic rings (N-N Tetradentates) that meet the requirements for use as "narrow band" valence stabilizers for $Co^{+3}$ include, but are not limited to: pentaphyrins (pentapyrroles); sapphyrins; smaragdyrins; pentaoxazoles; pentaisooxazoles; pentathiazoles; pentaisothiazoles; pentaazaphospholes; pentaimidazoles; pentapyrazoles; pentaoxadiazoles; pentathiadiazoles; pentadiazaphospholes; pentatriazoles; pentaoxatriazoles; and pentathiatriazoles.

N Valence Stabilizer #2b: Examples of seven-membered macrocyclics, macrobicyclics, and macropolycyclics (including catapinands, cryptands, cyclidenes, and sepulchrates) wherein all seven binding sites are composed of nitrogen and are contained in component 5-membered heterocyclic rings (N-N Tetradentates) that meet the requirements for use as "narrow band" valence stabilizers for $Co^{+3}$ include, but are not limited to: heptaphyrins (heptapyrroles); heptaoxazoles; heptaisooxazoles; heptathiazoles; heptaisothiazoles; heptaazaphospholes; heptaimidazoles; heptapyrazoles; heptaoxadiazoles; heptathiadiazoles; heptadiazaphospholes; heptatriazoles; heptaoxatriazoles; and heptathiatriazoles.

N Valence Stabilizer #3a: Examples of five-membered macrocyclics, macrobicyclics, and macropolycyclics (including catapinands, cryptands, cyclidenes, and sepulchrates) wherein all five binding sites are composed of nitrogen and are contained in a combination of 5-membered heterocyclic rings and amine or imine groups (N-N Tridentates or N-N Tetradentates) that meet the requirements for use as "narrow band" valence stabilizers for $Co^{+3}$ include, but are not limited to: superphthalocyanine; supernaphthalocyanine; diazapentaphyrins; tetraazapentaphyrins; pentaazapentaphyrins; diazapentapyrazoles; tetraazapentapyrazoles; pentaazapentapyrazoles; diazapentaimidazoles; tetraazapentaimidazoles; and pentaazapentaimidazoles.

N Valence Stabilizer #3b: Examples of seven-membered macrocyclics, macrobicyclics, and macropolycyclics (including catapinands, cryptands, cyclidenes, and sepulchrates) wherein all seven binding sites are composed of nitrogen and are contained in a combination of 5-membered heterocyclic rings and amine or imine groups (N-N Tridentates, N-N Tetradentates, or N-N Hexadentates) that meet the requirements for use as "narrow band" valence stabilizers for $Co^{+3}$ include, but are not limited to: diazaheptaphyrins; tetraazaheptaphyrins; hexaazaheptaphyrins; diazaheptapyrazoles; tetraazaheptapyrazoles; hexaazaheptapyrazoles; diazaheptaimidazoles; tetraazaheptaimidazoles; and hexaazaheptaimidazoles.

N Valence Stabilizer #3c: Examples of nine-membered macrocyclics, macrobicyclics, and macropolycyclics (including catapinands, cryptands, cyclidenes, and sepulchrates) wherein all nine binding sites are composed of nitrogen and are contained in a combination of 5-membered heterocyclic rings and amine or imine groups (N-N Tridentates, N-N Tetradentates, or N-N Hexadentates) that meet the requirements for use as "narrow band" valence stabilizers for $Co^{+3}$ include, but are not limited to: diazanonaphyrins; tetraazanonaphyrins; hexaazanonaphyrins; diazanonapyrazoles; tetraazanonapyrazoles; hexaazanonapyrazoles; diazanonaimidazoles; tetraazanonaimidazoles; and hexaazanonaimidazoles.

N Valence Stabilizer #4a: Examples of five-membered macrocyclics, macrobicyclics, and macropolycyclics (including catapinands, cryptands, cyclidenes, and sepulchrates) wherein all five binding sites are composed of nitrogen and are contained in component 6-membered heterocyclic rings (N-N Tetradentates) that meet the requirements for use as "narrow band" valence stabilizers for $Co^{+3}$ include, but are not limited to: cyclopentapyridines; cyclopentaoxazines; cyclopentathiazines; cyclopentaphosphorins; cyclopentaquinolines; cyclopentapyrazines; cyclopentapyridazines; cyclopentapyrimidines; cyclopentaoxadiazines; cyclopentathiadiazines; cyclopentacliazaphosphorins cyclopentaquinoxalines; cyclopentatriazines; cyclopentathiatriazines; and cyclopentaoxatriazines.

N Valence Stabilizer #4b: Examples of seven-membered macrocyclics, macrobicyclics, and macropolycyclics (including catapinands, cryptands, cyclidenes, and sepulchrates) wherein all seven binding sites are composed of nitrogen and are contained in component 6-membered heterocyclic rings (N-N Tetradentates) that meet the requirements for use as "narrow band" valence stabilizers for $Co^{+3}$ include, but are not limited to: cycloheptapyridines; cycloheptaoxazines; cycloheptathiazines; cycloheptaphosphorins; cycloheptaquinolines; cycloheptapyrazines; cycloheptapyridazines; cycloheptapyrimidines; cycloheptaoxadiazines; cycloheptathiadiazines; cycloheptadiazaphosphorins cycloheptaquinoxalines; cycloheptatriazines; cycloheptathiatriazines; and cycloheptaoxatriazines.

N Valence Stabilizer #5a: Examples of five-membered macrocyclics, macrobicyclics, and macropolycyclics (including catapinands, cryptands, cyclidenes, and sepulchrates) wherein all five binding sites are composed of nitrogen and are contained in a combination of 6-membered heterocyclic rings and amine or imine groups (N-N Tridentates or N-N Tetradentates) that meet the requirements for use as "narrow band" valence stabilizers for $Co^{+3}$ include, but are not limited to: diazacyclopentapyridines; tetraazacyclopentapyridines; diazacyclopentaquinolines; tetraazacyclopentaquinolines; diazacyclopentapyrazines; tetraazacyclopentapyrazines; diazacyclopentapyridazines; tetraazacyclopentapyridazines; diazacyclopentapyrimidines; tetraazacyclopentapyrimidines; diazacyclopentatriazines; and tetraazacyclopentatriazines.

N Valence Stabilizer #5b: Examples of seven-membered macrocyclics, macrobicyclics, and macropolycyclics (including catapinands, cryptands, cyclidenes, and sepulchrates) wherein all seven binding sites are composed of nitrogen and are contained in a combination of 6-membered heterocyclic rings and amine or imine groups (N-N Tridentates, N-N Tetradentates, or N-N Hexadentates) that meet the requirements for use as "narrow band" valence stabilizers for $Co^{+3}$ include, but are not limited to: diazacycloheptapyridines; tetraazacycloheptapyridines; diazacycloheptaquinolines; tetraazacycloheptaquinolines; diazacycloheptapyrazines; tetraazacycloheptapyrazines; diazacycloheptapyridazines; tetraazacycloheptapyridazines; diazacycloheptapyrimidines; tetraazacycloheptapyrimidines; diazacycloheptatriazines; and tetraazacycloheptatriazines.

N Valence Stabilizer #5c: Examples of nine-membered macrocyclics, macrobicyclics, and macropolycyclics (including catapinands, cryptands, cyclidenes, and sepulchrates) wherein all nine binding sites are composed of nitrogen and are contained in a combination of 6-membered heterocyclic rings and amine or imine groups (N-N Tridentates, N-N Tetradentates, or N-N Hexadentates) that meet the requirements for use as "narrow band" valence stabilizers for $Co^{+3}$ include, but are not limited to: diazacyclononapyridines; tetraazacyclononapyridines; diazacyclononaquinolines; tetraazacyclononaquinolines; diazacyclononapyrazines; tetraazacyclononapyrazines; diazacyclononapyridazines; tetraazacyclononapyridazines; diazacyclononapyrimidines; tetraazacyclononapyrimidines; diazacyclononatriazines; and tetraazacyclononatriazines.

N Valence Stabilizer #6: Examples of silylamines and silazanes (N Monodentates, N-N Bidentates, N-N Tridentates, N-N Tetradentates, and N-N Hexadentates) that meet the requirements for use as "narrow band" valence stabilizers for $Co^{+3}$ include, but are not limited to: trisilylamine; N-methyldisilazane (disilylmethylamine); N,N-dimethylsilylamine; (silyldimethylamine); tris(trimethylsilyl)amine; triethylsilylamine (triethylaminosilane) (triethylsilazane); N-ethyltriethylsilylamine (triethyl-N-ethylaminosilane); di-tert-butylsilanediamine (di-tert-butyldiaminosilane); bis(methylamino)diethylsilane; tris(dimethylamino)ethylsilane; hexamethyldisilazane;

N-methylhexaphenyldisilazane; hexamethylcyclotrisilazane; and octaphenylcyclotetrasilazane. [Note: Silylamines and silazanes are notably weaker ligands than their carbonaceous derivatives, although replacement of one or two $SiR_3$ groups with $CR_3$ will enhance the donor power of the ligand. Thus, $N(CR_3)_2(SiR_3)$ is a better ligand than $N(CR_3)(SiR_3)_2$, etc.]

N Valence Stabilizer #7: Examples of guanidines, diguanidines, and polyguanidines (N-N bidentates, N-N tridentates, N-N tetradentates, and N-N hexadentates) that meet the requirements for use as "narrow band" valence stabilizers for $Co^{+3}$ include, but are not limited to: guanidine; methylguanidine; ethylguanidine; isopropylguanidine; butylguanidine; benzylguanidine; phenylguanidine; tolylguanidine; naphthylguanidine; cyclohexylguanidine; norbornylguanidine; adamantylguanidine; dimethylguanidine; diethylguanidine; diisopropylguanidine; dibutylguanidine; dibenzylguanidine; diphenylguanidine; ditolylguanidine; dinaphthylguanidine; dicyclohexylguanidine; dinorbornylguanidine; diadamantylguanidine; ethylenediguanidine; propylenediguanidine; tetramethylenediguanidine; pentamethylenediguanidine; hexamethylenediguanidine; heptamethylenediguanidine; octamethylenediguanidine; phenylenediguanidine; piperazinediguanidine; oxalyldiguanidine; malonyldiguanidine; succinyldiguanidine; glutaryldiguanidine; adipyldiguanidine; pimelyldiguanidine; suberyldiguanidine; phthalyldiguanidine; benzimidazoleguanidine; aminoguanidine; nitroaminoguanidine; dicyandiamide (cyanoguanidine); dodecylguanidine; and nitrovin.

N Valence Stabilizer #8: Examples of phosphonitrile amides and bis(phosphonitrile amides)(N-N Bidentates and N-N Tetradentates) that meet the requirements for use as "narrow band" valence stabilizers for $Co^{+3}$ include, but are not limited to: phosphononitrile amide; N-phenylphosphonitrile amide; N-benzylphosphonitrile amide; N-cyclohexylphosphonitrile amide; N -norbornyiphosphonitrile amide; N,N'-diphenylphosphonitrile amide; N,N'-dibenzylphosphonitrile amide; N,N'-dicyclohexylphosphonitrile amide; and N,N'-dinorbomyiphosphonitrile amide. [Note: The phosphite ($P^{+3}$) valence of the phosphorus atom makes stabilizization of high valence metal ions much more difficult, though still possible.]

N Valence Stabilizer #9: Examples of phosphonimidic diamides, bis(phosphonimidic diamides), and poly(J)hosphonimidic diamides) (N-N bidentates and N-N tetradentates) that meet the requirements for use as "narrow band" valence stabilizers for $Co^{+3}$ include, but are not limited to: phosphonimidic diamide; N-benzylphosphonimidic diamide; N-phenylphosphonimidic diamide; N-cyclohexylphosphonimidic diamide; N-norbornylphosphonimidic diamide; N,N -dibenzylphosphonimidic diamide; N,N-diphenylphosphonimidic diamide; N,N -dicyclohexyiphosphonimidic diamide; and N,N-dinorbornylphosphonimidic diamide. [Note: The phosphite ($P^{+3}$) valence of the phosphorus atom makes stabilizization of high valence metal ions much more difficult, though still possible.]

N Valence Stabilizer #10: Examples of phosphonamidimidic acid, phosphonamidimidothioic acid, bis(phosphonamidimidic acid), bis(phosphonamidimidothioic acid), poly(phosphonamidimidic acid), poly(phosphonamidimidothioic acid), and derivatives thereof (N-N Bidentates, and N-N Tetradentates) that meet the requirements for use as "narrow band" valence stabilizers for $Co^{+3}$ include, but are not limited to: phosphonamidimidic acid, phosphonamidimidothioic acid; O -phenyiphosphonamidimidic acid; O-benzylphosphonamidimidic acid; O -cyclohexyiphosphonamidimidic acid; O-norbornyiphosphonamidimidic acid; S -phenylphosphonamidimidothioic acid; S-benzylphosphonamidimidothioic acid; S -cyclohexylphosphonamidimidothioic acid; and S-norbornylphosphonamidimidothioic acid. [Note: The phosphite ($P^{+3}$) valence of the phosphorus atom makes stabilizization of high valence metal ions much more difficult, though still possible.]

N Valence Stabilizer #11: Examples of pyridinaldimines, bis(pyridinaldimines), and poly(pyridinaldimines) (N-N Bidentates, N-N Tridentates, and N-N Tetradentates) that meet the requirements for use as "narrow band" valence stabilizers for $Co^{+3}$ include, but are not limited to: pyridylideneaniline [N-(pyridylmethylene)benzenamine]; and (2-pyridyl)benzylideneaniline.

N Valence Stabilizer #12: Examples of hydrazones, bis(hydrazones), and poly(hydrazones) (N Monodentates, N-N Bidentates, N-N Tridentates, and N-N Tetradentates) that meet the requirements for use as "narrow band" valence stabilizers for $Co^{+3}$ include, but are not limited to: acetaldehyde hydrazone; acetaldehyde phenylhydrazone; acetone hydrazone; acetone phenylhydrazone; pinacolone hydrazone; pinacolone phenylhydrazone; benzaldehyde hydrazone; benzaldehyde phenylhydrazone; naphthaldehyde hydrazone; naphthaldehyde phenylhydrazone; norbomanone hydrazone; norbornanone phenylhydrazone; camphor hydrazone; camphor phenylhydrazone; nopinone hydrazone; nopinone phenylhydrazine; 2-pyridinaldehyde hydrazone; 2-pyridinealdehyde phenyihydrazone; salicylaldehyde hydrazone; salicylaldehyde phenylhydrazone; quinolinaldehyde hydrazone; quinolinaldehyde phenyihydrazone; isatin dihydrazone; isatin di(phenylhydrazone); camphorquinone dihydrazone; camphorquinone di(phenylhydrazone); and 2-hydrazinobenzimidazole hydrazone.

N Valence Stabilizer #13: Examples of azo compounds without chelate substitution at the ortho - (for aryl) or alpha- or beta- (for alkyl) positions, bis(azo compounds), or poly (azo compounds) (N Monodentates, N-N Bidentates, or N-N Tridentates) that meet the requirements for use as "narrow band" valence stabilizers for $Co^{+3}$ include, but are not limited to: azobenzene (diphenyldiazene); p-diaminoazobenzene; p-dimethylaminoazobenzene (butter yellow); methyl orange; Fast Garnet GBC (4'-axnino-2,3'-dimethylazobenzene) [Note: non-bonding methyl group in the O-position.]; and Alizarin Yellow R. [Note: Azo compounds without chelate substitution at the ortho- (for aryl) or beta- (for alkyl) positions tend to stabilize lower oxidation states in metal ions.]

N Valence Stabilizer #14: Examples of formazans, bis(formazans), and poly(formazans) without ortho- hydroxy, carboxy, thiol, mercapto, amino, or hydrazido substitution (N-N Bidentates, N-N Tetradentates, and N-N Hexadentates) that meet the requirements for use as "narrow band" valence stabilizers for $Co^{+3}$ include, but are not limited to: 1,3,5-triphenylformazan; and 1,3,5-naphthylformazan.

N Valence Stabilizer #15: Examples of hydramides (N-N Bidentates) that meet the requirements for use as "narrow band" valence stabilizers for $Co^{+3}$ include, but are not limited to: hydrobenzamide; hydronaphthamide; and hydrosalicylamide.

N Valence Stabilizer #16: Examples of azines (including ketazines), bis(azines), and poly(azines) without ortho- hydroxy, carboxy, thiol, mercapto, amino, or hydrazido substitution (N-N Bidentates, N-N Tetradentates, and N-N Hexadentates) that meet the requirements for use as "narrow band" valence stabilizers for $Co^{+3}$ include, but are not limited to: benzalazine; naphthalazine; cyclohexanonazine; and norbornonazine.

N Valence Stabilizer #17: Examples of Schiff Bases with one Imine (C=N) Group and without ortho- (for aryl constituents) or alpha- or beta- (for alkyl constituents) hydroxy, carboxy, carbonyl, thiol, mercapto, thiocarbonyl, amino, imino, oximo, diazeno, or hydrazido substitution (N Monodentates) that meet the requirements for use as "narrow band" valence stabilizers for $Co^{+3}$ include, but are not limited to: N-(Benzaldehydo)isopropylamine; N-(Naphthaldehydo)isopropylamine; N-(Acetophenono)isopropylamine; N-(Propiophenono)isopropylamine; N-(Benzaldehydo)cyclohexylamine; N-(Naphthaldehydo)cyclohexylamine; N-(Acetophenono)cyclohexylamine; N-(Propiophenono)cyclohexylamine; N-(Benzaldehydo)arnline (BAAN); N-(Naphthaldehydo)aniline; N-(Acetophenono)aniline; N-(Propiophenono)aniline; N-(Benzaldehydo)aminonorbornane; N-(Naphthaldehydo)aminonorbornane; N-(Acetophenono)aminonorbornane; N-(Propiophenono)aminonorbornane; (Vanillino)anisidine; (Cinnamaldehydo)anisidine; N-(o-carboxycinnamaldehydo)aniline; N-(cinnamaldehydo)arnline; N-(cinnamaldehydo)m- or p-anisidine; and N-(o-carboxycinnamaldehydo)m- or p-anisidine.

N Valence Stabilizer #18: Examples of isocyanide and cyanamide and related ligands (N Monodentates) that meet the requirements for use as "narrow band" valence stabilizers for $Co^{+3}$ include, but are not limited to: isocyanate (—NCO); isothiocyanate (—NCS); isoselenocyanate (—NCSe); and cyanamide (—NCN). [Note: the nitrogen atom is directly complexed to the high valence metal ion.]

N Valence Stabilizer #19: Examples of nitrosyls and nitrites and related ligands (N Monodentates) that meet the requirements for use as "narrow band" valence stabilizers for $Co^+3$ include, but are not limited to: nitrosyl (—NO); thionitrosyl (—NS); nitrite (—NO$_2$); thionitrite (sulfinylamide)(thiazate)(—NSO); nitrosamine (=NN=O); thionitrosamine (=NN=S); nitramine (=NNO$_2$); and thionitramine (=NNS$_2$) ligands.

N Valence Stabilizer #20: Examples of nitriles, dinitriles, and polynitriles (N Monodentates, N-N Bidentates, N-N Tridentates) that meet the requirements for use as "narrow band" valence stabilizers for $Co^{+3}$ include, but are not limited to: benzonitrile; naphthonitrile; cyanonaphthalene; cyclohexylnitrile; cyanopyridine; cyanopurine; cyanophenol; cyanothiophenol; adamantane nitrile; norbornyl nitrile; cinnamonitrile; dicyanobenzene; dicyanobutene; dicyanoimidazole; dicyanopyridine; cyanotolunitrile; tetracyanoethylene (TCNE); tetracyanoquinodimethane (TCNQ); diethylaminopropionitrile (deapn), and polyacrylonitriles.

N Valence Stabilizer #21: Examples of azide ligands (N monodentates) that meet the requirements for use as "narrow band" valence stabilizers for $Co^{+3}$ include, but are not limited to: azide (—N$_3$) ions; methyl azide; ethyl azide; phenyl azide; diphenyltriazene; and phenyl sulfonyl azide.

S Valence Stabilizer #1: Examples of monothioethers (S monodentates) that meet the requirements for use as "narrow band" valence stabilizers for $Co^{+3}$ include, but are not limited to: hydrogen sulfide, dimethyl sulfide, diethyl sulfide, dioctyl sulfide, diphenyl sulfide, dicyclohexyl sulfide, tetramethylene sulfide (tetrahydrothiophene, tht), trimethylene sulfide, dimethylene sulfide (ethylene sulfide), pentamethylene sulfide, 1,4-thioxane, oxathiolane, cyclohexene sulfide, cyclooctene sulfide, benzotetrahydrothiophene, dibenzothiophene, naphthotetrahydrothiophene, and thiabicycloheptane.

S Valence Stabilizer #2: Examples of disulfides (S monodentates) that meet the requirements for use as "narrow band" valence stabilizers for $Co^{+3}$ include, but are not limited to: methyl disulfide, ethyl disulfide, phenyl disulfide, nitrophenide, and 1,2-dithiacyclohexane.

S Valence Stabilizer #3: Examples of dithioethers (S monodentates or S-S bidentates) that meet the requirements for use as "narrow band" valence stabilizers for $Co^{+3}$ include, but are not limited to: 1,3-dithiane, 1,4-dithiane, benzodithiane, dibenzodithiane, naphthodithiane, 2,5-dithiahexane (dth); 3,6-dithiaoctane (dto); 2,5-dimethyl-3,6-dithiaoctane; 3,7-dithianonane; 2,6-dithiaheptane; 1,6-diphenyl-2,5-dithiahexane; 1,4-diphenyl- 1,4-dithiabutane; 1,3-dithiolane; 1,4-dithiane (1,4-dithiacyclohexane); 1,4-dithiacycloheptane (dtch); 1,5-dithiacyclooctane (dtco); o-phenylenebis(2-thiapropane); o-phenylenebis(2-thiabutane); 2,2'-(thiamethyl)biphenyl, and 2,2'-(thiaethyl)biphenyl.

S Valence Stabilizer #4: Examples of trithioethers (S monodentates, S-S bidentates, or S-S tridentates) that meet the requirements for use as "narrow band" valence stabilizers for $Co^{+3}$ include, but are not limited to: 1,3,5-trithiane; 1,3,5-tris(methylthia)cyclohexane; 1,3,5-tris(ethylthia)cyclohexane; 1,3,5-tris(phenylthia)cyclohexane; 2,5,8-trithianonane; 3,6,9-trithiaundecane; and 2,6,10-trithiaundecane.

S Valence Stabilizer #5: Examples of tetrathioethers (S monodentates, S-S bidentates, S-S tridentates, or S-S tetradentates) that meet the requirements for use as "narrow band" valence stabilizers for $Co^{+3}$ include, but are not limited to: 1,4,10,13-tetrathiatridecane; 2,6,10,14-tetrathiapentadecane; 2,5,8,11-tetrathiadodecane; 2,5,9,12-tetrathiatridecane; 2,6,9,13-tetrathiatetradecane; 1,4-(o-thiomethyl)phenyl- 1,4-dithiabutane; 1,5-(o-thiomethyl)phenyl- 1,5-dithiapentane; 1,6-(o-thiomethyl)phenyl- 1,6-dithiahexane; 1,4-(o-thiomethyl)phenyl- 1,4-dithiabut-2-ene; and polythioethers.

S Valence Stabilizer #6: Examples of hexathioethers (S monodentates, S-S bidentates, S-S tridentates, S-S tetradentates, or S-S hexadentates) that meet the requirements for use as "narrow band" valence stabilizers for $Co^{+3}$ include, but are not limited to: tri(2-((o-thiomethyl)phenyl)ethyl)amine; and tri((o-thiomethyl)phenyl)methylamine.

S Valence Stabilizer #7a: Examples of 5-membered heterocyclic rings containing one sulfur atom (S monodentates) that meet the requirements for use as "narrow band" valence stabilizers for $Co^{+3}$ include, but are not limited to: dihydrothiophene, thiophene, thiazole, thiapyrroline, thiaphospholene, thiaphosphole, oxathiole, thiadiazole, thiatriazole, benzodihydrothiophene, benzothiophene, benzothiazole, benzothiaphosphole, dibenzothiophene, and naphthothiophene.

S Valence Stabilizer #7b: Examples of 5-membered heterocyclic rings containing two sulfur atoms (S monodentates or S-S bidentates) that meet the requirements for use as "narrow band" valence stabilizers for $Co^{+3}$ include, but are not limited to: dithiole, benzodithiole, and naphthodithiole.

S Valence Stabilizer #8a: Examples of 6-membered heterocyclic rings containing one sulfur atom (S monodentates) that meet the requirements for use as "narrow band" valence stabilizers for $Co^{+3}$ include, but are not limited to: dihydrothiopyran, thiopyran, thiazine, thiadiazine, thiaphosphorin, thiadiphosphorin, oxathiin, benzothiopyran, dibenzothiopyran, and naphthothiopyran.

S Valence Stabilizer #8b: Examples of 6-membered heterocyclic rings containing two sulfur atoms (S monodentates or S-S bidentates) that meet the requirements for use as "narrow band" valence stabilizers for $Co^{+3}$ include, but are not limited to: dihydrodithiin, dithiin, benzodithiin, dibenzodithiin (thianthrene), and naphthodithiin.

S Valence Stabilizer #9a: Examples of 5-membered heterocyclic rings containing one sulfur atom and having at least one additional sulfur atom binding site not contained in a ring (S Monodentates, S-S Bidentates, S-S Tridentates, S-S Tetradentates, or S-S Hexadentates) that meet the requirements for use as "narrow band" valence stabilizers for $Co^{+3}$ include, but are not limited to: 2,5-dimercapto-2,5-dihydrothiophene; 2,5-bis(thiomethyl)-2,5-dihydrobiophene; 2,5-bis(2-thiophenyl)-2,5-dihydrothiophene; 2,5-dimercaptothiophene; 2,5-bis(thiomethyl)thiophene; 2,5-bis(2-thiophenyl)thiophene; 2,5-dimercatothiazole; 2,5-bis(thiomethyl)thiazole; 2,5-bis(2-thiophenyl)thiazole; 2,5-dimercapto-1,3,4-thiadiazole [bismuththiol]; 2-mercaptothianaphthene; 7-(thiomethyl)thianaphthene; 1,8-dimercaptodibenzothiophene; 2-mercaptobenzothiazole; 2-mercapro-1,3,4-thiadiazole; 2-amino-5-mercapto-1,3,4-thiadiazole; 2,5-bis(alkylthio)-1,3,4-thiadiazole; and 7-(thiomethyl)benzothiazole.

S Valence Stabilizer #9b: Examples of 5-membered heterocyclic rings containing two sulfur atoms and having at least one additional sulfur atom binding site not contained in a ring (S Monodentates, S-S Bidentates, S-S Tridentates, S-S Tetradentates, or S-S Hexadentates) that meet the requirements for use as "narrow band" valence stabilizers for $Co^{+3}$ include, but are not limited to: 2-mercapto-1,3-dithiole; 2-(dimercaptomethyl)-1,3-dithiole; 4,5-dimercapto-1,3-dithiole; 4,5-bis(2-thiophenyl)-1,3-dithiole; 2-mercaptobenzodithiole; and 7-mercaptobenzodithiole.

S Valence Stabilizer #10a: Examples of 6-membered heterocyclic rings containing one sulfur atom and having at least one additional sulfur atom binding site not contained in a ring (S Monodentates, S-S Bidentates, S-S Tridentates, S-S Tetradentates, or S-S Hexadentates) that meet the requirements for use as "narrow band" valence stabilizers for $Co^{+3}$ include, but are not limited to: 2,6-dimercapto-2,5-dihydrothiopyran; 2,6-bis(thiomethyl)-2,5-dihydrothiopyran; 2,6-bis(2-thiophenyl)-2,5-dihydrothiopyran; 2,6-dimercaptothiopyran; 2,6-bis(thiomethyl)thiopyran; 2,6-bis(2-thiophenyl)thiopyran; 2,6-dimercaptothiazine; 2,6-bis(thiomethyl)thiazine; 2,6-bis(2-thiophenyl)thiazine; 2,6-dimercapto-1,3,5-thiadiazine; 2-mercapto-1-benzothiopyran; 8-mercapto-1-benzothiopyran; and 1,9-dimercaptodibenzothiopyran.

S Valence Stabilizer #10b: Examples of 6-membered heterocyclic rings containing two sulfur atoms and having at least one additional sulfur atom binding site not contained in a ring (S Monodentates, S-S Bidentates, S-S Tridentates, S-S Tetradentates, or S-S Hexadentates) that meet the requirements for use as "narrow band" valence stabilizers for $Co^{+3}$ include, but are not limited to: 2-mercapto-1,4-dithiin; 2,6-dimercapto-1,4-dithiin; 2,6-bis(2-thiophenyl)-1,4-dithiin; 2,3-dimercapto-1,4-benzodithiin; 5,8-dimercapto-1,4-benzodithiin; 1,8-dimercaptothianthrene; and 1,4,5,8-tetramercaptothianthrene.

S Valence Stabilizer #11a: Examples of 5-membered heterocyclic rings containing one sulfur atom and having at least one additional sulfur atom binding site contained in a ring (S Monodentates, S-S Bidentates, S-S Tridentates, S-S Tetradentates) that meet the requirements for use as "narrow band" valence stabilizers for $Co^{+3}$ include, but are not limited to: 2,2'-bi-2,5-dihydrothiophene; 2,2',2"-tri-2,5-dihydrothiophene; 2,2'-bithiophene; 2,2',2"-trithiophene; 2,2'-bithiazole; 5,5'-bithiazole; 2,2'-bioxathiole; 2,2'-bi-1,3,4-thiadiazole; 2,2'-bithianaphthene; 2,2'-bibenzothiazole; 1,1'-bis(dibenzothiophene); and polythiophenes.

S Valence Stabilizer #11b: Examples of 5-membered heterocyclic rings containing two sulfur atoms and having at least one additional sulfur atom binding site contained in a ring (S Monodentates, S-S Bidentates, S-S Tridentates, S-S Tetradentates) that meet the requirements for use as "narrow band" valence stabilizers for $Co^{+3}$ include, but are not limited to: 2,2'-bi-1,3-dithiole; 4,4'-bi-1,3-dithiole; 7,7'-bi-1,2-benzodithiole; 3,3'-bi-1,2-benzodithiole; and tetrathiofulvalene.

S Valence Stabilizer #12a: Examples of 6-membered heterocyclic rings containing one sulfur atom and having at least one additional sulfur atom binding site contained in a ring (S Monodentates, S-S Bidentates, S-S Tridentates, S-S Tetradentates) that meet the requirements for use as "narrow band" valence stabilizers for $Co^{+3}$ include, but are not limited to: 2,2'-bi-2,5-dihydrothiopyran; 2,2',2"-tri-2,5-dihydrothiopyran; 2,2'-bithiopyran; 2,2',2"-trithiopyran; 2,2'-bi-1,4-thiazine; 2,2'-bi-1,3,5-thiadiazine; 2,2'-bi-1-benzothiopyran; and 1,1'-bis(dibenzothiopyran)

S Valence Stabilizer #12b: Examples of 6-membered heterocyclic rings containing two sulfur atoms and having at least one additional sulfur atom binding site contained in a ring (S Monodentates, S-S Bidentates, S-S Tridentates, S-S Tetradentates) that meet the requirements for use as "narrow band" valence stabilizers for $Co^{+3}$ include, but are not limited to: 2,2'-bi-1,4-dithiin; 2,2'-bi-1,3-dithiin; 5,5'-bi-1,4-benzodithiin; 2,2'-bi-1,3-benzodithiin; and 1,1'-bithianthrene.

S Valence Stabilizer #13a: Examples of two-membered macrocyclics, macrobicyclics, and macropolycyclics (including catapinands, cryptands, cyclidenes, and sepulchrates) wherein both binding sites are composed of sulfur (usually thiol or thioether groups) and are not contained in component heterocyclic rings (S-S Bidentates) that meet the requirements for use as "narrow band" valence stabilizers for $Co^{+3}$ include, but are not limited to: dithiacyclobutane ([4]$aneS_2$); dithiacyclopentane ([5]$aneS_2$); dithiacyclohexane ([6]$aneS_2$); dithiacycloheptane ([7]$aneS_2$); dithiacyclooctane ([8]$aneS_2$); dithiacyclobutene ([4]$eneS_2$); dithiacyclopentene ([5]$eneS_2$); dithiacyclohexene ([6]$eneS_2$); dithiacycloheptene ([7]$eneS_2$); dithiacyclooctene ([8]$eneS_2$); dithiacyclobutadiene ([4]$dieneS_2$); dithiacyclopentadiene ([5]$dieneS_2$); dithiacyclohexadiene ([6]$dieneS_2$); dithiacycloheptadiene ([7]$dieneS_2$); and dithiacyclooctadiene ([8]$dieneS_2$).

S Valence Stabilizer #13b: Examples of three-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates) that meet the requirements for use as "narrow band" valence stabilizers for $Co^{+3}$ include, but are not limited to: trithiacyclohexane ([6]$aneS_3$); trithiacycloheptane ([7]$aneS_3$); trithiacyclooctane ([8]$aneS_3$); trithiacyclononane ([9]$aneS_3$); trithiacyclodecane ([10]$aneS_3$); trithiacycloundecane ([11]$aneS_3$); trithiacyclododecane ([12]$aneS_3$); trithiacyclohexene ([6]$eneS_3$); trithiacycloheptene ([7]$eneS_3$); trithiacyclooctene ([8]$eneS_3$); trithiacyclononene ([9]$eneS_3$); trithiacyclodecene ([10]$eneS_3$); tnthiacycloundecene ([11]$eneS_3$); trithiacyclodOdecene ([12]$eneS_3$); trithiacyclohexatriene ([6]$trieneS_3$); trithiacycloheptatriene ([7]$trieneS_3$); trithiacyclooctatriene ([8]$trieneS_3$); trithiacyclononatriene ([9]$trieneS_3$); trithiacyclodecatriene ([10]$trieneS_3$); trithiacycloundecatriene ([11]$trieneS_3$); and trithiacyclododecatriene ([12]$trieneS_3$).

S Valence Stabilizer #13c: Examples of four-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tetradentates) that meet the requirements for use as "narrow band" valence stabilizers for Co$^{+3}$ include, but are not limited to: tetrathiacyclooctane ([8]aneS$_4$); tetrathiacyclononane ([9]aneS$_4$); tetrathiacyclodecane ([10]aneS$_4$); tetrathiacycloundecane ([11]aneS$_4$); tetrathiacyclododecane ([12]aneS$_4$); tetrathiacyclotridecane ([13]aneS$_4$); tetrathiacyclotetradecane ([14]aneS$_4$); tetrathiacyclopentadecane ([15]aneS$_4$); tetrathiacyclohexadecane ([16]aneS$_4$); tetrathiacycloheptadecane ([17]aneS$_4$); tetrathiacyclooctadecane ([18]aneS$_4$); tetrathiacyclononadecane ([19]aneS$_4$); tetrathiacycloeicosane ([20]aneS$_4$); tetrathiacyclooctadiene ([8]dieneS$_4$); tetrathiacyclononadiene ([9]dieneS$_4$); tetrathiacyclodecadiene ([10]dieneS$_4$); tetrathiacycloundecadiene ([11]dieneS$_4$); tetrathiacyclododecadiene ([12]dieneS$_4$); tetrathiacyclotri decadiene ([13]dieneS$_4$); tetrathiacyclotetradecadiene ([14]dieneS$_4$); tetrathiacyclopentadecadiene ([15]dieneS$_4$); tetrathiacyclohexadecadiene ([16]dieneS$_4$); tetrathiacycloheptadecadiene ([17]dieneS$_4$); tetrathiacyclooctadecadiene ([18]dieneS$_4$); tetrathiacyclononadecadi ene ([19]dieneS$_4$); tetrathiacycloeicosadi ene ([20]dieneS$_4$); tetrathi acyclooctatetradiene ([8] tetradieneS$_4$); tetrathiacyclononatetradiene ([9]tetradieneS$_4$); tetrathiacyclodecatetradiene ([10]tetradieneS$_4$); tetrathiacycloundecatetradiene ([11]tetradieneS$_4$); tetrathiacyclododecatetradiene ([12]tetradieneS$_4$); tetrathiacyclotridecatetradiene ([13]tetradieneS$_4$); tetrathiacyclotetradecatetradiene ([14]tetradieneS$_4$); tetrathiacyclopentadecatetradiene ([15]tetradieneS$_4$); tetrathiacyclohexadecatetradiene ([16]tetradieneS$_4$); tetrathiacycloheptadecatetradiene ([17]tetradieneS$_4$); tetrathiacyclooctadecatetradiene ([18]tetradieneS$_4$); tetrathiacyclononadecatetradiene ([19]tetradieneS$_4$); and tetrathiacycloeicosatetradiene ([20]tetradieneS$_4$).

S Valence Stabilizer #13d: Examples of five-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates or S-S Tetradentates) that meet the requirements for use as "narrow band" valence stabilizers for Co$^{+3}$ include, but are not limited to: pentathiacyclodecane ([10]aneS$_5$); pentathiacycloundecane ([11]aneS$_5$); pentathiacyclododecane ([12]aneS$_5$); pentathiacyclotridecane ([13]aneS$_5$); pentathiacyclotetradecane ([14]aneS$_5$); pentathiacyclopentadecane ([15]aneS$_5$); pentathiacyclodecatriene ([10]trieneS$_5$); pentathiacycloundecatriene ([11]trieneS$_5$); pentathiacyclododecatriene ([12] trieneS$_5$); pentathiacyclotridecatriene ([13]trieneS$_5$); pentathiacyclotetradecatriene ([14]trieneS$_5$); and pentathiacyclopentadecatriene ([15]trieneS$_5$).

S Valence Stabilizer #13e: Examples of six-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates, S-S Tetradentates, or S-S Hexadentates) that meet the requirements for use as "narrow band" valence stabilizers for Co$^{+3}$ include, but are not limited to: hexathiacyclododecane ([12]aneS$_6$); hexathiacyclotridecane ([13]aneS$_6$); hexathiacyclotetradecane ([14]aneS$_6$); hexathiacyclopentadecane ([15]aneS$_6$); hexathiacyclohexadecane ([16]aneS$_6$); hexathiacycloheptadecane ([17]aneS$_6$); hexathiacyclooctadecane ([18]aneS$_6$); hexathiacyclononadecane ([19]aneS$_6$); hexathiacycloeicosane ([20]aneS$_6$); hexathiacycloheneicosane ([21]aneS$_6$); hexathiacyclodocosane ([22]aneS$_6$); hexathiacyclotricosane ([23]aneS$_6$); hexathiacyclotetracosane ([24]aneS$_6$); hexathiacyclododecatriene ([12]trieneS$_6$); hexathiacyclotridecatriene ([13]trieneS$_6$); hexathiacyclotetradecatriene ([14]trieneS$_6$); hexathiacyclopentadecatriene ([15]trieneS$_6$); hexathiacyclohexadecatriene ([16]trieneS$_6$); hexathiacycloheptadecatriene ([17]trieneS$_6$); hexathiacyclooctadecatriene ([18]trieneS$_6$); hexathiacyclononadecatriene ([19]trieneS$_6$); hexathiacycloeicosatriene ([20]trieneS$_6$); hexathiacycloheneicosatriene ([21]trieneS$_6$); hexathiacyclodocosatriene ([22]trieneS $_6$); hexathiacyclotricosatriene ([23]trieneS$_6$); and hexathiacyclotetracosatriene ([24]trieneS$_6$).

S Valence Stabilizer #13f: Examples of seven-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates, S-S Tetradentates, or S-S Hexadentates) that meet the requirements for use as "narrow band" valence stabilizers for Co$^{+3}$ include, but are not limited to: heptathiacyclotetradecane ([14]aneS$_7$); heptathiacyclopentadecane ([15]aneS$_7$); heptathiacyclohexadecane ([16]aneS$_7$); heptathiacycloheptadecane ([17]aneS$_7$); heptathiacyclooctadecane ([18]aneS$_7$); heptathiacyclononadecane ([19]aneS$_7$); heptathiacycloeicosane ([20]aneS$_7$); heptathiacycloheneicosane ([21]aneS$_7$); heptathiacyclotetradecatriene ([14]trieneS$_7$); heptathiacyclopentadecatriene ([15]trieneS$_7$); heptathiacyclohexadecatriene ([16]trieneS$_7$); heptathiacycloheptadecatriene ([17]trieneS$_7$); heptathiacyclooctadecatriene ([18]trieneS$_7$); heptathiacyclononadecatriene ([19]trieneS$_7$); heptathiacycloeicosatriene ([20]trieneS$_7$); and heptathiacycloheneicosatriene ([21]trieneS$_7$).

S Valence Stabilizer #13g: Examples of eight-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates, S-S Tetradentates, or S-S Hexadentates) that meet the requirements for use as "narrow band" valence stabilizers for Co$^{+3}$ include, but are not limited to: octathiacyclohexadecane ([16]aneS$_8$); octathiacycloheptadecane ([17]aneS$_8$); octathiacyclooctadecane ([18]aneS$_8$); octathiacyclononadecane ([19]aneS$_8$); octathiacycloeicosane ([20]aneS$_8$); octathiacycloheneicosane ([21]aneS$_8$); octathiacyclodocosane ([22]aneS$_8$); octathiacyclotricosane ([23]aneS$_8$); octathiacyclotetracosane ([24]aneS$_8$); octathiacyclohexadecatetradiene ([16]tetradieneS$_8$); octathiacycloheptadecatetradiene ([17]tetradieneS$_8$); octathiacyclooctadecatetradiene ([18]tetradieneS$_8$); octathiacyclononadecatetradiene ([19]tetradieneS$_8$); octathiacycloeicosatetradiene ([20]tetradieneS$_8$); octathiacycloheneicosatetradiene ([21]tetradieneS$_8$); octathiacyclodocosatetradiene ([22]tetradieneS$_8$); octathiacyclotricosatetradiene ([23]tetradieneS$_8$); and octathiacyclotetracosatetradiene ([24]tetradieneS$_8$).

S Valence Stabilizer #13h: Examples of nine-membered macrocyclics, macrobicyclics, and macropolycyclics (including catapinands, cryptands, cyclidenes, and sepulebrates) wherein all binding sites are composed of sulfur (usually thiol or thioether groups) and are not contained in component heterocyclic rings (S-S Tridentates, S-S Tetradentates, or S-S Hexadentates) that meet the requirements for use as "narrow band" valence stabilizers for Co$^{+3}$ include, but are not limited to: nonathiacyclooctadecane ([18]aneS$_9$); nonathiacyclononadecane ([19]aneS$_9$); nonathiacycloeicosane ([20]aneS$_9$); nonathiacycloheneicosane ([21]aneS$_9$); nonathiacyclodocosane ([22]aneS$_9$); nonathiacyclotricosane ([23]aneS$_9$); nonathiacyclotetracosane ([24]aneS$_9$); nonathiacyclopentacosane ([25]aneS$_9$); nonathiacyclohexacosane ([26]aneS$_9$); nonathiacycloheptacosane ([27]aneS$_9$);

nonathiacyclooctadecatetradiene ([18]tetradieneS$_9$); nonathiacyclononadecatetradiene ([19]tetradieneS$_9$); nonathiacycloeicosatetradiene ([20]tetradieneS$_9$); nonathiacycloheneicosatetradiene ([21]tetradieneS$_9$); nonathiacyclodocosatetradiene ([22]tetradieneS$_9$); nonathiacyclotricosatetradiene ([23]tetradieneS$_9$) nonathiacyclotetracosatetradiene ([24]tetradieneS$_9$); nonathiacyclopentacosatetradiene ([25]tetradieneS$_9$); nonathiacyclohexacosatetradiene ([26]tetradieneS$_9$); and nonathiacycloheptacosatetradiene ([27]tetradieneS$_9$).

S Valence Stabilizer #13i: Examples of ten-membered macrocyclics, macrobicyclics, and macropolycyclics (including catapinands, cryptands, cyclidenes, and sepulchrates) wherein all binding sites are composed of sulfur (usually thiol or thioether groups) and are not contained in component heterocyclic rings (S-S Tridentates, S-S Tetradentates, or S-S Hexadentates) that meet the requirements for use as "narrow band" valence stabilizers for Co$^{+3}$ include, but are not limited to: decathiacycloeicosane ([20]aneS$_{10}$); decathiacycloheneicosane ([21]aneS$_{10}$); decathiacyclodocosane ([22]aneS$_{10}$); decathiacyclotricosane([23]aneS$_{10}$); decathiacyclotetracosane ([24]aneS$_{10}$); decathiacyclopentacosane ([25]aneS$_{10}$); decathiacyclohexacosane ([26]aneS$_{10}$); decathiacycloheptacosane ([27]aneS$_{10}$); decathiacyclooctacosane ([28]aneS$_{10}$); decathiacyclononacosane ([29]aneS$_{10}$); decathiacyclotriacontane ([30]aneS$_{10}$); decathiacycloeicosapentadiene ([20]pentadieneS$_{10}$); decathiacycloheneicosapentadiene ([21]pentadieneS$_{10}$); decathiacyclodocosapentadiene ([22]pentadieneS$_{10}$); decathiacyclotricosapentadiene ([23]pentadieneS$_{10}$); decathiacyclotetracosapentadiene ([24]pentadieneS$_{10}$); decathiacyclopentacosapentadiene ([25]pentadieneS$_{10}$); decathiacyclohexacosapentadiene ([26]pentadieneS$_{10}$); decathiacycloheptacosapentadiene ([27]pentadieneS$_{10}$); decathiacyclooctacosapentadiene ([28]pentadieneS$_{10}$); decathiacyclononacosapentadiene ([29]pentadieneS$_{10}$); and decathiacyclotriacontapentadiene ([30]pentadieneS$_{10}$).

S Valence Stabilizer #14a: Examples of four-membered macrocyclics, macrobicyclics, and macropolycyclics (including catapinands, cryptands, cyclidenes, and sepulchrates) wherein all four binding sites are composed of sulfur and are contained in component 5-membered heterocyclic rings (S-S Tetradentates) that meet the requirements for use as "narrow band" valence stabilizers for Co$^{+3}$ include, but are not limited to: tetrathiophenes; tetrathiazoles; tetrathiaphospholes; tetraoxathioles; tetrathiadiazoles; tetrathiatriazoles; and tetradithioles.

S Valence Stabilizer #14b: Examples of five-membered macrocyclics, macrobicyclics, and macropolycyclics (including catapinands, cryptands, cyclidenes, and sepulchrates) wherein all five 35 binding sites are composed of sulfur and are contained in component 5-membered heterocyclic rings (S-S Tridentates or S-S Tetradentates) that meet the requirements for use as "narrow band" valence stabilizers for Co$^{+3}$ include, but are not limited to: pentathiophenes; pentathiazoles; pentathiaphospholes; pentaoxathioles; pentathiadiazoles; pentathiatriazoles; and pentadithioles.

S Valence Stabilizer #14c: Examples of six-membered macrocyclics, macrobicyclics, and macropolycyclics (including catapinands, cryptands, cyclidenes, and sepulchrates) wherein all six binding sites are composed of sulfur and are contained in component 5-membered heterocyclic rings (S-S Tridentates, S-S Tetradentates, or S-S Hexadentates) that meet the requirements for use as "narrow band" valence stabilizers for Co$^{+3}$ include, but are not limited to: hexathiophenes; hexathiazoles; hexathiaphospholes; hexaoxathioles; hexathiadiazoles; hexathiatriazoles; and hexadithioles.

S Valence Stabilizer #14d: Examples of seven-membered macrocyclics, macrobicyclics, and macropolycyclics (including catapinands, cryptands, cyclidenes, and sepulchrates) wherein all seven binding sites are composed of sulfur and are contained in component 5-membered heterocyclic rings (S-S Tridentates, S-S Tetradentates, or S-S Hexadentates) that meet the requirements for use as "narrow band" valence stabilizers for Co$^{+3}$ include, but are not limited to: heptathiophenes; heptathiazoles; heptathiaphospholes; heptaoxathioles; heptathiadiazoles; heptathiatriazoles; and heptadithioles.

5 Valence Stabilizer #14e: Examples of eight-membered macrocyclics, macrobicyclics, and macropolycyclics (including catapinands, cryptands, cyclidenes, and sepulchrates) wherein all eight binding sites are composed of sulfur and are contained in component 5-membered heterocyclic rings (S-S Tridentates, S-S Tetradentates, or S-S Hexadentates) that meet the requirements for use as "narrow band" valence stabilizers for Co$^{+3}$ include, but are not limited to: octathiophenes; octathiazoles; octathiaphospholes; octaoxathioles; octathiadiazoles; octathiatriazoles; and octadithioles.

S Valence Stabilizer #14f: Examples of nine-membered macrocyclics, macrobicyclics, and macropolycyclics (including catapinands, cryptands, cyclidenes, and sepulchrates) wherein all nine binding sites are composed of sulfur and are contained in component 5-membered heterocyclic rings (S-S Tridentates, S-S Tetradentates, or S-S Hexadentates) that meet the requirements for use as "narrow band" valence stabilizers for Co$^{+3}$ include, but are not limited to: nonathiophenes; nonathiazoles; nonathiaphospholes; nonaoxathioles; nonathiadiazoles; nonathiatriazoles; and nonadithioles.

S Valence Stabilizer #14g: Examples of ten-membered macrocyclics, macrobicyclics, and macropolycyclics (including catapinands, cryptands, cyclidenes, and sepulchrates) wherein all ten binding sites are composed of sulfur and are contained in component 5-membered heterocyclic rings (S-S Tridentates, S-S Tetradentates, or S-S Hexadentates) that meet the requirements for use as "narrow band" valence stabilizers for Co$^{+3}$ include, but are not limited to: decathiophenes; decathiazoles; decathiaphospholes; decaoxathioles; decathiadiazoles; decathiatriazoles; and decadithioles.

S Valence Stabilizer #15a: Examples of four-membered macrocyclics, macrobicyclics, and macropolycyclics (including catapinands, cryptands, cyclidenes, and sepulchrates) wherein all four binding sites are composed of sulfur and are contained in a combination of 5-membered heterocyclic rings and thiol, thioether, or thioketo groups (S-S Tetradentates) that meet the requirements for use as "narrow band" valence stabilizers for Co$^{+3}$ include, but are not limited to: dithiatetrathiophenes; tetrathiatetrathiophenes; dithiatetradithioles; and tetrathiatetradithioles.

5 Valence Stabilizer #15b: Examples of five-membered macrocyclics, macrobicyclics, and macropolycyclics (including catapinands, cryptands, cyclidenes, and sepulchrates) wherein all five binding sites are composed of sulfur and are contained in a combination of 5-membered heterocyclic rings and thiol, thioether, or thioketo groups (S-S Tridentates or S-S Tetradentates) that meet the requirements for use as "narrow band" valence stabilizers for Co$^{+3}$ include, but are not limited to: dithiapentathiophenes; tetrathiapentathiophenes; dithiapentadithioles; and tetrathiapentadithioles.

S Valence Stabilizer #15c: Examples of six-membered macrocyclics, macrobicyclics, and macropolycyclics (including catapinands, cryptands, cyclidenes, and sepulchrates) wherein all six binding sites are composed of sulfur and are contained in a combination of 5-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: ditbiahexaathiophenes; trithiahexathiophenes; dithiahexadithioles; and trithiahexadithioles.

S Valence Stabilizer #15d: Examples of seven-membered macrocyclics, macrobicyclics, and macropolycyclics (including catapinands, cryptands, cyclidenes, and sepulchrates) wherein all seven binding sites are composed of sulfur and are contained in a combination of 5-membered heterocyclic rings and thiol, thioether, or thioketo groups (S-S Tridentates, S-S Tetradentates, or S-S Hexadentates) that meet the requirements for use as "wide band" valence stabilizers for $Co^{+3}$ include, but are not limited to: dithiaheptathiophenes; tetrathiaheptathiophenes; dithiaheptadithioles; and tetrathiaheptaclithioles.

S Valence Stabilizer #15e: Examples of eight-membered macrocyclics, macrobicyclics, and macropolycyclics (including catapinands, cryptands, cyclidenes, and sepulchrates) wherein all eight binding sites are composed of sulfur and are contained in a combination of 5-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiaoctathiophenes; tetrathiaoctathiophenes; dithiaoctadithioles; and tetrathiaoctadithioles.

S Valence Stabilizer #15f: Examples of nine-membered macrocyclics, macrobicyclics, and macropolycyclics (including catapinands, cryptands, cyclidenes, and sepulchrates) wherein all nine binding sites are composed of sulfur and are contained in a combination of 5-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: trithianonathiophenes; hexathianonathiophenes; trithianonadithioles; and hexathianonadithioles.

S Valence Stabilizer #15g: Examples of ten-membered macrocyclics, macrobicyclics, and macropolycyclics (including catapinands, cryptands, cyclidenes, and sepulchrates) wherein all ten 5 binding sites are composed of sulfur and are contained in a combination of 5-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiadecathiophenes; pentathiadecathiophenes; dithiadecadithioles; and pentathiadecadithioles.

S Valence Stabilizer #16a: Examples of four-membered macrocyclics, macrobicyclics, and macropolycyclics (including catapinands, cryptands, cyclidenes, and sepulcbrates) wherein all four binding sites are composed of sulfur and are contained in component 6-membered heterocyclic rings (S-S Tetradentates) that meet the requirements for use as "narrow band" valence stabilizers for $Co^{+3}$ include, but are not limited to: tetrathiopyrans; tetrathiazines; tetrathiaphosphorins; tetrathiadiphosphorins; tetraoxathiins; and tetradithiins.

S Valence Stabilizer #16b: Examples of five-membered macrocyclics, macrobicyclics, and macropolycyclics (including catapinands, cryptands, cyclidenes, and sepulchrates) wherein all five binding sites are composed of sulfur and are contained in component 6-membered heterocyclic rings (S-S Tridentates or S-S Tetradentates) that meet the requirements for use as "narrow band" valence stabilizers for $Co^{+3}$ include, but are not limited to: pentathiopyrans; pentathiazines; pentathiaphosphorins; pentathiadiphosphorins; pentaoxathiins; and pentadithiins.

S Valence Stabilizer #16c: Examples of six-membered macrocyclics, macrobicyclics, and macropolycyclics (including catapinands, cryptands, cyclidenes, and sepulchrates) wherein all six binding sites are composed of sulfur and are contained in component 6-membered heterocyclic rings (S-S Tridentates, S-S Tetradentates, or S-S Hexadentates) that meet the requirements for use as "narrow band" valence stabilizers for $Co^{+3}$ include, but are not limited to: hexathiopyrans; hexathiazines; hexathiaphosphorins; hexathiadiphosphorins; hexaoxathiins; and hexadithiins.

S Valence Stabilizer #16d: Examples of seven-membered macrocyclics, macrobicyclics, and macropolycyclics (including catapinands, cryptands, cyclidenes, and sepulchrates) wherein all seven binding sites are composed of sulfur and are contained in component 6-membered heterocyclic rings (S-S Tridentates, S-S Tetradentates, or S-S Hexadentates) that meet the requirements for use as "narrow band" valence stabilizers for $Co^{+3}$ include, but are not limited to: heptathiopyrans; heptathiazines; heptathiaphosphorins; heptathiadiphosphorins; heptaoxathiins; and heptadithiins.

S Valence Stabilizer #16e: Examples of eight-membered macrocyclics, macrobicyclics, and macropolycyclics (including catapinands, cryptands, cyclidenes, and sepulchrates) wherein all eight binding sites are composed of sulfur and are contained in component 6-membered heterocyclic rings (S-S Tridentates, S-S Tetradentates, or S-S Hexadentates) that meet the requirements for use as "narrow band" valence stabilizers for $Co^{+3}$ include, but are not limited to: octathiopyrans; octathiazines; octathiaphosphorins; octathiadiphosphorins; octaoxathiins; and octadithiins.

S Valence Stabilizer #16f: Examples of nine-membered macrocyclics, macrobicyclics, and macropolycyclics (including catapinands, cryptands, cyclidenes, and sepulchrates) wherein all nine binding sites are composed of sulfur and are contained in component 6-membered heterocyclic rings (S-S Tridentates, S-S Tetradentates, or S-S Hexadentates) that meet the requirements for use as "narrow band" valence stabilizers for $Co^{+3}$ include, but are not limited to: nonathiopyrans; nonathiazines; nonathiaphosphonns; nonathiadiphosphorins; nonaoxathiins; and nonadithiins.

S Valence Stabilizer #16g: Examples of ten-membered macrocyclics, macrobicyclics, and macropolycyclics (including catapinands, cryptands, cyclidenes, and sepulchrates) wherein all ten binding sites are composed of sulfur and are contained in component 6-membered heterocyclic rings (S-S Tridentates, S-S Tetradentates, or S-S Hexadentates) that meet the requirements for use as "narrow band" valence stabilizers for $Co^{+3}$ include, but are not limited to: decathiopyrans; decathiazines; decathiaphosphorins; decathiadiphosphorins; decaoxathiins; and decadithiins.

S Valence Stabilizer #17a: Examples of four-membered macrocyclics, macrobicyclics, and macropolycyclics (including catapinands, cryptands, cyclidenes, and sepulchrates) wherein all four binding sites are composed of sulfur and are contained in a combination of 6-membered heterocyclic rings and thiol, thioether, or thioketo groups (S-S Tetradentates) that meet the requirements for use as "narrow band" valence stabilizers for $Co^{+3}$ include, but are not limited to: dithiatetrathiopyrans; tetrathiatetrathiopyrans; dithiatetrathiazines; tetrathiatetrathiazines; dithiatetrathiaphosphorins; tetrathiatetrathiaphosphorins; dithiatetraoxathiins; tetrathiatetraoxathiins; dithiatetradithiins; and tetrathiatetradithiins.

S Valence Stabilizer #17b: Examples of five-membered macrocyclics, macrobicyclics, and macropolycyclics (including catapinands, cryptands, cyclidenes, and sepulchrates) wherein all five binding sites are composed of sulfur and are contained in a combination of 6-membered heterocyclic rings and thiol, thioether, or thioketo groups (S-S Tridentates or S-S Tetradentates) that meet the requirements for use as "narrow band" valence stabilizers for $Co^{+3}$ include, but are not limited to: dithiapentathiopyrans; tetrathiapentathiopyrans; dithiapentathiazines; tetrathiapentathiazines; dithiapentathiaphosphorins; tetrathiapentathiaphosphorins; dithiapentaoxathiins; tetrathiapentaoxathiins; dithiapentadithiins; and tetrathiapentadithiins.

S Valence Stabilizer #17c: Examples of six-membered macrocyclics, macrobicyclics, and macropolycyclics (including catapinands, cryptands, cyclidenes, and sepulchrates) wherein all six binding sites are composed of sulfur and are contained in a combination of 6-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiahexathiopyrans; trithiahexathiopyrans; dithiahexathiazines; trithiahexathiazines; dithiahexathiaphosphorins; trithiahexathiaphosphorins; dithiahexaoxathiins; trithiahexaoxathiins; dithiahexadithiins; and trithiahexadithiins.

S Valence Stabilizer #17d: Examples of seven-membered macrocyclics, macrobicyclics, and macropolycyclics (including catapinands, cryptands, cyclidenes, and sepulchrates) wherein all seven binding sites are composed of sulfur and are contained in a combination of 6-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiaheptathiopyrans; tetrathiaheptathiopyrans; dithiaheptathiazines; tetrathiaheptathiazines; dithiaheptathiaphosphorins; tetrathiaheptathiaphosphorins; dithiaheptaoxathiins; tetrathiaheptaoxathiins; dithiaheptadithiins; and tetrathiaheptadithiins.

S Valence Stabilizer #17e: Examples of eight-membered macrocyclics, macrobicyclics, and macropolycyclics (including catapinands, cryptands, cyclidenes, and sepulchrates) wherein all eight binding sites are composed of sulfur and are contained in a combination of 6-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiaoctathiopyrans; tetrathiaoctathiopyrans; dithiaoctathiazines; tetrathiaoctathiazines; dithiaoctathiaphosphorins; tetrathiaoctathiaphosphorins; dithiaoctaoxathiins; tetrathiaoctaoxathiins; dithiaoctadithiins; and tetrathiaoctadithiins.

S Valence Stabilizer #17f: Examples of nine-membered macrocyclics, macrobicyclics, and macropolycyclics (including catapinands, cryptands, cyclidenes, and sepulchrates) wherein all nine binding sites are composed of sulfur and are contained in a combination of 6-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: trithianonathiopyrans; hexatbianonathiopyrans; trithianonathiazines; hexathianonathiazines; trithianonathiaphosphorins; hexathianonathiaphosphorins; trithianonaoxathiins; hexathianonaoxathiins; trithianonadithiins; and hexathianonadithiins.

S Valence Stabilizer #17g: Examples of ten-membered macrocyclics, macrobicyclics, and macropolycyclics (including catapinands, cryptands, cyclidenes, and sepulchrates) wherein all ten binding sites are composed of sulfur and are contained in a combination of 6-membered heterocyclic rings and thiol, thioether, or thioketo groups (S-S Tridentates, S-S Tetradentates, or S-S Hexadentates) that meet the requirements for use as "narrow band" valence stabilizers for $Co^{+3}$ include, but are not limited to: dithiadecathiopyrans; pentathiadecathiopyrans; dithiadecathiazines; pentathiadecathiazines; dithiadecathiaphosphorins; pentathiadecathiaphosphorins; dithiadecaoxathiins; pentathiadecaoxathiins; dithiadecadithiins; and pentathiadecadithiins.

S Valence Stabilizer #18: Examples of dithiobiurets (dithioimidodicarbonic diamides), dithioisobiurets, dithiobiureas, trithiotriurets, trithiotriureas, bis(dithiobiurets), bis(dithioisobiurets), bis(dithiobiureas), poly(dithiobiurets), poly(dithioisobiurets), and poly(dithiobiureas) (S-S Bidentates, S-S Tridentates, S-S Tetradentates) that meet the requirements for use as "narrow band" valence stabilizers for $Co^{+3}$ include, but are not limited to: dithiobiuret, dithioisobiuret, dithiobiurea, trithiotriuret, trithiotriurea, nitrodithiobiuret, dinitrodithiobiuret, aminodithiobiuret, diaminodithiobiuret, oxydithiobiuret, dioxydithiobiuret, cyanodithiobiuret, methyldithiobiuret, ethyldithiobiuret, isopropyldithiobiuret, phenyldithiobiuret, benzyldithiobiuret, cyclohexyldithiobiuret, norbomyldithiobiuret, adamantyldithiobiuret, dimethyldithiobiuret, diethyldithiobiuret, diisopropyldithiobiuret, diphenyldithiobiuret, dibenzyldithiobiuret, dicyclohexyldithiobiuret, dinorbornyldithiobiuret, and diadamantyldithiobiuret.

S Valence Stabilizer #19: Examples of thioacylthioureas, thioaroylthioureas, bis(thioacylthioureas), bis(thioaroylthioureas), poly(thioacylthioureas), and poly(thioaroylthioureas) (S-S Bidentates, S-S Tridentates, S-S Tetradentates) that meet the requirements for use as "narrow band" valence stabilizers for $Co^{+3}$ include, but are not limited to: thioformylthiourea, thioacetylthiourea, thiobenzoylthiourea, thiocyclohexoylthiourea, pentafluorothiobenzoylthiourea, N-methylthioacetylthiourea, N-phenylthiobenzoylthiourea, and N-cyclohexylthiocyclohexoylthiourea.

S Valence Stabilizer #20: Examples of dithioacyl disulfides, bis(dithioacyl disulfides), and poly(dithioacyl disulfides), (S-S Bidentates, S-S Tridentates, S-S Tetradentates) that meet the requirements for use as "narrow band" valence stabilizers for $Co^{+3}$ include, but are not limited to: dithioacetyl disulfide; dithiopropanoyl disulfide; dithiobenzoyl disulfide; and dithiopentafluorobenzoyl disulfide.

S Valence Stabilizer #21: Examples of tetrathioperoxydicarbonic diamides, bis(tetrathioperoxydicarbonic diamides), and poly(tetrathioperoxydicarbonic diamides) (S-S Bidentates, S-S Tridentates, S-S Tetradentates) that meet the requirements for use as "narrow band" valence stabilizers for $Co^{+3}$ include, but are not limited to: tetrathioperoxydicarbonic diamide; N-phenyltetrathioperoxydicarbonic diamide; N-benzyltetrathioperoxydicarbonic diamide; N-cyclohexyltetrathioperoxydicarbonic diamide; N-norbornyltetrathioperoxydicarbonic diamide; N,N'-diphenyltetrathioperoxydicarbonic diamide; N,N'-dibenzyltetrathioperoxydicarbonic diamide; N,N'-dicyclohexyltetrathioperoxydicarbonic diamide; and N,N'-dinorbornyltetrathioperoxydicarbonic diamide.

S Valence Stabilizer #22: Examples of hexathio-, pentathio-, and tetrathioperoxydicarbonic acids, bis(hexathio-, pentathio-, and tetrathioperoxydicarbonic acids), poly(hexathio-, pentathio-, and tetrathioperoxydicarbonic acids), and derivatives thereof (S-S Bidentates, S-S Tridentates, S-S Tetradentates) that meet the requirements for use as "narrow band" valence stabilizers for $Co^{+3}$ include, but are not limited to: hexathioperoxydicarbonic acid, pentathioperoxydicarbonic acid, tetrathioperoxydicarbonic acid, S-phenylhexathioperoxydicarbonic acid; S-benzylhexathioperoxydicarbonic acid; S-cyclohexylhexathioperoxydicarbonic acid; S-norbornyihexathioperoxydicarbonic acid; 5,S'-diphenyihexathioperoxydicarbonic acid; S,S'-dibenzylhexathioperoxydicarbonic acid; S,S'-dicyclohexyihexathioperoxydicarbonic acid; and S,S'-dinorbomyihexathioperoxydicarbonic acid.

S Valence Stabilizer #23: Examples of dithioperoxydiphosphoramides, bis(dithioperoxydiphosphoramides), and poly(dithioperoxydiphosphoramides) (S-S Bidentates, S-S Tridentates, S-S Tetradentates) that meet the requirements for use as "narrow band" valence stabilizers for $Co^{+3}$ include, but are not limited to: dithioperoxydiphosphoramide, N-methyldithioperoxydiphosphoramide, N-isopropyldithioperoxydiphosphoramide, N-tert-butyldithioperoxydiphosphoramide, N-phenyldithioperoxydiphosphoramide, N-pentafluorophenyldithioperoxydiphosphoramide, N-benzyldithioperoxydiphosphoramide, N-cyclohexyldithioperoxydiphosphoramide, N-norbornyldithioperoxydiphosphoramide, N,N'''-dimethyldithioperoxydiphosphoramide, N,N'''-diisopropyldithioperoxydiphosphoramide, N,N'''-di-tert-butyldithioperoxydiphosphoramide, N,N'''-diphenyldithioperoxydiphosphoramide, N,N'''-di-pentafluorophenyldithioperoxydiphosphoramide, N,N'''-dibenzyldithioperoxydiphosphoramide, N,N'''-dicyclohexyldithioperoxydiphosphoramide, and N,N'''-dinorbornyldithioperoxydiphosphoramide.

S Valence Stabilizer #24: Examples of dithioperoxydiphosphoric acids, bis(dithioperoxydiphosphoric acids), poly(dithioperoxydiphosphoric acids), and derivatives thereof (S-S Bidentates, S-S Tridentates, S-S Tetradentates) that meet the requirements for use as "narrow band" valence stabilizers for $Co^{+3}$ include, but are not limited to: dithioperoxydiphosphoric acid, methyldithioperoxydiphosphoric acid, isopropyldithioperoxydiphosphoric acid, tert-butyldithioperoxydiphosphoric acid, phenyldithioperoxydiphosphoric acid, pentafluorophenyldithioperoxydiphosphoric acid, benzyldithioperoxydiphosphoric acid, cyclohexyldithioperoxydiphosphoric acid, norbornyldithioperoxydiphosphoric acid, dimethyldithioperoxydiphosphoric acid, diisopropyldithioperoxydiphosphoric acid, di-tert-butyldithioperoxydiphosphoric acid, diphenyldithioperoxydiphosphoric acid, di-pentafluorophenyldithioperoxydiphosphoric acid, dibenzyldithioperoxydiphosphoric acid, dicyclohexyldithioperoxydiphosphoric acid, and dinorbomyldithioperoxydiphosphoric acid.

S Valence Stabilizer #25: Examples of dithioimidodiphosphonic acids, dithiohydrazidodiphosphonic acids, bis(dithioimidodiphosphonic acids), bis(dithiohydrazidodiphosphonic acids), poly(dithioimidodiphosphonic acids), poly(dithiohydrazidodiphosphonic acids), and derivatives thereof (S-S Bidentates, S-S Tridentates, S-S Tetradentates) that meet the requirements for use as "narrow band" valence stabilizers for $Co^{+3}$ include, but are not limited to: dithioimidodiphosphonic acid, methyldithioimidodiphosphonic acid, isopropyldithioimidodiphosphonic acid, tert-butyldithioimidodiphosphonic acid, phenyldithioimidodiphosphonic acid, pentafluorophenyldithioimidodiphosphonic acid, benzyldithioimidodiphosphonic acid, cyclohexyldithioimidodiphosphonic acid, norbornyldithioimidodiphosphonic acid, dimethyldithioimidodiphosphonic acid, diisopropyldiothioimidodiphosphonic acid, di-tert-butyldithioimidodiphosphonic acid, diphenyldithioimidodiphosphonic acid, di-pentafluorophenyldithioimidodiphosphonic acid, dibenzyldithioimidodiphosphonic acid, dicyclohexyldithioimidodiphosphonic acid, and dinorbornyldithioimidodiphosphonic acid. [Note: The phosphite ($P^{+3}$) valence of the phosphorus atom makes stabilization of high valence metal ions much more difficult, though still possible.]

S Valence Stabilizer #26: Examples of dithioimidodiphosphonamides, dithiohydrazidodiphosphonamides, bis(dithioimidodiphosphonamides), bis(dithiohydrazidodiphosphonamides), poly(dithioimidodiphosphonamides), and poly(dithiohydrazidodiphosphonamides) (S-S Bidentates, S-S Tridentates, S-S Tetradentates) that meet the requirements for use as "narrow band" valence stabilizers for $Co^{+3}$ include, but are not limited to: dithioimidodiphosphonamide, N-methyldithioimidodiphosphonamide, N-isopropyldithioimidodiphosphonamide, N-tert-butyldithioimidodiphosphonamide, N-phenyldithioimidodiphosphonamide, N-pentafluorophenyldithioimidodiphosphonamide, N-benzyldithioimidodiphosphonamide, N-cyclohexyldithioimidodiphosphonamide, N-norbornyldithioimidodiphosphonamide, N,N'''-dimethyldithioimidodiphosphonamide, N,N'''-diisopropyldithioimidodiphosphonamide, N,N'''-di-tert-butyldithioimidodiphosphonamide, N,N'''-diphenyldithioimidodiphosphonamide, N,N'''-di-pentafluorophenyldithioimidodiphosphonamide, N,N'''-dibenzyldithioimidodiphosphonamide, N,N'''-dicyclohexyldithioimidodiphosphonamide, and N,N'''-dinorbornyldithioimidodiphosphonamide. [Note: The phosphite ($P^{+3}$) valence of the phosphorus atom makes stabilizization of high valence metal ions much more difficult, though still possible.]

S Valence Stabilizer #27: Examples of dithiodiphosphonamides, bis(dithiodiphosphonamides), and poly(dithiodiphosphonamides) (S-S Bidentates, S-S Tridentates, S-S Tetradentates) that meet the requirements for use as "narrow band" valence stabilizers for $Co^{+3}$ include, but are not limited to: dithiodiphosphonamide, N-methyldithiodiphosphonamide, N-isopropyldithiodiphosphonamide, N-tert-butyldithiodiphosphonamide, N-phenyldithiodiphosphonamide, N-pentafluorophenyldithiodiphosphonamide, N-benzyldithiodiphosphonamide, N-cyclohexyldithiodiphosphonamide, N-norbornyldithiodiphosphonamide, N,N'''-dimethyldithiodiphosphonamide, N,N'''-diisopropyldithiodiphosphonamide, N,N'''-di-tertbutyldithiodiphosphonamide, N,N'''-diphenyldithiodiphosphonamide, N,N'''-dipentafluorophenyldithiodiphosphonamide, N,N'''-dibenzyldithiodiphosphonamide, N,N'''-dicyclohexyldithiodiphosphonamide, and N,N'''-dinorbornyldithiodiphosphonamide. [Note: The phosphite ($P^{+3}$) valence of the phosphorus atom makes stabilizization of high valence metal ions much more difficult, though still possible.]

S Valence Stabilizer #28: Examples of dithiodiphosphonic acids, bis(dithiodiphosphonic acids), poly(dithiodiphosphonic acids), and derivatives thereof (S-S Bidentates, S-S Tridentates, S-S Tetradentates) that meet the requirements for use as "narrow band" valence stabilizers for $Co^{+3}$ include, but are not limited to: dithiodiphosphonic acid, methyldithiodiphosphonic acid, isopropyldithiodiphosphonic acid, tert-butyldithiodiphosphonic acid, phenyldithiodiphosphonic acid, pentafluorophenyldithiodiphosphonic acid, benzyldithiodiphosphonic acid, cyclohexyldithiodiphosphonic acid, norbornyldithiodiphosphonic acid, dimethyldithiodiphosphonic acid, diisopropyldiothiodiphosphonic acid, di-tert-butyldithiodiphosphonic acid, diphenyldithiodiphosphonic acid, di-pentafluorophenyldithiodiphosphonic acid, dibenzyldithiodiphosphonic acid, dicyclohexyldithiodiphosphonic acid, and dinorbornyldithiodiphosphonic acid. [Note: The phosphite ($P^{+3}$) valence of the phosphorus atom makes stabilizization of high valence metal ions much more difficult, though still possible.]

S Valence Stabilizer #29: Examples of dithioperoxydiphosphonamides, bis(dithioperoxydiphosphonamides), and poly(dithioperoxydiphosphonamides) (S-S Bidentates, S-S Tridentates, S-S Tetradentates) that meet the requirements for use as "narrow band" valence stabilizers for $Co^{+3}$ include, but are not limited to: dithioperoxydiphosphonamide, N-methyldithioperoxydiphosphonamide, N-isopropyldithioperoxydiphosphonamide, N-tert-butyldithioperoxydiphosphonamide, N-phenyldithioperoxydiphosphonamide, N-pentafluorophenyldithioperoxydiphosphonamide, N-benzyldithioperoxydiphosphonamide, N-cyclohexyldithioperoxydiphosphonamide, N-norbornyldithioperoxydiphosphonamide, N,N'''-dimethyldithioperoxydiphosphonamide, N,N'''-diisopropyldithioperoxydiphosphonamide, N,N'''-di-tert-butyldithioperoxydiphosphonamide, N,N'''-diphenyldithioperoxydiphosphonamide, N,N'''-di-pentafluorophenyldithioperoxydiphosphonamide, N,N'''-dibenzyldithioperoxydiphosphonamide, N,N'''-dicyclohexyldithioperoxydiphosphonamide, and N,N'''-dinorbornyldithioperoxydiphosphonamide. [Note: The phosphite ($P^{+3}$) valence of the phosphorus atom makes stabilizization of high valence metal ions much more difficult, though still possible.]

S Valence Stabilizer #30: Examples of dithioperoxydiphosphonic acids, bis(dithioperoxydiphosphonic acids), poly(dithioperoxydiphosphonic acids), and derivatives thereof (S-S Bidentates, S-S Tridentates, S-S Tetradentates) that meet the requirements for use as "narrow band" valence stabilizers for $Co^{+3}$ include, but are not limited to: dithioperoxydiphosphonic acid, methyldithioperoxydiphosphonic acid, isopropyldithioperoxydiphosphonic acid, tert-butyldithioperoxydiphosphonic acid, phenyldithioperoxydiphosphonic acid, pentafluorophenyldithioperoxydiphosphonic acid, benzyldithioperoxydiphosphonic acid, cyclohexyldithioperoxydiphosphonic acid, norbornyldithioperoxydiphosphonic acid, dimethyldithioperoxydiphosphonic acid, diisopropyldithioperoxydiphosphonic acid, di-tert-butyldithioperoxydiphosphonic acid, diphenyldithioperoxydiphosphonic acid, di-pentafluorophenyldithioperoxydiphosphonic acid, dibenzyldithioperoxydiphosphonic acid, dicyclohexyldithioperoxydiphosphonic acid, and dinorbornyldithioperoxydiphosphonic acid. [Note: The phosphite ($P^{+3}$) valence of the phosphorus atom makes stabilizization of high valence metal ions much more difficult, though still possible.]

S Valence Stabilizer #31: Examples of dithiophosphonic acids (phosphonodithioic acids), bis(dithiophosphonic acids), poly(dithiophosphonic acids), and derivatives thereof (S-S Bidentates, S-S Tridentates, S-S Tetradentates) that meet the requirements for use as "narrow band" valence stabilizers for $Co^{+3}$ include, but are not limited to: dithiophosphonic acid, O-phenyldithiophosphomc acid, O-benzyldithiophosphonic acid, O-cyclohexyldithiophosphonic acid, O-norbornyldithiophosphonic acid, O,P-diphenyldithiophosphonic acid, O,P-dibenzyldithiophosphonic acid, O,P-dicyclohexyldithiophosphonic acid, and O,P-dinorbornyldithiophosphonic acid. [Note: The phosphite ($P^{+3}$) valence of the phosphorus atom makes stabilizization of high valence metal ions much more difficult, though still possible.]

S Valence Stabilizer #32: Examples of trithiophosphonic acids (phosphonotrithioic acids), bis(trithiophosphonic acids), poly(trithiophosphonic acids), and derivatives thereof (S-S Bidentates, S-S Tridentates, S-S Tetradentates) that meet the requirements for use as "narrow band" valence stabilizers for $Co^{+3}$ include, but are not limited to: trithiophosphonic acid, S-phenyltrithiophosphonic acid, S-benzyltrithiophosphonic acid, S-cyclohexyltrithiophosphonic acid, S-norbornyltrithiophosphonic acid, S,P-diphenyltrithiophosphonic acid, S,P-dibenzyltrithiophosphonic acid, S,P-dicyclohexyltrithiophosphonic acid, and S,P-dinorbornyltrithiophosphonic acid. [Note: The phosphite ($P^{+3}$) valence of the phosphorus atom makes stabilizization of high valence metal ions much more difficult, though still possible.]

S Valence Stabilizer #33: Examples of phosphono(dithioperoxo)thioic acids, bis[phosphono(dithioperoxo)thioic acids], poly[phosphono(dithioperoxo)thioic acids], and derivatives thereof (S-S Bidentates, S-S Tridentates, S-S Tetradentates) that meet the requirements for use as "narrow band" valence stabilizers for $Co^{+3}$ include, but are not limited to: phosphono(dithioperoxo)thioic acid, O-phenylphosphono(dithioperoxo)thioic acid, O-benzylphosphono(dithioperoxo)thioic acid, O-cyclohexylphosphono(dithioperoxo)thioic acid, O-norbornylphosphono(dithioperoxo)thioic acid, O,P-diphenylphosphono(dithioperoxo)thioic acid, O,P-dibenzylphosphono(dithioperoxo)thioic acid, O,P-dicyclohexylphosphono(dithioperoxo)thioic acid, and O,P-dinorbornylphosphono(dithioperoxo)thioic acid. [Note: The phosphite ($P^{+3}$) valence of the phosphorus atom makes stabilizization of high valence metal ions much more difficult, though still possible.]

S Valence Stabilizer #34: Examples of phosphono(dithioperoxo)dithioic acids, bis[phosphono(dithioperoxo)dithioic acids], poly[phosphono(dithioperoxo)dithioic acids], and derivatives thereof (S-S Bidentates, S-S Tridentates, S-S Tetradentates) that meet the requirements for use as "narrow band" valence stabilizers for $Co^{+3}$ include, but are not limited to: phosphono(dithioperoxo)dithioic acid, S-phenylphosphono(dithioperoxo)dithioic acid, S-benzylphosphono(dithioperoxo)dithioic acid, S-cyclohexylphosphono(dithioperoxo)dithioic acid, S-norbornylphosphono(dithioperoxo)dithioic acid, S,P-diphenylphosphono(dithioperoxo)dithioic acid, S,P-dibenzylphosphono(dithioperoxo)dithioic acid, S,P-dicyclohexylphosphono(dithioperoxo)dithioic acid, and S,P-dinorbornylphosphono(dithioperoxo)dithioic acid. [Note: The phosphite ($P^{+3}$) valence of the phosphorus atom makes stabilizization of high valence metal ions much more difficult, though still possible.]

S Valence Stabilizer #35: Examples of S-(alkylthio)thiocarboxylic acids, S-(arylthio)thiocarboxylic acids, and S,S-thiobisthiocarboxylic Acids (S-S Bidentates and S-S Tridentates) that meet the requirements for use as "narrow band" valence stabilizers for $Co^{+3}$ include, but are not limited to: (methylthio)thioacetic acid; (methylthio)thiobenzoic acid; (methylthio)thionicotinic acid; (methylthio)thionapthoic acid; (phenylthio)thioacetic acid; (phenylthio)thiobenzoic acid; (phenylthio)thionaphthoic acid; (norbomylthio)thioacetic acid; (norbornylthio)thiobenzoic acid; (norbornylthio)

thionapthoic acid; thiobisthioacetic acid; thiobisthiobenzoic acid; and thiobisthionapthoic acid.

S Valence Stabilizer #36: Examples of S-(alkyldisulfido) thiocarboxylic acids, S-(aryldisulfido)thiocarboxylic acids, and S,S'-disulfidobisthiocarboxylic acids (S-S Bidentates and S-S Tridentates) that meet the requirements for use as "narrow band" valence stabilizers for $Co^{+3}$ include, but are not limited to: (methyldisulfido)thioacetic acid; (methyldisulficlo)thiobenzoic acid; (methyldisulfido)thionicotinic acid; (methyldisulfido)tbionapthoic acid; (phenyldisulfido)thioacetic acid; (phenyldisulfido)thiobenzoic acid; (phenyldisulfido)thionaphthoic acid; (norbornyldisulfido)thioacetic acid; (norbornyldisulfido)thiobenzoic acid; (norbornyldisulfido)thionapthoic acid; S,S'-disulfidobisthioacetic acid; S,S'-disulfidobisthiobenzoic acid; and S,S'-disulfidobisthionapthoic acid.

S Valence Stabilizer #37: Examples of 1,2-dithiolates, bis(1,2-dithiolates), and poly(1,2-dithiolates) (S-S Bidentates, S-S Tridentates, S-S Tetradentates) that meet the requirements for use as "narrow band" valence stabilizers for $Co^{+3}$ include, but are not limited to: 2,3-butanedithiol; 1,2-diphenyl-1,2-ethanedithiol; 1,2-di(pentafluorophenyl)-1,2-ethanedithio; 1,2-dicyclohexyl-1,2-ethanedithiol; 1,2-dinorbornyl-1,2-ethanedithiol; 2,3-dimercaptopropanol; 2,3-dimercaptosuccinic acid; poly[bis(arylthio)acetylene]s; and poly[bis(alkylylthio)acetylene]s.

S Valence Stabilizer #38: Examples of rhodanines and bis(rhodanines) (S-S Bidentates and S-S Tetradentates) that meet the requirements for use as "narrow band" valence stabilizers for $Co^{+3}$ include, but are not limited to: 3-methyirhodanine; 3-ethylrhodanine; 3-isopropylrhodanine; 3-phenylrhodanine; 3-benzylrhodanine; 3-cyclohexylrhodanine; 3-norbornylrhodanine; 5-methyfrhodanine; 5-ethyfrhodanine; 5-isopropylrhodanine; 5-phenylrhodanine; 5-benzylrhodanine; 5-cyclohexylrhodanine; 5-norbornyirhodanine; 3,3'-ethylenebisrhodanine; 3,3'-propylenerhodanine; 3,3'-butylenerhodanine; 5,5'-ethylenebisrhodanine; 5,5'-propylenerhodanine; and 5,5'-butylenerhodanine. [Note: rhodanines and bis(rhodanines) tend to stabilize lower oxidation states in metal ions.]

S Valence Stabilizer #39: Examples of dithiocarbimates, bis(dithiocarbimates), and poly(dithiocarbimates) (S-S Bidentates, S-S Tridentates, and S-S Tetradentates) that meet the requirements for use as "narrow band" valence stabilizers for $Co^{+3}$ include, but are not limited to: methyldithiocarbimate; trifluoromethyldithiocarbimate; ethyldithiocarbimate; propyldithiocarbimate; isopropyldithiocarbimate; butyldithiocarbimate; tertbutyldithiocarbimate; cyanodithiocarbimate (CDC); cyanamidodithiocarbimate; azidodithiocarbimate; phenyldithiocarbimate; pentafluorophenyldithiocarbimate; benzyldithiocarbimate; naphthyldithiocarbimate; cyclohexyldithiocarbimate; norbornyldithiocarbimate; and adamantyldithiocarbimate. [Note: Carbimates tend to stabilize lower oxidation states in metal ions.]

S Valence Stabilizer #40: Examples of thioxanthates, bis(thioxanthates), and poly(thioxanthates) (S-S Bidentates and S-S Tetradentates) that meet the requirements for use as "narrow band" valence stabilizers for $Co^{+3}$ include, but are not limited to: methyl thioxanthate (MeSxan); ethyl thioxanthate (EtSxan); isopropyl thioxanthate (iPrSxan); trifluoromethyl thioxanthate ($CF_3Sxan$); cyanothioxanthate; cyanamidothioxanthate; phenyl thioxanthate (PhSxan); benzyl thioxanthate (BzSxan); pentafluorophenyl thioxanthate; cyclohexyl thioxanthate (cHxSxan); and norbornyl thioxanthate. [Note: Thioxanthates tend to stabilize lower oxidation states in metal ions.]

S Valence Stabilizer #41: Examples of xanthates, bis(xanthates), and poly(xanthates) (S-S Bidentates and S-S Tetradentates) that meet the requirements for use as "narrow band" valence stabilizers for $Co^{+3}$ include, but are not limited to: methyl xanthate (Mexan); ethyl xanthate (Etxan); isopropyl xanthate (iPrxan); trifluoromethyl xanthate ($CF_3xan$); cyanoxanthate; cyanamidoxanthate; phenyl xanthate (Phxan); benzyl xanthate (Bzxan); pentafluorophenyl xanthate; cyclohexyl xanthate (cHxxan); and norbornyl xanthate. [Note: Xanthates tend to stabilize lower oxidation states in metal ions.]

S Valence Stabilizer #42: Examples of phosphinodithioformates (S-S Bidentates) that meet the requirements for use as "narrow band" valence stabilizers for $Co^{+3}$ include, but are not limited to: trimethyiphosphinodithioformate; triethylphosphinodithioformate; triphenylphosphinodithioformate; tricyclohexylphosphinodithioformate; dimethylphosphinodithioformate; diethyiphosphinodithioformate; diphenylphosphinodithioformate; and dicyclohexylphosphinodithioformate.

S Valence Stabilizer #43: Examples of alkyl- and aryl-dithioborates, trithioborates, perthioborates, bis(dithioborates), bis(trithioborates), and bis(perthioborates) (S-S Bidentates and S-S Tetradentates) that meet the requirements for use as "narrow band" valence stabilizers for $Co^{+3}$ include, but are not limited to: S,O-diethyl dithioborate; S,O-diisopropyl dithioborate; S,O-diphenyl dithioborate; S,O-dibenzyi dithioborate; S,O-dicyciohexyl dithioborate; S,O-dinorbornyl dithioborate; diethyl trithioborate; diisopropyl trithioborate; diphenyl trithioborate; dibenzyl trithioborate; dicyclohexyl trithioborate; and dinorbomyl trithioborate.

S Valence Stabilizer #44: Examples of alkyl- and aryl-dithioboronates and bis(dithioboronates) (S-S Bidentates and S-S Tetradentates) that meet the requirements for use as "narrow band" valence stabilizers for $Co^{+3}$ include, but are not limited to: diethyl dithioboronate; diisopropyl ditbioboronate; diphenyl dithioboronate; dibenzyl dithioboronate; dicyclohexyl dithioboronate; and dinorbornyl dithioboronate. [Note: boronates tend to stabilize lower oxidation states in metal ions.]

S Valence Stabilizer #45: Examples of trithioarsonic acids (arsonotrithioic acids), dithioarsonic acids (arsonodithioic acids), tetrathioarsonic acids (arsonotetrathioic acids), and derivatives thereof (S-S Bidentates, S-S Tridentates, S-S Tetradentates) that meet the requirements for use as "narrow band" valence stabilizers for $Co^{+3}$ include, but are not limited to: trithioarsonic acid, O-phenyltrithioarsonic acid, O-benzyltrithioarsonic acid, O-cyclohexyltrithioarsonic acid, O-norbornyltrithioarsonic acid, O,S-diphenyltrithioarsonic acid, O,S-dibenzyltrithioarsonic acid, O,S-dicyclohexyltrithioarsonic acid, O,S-dinorbomyltrithioarsonic acid; dithioarsonic acid, O-phenyldithioarsonic acid, O-benzyldithioarsonic acid, O-cyclohexyldithioarsonic acid, O-norbornyldithioarsonic acid, O,O-diphenyldithioarsonic acid, O,O-dibenzyldithioarsonic acid, O,O-dicyclohexyldithioarsonic acid, and O,O-dinorbornyldithioarsonic acid.

S Valence Stabilizer #46: Examples of trithioantimonic acids (stibonotrithioic acids), dithioantimonic acids (stibonodithioic acids), tetrathioantimonic acids (stibonotetrathioic acids), and derivatives thereof (S-S Bidentates, S-S Tridentates, S-S Tetradentates) that meet the requirements for use as "narrow band" valence stabilizers for $Co^{+3}$ include, but are not limited to: trimethyltrithioantimonate; triethyltrithioantimonate; and triphenyltrithioantimonate.

S Valence Stabilizer #47: Examples of phosphine P-sulfides and amino-substituted phosphine sulfides (S Monodentates) that meet the requirements for use as "narrow band"

valence stabilizers for $Co^{+3}$ include, but are not limited to: trimethylphosphine sulfide (TMPS); triethylphosphine sulfide (TEPS); triphenylphosphine sulfide (TPhPS); tribenzylphosphine sulfide (TBzPS); tricyclohexylphosphine sulfide (TcHxPS); and trinorbornylphosphine sulfide for phosphine P-sulfides; and tris(dimethylamino)phosphine sulfide; trimorpholinophosphine sulfide; tripiperidinophosphine sulfide; tripyrrolidinophosphine sulfide; and tri(cyclohexylamino)phosphine sulfide for amino-substituted phosphine sulfides.

S Valence Stabilizer #48: Examples of arsine As-sulfides and amino-substituted arsine sulfides (S Monodentates) that meet the requirements for use as "narrow band" valence stabilizers for $Co^{+3}$ include, but are not limited to: trimethylarsine sulfide; triethylarsine sulfide; triphenylarsine sulfide; tribenzylarsine sulfide; tricyclohexylarsine sulfide; and trinorbornylarsine sulfide for arsine As-sulfides; and tris(dimethylamino)arsine sulfide; trimorpholinoarsine sulfide; tripiperidinoarsine sulfide; tripyrrolidinoarsine sulfide; and tri(cyclohexylamino)arsine sulfide for amino-substituted arsine sulfides.

S Valence Stabilizer #49: Examples of thiocyanate ligands (S monodentates) that meet the requirements for use as "narrow band" valence stabilizers for $Co^{+3}$ include, but are not limited to: selenocyanate (-SCN).

S Valence Stabilizer #50: Examples of thiolates that meet the requirements for use as "narrow band" valence stabilizers for $Co^{+3}$ include, but are not limited to: thiophenol; naphthalenethiol; 1-dodecanethion; hexadecyl mercaptan; benzenethiol (bt); polybenzenethiols; and polythioarylenes.

S Valence Stabilizer #51: Examples of sulfide that meet the requirements for use as "narrow band" valence stabilizers for $Co^{+3}$ include, but are not limited to: sulfides ($—S^{2-}$); disulfides ($—S_2^{2-}$); and polysulfides ($—S_x^{2-}$).

P Valence Stabilizer #1: Examples of monophosphines (P monodentates) that meet the requirements for use as "narrow band" valence stabilizers for $Co^{+3}$ include, but are not limited to: phosphine, phenylphosphine, diphenylphosphine, triphenylphosphine, tricyclohexylphosphine, phenyldimethylphosphine, phenyldiethylphosphine, methyldiphenylphosphine, ethyldiphenylphosphine, phosphirane, phosphetane, phospholane, phosphorinane, benzophospholane, benzophosphorinane, dibenzophospholane, dibenzophosphorinane, naphthophospholane, naphthophosphorinane, phosphinonorbomane, and phosphinoadamantane.

P Valence Stabilizer #2: Examples of diphosphines (P monodentates or P-P bidentates) that meet the requirements for use as "narrow band" valence stabilizers for $Co^{+3}$ include, but are not limited to: diphospholane, benzodiphospholane, naphthodiphospholane, diphosphorinane, benzodiphosphorinane, dibenzodiphosphorinane, naphthodiphosphorinane, bis(diphenylphosphino)methane, bis(diphenylphosphino)ethane, bis(diphenylphosphino)propane, bis(diphenylphosphino)butane, bis(diphenylphosphino)pentane, 1,2-bis(diphenylphosphino)ethylene, and o-phenylenebis(diphenylphosphine). (Note: the aryl derivatives are air-stable, whereas the alkyl derivatives are air-sensitive and therefore unsuitable for these applications.)

P Valence Stabilizer #3: Examples of triphosphines (P monodentates, P-P bidentates, or P-P tridentates) that meet the requirements for use as "narrow band" valence stabilizers for $Co^{+3}$ include, but are not limited to: triphosphorinane, P,P'-tetraphenyl-2-methyl-2-(P-diphenyl)phosphinomethyl-1,3-propanediphosphine; P,P-[2-(P-diphenyl)phosphinoethyl]diethyl-P-phenylphosphine; P,P-[2-(P-diphenyl)phosphino]diphenyl-P-phenylphosphine; and hexahydro-2,4,6-trimethyl-1,3,5-triphosphazine. (Note: the aryl derivatives are air-stable, whereas the alkyl derivatives are air-sensitive and therefore unsuitable for these applications.)

P Valence Stabilizer #4: Examples of tetraphosphines (P monodentates, P-P bidentates, P-P tridentates, and P-P tetradentates) that meet the requirements for use as "narrow band" valence stabilizers for $Co^{+3}$ include, but are not limited to: P,P'-tetraphenyl-2,2-[(P-diphenyl)phosphinomethyl]-1,3-propanediphosphine; tri[o-(P-diphenyl)phosphinophenyl]phosphine; and 1,1,4,7,10,10-hexaphenyl-1,4,7,10-tetraphosphadecane. (Note: the aryl derivatives are air-stable, whereas the alkyl derivatives are air-sensitive and therefore unsuitable for these applications.)

P Valence Stabilizer #5: Examples of pentaphosphines (P monodentates, P-P bidentates, P-P tridentates, and P-P tetradentates) that meet the requirements for use as "narrow band" valence stabilizers for $Co^{+3}$ include, but are not limited to: 4-[2-(P-diphenyl)phosphinoethyl]-1,1,7,10,10-pentaphenyl-1,4,7,10-tetraphosphadecane. (Note: the aryl derivatives are air-stable, whereas the alkyl derivatives are air-sensitive and therefore unsuitable for these applications.)

P Valence Stabilizer #6: Examples of hexaphosphines (P-P bidentates, P-P tridentates, P-P tetradentates, and P-P hexadentates) that meet the requirements for use as "narrow band" valence stabilizers for $Co^{+3}$ include, but are not limited to: 1,1,10,10-tetraphenyl-4,7-[2-(P,P-diphenyl)phosphinoethyl]-1,4,7,10-tetraphosphadecane. (Note: the aryl derivatives are air-stable, whereas the alkyl derivatives are air-sensitive and therefore unsuitable for these applications.)

P Valence Stabilizer #7a: Examples of 5-membered heterocyclic rings containing one phosphorus atom (P monodentates) that meet the requirements for use as "narrow band" valence stabilizers for $Co^{+3}$ include, but are not limited to: 1-phospholene, 2-phospholene, 3-phospholene, phosphole, oxaphosphole, thiaphosphole, benzophospholene, benzophosphole, benzoxaphosphole, benzothiaphosphole, dibenzophospholene, dibenzophosphole, naphthophospholene, naphthophosphole, naphthoxaphosphole, naphthothiaphosphole.

P Valence Stabilizer #7b: Examples of 5-membered heterocyclic rings containing two phosphorus atoms (P monodentates or P-P bidentates) that meet the requirements for use as "narrow band" valence stabilizers for $Co^{+3}$ include, but are not limited to: diphospholene, diphosphole, oxadiphospholene, thiadiphospholene, benzodiphospholene, benzodiphosphole, naphthodiphospholene, and naphthodiphosphole.

P Valence Stabilizer #7c: Examples of 5-membered heterocyclic rings containing three phosphorus atoms (P monodentates or P-P bidentates) that meet the requirements for use as "narrow band" valence stabilizers for $Co^{+3}$ include, but are not limited to: triphosphole.

P Valence Stabilizer #8a: Examples of 6-membered heterocyclic rings containing one phosphorus atom (P monodentates) that meet the requirements for use as "narrow band" valence stabilizers for $Co^{+3}$ include, but are not limited to: phosphorin, oxaphosphorin, thiaphosphorin, benzophosphorin, benzoxaphosphorin, benzothiaphosphorin, acridophosphine, phosphanthridine, dibenzoxaphosphorin, dibenzothiaphosphorin, naphthophosphorin, naphthoxaphosphorin, and naphthothiaphosphorin.

P Valence Stabilizer #8b: Examples of 6-membered heterocyclic rings containing two phosphorus atoms (P monodentates or P-P bidentates) that meet the requirements for use as "narrow band" valence stabilizers for $Co^{+3}$ include, but are not limited to: o-diphosphorin, m-diphosphorin, p-diphosphorin, oxadiphosphorin, thiadiphosphorin, benzodiphosphorin, benzoxadiphosphorin, benzothiadiphosphorin, dibenzodiphosphorin, dibenzoxadiphosphorin, dibenzothiadiphosphorin, naphthodiphosphorin, naphthoxadiphosphorin, and naphthothiadiphosphorin.

P Valence Stabilizer #8c: Examples of 6-membered heterocyclic rings containing three phosphorus atoms (P monodentates or P-P bidentates) that meet the requirements for use as "narrow band" valence stabilizers for $Co^{+3}$ include, but are not limited to: 1,3,5-triphosphorin, 1,2,3-triphosphorin, benzo-1,2,3-triphosphorin, and naphtho-1,2,3-triphosphorin.

P Valence Stabilizer #9a: Examples of 5-membered heterocyclic rings containing one phosphorus atom and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)-1-pholene; 2,5-(P-phenylphosphino)-1-pholene; 2-(P-phenylphosphino)-3-phosholene; 2,5-(P-phenylphosphino)-3-phosholene; 2-(P-phenylphosphino)phosphole; 2,5-(P-phenylphosphino)phosphole; 2-(P-phenylphosphino)benzophosphole; 7-(P-phenylphosphino)benzophosphole; and 1,8-(P-phenylphosphino)dibenzophosphole.

P Valence Stabilizer #9b: Examples of 5-membered heterocyclic rings containing two phosphorus atoms and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)-1,3-diphospholene; 2,5-(P-phenylphospbino)-1,3-diphospholene; 2-(P-phenyiphosphino)-1,3-diphosphole; 2,5-(P-phenylphosphino)-1,3-diphosphole; 2-(P-phenylphosphino)benzodiphosphole; and 7-(P-phenylphosphino)benzodiphosphole.

P Valence Stabilizer #9c: Examples of 5-membered heterocyclic rings containing three phosphorus atoms and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)-1,3,4-triphosphole; and 2,5-(P-phenylphosphino)-1,3,4-triphosphole.

P Valence Stabilizer #10a: Examples of 6-membered heterocyclic rings containing one phosphorus atom and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)phosphorin; 2,5-(P-phenylphosphino)phosphorin; 2-(P-phenylphosphino)benzophosphorin; 7-(P-phenylphosphino)benzophosphorin; and 1,9-(P-phenylphosphino)acridophosphine.

P Valence Stabilizer #10b: Examples of 6-membered heterocyclic rings containing two phosphorus atoms and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)-4-diphosphorin; 2,6-(P-phenylphosphino)-4-diphosphorin; 2,3,5,6-(P-phenylphosphino)-4-diphosphorin; 2-(P-phenylphosphino)benzo-1,4-diphosphorin; 2,3-(P-phenylphosphino)benzo-1,4-diphosphorin; 2,8-(P-phenylphosphino)benzo-1,4-diphosphorin; 2,3,5,8-(P-phenylphosphino)benzo-1,4-diphosphorin; 1,9-(P-phenylphosphino)dibenzodiphosphorin; and 1,4,6,9-(P-phenylphosphino)dibenzodiphosphorin.

P Valence Stabilizer #10c: Examples of 6-membered heterocyclic rings containing three phosphorus atoms and having at least one additional phosphorus atom binding site not contained in a ring (P Monodentates, P-P Bidentates, P-P Tridentates, P-P Tetradentates, or P-P Hexadentates) that meet the requirements for use as "narrow band" valence stabilizers for $Co^{+3}$ include, but are not limited to: 2-(P-phenylphosphino)-1,3,5-triphosphorin; 2,6-(P-phenylphosphino)-1,3,5-triphosphorin; 4-(P-phenylphosphino)-1,2,3-triphosphorin; and 8-(P-phenylphosphino)benzo-1,2,3-triphosphorin.

P Valence Stabilizer #11a: Examples of 5-membered heterocyclic rings containing one phosphorus atom and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to: 2,2'-bi-1-phospholene; 2,2',2"-tri-1-pholene; 2,2'-bi-3-phospholene; 2,2',2"-tri-3-phospholene; 2,2'-biphosphole; 2,2',2"-triphosphole; and 2,2'-bibenzophosphole.

P Valence Stabilizer #11b: Examples of 5-membered heterocyclic rings containing two phosphorus atoms and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to: 2,2'-bi-1,3-diphospholene; 2,2'-bi-1,3-diphosphole; and 2,2'-bibemzo-1,3-diphosphole.

P Valence Stabilizer #11c: Examples of 5-membered heterocyclic rings containing three phosphorus atoms and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to :2,2'-bi-1,3,4-triphosphole; and 2,2',2"-tri-1,3,4-triphosphole.

P Valence Stabilizer #12a: Examples of 6-membered heterocyclic rings containing one phosphorus atom and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to: 2,2'-biphosphorin; 2,2',2"-triphosphorin; 2,2',2", 2'"-tetraphosphorin; 2,2'-bibenzophosphorin; and 8,8'-bibenzophosphorin.

P Valence Stabilizer #12b: Examples of 6-membered heterocyclic rings containing two phosphorus atoms and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to: 3,3'-bi-1,2-diphosphorin; 3,3',3"-tri-1,2-diphosphorin; 2,2'-bi-1,4-diphosphorin; 2,2',2"-tri-1,4-diphosphorin; 3,3'-bibenzo-1,2-diphosphorin; 8,8'-bibenzo-1,2-diphosphorin; 2,2'-bibenzo-1,4-diphosphorin; and 8,8'-bibenzo-1,4-diphosphorin.

P Valence Stabilizer #12c: Examples of 6-membered heterocyclic rings containing three phosphorus atoms and having at least one additional phosphorus atom binding site contained in a ring (P Monodentates, P-P Bidentates, P-P Tridentates, P-P Tetradentates) that meet the requirements for use as "narrow band" valence stabilizers for $Co^{+3}$ include, but are not limited to: 2,2'-bi-1,3,5-triphosphorin; 2,2',2"-tri-1,3, 5-triphosphorin; 4,4'-bi-1,2,3-triphosphorin; 4,4'-bibenzo-1,2,3-triphosphorin; and 8,8'-bibenzo-1,2,3-triphosphorin.

P Valence Stabilizer #13a: Examples of two-membered macrocyclics, macrobicyclics, and macropolycyclics (including catapinands, cryptands, cyclidenes, and sepulchrates) wherein both binding sites are composed of phosphorus and are not contained in component heterocyclic rings (P-P Bidentates) that meet the requirements for use as "narrow band" valence stabilizers for $Co^{+3}$ include, but are not limited to: P,P-diphenyldiphosphacyclobutane ([4]aneP$_2$); P,P-diphenyldiphosphacyclopentane ([5]aneP$_2$); P,P-diphenyldiphosphacyclohexane ([6]aneP$_2$); P,P-diphenyldiphosphacycloheptane ([7]aneP$_2$); P,P-diphenyldiphosphacyclooctane ([8]aneP$_2$); P,P-diphenyldiphosphacyclobutene ([4]eneP$_2$); P,P-diphenyldiphosphacyclopentene ([5]eneP$_2$); P,P-diphenyldiphosphacyclohexene ([6]eneP$_2$); P,P-diphenyldiphosphacycloheptene ([7]eneP$_2$); and P,P-diphenyldiphosphacyclooctene ([8]eneP$_2$).

P Valence Stabilizer #13b: Examples of three-membered macrocyclics, macrobicyclics, and macropolycyclics (including catapinands, cryptands, cyclidenes, and sepulchrates) wherein all binding sites are composed of phosphorus and are not contained in component heterocyclic rings (P-P Tridentates) that meet the requirements for use as "narrow band" valence stabilizers for $Co^{+3}$ include, but are not limited to: P,P,P-triphenyltriphosphacyclohexane ([6]aneP$_3$); P,P,P-triphenyltriphosphacycloheptane ([7]aneP$_3$); P,P,P-triphenyltriphosphacyclooctane ([8]aneP$_3$); P,P,P-triphenyltriphosphacyclononane ([9]aneP$_3$); P,P,P-triphenyltriphosphacyclodecane ([10]aneP$_3$); P,P,P-triphenyltriphosphacycloundecane ([11]aneP$_3$); P,P,P-triphenyltriphosphacyclododecane ([12]aneP$_3$); P,P,P-triphenyltriphosphacyclohexatriene ([6]trieneP$_3$); P,P,P-triphenyltriphosphacycloheptatriene ([7]trieneP$_3$); P,P,P-triphenyltriphosphacyclooctatriene ([8]trieneP$_3$); P,P,P-triphenyltriphosphacyclononatriene ([9]trieneP$_3$); P,P,P-triphenyltriphosphacyclodecatriene ([10]trieneP$_3$); P,P,P-triphenyltriphosphacycloundecatriene ([11]trieneP$_3$); and P,P,P-triphenyltriphosphacyclododecatriene ([12]trieneP$_3$).

P Valence Stabilizer #13c: Examples of four-membered macrocyclics, macrobicyclics, and macropolycyclics (including catapinands, cryptands, cyclidenes, and sepulchrates) wherein all binding sites are composed of phosphorus and are not contained in component heterocyclic rings (P-P Tetradentates) that meet the requirements for use as "narrow band" valence stabilizers for $Co^{+3}$ include, but are not limited to: P,P,P,P-tetraphenyltetraphosphacyclooctane ([8]aneP$_4$); P,P,P,P-tetraphenyltetraphosphacyclononane ([9]aneP$_4$); P,P,P,P-tetraphenyltetraphosphacyclodecane ([10]aneP$_4$); P,P,P,P-tetraphenyltetraphosphacycloundecane ([11]aneP$_4$); P,P,P,P-tetraphenyltetraphosphacyclododecane ([12]aneP$_4$); P,P,P,P-tetraphenyltetraphosphacyclotridecane ([13]aneP$_4$); P,P,P,P-tetraphenyltetraphosphacyclotetradecane ([14]aneP$_4$); P,P,P,P-tetraphenyltetraphosphacyclopentadecan ([15]aneP$_4$); P,P,P,P-tetraphenyltetraphosphacyclohexadecane ([16]aneP$_4$); P,P,P,P-tetraphenyltetraphosphacycloheptadecan ([17]aneP$_4$); P,P,P,P-tetraphenyltetraphosphacyclooctadecan ([18]aneP$_4$); P,P,P,P-tetraphenyltetraphosphacyclononadecan ([19]aneP$_4$); and P,P,P,P-tetraphenyltetraphosphacycloeicosan ([20]aneP$_4$).

P Valence Stabilizer #13d: Examples of five-membered macrocyclics, macrobicyclics, and macropolycyclics (including catapinands, cryptands, cyclidenes, and sepulchrates) wherein all binding sites are composed of phosphorus and are not contained in component heterocyclic rings (P-P Tridentates, or P-P Tetradentates) that meet the requirements for use as "narrow band" valence stabilizers for $Co^{+3}$ include, but are not limited to: P,P,P,P,P-pentaphenylpentaphosphacyclodecane ([10]aneP$_5$); P,P,P,P,P-pentaphenylpentaphosphacycloundecane ([11]aneP$_5$); P,P,P,P,P-pentaphenylpentaphosphacyclododecane ([12]aneP$_5$); P,P,P,P,P-pentaphenylpentaphosphacyclotridecane ([13]aneP$_5$); P,P,P,P,P-pentaphenylpentaphosphacyclotetradecane ([14]aneP$_5$); and P,P,P,P,P-pentaphenylpentaphosphacyclopentadecane ([15]aneP$_5$).

P Valence Stabilizer #13e: Examples of six-membered macrocyclics, macrobicyclics, and macropolycyclics (including catapinands, cryptands, cyclidenes, and sepulcbrates) wherein all binding sites are composed of phosphorus and are not contained in component heterocyclic rings (P-P-P Tridentates, P-P-P-P Tetradentates, or P-P-P-P-P-P Hexadentates) that meet the requirements for use as "narrow band" valence stabilizers for $Co^{+3}$ include, but are not limited to: P,P,P,P,P,P-hexaphenylhexaphosphacyclododecane ([12]aneP$_6$); P,P,P,P,P,P-hexaphenylhexaphosphacyclotridecane ([13]aneP$_6$); P,P,P,P,P,P-hexaphenylhexaphosphacyclotetradecane ([14]aneP$_6$); P,P,P,P,P,P-hexaphenylhexaphosphacyclopentadecane ([15]aneP$_6$); P,P,P,P,P,P-hexaphenyihexaphosphacyclohexadecane ([16]aneP$_6$); P,P,P,P,P,P-hexaphenylhexapho sphacycloheptadecane ([17]aneP$_6$); P,P,P,P,P,P-hexaphenylhexaphosphacyclooctadecane ([18]aneP$_6$); P,P,P,P,P,P-hexaphenylhexaphosphacyclononadecane ([19]aneP$_6$); P,P,P,P,P,P-hexaphenylhexaphsphacycloeicosane ([20]aneP$_6$); P,P,P,P,P,P-hexaphenylhexaphosphacycloheneicosane ([21]aneP$_6$); P,P,P,P,P,P-hexaphenylhexaphosphacyclodocosane ([22]aneP$_6$); P,P,P,P,P,P-hexaphenylhexaphosphacyclotricosane ([23]aneP$_6$); P,P,P,P,P,P-hexaphenylhexaphosphacyclotetracosan ([24]aneP$_6$).

P Valence Stabilizer #13f: Examples of eight-membered macrocyclics, macrobicyclics, and macropolycyclics (including catapinands, cryptands, cyclidenes, and sepulchrates) wherein all binding sites are composed of phosphorus and are not contained in component heterocyclic rings (P-P Tridentates, P-P Tetradentates, or P-P Hexadentates) that meet the requirements for use as "narrow band" valence stabilizers for $Co^{+3}$ include, but are not limited to: P,P,P,P,P,P,P,P-octaphenyloctaphosphacyclohexadecan ([16]aneP$_8$); P,P,P,P,P,P,P,P-octaphenyloctaphosphacycloheptadecane ([17]aneP$_8$); P,P,P,P,P,P,P,P-octaphenyloctaphosphacyclooctadecane ([18]aneP$_8$); P,P,P,P,P,P,P,P-octaphenyloctaphosphacyclononadecane ([19]aneP$_8$); P,P,P,P,P,P,P,P-octaphenyloctaphsphacycloeicosane ([20]aneP$_8$); P,P,P,P,P,P,P,P-octaphenyloctaphosphacycloheneicosane ([21]aneP$_8$); P,P,P,P,P,P,P,P-octaphenyloctaphosphacyclodocosane ([22]aneP$_8$); P,P,P,P,P,P,P,P-octaphenyloctaphosphacyclotricosan ([23]aneP$_8$); and P,P,P,P,P,P,P,P-octaphenyloctaphosphacyclotetracosan ([24]aneP$_8$).

P Valence Stabilizer #14a: Examples of four-membered macrocyclies, macrobicyclics, and macropolycyclics (including catapinands, cryptands, cyclidenes, and sepulchrates) wherein all four binding sites are composed of phosphorus and are contained in component 5-membered heterocyclic rings (P-P Tetradentates) that meet the requirements for use as "narrow band" valence stabilizers for $Co^{+3}$ include, but are not limited to: tetraphospholenes; tetraphospholes; tetraoxaphospholes; tetradiphospholenes; tetradiphospholes; and tetraoxadiphospholes.

P Valence Stabilizer #14b: Examples of six-membered macrocyclics, macrobicyclics, and macropolycyclics (including catapinands, cryptands, cyclidenes, and sepulchrates) wherein all six binding sites are composed of phosphorus and are contained in component 5-membered heterocyclic rings (P-P Tetradentates and P-P Hexadentates) that meet the requirements for use as "narrow band" valence stabilizers for $Co^{+3}$ include, but are not limited to: hexaphospholenes; hexaphospholes; hexaoxaphospholes; hexadiphospholenes; hexadiphospholes; and hexaoxadiphospholes.

P Valence Stabilizer #14c: Examples of eight-membered macrocyclics, macrobicyclics, and macropolycyclics (including catapinands, cryptands, cyclidenes, and sepulchrates) wherein all eight binding sites are composed of phosphorus and are contained in component 5-membered heterocycic rings (P-P Tridentates; P-P Tetradentates; or P-P Hexadentates) that meet the requirements for use as "narrow band" valence stabilizers for $Co^{+3}$ include, but are not limited to: octaphospholenes; octaphospholes; octaoxaphospholes; octadiphospholenes; octadiphospholes; and octaoxadiphospholes.

P Valence Stabilizer #15a: Examples of four-membered macrocyclics, macrobicyclics, and macropolycyclics (including catapinands, cryptands, cyclidenes, and sepulchrates) wherein all four binding sites are composed of phosphorus and are contained in a combination of 5-membered heterocyclic rings and phosphine groups (P-P Tridentates, P-P Tetradentates) that meet the requirements for use as "narrow band" valence stabilizers for $Co^{+3}$ include, but are not limited to: diphosphatetraphospholenes; tetraphosphatetraphospholenes; diphosphatetraphospholes; tetraphosphatetraphospholes; diphoshatetradiphospholes; and tetraphosphatetradiphospholes.

P Valence Stabilizer #15b: Examples of six-membered macrocyclics, macrobicyclics, and macropolycyclics (including catapinands, cryptands, cyclidenes, and sepulchrates) wherein all six binding sites are composed of phosphorus and are contained in a combination of 5-membered heterocyclic rings and phosphine groups (P-P Tridentates, P-P Tetradentates, and P-P Hexadentates) that meet the requirements for use as "narrow band" valence stabilizers for $Co^{+3}$ include, but are not limited to: diphosphahexaphospholenes; thaphosphahexaphospholenes; diphosphahexaphospholes; triphosphahexaphospholes; diphoshahexadiphospholes; and triphosphahexadiphospholes.

P Valence Stabilizer #15c: Examples of eight-membered macrocyclics, macrobicyclics, and macropolycyclics(including catapinands, cryptands, cyclidenes, and sepulchrates) wherein all eight binding sites are composed of phosphorus and are contained in a combination of 5-membered heterocyclic rings and phosphine groups (P-P Tridentates, P-P Tetradentates, and P-P Hexadentates) that meet the requirements for use as "narrow band" valence stabilizers for $Co^{+3}$ include, but are not limited to: diphosphaoctaphospholenes; tetraphosphaoctaphospholenes; diphosphaoctaphospholes; tetraphosphaoctaphospholes; diphoshaoctadiphospholes; and tetraphosphaoctadiphospholes.

P Valence Stabilizer #16a: Examples of four-membered macrocyclics, macrobicyclics, and macropolycyclics (including catapinands, cryptands, cyclidenes, and sepulchrates) wherein all four binding sites are composed of phosphorus and are contained in component 6-membered heterocyclic rings (P-P Tetradentates) that meet the requirements for use as "narrow band" valence stabilizers for $Co^{+3}$ include, but are not limited to: cyclotetraphosphorins; cyclotetraaoxaphosphorins; cyclotetradiphosphorins; and cyclotetraoxadiphosphorins.

P Valence Stabilizer #16b: Examples of six-membered macrocyclics, macrobicyclics, and macropolycyclics (including catapinands, cryptands, cyclidenes, and sepulchrates) wherein all six binding sites are composed of phosphorus and are contained in component 6-membered heterocyclic rings (P-P Tridentates, P-P Tetradentates, and P-P Hexadentates) that meet the requirements for use as "narrow band" valence stabilizers for $Co^{+3}$ include, but are not limited to: cyclohexaphosphorins; cyclohexaoxaphosphorins; cyclohexadiphosphorins; and cyclohexaoxadiphosphorins.

P Valence Stabilizer #16c: Examples of eight-membered macrocyclics, macrobicyclics, and macropolycyclics (including catapinands, cryptands, cyclidenes, and sepulchrates) wherein all eight binding sites are composed of phosphorus and are contained in component 6-membered heterocyclic rings (P-P Tridentates, P-P Tetradentates, and P-P Hexadentates) that meet the requirements for use as "narrow band" valence stabilizers for $Co^{+3}$ include, but are not limited to: cyclooctaphosphorins; cyclooctaoxaphosphorins; cyclooctadiphosphorins; and cyclooctaoxadiphosphorins.

P Valence Stabilizer #17a: Examples of four-membered macrocyclics, macrobicyclics, and macropolycyclics (including catapinands, cryptands, cyclidenes, and sepulchrates) wherein all four binding sites are composed of phosphorus and are contained in a combination of 6-membered heterocyclic rings and phosphine groups (P-P Tridentates, P-P Tetradentates, or P-P Hexadentates) that meet the requirements for use as "narrow band" valence stabilizers for $Co^{+3}$ include, but are not limited to: diphosphacyclotetraphosphorins; tetraphosphacyclotetraphosphorins; diphosphacyclotetraoxaphosphorins; tetraphosphacyclotetraoxaphosphorins; cliphosphacyclotetradiphosphorins; tetraphosphacyclotetradiphosphorins; diphosphacyclotetraoxadiphosphorins; and tetraphosphacyclotetraoxadiphosphorins.

P Valence Stabilizer #17b: Examples of six-membered macrocyclics, macrobicyclics, and macropolycyclics (including catapinands, cryptands, cyclidenes, and sepulchrates) wherein all six binding sites are composed of phosphorus and are contained in a combination of 6-membered heterocyclic rings and phosphine groups (P-P Tridentates, P-P Tetradentates, or P-P Hexadentates) that meet the requirements for use as "narrow band" valence stabilizers for $Co^{+3}$ include, but are not limited to: diphosphacyclohexaphosphorins; triphosphacyclohexaphosphorins; diphosphacyclohexaoxaphosphorins; triphosphacyclohexaoxaphosphorins; diphosphacyclohexadiphosphorins; triphosphacyclohexadiphosphorins; diphosphacyclohexaoxadiphosphorins; and triphosphacyclohexaoxadiphosphorins.

P Valence Stabilizer #17c: Examples of eight-membered macrocyclics, macrobicyclics, and macropolycyclics (including catapinands, cryptands, cyclidenes, and sepulchrates) wherein all eight binding sites are composed of phosphorus and are contained in a combination of 6-membered heterocyclic rings and phosphine groups (P-P Tridentates, P-P Tetradentates, or P-P Hexadentates) that meet the requirements for use as "narrow band" valence stabilizers for $Co^{+3}$ include, but are not limited to: diphosphacyclooctaphosphorins; tetraphosphacycl ooctaphosphorins; diphosphacyclooctaoxaphosphorins; tetraphosphacyclooctaoxaphosphorins; diphosphacyclooctadiphosphorins; tetraphosphacyclooctadiphosphorins; diphosphacyclooctaoxadiphosphorins; and tetraphosphacyclooctaoxadiphosphorins.

O Valence Stabilizer #1: Examples of biurets (imidodicarbonic diamides), isobiurets, biureas, triurets, triureas, bis(biurets), bis(isobiurets), bis(biureas), poly(biurets), poly(isobiurets), and poly(biureas) (O-O Bidentates, O-O Tridentates, O-O Tetradentates) that meet the requirements for use as "narrow band" valence stabilizers for $Co^{+3}$ include, but are not limited to: biuret, isobiuret, biurea, triuret, triurea, nitrobiuret, dinitrobiuret, aminobiuret, diaminobiuret, oxybiuret, dioxybiuret, cyanobiuret, methylbiuret, ethylbiuret, isopropylbiuret, phenylbiuret, benzylbiuret, cyclohexylbiuret, norbornylbiuret, adamantylbiuret, dimethylbiuret, diethylbiuret, diisopropylbiuret, diphenylbiuret, clibenzylbiuret, dicyclohexylbiuret, dinorbornylbiuret, and diadamantylbiuret.

O Valence Stabilizer #2: Examples of acylureas, aroylureas, bis(acylureas), bis(aroylureas), poly(acylureas), and poly(aroylureas) (O-O Bidentates, O-O Tridentates, O-O Tetradentates) that meet the requirements for use as "narrow band" valence stabilizers for $Co^{+3}$ include, but are not limited to: formylurea, acetylurea, benzoylurea, cyclohexoylurea, pentafluorobenzoylurea, N-methylacetylurea, N-phenylbenzoylurea, and N-cyclohexylcyclohexoylurea.

O Valence Stabilizer #3: Examples of imidodialdehydes, hydrazidodialdehydes (acyl hydrazides), bis(imidodialdehydes), bis(hydrazidodialdehydes), poly(imidodialdehydes), and poly(hydrazidodialdehydes) (O-O Bidentates, O-O Tridentates, O-O Tetradentates) that meet the requirements for use as "narrow band" valence stabilizers for $Co^{+3}$ include, but are not limited to: diacetamide, dipropanamide, dibutanamide, dibenzamide, and dicyclohexamide.

O Valence Stabilizer #4: Examples of imidodicarbonic acids, hydrazidodicarbonic acids, bis(imidodicarbonic acids), bis(hydrazidodicarbonic acids), poly(imidodicarbonic acids), poly(hydrazidodicarbonic acids) and derivatives thereof (O-O Bidentates, O-O Tridentates, O-O Tetradentates) that meet the requirements for use as "narrow band" valence stabilizers for $Co^{+3}$ include, but are not limited to: imidodicarbonic acid, hydrazidodicarbonic acid, O-phenylimidodicarbonic acid, O-benzylimidodicarbonic acid, O-cyclohexylimidodicarbonic acid, O-norbornylimidodicarbonic acid, O,O'-diphenylimidodicarbonic acid, O,O'-dibenzylimidodicarbonic acid, O,O'-dicyclohexylimidodicarbonic acid, and O,O'-dinorbornylimidodicarbonic acid.

O Valence Stabilizer #5: Examples of imidodisulfamic acid, imidodisulfuric acid, bis(imidodisulfamic acid), bis(imidodisulfuric acid), poly(imidodisulfamic acid), and poly(imidodisulfuric acid) and derivatives thereof (O-O Bidentates, O-O Tridentates, O-O Tetradentates) that meet the requirements for use as "narrow band" valence stabilizers for $Co^{+3}$ include, but are not limited to: imidodisulfamic acid, imidodisulfuric acid, N-phenylimidodisulfamic acid, N-benzylimidodisulfamic acid, N-cyclohexylimidodisulfamic acid, N-norbornylimidodisulfamic acid, N,N'-diphenylimidodisulfamic acid, N,N'-dibenzylimidodisulfamic acid, N,N'-dicyclohexylimidodisulfamic acid, and N,N'-norbornylimidodisulfamic acid.

O Valence Stabilizer #6: Examples of 1,3-diketones (beta-diketonates), 1,3,5-triketones, bis(1,3-diketones), and poly(1,3-diketones), all with a molecular weight greater than 125 (O-O Bidentates, O-O Tridentates, O-O Tetradentates) that meet the requirements for use as "narrow band" valence stabilizers for $Co^{+3}$ include, but are not limited to: hexafluoropentanedione; dibenzoylmethane (1,3-diphenyl-1,3-propanedione); benzoylpinacolone; dicyclohexoylmethane; diphenylpentanetrionate; dibenzoylacetone; benzoylacetylacetone; dibenzoylacetylacetone; tetramethylnonanetrionate; hexafluoroheptanetrionate; trifluoroheptanetrionate; trifluoroacetylcamphor (facam); and 1,3-indandione.

O Valence Stabilizer #7: Examples of 1,2-diketones (aipha-diketonates), 1,2,3-triketones, tropolonates, o-quinones, bis(1,2-diketones), and poly(1,2-diketones), all with a molecular weight greater than 100 (O-O Bidentates, O-O Tridentates, O-O Tetradentates) that meet the requirements for use as "narrow band" valence stabilizers for $Co^{+3}$ include, but are not limited to: tropolone; 1,2-benzoquinone (o-quinone); di-tert-butyl-1,2-benzoquinone; hexafluoro-1,2-benzoquinone; 1,2-naphthoquinone; 9,10-phenanthroquinone; and 1,2-indandione.

O Valence Stabilizer #8: Examples of malonamides (malonodiamides), bis(malonamides), and polymalonamides (O-O Bidentates, O-O Tridentates, O-O Tetradentates) that meet the requirements for use as "narrow band" valence stabilizers for $Co^{+3}$ include, but are not limited to: malonamide, N-phenylmalonamide, N-benzylmalonamide, N-pentafluorophenylmalonamide, N-cyclohexylmalonamide, N-norbornylmalonamide, N,N'-diphenylmalonamide, N,N'-dibenzylmalonamide, N,N'-dipentafluorophenylmalonamide, N,N'-dicyclohexylmalonamide, and N,N'-norbornylmalonamide.

O Valence Stabilizer #9: Examples of 2-acylacetamides, bis(2-acylacetamides), and poly(2-acylacetamides) (O-O Bidentates, O-O Tridentates, O-O Tetradentates) that meet the requirements for use as "narrow band" valence stabilizers for $Co^{+3}$ include, but are not limited to: 2-acetoacetamide, N-phenyl-2-acetoacetamide, N-pentafluorophenyl-2-acetoacetamide, N-benzyl-2-acetoacetamide, N-cyclohexyl-2-acetoacetamide, N-norbornyl-2-acetoacetamide, N-phenyl-2-benzoacetamide, N-pentafluorophenyl-2-pentafluorobenzoacetamide, and N-cyclohexyl-2-cyclohexoacetamide.

O Valence Stabilizer #10: Examples of monothiodicarbonic diamides, bis(monothiodicarbonic diamides), and poly(monothiodicarbonic diamides) (O-O Bidentates, O-O Tridentates, O-O Tetradentates) that meet the requirements for use as "narrow band" valence stabilizers for $Co^{+3}$ include, but are not limited to: monothiodicarbonic diamide; N-phenylmonothiodicarbonic diamide; N-pentafluorophenylmonothiodicarbonic diamide; N-benzylmonothiodi carbonic diamide; N-cyclohexylmonothiodi carbonic diamide; N-norbornylmonothiodicarbonic diamide; N,N'-diphenylmonothiodicarbonic diamide; N,N'-dipentafluorophenylmonothiodicarbonic diamide; N,N'-dibenzylmonothiodicarbonic diamide; N,N'-dicyclohexylmonothiodicarbonic diamide; and N,N'-dinorbornylmonothiodicarbonic diamide.

O Valence Stabilizer #11: Examples of monothiodicarbonic acids, bis(monothiodicarbonic acids), poly(monothiodicarbonic acids), and derivatives thereof (O-O Bidentates, O-O Tridentates, O-O Tetradentates) that meet the requirements for use as "narrow band" valence stabilizers for $Co^{+3}$ include, but are not limited to: monothiodicarbonic acid, O-phenylmonothiodicarbonic acid, O-benzylmonothiodicarbonic acid, O-cyclohexylmonothiodicarbonic acid, O-norbornylmonothiodicarbonic acid, O,O'-diphenylmonothiodicarbonic acid, O,O'-dibenzylmonothiodicarbonic acid, O,O'-dicyclohexylmonothiodicarbonic acid, and O,O'-dinorbornylmonothiodicarbonic acid.

O Valence Stabilizer #12: Examples of dithioperoxydicarbonic acids, bis(dithioperoxydicarbonic acids), poly(dithioperoxydicarbonic acids), and derivatives thereof (O-O Bidentates, O-O Tridentates, O-O Tetradentates) that meet the requirements for use as "narrow band" valence stabilizers for $Co^{+3}$ include, but are not limited to: dithioperoxydicarbonic acid, O-phenyldithioperoxydicarbonic acid; O-benzyldithioperoxydicarbonic acid; O-cyclohexyldithioperoxydicarbonic acid; O-norbornyldithioperoxydicarbonic acid; O,O'-diphenyldithioperoxydicarbonic acid; O,O'-dibenzyldithioperoxydicarbonic acid; O,O'-dicyclohexyldithioperoxydicarbonic acid; and O,O'-dinorbornyldithioperoxydicarbonic acid.

O Valence Stabilizer #13: Examples of trithionic acid, bis(trithionic acid), poly(trithionic acid), and derivatives thereof (O-O Bidentates, O-O Tridentates, O-O Tetradentates) that meet the requirements for use as "narrow band" valence stabilizers for $Co^{+3}$ include, but are not limited to: diphenyl trithionate, dipentafluorodiphenyl trithionate, dicyclohexyl trithionate, and dinorbornyl trithionate.

O Valence Stabilizer #14: Examples of hypophosphoric acids, bis(hypophosphoric acids), and poly(hypophosphoric acids), and derivatives thereof (O-O Bidentates, O-O Tridentates, O-O Tetradentates) that meet the requirements for use as "narrow band" valence stabilizers for $Co^{+3}$ include, but are not limited to: hypophosphoric acid, O-methylhypophosphoric acid, O-isopropyihypophosphoric acid, O-tert-butylhypophosphoric acid, O-phenyihypophosphoric acid, O-pentafluorophenyihypophosphoric acid, O-benzylhypophosphoric acid, O-cyclohexyihypophosphoric acid, O-norbornylhypophosphoric acid, O,O'-dimethylhypophosphoric acid, O,O'-diisopropylhypophosphoric acid, O,O'-di-tert-butylhypophosphoric acid, O,O'-diphenyihypophosphoric acid, O,O'-di-pentafluorophenylhypophosphoric acid, O,O'-dibenzylhypophosphoric acid, O,O'-dicyclohexylhypophosphoric acid, and O,O'-dinorbornyihypophosphoric acid.

O Valence Stabilizer #15: Examples of hypophosphoramides, bis(hypophosphoramides), and poly(hypophosphoramides) (O-O Bidentates, O-O Tridentates, O-O Tetradentates) that meet the requirements for use as "narrow band" valence stabilizers for $Co^{+3}$ include, but are not limited to: hypophosphoramide, N-methylhypophosphoramide, N-isopropylhypophosphoramide, N-tert-butylhypophosphoramide, N-phenylhypophosphoramide, N-pentafluorophenylhypophosphoramicle, N-benzylhypophosphoramide, N-cyclohexylhypophosphoramide, N-norbomylhypophosphoramide, N,N'''-dimethylhypophosphoramide, N,N'''-diisopropylhypophosphoramide, N,N'''-di-tert-butylhypophosphoramide, N,N'''-diphenylhypophosphoramide, N,N'''-di-pentafluorophenylhypophosphoramide, N,N'''-dibenzylhypophosphoramide, N,N'''-dicyclohexylhypophosphoramide, and N,N'''-dinorbornylhypophosphoramide.

O Valence Stabilizer #16: Examples of imidodiphosphoric acids, hydrazidodiphosphoric acids, bis(imidodiphosphoric acids), bis(hydrazidodiphosphoric acids), poly(imidodiphosphoric acids), poly(hydrazidodiphosphoric acids), and derivatives thereof (O-O Bidentates, O-O Tridentates, O-O Tetradentates) that meet the requirements for use as "narrow band" valence stabilizers for $Co^{+3}$ include, but are not limited to: imidodiphosphoric acid, methylimidodiphosphoric acid, isopropylimidodiphosphoric acid, tert-butylimidodiphosphoric acid, phenylimidodiphosphoric acid, pentafluorophenylimidodiphosphoric acid, benzylimidodiphosphoric acid, cyclohexylimidodiphosphoric acid, norbornylimidodiphosphoric acid, dimethylimidodiphosphoric acid, diisopropylimidodiphosphoric acid, di-tert-butylimidodiphosphoric acid, diphenylimidodiphosphoric acid, di-pentafluorophenylimidodiphori c acid, dibenzylimidodiphosphoric acid, dicyclohexylimidodiphosphoric acid, and dinorbornylimidodiphosphoric acid.

O Valence Stabilizer #17: Examples of imidodiphosphoramides, hydrazidodiphosphoramides, bis(imidodiphosphoramides), bis(hydrazidodiphosphoramides), poly(imidodiphosphoramides), and poly(hydrazidodiphosphoramides) (O-O Bidentates, O-O Tridentates, O-O Tetradentates) that meet the requirements for use as "narrow band" valence stabilizers for $Co^{+3}$ include, but are not limited to: imidodiphosphoramide, N-methylimidodiphosphoramide, N-isopropylimidodiphosphoramide, N-tert-butylimidodiphosphoramide, N-phenylimidodiphosphoramide, N-pentafluorophenylimidodiphosphoramide, N-benzylimidodiphosphoramide, N-cyclohexylimidodiphosphoramide, N-norbornylimidodiphosphoramide, N,N'''-dimethylimidodiphosphoramide, N,N'''-diisopropylimidodiphosphoramide, N,N'''-di-tert-butylimidodiphosphoramide, N,N'''-diphenylimidodiphosphoramide, N,N'''-di-pentafluorophenylimidodiphosphoramide, N,N'''-dibenzylimidodiphosphoramide, N,N'''-dicyclohexylimidodiphosphoramide, and N,N'''-dinorbornylimidodiphosphoramide.

O Valence Stabilizer #18: Examples of diphosphoramides, bis(diphosphoramides), and poly(diphosphoramides) (O-O Bidentates, O-O Tridentates, O-O Tetradentates) that meet the requirements for use as "narrow band" valence stabilizers for $Co^{+3}$ include, but are not limited to: diphosphoramide, N-methyldiphosphoramide, N-isopropyldiphosphoramide, N-tert-butyldiphosphoramide, N-phenyldiphosphoramide, N-pentafluorophenyldiphosphoramide, N-berizyldiphosphoramide, N-cyclohexyldiphosphoramide, N-norbornyldiphosphoramide, N,N'''-dimethyldiphosphoramide, N,N'''-diisopropyldiphosphoramide, N,N'''-di-tert-butyldiphosphoramide, N,N'''-diphenyldiphosphoramide, N,N'''-di-pentafluorophenyldiphosphoramide, N,N'''-dibenzyldiphosphoramide, N,N'''-dicyclohexyldiphosphoramide, and N,N'''-dinorbornyldiphosphoramide.

O Valence Stabilizer #19: Examples of imidodiphosphonic acids, hydrazidodiphosphonic acids, bis(imidodiphosphonic acids), bis(hydrazidodiphosphonic acids), poly(imidodiphosphonic acids), poly(hydrazidodiphosphonic acids), and derivatives thereof (O-O Bidentates, O-O Tridentates, O-O Tetradentates) that meet the requirements for use as "narrow band" valence stabilizers for $Co^{+3}$ include, but are not limited to: imidodiphosphonic acid, methylimidodiphosphonic acid, isopropylimidodiphosphonic acid, tert-butylimidodiphosphonic acid, phenylimidodiphosphonic acid, pentafluorophenylimidodiphosphonic acid, benzylimidodiphosphonic acid, cyclohexylimidodiphosphonic acid, norbomylimidodiphosphonic acid, dimethylimidodiphosphonic acid, diisopropylimidodiphosphonic acid, di-tert-butylimidodiphosphonic acid, diphenylimidodiphosphonic acid, di-pentafluorophenylimidodiphosphonic acid, dibenzylimidodiphosphonic acid, dicyclohexylimidodiphosphonic acid, and dinorbornylimidodiphosphonic acid. [Note: The phosphite ($P^{+3}$) valence of the phosphorus atom makes stabilizization of high valence metal ions much more difficult, though still possible.]

O Valence Stabilizer #20: Examples of imidodiphosphonamides, hydrazidodiphosphonamides, bis(imidodiphosphonamides), bis(hydrazidodiphosphonamides), poly(imidodiphosphonamides), and poly(hydrazidodiphosphonamides) (O-O Bidentates, O-O Tridentates, O-O Tetradentates) that meet the requirements for use as "narrow band" valence stabilizers for $Co^{+3}$ include, but are not limited to: imidodiphosphonamide, N-methylimidodiphosphonamide, N-isopropylimidodiphosphonamide, N-tert-butylimidodiphosphonamide, N-phenylimidodiphosphonamide, N-pentafluorophenylimidodiphosphonamide, N-benzylimidodiphosphonamide, N-cyclohexylimidodiphosphonamide, N-norbornylimidodiphosphonamide, N,N'''-dimethylimidodiphosphonamide, N,N'''-diisopropylimidodiphosphonamide, N,N'''-di-tert-butylimidodiphosphonamide, N,N'''-diphenylimidodiphosphonamide, N,N'''-di-pentafluorophenylimidodiphosphonamide, N,N'''-dibenzylimidodiphosphonamide, N,N'''-dicyclohexylimidodiphosphonamide, and N,N'''-dinorbornylimidodiphosphonamide. [Note: The phosphite ($P^{+3}$) valence of the phosphorus atom makes stabilizization of high valence metal ions much more difficult, though still possible.]

O Valence Stabilizer #21: Examples of diphosphonamides, bis(diphosphonamides), and poly(diphosphonamides) (O-O Bidentates, O-O Tridentates, O-O Tetradentates) that meet the requirements for use as "narrow band" valence stabilizers for $Co^{+3}$ include, but are not limited to: diphosphonamide, N-methyldiphosphonamide, N-isopropyldiphosphonamide, N-tert-butyldiphosphonamide, N-phenyldiphosphonamide, N-pentafluorophenyldiphosphonamide, N-benzyldiphosphonamide, N-cyclohexyldiphosphonamide, N-norbornyldiphosphonamide, N,N'''-dimethyldiphosphonamide, N,N'''-diisopropyldiphosphonamide, N,N''''-di-tert-butyldiphosphonamide, N,N''''-diphenyldiphosphonamide, N,N''''-di-pentafluorophenyldiphosphonamide, N,N''''-dibenzyldiphosphonamide, N,N'''-dicyclohexyldiphosphonamide, and N,N'''-dinorbornyldiphosphonamide. [Note: The phosphite ($P^{+3}$) valence of the phosphorus atom makes stabilization of high valence metal ions much more difficult, though still possible.]

O Valence Stabilizer #22: Examples of beta-hydroxyketones, beta-hydroxyaldehydes, bis(beta-hydroxyketones), bis(beta-hydroxyaldehydes), poly(beta-hydroxyketones), and poly(beta-hydroxyaldehydes) (O-O Bidentates, O-O Tridentates, O-O Tetradentates) that meet the requirements for use as "narrow band" valence stabilizers for $Co^{+3}$ include, but are not limited to: 4-hydroxypentan-2-one; 1,3-diphenyl-3-hydroxypropanal; 1,3-dibenzyl-3-hydroxypropanal; 1,3-dicyclohexyl-3 -hydroxypropanal; 1,3-dinorbornyl-3 -hydroxypropanal; 1,3-di(2-thienyl)-3-hydroxypropanal; 1,3-di(2-furyl)-3-hydroxypropanal; o-hydroxyacetophenone; juglone; alizarin; 1-hydroxyanthraquinone; 1,8-hydroxyanthraquinone; 1-hydroxyacridone; and beta-hydroxybenzophenone.

O Valence Stabilizer #23: Examples of N-(aminomethylol) ureas [N-(aminohydroxymethyl)ureas], bis[N-(aminomethylol)ureas], and poly[N-(aminomethylol)ureas] (O-O Bidentates, O-O Tridentates, O-O Tetradentates) that meet the requirements for use as "narrow band" valence stabilizers for $Co^{+3}$ include, but are not limited to: N'-(aminohydroxymethyl)urea; N,N''-dimethyl-N'-(aminohydroxymethyl)urea; N,N'-diethyl-N'-(aminohydroxymethyl)urea; N,N''-isopropyl-N'-(aminohydroxymethyl)urea; N,N''-diphenyl-N'-(aminohydroxymethyl)urea; N,N''-dibenzyl-N'-(aminohydroxymethyl)urea; N,N''-dicyclohexyl-N'-(aminohydroxymethyl)urea; and N,N''-dinorbornyl-N'-(aminohydroxymethyl)urea.

O Valence Stabilizer #24: Examples of oxamides, bis(oxamides), and poly(oxamides) (O-O Bidentates, O-O Tridentates, O-O Tetradentates) that meet the requirements for use as "narrow band" valence stabilizers for $Co^{+3}$ include, but are not limited to: oxamide, N-methyloxamide; N-ethyloxamide; N-isopropyloxamide; N-phenyloxamide; N-benzyloxamide; N-cyclohexyloxamide; N-norbornyloxamide; N,N'-dimethyloxamide; N,N'-diethyloxamide; N,N'-diisopropyloxamide; N,N'-diphenyloxamide; N,N'-dibenzyloxamide; N,N'-dicyclohexyloxamide; and N,N'-dinorbornyloxamide.

O Valence Stabilizer #25: Examples of squaric acids and derivatives thereof (O-O Bidentates) that meet the requirements for use as "narrow band" valence stabilizers for $Co^{+3}$ include, but are not limited to: deltic acid; squaric acid; croconic acid; and rhodizonic acid.

O Valence Stabilizer #26: Examples of dicarboxylic acids, bis(dicarboxylic acids), poly(dicarboxylic acids), and derivatives thereof (O-O Bidentates and O-O Tetradentates) that meet the requirements for use as "narrow band" valence stabilizers for $Co^{+3}$ include, but are not limited to: oxalic acid; malonic acid; succinic acid; diphenyl oxalate; diphenyl malonate; and diphenyl succinate.

O Valence Stabilizer #27: Examples of carbonates and bis(carbonates) (O-O Bidentates and O-O Tetradentates) that meet the requirements for use as "narrow band" valence stabilizers for $Co^{+3}$ include, but are not limited to: carbonate; bicarbonate; O,O-diethylcarbonate; diisopropylcarbonate; diphenylcarbonate; dibenzylcarbonate; dicyclohexylcarbonate; and dinorbornylcarbonate.

O Valence Stabilizer #28: Examples of carbamates, bis(carbamates), and poly(carbamates) (including N-hydroxycarbamates and N-mercaptocarbamates) (O-O Bidentates, O-O Tridentates, and O-O Tetradentates) that meet the requirements for use as "narrow band" valence stabilizers for $Co^{+3}$ include, but are not limited to: dimethylcarbamate (dmc); di(trifluorodimethyl)carbamate; ethyl carbamate; diethylcarbamate (dec); dipropylcarbamate; diisopropylcarbamate; dibutylcarbamate; ditertbutylcarbamate; dicyanamidocarbamate; diphenylcarbamate; di(pentafluorophenyl)carbamate; dibenzylcarbamate; dinaphthylcarbamate; dicyclohexylcarbamate; dinorbornylcarbamate; diadamantylcarbamate; pyrrolidinocarbamate (pyrc); piperidinocarbamate (pipc); morpholinocarbamate (morc); thiamorpholinocarbamate; 3-pyrrolinocarbamate; pyrrolocarbamate; oxazolocarbamate; isoxazolocarbamate; thiazolocarbamate; isothiazolocarbamate; indolocarbamate; carbazolocarbamate; pyrazolinocarbamate; imidazolinocarbamate; pyrazolocarbamate; imidazolocarbamate; indazolocarbamate; and triazolocarbamate.

O Valence Stabilizer #29: Examples of carbazates (carbazides), bis(carbazates), and poly(carbazates) (O-O Bidentates, O-O Tridentates, and O-O Tetradentates; or possibly N-O Bidentates, N-O Tridentates, and N-O Tetradentates) that meet the requirements for use as "narrow band" valence stabilizers for $Co^{+3}$ include, but are not limited to: N,N'-dimethylcarbazate; N,N'-di(trifluoromethyl)carbazate; N,N'-diethylcarbazate; N,N'-diphenylcarbazate; N,N'-dibenzylcarbazate; N,N'-di(pentafluorophenyl)carbazate; N,N'-dicyclohexylcarbazate; and N,N'-dinorbornylcarbazate.

O Valence Stabilizer #30: Examples of carbimates, bis(carbimates), and poly(carbimates) (O-O Bidentates, O-O Tridentates, and O-O Tetradentates) that meet the requirements for use as "narrow band" valence stabilizers for $Co^{+3}$ include, but are not limited to: methylcarbimate; trifluoromethylcarbimate; ethylcarbimate; propylcarbimate; isopropylcarbimate; butylcarbimate; tertbutylcarbimate; cyanocarbimate; cyanamidocarbimate; azidocarbimate; phenylcarbimate; pentafluorophenylcarbimate; benzylcarbimate; naphthylcarbimate; cyclohexylcarbimate; norbornylcarbimate; and adamantylcarbimate. [Note: Carbimates tend to stabilize lower oxidation states in metal ions.]

O Valence Stabilizer #31: Examples of arsonic acids, bis(arsonic acids), poly(arsonic acids), and derivatives thereof (O-O Bidentates, O-O Tridentates, O-O Tetradentates) that meet the requirements for use as "narrow band" valence stabilizers for $Co^{+3}$ include, but are not limited to: arsonic acid, O-phenylarsonic acid, O-benzylarsonic acid, O-cyclohexylarsonic acid, O-norbornylarsonic acid, O,O-diphenylarsonic acid, O,O-dibenzylarsonic acid, O,O-dicyclohexylarsonic acid, O,O-dinorbornylarsonic acid; and aminophenylarsonic acids.

O Valence Stabilizer #32: Examples of alkyl- and arylborates and bis(borates) (O-O Bidentates and O-O Tetradentates) that meet the requirements for use as "narrow band" valence stabilizers for $Co^{+3}$ include, but are not limited to: triethyl borate; diisopropyl borate; diphenyl borate; dibenzyl borate; dicyclohexyl borate; and dinorbornyl borate.

O Valence Stabilizer #33: Examples of alkyl- and arylboronates and bis(boronates) (O-O Bidentates and O-O Tetradentates) that meet the requirements for use as "narrow band" valence stabilizers for $Co^{+3}$ include, but are not limited to: diethyl boronate; diisopropyl boronate; diphenyl boronate; dibenzyl boronate; dicyclohexyl boronate; and dinorbornyl boronate. [Note: boronates tend to stabilize lower oxidation states in metal ions.]

O Valence Stabilizer #34: Examples of phosphine P-oxides and amino-substituted phosphine oxides (O Monodentates) that meet the requirements for use as "narrow band" valence stabilizers for $Co^{+3}$ include, but are not limited to: trimethylphosphine oxide (TMPO); triethylphosphine oxide (TEPO); triphenyiphosphine oxide (TPhPO); tribenzylphosphine oxide (TBzPO); tricyclohexyiphosphine oxide (TcHxPO); and trinorbornyiphosphine oxide for phosphine P-oxides; and hexamethyiphosphoramide (HMPA); trimorpholinophosphine oxide (TMrPO); tripiperidinophosphine oxide; tripyrrolidinophosphine oxide; and tri(cyclohexylamino)phosphine oxide for amino-substituted phosphine oxides.

O Valence Stabilizer #35: Examples of arsine As-oxides and amino-substituted arsine oxides (O Monodentates) that meet the requirements for use as "narrow band" valence stabilizers for $Co^{+3}$ include, but are not limited to: trimethylarsine oxide (TMAsO); triethylarsine oxide (TEAsO); triphenylarsine oxide (TPhAsO); tribenzylarsine oxide (TBzAsO); tricyclohexylarsine oxide (TcHxAsO); and trinorbornylarsine oxide for arsine As-oxides; and hexamethylarsonamide; trimorpholinoarsine oxide; tripiperidinoarsine oxide; tripyrrolidinoarsine oxide; and tri(cyclohexylamino)arsine oxide for amino-substituted arsine oxides.

O Valence Stabilizer #36: Examples of cyanate ligands (O monodentates) that meet the requirements for use as "narrow band" valence stabilizers for $Co^{+3}$ include, but are not limited to: cyanate (—OCN).

N-S Valence Stabilizer #1: Examples of thioimidates, dithioimidates, polythioimidates, and derivatives of thioimidic acid (N-S bidentates and N-S tetradentates) that meet the requirements for use as "narrow band" valence stabilizers for $Co^{+3}$ include, but are not limited to: S-methyl formathioimidate; S-ethyl formathioimidate; S-methyl acetathioimidate; S-ethyl acetathioimidate; S-methyl benzthioimidate; S-ethyl benzthioimidate; S-methyl cyclohexylthioimidate; S-ethyl cyclohexylthioimidate; S-methyl pentafluorobenzthioimidate; S-ethyl pentafluorobenzthioimidate; S-methyl 2-pyridylthioimidate; S-ethyl 2-pyridylthioimidate; S,S'-dimethyl benzdithioimidate; S,S'-dimethyl tetrafluorobenzdithioimidate; 2-iminothiolane; and 2-iminotetrahydrothiopyran. [Note: Many thioimidate complexes are decomposed by water, but their stability can be enhanced through the use of fluorinated solubility control anions (e.g. $PF_6$).]

N-S Valence Stabilizer #2: Examples of thioguanylureas, guanidinothioureas, bis(thioguanylureas), bis(guanidinothioureas, poly(thioguanylureas), and poly(guanidinothioureas) (N-S Bidentates and N-S Tetradentates) that meet the requirements for use as "narrow band" valence stabilizers for $Co^{+3}$ include, but are not limited to: thioguanylurea (amidinothiourea); guanidinothiourea; methylthioguanylurea; ethylthioguanylurea; isopropylthioguanylurea; butylthioguanylurea; benzylthioguanylurea; phenyithioguanylurea; tolyithioguanylurea; naphthylthioguanylurea; cyclohexylthioguanylurea; norbornyithioguanylurea; adamantyithioguanylurea; dimethylthioguanylurea; diethylthioguanylurea; diisopropylthioguanylurea; dibutyithioguanylurea; dibenzylthioguanylurea; diphenylthioguanylurea; ditolyithioguanylurea; dinaphthylthioguanylurea; dicyclohexylthioguanylurea; dinorbornylthioguanylurea; diadamantylthioguanylurea; ethylenebis(thioguanylurea); propylenebis(thioguanylurea); phenylenebis(thioguanylurea); piperazinebis(thioguanylurea); oxalylbis(thioguanylurea); malonylbis(thioguanylurea); succinylbis(thioguanylurea); and phthalylbis(thioguanylurea). [Note: thioguanylureas generally tend to favor lower oxidation states in complexed metals.]

N-S Valence Stabilizer #3: Examples of amidinothioamides, guanidinothioamides, bis(amidinothioamides), bis(guanidinothioamides), poly(amidinothioamides), and poly(guanidinothioamides) (including both N-amidinothioamides and 2-amidinothioacetamides) (N-S Bidentates, N-S Tridentates, and N-S Tetradentates) that meet the requirements for use as "narrow band" valence stabilizers for $Co^{+3}$ include, but are not limited to: amidinothioacetamide; guanidinothioamide, amidinothiopropanamide; amidinothiobutanamide; amidinothiobenzamide; amidinothiotoluamide; amidinothiocyclohexamide; N-methylamidinothioacetamide; N-ethylamidinothiopropanamide; N-propylamidinothiobutanamide; N-phenylamidinothiobenzamide; N-tolylamidinothiotoluamide; N-cyclohexylamidinothiocyclohexamide; bis(amidinothiooxamide); bis(amidinothiomalonamide); bis(amidinothiosuccinamide); bis(amidinothiophthalamide); 2-amidinothioacetamide (thiomalonamamidine); N-methyl-2-amidinothioacetamide; N-ethyl-2-amidinothioacetamide; N-phenyl-2-amidinothioacetamide; N-benzyl-2-amidinothioacetamide; N-cyclohexyl-2-amidinothioacetamide; N,N'-dimethyl-2-amidinothioacetamide; N,N'-diethyl-2-amidinothioacetamide; N,N'-diphenyl-2-amidinothioacetamide; N,N'-dibenzyl-2-amidinothioacetamide; and N,N'-dicyclohexyl-2-amidinothioacetamide. [Note: amidinothioamides generally tend to favor lower oxidation states in complexed metals.]

N-S Valence Stabilizer #4: Examples of imidoylthioamides, bis(imidoylthioamides), and poly(imidoylthioamides) (N-S Bidentates, N-S Tridentates, and N-S Tetradentates) that meet the requirements for use as "narrow band" valence stabilizers for $Co^{+3}$ include, but are not limited to: acetimidoylthioacetamide; acetimidoylthiopropanamide; acetimidoylthiobutanamide; acetimidoylthiobenzamide; acetimidolyithiotoluamide; acetimidoylthiocyclohexamide; propimidoylthiopropanamide; butimidoylthiobutanamide; benzimidoylthiobenzamide; ethylenebis(acetimidoylthioacetamide); propylenebis(acetimidoylthioacetamide); and phenylenebis(acetimidoylthioacetamide). [Note: imidoylthioamides generally tend to favor lower oxidation states in complexed metals.]

N-S Valence Stabilizer #5: Examples of thioureas, bis(thioureas), and poly(thioureas), including thiourylene complexes (N-S bidentates and N-S tetradentates) that meet the requirements for use as "narrow band" valence stabilizers for $Co^{+3}$ include, but are not limited to: thiourea; methyithiourea; ethylthiourea; isopropyithiourea; benzylthiourea; phenylthiourea; cyclohexylthiourea; naphthylthiourea (ntu); biphenyithiourea; norbornylthiourea; adamantylthiourea; N,N'-dimethyithiourea; N,N'-diethylthiourea; N,N'-diisopropylthiourea; N,N'-dibenzylthiourea; N,N'-dicyclohexylthiourea; N,N'-dinapthylthiourea; N,N'-dibiphenyithiourea; N,N'-dinorbomylthiourea; N,N'-diadamantylthiourea; tetramethylthiourea; ethylenethiourea (2-imidazolidinethione)(etu); 4,5-dihydroxy-2-imidazolinethione (dhetu); propylenethiourea; N-(thiazol-2-yl)thiourea; diphenylphosphinothioyl thioureas; allylthiourea; N-allyl-N'-pyridylthiourea; N-allyl-N'-anisyithiourea; N-allyl-N'-naphthylthiourea; N-allyl-N'-phenylthiourea; thioglycoluril (acetylenethiourea); and bis(pyridylmethyl)thiourea. [Note: thioureas generally tend to favor lower oxidation states in complexed metals.]

N-S Valence Stabilizer #6: Examples of thiocarboxamides, bis(thiocarboxamides), and poly(thiocarboxamides), (N-S bidentates, N-S tridentates, and N-S tetradentates) that meet the requirements for use as "narrow band" valence stabilizers for $Co^{+3}$ include, but are not limited to: thiocarbamide (tu); thioacetamide (taa); thiopropionamide; thiobutanamide; thiobenzamide (1-phenylthioformamide)(tba); 1-naphthylthioformamide); 1-cyclohexyithioformamide); 1-norbornyithioformamide; 1-adamantylthiofonnamide; N,N-dimethylthioformamide; N,N-dimethylthioacetamide; pyridine-2-thiocarboxamide (thiopicolinamide); pyrazine-2,3-dithiocarboxamide; thionicotinamide; 2-thiophenethiocarboxamide; N,N-dimethylthiobenzamide; N-ethylthiocarbamide (N-etu); tetramethylthiocarbamide (tmtu); 2-thioacetamidothiazole (tatz); and polythioacrylamides. [Note: thiocarboxamides generally tend to favor lower oxidation states in complexed metals.]

N-S Valence Stabilizer #7: Examples of imidosulfurous diamides and bis(imidosulfurous diamides) (N-S Bidentates, N-S Tridentates, and N-S Tetradentates) that meet the requirements for use as "narrow band" valence stabilizers for $Co^{+3}$ include, but are not limited to: N,N'-diphenylimidosulfurous diamide; N,N'-dibenzylimidosulfurous diamide; and phenylenebis(imidosulfurous diamide). [Note: These complexes tend to hydrolyze unless stabilized with a fluorinated anionic solubility control agent. The sulfite ($S^{+4}$) valence of the sulfur atom makes stabilizization of high valence metal ions much more difficult, though still possible.]

N-S Valence Stabilizer #8: Examples of sulfurdiimines, bis(sulfurdiimines), and poly(sulfurdiimines) (N-S Bidentates, N-S Tridentates, and N-S Tetradentates) that meet the requirements for use as "narrow band" valence stabilizers for $Co^{+3}$ include, but are not limited to: N,N'-diphenylsulfurdiimine; N,N'-dibenzylsulfurdiimine; and phenylenebis(sulfurdiimine). [Note: These complexes tend to hydrolyze unless stabilized with a fluorinated anionic solubility control agent. The sulfite ($S^{+4}$) valence of the sulfur atom makes stabilizization of high valence metal ions much more difficult, though still possible.]

N-S Valence Stabilizer #9: Examples of phosphonimidothioic acid, phosphonimidodithioic acid, bis(phosphonimidothioic acid); bisQthosphonimidodithioic acid), and derivatives thereof (N-S Bidentates, N-S Tetradentates) that meet the requirements for use as "narrow band" valence stabilizers for $Co^{+3}$ include, but are not limited to: phosphonimidothioic acid, phosphonimidodithioic acid; O-phenylphosphonimidothioic acid; O-benzylphosphonimidothioic acid; O-cyclohexylphosphonimidothioic acid; O-norbornylphosphonimidothioic acid; S-phenylphosphonimidodithioic acid; S-benzylphosphonimidodithioic acid; S-cyclohexylphosphonimidodithioic acid; and S-norbornylphosphonimidodithioic acid. [Note: The phosphite ($P^{+3}$) valence of the phosphorus atom makes stabilizization of high valence metal ions much more difficult, though still possible.]

N-S Valence Stabilizer #10: Examples of phosphonothioic diamides, bis(phosphonothioic diamides), and poly(phosphonothioic diamides) (N-S Bidentates and N-S Tetradentates) that meet the requirements for use as "narrow band" valence stabilizers for $Co^{+3}$ include, but are not limited to: phosphonothioic diamide, phosphonothioic dihydrazide, phosphonamidothioic hydrazide, N-phenylphosphonothioic diamide, N-benzylphosphonothioic diamide, N-cyclohexylphosphonothioic diamide, and N-norbomylphosphonothioic diamide. [Note: The phosphite ($P^{+3}$) valence of the phosphorus atom makes stabilizization of high valence metal ions much more difficult, though still possible.]

N-S Valence Stabilizer #11: Examples of phosphonamidothioic acid, phosphonamidimidodithioic acid, bis(phosphonamidothioic acid), bis(phosphonamidimidodithioic acid), poly(phosphonamidothioic acid), and poly(phosphonamidimidodithioic acid), and derivatives thereof (N-S Bidentates and N-S Tetradentates) that meet the requirements for use as "narrow band" valence stabilizers for $Co^{+3}$ include, but are not limited to: phosphonamidothioic acid, phosphonamidimidodithioic acid, phosphonohydrazidodithioic acid, phosphonohydrazidothioic acid, S-phenylphosphonamidimidodithioic acid, S-benzylphosphonamidimidodithioic acid, 5-cyclohexylphosphonamidimidodithioic acid, and S-norbornylphosphonamidimidodithioic acid. [Note: The phosphite ($P^{+3}$) valence of the phosphorus atom makes stabilizization of high valence metal ions much more difficult, though still possible.]

N-S Valence Stabilizer #12: Examples of beta-aminothiones (N-substituted 3-amino-2-propenethioaldehydes), bis(beta-aminothiones), and poly(beta-aminothiones) (N-S Bidentates and N-S Tetradentates) that meet the requirements for use as "narrow band" valence stabilizers for $Co^{+3}$ include, but are not limited to: 4-methylamino-3-penten-2-thione; 4-ethylamino-3-penten-2-thione; 4-isopropylamino-3-penten-2-thione; 4-phenylamino-3-penten-2-thione; 4-naphthylamino-3-penten-2-thione; 4-cyclohexylamino-3-penten-2-thione; 4-norbornylamino-3-penten-2-thione; 4-hydroxyamino-3-penten-2-thione; 3-methylamino-1-phenyl-2-butenethioaldehydel; 3-ethylamino-1-phenyl-2-butenethioaldehyde; 3-isopropylamino-1-phenyl-2-butenethioaldehyde; 3-phenylamino-1-phenyl-2-butenethioaldehyde; 3-naphthylamino-1-phenyl-2-butenethioaldehyde; 3-cyclohexylamino-1-phenyl-2-butenethioaldehyde; 3-norbornylamino-1-phenyl-2-butenethioaldehyde; 3-hydroxyamino-1-phenyl-2-butenethioaldehyde; 3-phenylamino-1,3-diphenyl-2-propenethioaldehyde; 3-cyclohexylamino-1,3-dicyclohexyl-2-propenethioaldehyde; and 3-norbomylamino-1,3-dinorbornyl-2-propenethioaidehyde.

N-S Valence Stabilizer #13: Examples of 3-aminothioacrylamides (3-amino-2-thiopropenamides), 3,3-diaminothioacrylamides, bis(3-aminothioacrylamides), bis(3,3-diaminothioacrylamides), poly(3-aminothioacrylamides), and poly(3,3-diaminothioacrylamides) (N-S Bidentates and N-S Tetradentates) that meet the requirements for use as "narrow band" valence stabilizers for $Co^{+3}$ include, but are not limited to: 3-methylaminothioacrylamide; 3-ethylaminothioacrylamide, 3-isopropylaminothioacrylamide, 3-phenylaminothioacrylamide; 3-naphthylaminothioacrylamide; 3-cyclohexylaminothioacrylamide; 3-norbornylaminothioacrylamide; 3-hydroxyaminothioacrylamide; N-methyl-3-methylaminothioacrylamide; N-ethyl-3-ethylaminothioacrylamide, N-isopropyl-3-isopropylaminothioacrylamide, N-phenyl-3-phenylaminothioacrylamide; N-naphthyl-3-naphthylaminothioacrylamide; N-cyclohexyl-3-cyclohexylaminothioacrylamide; N-norbornyl-3-norbornylaminothioacrylamide; 3-amino-3-methylaminothioacrylamide; 3-amino-3-ethylaminothioacrylamide, 3-amino-3-isopropylaminothioacrylamide, 3-amino-3-phenylaminothioacrylamide; 3-amino-3-naphthylaminothioacrylamide; 3-amino-3-cyclohexylaminothioacrylamide; 3-amino-3-norbornylaminothioacrylamide; and 3-amino-3-hydroxyaminothioacrylamide.

N-S Valence Stabilizer #14: Examples of 3-aminothioacrylic acids (3-amino-2-thiopropenoic acids), 3-mercapto-3-aminothioacrylic acids, bis(3-aminothioacrylic acids), bis(3-mercapto-3-aminothioacrylic acids), poly(3-aminothioacrylic acids), and poly(3-mercapto-3-aminothioacrylic acids), and derivatives thereof (N-S Bidentates and N-S Tetradentates) that meet the requirements for use as "narrow band" valence stabilizers for $Co^{+3}$ include, but are not limited to: 3-aminothioacrylic acid; 3-mercapto- 3-aminothioacrylic acid; 3-methylaminothioacrylic acid; 3-ethylaminothioacrylic acid; 3-isopropylaminothioacrylic acid; 3-phenylaminothioacrylic acid; 3-naphthylaminothioacrylic acid; 3-cyclohexylaminothioacrylic acid; 3-norbornylaminothioacrylic acid; 3-hydroxyaminothioacrylic acid; methyl 3-methylaminothioacrylate; ethyl 3-ethylaminothioacrylate; isopropyl 3-isopropylaminothioacrylate; benzyl 3-phenylaminothioacrylate; naphthyl 3-naphthylaminothioacrylate; cyclohexyl 3-cyclohexylaminothioacrylate; and norbornyl 3-norbornylaminothioacrylate.

N-S Valence Stabilizer #15: Examples of N-thioacyl benzylidenimines, bis(N-thioacyl benzylidenimines), and poly(N-thioacyl benzylidenimines) (N-S Bidentates and N-S Tetradentates) that meet the requirements for use as "narrow band" valence stabilizers for $Co^{+3}$ include, but are not limited to: N-thioformyl benzylidenimine, N-thioacetyl benzylidenimine; N-thiobenzoyl benzylidenimine; and N-pentafluorothiobenzoyl benzylidenimine.

N-S Valence Stabilizer #16: Examples of thiocarbonyl oximes, bis(thiocarbonyl oximes), and poly(thiocarbonyl oximes) (N-S Bidentates, N-S Tridentates, and N-S Tetradentates) that meet the requirements for use as "narrow band" valence stabilizers for $Co^{+3}$ include, but are not limited to: butane-3-thione-2-one monoxime); and diphenylethane-2-thione-1-one monoxime. N-S Valence Stabilizer #17: Examples of mercapto oximes, bis(mercapto oximes), and poly(mercapto oximes) (including 2-sulfur heterocyclic oximes) (N-S Bidentates, N-S Tridentates, N-S Tetradentates, and N-S Hexadentates) that meet the requirements for use as "narrow band" valence stabilizers for $Co^{+3}$ include, but are not limited to: 3-mercaptobutan-2-one oxime; 4-mercaptohexan-3-one oxime; (1,2-diphenyl-2-mercaptoethanone oxime); 1,2-di(trifluoromethyl)-2-mercaptoethanone oxime; 1,2-dicyclohexyl-2-mercaptoethanone oxime; 1,2-dinorbornyl-2-mercaptoethanone oxime; 2-mercaptobenzaldehyde oxime; 2-mercapto-1-naphthaldehyde oxime; thiophene-2-aldoxime; methyl 2-thiophenyl ketoxime; and phenyl 2-thiophenyl ketoxime.

N-S Valence Stabilizer #18: Examples of 2-nitrothiophenols (2-nitrobenzenethiols) (N-S Bidentates) that meet the requirements for use as "narrow band" valence stabilizers for $Co^{+3}$ include, but are not limited to: 2-nitrothiophenol; 2,3-dinitrothiophenol; 2,4-dinitrothiophenol; 2,5-dinitrothiophenol; 2,6-dinitrothiophenol; 1-nitro-2-naphthalenethiol; and 2-nitro-1-naphthalenethiol.

N-S Valence Stabilizer #19: Examples of 2-nitrilothiophenols (2-nitrilobenzenethiols) (N-S Bidentates) that meet the requirements for use as "narrow band" valence stabilizers for $Co^{+3}$ include, but are not limited to: 2-cyanothiophenol; 2,3-dicyanothiophenol; 2,4-dicyanothiophenol; 2,5-dicyanothiophenol; 2,6-dicyanothiophenol; 1-cyano-2-naphthalenethiol; and 2-cyano-1-naphthalenethiol.

N-S Valence Stabilizer #20: Examples of thiohydrazides, bis(thiohydrazides), and poly(thiohydrazides) (N-S Bidentates and N-S Tetradentates) that meet the requirements for use as "narrow band" valence stabilizers for $Co^{+3}$ include, but are not limited to: thioformic hydrazide; thioacetic hydrazide; thiopropionic hydrazide; thiobenzoic hydrazide; thiophthalhydrazide; thiosalicylic hydrazide; thionaphthoic hydrazides; thionorbornaneacetic hydrazide; thionicotinic hydrazide; and thioisonicotinic hydrazide. [Note: Thiohydrazides prefer complexation with lower oxidation states in metal ions.]

N-S Valence Stabilizer #21: Examples of thiosemicarbazides, bis(thiosemicarbazides), and poly(thiosemicarbazides) (N-S Bidentates, N-S Tetradentates, and N-S Hexadentates) that meet the requirements for use as "narrow band" valence stabilizers for $Co^{+3}$ include, but are not limited to: thiosemicarbazide (tsc); thiosemicarbazide diacetic acid (tsda); 1-methyithiosemicarbazide (1 mts); 1-ethylthiosemicarbazide; 1-isopropyithiosemicarbazide; 1-phenylthiosemicarbazide (1 pts)(cryogenine); 1-benzylthiosemicarbazide; 1-cyclohexyithiosemicarbazide; 1-norbornyithiosemicarbazide; 4-methyithiosemicarbazide (4mts); 4-ethyithiosemicarbazide; 4-isopropyithiosemicarbazide; 4-phenyithiosemicarbazide (4-pts); 4-benzylthiosemicarbazide; 4-cyclohexylthiosemicarbazide; 4-norbornylthiosemicarbazide; nicotinic thiosemicarbazide; isonicotinic thiosemicarbazide; and 4-phenyl-1-benrzenesulfonyl-3-thiosemicarbazide (pbst). [Note: Thiosemicarbazides prefer complexation with lower oxidation states in metal ions.]

N-S Valence Stabilizer #22: Examples of five-, seven-, or nine-membered macrocyclics, macrobicyclics, and macropolycyclics (including catapinands, cryptands, cyclidenes, and sepulchrates) wherein all binding sites are composed of nitrogen (usually amine or imine groups) or sulfur (usually thiols, mercaptans, or thiocarbonyls) and are not contained in component heterocyclic rings (N-S Tridentates, N-S Tetradentates, and N-S Hexadentates) that meet the requirements for use as "narrow band" valence stabilizers for $Co^{+3}$ include, but are not limited to: triazadithiacyclodecane ($[10]aneS_2N_3$); triazadithiacycloundecane ($[11]aneS_2N_3$); triazadithiacyclododecane ($[12]aneS_2N_3$); triazadithiacyclotridecane ($[13]aneS_2N_3$); triazadithiacyclotetradecane ($[14]aneS_2N_3$); triazadithiacyclopentadecane ($[15]aneS_2N_3$); thiomorpholine; and thiazolidine.

N-S Valence Stabilizer #23: Examples of five- or seven-membered macrocyclics, macrobicyclics, and macropolycyclics (including catapinands, cryptands, cyclidenes, and sepulchrates) wherein all binding sites are composed of nitrogen or sulfur and are contained in component heterocyclic rings (N-S Bidentates, N-S Tridentates, N-S Tetradentates, or N-S Hexadentates) that meet the requirements for use as "narrow band" valence stabilizers for $Co^{+3}$ include, but are not limited to: dithiopyrantripyridines; dithiophenetripyrroles; trithiopyrantetrapyridines; and trithiophenetetrapyrroles.

N-S Valence Stabilizer #24: Examples of five-, seven-, or nine-membered macrocyclics, macrobicyclics, and macropolycyclics (including catapinands, cryptands, cyclidenes, and sepulchrates) wherein all binding sites are composed of nitrogen or sulfur and are contained in a combination of heterocyclic rings and amine, imine, thiol, mercapto, or thiocarbonyl groups (N-S Bidentates, N-S Tridentates, N-S Tetradentates, or N-S Hexadentates) that meet the requirements for use as "narrow band" valence stabilizers for $Co^{+3}$ include, but are not limited to: azathiapentaphyrins; diazadithiapentaphyrins; azathiapentaphyrins; and diazadithiapentaphyrins.

N-O Valence Stabilizer #1: Examples of imidates, diimidates, polyimidates, and derivatives of imidic acid (N-O bidentates and N-O tetradentates) that meet the requirements for use as "narrow band" valence stabilizers for $Co^{+3}$ include, but are not limited to: O-methyl formimidate; O-ethyl formimidate; O-methyl acetimidate; O-ethyl acetimidate; O-methyl benzimidate; O-ethyl benzimidate; O-methyl cyclohexylimidate; O-ethyl cyclohexylimidate; O-methyl pentafluorobenzimidate; O-ethyl pentafluorobenzimidate; O-methyl 2-pyridylimidate; O-ethyl 2-pyridylimidate; O,O'-dimethyl benzdiimidate; O,O'-dimethyl tetrafluorobenzdiimidate; 2-iminotetrahydrofuran; and 2-iminotetrahydropyran. [Note: Most imidate complexes are decomposed by water, but their stability can be enhanced through the use of fluorinated solubility control anions (e.g. $PF_6$).]

N-O Valence Stabilizer #2: Examples of pseudoureas, bis(pseudoureas), and poly(pseudoureas) (N-O bidentates and N-O tetradentates) that meet the requirements for use as "narrow band" valence stabilizers for $Co^{+3}$ include, but are not limited to: O-methyl pseudourea; O-ethyl pseudourea; O-isopropyl pseudourea; O-benzyl pseudourea; O-cyclohexyl pseudourea; O-norbornyl pseudourea; O-pentafluorobenzyl pseudourea; N-methyl pseudourea; N-ethyl pseudourea; N-isopropyl pseudourea; N-benzyl pseudourea; N-cyclohexyl pseudourea; N-norbornyl pseudourea; and N-pentafluorobenzyl pseudourea.

N-O Valence Stabilizer #3: Examples of 2-amidinoacetates, bis(2-amidinoacetates), and poly(2-amidinoacetates) (N-O Bidentates and N-U Tetradentates) that meet the requirements for use as "narrow band" valence stabilizers for $Co^{+3}$ include, but are not limited to: N-methyl-2-amidinoacetate; O-methyl-2-amidinoacetate; N-benzyl-2-amidinoacetate; and O-benzyl-2-amidinoacetate. [Note: many 2-amidinoacetates tend to hydrolyze in water. This can be minimized through the use of fluorinated solubility control anions such as $PF_6^-$.]

N-O Valence Stabilizer #4: Examples of ureas, bis(ureas), and poly(ureas), including urylene complexes (N-O bidentates and N-O tetradentates) that meet the requirements for use as "narrow band" valence stabilizers for $Co^{+3}$ include, but are not limited to: urea; methylurea; ethylurea; isopropylurea; benzylurea; cyclohexylurea; naphthylurea; biphenylurea; norbornylurea; adamantylurea; N,N'-dimethylurea; N,N'-diethylurea; N,N'-diisopropylurea; N,N'-dibenzylurea; N,N'-dicyclohexylurea; N,N'dinapthylurea; N,N'-dibiphenylurea; N,N'-dinorbornylurea; N,N'-diadamantylurea; ethyleneurea (2-imidazolidone); propyleneurea; glycoluril (acetyleneurea); and N,N'-bis(4-nitrophenyl)urea.

N-O Valence Stabilizer #5: Examples of phosphonimidic acid, bis(phosphonimidic acid), poly(phosphonimidic acid), and derivatives thereof(N-O Bidentates and N-O Tetradentates) that meet the requirements for use as "narrow band" valence stabilizers for $Co^{+3}$ include, but are not limited to: phosphonimidic acid; O-phenylphosphonimidic acid; O-benzylphosphonimidic acid; O-cyclohexylphosphonimidic acid; and O-norbomyiphosphonimidic acid. [Note: The phosphite ($P^{+3}$) valence of the phosphorus atom makes stabilizization of high valence metal ions much more difficult, though still possible.]

N-O Valence Stabilizer #6: Examples of phosphonamidic acid, phosphonic diamide, bis(phosphonamidic acid), bis(phosphonic diamide), poly(phosphonamidic acid), poly(phosphonic diamide), and derivatives thereof (N-O Bidentates and N-O Tetradentates) that meet the requirements for use as "narrow band" valence stabilizers for $Co^{+3}$ include, but are not limited to: phosphonamidic acid, phosphonic diamide, phosphonamidic hydrazide, phosphonic dihydrazide, O-phenyiphosphonamidic acid, O-benzylphosphonamidic acid, O-cyclohexylphosphonamidic acid, O-norbornyiphosphonamidic acid, N-benzylphosphonic diamide, N-phenylphosphonic diamide, N-cyclohexylphosphomc diamide, and N-norbornylphosphonic diamide. [Note: The phosphite ($P^{+3}$) valence of the phosphorus atom makes stabilizization of high valence metal ions much more difficult, though still possible.]

N-O Valence Stabilizer #7: Examples of beta-ketoamines (N-substituted 3-amino-2-propenals), bis(beta-ketoamines), and poly(beta-ketoamines) (N-O Bidentates and N-O Tetradentates) that meet the requirements for use as "narrow band" valence stabilizers for $Co^{+3}$ include, but are not limited to: 4-methylamino-3-penten-2-one; 4-ethylamino-3-penten-2-one; 4-isopropylamino-3-penten-2-one; 4-phenylamino-3-penten-2-one; 4-naphthylamino-3-penten-2-one; 4-cyclohexylamino-3-penten-2-one; 4-norbornylamino-3-penten-2-one; 4-hydroxyamino-3-penten-2-one; 3-methylamino-1-phenyl-2-butenal; 3-ethylamino-1-phenyl-2-butenal; 3-isopropylamino-1-phenyl-2-butenal; 3-phenylamino-1-phenyl-2-butenal; 3-naphthylamino-1-phenyl-2-butenal; 3-cyclohexylamino-1-phenyl-2-butenal; 3-norbornylamino-1-phenyl-2-butenal; 3-hydroxyamino-1-phenyl-2-butenal; 3-phenylamino-1,3-diphenyl-2-propenal; 3-cyclohexylamino-1,3-dicyclohexyl-2-propenal; 3-norbomylamino-1,3-dinorbomyl-2-propenal; 2,2'-pyridil; aipha-pyridoin; 4-aminoantipyrine (aap); beta-phenylaminopropiophenone; and polyaminoquinones (PAQs).

N-O Valence Stabilizer #8: Examples of 3-aminoacrylamides (3-amino-2-propenamides), 3,3-diaminoacrylamides, bis(3-aminoacrylamides), bis(3,3-diaminoacrylamides), poly(3-aminoacrylamides), and poly(3,3 -diaminoacrylamides) (N-O Bidentates and N-O Tetradentates) that meet the requirements for use as "narrow band" valence stabilizers for $Co^{+3}$ include, but are not limited to: 3-methylaminoacrylamide; 3-ethylaminoacrylamide, 3-isopropylaminoacrylamide, 3-phenylaminoacrylamide; 3-naphthylaminoacrylamide; 3-cyclohexylaminoacrylamide; 3-norbornylaminoacrylamide; 3-hydroxyaminoacrylamide; N-methyl-3-methylaminoacrylamide; N-ethyl-3-ethylaminoacrylamide, N-isopropyl-3-isopropylaminoacrylamide, N-phenyl-3-phenylaminoacryl amide; N-naphthyl-3 -naphthylaminoacrylamide; N-cyclohexyl-3-cyclohexylaminoacrylamide; N-norbornyl-3-norbornylaminoacrylami de; 3-amino-3-methylaminoacrylaniide; 3-amino-3-ethylaminoacrylamide, 3-amino-3-isopropylaminoacrylamide, 3-amino-3-phenylaminoacrylamide; 3-amino-3-naphthylaminoacrylamide; 3-amino-3-cyclohexylaminoacrylamide; 3-amino-3-norbornylaminoacryl amide; and 3-amino-3-hydroxyaminoacrylamide.

N-O Valence Stabilizer #9: Examples of 3-aminoacrylic acids (3-amino-2-propenoic acids), 3-hydroxy-3-aminoacrylic acids, bis(3-aminoacrylic acids), bis(3-hydroxy-3-aminoacrylic acids), poly(3-aminoacrylic acids), and poly(3-hydroxy-3-aminoacrylic acids), and derivatives thereof (N-O Bidentates and N-O Tetradentates) that meet the requirements for use as "narrow band" valence stabilizers for $Co^{+3}$ include, but are not limited to: 3-aminoacrylic acid; 3-hydroxy-3-aminoacrylic acid; 3-methylaminoacrylic acid; 3-ethylaminoacrylic acid; 3-isopropylaminoacrylic acid; 3-phenylaminoacrylic acid; 3-naphthylaminoacrylic acid; 3-cyclohexylaminoacrylic acid; 3-norbornylaminoacrylic acid; 3-hydroxyaminoacrylic acid; methyl 3-methylaminoacrylate; ethyl 3-ethylaminoacrylate; isopropyl 3-isopropylaminoacrylate; benzyl 3 -phenylaminoacrylate; naphthyl 3-naphthylaminoacrylate; cyclohexyl 3-cyclohexylaminoacrylate; and norbornyl 3-norbornylaminoacrylate.

N-O Valence Stabilizer #10: Examples of N-acyl benzylidenimines, bis(N-acyl benzylidenimines), and poly(N-acyl benzylidenimines) (N-O Bidentates and N-O Tetradentates) that meet the requirements for use as "narrow band" valence stabilizers for $Co^{+3}$ include, but are not limited to: N-formyl benzylidenimine, N-acetyl benzylidenimine; N-benzoyl benzylidenimine; and N-pentafluorobenzoyl benzylidenimine.

N-O Valence Stabilizer #11: Examples of 2-nitroanilines (N-O Bidentates) that meet the requirements for use as "narrow band" valence stabilizers for $Co^{+3}$ include, but are not limited to: 2-nitroaniline; 2,6-dintroaniline; 2-nitrophenylenediamine; 2-nitrophenylenetriamine; 2-nitro-1-aminonaphthalene; 1-nitro-2-aminonaphthalene; nitrodiaminonaphthalene; and dipicrylamine.

N-O Valence Stabilizer #12: Examples of 2-nitrilophenols (N-O Bidentates) that meet the requirements for use as "narrow band" valence stabilizers for $Co^{+3}$ include, but are not limited to: 2-cyanophenol; 2,3-dicyanophenol; 2,4-dicyanophenol; 2,5-dicyanophenol; 2,6-dicyanophenol; 1-cyano-2-naphthol; and 2-cyano-1-naphthol. Also includes acylcyanamides.

N-O Valence Stabilizer #13: Examples of amine N-oxides and N-diazine oxides (azoxy compounds) (N-O Bidentates, N-O Tridentates, and N-O Tetradentates) that meet the requirements for use as "narrow band" valence stabilizers for $Co^{+3}$ include, but are not limited to: pyridine N-oxide (pyNO or PNO); picoline N-oxide (picNO); lutidine N-oxide (lutNO or LNO); collidine N-oxide (collNO or CNO); quinoline N-oxide (QuinNO or QNO); isoquinoline N-oxide (iso-QuinNO or IQNO); acridine N-oxide (AcrNO or ANO); picolinic acid N-oxide (PicANO); pyridinethiolate N-oxide (PTNO); adenine N-oxide; adenosine N-oxide; 1,10-phenanthroline mono-N-oxide (phenNO); 1,10-phenanthroline N,N-dioxide (phen2NO); bipyridyl mono-N-oxide (bipyNO); bipyridyl N,N-dioxide (bipy2NO); pyrazine mono-N-oxide (pyzNO); pyrazine N,N-dioxide (pyz2NO); pyrimidine mono-N-oxide (pymNO); pyrimidine N,N-dioxide (pym2NO); pyridazine mono-N-oxide (pdzNO); pyridazine N,N-dioxide (pdz2NO); quinoxaline mono-N-oxide (qxNO); quinoxaline N,N-dioxide (qx2NO); phenazine mono-N-oxide (phzNO); phenazine N,N-dioxide (phz2NO); 2,3-di(pyridine N-oxide)quinoxaline (dpoq); inosine N-oxide; 4,4'-bipyridine N,N-dioxide; 1-hydroxypyrazole 2-oxide; 1-hydroxyimidazole 3-oxide; 2,2'-diimidazyl 3,3'-dioxide; imidazole N-oxides; 1-hydroxyimidazole-3-N-oxides; N-benzylidine aniline N-oxide; N-(naphthylidene) aniline N-oxide; N-(hydroxybenzylidene) aniline N-oxide; and 2,2'-dibenzimidazyl 3,3'-dioxide (indigo N,N-dioxide) for amine N-oxides; and azoxybenzene; phthalazine N-oxide; benzocinnoline N-oxide; and bipyrazinyl N-oxide as N-diazine oxide examples.

N-O Valence Stabilizer #14: Examples of hydrazides, bis(hydrazides), and poly(hydrazides) (N-O Bidentates and N-O Tetradentates) that meet the requirements for use as "narrow band" valence stabilizers for $Co^{+3}$ include, but are not limited to: formic hydrazide; acetic hydrazide; propionic hydrazide; benzoic hydrazide; phthalhydrazide; salicylic hydrazide; naphthoic hydrazides; norbornaneacetic hydrazide; nicotimc hydrazide; and isonicotinic hydrazide (isoniazid). [Note: Hydrazides prefer complexation with lower oxidation states in metal ions.]

N-O Valence Stabilizer #15: Examples of semicarbazides, bis(semicarbazides), and poly(semicarbazides) (N-O Bidentates, N-O Tetradentates, and N-O Hexadentates) that meet the requirements for use as "narrow band" valence stabilizers for $Co^{+3}$ include, but are not limited to: semicarbazide (sc); semicarbazide diacetic acid (sda); 1-methylsemicarbazide; 1-ethylsemicarbazide; 1-isopropylsemicarbazide; 1-phenylsemicarbazide; 1-benzylsemicarbazide; 1-cyclohexylsemicarbazide; 1-norbornylsemicarbazide; 4-methylsemicarbazide; 4-ethylsemicarbazide; 4-isopropylsemicarbazide; 4-phenylsemicarbazide; 4-benzylsemicarbazide; 4-cyclohexylsemicarbazide; 4-norbomylsemicarbazide; nicotinic semicarbazide; and isonicotinic semicarbazide. [Note: Semicarbazides prefer complexation with lower oxidation states in metal ions.]

N-O Valence Stabilizer #16: Examples of five-, seven-, or nine-membered macrocyclics, macrobicyclics, and macropolycyclics (including catapinands, cryptands, cyclidenes, and sepulchrates) wherein all binding sites are composed of nitrogen (usually amine or imine groups) or oxygen (usually hydroxy, carboxy, or carbonyl groups) and are not contained in component heterocyclic rings (N-O Tridentates, N-O Tetradentates, and N-O Hexadentates) that meet the requirements for use as "narrow band" valence stabilizers for $Co^{+3}$ include, but are not limited to: triazadioxacyclodecane ([10]aneO$_2$N$_3$); triazadioxacycloundecane ([11]aneO$_2$N$_3$); triazadioxacyclododecane ([12]aneO$_2$N$_3$); triazadioxacyclotridecane ([13]aneO$_2$N$_3$); triazadioxacyclotetradecane ([14]aneO$_2$N$_3$); and triazadioxacyclopentadecane ([15]aneO$_2$N$_3$).

N-O Valence Stabilizer #17: Examples of five- or seven-membered macrocyclics, macrobicyclics, and macropolycyclics (including catapinands, cryptands, cyclidenes, and sepulchrates) wherein all binding sites are composed of nitrogen or oxygen and are contained in component heterocyclic rings (N-O Bidentates, N-O Tridentates, N-O Tetradentates, or N-O Hexadentates) that meet the requirements for use as "narrow band" valence stabilizers for $Co^{+3}$ include, but are not limited to: dipyrantripyridines; difurantripyrroles; tripyrantetrapyridines; and trifurantetrapyrroles.

N-O Valence Stabilizer #18: Examples of five-, seven-, or nine-membered macrocyclics, macrobicyclics, and macropolycyclics (including catapinands, cryptands, cyclidenes, and sepulchrates) wherein all binding sites are composed of nitrogen or oxygen and are contained in a combination of heterocyclic rings and amine, imine, hydroxy, carboxy, or carbonyl groups (N-O Bidentates, N-O Tridentates, N-O Tetradentates, or N-O Hexadentates) that meet the requirements for use as "narrow band" valence stabilizers for $Co^{+3}$ include, but are not limited to: azaoxapentaphyrins; diazadioxapentaphyrins; azaoxapentaphyrins; and diazadioxapentaphyrins.

S-O Valence Stabilizer #1: Examples of thiobiurets (thioimidodicarbonic diamides), thioisobiurets, thiobiureas, thiotriurets, thiotriureas, bis(thiobiurets), bis(thioisobiurets), bis(thiobiureas), poly(thiobiurets), poly(thioisobiurets), poly(thiobiureas) (S-O Bidentates, S-O Tridentates, S-O Tetradentates), and (3-formamidino thiocarbamides) that meet the requirements for use as "narrow band" valence stabilizers for $Co^{+3}$ include, but are not limited to: thiobiuret, thioisobiuret, thiobiurea, thiotriuret, thiotriurea, nitrothiobiuret, dinitrothiobiuret, aminothiobiuret, diaminothiobiuret, oxythiobiuret, dioxythiobiuret, cyanothiobiuret, methylthiobiuret, ethylthiobiuret, isopropylthiobiuret, phenyithiobiuret, benzylthiobiuret, cyclohexylthiobiuret, norbornylthiobiuret, adamantylthiobiuret, dimethyithiobiuret, diethyithiobiuret, diisopropylthiobiuret, diphenyithiobiuret, dibenzylthiobiuret, dicyclohexylthiobiuret, dinorbornylthiobiuret, and diadamantylthiobiuret.

S-O Valence Stabilizer #2: Examples of acyithioureas, aroylthioureas, thioacylureas, thioaroylureas, bis(acylthioureas), bis(aroylthioureas), bis(thioacylureas), bis(thioaroylureas), poly(thioacylthioureas), poly(thioaroylthioureas), poly(thioacylureas), and poly(thioaroylureas) (S-O Bidentates, S-O Tridentates, S-O Tetradentates) that meet the requirements for use as "narrow band" valence stabilizers for $Co^{+3}$ include, but are not limited to: thioformylurea, thioacetylurea, thiobenzoylurea, thiocyclohexoylurea, pentafluorothiobenzoylurea, acetylthiourea, benzoylthiourea, and cyclohexoylthiourea.

S-O Valence Stabilizer #3: Examples of thioimidodialdehydes, thiohydrazidodialdehydes (thioacyl hydrazides), bis(thioimidodialdehydes), bis(thiohydrazidodialdehydes), poly(thioimidodialdehydes), and poly(thiohydrazidodialdehydes) (S-O Bidentates, S-O Tridentates, S-O Tetradentates) that meet the requirements for use as "narrow band" valence stabilizers for $Co^{+3}$ include, but are not limited to: thiodiacetamide, thiodipropanamide, thiodibutanamide, thiodibenzamide, and thiodicyclohexamide.

S-O Valence Stabilizer #4: Examples of thioimidodicarbonic acids, thiohydrazidodicarbonic acids, bis(thioimidodicarbonic acids), bis(thiohydrazidodicarbonic acids), poly(thioimidodicarbonic acids), poly(thiohydrazidodicarbonic acids) and derivatives thereof (S-O Bidentates, S-O Tridentates, S-O Tetradentates) that meet the requirements for use as "narrow band" valence stabilizers for $Co^{+3}$ include, but are not limited to: thioimidodicarbonic acid, thiohydrazidodicarbonic acid, O-phenylthioimidodicarbonic acid, O-benzylthioimidodicarbonic acid, O-cyclohexylthioimidodicarbonic acid, O-norbornylthioimidodicarbonic acid, O,O'-diphenylthioimidodicarbonic acid, O,O'-dibenzylthioimidodicarbonic acid, O,O'-dicyclohexylthioimidodicarbonic acid, O,O'-dinorbornylthioimidodicarbonic acid.

S-O Valence Stabilizer #5: Examples of 1,2-monothioketones (monothiolenes, monothio-alpha-ketonates), 1,2,3-monothioketones, 1,2,3-dithioketones, monothiotropolonates, ortho-monothioquinones, bis(1,2-monothioketones), and poly(1,2-monothioketones) (S-O Bidentates, S-O Tridentates, S-O Tetradentates) that meet the requirements for use as "narrow band" valence stabilizers for $Co^{+3}$ include, but are not limited to: monothiotropolone; 1,2-monothiobenzoquinone (o-monothioquinone); di-tert-butyl-1,2-monothiobenzoquinone; hexafluoro-1,2-monothiobenzoquinone; 1,2-monothionaphthoquinone; 9,10-monothiophenanthroquinone; monothiosquaric acid; monothiodeltic acid; monothiocroconic acid; and monothiorhodizonic acid.

S-O Valence Stabilizer #6: Examples of trithioperoxydicarbonic diamides, bis(trithioperoxydicarbonic diamides), and poly(trithioperoxydicarbonic diamides) (S-O Bidentates, S-O Tridentates, S-O Tetradentates) that meet the requirements for use as "narrow band" valence stabilizers for $Co^{+3}$ include, but are not limited to: trithioperoxydicarbonic diamide; N-phenyltrithioperoxydicarbonic diamide; N-benzyltrithioperoxydicarbonic diamide; N-cyclohexyltrithioperoxydicarbonic diamide; N-norbornyltrithioperoxydicarbonic diamide; N,N'-diphenyltrithioperoxydicarbonic diamide; N,N'-dibenzyltrithioperoxydicarbonic diamide; N,N'-dicyclohexyltrithioperoxydicarbonic diamide; and N,N'-dinorbornyltrithioperoxydicarbonic diamide.

S-O Valence Stabilizer #7: Examples of dithiodicarbonic acids, bis(dithiodicarbonic acids), poly(dithiodicarbonic acids), and derivatives thereof (S-O Bidentates, S-U Tridentates, S-O Tetradentates) that meet the requirements for use as "narrow band" valence stabilizers for $Co^{+3}$ include, but are not limited to: dithiodicarbonic acid, O-phenyldithiodicarbonic acid, O-benzyldithiodicarbonic acid, O-cyclohexyldithiodicarbonic acid, O-norbornyldithiodicarbonic acid, O,O'-diphenyldithiodicarbonic acid, O,O'-dibenzyldithiodicarbonic acid, O,O'-dicyclohexyldithiodicarbonic acid, and O,O'-dinorbornyldithiodicarbonic acid.

S-O Valence Stabilizer #8: Examples of trithioperoxydicarbonic acids, bis(trithioperoxydicarbonic acids), poly(trithioperoxydicarbonic acids), and derivatives thereof (S-O Bidentates, S-O Tridentates, S-U Tetradentates) that meet the requirements for use as "narrow band" valence stabilizers for $Co^{+3}$ include, but are not limited to: trithioperoxydicarbonic acid, O-phenyltrithioperoxydicarbonic acid; O-benzyltrithioperoxydicarbonic acid; O-cyclohexyltrithioperoxydicarbonic acid; O-norbornyltrithioperoxydicarbonic acid; O,O'-diphenyltrithioperoxydicarbonic acid; O,O'-dibenzyltrithioperoxydicarbonic acid; O,O'-dicyclohexyltrithioperoxydicarbonic acid; and O,O'-dinorbornyltrithioperoxydicarbonic acid.

S-O Valence Stabilizer #9: Examples of monothioperoxydiphosphoramides, bis(monothioperoxydiphosphoramides), and poly(monothioperoxydiphosphoramides) (S-O Bidentates, S-O Tridentates, S-O Tetradentates) that meet the requirements for use as "narrow band" valence stabilizers for $Co^{+3}$ include, but are not limited to: monothioperoxydiphosphoramide, N-methylmonothioperoxydiphosphoramide, N-isopropylmonothioperoxydiphosphoramide, N-tert-butylmonothioperoxydiphosphoramide, N-phenylmonothioperoxydiphosphoramide, N-pentafluorophenylmonothioperoxydiphosphoramide, N-benzylmonothioperoxydiphosphoramide, N-cyclohexylmonothioperoxydiphosphoramide, N-norbornylmonothioperoxydiphosphoramide, N,N'''-dimethylmonothioperoxydiphosphoramide, N,N'''-diisopropylmonothioperoxydiphosphoramide, N,N'''-di-tert-butylmonothioperoxydiphosphoramide, N,N'''-diphenylmonothioperoxydiphosphoramide, N,N'''-dipentafluorophenylmonothioperoxydiphosphoramide, N,N'''-dibenzylmonothioperoxydiphosphoramide, N,N'''-dicyclohexylmonothioperoxydiphosphoramide, and N,N'''-dinorbornylmonothioperoxydiphosphoramide.

S-O Valence Stabilizer #10: Examples of monothioperoxydiphosphoric acids, bis(monothioperoxydiphosphoric acids), poly(monothioperoxydiphosphoric acids), and derivatives thereof (S-O Bidentates, S-O Tridentates, S-O Tetradentates) that meet the requirements for use as "narrow band" valence stabilizers for $Co^{+3}$ include, but are not limited to: monothioperoxydiphosphoric acid, methylmonothioperoxydiphosphoric acid, isopropylmonothioperoxydiphosphoric acid, tert-butylmonothioperoxydiphosphoric acid, phenylmonothioperoxydiphosphoric acid, pentafluorophenylmonothioperoxydiphosphoric acid, benzylmonothioperoxydiphosphoric acid, cyclohexylmonothioperoxydiphosphoric acid, norbornylmonothioperoxydiphosphoric acid, dimethylmonothioperoxydiphosphoric acid, diisopropylmonotbioperoxydiphosphoric acid, di-tert-butylmonothioperoxydiphosphoric acid, diphenylmonothioperoxydiphosphoric acid, di-pentafluorophenylmonothioperoxydiphosphoric acid, dibenzylmonothioperoxydiphosphoric acid, dicyclohexylmonothioperoxydiphosphoric acid, and dinorbornylmonothioperoxydiphosphoric acid.

S-O Valence Stabilizer #11: Examples of monothioimidodiphosphonic acids, monothiohydrazidodiphosphonic acids, bis(monothioimidodiphosphonic acids), bis(monothiohydrazidodiphosphonic acids), poly(monothioimidodiphosphonic acids), poly(monothiohydrazidodiphosphonic acids), and derivatives thereof (S-O Bidentates, S-O Tridentates, S-O Tetradentates) that meet the requirements for use as "narrow band" valence stabilizers for $Co^{+3}$ include, but are not limited to: monothioimidodiphosphonic acid, methylmonothioimidodiphosphonic acid, isopropylmonothioimidodiphosphonic acid, tert-butylmonothioimidodiphosphonic acid, phenylmonothioimidodiphosphonic acid, pentafluorophenylmonothioimidodiphosphonic acid, benzylmonothioimidodiphosphonic acid, cyclohexylmonothioimidodiphosphonic acid, norbornylmonothioimidodiphosphonic acid, dimethylmonothioimidodiphosphonic acid, diisopropylmonothioimidodiphosphonic acid, di-tert-butylmonothioimidodiphosphonic acid, diphenylmonothioimidodiphosphonic acid, di-pentafluorophenylmonothioimidodiphosphonic acid, dibenzylmonothioimidodiphosphonic acid, dicyclohexylmonothioimidodiphosphonic acid, and dinorbornylmonothioimidodiphosphonic acid. [Note: The phosphite ($P^{+3}$) valence of the phosphorus atom makes stabilizization of high valence metal ions much more difficult, though still possible.]

S-O Valence Stabilizer #12: Examples of monothioimidodiphosphonamides, monothiohydrazidodiphosphonamides, bis(monothioimidodiphosphonamides), bis(monothiohydrazidodiphosphonamides), poly(monothioimidodiphosphonamides), and poly(monothiohydrazidodiphosphonamides) (S-O Bidentates, S-O Tridentates, S-O Tetradentates) that meet the requirements for use as "narrow band" valence stabilizers for $Co^{+3}$ include, but are not limited to: monothioimidodiphosphonamide, N-methylmonothioimidodiphosphonamide, N-isopropylmonothioimidodiphosphonamide, N-tert-butylmonothioimidodiphosphonamide, N-phenylmonothioimidodiphosphonamide, N-pentafluorophenylmonothioimidodiphosphonamide, N-benzylmonothioimidodiphosphonamide, N-cyclohexylmonothioimidodiphosphonamide, N-norbornylmonothioimidodiphosphonamide, N,N'''-dimethylmonothioimidodiphosphonamide, N,N'''-diisopropylmonothioimidodiphosphonamide, N,N'''-di-tert-butylmonothioimidodiphosphonamide, N,N'''-diphenylmonothioimidodiphosphonamide, N,N'''-di-pentafluorophenylmonothioimidodiphosphonamide, N,N'''-dibenzylmonothioimidodiphosphonamide, N,N'''-dicyclohexylmonothioimidodiphosphonamide, and N,N'''-dinorbornylmonothioimidodiphosphonamide. [Note: The phosphite ($P^{+3}$) valence of the phosphorus atom makes stabilizization of high valence metal ions much more difficult, though still possible.]

S-O Valence Stabilizer #13: Examples of dithiodiphosphonamides, bis(dithiodiphosphonamides), and poly(dithiodiphosphonamides) (S-O Bidentates, S-O Tridentates, S-O Tetradentates) that meet the requirements for use as "narrow band" valence stabilizers for $Co^{+3}$ include, but are not limited to: dithiodiphosphonamide, N-methyldithiodiphosphonamide, N-isopropyldithiodiphosphonamide, N-tert-butyldithiodiphosphonamide, N-phenyldithiodiphosphonamide, N-pentafluorophenyldithiodiphosphonamide, N-benzylclithiodiphosphonamide, N-cyclohexyldithiodiphosphonamide, N-norbornyldithiodiphosphonamide, N,N'''-dimethyldithiodiphosphonamide, N,N'''-diisopropyldithiodiphosphonamide, N,N'''-di-tert-butyldithiodiphosphonamide, N,N'''-diphenyldithiodiphosphonamide, N,N'''-di-pentafluorophenyldithiodiphosphonamide, N,N'''-dibenzyldithiodiphosphonamide, N,N'''-dicyclohexyldithiodiphosphonamide, and N,N'''-dinorbornyldithiodiphosphonamide. [Note: The phosphite ($P^{+3}$) valence of the phosphorus atom makes stabilizization of high valence metal ions much more difficult, though still possible.]

S-O Valence Stabilizer #14: Examples of dithiodiphosphonic acids, bis(dithiodiphosphonic acids), poly(dithiodiphosphonic acids), and derivatives thereof (S-O Bidentates, S-O Tridentates, S-O Tetradentates) that meet the requirements for use as "narrow band" valence stabilizers for $Co^{+3}$ include, but are not limited to: dithiodiphosphonic acid, methyldithiodiphosphonic acid, isopropyldithiodiphosphonic acid, tert-butyldithiodiphosphonic acid, phenyldithiodiphosphonic acid, pentafluorophenyldithiodiphosphonic acid, benzyldithiodiphosphonic acid, cyclohexyldithiodiphosphonic acid, norbornyldithiodiphosphonic acid, dimethyldithiodiphosphonic acid, diisopropyldiothiodiphosphonic acid, di-tert-butyldithiodiphosphonic acid, diphenyldithiodiphosphonic acid, di-pentafluorophenyldithiodiphosphonic acid, dibenzyldithiodiphosphonic acid, dicyclohexyldithiodiphosphonic acid, and dinorbornyldithiodiphosphonic acid. [Note: The phosphite ($P^{+3}$) valence of the phosphorus atom makes stabilizization of high valence metal ions much more difficult, though still possible.]

S-O Valence Stabilizer #15: Examples of monothioperoxydiphosphonamides, bis(monothioperoxydiphosphonamides), and poly(monothioperoxydiphosphonamides) (S-O Bidentates, S-O Tridentates, S-O Tetradentates) that meet the requirements for use as "narrow band" valence stabilizers for $Co^{+3}$ include, but are not limited to: monothioperoxydiphosphonamide, N-methylmonothioperoxydiphosphonamide, N-isopropylmonothioperoxydiphosphonamide, N-tert-butylmonothioperoxydiphosphonamide, N-phenylmonothioperoxydiphosphonamide, N-pentafluorophenylmonothioperoxydiphosphonamide, N-benzylmonothioperoxydiphosphonamide, N-cyclohexylmonothioperoxydiphosphonamide, N-norbornylmonothioperoxydiphosphonamide, N,N'''-dimethylmonothioperoxydiphosphonamide, N,N'''-diisopropylmonothioperoxydiphosphonamide, N,N'''-di-tert-butylmonothioperoxydiphosphonamide, N,N'''-diphenylmonothioperoxydiphosphonamide, N,N'''di-pentafluorophenylmonothioperoxydiphosphonamide, N,N'''-dibenzyhnonothioperoxydiphosphonamide, N,N'''-dicyclohexylmonothioperoxydiphosphonamide, and N,N'''-dinorbornylmonothioperoxydiphosphonamide. [Note: The phosphite ($P^{+3}$) valence of the phosphorus atom makes stabilizization of high valence metal ions much more difficult, though still possible.]

S-O Valence Stabilizer #16: Examples of monothioperoxydiphosphonic acids, bis(monothioperoxydiphosphonic acids), poly(monothioperoxydiphosphonic acids), and derivatives thereof (S-O Bidentates, S-O Tridentates, S-O Tetradentates) that meet the requirements for use as "narrow band" valence stabilizers for $Co^{+3}$ include, but are not limited to: monothioperoxydiphosphonic acid, methylmonothioperoxydiphosphonic acid, isopropylmonothioperoxydiphosphonic acid, tert-butylmonothioperoxydiphosphonic acid, phenylmonothioperoxydiphosphonic acid, pentafluorophenylmonothioperoxydiphosphonic acid, benzylmonothioperoxydiphosphonic acid, cyclohexylmonothioperoxydiphosphonic acid, norbornylmonothioperoxydiphosphonic acid, dimethylmonothioperoxydiphosphonic acid, diisopropylmonothioperoxydiphosphonic acid, di-tert-butylmonothioperoxydiphosphonic acid, diphenylmonothioperoxydiphosphonic acid, di-pentafluorophenylmonothioperoxydiphosphonic acid, dibenzylmonothioperoxydiphosphonic acid, dicyclohexylmonothioperoxydiphosphonic acid, and dinorbornylmonothioperoxydiphosphonic acid. [Note: The phosphite ($P^{+3}$) valence of the phosphorus atom makes stabilizization of high valence metal ions much more difficult, though still possible.]

S-O Valence Stabilizer #17: Examples of monothiophosphoric acids (phosphorothioic acids), bis(monothiophosphoric acids), poly(monothiophosphoric acids), and derivatives thereof (S-O Bidentates, S-O Tridentates, S-O Tetradentates) that meet the requirements for use as "narrow band" valence stabilizers for $Co^{+3}$ include, but are not limited to: monothiophosphoric acid, O-phenylmonothiophosphoric acid, O-benzylmonothiophosphoric acid, O-cyclohexylmonothiophosphoric acid, O-norbornylmonothiophosphoric acid, O,O-diphenylmonothiophosphoric acid, O,O-dibenzylmonothiophosphoric acid, O,O-dicyclohexylmonothiophosphoric acid, and O,O-dinorbornylmonothiophosphoric acid.

S-O Valence Stabilizer #18: Examples of phosphoro(dithioperoxoic) acids, bis[phosphoro(dithioperoxoic) acids], poly[phosphoro(dithioperoxoic) acids], and derivatives thereof (S-O Bidentates, S-O Tridentates, S-O Tetradentates) that meet the requirements for use as "narrow band" valence stabilizers for $Co^{+3}$ include, but are not limited to:

phosphoro(dithioperoxoic) acid, O-phenylphosphoro(dithioperoxoic) acid, O-benzylphosphoro(dithioperoxoic) acid, O-cyclohexylphosphoro(dithioperoxoic) acid, O-norbornylphosphoro(dithioperoxoic) acid, O,O-diphenylphosphoro(dithioperoxoic) acid, O,O-dibenzylphosphoro(dithioperoxoic) acid, O,O-dicyclohexylphosphoro(dithioperoxoic) acid, and O,O-dinorbornylphosphoro(dithioperoxoic) acid.

S-O Valence Stabilizer #19: Examples of monothiophosphonic Acids (phosphonothioic acids), bis(monothiophosphonic acids), poly(monothiophosphonic acids), and derivatives thereof (S-O Bidentates, S-O Tridentates, S-O Tetradentates) that meet the requirements for use as "narrow band" valence stabilizers for $Co^{+3}$ include, but are not limited to: monothiophosphonic acid, O-phenylmonothiophosphonic acid, O-benzylmonothiophosphonic acid, O-cyclohexylmonothiophosphonic acid, O-norbornylmonothiophosphonic acid, O,P-diphenylmonothiophosphonic acid, O,P-dibenzylmonothiophosphonic acid, O,P-dicyclohexylmonothiophosphonic acid, and O,P-dinorbornylmonothiophosphonic acid. [Note: The phosphite ($P^{+3}$) valence of the phosphorus atom makes stabilizization of high valence metal ions much more difficult, though still possible.]

S-O Valence Stabilizer #20: Examples of phosphono(dithioperoxoic) acids, bis[phosphono(dithioperoxoic) acids], poly[phosphono(dithioperoxoic) acids], and derivatives thereof (S-O Bidentates, S-O Tridentates, S-O Tetradentates) that meet the requirements for use as "narrow band" valence stabilizers for $Co^{+3}$ include, but are not limited to: phosphono(dithioperoxoic) acid, O-phenylphosphono(dithioperoxoic) acid, O-benzylphosphono(dithioperoxoic) acid, O-cyclohexylphosphono(dithioperoxoic) acid, O-norbornylphosphono(dithioperoxoic) acid, O,P-diphenylphosphono(dithioperoxoic) acid, O,P-dibenzylphosphono(dithioperoxoic) acid, O,P-dicyclohexylphosphono(dithioperoxoic) acid, and O,P-dinorbornylphosphono(dithioperoxoic) acid. [Note: The phosphite ($P^{+3}$) valence of the phosphorus atom makes stabilizization of high valence metal ions much more difficult, though still possible.]

S-O Valence Stabilizer #21: Examples of beta-hydroxythioketones, beta-hydroxythioaldehydes, bis(beta-hydroxythioketones), bis(beta-hydroxythioaldehydes), poly(beta-hydroxythioketones), and poly(beta-hydroxythioaldehydes) (S-O Bidentates, S-O Tridentates, S-O Tetradentates) that meet the requirements for use as "narrow band" valence stabilizers for $Co^{+3}$ include, but are not limited to: 4-hydroxypentan-2-thione; 1,3-diphenyl-3-hydroxypropanethioaldehyde; 1,3-dibenzyl-3-hydroxypropanethioaldehyde; 1,3-dicyclohexyl-3-hydroxypropanethioaldehyde; 1,3-dinorbonyl-3-hydroxypropanethioaldehyde; 1,3-di(2-tbienyl)-3-hydroxypropanethioaldehyde; 1,3-di(2-furyl)-3-hydroxypropanethioaldehyde; o-hydroxythioacetophenone; and beta-hydroxythiobenzophenone.

S-O Valence Stabilizer #22: Examples of beta-mercaptoketones, beta-mercaptoaldehydes, bis(beta-mercaptoketones), bis(beta-mercaptoaldehydes), poly(beta-mercaptoketones), and poly(beta-mercaptoaldehydes) (S-O Bidentates, S-O Tridentates, S-O Tetradentates) that meet the requirements for use as "narrow band" valence stabilizers for $Co^{+3}$ include, but are not limited to: 4-mercaptopentan-2-one; 1,3-diphenyl-3-mercaptopropanal; 1,3-dibenzyl-3-mercaptopropanal; 1,3-dicyclohexyl-3-mercaptopropanal; 1,3-dinorbornyl-3-mercaptopropanal; 1,3-di(2-thienyl)-3-mercaptopropanal; 1,3-di(2-furyl)-3-mercaptopropanal; 3-mercapto-1,5-pentanedialdehyde; o-mercaptoacetophenone; 5-mercapto-1,4-naphthoquinone; 1-mercaptoacridone; 1-mercaptoanthraquinone; 1,8-dimercaptoanthraquinone; and beta-mercaptobenzophenone.

S-O Valence Stabilizer #23: Examples of N-(aminomethylol)thioureas [N-(aminohydroxymethyl)thioureas], bis[N-(aminomethylol)thioureas], and poly[N-(aminomethylol)thioureas] (S-O Bidentates, S-O Tridentates, S-O Tetradentates) that meet the requirements for use as "narrow band" valence stabilizers for $Co^{+3}$ include, but are not limited to: N'-(aminohydroxymethyl)thiourea; N,N'''-dimethyl-N'-(aminohydroxymethyl)thiourea; N,N'-diethyl-N'-(aminohydroxymethyl)thiourea; N,N'''-isopropyl-N'-(aminohydroxymethyl)thiourea; N,N''-diphenyl-N'-(aminohydroxymethyl)thiourea; N,N''-dibenzyl-N'-(aminohydroxymethyl)thiourea; N,N''-dicyclohexyl-N'-(aminohydroxymethyl)thiourea; and N,N''-dinorbornyl-N'-(aminohydroxymethyl)thiourea.

S-O Valence Stabilizer #24: Examples of N-(aminomethylthiol)ureas [N-(aminomercaptomethyl)ureas], bis[N-(aminomethylthiol)ureas], and poly[N-(aminomethylthiol)ureas] (S-O Bidentates, S-O Tridentates, S-O Tetradentates) that meet the requirements for use as "narrow band" valence stabilizers for $Co^{+3}$ include, but are not limited to: N'-(aminomercaptomethyl)urea; N,N''-dimethyl-N'-(aminomercaptomethyl)urea; N,N'-diethyl-N'-(aminomercaptomethyl)urea; N,N''-isopropyl-N'-(aminomercaptomethyl)urea; N,N''-diphenyl-N'-(aminomercaptomethyl)urea; N,N''-dibenzyl-N'-(aminomercaptomethyl)urea; N,N''-dicyclohexyl-N'-(aminomercaptomethyl)urea; and N,N''-dinorbornyl-N'-(aminomercaptomethyl)urea.

S-O Valence Stabilizer #25: Examples of monothiooxamides, bis(monothiooxamides), and poly(monothiooxamides) (S-O Bidentates, S-O Tridentates, S-O Tetradentates) that meet the requirements for use as "narrow band" valence stabilizers for $Co^{+3}$ include, but are not limited to: monothiooxamide, N-methylthiooxamide; N-ethylthiooxamide; N-isopropylthiooxamide; N-phenylthiooxamide; N-benzylthiooxamide; N-cyclohexylthiooxamide; N-norbornylthiooxamide; N,N'-dimethylthiooxamide; N,N'-diethylthiooxamide; N,N'-diisopropylthiooxamide; N,N'-diphenylthiooxamide; N,N'-dibenzylthiooxamide; N,N'-dicyclohexylthiooxamide; and N,N'-dinorbornylthiooxamide.

S-O Valence Stabilizer #26: Examples of beta-mercapto carboxylic acids, bis(beta-mercapto carboxylic acids), poly(beta-mercapto carboxylic acids), and derivatives thereof (S-O Bidentates, S-O Tridentates, S-O Tetradentates) that meet the requirements for use as "narrow band" valence stabilizers for $Co^{+3}$ include, but are not limited to: methyl 3-mercaptopropanoate; methyl 3-mercaptobutanoate; ethyl 3-mercaptobutanoate; phenyl 3-mercaptobutanoate; cyclohexyl 3-mercaptobutanoate; norbornyl 3-mercaptobutanoate; methyl beta-mercaptohydrocinnamate; ethyl beta-mercaptohydrocinnamate; phenyl beta-mercaptohydrocinnamate; methyl o-mercaptobenzoate; ethyl o-mercaptobenzoate; phenyl o-mercaptobenzoate; cyclohexyl o-mercaptobenzoate; (2-benzothiazolylthio) succinic acid (mtbs); norbornyl o-mercaptobenzoate; and 3-[(benzothiazol-2-yl)thio]propionic acid.

S-O Valence Stabilizer #27: Examples of beta-mercapto thiocarboxylic acids, bis(beta-mercapto thiocarboxylic acids), poly(beta-mercapto thiocarboxylic acids), and derivatives thereof (S-O Bidentates, S-O Tridentates, S-O Tetradentates) that meet the requirements for use as "narrow band" valence stabilizers for $Co^{+3}$ include, but are not limited to: methyl 3-mercaptothiobutanoate; ethyl 3-mercaptothiobutanoate; phenyl 3-mercaptothiobutanoate; cyclohexyl 3-mercaptothiobutanoate; norbornyl 3-mercaptothiobutano ate;

methyl beta-mercaptothiocinnamate; ethyl beta-mercaptothiocinnamate; phenyl beta-mercaptothiocinnamate; methyl o-mercaptothiobenzoate; ethyl o-mercaptothiobenzoate; phenyl o-mercaptothioberizoate; cyclohexyl o-mercaptothiobenzoate; norbornyl o-mercaptothiobenzoate; and (alkylthio)oxoethyl alkyl(aryl) disulfides.

S-O Valence Stabilizer #28: Examples of beta-hydroxy thiocarboxylic acids, bis(beta-hydroxy thiocarboxylic acids), poly(beta-hydroxy thiocarboxylic acids), and derivatives thereof (S-O Bidentates, S-O Tridentates, S-O Tetradentates) that meet the requirements for use as "narrow band" valence stabilizers for $Co^{+3}$ include, but are not limited to: methyl 3-hydroxythiobutanoate; 35 ethyl 3-hydroxythiobutanoate; phenyl 3-hydroxythiobutanoate; cyclohexyl 3-hydroxythiobutanoate; norbornyl 3-hydroxythiobutanoate; methyl beta-hydroxythiocinnamate; ethyl beta-hydroxythiocinnamate; phenyl beta-hydroxythiocinnamate; methyl o-hydroxythiobenzoate; ethyl o-hydroxythiobenzoate; phenyl o-hydroxythiobenzoate; cyclohexyl o-hydroxythiobenzoate; and norbornyl o-hydroxythiobenzoate.

S-O Valence Stabilizer #29: Examples of beta-mercapto carboxamides, bis(beta-mercapto carboxamides), poly(beta-mercapto carboxamides), and derivatives thereof (S-O Bidentates, S-O Tridentates, S-O Tetradentates) that meet the requirements for use as "narrow band" valence stabilizers for $Co^{+3}$ include, but are not limited to: N-methyl 3-mercaptobutanamide; N-ethyl 3-mercaptobutanamide; N-phenyl 3-mercaptobutanamide; N-cyclohexyl 3-mercaptobutanamide; N-norbornyl 3-mercaptobutanamide; N-methyl o-mercaptobenzamide; N-ethyl o-mercaptobenzamide; N-phenyl o-mercaptobenzamide; N-cyclohexyl o-mercaptobenzamide; and N-norbornyl omercaptoberizamide.

S-O Valence Stabilizer #30: Examples of S-alkylthiocarboxylic Acids, arylthiocarboxylic Acids, and S,S-thiobiscarboxylic Acids (S-O Bidentates and S-O Tndentates) that meet the requirements for use as "narrow band" valence stabilizers for $Co^{+3}$ include, but are not limited to: (methylthio)acetic acid; (methylthio)benzoic acid; (methylthio)mcotinic acid; (methylthio)napthoic acid; (phenylthio)acetic acid; (phenylthio)benzoic acid; (phenylthio)naphthoic acid; (norbornylthio)acetic acid; (norbornylthio)benzoic acid; (norbornylthio)napthoic acid; thiobisacetic acid; thiobisbenzoic acid; and thiobisnapthoic acid.

S-O Valence Stabilizer #31: Examples of S-alkyldisulfidocarboxylic acids, S-aryldisulfidocarboxylic acids, and S,S'-disulfidobiscarboxylic acids (S-O Bidentates and S-O Tridentates) that meet the requirements for use as "narrow band" valence stabilizers for $Co^{+3}$ include, but are not limited to: (methyldisulfido)acetic acid; (methyldisulfldo)benzoic acid; (methyldisulfido)nicotinic acid; (methyldisulfido)napthoic acid; (phenyldisulfido)acetic acid; (phenyldisulfido)benzoic acid; (phenyldisulfido)naphthoic acid; (norbornyldisulfido)acetic acid; (norbornyldisulfido)benzoic acid; (norbornyldisulfido)napthoic acid; S,S'-disulfidobisacetic acid; S,S'-disulfidobisbenzoic acid; and S,S'-disulfidobisnapthoic acid.

S-O Valence Stabilizer #32: Examples of monothiomonocarboxylic acids, dithiodicarboxylic acids, bis(monothiomonocarboxylic acids), bis(dithiodicarboxylic acids), poly(monothiomonocarboxylic acids), poly(dithiodicarboxylic acids), and derivatives thereof (S-O Bidentates and S-O Tetradentates) that meet the requirements for use as "narrow band" valence stabilizers for $Co^{+3}$ include, but are not limited to: thioacetic acid; thiopropionic acid; thiobenzoic acid; thiophenylacetic acid; thiocyclohexanoic acid; thiofuroic acid; thionaphthoic acid; phenyl thioacetate; phenyl thiopropionate; phenyl thiobenzoate; phenyl thiocyclohexanoate; phenyl thiofuroate; phenyl thionaphthoate; dithiooxalic acid (dto); monothiooxalic acid (mtox); dithiomalonic acid; dithiosuccinic acid; diphenyl dithiooxalate; diphenyl dithiomalonate; and diphenyl dithiosuccinate.

S-O Valence Stabilizer #33: Examples of monothiocarbonates and bis(monothiocarbonates) (S-O Bidentates and S-O Tetradentates) that meet the requirements for use as "narrow band" valence stabilizers for $Co^{+3}$ include, but are not limited to: S,O-diethyldithiocarbonate; S,O-diisopropyldithiocarbonate; S,O-diphenyldithiocarbonate; S,O-dibenzyldithiocarbonate; S,O-dicyclohexyldithiocarbonate; and S,O-dinorbomyldithiocarbonate.

S-O Valence Stabilizer #34: Examples of monothiocarbazates (monothiocarbazides), bis(monothiocarbazates), and poly(monothiocarbazates) (S-O Bidentates, S-O Tridentates, and S-O Tetradentates; or possibly N-S Bidentates, N-S Tridentates, and N-S Tetradentates) that meet the requirements for use as "narrow band" valence stabilizers for $Co^{+3}$ include, but are not limited to: N,N'-dimethylmonothiocarbazate; N,N'-di(trifluoromethyl)monothiocarbazate; N,N'-diethylmonothiocarbazate; N,N'-diphenylmonothiocarbazate; N,N'-dibenzylmonothiocarbazate; N,N'-di(pentafluorophenyl)monothiocarbazate; N,N'-dicyclohexylmonothiocarbazate; and N,N'-dinorbornylmonothiocarbazate.

S-O Valence Stabilizer #35: Examples of mercapto alcohols and silylmercaptoalcohols, bis(mercapto alcohols and silylmercaptoalcohols), and poly(mercapto alcohols and silylmercaptoalcohols) (S-O Bidentates, S-O Tridentates, S-O Tetradentates) that meet the requirements for use as "narrow band" valence stabilizers for $Co^{+3}$ include, but are not limited to: 2-mercaptoethanol (mel); 3-mercaptopropanol (mpl); 2-mercaptophenol; 2-mercaptocyclohexanol; 3-mercapto-2-norborneol; 2-mercaptopyridine 1-oxide; 1,4-thioxane; thiodialkanols; 2-(trimethoxysilyl)-1-ethanethiol (tmset); 3-(trimethoxysilyl)-1-propanethiol (tmspt); o-hydroxythiophenols; o-(O-hydroxyalkyl(aryl))thiophenols; and o-(S-thioalkyl(aryl))phenols.

S-O Valence Stabilizer #36: Examples of monothiocarbimates, bis(monothiocarbimates), and poly(monothiocarbimates) (S-O Bidentates, S-O Tridentates, and S-O Tetradentates) that meet the requirements for use as "narrow band" valence stabilizers for $Co^{+3}$ include, but are not limited to: methylmonothiocarbimate; trifluoromethylmonothiocarbimate; ethylmonothiocarbimate; propylmonothiocarbimate; isopropylmonothiocarbimate; butylmonothiocarbimate; tert-butylmonothiocarbimate; cyanomonothiocarbimate; cyanamidomonothiocarbimate; azidomonothiocarbimate; phenylmonothiocarbimate; pentafluorophenylmonothiocarbimate; benzylmonothiocarbimate; naphthylmonothiocarbimate; cyclohexylmonothiocarbimate; norbornylmonothiocarbimate; and adamantylmonothiocarbimate. [Note: Carbimates tend to stabilize lower oxidation states in metal ions.]

S-O Valence Stabilizer #37: Examples of alkyl- and arylmonothioborates and bis(monothioborates) (S-O Bidentates and S-O Tetradentates) that meet the requirements for use as "narrow band" valence stabilizers for $Co^{+3}$ include, but are not limited to: O,O'-diethyl monothioborate; O,O'-diisopropyl monothioborate; O,O'-diphenyl monothioborate; O,O'-dibenzyl monothioborate; O,O'-dicyclohexyl monothioborate; and O,O'-dinorbornyl monothioborate.

S-O Valence Stabilizer #38: Examples of alkyl- and arylmonothioboronates and bis(monothioboronates) (S-O Bidentates and S-O Tetradentates) that meet the requirements for use as "narrow band" valence stabilizers for $Co^{+3}$ include, but are not limited to: diethyl monothioboronate; diisopropyl monothioboronate; diphenyl monothioboronate; dibenzyl monothioboronate; dicyclohexyl monothioboronate; and dinorbomyl monothioboronate. [Note: boronates tend to stabilize lower oxidation states in metal ions.]

S-O Valence Stabilizer #39: Examples of monothioarsonic acids (arsonothioic acids), bis(monothioarsonic acids), poly(monothioarsonic acids), and derivatives thereof (S-O Bidentates, S-O Tridentates, S-O Tetradentates) that meet the requirements for use as "narrow band" valence stabilizers for $Co^{+3}$ include, but are not limited to: monothioarsonic acid, O-phenylmonothioarsonic acid, O-benzylmonothioarsonic acid, O-cyclohexylmonothioarsonic acid, O-norbornylmonothioarsonic acid, O,O-diphenylmonothioarsonic acid, O,O-dibenzylmonothioarsonic acid, O,O-dicyclohexylmonothioarsonic acid, and O,O-dinorbornylmonothioarsonic acid.

S-O Valence Stabilizer #40: Examples of heterocyclic rings containing one or two sulfur atoms and having at least one additional oxygen atom binding site not in a ring (S-O Bidentates, S-O Tndentates, S-O Tetradentates, or S-O Hexadentates) that meet the requirements for use as "narrow band" valence stabilizers for $Co^{+3}$ include, but are not limited to: 2-thiopheneethanol (2-(2-thienyl)ethanol); 2-propionylthiophene (1-(2-thienyl)-1-propanone); N,N'-thiobisphthalimide; 1,1'-thiocarbonyldi-2-pyridone; 2-thiopheneacetic acid; 2-thiophenecarboxamide; 2-thiophenecarboxaldehyde; 2-thiophenecarboxylic acid; 2,5-thiophenedicarboxaldehyde; 2,5-thiophenedicarboxylic acid; 2-thiophenemethanol; 2-thiophenone; thiotetronic acid; alkyl(aryl) 2-thienyl ketones; dithienyl ketone; 1,3-dithiane-2-carboxylic acid; and 1,3-dithiolane-2-carboxylic acid.

S-O Valence Stabilizer #41: Examples of heterocyclic rings containing one or two oxygen atoms and having at least one additional sulfur atom binding site not in a ring (S-O Bidentates, S-O Tridentates, S-O Tetradentates, or S-O Hexadentates) that meet the requirements for use as "narrow band" valence stabilizers for $Co^{+3}$ include, but are not limited to: 2-furanethanethiol (2-(2-furyl)ethanethiol); 1-(2-fuiyl)-1-propanethione); 2-furanthioacetic acid; 2-furanthiocarboxaldehyde; 2-furanthiocarboxamide; 2-furanthiocarboxylic acid; 2,5-furandithiocarboxaldehyde; 2,5-furandithiocarboxylic acid; 2-furanmethanethiol; 2-furanthione; furfuryl disulfide; furfuryl mercaptan; furfuryl sulfide; and furfuryl methyl disulfide.

S-O Valence Stabilizer #42: Examples of heterocyclic rings containing one or two sulfur atoms and having at least one additional oxygen atom binding site in a separate ring (S-O Bidentates, S-O Tridentates, S-O Tetradentates, or S-O Hexadentates) that meet the requirements for use as "narrow band" valence stabilizers for $Co^{+3}$ include, but are not limited to: 2-(2-furyl)thiophene; 2,5-(2-furyl)thiophene; 2-(2-fiiryl)thiopyran; and 2,5-(2-furyl)thiopyran.

S-O Valence Stabilizer #43: Examples of two-, three-, four-, five-, six-, seven-, eight-, nine-, and ten-membered macrocyclics, macrobicyclics, and macropolycyclics (including catapinands, cryptands, cyclidenes, and sepulchrates) wherein all binding sites are composed of sulfur (usually thiol, mercapto, or thiocarbonyl groups) or oxygen (hydroxy, carboxy, or carbonyl groups) and are not contained in component heterocyclic rings (S-O Bidentates, S-O Tridentates, S-O Tetradentates, and S-O Hexadentates) that meet the requirements for use as "narrow band" valence stabilizers for $Co^{+3}$ include, but are not limited to: thiaoxacyclobutane ([4]aneOS); thiaoxacyclopentane ([5]aneOS); thiaoxacyclohexane ([6]aneOS); thiaoxacycloheptane ([7]aneOS); thiaoxacyclooctane ([8]aneOS); thiaoxacyclobutene ([4]eneOS); thiaoxacyclopentene ([5]eneOS); thiaoxacyclohexene ([6]eneOS); thiaoxacycloheptene ([7]eneOS); thiaoxacyclooctene ([8]eneOS); dithiaoxacyclohexane ([6]aneOS$_2$); dithiaoxacycloheptane ([7]aneOS$_2$); dithiaoxacyclooctane ([8]aneOS$_2$); dithiaoxacyclononane ([9]aneOS$_2$); dithiaoxacyclodecane ([10]aneOS$_2$); dithiaoxacycloundecane ([11]aneOS$_2$); dithiaoxacyclododecane ([12]aneOS$_2$); dithiaoxacyclohexene ([6]aneOS$_2$); dithiaoxacycloheptene ([7]aneOS$_2$); dithiaoxacyclooctene ([8]aneOS$_2$); dithiaoxacyclononene ([9]aneOS$_2$); dithiaoxacyclodecene ([10]aneOS$_2$); dithiaoxacycloundecene ([11]aneOS$_2$); dithiaoxacyclododecene ([12]aneOS$_2$); dithiadioxacyclooctane ([8]aneO$_2$S$_2$); dithiadioxacyclononane ([9]aneO$_2$S$_2$); dithiadioxacyclodecane ([10]aneO$_2$S$_2$); dithiadioxacycloundecane ([11]aneO$_2$S$_2$); dithiadioxacyclododecane ([12]aneO$_2$S$_2$); dithiadioxacyclotridecane ([13]aneO$_2$S$_2$); dithiadioxacyclotetradecane ([14]aneO$_2$S$_2$); dithiadioxacyclopentadecane ([15]aneO$_2$S$_2$); dithiadioxacyclohexadecane ([16]aneO$_2$S$_2$); dithiadioxacycloheptadecane ([17]aneO$_2$S$_2$); dithiadioxacyclooctadecane ([18]aneO$_2$S$_2$); dithiadioxacyclononadecane ([19]aneO$_2$S$_2$); dithiadioxacycloeicosane ([20]aneO$_2$S$_2$); dithiadioxacyclooctadiene ([8]dieneO$_2$S$_2$); dithiadioxacyclononadiene ([9]dieneO$_2$S$_2$); dithiadioxacyclodecadiene ([10]dieneO$_2$S$_2$); dithiadioxacycloundecadiene ([11]dieneO$_2$S$_2$); dithiadioxacyclododecadiene ([12]dieneO$_2$S$_2$); dithiadioxacyclotridecadiene ([13]dieneO$_2$S$_2$); dithiadioxacyclotetradecadiene ([14]dieneO$_2$S$_2$); dithiadioxacyclopentadecadiene ([15]dieneO$_2$S$_2$); dithiadioxacyclohexadecadiene ([16]dieneO$_2$S$_2$); dithiadioxacycloheptadecadiene ([17]dieneO$_2$S$_2$); dithiadioxacyclooctadecadiene ([18]dieneO$_2$S$_2$); dithiadioxacyclononadecadiene ([19]dieneO$_2$S$_2$); and dithiadioxacycloeicosadiene ([20]dieneO$_2$S$_2$).

S-O Valence Stabilizer #44: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of sulfur or oxygen and are contained in component heterocyclic rings (S-U Tridentates, S-O Tetradentates, or S-U Hexadentates) that meet the requirements for use as "narrow band" valence stabilizers for $Co^{+3}$ include, but are not limited to: difurandithiophenes; difurantrithiophenes; trifurantrithiophenes; and tetrafurantetrathiophenes.

S-O Valence Stabilizer #45: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of sulfur or oxygen and are contained in a combination of heterocyclic rings and thiol, mercapto, thiocarbonyl, hydroxy, carboxy, and carbonyl groups (S-U Tridentates, S-U Tetradentates, or S-U Hexadentates) that meet the requirements for use as "narrow band" valence stabilizers for $Co^{+3}$ include, but are not limited to: dithiadifurandithiophenes; tetrathiadifurandithiophenes; trithiatrifurantrithiophenes; trithiatrifurantrithiophenes; tetrathiatetrafurantetrathiophenes; and octathiatetrafurantetrathiophenes.

S-O Valence Stabilizer #46: Examples of sulfoxides that meet the requirements for use as "narrow band" valence stabilizers for $Co^{+3}$ include, but are not limited to: dimethylsulfoxide (DMSO); diethylsulfoxide; diphenylsulfoxide; and tetrahydrothiophene oxide.

S-O Valence Stabilizer #47: Examples of sulfones that meet the requirements for use as "narrow band" valence stabilizers for $Co^{+3}$ include, but are not limited to: dimethyl sulfone; diethyl sulfone; and diphenyl sulfone.

S-O Valence Stabilizer #48: Examples of sulfur dioxide ligands that meet the requirements for use as "narrow band" valence stabilizers for $Co^{+3}$ include, but are not limited to:

sulfur dioxide (—SO$_2$) ligands. [Note: Sulfur dioxide is a reducing agent, and complexed metal ions therefore tend to prefer lower oxidation states.]

N-P Valence Stabilizer #1: Examples of aminoaryl phosphines and iminoaryl phosphines (N-P Bidentates, N-P Tridentates, and N-P Tetradentates) that meet the requirements for use as "narrow band" valence stabilizers for Co$^{+3}$ include, but are not limited to: tri(2-aminophenyl)phosphine; tri(2-aminophenyl)phosphine oxide; and tri(2-aminophenyl)phosphine sulfide.

N-P Valence Stabilizer #2: Examples of heterocyclic rings containing one, two, three, or four nitrogen atoms and having at least one additional phosphorus atom binding site not in a ring (N-P Bidentates, N-P Tridentates, N-P Tetradentates, or N-P Hexadentates) that meet the requirements for use as "narrow band" valence stabilizers for Co$^{+3}$ include, but are not limited to: tri(2-imidazolyl)phosphine; tri(2-pyrrolyl)phosphine; tri(2-pyridyl)phosphine; tri(2-imidazolyl)phosphine oxide; tri(2-pyrrolyl)phosphine oxide; tri(2-pyridyl)phosphine oxide; tri(2-imidazolyl)phosphine sulfide; tri(2-pyrrolyl)phosphine sulfide; and tri(2-pyridyl)phosphine sulfide.

N-P Valence Stabilizer #3: Examples of heterocyclic rings containing one, two, or three phosphorus atoms and having at least one additional nitrogen atom binding site not in a ring (N-P Bidentates, N-P Tridentates, N-P Tetradentates, or N-P Hexadentates) that meet the requirements for use as "narrow band" valence stabilizers for Co$^{+3}$ include, but are not limited to: 2-aminophosphole; 2,5-diaminophosphole; 2-(aminomethyl)phosphole; 2,5-di(aminomethyl)phosphole; 2-aminophosphorin; 2,6-diaminophosphorin; 2-(aminomethyl)phosphorin; 2,6-di(aminomethyl)phosphorin; triaminocyclotriphosphazenes; and hexaminocyclotriphosphazenes.

N-P Valence Stabilizer #4: Examples of heterocyclic rings containing one, two, three, or four nitrogen atoms and having at least one additional phosphorus atom binding site in a separate ring (N-P Bidentates, N-P Tridentates, N-P Tetradentates) that meet the requirements for use as "narrow band" valence stabilizers for Co$^{+3}$ include, but are not limited to: 2-(2-pyrrolyl)phosphole; 2,5-di(2-pyrrolyl)phosphole; 2-(2-pyridyl)phosphorin; and 2,6-(2-pyridyl)phosphorin.

N-P Valence Stabilizer #5: Examples of two-, three-, four-, five-, six-, seven-, eight-, nine-, and ten-membered macrocyclics, macrobicyclics, and macropolycyclics (including catapinands, cryptands, cyclidenes, and sepulchrates) wherein all binding sites are composed of nitrogen (usually amine or imine groups) or phosphorus and are not contained in component heterocyclic rings (N-P Bidentates, N-P Tridentates, N-P Tetradentates, and N-P Hexadentates) that meet the requirements for use as "narrow band" valence stabilizers for Co$^{+3}$ include, but are not limited to: cyclobiphosphazenes; cyclotriphosphazenes; cyclotetraphosphazenes; cyclopentaphosphazenes; cyclohexaphosphazenes; diphosphatetraazacyclooctatetraenes; diphospha-s-triazines; and phospha-s-triazines.

N-P Valence Stabilizer #6: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of nitrogen or phosphorus and are contained in component heterocyclic rings (N-P Bidentates, N-P Tridentates, N-P Tetradentates, or N-P Hexadentates) that meet the requirements for use as "narrow band" valence stabilizers for Co$^{+3}$ include, but are not limited to: diphospholedipyrroles; diphosphorindipyridines; triphospholetripyrroles; triphosphorintripyridines; tetraphospholetetrapyrroles; and tetraphosphorintetrapyridines.

N-P Valence Stabilizer #7: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of nitrogen or phosphorus and are contained in a combination of heterocyclic rings and amine, imine, and phosphine groups (N-P Bidentates, N-P Tridentates, N-P Tetradentates, or N-P Hexadentates) that meet the requirements for use as "narrow band" valence stabilizers for Co$^{+3}$ include, but are not limited to: azaphosphatetraphyrins; diazadiphosphatetraphyrins; azaphosphahexaphyrins; diazadiphosphahexaphyrins; triazatriphosphahexaphyrins; and apholate.

S-P Valence Stabilizer #1: Examples of thioaryl phosphines (S-P Bidentates, S-P Tridentates, S-P Tetradentates, and S-P Hexadentates) that meet the requirements for use as "narrow band" valence stabilizers for Co$^{+3}$ include, but are not limited to: tri(2-mercaptophenyl)phosphine; tri(2-mercaptophenyl)phosphine oxide; and tri(2-mercaptophenyl)phosphine sulfide.

S-P Valence Stabilizer #2: Examples of heterocyclic rings containing one or two sulfur atoms and having at least one additional phosphorus atom binding site not in a ring (S-P Bidentates, S-P Tridentates, S-P Tetradentates, or S-P Hexadentates) that meet the requirements for use as "narrow band" valence stabilizers for Co$^{+3}$ include, but are not limited to: tri(2-thiophene)phosphine; tri(2-thiopyran)phosphine; tri(2-thiophene)phosphine oxide; tri(2-thiopyran)phosphine oxide; tri(2-thiophene)phosphine sulfide; and tri(2-thiopyran)phosphine sulfide.

S-P Valence Stabilizer #3: Examples of heterocyclic rings containing one, two, or three phosphorus atoms and having at least one additional sulfur atom binding site not in a ring (S-P Bidentates, S-P Tridentates, S-P Tetradentates, or S-P Hexadentates) that meet the requirements for use as "narrow band" valence stabilizers for Co$^{+3}$ include, but are not limited to: 2-mercaptophosphole; 2,5-dimercaptophosphole; 2-(mercaptomethyl)phosphole; 2,5-di(mercaptomethyl)phosphole; 2-mercaptophosphorin; 2,6-dimercaptophosphorin; 2-(mercaptomethyl)phosphorin; and 2,6-di(mercaptomethyl)phosphorin.

S-P Valence Stabilizer #4: Examples of heterocyclic rings containing one or two sulfur atoms and having at least one additional phosphorus atom binding site in a separate ring (S-P Bidentates, S-P Tridentates, S-P Tetradentates) that meet the requirements for use as "narrow band" valence stabilizers for Co$^{+3}$ include, but are not limited to: 2-(2-thienyl)phosphole; 2,5-di(2-thienyl)phosphole; 2-(2-thienyl)phosphorin; and 2,6-(2-thienyl)phosphorin.

S-P Valence Stabilizer #5: Examples of two-, three-, four-, five-, six-, seven-, eight-, nine-, and ten-membered macrocyclics, macrobicyclics, and macropolycyclics (including catapinands, cryptands, cyclidenes, and sepulchrates) wherein all binding sites are composed of sulfur (usually thiol, mercapto, or thiocarbonyl groups) or phosphorus and are not contained in component heterocyclic rings (S-P Bidentates, S-P Tridentates, S-P Tetradentates, and S-P Hexadentates) that meet the requirements for use as "narrow band" valence stabilizers for Co$^{+3}$ include, but are not limited to: phosphathiacyclobutane ([4]anePS); phosphathiacyclopentane ([5]anePS); phosphathiacyclohexane ([6]anePS); phosphathiacycloheptane ([7]anePS); phosphathiacyclooctane ([8]anePS); diphosphathiacyclohexane ([6]aneSP$_2$); diphosphathiacycloheptane ([7]aneSP$_2$); diphosphathiacyclooctane ([8]aneSP$_2$); diphosphathiacyclononane ([9]aneSP$_2$);

diphosphathiacyclodecane ([10]aneSP$_2$); diphosphathiacycloundecane ([11]aneSP$_2$); diphosphathiacyclododecane ([12]aneSP$_2$); diphosphadithiacyclooctane ([8]aneS$_2$P$_2$); diphosphadithiacyclononane ([9]aneS$_2$P$_2$); diphosphadithiacyclodecane ([10]aneS$_2$P$_2$); diphosphadithiacycloundecane ([11]aneS$_2$P$_2$); diphosphadithiacyclododecane ([12]aneS$_2$P$_2$); diphosphadithiacyclotridecane ([13]aneS$_2$P$_2$); diphosphadithiacyclotetradecane ([14]aneS$_2$P$_2$); diphosphadithiacyclopentadecane ([15]aneS$_2$P$_2$); diphosphadithiacyclohexadecane ([16]aneS$_2$P$_2$); diphosphadithiacycloheptadecane ([17]aneS$_2$P$_2$); diphosphadithiacyclooctadecane ([18]aneS$_2$P$_2$); diphosphadithiacyclononadecane ([19]aneS$_2$P$_2$); diphosphadithiacycloeicosane ([20]aneS$_2$P$_2$).

S-P Valence Stabilizer #6: Examples of four-, five-, six-, seven-, eight-, nine-, or ten-membered macrocyclics, macrobicyclics, and macropolycyclics (including catapinands, cryptancis, cyclidenes, and sepulchrates) wherein all binding sites are composed of sulfur or phosphorus and are contained in component heterocyclic rings (S-P Bidentates, S-P Tridentates, S-P Tetradentates, or S-P Hexadentates) that meet the requirements for use as "narrow band" valence stabilizers for $Co^{+3}$ include, but are not limited to: diphospholedithiophenes; diphosphorindithiopyrans; triphospholetrithiophenes; triphosphorintrithiopyrans; tetraphospholetetrathiophenes; and tetraphosphorintetrathiopyrans.

S-P Valence Stabilizer #7: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of sulfur or phosphorus and are contained in a combination of heterocyclic rings and thiol, mercapto, thiocarbonyl, and phosphine groups (S-P Bidentates, S-P Tridentates, S-P Tetradentates, or S-P Hexadentates) that meet the requirements for use as "narrow band" valence stabilizers for $Co^{+3}$ include, but are not limited to: thiaphosphatetraphyrins; dithiadiphosphatetraphyrins; thiaphosphahexaphyrins; dithiadiphosphahexaphyrins; and trithiatriphosphahexaphyrins.

P-O Valence Stabilizer #1: Examples of hydroxyaryl phosphines (P-O Bidentates, P-O Tridentates, P-O Tetradentates, and P-O Hexadentates) that meet the requirements for use as "narrow band" valence stabilizers for $Co^{+3}$ include, but are not limited to: tri(2-hydroxyphenyl)phosphine; tri(2-hydroxyphenyl)phosphine oxide; and tri(2-hydroxyphenyl)phosphine sulfide.

P-O Valence Stabilizer #2: Examples of heterocyclic rings containing one or two oxygen atoms and having at least one additional phosphorus atom binding site not in a ring (P-O Bidentates, P-O Tridentates, P-O Tetradentates, or P-O Hexadentates) that meet the requirements for use as "narrow band" valence stabilizers for $Co^{+3}$ include, but are not limited to: tri(2-furan)phosphine; tri(2-pyran)phosphine; tri(2-furan)phosphine oxide; tn(2-pyran)phosphine oxide; tri(2-furan)phosphine sulfide; and tri(2-pyran)phosphine sulfide.

P-O Valence Stabilizer #3: Examples of heterocyclic rings containing one, two, or three phosphorus atoms and having at least one additional oxygen atom binding site not in a ring (P-O Bidentates, P-O Tridentates, P-O Tetradentates, or P-O Hexadentates) that meet the requirements for use as "narrow band" valence stabilizers for $Co^{+3}$ include, but are not limited to: 2-hydroxyphosphole; 2,5-dihydroxyphosphole; 2-(hydroxymethyl)phosphole; 2,5-di(hydroxymethyl)phosphole; 2-hydroxyphosphorin; 2,6-dihydroxyphosphorin; 2-(hydroxymethyl)phosphorin; and 2,6-di(hydroxymethyl)phosphorin.

P-O Valence Stabilizer #4: Examples of heterocyclic rings containing one or two oxygen atoms and having at least one additional phosphorus atom binding site in a separate ring (P-O Bidentates, P-O Tridentates, P-U Tetradentates) that meet the requirements for use as "narrow band" valence stabilizers for $Co^{+3}$ include, but are not limited to: 2-(2-furyl)phosphole; 2,5-di(2-furyl)phosphole; 2-(2-furyl)phosphorin; and 2,6-(2-furyl)phosphorin.

P-O Valence Stabilizer #5: Examples of two-, three-, four-, five-, six-, seven-, eight-, nine-, and ten-membered macrocyclics, macrobicyclics, and macropolycyclics (including catapinands, cryptands, cyclidenes, and sepulchrates) wherein all binding sites are composed of oxygen (usually hydroxy, carboxy, or carbonyl groups) or phosphorus and are not contained in component heterocyclic rings (P-O Bidentates, P-O Tridentates, P-O Tetradentates, and P-O Hexadentates) that meet the requirements for use as "narrow band" valence stabilizers for $Co^{+3}$ include, but are not limited to: phosphaoxacyclobutane ([4]anePO); phosphaoxacyclopentane ([5]anePO); phosphaoxacyclohexane ([6]anePO); phosphaoxacycloheptane ([7]anePO); phosphaoxacyclooctane ([8]anePO); diphosphaoxacyclohexane ([6]aneOP$_2$); diphosphaoxacycloheptane ([7]aneOP$_2$); diphosphaoxacyclooctane ([8]aneOP$_2$); diphosphaoxacyclononane ([9]aneOP$_2$); diphosphaoxacyclodecane ([10]aneOP$_2$); diphosphaoxacycloundecane ([11]aneOP$_2$); diphosphaoxacyclododecane ([12]aneOP$_2$); diphosphadioxacyclooctane ([8]aneO$_2$P$_2$); diphosphadioxacyclononane ([9]aneO$_2$P$_2$); diphosphadioxacyclodecane ([10]aneO$_2$P$_2$); diphosphadioxacycloundecane ([11]aneO$_2$P$_2$); diphosphadioxacyclododecane ([12]aneO$_2$P$_2$); diphosphadioxacyclotridecane ([13]aneO$_2$P$_2$); diphosphadioxacyclotetradecane ([14]aneO$_2$P$_2$); diphosphadioxacyclopentadecane ([15]aneO$_2$P$_2$); diphosphadioxacyclohexadecane ([16]aneO$_2$P$_2$); diphosphadioxacycloheptadecane ([17]aneO$_2$P$_2$); diphosphadioxacyclooctadecane ([18]aneO$_2$P$_2$); diphosphadioxacyclononadecane ([19]aneO$_2$P$_2$); diphosphadioxacycloeicosane ([20]aneO$_2$P$_2$); and dioxaphospholane.

P-O Valence Stabilizer #6: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of oxygen or phosphorus and are contained in component heterocyclic rings (P-O Bidentates, P-O Tridentates, P-O Tetradentates, or P-O Hexadentates) that meet the requirements for use as "narrow band" valence stabilizers for $Co^{+3}$ include, but are not limited to: diphospholedifurans; diphosphorindipyrans; triphospholetrifurans; triphosphorintripyrans; tetrapho spholetetrafurans; and tetraphosphorintetrapyrans.

P-O Valence Stabilizer #7: Examples of four-, five-, six-, seven-, eight-, nine-, or ten-membered macrocyclics, macrobicyclics, and macropolycyclics (including catapinands, cryptands, cyclidenes, and sepulchrates) wherein all binding sites are composed of oxygen or phosphorus and are contained in a combination of heterocyclic rings and hydroxy, carboxy, carbonyl, and phosphine groups (P-O Bidentates, P-O Tridentates, P-O Tetradentates, or P-O Hexadentates) that meet the requirements for use as "narrow band" valence stabilizers for $Co^{+3}$ include, but are not limited to: oxaphosphatetraphyrins; dioxadiphosphatetraphyrins; oxaphosphahexaphyrins; dioxadiphosphahexaphyrins; and trioxatriphosphahexaphyrins.

As Valence Stabilizer #1: Examples of mono arsines (As Monodentates) that meet the requirements for use as "narrow band" valence stabilizers for $Co^{+3}$ include, but are not limited to: arsine, triphenylarsine, ticyclohexylarsine, methyldiphenylarsine, ethyldiphenylarsine, arsinonorbomane, and arsinoadamantane.

As Valence Stabilizer #2: Examples of diarsines (As Monodentates or As-As Bidentates) that meet the requirements for use as "narrow band" valence stabilizers for $Co^{+3}$ include, but are not limited to: bis(diphenylarsino)methane, bis(diphenylarsino)ethane, bis(diphenylarsino)propane, bis(diphenylarsino)butane, bis(diphenylarsino)pentane, 1,2-diarsinobenzene, cyclohexane-1,2-diarsine, 1,2-bis(phenylbutylarsino)ethane, o-phenylenebis(methylphenylarsine) and o-phenylenebis(dimethylarsine) (diars). (Note: the aryl derivatives are air-stable, whereas the alkyl derivatives are air-sensitive and therefore unsuitable for these applications.)

As Valence Stabilizer #3: Examples of triarsines (As-As Bidentates, or As-As Tridentates) that meet the requirements for use as "narrow band" valence stabilizers for $Co^{+3}$ include, but are not limited to: 1,1,5,9,9-pentaphenyl-1,5,9-triarsanonane, 3-methyl-3-(As,As-dimethyl)arsinomethyl-1,1,5,5-tetraphenyl-1,5-diarsapentane, As,As-[o-(As-dimethyl)arsinodiphenyl]-(As-phenyl)arsine, As,As-[o-(As-diphenyl)arsinodiphenyl]-(As-phenyl)arsine, hexahydro-2,4,6-trimethyl-1,3,5-triarsinazine. (Note: the aryl derivatives are air-stable, whereas the alkyl derivatives are air-sensitive and therefore unsuitable for these applications.)

As Valence Stabilizer #4: Examples of tetraarsines (As-As Bidentates, As-As Tridentates, or As-As Tetradentates) that meet the requirements for use as "narrow band" valence stabilizers for $Co^{+3}$ include, but are not limited to: 3,3-(As-diphenyl)arsinomethyl-1,1,5,5-tetraphenyl-1,5-diarsapentane. (Note: the aryl derivatives are air-stable, whereas the alkyl derivatives are air-sensitive and therefore unsuitable for these applications.)

As Valence Stabilizer #5: Examples of pentaarsines (As-As Bidentates, As-As Tridentates, or As-As Tetradentates) that meet the requirements for use as "narrow band" valence stabilizers for $Co^{+3}$ include, but are not limited to: 4-[2-(As-diphenyl)arsinoethyl]-1,1,7,10,10-pentaphenyl-1,4,7,10-tetraarsadecane. (Note: the aryl derivatives are air-stable, whereas the alkyl derivatives are air-sensitive and therefore unsuitable for these applications.)

As Valence Stabilizer #6: Examples of hexaarsines (As-As Bidentates, As-As Tridentates, As-As Tetradentates, or As-As Hexadentates) that meet the requirements for use as "narrow band" valence stabilizers for $Co^{+3}$ include, but are not limited to: o-phenylenebis[di-3-(As-diphenyl)arsinopropylarsine]. (Note: the aryl derivatives are air-stable, whereas the alkyl derivatives are air-sensitive and therefore unsuitable for these applications.)

As Valence Stabilizer #7: Examples of 5-membered heterocyclic rings containing one arsenic atom (As Monodentates) that meet the requirements for use as "narrow band" valence stabilizers for $Co^{+3}$ include, but are not limited to: arsole, azarsole, diazarsole, benzarsole, benzazarsole, dibenzarsole, naphtharsole, naphthazarsole.

As Valence Stabilizer #8: Examples of 6-membered heterocyclic rings containing one arsenic atom (As Monodentates) that meet the requirements for use as "narrow band" valence stabilizers for $Co^{+3}$ include, but are not limited to: arsenin, azarsenin, diazarsenin, benzarsenin, benzazarsenin, dibenzarsenin, naphtharsenin, and naphthazarsenin.

As Valence Stabilizer #9: Examples of 5-membered heterocyclic rings containing one arsenic atom and having at least one additional arsenic atom binding site not contained in a ring (As Monodentates, As-As Bidentates, As-As Tridentates, As-As Tetradentates, or As-As Hexadentates) that meet the requirements for use as "narrow band" valence stabilizers for $Co^{+3}$ include, but are not limited to: 2-(As-phenylarsino)arsole; 2,5-(As-phenylarsino)arsole; 2-(As-phenylarsino)benzarsole; 7-(As-phenylarsino)benzarsole; and 1,8-(As-phenylarsino)dibenzarsole.

As Valence Stabilizer #10: Examples of 6-membered heterocyclic rings containing one arsenic atom and having at least one additional arsenic atom binding site not contained in a ring (As Monodentates, As-As Bidentates, As-As Tridentates, As-As Tetradentates, or As-As Hexadentates) that meet the requirements for use as "narrow band" valence stabilizers for $Co^{+3}$ include, but are not limited to: 2-(As-phenylarsino)arsenin; 2,5-(As-phenylarsino)arsenin; 2-(As-phenylarsino)benzarsenin; 7-(As-phenylarsino)benzarsenin; and 1,9-(As-phenylarsino)dibenzarsenin.

As Valence Stabilizer #11: Examples of 5-membered heterocyclic rings containing one arsenic atom and having at least one additional arsenic atom binding site contained in a ring (As Monodentates, As-As Bidentates, As-As Tridentates, As-As Tetradentates) that meet the requirements for use as "narrow band" valence stabilizers for $Co^{+3}$ include, but are not limited to: 2,2'-biarsole; 2,2',2''-triarsole; and 2,2'-bibenzarsole.

As Valence Stabilizer #12: Examples of 6-membered heterocyclic rings containing one arsenic atom and having at least one additional arsenic atom binding site contained in a ring (As Monodentates, As-As Bidentates, As-As Tridentates, As-As Tetradentates) that meet the requirements for use as "narrow band" valence stabilizers for $Co^{+3}$ include, but are not limited to: 2,2'-biarsenin; 2,2',2''-triarsenin; 2,2',2'',2'''-tetraarsenin; 2,2'-bibenzarsenin; and 8,8'-bibenzarsenin.

As Valence Stabilizer #13a: Examples of two-membered macrocyclics, macrobicyclics, and macropolycyclics (including catapinands, cryptands, cyclidenes, and sepulchrates) wherein both binding sites are composed of arsenic and are not contained in component heterocyclic rings (As-As Bidentates) that meet the requirements for use as "narrow band" valence stabilizers for $Co^{+3}$ include, but are not limited to: As,As-diphenyldiarsacyclobutane ([4]aneAs$_2$); As,As-diphenyldiarsacyclopentane ([5]aneAs$_2$); As,As-diphenyldiarsacyclohexane ([6]aneAs$_2$); As,As-diphenyldiarsacycloheptane ([7]aneAs$_2$); As,As-diphenyldiarsacyclooctane ([8]aneAs$_2$); As,As-diphenyldiarsacyclobutene ([4]eneAs$_2$); As,As-diphenyldiarsacyclopentene ([5]eneAs$_2$); As,As-diphenyldiarsacyclohexene ([6]eneAs$_2$); As,As-diphenyldiarsacycloheptene ([7]eneAs$_2$); and As,As-cliphenyldiarsacyclooctene ([8]eneAs$_2$).

As Valence Stabilizer #13b: Examples of three-membered macrocyclics, macrobicyclics, and macropolycyclics (including catapinands, cryptands, cyclidenes, and sepulchrates) wherein all binding sites are composed of arsenic and are not contained in component heterocyclic rings (As-As Tridentates) that meet the requirements for use as "narrow band" valence stabilizers for $Co^{+3}$ include, but are not limited to: As,As,As-triphenyltriarsacyclohexane ([6]aneAs$_3$); As,As,As-triphenyltriarsacycloheptane ([7]aneAs$_3$); As,As,As-triphenyltriarsacyclooctane ([8]aneAs$_3$); As,As,As-triphenyltriarsacyclononane ([9]aneAs$_3$); As,As,As-triphenyltriarsacyclodecane ([10]aneAs$_3$); As,As,As-triphenyltriarsacycloundecane ([11]aneAs$_3$); As,As,As-triphenyltriarsacyclododecane ([12]aneAs$_3$); As,As,As-triphenyltriarsacyclohexatriene ([6]trieneAs$_3$); As,As,As-triphenyltriarsacycloheptatriene ([7]trieneAs$_3$); As,As,As-triphenyltriarsacyclooctatriene ([8]trieneAs$_3$); As,As,As-triphenyltri arsacyclononatriene ([9]trieneAs$_3$); As,As,As-triphenyltriarsacyclodecatriene ([10]trieneAs$_3$); As,As,As-triphenyltriarsacycloundecatriene ([11]trieneAs$_3$); and As,As,As-triphenyltriarsacyclododecatriene ([12]trieneAs$_3$).

As Valence Stabilizer #13c: Examples of four-membered macrocyclics, macrobicyclics, and macropolycyclics (including catapinands, cryptands, cyclidenes, and sepulchrates) wherein all binding sites are composed of arsenic and are not contained in component heterocyclic rings (As-As Tetradentates) that meet the requirements for use as "narrow band" valence stabilizers for $Co^{+3}$ include, but are not limited to: As,As,As,As-tetraphenyltetraarsacyclooctane ([8]aneAs$_4$); As,As,As,As-tetraphenyltetraarsacyclononane ([9]aneAs$_4$); As,As,As,As-tetraphenyltetraarsacyclodecane ([10]aneAs$_4$); As,As,As,As-tetraphenyltetraarsacycloundecane ([11]aneAs$_4$); As,As,As,As-tetraphenyltetraarsacyclododecane ([12]aneAs$_4$); As,As,As,As-tetraphenyltetraarsacyclotridecane ([13]aneAs$_4$); As,As,As,As-tetraphenyltetraarsacyclotetradecane ([14]aneAs$_4$); As,As,As,As-tetraphenyltetraarsacyclopentadecane ([15]aneAs$_4$); As,As,As,As-tetraphenyltetraarsacyclohexadecane ([16]aneAs$_4$); As,As,As,As-tetraphenyltetraarsacycloheptadecane ([17]aneAs$_4$); As,As,As,As-tetraphenyltetraarsacyclooctadecane ([18]aneAs$_4$); As,As,As,As-tetraphenyltetraarsacyclononadecane ([19]aneAs$_4$); and As,As,As,As-tetraphenyltetraarsacycloeicosane ([20]aneAs$_4$).

As Valence Stabilizer #13d: Examples of six-membered macrocyclics, macrobicyclics, and macropolycyclics (including catapinands, cryptands, cyclidenes, and sepulchrates) wherein all binding sites are composed of arsenic and are not contained in component heterocyclic rings (As-As Tridentates, As-As Tetradentates, or As-As Hexadentates) that meet the requirements for use as "narrow band" valence stabilizers for $Co^{+3}$ include, but are not limited to: As,As,As,As,As,As-hexaphenylhexaarsacyclododecane ([12]aneAs$_6$); As-As,As,As,As,As-hexaphenylhexaarsacyclotridecane ([13]aneAs$_6$); As,As,As,As,As,As-hexaphenylhexaarsacyclotetradecane ([14]aneAs$_6$); As,As,As,As,As,As-hexaphenylhexaarsacyclopentadecane ([15]aneAs$_6$); As,As,As,As,As,As-hexaphenylhexaarsacyclohexadecane ([16]aneAs$_6$); As,As,As,As,As,As-hexaphenylhexaarsacycloheptadecane ([17]aneAs$_6$); As,As,As,As,As,As-hexaphenylhexaarsacyclooctadecane ([18]aneAs$_6$); As,As,As,As,As,As-hexaphenylhexaarsacyclononadecane ([19]aneAs$_6$); As,As,As,As,As,As-hexaphenylhexaarsacycloeicosane ([20]aneAs$_6$); As,As,As,As,As,As-hexaphenylhexaarsacycloheneicosane ([21]aneAs$_6$); As,As,As,As,As,As-hexaphenylhexaarsacyclodocosane ([22]aneAs$_6$); As,As,As,As,As,As-hexaphenyl-hexaarsacyclotricosane ([23]aneAs$_6$); and hexaphenyl-hexaarsacyclotetracosane ([24]aneAs$_6$).

Valence Stabilizer #14a: Examples of four-membered macrocyclics, macrobicyclics, and macropolycyclics (including catapinands, cryptands, cyclidenes, and sepulchrates) wherein all four binding sites are composed of arsenic and are contained in component 5-membered heterocyclic rings (As-As Tetradentates) that meet the requirements for use as "narrow band" valence stabilizers for $Co^{+3}$ include, but are not limited to: tetraarsoles.

As Valence Stabilizer #14b: Examples of six-membered macrocyclics, macrobicyclics, and macropolycyclics (including catapinands, cryptands, cyclidenes, and sepulchrates) wherein all six binding sites are composed of arsenic and are contained in component 5-membered heterocyclic rings (As-As Tetradentates and As-As Hexadentates) that meet the requirements for use as "narrow band" valence stabilizers for $Co^{+3}$ include, but are not limited to: hexaarsoles.

As Valence Stabilizer #15a: Examples of four-membered macrocyclics, macrobicyclics, and macropolycyclics (including catapinands, cryptands, cyclidenes, and sepulchrates) wherein all four binding sites are composed of arsenic and are contained in a combination of 5-membered heterocyclic rings and arsine groups (As-As Tridentates, As-As Tetradentates) that meet the requirements for use as "narrow band" valence stabilizers for $Co^{+3}$ include, but are not limited to: diarsatetraarsoles; and tetraarsatetraarsoles.

As Valence Stabilizer #15b: Examples of six-membered macrocyclics, macrobicyclics, and macropolycyclics (including catapinands, cryptands, cyclidenes, and sepulchrates) wherein all six binding sites are composed of arsenic and are contained in a combination of 5-membered heterocyclic rings and phosphine groups (As-As Tridentates, As-As Tetradentates, and As-As Hexadentates) that meet the requirements for use as "narrow band" valence stabilizers for $Co^{+3}$ include, but are not limited to: diarsahexaarsoles; and triarsahexaarsoles.

As Valence Stabilizer #16a: Examples of four-membered macrocyclics, macrobicyclics, and macropolycyclics (including catapinands, cryptands, cyclidenes, and sepulchrates) wherein all four binding sites are composed of arsenic and are contained in component 6-membered heterocyclic rings (As-As Tetradentates) that meet the requirements for use as "narrow band" valence stabilizers for $Co^{+}3$ include, but are not limited to: cyclotetraarsenins.

As Valence Stabilizer #16b: Examples of six-membered macrocyclics, macrobicyclics, and macropolycyclics (including catapinands, cryptands, cyclidenes, and sepulchrates) wherein all six binding sites are composed of arsenic and are contained in component 6-membered heterocyclic rings (As-As Tridentates, As-As Tetradentates, and As-As Hexadentates) that meet the requirements for use as "narrow band" valence stabilizers for $Co^{+3}$ include, but are not limited to: cyclohexaarsenins.

As Valence Stabilizer #17a: Examples of four-membered macrocyclics, macrobicyclics, and macropolycyclics (including catapinands, cryptands, cyclidenes, and sepulchrates) wherein all four binding sites are composed of arsenic and are contained in a combination of 6-membered heterocyclic rings and arsine groups (As-As Tridentates, As-As Tetradentates, or As-As Hexadentates) that meet the requirements for use as "narrow band" valence stabilizers for $Co^{+3}$ include, but are not limited to: diarsacyclotetraarsenins; and tetraarsacyclotetraarsenins.

As Valence Stabilizer #17b: Examples of six-membered macrocyclics, macrobicyclics, and macropolycyclics (including catapinands, cryptands, cyclidenes, and sepulchrates) wherein all six binding sites are composed of arsenic and are contained in a combination of 6-membered heterocyclic rings and arsine groups (As-As Tridentates, As-As Tetradentates, or As-As Hexadentates) that meet the requirements for use as "narrow band" valence stabilizers for $Co^{+3}$ include, but are not limited to: diarsacyclohexaarsenins; and triarsacyclohexaarsenins.

Se Valence Stabilizer #1: Examples of monoselenoethers (Se Monodentates) that meet the requirements for use as "narrow band" valence stabilizers for $Co^{+3}$ include, but are not limited to: hydrogen selenide, dimethyl selenide, diethyl selenide, dioctyl selenide, diphenyl selenide, dicyclohexyl selenide, tetramethylene selenide, trimethylene selenide, dimethylene selenide, and selenobicycloheptane. Se Valence Stabilizer #2: Examples of diselenoethers (Se Bidentates) that meet the requirements for use as "narrow band" valence stabilizers for $Co^{+3}$ include, but are not limited to: 2,5-dimethyl-3,6-diselenaoctane; 2,5-diselenahexane; 2,6-diselenaheptane; 3,7-diselenanonane; 3,6-diselenaoctane; 3-butenyl butyl selenoether (bbs); 4-pentenyl butyl selenoether (pbs); 3-butenyl phenyl selenoether (bps); and 4-pentenyl phenyl selenoether (pps).

Se Valence Stabilizer #3: Examples of triselenoethers (Se Bidentates or Se Tridentates) that meet the requirements for use as "narrow band" valence stabilizers for $Co^{+3}$ include, but are not limited to: 1,3,5-triselenane; 2,5,8-triselenanonane; 3,6,9-triselenaundecane; and 2,6,10-triselenaundecane.

Se Valence Stabilizer #4: Examples of tetraselenoethers (Se Bidentates, Se Tridentates, or Se Tetradentates) that meet the requirements for use as "narrow band" valence stabilizers for $Co^{+3}$ include, but are not limited to: 2,6,10,14-tetraselenapentadecane and 2,5,8,11-tetraselenadodecane.

Se Valence Stabilizer #5a: Examples of 5-membered heterocyclic rings containing one selenium atom (Se Monodentates) that meet the requirements for use as "narrow band" valence stabilizers for $Co^{+3}$ include, but are not limited to: dihydroselenophene, selenophene, selenazole, selenapyrroline, selenaphospholene, selenaphosphole, oxaselenole, selenadiazole, selenatriazole, benzodihydroselenophene, benzoselenophene, benzoselenazole, benzoselenaphosphole, dibenzoselenophene, and naphthoselenophene.

Se Valence Stabilizer #5b: Examples of 5-membered heterocyclic rings containing two selenium atoms (Se Monodentates or Se Bidentates) that meet the requirements for use as "narrow band" valence stabilizers for $Co^{+3}$ include, but are not limited to: diselenole, benzodiselenole, and naphthodiselenole.

Se Valence Stabilizer #6a: Examples of 6-membered heterocyclic rings containing one selenium atom (Se Monodentates) that meet the requirements for use as "narrow band" valence stabilizers for $Co^{+3}$ include, but are not limited to: dihydroselenopyran, selenopyran, selenazine, selenadiazine, selenaphosphorin, selenadiphosphorin, oxaselenin, benzoselenopyran, dibenzoselenopyran, and naphthoselenopyran.

Se Valence Stabilizer #6b: Examples of 6-membered heterocyclic rings containing two selenium atoms (Se Monodentates or Se Bidentates) that meet the requirements for use as "narrow band" valence stabilizers for $Co^{+3}$ include, but are not limited to: dihydrodiselenin, diselenin, benzodiselenin, dibenzodiselenin, and naphthodiselenin.

Se Valence Stabilizer #7: Examples of 5-membered heterocyclic rings containing one selenium atom and having at least one additional selenium atom binding site not contained in a ring (Se Monodentates, Se-Se Bidentates, Se-Se Tridentates, Se-Se Tetradentates, or Se-Se Hexadentates) that meet the requirements for use as "narrow band" valence stabilizers for $Co^{+3}$ include, but are not limited to: 2,5-diseleno-2,5-dihydroselenophene; 2,5-bis(selenomethyl)-2,5-dihydroselenophene; 2,5-bis(2-selenophenyl)-2,5-dihydroselenophene; 2,5-diseleno(selenophene); 2,5-bis(selenomethyl)selenophene; 2,5-bis(2-selenophenyl)selenophene; 2,5-diseleno(selenazole); 2,5-bis(selenomethyl)selenazole; 2,5-bis(2-selenophenyl)selenazole; and 2,5-diseleno-1,3,4-selenadiazole [bismuthselenol].

Se Valence Stabilizer #8: Examples of 6-membered heterocyclic rings containing one selenium atom and having at least one additional selenium atom binding site not contained in a ring (Se Monodentates, Se-Se Bidentates, Se-Se Tridentates, Se-Se Tetradentates, or Se-Se Hexadentates) that meet the requirements for use as "narrow band" valence stabilizers for $Co^{+3}$ include, but are not limited to: 2,6-diseleno-2,5-dihydroselenopyran; 2,6-bis(selenomethyl)-2,5-dihydroselenopyran; 2,6-bis(2-selenophenyl)-2,5-dihydroselenopyran; 2,6-diseleno(selenopyran); 2,6-bis(selenomethyl) selenopyran; 2,6-bis(2-selenophenyl)selenopyran; 2,6-diseleno(selenazine); 2,6-bis(selenomethyl)selenazine; 2,6-bis(2-selenophenyl)selenazine; 2,6-diseleno-1,3,5-selenadiazine; 2-seleno-1-benzoselenopyran; 8-seleno-1-benzoselenopyran; and 1,9-diselenodibenzoselenopyran.

Se Valence Stabilizer #9: Examples of 5-membered heterocyclic rings containing one selenium atom and having at least one additional selenium atom binding site contained in a ring (Se Monodentates, Se-Se Bidentates, Se-Se Tridentates, Se-Se Tetradentates) that meet the requirements for use as "narrow band" valence stabilizers for $Co^{+3}$ include, but are not limited to: 2,2'-bi-2,5-dihydroselenophene; 2,2',2''-tri-2,5-dihydroselenophene; 2,2'-biselenophene; 2,2',2''-triselenophene; 2,2'-biselenazole; 5,5'-biselenazole; 2,2'-bi-4-1,3,4-selenadiazole; 2,2'-biselenanaphthene; 2,2'-bibenzoselenazole; and 1,1'-bis(dibenzoselenophene).

Se Valence Stabilizer #10: Examples of 6-membered heterocyclic rings containing one selenium atom and having at least one additional selenium atom binding site contained in a ring (Se Monodentates, Se-Se Bidentates, Se-Se Tridentates, Se-Se Tetradentates) that meet the requirements for use as "narrow band" valence stabilizers for $Co^{+3}$ include, but are not limited to: 2,2'-bi-2,5-dihydroselenopyran; 2,2',2''-tri-2,5-dihydroselenopyran; 2,2'-biselenopyran; 2,2',2''-triselenopyran; 2,2'-bi-1,4-selenazine; 2,2'-bi-1,3,5-selenadiazine; 2,2'-bi-1-benzoselenopyran; and 1,1'-bis(dibenzoselenopyran). Se Valence Stabilizer #11a: Examples of two-membered macrocyclics, macrobicyclics, and macropolycyclics (including catapinands, cryptands, cyclidenes, and sepulchrates) wherein both binding sites are composed of selenium (usually selenol or selenoether groups) and are not contained in component heterocyclic rings (Se-Se Bidentates) that meet the requirements for use as "narrow band" valence stabilizers for $Co^{+3}$ include, but are not limited to: diselenacyclobutane ([4]ane$Se_2$); diselenacyclopentane ([5]ane$Se_2$); diselenacyclohexane ([6]ane$Se_2$); diselenacycloheptane ([7]ane$Se_2$); diselenacyclooctane ([8]ane$Se_2$); diselenacyclobutene ([4]ene$Se_2$); diselenacyclopentene ([5]ene$Se_2$); diselenacyclohexene ([6]ene$Se_2$); diselenacycloheptene ([7]ene$Se_2$); diselenacyclooctene ([8]ene$Se_2$); diselenacyclobutadiene ([4]diene$Se_2$); diselenacyclopentadiene ([5]diene$Se_2$); diselenacyclohexadiene ([6]diene$Se_2$); diselenacycloheptadiene ([7]diene$Se_2$); and diselenacyclooctadiene ([8]diene$Se_2$).

Se Valence Stabilizer #11b: Examples of three-membered macrocyclics, macrobicyclics, and macropolycyclics (including catapinands, cryptands, cyclidenes, and sepulchrates) wherein all binding sites are composed of selenium (usually selenol or selenoether groups) and are not contained in component heterocyclic rings (Se-Se Tridentates) that meet the requirements for use as "narrow band" valence stabilizers for $Co^{+3}$ include, but are not limited to: triselenacyclohexane ([6]ane$Se_3$); triselenacycloheptane ([7]ane$Se_3$); triselenacyclooctane ([8]ane$Se_3$); triselenacyclononane ([9]ane$Se_3$); triselenacyclodecane ([10]ane$Se_3$); triselenacycloundecane ([11]ane$Se_3$); triselenacyclododecane ([12]ane$Se_3$); triselenacyclohexene ([6]ene$Se_3$); triselenacycloheptene ([7]ene$Se_3$); triselenacyclooctene ([8]ene$Se_3$); triselenacyclononene ([9]ene$Se_3$); triselenacyclodecene ([10]ene$Se_3$); triselenacycloundecene ([11]ene$Se_3$); triselenacyclododecene ([12]ene$Se_3$); triselenacyclohexatriene ([6]triene$Se_3$); triselenacycloheptatriene ([7]triene$Se_3$); triselenacyclooctatriene ([8]triene$Se_3$); triselenacyclononatriene ([9]triene$Se_3$); triselenacyclodecatriene ([10]triene$Se_3$); triselenacycloundecatriene ([11]triene$Se_3$); and triselenacyclododecatriene ([12]triene$Se_3$).

Se Valence Stabilizer #11c: Examples of four-membered macrocyclics, macrobicyclics, and macropolycyclics (including catapinands, cryptands, cyclidenes, and sepulchrates) wherein all binding sites are composed of selenium (usually selenol or selenoether groups) and are not contained in component heterocyclic rings (Se-Se Tetradentates) that meet the requirements for use as "narrow band" valence stabilizers for $Co^{+3}$ include, but are not limited to: tetraselenacyclooctane ([8]ane$Se_4$); tetraselenacyclononane ([9]ane$Se_4$); tetraselenacyclodecane ([10]ane$Se_4$); tetraselenacycloundecane ([11]ane$Se_4$); tetraselenacyclododecane ([12]ane$Se_4$); tetraselenacyclotridecane ([13]ane$Se_4$); tetraselenacyclotetradecane ([14]ane$Se_4$); tetraselenacyclopentadecane ([15]ane$Se_4$); tetraselenacyclohexadecane ([16]ane$Se_4$); tetraselenacycloheptadecane ([17]ane$Se_4$); tetraselenacyclooctadecane ([18]ane$Se_4$); tetraselenacyclononadecane ([19]ane$Se_4$); tetraselenacycloeicosane ([20]ane$Se_4$); tetraselenacyclooctadiene ([8]diene$Se_4$); tetraselenacyclononadiene ([9]diene$Se_4$); tetraselenacyclodecadiene ([10]diene$Se_4$); tetraselenacycloundecadiene ([11]diene$Se_4$); tetraselenacyclododecadiene ([12]diene$Se_4$); tetraselenacyclotridecadiene ([13]diene$Se_4$); tetraselenacyclotetradecadiene ([14]diene$Se_4$); tetraselenacyclopentadecadiene ([15]diene$Se_4$); tetraselenacyclohexadecadiene ([16]diene$Se_4$); tetraselenacycloheptadecadiene ([17]diene$Se_4$); tetraselenacyclooctadecadiene ([18]diene$Se_4$); tetraselenacyclononadecadiene ([19]diene$Se_4$); tetraselenacycloeicosadiene ([20]diene$Se_4$); tetraselenacyclooctatetradiene ([8]tetradiene$Se_4$); tetraselenacyclononatetradiene ([9]tetradiene$Se_4$); tetraselenacyclodecatetradiene ([10]tetradiene$Se_4$); and tetraselenacycloundecatetradiene ([11]tetradiene$Se_4$).

Se Valence Stabilizer #11d: Examples of six-membered macrocyclics, macrobicyclics, and macropolycyclics (including catapinands, cryptands, cyclidenes, and sepulcrates) wherein all binding sites are composed of selenium (usually selenol or selenoether groups) and are not contained in component heterocyclic rings (Se-Se Tridentates, Se-Se Tetradentates, or Se-Se Hexadentates) that meet the requirements for use as "narrow band" valence stabilizers for $Co^{+3}$ include, but are not limited to: hexaselenacyclododecane ([12]ane$Se_6$); hexaselenacyclotridecane ([13]ane$Se_6$); hexaselenacyclotetradecane ([14]ane$Se_6$); hexaselenacyclopentadecane ([15]ane$Se_6$); hexaselenacyclohexadecane ([16]ane$Se_6$); hexaselenacycloheptadecane ([17]ane$Se_6$); hexaselenacyclooctadecane ([18]ane$Se_6$); hexaselenacyclononadecane ([19]ane$Se_6$); hexaselenacycloeicosane ([20]ane$Se_6$); hexaselenacycloheneicosane ([21]ane$Se_6$); hexaselenacyclodocosane ([22]ane$Se_6$); hexaselenacyclotricosane ([23]ane$Se_6$); hexaselenacyclotetracosane ([24]ane$Se_6$); hexaselenacyclododecatriene ([12]triene$Se_6$); hexaselenacyclotridecatriene ([13]triene$Se_6$); hexaselenacyclotetradecatriene ([14]triene$Se_6$); hexaselenacyclopentadecatriene ([15]triene$Se_6$; hexaselenacyclohexadecatriene ([16]triene$Se_6$); hexaselenacycloheptadecatriene ([17]triene$Se_6$); and hexaselenacyclooctadecatriene ([18]triene$Se_6$).

Se Valence Stabilizer #12a: Examples of four-membered macrocyclics, macrobicyclics, and macropolycyclics (including catapinands, cryptands, cyclidenes, and sepulchrates) wherein all four binding sites are composed of selenium and are contained in component 5-membered heterocyclic rings (Se-Se Tetradentates) that meet the requirements for use as "narrow band" valence stabilizers for $Co^{+3}$ include, but are not limited to: tetraselenophenes; tetraselenaphospholes; tetraoxaselenoles; and tetradiselenoles.

Se Valence Stabilizer #12b: Examples of six-membered macrocyclics, macrobicyclics, and macropolycyclics (including catapinands, cryptands, cyclidenes, and sepulchrates) wherein all six binding sites are composed of selenium and are contained in component 5-membered heterocyclic rings (Se-Se Tridentates or Se-Se Tetradentates) that meet the requirements for use as "narrow band" valence stabilizers for $Co^{+3}$ include, but are not limited to: hexaselenophenes; hexaselenaphospholes; hexaoxaselenoles; and hexadiselenoles.

Se Valence Stabilizer #13a: Examples of four-membered macrocyclics, macrobicyclics, and macropolycyclics (including catapinands, cryptands, cyclidenes, and sepulcbrates) wherein all four binding sites are composed of selenium and are contained in a combination of 5-membered heterocyclic rings and selenol and selenoether groups (Se-Se Tetradentates) that meet the requirements for use as "narrow band" valence stabilizers for $Co^{+3}$ include, but are not limited to: diselenatetraselenophenes; tetraselenatetraselenophenes; diselenatetradiselenoles; and tetraselenatetradiselenoles.

Se Valence Stabilizer #13b: Examples of six-membered macrocyclics, macrobicyclics, and macropolycyclics (including catapinands, cryptands, cyclidenes, and sepulchrates) wherein all six binding sites are composed of selenium and are contained in a combination of 5-membered heterocyclic rings and selenol or selenoether groups (Se-Se Tridentates or Se-Se Hexadentates) that meet the requirements for use as "narrow band" valence stabilizers for $Co^{+3}$ include, but are not limited to: diselenahexaselenophenes; and triselenahexaselenophenes.

Se Valence Stabilizer #14a: Examples of four-membered macrocyclics, macrobicyclics, and macropolycyclics (including catapinands, cryptands, cyclidenes, and sepulchrates) wherein all four binding sites are composed of selenium and are contained in component 6-membered heterocyclic rings (Se-Se Tetradentates) that meet the requirements for use as "narrow band" valence stabilizers for $Co^{+3}$ include, but are not limited to: tetraselenopyrans; tetraselenaphosphorins; tetraselenadiphosphorins; tetraoxaselenins; and tetradiselenins.

Se Valence Stabilizer #14b: Examples of six-membered macrocyclics, macrobicyclics, and macropolycyclics (including catapinands, cryptands, cyclidenes, and sepulchrates) wherein all six binding sites are composed of selenium and are contained in component 6-membered heterocyclic rings (Se-Se Tridentates or Se-Se Hexadentates) that meet the requirements for use as "narrow band" valence stabilizers for $Co^{+3}$ include, but are not limited to: hexaselenopyrans; hexaselenaphosphorins; hexaselenadiphosphorins; hexaoxaselenins; and hexadiselenins.

Se Valence Stabilizer #15a: Examples of four-membered macrocyclics, macrobicyclics, and macropolycyclics (including catapinands, cryptands, cyclidenes, and sepulchrates) wherein all four binding sites are composed of selenium and are contained in a combination of 6-membered heterocyclic rings and selenol or selenoether groups (Se-Se Tetradentates) that meet the requirements for use as "narrow band" valence stabilizers for $Co^{+3}$ include, but are not limited to: diselenatetraselenopyrans; tetraselenatetraselenopyrans; diselenatetraselenaphosphorins; tetraselenatetraselenaphosphorins; diselenatetraoxaselenins; tetraselenatetraoxaselenins; diselenatetradiselenins; and tetraselenatetradiselenins.

Se Valence Stabilizer #15b: Examples of six-membered macrocyclics, macrobicyclics, and macropolycyclics (including catapinands, cryptands, cyclidenes, and sepulchrates) wherein all six binding sites are composed of selenium and are contained in a combination of 6-membered heterocyclic rings and selenol or selenoether groups (Se-Se Tridentates, Se-Se Tetradentates, or Se-Se Hexadentates) that meet the requirements for use as "narrow band" valence stabilizers for $Co^{+3}$ include, but are not limited to: diselenahexaselenopyrans; triselenahexaselenopyrans; diselenahexaselenaphosphorins; triselenahexaselenaphosphorins; diselenahexaoxaselenins; triselenahexaoxaselenins; diselenahexadiselenins; and triselenahexadiselenins.

Se Valence Stabilizer #16: Examples of 1,3-diselenoketones (diseleno-beta-ketonates), 1,3,5-triselenoketones, bis(1,3-diselenoketones), and poly(1,3-diselenoketones) (Se-Se Bidentates, Se-Se Tridentates, Se-Se Tetradentates) that meet the requirements for use as "narrow band" valence stabilizers for $Co^{+3}$ include, but are not limited to: hexafluoropentanediselenone; 1,3-diphenyl-1,3-propanediselenone; selenobenzoylselenopinacolone; diselenocyclohexoylmethane; diphenylpentanetriselenoate; tetramethylnonanetriselenoate; hexafluoroheptanetriselenoate; trifluoroheptanetriselenoate; 1-(2-thienyl)-1,3-butanediselenone, 1-(2-naphthyl)-1,3-butanediselenone, and trifluoroselenoacetylselenocamphor.

Se Valence Stabilizer #17: Examples of 1,1-diselenolates, bis(1,1-diselenolates), and poly(1,1-diselenolates) (Se-Se Bidentates and Se-Se Tetradentates) that meet the requirements for use as "narrow band" valence stabilizers for $Co^{+3}$ include, but are not limited to: 1,1-dicyano-2,2-ethylene diselenolate; 1,1-dicarboalkoxy-2,2-ethylene diselenolate; 1,1-di(trifluoromethyl)-2,2-ethylene diselenolate; 1,1-di(pentafluorophenyl)-2,2-ethylene diselenolate; 1-pentamethylene-2,2-ethylene diselenolate; and 1-nitroethylene diselenolate.

Se Valence Stabilizer #18: Examples of diselenocarbamates, bis(diselenocarbamates), and poly(diselenocarbamates) (including N-hydroxydiselenocarbamates and N-mercaptodiselenocarbamates) (Se-Se Bidentates, Se-Se Tridentates, and Se-Se Tetradentates) that meet the requirements for use as "narrow band" valence stabilizers for $Co^{+3}$ include, but are not limited to: dimethyldiselenocarbamate; di(trifluorodimethyl)diselenocarbamate; diethyldiselenocarbamate; dipropyldiselenocarbamate; diisopropyldiselenocarbamate; dibutyldiselenocarbamate; ditertbutyldiselenocarbamate; dicyanamidodiselenocarbamate; azidoselenoformates; diphenyldiselenocarbamate; di(pentafluorophenyl)diselenocarbamate; dibenzyldiselenocarbamate; dinaphthyldiselenocarbamate; dicyclohexyldiselenocarbamate; dinorbornyldiselenocarbamate; diadamantyldiselenocarbamate; pyrrolidinodiselenocarbamate; piperidinodiselenocarbamate; morpholinodiselenocarbamate; thiamorpholinodiselenocarbamate; 3-pyrrolinodiselenocarbamate; pyrrolodiselenocarbamate; oxazolodiselenocarbamate; isoxazolodiselenocarbamate; thiazolodiselenocarbamate; isothiazolodiselenocarbamate; indolodiselenocarbamate; carbazolodiselenocarbamate; pyrazolinodiselenocarbamate; imidazolinodiselenocarbamate; pyrazolodiselenocarbamate; imidazolodiselenocarbamate; indazolodiselenocarbamate; and triazolodiselenocarbamate.

Se Valence Stabilizer #19: Examples of triselenophosphoric acids (phosphorotriselenoic acids), bis(triselenophosphoric acids), poly(triselenophosphoric acids), and derivatives thereof (Se-Se Bidentates, Se-Se Tridentates, Se-Se Tetradentates) that meet the requirements for use as "narrow band" valence stabilizers for $Co^{+3}$ include, but are not limited to: triselenophosphoric acid, O-phenyltriselenophosphoric acid, O-benzyltriselenophosphoric acid, O-cyclohexyltriselenophosphoric acid, O-norbornyltriselenopho sphoric acid, O,Se-diphenyltriselenophosphoric acid, O,Se-dibenzyltriselenophosphoric acid, O,Se-dicyclohexyltriselenophosphoric acid, and O,Se-dinorbornyltriselenophosphoric acid.

Se Valence Stabilizer #20: Examples of diselenophosphoric acids (phosphorodiselenoic acids), bis(diselenophosphoric acids), poly(diselenophosphoric acids), and derivatives thereof (Se-Se Bidentates, Se-Se Tridentates, Se-Se Tetradentates) that meet the requirements for use as "narrow band" valence stabilizers for $Co^{+3}$ include, but are not limited to: diselenophosphoric acid, O-phenyldiselenophosphoric acid, O-benzyldiselenophosphoric acid, O-cyclohexyldiselenophosphoric acid, O-norbomyldiselenophosphoric acid, O,O-diphenyldiselenophosphoric acid, O,O-dibenzyldiselenophosphoric acid, O,O-dicyclohexyldiselenophosphoric acid, and O,O-dinorbornyldiselenophosphoric acid.

Se Valence Stabilizer #21: Examples of tetraselenophosphoric acids (phosphorotetraselenoic acids), bis(tetraselenophosphoric acids), poly(tetraselenophosphoric acids), and derivatives thereof (Se-Se Bidentates, Se-Se Tridentates, Se-Se Tetradentates) that meet the requirements for use as "narrow band" valence stabilizers for $Co^{+3}$ include, but are not limited to: tetraselenophosphoric acid, Se-phenyltetraselenophosphoric acid, Se-benzyltetraselenophosphoric acid, Se-cyclohexyltetraselenophosphoric acid, Se-norbornyltetraselenophosphoric acid, Se,Se-diphenyltetraselenophosphoric acid, Se,Se-dibenzyltetraselenophosphoric acid, Se,Se-dicyclohexyltetraselenophosphoric acid, and Se,Se-dinorbornyltetraselenophosphoric acid.

Se Valence Stabilizer #22: Examples of diselenocarbonates, triselenocarbonates, bis(diselenocarbonates), and bis(triselenocarbonates), (Se-Se Bidentates and S-S Tetradentates) that meet the requirements for use as "narrow band" valence stabilizers for $Co^{+3}$ include, but are not limited to: Se,Se-diethyldiselenocarbonate; Se,Se-diisopropyldiselenocarbonate; Se,Se-diphenyldiselenocarbonate; Se,Se-dibenzyldiselenocarbonate; Se,Se-dicyclohexyldiselenocarbonate; Se,Se-dinorbornyldiselenocarbonate; diethyltriselenocarbonate; diisopropyltriselenocarbonate; diphenyltriselenocarbonate; dibenzyltriselenocarbonate; dicyclohexyltriselenocarbonate; and dinorbornyltriselenocarbonate.

Se Valence Stabilizer #23: Examples of selenocyanate ligands (Se monodentates) that meet the requirements for use as "narrow band" valence stabilizers for $Co^{+3}$ include, but are not limited to: selenocyanate (—SeCN).

Se Valence Stabilizer #24: Examples of selenolates (Se monodentates) that meet the requirements for use as "narrow band" valence stabilizers for $Co^{+3}$ include, but are not limited to: selenophenol; and naphthaleneselenol.

Miscellaneous Valence Stabilizer #1: Examples of diene, bicyclicand tricyclic hydrocarbon ligands that meet the requirements for use as "narrow band" valence stabilizers for $Co^{+3}$ include, but are not limited to: cyclopentadiene; azulene; carotene; norbornane; and adamantane.

Miscellaneous Valence Stabilizer #2: Examples of cyanide and related ligands that meet the requirements for use as "narrow band" valence stabilizers for $Co^{+3}$ include, but are not limited to: cyanide (—CN); and fulminate (—CNO).

Miscellaneous Valence Stabilizer #3: Examples of carbonyl ligands that meet the requirements for use as "narrow band" valence stabilizers for $Co^{+3}$ include, but are not limited to: carbonyl (—CO); and carbon dioxide ($CO_2$) ligands.

Miscellaneous Valence Stabilizer #4: Examples of halogens that meet the requirements for use as "narrow band" valence stabilizers for $Co^{+3}$ include, but are not limited to: fluorine; chlorine; bromine; and iodine.

Miscellaneous Valence Stabilizer #5: Examples of hydroxo and oxo functionalities that meet the requirements for use as "narrow band" valence stabilizers for $Co^{+3}$ include, but are not limited to: water ($H_2O$); dioxygen ($O_2$); oxide ($O^{2-}$); hydroxide (OH); peroxo groups ($O_2^{2-}$); and superoxo groups ($O_2^-$).

Water-soluble precursors for the organic valence stabilizers are typically used to ensure that sufficient material is available for pigment synthesis. However, in the case of organic valence stabilizers, it is also possible to synthesize the desired CoIII/valence stabilizer compounds from organic solvent systems. Therefore, solubility in organic solvents (for the precursors) is also acceptable. Identification of suitable water soluble precursors can be difficult because many of these organics do not form a wide range of water-soluble compounds.

3e) Mixed Inorganic/Organic Valence Stabilizers

Mixing organic and inorganic valence stabilizers in a pigment solution will often result in a pigment with poor corrosion inhibiting properties because of cross interference. Inorganic and organic stabilizers interact with CoIII in different ways. For example, inorganic valence stabilizers perform their function by forming a shell of octahedrally or tetrahedrally coordinated anionic species around a captured CoIII ion. The net charge of these inorganic CoIII-stabilizer compounds is therefore always negative. Organic species stabilize by the formation of a soft bond between the bonding atom in the stabilizer (e.g., nitrogen or sulfur) and the CoIII ion. The net charge of these compounds is usually positive. If these two very different types of stabilization ligands are combined, then the magnitude of the charge on the stabilized compound can be significantly reduced. The performance of organic or inorganic stabilized corrosion inhibitor compounds has been found to be directly related to the ability of the compound to form and sustain a thick electrostatic barrier layer. Additionally, a mixed stabilizer will have a poorly developed electrostatic field and a non-optimal packing around the CoIII ion, resulting in a compound with less resistance to aqueous attack. Mixed organic/inorganic stabilized CoIII pigments can perform more poorly than pigments that have exclusively inorganic or organic valence stabilizers for this reason.

3f) Valence Stabilizers for Tetravalent Cobalt

The $Co^{+4}$ ion forms very few stable complexes with organic compounds, and no currently known inorganically stabilized complexes. $Co^{+4}$ may be used in broader applications in the future with compounds not currently identified. Examples of typical organic ligands for $Co^{+4}$ include dithiocarbamates, dithiolenes, dithiols, dithioketones, norbornyls, biguanides, azo oximes (including hydrazone oximes), some Schiff Bases, and some azo compounds.

4) Additional Solubility Control Agents

The use of additional solubility control agents is optional. The anions or cations present in the pigment synthesis bath may be sufficient to form compounds with the desired solubility and saturated pH characteristics. However, pigment synthesis may produce compounds with greater than optimal solubilities, and the use of additional solubility control agents may be desirable. In situations where fine tuning of solubility or saturated pH is desired, cationic species are typical for CoIII-stabilizer combinations when an inorganic valence stabilizer is used, and anionic species are typical for CoIII/organic valence stabilizer combinations.

Additional solubility and saturated pH control can be achieved through the use of nontoxic inorganic cations, which include, but are not limited to: $H^+$, $Li^+$, $Na^+$, $K^+$, $Rb^+$, $Cs^+$, $NH_4^+$, $Mg^{+2}$, $Ca^{+2}$, $Sr^{+2}$ $Y^{+3}$, $La^{+3}$, $Ce^{+3}$, $Ce^{+4}$, $Nd^{+3}$, $Pr^{+3}$, $Sc^{+3}$, $Sm^{+3}$, $Eu^{+3}$, $Eu^{+2}$, $Gd^{+3}$, $Tb^{+3}$, $Dy^{+3}$, $Ho^{+3}$, $Er^{+3}$, $Tm^{+3}$, $Yb^{+3}$, $Lu^{+3}$, $Ti^{+4}$, $Zr^{+4}$, $Ti^{+3}$ $Hf^4$, $Nb^{+5}$, $Ta^{+5}$, $Nb^{+4}$, $Ta^{+4}$, $Mo^{+6}$, $W^{+5}$, $Mo^{+5}$, $W^{+5}$, $Mo^{+4}$, $W^{+4}$, $Mn^{+2}$, $Mn^{+3}$, $Mn^{+4}$, $F^{+2}$ $Fe^{+3}$, $Co^{+2}$, $Co^{+3}$, $Ru^{+2}$, $Ru^{+3}$, $Ru^{+4}$, $Rh^{+3}$, $Ir^3$, $Rh^{+2}$, $Ir^{+2}$, $Pd^{+4}$, $Pt^{+4}$, $Pd^{+2}$, $Pt^{+2}$, $Cu^+$, $Cu^{+2}$, $Cu^{+3}$, $Ag^+$, $Ag^{+2}$, $Ag^{+3}$, $Au^+$, $Au^{+2}$, $Au^{+3}$, $Zn^{+2}$, $Al^{+3}$, $Ga^{+3}$, $Ga^+$, $In^{+3}$, $In^+$, $Ge^{+4}$, $Ge^{+2}$, $Sn^{+2}$, $Sn^{+4}$, $Sb^{+3}$, $Sb^{+5}$, $Bi^{+3}$, and $Bi^{+5}$. Any water-soluble compound containings these cations can be used for this purpose. The nitrates, chlorides, bromides, and perchlorates of these cations offer inexpensive water-soluble precursors, although many other water-soluble precursors exist. The use of alkaline ions such as $Mg^{+2}$, $Ca^{+2}$, and $Sr^{+2}$ for solubility control has been demonstrated successfully, with acceptable saturated pH values.

Cationic solubility control may also be achieved through the use of nontoxic organic cations that include, but are not limited to: quaternary ammonium compounds ($NR_4^+$, where R can be any combination of alkyl, aromatic, or acyclic organic substituents, such as the methyltriethylammonium ion); organic compounds containings at least one $N^+$ site (such as pyridinium or thiazolium cations); organic compounds containing at least one phosphonium site ($P^+$, such as the benzyltriphenylphosphonium ion); organic compounds containing at least one stibonium site ($Sb^+$, such as the tetraphenylstibonium ion); organic compounds containing at least one oxonium site ($O^+$, such as pyrylium cations); organic compounds containing at least one sulfonium site ($S^+$, such as the triphenylsulfonium ion); and organic compounds containing at least one iodonium site ($I^+$, such as the diphenyliodonium ion).

The quaternary ammonium compounds, organic compounds containing at least one $N^+$ site, and organic compounds containing at least one oxonium site are the most important of these classifications because of the very large number of stable cations that are available. Water-soluble precursors for these organic cations are desirable in order to maximize the amount of material available in the appropriate pigment synthesis solution. Most of these materials are also soluble in organic solvents and hydrocarbons. Fluorides, chlorides, and bromides offer the most water-soluble precursors for these organic cations, although nitrates and perchlorates of those cations with lower molecular weights (e.g., tetramethylammonium) are also acceptable water-soluble precursors. Nitrates and perchlorates of larger (greater molecular weight) organic cations are generally not acceptable as precursors because of their low water solubility.

Toxic inorganic or organic cations can be used as additional solubility control agents although this is less desirable. Examples of toxic inorganic cations that can be used include, but are not limited to: $Be^{+2}$, $Ba^{+2}$, $V^{+5}$, $V^{+4}$, $V^{+3}$, $Cr^{+3}$, $Ni^{+2}$, $Ni^{+4}$, $Os^{+4}$, $Cd^{+2}$, $Hg^{+1}$, $Hg^{+2}$, $Tl^+$, $Tl^{+3}$, $As^{+3}$, $As^{+5}$, $Pb^{+2}$, and $Pb^{+4}$. Examples of toxic organic cations include, but are not limited to: organic compounds containing at least one arsonium site (an example being the tetraphenylarsonium ion of $As^+$); and organic compounds containing at least one selenonium site (an example being the triphenylselenonium ion of $Se^+$). Use of these materials for additional solubility control may be necessary in some specific instances where the toxicity of the resulting pigment is of limited importance to the operator. Water-soluble precursors for these toxic cations are typical in order to maximize the amount of available cation for solubility control in aqueous-based synthesis solutions. The organic cations are frequently hydrocarbon-soluble. In general, the nitrates, chlorides, bromides, and perchlorates of these cations offer the highest water solubility.

Additional solubility control can also be achieved by using nontoxic inorganic anions, especially for CoIII/organic valence stabilizer combinations. Soluble precursors for these inorganic anions are desirable in order to maximize the amount of material available in the appropriate pigment formation solution. Inorganic examples include, but are not limited to: fluorotitanates, chlorotitanates, fluorozirconates, chlorozirconates, fluoroniobates, chloroniobates, fluorotantalates, chlorotantalates, molybdates, tungstates, permanganates, fluoromanganates, chloromanganates, fluoroferrates, chloroferrates, fluorocobaltates, chlorocobaltates, fluorozincates, chlorozincates, borates, fluoroborates, fluoroaluminates, chloroaluminates, carbonates, silicates, fluorosilicates, fluorostannates, nitrates, nitrites, azides, phosphates, phosphites, phosphonates, phosphinites, thiophosphates, thiophosphites, thiophosphonates, thiophosphinites, fluorophosphates, fluoroantimonates, chloroantimonates, sulfates, sulfites, sulfonates, thiosulfates, dithionites, dithionates, fluorosulfates, tellurates, fluorides, chlorides, chlorates, perchlorates, bromides, bromates, iodides, iodates, periodates, and heteropolyanions (e.g., heteropolymolybdates or silicomolybdates).

Additional solubility control can also be achieved through the use of an almost unlimited number of nontoxic organic anions (e.g., organics with different carboxylate or acid groups). Examples include, but are not limited to, ferricyanides; ferrocyanides; cyanocobaltates; cyanocuprates; cyanomanganates; cyanates; cyanatoferrates; cyanatocobaltates; cyanatocuprates; cyanatomanganates; thiocyanates; thiocyanatoferrates; thiocyanatocobaltates; thiocyanatocuprates; thiocyanatomanganates; cyanamides; cyanamidoferrates; cyanamidocobaltates; cyanamidocuprates; cyanamidomanganates; nitritoferrates; nitritocobaltates; azides; (thio)carboxylates, di(thio)carboxylates, tri(thio)carboxylates, or tetra(thio)carboxylates [useful representatives including, but not limited to, acetic acid, benzoic acid, succinic acid, fumaric acid, salicylic acid, lactic acid, tartaric acid, antimonyl tartrates, cinnamic acid, adipic acid, phthalic acid, terephthalic acid, citric acid, ascorbic acid, malic acid, malonic acid, oxalic acid, stearic acid, gallic acid, naphthenic acid, camphoric acid, nitrosalicylic acid, aminosalicylic acid, acetylsalicylic acid, sulfosalicylic acid, nitrobenzoic acid, perfluoro$C_{2-16}$carboxylic acids, trinitrobenzoic acid, chlorobenzoic acid, anisic acid, iodobenzoic acid, anthranilic acid, mandelic acid, toluic acid, nicotinic acid, isonicotinic acid, pyrazolecarboxylic acid, picrolonic acid, quinaldic acid, diphenic acid, benzoquinaldic acid, quinolinecarboxylic acid, isoquinolinecarboxylic acid, triazinecarboxylic acid, (thio)carbonic acids, (thio)carbamic acids, trimethylhexylic acid, tetrafluorophthalic acid, ethylenediaminetetraacetic acid, toluoylpropionic acid, lactobionic acid, octylthiopropionate, lipoic acid, methylbenzoylpropionic acid, anthracenesuccinic acid, benzothiazolecarboxylic acid, phenylacetic acid, glycolic acid, thioglycolic acid, benzothiazolylthiosuccinic acid, benzothiazolylthiopropionic acid, phenylanthranilic acid, furancarboxylic acid, nitrofuroic acid, phosphonobutanetricarboxylic acid, benzothiazolylthiosuccinic acid, N-phosphonomethylglycine, cresoxyacetic acid, aminobutyric acid, alanine, asparagine, cysteine, glutamine, glycine, leucine, methionine, phenylalanine, proline, serine, threonine, tryptophan, tyrosine, valine, glutamic acid, aspartic acid, arginine, histidine, lysine, trihydroxyglutaric acid, phenoxyacetic acid, hydroxynaphthoic acid, phenylbutyric acid, hydroxyphosphonoacetic acid, tropic acid, aminophenylpropionic acid, dihydrocinnamic acid, hydroxycinnamic acid, cinchomeronic acid, aurintricarboxylic acid, benzotriazolecarboxylic acid, hydroxyphosphonoacetic acid, cyanuric acid, barbituric acid, violuric acid, diphenylvioluric acid, dilituric acid, thiobarbituric acid, cresotic acid, trimethylhexylic acid, nitrilotriacetic acid, N,N'-terephthaloylbis(aminocaproic acid), ethyleneglycolbis(aminoethylether)tetraacetic acid, diethylenetriaminepentaacetic acid, 2-phosphonobutanetricarboxylic acid, N,N'-bis(2-hydroxysuccinyl)ethylenediamine, nicotinic acid, naptalam, nitrobenzoic acid, nonylphenoxyacetic acid, and olsalazine]; (thio)phenolates, di(thio)phenolates, tri(thio)phenolates, or tetra(thio)phenolates [useful representatives including, but not limited to, pyrocatechol, resorcinol, picric acid, styphnic acid, pyrogallol, purpurin, purpurogallin, benzopurpurin, gallein, thiophenol, rhodizonic acid, kojic acid, chromotropic acid, carminic acid, fluorescein, tannic acid, and humic acid]; (thio)phosphonates, di(thio)phosphonates, or tri(thio)phosphonates [useful representatives including, but not limited to, diethylphosphonic acid, diphenylphosphonic acid, nitrophenylphosphonic acid, perfluoro$C_{1-6}$phosphonic acids, benzenephosphonic acid, phytic acid, hydroxyethylidenebisphosphonic acid, nitrilotrimethylenephosphonic acid, aminomethylenephosphonic acid, etidronic acid, ethylphosphonic acid, chloroethylphosphonic acid, ethylenediaminotetramethylenephosphonic acid, laurylhydroxydiphosphonic acid, methylaminodimethylenephosphonic acid, alkyl (aryl)diphosphonic acids, N-cetylaminoethanediphosphonic acid, carboxyhydroxymethylphosphonic acid (hpa), oxyethylidenediphosphonic acid, polycaproamidophosphonates, phenylethanetriphosphonic acid, oxidronic acid, and pamidronic acid]; (thio)phosphonamides, di(thio)phosphonamides, or tri(thio)phosphonamides [useful representatives including, but not limited to, phosphoramidic acid, phosphordiamidic acid (diamidophosphonic acid), and phosphoramidothioic acid]; amino(thio)phosphonates, diamino(thio) phosphonates, or triamino(thio)phosphonates; imino(thio) phosphonates or diimino(thio)phosphonates; (thio) sulfonates, di(thio)sulfonates, or tri(thio)sulfonates [useful representatives including, but not limited to, methanesulfonic acid, benzenesulfonic acid, aminobenzenesulfonic acid (sulfanilic acid), nitrobenzenesulfonic acid, phenylsulfonic acid, naphthalenesulfonic acid, nitronaphthalenesulfonic acid, oxinesulfonic acid, alizarinsulfonic acid, benzidinesulfonic acid, flavianic acid, camphorsulfonic acid, diiodophenolsulfonic acid (sozoiodol), 8-hydroxyquinoline-5-sulfonic acid, 7-nitro-8-hydroxyquinoline-5-sulfonic acid; benzotriazolesulfonic acid, bis(trifluoromethyl)benzenesulfonic acid, diiododihydroxybenzophenonesulfonic acid, p-amino-p'-ethoxydiphenylamine-o-sulfonic acid, 1-amino-2-naphthol-4-sulfonic acid; 1,2-diaminoanthraquinone-3-sulfonic acid, 1,5-dinitro-2-naphthol-7-sulfonic acid, perfluoro$C_{2-16}$sulfonic acids, benzenedisulfonic acid, phenyldisulfonic acid, naphthalenedisulfonic acid, 3,6-naphtholdisulfonic acid, indigodisulfonic acid, benzidinedisulfonic acid, carboxylodobenzenesulfonic acids; N-benzeneaminomethanesulfonic acid (ams); amido-G-acid; amido-R-acid; naphthalene(di)sulfonic acid (Armstrong's acid); amsonic acid; Badische acid; camphorsulfonic acid; chrysophenine; Cassella's acid; chromotropic acid; Cleve's acid; croceic acid; anthracenesulfonic acid; hydroxyquinolinesulfonic acid; hydrazinobenzenesulfonic acid; indigo carmine; indoxyl; isatinsulfonic acid; indican; lignosulfonic acid; metanil yellow; metanilic acid; naphthoquinonesulfonic acid; Nuclear Fast Red; naphthol(di)sulfonic acid; naphthylamine(di)sulfonic acid; Orange I; orthanilic acid; phenol(di)sulfonic acid; methylenedinaphthalenesulfonic acid; methyl orange; and piperazinediethanesulfonic acid (pipes)]; (thio)sulfonamides, di(thio)sulfonamides, or tri(thio)sulfonamides; amino (thio)sulfonates, diamino(thio)sulfonates, or triamino(thio) sulfonates; imino(thio)sulfonates (including sulfamates) or diimino(thio)sulfonates (including disulfamates) [useful representatives including, but not limited to, methylsulfamic acid and phenylsulfamic acid]; (thio)borates, di(thio)borates, or (thio)boronates [useful representatives including, but not limited to, phenylboric acid and borotartaric acid]; organic silicates; and stibonates [useful representatives including, but not limited to, antimonyl tartrate and benzenestibonic acid]. Soluble precursors for these organic anions are desirable to maximize the amount available in the appropriate pigment synthesis solution. These organic anions are frequently soluble in organic solvents orhydrocarbons in addition to water-based systems.

Finally, toxic inorganic or organic anions can be used as additional solubility control agents, although they are less desirable. Examples of toxic inorganic anions include, but are not limited to: arsenates, arsenites, fluoroarsenates, chloroarsenates, selenates, selenites, fluorothallates, chlorothallates, iodomercury anions (e.g., Nessler's reagent), thiocyanatomercury anions (e.g., Behren's reagent), chloromercurates, bromomercurates, osmates, fluoronickelates, chromates, Reinecke's salt, and vanadates. Examples of toxic organic anions include cyanides; cyanochromates; cyanonickelates; cyanatochromates; cyanatonickelates; thiocyanatochromates; thiocyanatonickelates; cyanamidochromates; cyanamidonickelates; nitritonickelates; arsonates, diarsonates, or triarsonates [useful representatives being propylarsonic acid, phenylarsonic acid, hydroxyphenylarsonic acid, benzenearsonic acid, methylbenzenearsonic acid, hydroxybenzenearsonic acid, and nitrobenzenearsonic acid]; and organic selenates, diselenates, or triselenates. These materials may be necessary in some specific instances for additional solubility control where toxicity of the final pigment material is of limited importance. Soluble precursors for these organic anions are desirable to maximize the amount available in the appropriate pigment synthesis solution. The alkali or ammonium species of these anions typically offer the greatest water solubility.

5) Valence Stabilizers for "Indicator Pigments"

Some heteropolymetallate valence stabilizers for trivalent cobalt pigments have been observed to result in pigments that change color as the CoIII-stabilizer compound was exhausted during corrosion. For example, molybdate-stabilized CoIII pigments are typically light green after being prepared and combined with a suitable binder system. These pigments were observed to gradually change from light green to royal blue after extended exposure to ASTM B-117 and ASTM G-85 accelerated corrosion testing environments. The rate of color change was gradual with time and scaled with initiation and continued corrosion of the substrate. The color change from green to blue is well-documented in the inorganic chemistry literature for heteropolymolybdates. Numerous studies have shown that the color change associated with molybdenum blues is due to reduction of the molybdenum (VI) ion (the valence stabilizer for CoIII in this example), to the more reduced molybdenum (IV) ion. Other cobalt-containing compounds can exhibit differences in color with the change in valence of the cobalt ion in the pigment compound. Organometallic literature has many examples of cobalt compounds where an organic trivalent cobalt compound is one color and the divalent compound is a different color. For example, divalent cobalt phthalocyanines are green and the trivalent cobalt derivatives are violet-black.

Color changes in the paint can be used as a metric to determine when the corrosion-inhibiting ability of the pigment has begun to fail. Alternatively, changes in pigment color hue may suggest remaining corrosion-inhibiting service life. The color change behavior is not observed for all CoIII-valence stabilizer combinations. Those compositions that do exhibit a significant color change between fully oxidized and reduced valence states are typical for applications where an indication of the amount of remaining unreacted pigment is desired. This represents an advantage over conventional chromate pigments which do not demonstrate a significant color change during reduction.

B) Pigment Synthesis

The cobalt compounds of the present invention can be synthesized by many different formation routes, and the synthesis of specific trivalent cobalt compounds is often found in the general cobalt coordination chemistry literature. The syntheses of several trivalent cobalt compounds suitable for use as pigments are outlined in the Examples section of this specification.

The pigments can be synthesized via precipitation routes (including onto inorganic or organic substrates), by firing of constituents, by evaporative routes, etc. Precipitation is a typical synthesis route, however, because: a) it is easiest to control, b) it allows inorganic valence stabilizers to polymerize, and c) many organic valence stabilizer precursors are degraded by high temperatures. Precipitation from aqueous (water-based) solutions is typical, because the formed trivalent cobalt pigment materials are required to be sparingly soluble in water in order to function adequately as corrosion-inhibitors. For the more soluble pigments (i.e., with solubilities as high as $1 \times 10^0$ moles/liter of trivalent cobalt, for specialized applications), precipitation can be aided by traditional salting-out methodologies, such as adding salt or alcohols to further facilitate precipitation. If desired, precipitation onto or in combination with inert materials such as oxides, hydroxides, silicates, borates, aluminates, phosphates, carbonates, titanates, molybdates, tungstates, oxalates, polymers, etc., can be initiated. An almost infinite variety of colors, hues, tints, solubilities, saturated pHs, decomposition temperatures, melting points, and corrosion-inhibiting action can be produced in pigments based solely on the CoIII ion.

Organic solvents can also be used for the synthesis of these pigments, especially for many of the organic valence-stabilized cobalt compounds. Conventional organic solvents include, but are not limited to: methanol, ethanol, n-propanol, isopropanol, n-butanol, isobutanol, sec-butanol, benzyl alcohol, glycerol, ethylene glycol, propylene glycol, cresol, cyclohexanol, butyl carbitol, cellosolve, methyl cellosolve, ethyl lactate, acetone, methyl ethyl ketone (MEK), diethyl ketone, methyl isobutyl ketone (MIBK), cyclohexanone, acetophenone, diethyl ether, isopropyl ether, furan, tetrahydrofuran (THF), dioxane, tetrahydropyran, methyl formate, ethyl formate, methyl acetate, ethyl acetate, methyl propionate, ethyl propionate, methyl butyrate, ethyl butyrate, propylene oxide, acetic acid, propionic acid, butyrolactone, ethylene carbonate, propylene carbonate, benzaldehyde, propyl amine, diethyl amine, ethanolamine, aniline, pyridine, acetonitrile, dimethylformamide (DMF), propionitrile, nitrobenzene, hexane, cyclohexane, benzene, toluene, xylene, carbon tetrachloride, chloroform, methylene chloride, dichloroethane, trichloroethane, trichloroethylene, chlorobenzene, Freon 113, carbon disulfide, dimethyl sulfoxide (DMSO), and hexamethylphosphoric triamide (HMPT). These solvents can be used in instances where the specific CoIII/valence stabilizer is insoluble in that specific solvent and sparingly soluble in water, or in instances where evaporative formation of fine particle sizes is desired.

A typical CoIII compound with inorganic valence stabilization was prepared as follows:

1) the stabilizer was dissolved in a minimum of water with added acetic acid or sodium acetate to buffer the solution to the proper pH;

2) cobalt nitrate was dissolved in a separate buffered water solution;

3) the stabilizer solution was heated to near boiling and the cobalt solution added all at once;

4) this stabilizer-cobalt solution was heated for 15 to 60 minutes with a potassium acetate buffer to initiate inorganic polymerization of the valence stabilizer in the presence of a persulfate oxidizer to form trivalent cobalt;

5) this solution (mother liquor) was cooled and any precipitate filtered;

6) the mother liquor was separated into five fractions and an additional solubility control agent was added; and 7) each solution from step 6 was ice chilled and precipitates filtered and dried.

Solubility control agents Mg, Ca, Zn, Sr, and Ba were used to obtain a broad spectrum of solubilities with a single CoIII-valence stabilizer combination. Occasionally a precipitate would not form with the addition of a "solubility control agent" or a day of evaporation. This would imply that the target compound was extremely water soluble and unsuited for use as a pigment. Conversely, a precipitate would occasionally form immediately on addition of the last pH buffer or even the oxidizing agent. This would imply that the target CoIII compound was extremely insoluble and unsuited for use as a corrosion inhibiting pigment when incorporating the buffer or oxidizer's cations.

CoIII pigments with organic valence stabilizers were synthesized in a similar fashion. Water-soluble organic ligands (i.e., the azo dye examples) allowed the entire synthesis to be performed in aqueous solution. Valence stabilizers of low water solubility (i.e., 8-hydroxyquinoline) were complexed in an isopropanol/water mixture. It was not necessary to carefully control pH of the organic syntheses because polymerization like that needed for the heteropolymetallate inorganic stabilizers was not necessary. Anionic "solubility control agents" such as sulfate, phosphate, molybdate, tungstate, and phosphomolybdate were used for the organic examples to form progressively larger compounds with less solubility.

The color of CoIII pigments depends on the specific CoIII-valence stabilizer combination. Inorganically valence stabilized CoIII compounds ranged from olive green to yellow. The color of CoIII pigments incorporating organic valence stabilizers often matched the color of the valence stabilizer. This was particularly true of the azo dyes. The colors of the organically stabilized pigments were orange-yellow ranging to green or brown.

Oxidation of divalent cobalt to the trivalent oxidation state can be performed prior to, or after, compound formation. If trivalent cobalt salts are to be used for synthesis, then additional oxidation may or may not be necessary, depending upon the synthesis conditions. For example, a CoIII/valence stabilizer coordination compound could be prepared, or a CoII/valence stabilizer compound could be prepared and subsequently oxidized to a CoIII/valence stabilizer compound.

Oxidation prior to compound formation is typical, however, to ensure that the stability of the formed compound is maintained.

The stability of compounds using the same valence stabilizer ligand differs significantly because of the difference in size between the CoII and CoIII ions (74.5 μm versus 61 pm). This has to do with the size requirements of the coordinating ligand. Therefore, one ligand geometry may result in a very stable CoII compound, but the same compound containing CoIII can, in many instances, exhibit lower stabilities because of the difference in size of the ions. Oxidation to the trivalent state prior to precipitation (or other preparative methodology) ensures that once recovered, the compound is for the most part in a usable form.

Preparation of a divalent cobalt compound, with subsequent oxidation treatment (e.g., via steam, gaseous oxygen, concentrated liquid oxidizer, etc.) to convert the compound to a trivalent oxidation state, can degrade the ligand or the entire compound, or can alter substituent groups on that ligand. Trivalent cobalt/valence stabilizer complexes having a melting temperature lower than approximately 50° C. can be produced as a low melting solid, or a liquid-phase inhibitor. They can also be combined with inert materials in order to provide a solid material. If combination with inert materials is desired, then the trivalent corrosion inhibiting compound can be absorbed into, or adsorbed onto, the surfaces of the inert particles. The particles can be inorganic (e.g., oxides, hydroxides, phosphates, borates, silicates, carbonates, aluminates, titanates, molybdates, tungstates, oxalates, and polymers, and combinations thereof) or organic (e.g., polymeric) in nature.

EXAMPLES

These examples are not intended to represent refined final commercial compositions. They are intended to demonstrate the range and robustness of the CoIII valence stabilization for pigments of the present invention.

1) Wash Primer Preparation

The corrosion inhibiting performance of CoIII pigments was evaluated by incorporating them into primer paint formulations. The acid wash primer paint formulations called out in DoD-P-15328 [Primer (Wash), Pretreatment (Formulation No. 117 for Metals)] were used to test the various pigments. The wash primer is composed of a resin, an acid, a corrosion inhibiting pigment, powdered talc, and carbon lampblack. The acid content of this wash primer provides a rigorous initial test of the stability and performance of the pigments. Other, more benign, polymer-based binder and resin systems might not separate the compounds based on their performance as effectively or as rapidly.

The base solution for the wash primer in this specification was prepared by mixing 88.3 grams of isopropanol, 31.3 grams of n-butanol, and 3.8 grams of deionized water with 14 grams of poly(vinyl butyral) resin (PVB) (Monsanto Butvar B-90™). PVB was used exclusively throughout testing to avoid preparation and compositional complications during analysis of pigment performance. However, the invention is not limited to the use of PVB.

Acid diluent was prepared by mixing 70 grams of 85% phosphoric acid, 63 grams of deionized water, and 247 grams of isopropanol. Finely-ground pigment powder was measured out and added to 13.74 grams of the base solution for each paint to be tested. A small amount (0.2 g) of powdered talc (magnesium silicate) "filler" was added. Lampblack was not added to these samples. These components were mixed thoroughly by hand and 3.8 g of phosphoric acid diluent added with further mixing. This rough processing allowed direct comparisons of pigment performance to be made without complications due to powder treatments, modifications, and additives.

For each pigment to be tested, the primer paint was applied onto 10 metal substrates—5 precleaned 7075-T6 and 5 precleaned 2024-T3 aluminum substrates. This is not the conventional paint application procedure for aluminum alloys. Under normal service conditions, aluminum alloys are first subjected to a hexavalent chromium-containing conversion coating prior to primer application. However, the conversion coating was omitted so that the performance of the pigment alone could be evaluated and not the synergistic effects of hexavalent chromium (in the conversion coating) or even of barrier films (in the phosphate or anodized coatings).

Multiple samples of specific pigment compositions were prepared and tested. Samples treated with zinc and strontium chromate were used as comparison standards. The chromate pigments were prepared identically to those used to test CoIII composition variations.

2) Corrosion Testing

PVB wash primers containing various pigment formulations were evaluated by exposing them to static salt fog (ASTM B-117) and cyclic Prohesiomm (ASTM G-85.5) accelerated corrosion tests. ASTM B-117 is a traditional corrosion "proof" test that has little relation to a real working environment. This accelerated corrosion test exposes samples to a constant salt-water fog and is a de facto test of solubility for corrosion inhibitors. B-117 does not necessarily test the ability of a corrosion inhibitor to actually inhibit corrosion. This is particularly true of inhibitors and compounds that have not been fully optimized with respect to solubility. ASTM G-85.5 (Prohesion™) is a cyclic corrosion test that more closely resembles real working environments. This accelerated corrosion test exposes samples to a cycle of fog of dilute salt and ammonium sulfate at room temperature followed by forced-air drying at an elevated temperature. This is a more realistic test of the ability of a compound to inhibit corrosion. Results of these tests can be combined to gain insight into how a particular coating or compound will perform relative to a standard as well as helping identify strengths and weaknesses in the performance of the material.

ment compositions developed using the methodology described in this specification.

Chromate pigments were precipitated from aqueous synthesis solutions and incorporated into PVB wash primer formulations so that each primer sample had the same molar quantity of hexavalent chromium. These primers were then applied to 2024-T3 and 7075-T6 aluminum alloy samples. After the samples had dried for 24 hours, they were scribed and the edges of each sample taped to eliminate edge effects. These samples were then exposed to 168 hours of both ASTM B-117 and G-85.5. Magnesium chromate is so soluble in aqueous solution that the resin began to cross-link immediately, even before the phosphoric acid diluent was added to the PVB pigment mixture. PVB based paints containing magnesium chromate pigments performed well initially (the first 4 days of the test) but began to degrade rapidly as the chromate was depleted. Insoluble bismuth chromate appeared to enhance the effects of corrosion and performed worse than PVB samples that contained no pigment. Zinc and strontium species with intermediate aqueous solubility provided the greatest corrosion inhibition of the chromate pigments when used in the PVB wash primer.

Table 3 presents the accelerated corrosion testing results for bare 2024-T3 and 7075-T6 aluminum alloy test panels treated with PVB combined with zinc and strontium chromate corrosion inhibiting pigments. For each pigment, the first row shows the results on 2024-T3, and the second row shows the results on 7075-T6.

TABLE 3

Zinc and Strontium Chromate Pigment Accelerated Corrosion Test Results

| Stabilizer | 2024-T3 B-117 168 hrs | | 7075-T6 B-117 168 hrs | | 2024-T3 G-85 168 hrs | | 7075-T6 G-85 168 hrs | |
|---|---|---|---|---|---|---|---|---|
| | Proc. A | Proc. B | Proc. A | Proc. B | Proc. A | Proc. B | Proc. A | Proc. B |
| Zn as 1.35 g zinc chromate | 10 | 9 | 9 | 9 | 10 | 9 | 9 | 9 |
| | 10 | 9 | 9 | 9 | 10 | 9 | 9 | 9 |
| Sr as 1.51 g strontium chromate | 9 | 9 | 9 | 9 | 9 | 9 | 9 | 9 |
| | 9 | 9 | 9 | 8 | 9 | 9 | 9 | 9 |

Evaluated by using ASTM D-1654 - Painted or Coated Specimens Subjected to Corrosive Environments.

3) Rating Method

ASTM D-1654 evaluation standard for painted or coated specimens subjected to corrosive environments was used to evaluate the performance of the coatings. After the paint dried for 24 hours, each plate was scribed with an X and the plate edges were sealed with PVC tape to eliminate corrosion edge effects.

Two visual observations are associated with this rating test. Procedure A involves a rating of the failure at the scribe—the representative creepage of corrosion away from the scribe. Procedure B involves a rating of the failure in the unscribed areas in terms of the percentage which shows corrosion coming through the film. In this way, not only the bulk corrosion-inhibiting action of a pigment through the binder can be rated, but also its "throwing power".

4) Comparison Example

Zinc and strontium chromates are commercial CrVI-based pigments used extensively to provide corrosion protection to metal surfaces. These pigments were used as performance baselines to determine the effectiveness of CoIII-based pig- The zinc and strontium chromate treated samples performed well during their period of exposure as is expected from the current state-of-the-art. Minor differences in performance as a function of substrate composition were noted.

5) Example 1—Trivalent Cobalt Pigments in PVB Resin

In order to establish the acceptable solubility limits for valence stabilized trivalent cobalt coatings, coating samples were prepared that contained CoIII pigments wherein the CoIII ion was stabilized in the compound with six ammonia molecules forming hexaaminecobalt(III)-$Co(NH_3)_6^+$. The only difference between the subsequently prepared pigment compounds was the anion attached to the hexaaminecobalt (III) cation. Wash primer coatings containing these pigments were prepared wherein the trivalent cobalt was present in identical molar concentrations from sample to sample. These paints were then applied to both 2024-T3 and 7075-T6 aluminum alloy samples. Pigments were made with chloride, bromide, sulfate, hexafluorosilicate, phosphate, molybdate, tungstate, and phosphomolybdate anions. Additionally, $Co_2O_3$ (in which one of the cobalt atoms is trivalent) was also used as a pigment for this application.

These paint samples were then exposed to 135 hours of both ASTM B-117 and G-85.5 corrosion environments. As with the hexavalent chromium coatings described above, a clear progression of corrosion resistance was observed with the nature of the anion. The extremely insoluble cobalt samples, e.g., those that contained $CO_2O_3$ (solubility $1\times10^{-5}$ mol/liter CoIII), exhibited no discernable corrosion resistance at all. Samples of hexaaminecobalt(III) molybdate, tungstate, and phosphomolybdate (all anions that result in reported solubilities of $5.5\times10^{-4}$ mol/liter CoIII or less when complexed with $Co(NH_3)_6^{+3}$) exhibited a small amount of corrosion resistance. Molybdate performed the best of these three pigment compounds, and phosphomolybdate performed the worst. Samples that contained compounds in the intermediate solubility ranges ($1\times10^{-1}$ to $5\times10^{-4}$ moles/liter cobalt, e.g., phosphate, hexafluorosilicate, sulfate, and bromide) performed the best of all. The paint samples that contained the most soluble species such as chloride, with a reported solubility of approximately $2\times10^{-1}$ moles/liter CoIII, performed very well in the early stages of the test and then failed as the test progressed due to rapid depletion of CoIII.

Thus, a typical solubility range for pigments is about $1\times10^{-1}$ to about $1\times10^{-4}$ moles/liter of CoIII. Solubilities higher than about $1\times10^{-1}$ moles/liter of CoIII exhibited corrosion resistance early in the test but then failed. Solubility ranges as high as $1\times10^{0}$ to as low as $5\times10^{-5}$ moles per liter of CoIII may offer some corrosion protection under certain conditions, as CrVI based systems do. These solubility ranges define the solubility conditions for optimum corrosion resistance in $Co^{+3}$ anticorrosive pigments. However, the performance of these pigments was not the same as that exhibited by conventional hexavalent chromium pigments. Some polarization of the CoII pigments was determined to be necessary in order to optimize their performance because of differences in characteristics between the CoIII and CrVI ions. This was done through the selection of improved valence stabilizers, as is defined herein.

6) Example 2 - Optimized Trivalent Cobalt Pigments in PVB Resin

CoIII/valence stabilizer compounds were synthesized using either published literature procedures, or standard organometallic synthesis techniques because optimized trivalent cobalt corrosion-inhibiting pigments are not commercially available. The pigment syntheses were mainly aqueous-based precipitation techniques, although some pigments (i.e., those using some selected organic valence stabilizers) needed alcohol/water mixtures for the synthesis due to the low solubility of the valence stabilizer compound in pure water. Table 4 shows the CoIII-valence stabilizer combinations used for these optimized CoIII-containing paints. As can be seen in Table 4, CoIII pigments containing both inorganic and organic valence stabilizers were formed.

TABLE 4

Optimized Trivalent Cobalt Pigments Prepared

| Pigment | Synthesis Solvent | Addendum Ions | Synthesis Notes |
|---|---|---|---|
| $Co^{+3}$/phosphotungstate [11-tungstophospho-cobaltate(III)] | $H_2O$ | Sr, Ba | Lighter salts (Mg, Ca, & Zn) not formed |
| $Co^{+3}$/molybdate [6-molybdo-cobaltate(III)] | $H_2O$ | $NH_4$, Ca, Ba | $NH_4$ salt precip. from mother liq.; Ca salt fm. by evap.; Sr, Zn salts not formed. |
| $Co^{+3}$/molybdate [10-molybdo-cobaltate(III)] | $H_2O$ | Mg, Ca, Zn, Sr, Ba | |
| $Co^{+3}$/periodate [Periodato-cobaltate(III)] | $H_2O$ | H, Mg, Sr, Ba | H (acid) salt precip. from mother liq.; limited precip. of Ca, Zn salts |
| $Co^{+3}$/vanadate [10-vanado-cobaltate(III)] | $H_2O$ | Na, Mg, Ca, Zn, Sr, Ba | Na salt precip. from mother liq. |
| $Co^{+3}$/Diethyldithio-carbamate | $H_2O$ | $SO_4^{-2}$, $PO_4^{-3}$, $WO_4^{-2}$, $MoO_4^{-2}$, phosphomolybdate | |
| $Co^{+3}$/2-Mercapto-benzimidazole | i-PrOH/$H_2O$ | $SO_4^{-2}$ | $SO_4^{-2}$ fm. from mother liq. |
| $Co^{+3}$/8-Hydroxy-quinoline | i-PrOH/$H_2O$ | $SO_4^{-2}$, $PO_4^{-3}$ | $SO_4^{-2}$ fm. from mother liq.; $PO_4^{-3}$ on anion addn. |

Table 5 presents the accelerated corrosion testing results for bare 2024-T3 and 7075-T6 aluminum alloy test panels treated with inorganically stabilized trivalent cobalt pigment in PVB, while Table 6 shows some organically stabilized cobalt pigments. Table 5 shows the samples that were produced, as well as the pigment contained within them. Note that the molar concentration of CoIII in these paints is much less than that in the zinc chromate wash primers ($7.44\times10^{-3}$ m). This was done because the molecular weight of the CoIII compounds exceeds that of zinc chromate, implying that a much larger mass would be necessary to achieve equal molar concentrations of CoIII and CrVI. As can be seen in the corrosion exposure results, even with these much lower molar concentrations of CoIII, the "optimized" pigments provided comparable or substantial corrosion protection to chromium. These pigments also outperformed by a significant margin those pigments (i.e., molybdates, tungstates, phosphates, borates, mercaptobenzimidazole) containing no inherent oxidizer properties. For each pigment, the first row shows the performance of one sample under the specified conditions, and the second shows the performance of a duplicate sample under the same conditions. It is also interesting to note the change in performance for the 10-molybdocobaltates and the 10-vanadatocobalates just by altering the solubility control agents.

TABLE 5

Inorganically Stabilized CoIII Wash Primers Formulations

| Stabilizer/ Solubility Control Agent | Inhibitor Conc. (M) | 2024-T3 B-117 Proc. A | 2024-T3 B-117 Proc. B | 7075-T6 B-117 Proc. A | 7075-T6 B-117 Proc. B | 2024-T3 G-85 Proc. A | 2024-T3 G-85 Proc. B | 7075-T6 G-85 Proc. A | 7075-T6 G-85 Proc. B | Hours |
|---|---|---|---|---|---|---|---|---|---|---|
| Ba as 2.52 g barium 11-tungstophosphocobaltate | $7.44 \times 10^{-4}$ (10% of Cr) | 7 | 6 | 7 | 6 | 7 | 6 | 7 | 6 | 139 |
|  |  | 7 | 6 | 7 | 6 | 7 | 7 | 7 | 6 | 139 |
| Calcium-6-MoCo as 1.88 g calcium 6-molybdocobaltate | $1.49 \times 10^{-3}$ (20% of Cr) | 7 | 5 | 7 | 6 | 8 | 7 | 8 | 8 | 117 |
|  |  | 6 | 6 | 7 | 6 | 8 | 7 | 8 | 8 | 117 |
| Mg as 1.44 g magnesium 10-molybdocobaltate | $1.49 \times 10^{-3}$ (20% of Cr) | 7 | 6 | 7 | 6 | 9 | 8 | 9 | 7 | 144 |
|  |  | 7 | 6 | 7 | 6 | 8 | 7 | 9 | 8 | 144 |
| Ca as 1.48 g calcium 10-molybdocobaltate | $1.49 \times 10^{-3}$ (20% of Cr) | 7 | 6 | 7 | 6 | 9 | 8 | 8 | 7 | 144 |
|  |  | 7 | 6 | 6 | — | 9 | 8 | 9 | 8 | 144 |
| Zn as 1.54 g zinc 10-molybdocobaltate | $1.49 \times 10^{-3}$ (20% of Cr) | 7 | 7 | 7 | 7 | 6 | 7 | 7 | 6 | 144 |
|  |  | 7 | 7 | 7 | 5 | 7 | 6 | 7 | 6 | 144 |
| Sr as 1.59 g strontium 10-molybdocobaltate | $1.49 \times 10^{-3}$ (20% of Cr) | 6 | 5 | 7 | 6 | 7 | 6 | 7 | 6 | 144 |
|  |  | 7 | 5 | 6 | 5 | 7 | 6 | 7 | 6 | 144 |
| Ba as 1.70 g barium 10-molybdocobaltate | $1.49 \times 10^{-3}$ (20% of Cr) | 7 | 6 | 6 | 5 | 7 | 7 | 7 | 7 | 144 |
|  |  | 7 | 6 | 6 | 5 | 7 | 7 | 7 | 7 | 144 |
| Mg as 1.83 g magnesium periodatocobaltate | $3.72 \times 10^{-3}$ (50% of Cr) | 7 | 6 | 7 | 6 | 7 | 7 | 7 | 7 | 139 |
|  |  | 7 | 6 | 7 | 6 | 8 | 8 | 7 | 7 | 139 |
| Na as 2.15 g sodium 10-vanadatocobaltate | $1.49 \times 10^{-3}$ (20% of Cr) | 9 | 8 | 6 | 7 | 8 | 7 | 7 | 6 | 139 |
|  |  | 9 | 8 | 6 | 7 | 8 | 7 | 7 | 6 | 139 |
| Mg as 2.00 g magnesium 10-vanadatocobaltate | $1.49 \times 10^{-3}$ (20% of Cr) | 7 | 7 | 7 | 7 | 8 | 7 | 8 | 7 | 139 |
|  |  | 6 | 7 | 7 | 7 | 9 | 8 | 9 | 8 | 139 |
| Ca as 2.03 g calcium 10-vanadatocobaltate | $1.49 \times 10^{-3}$ (20% of Cr) | 8 | 7 | 7 | 6 | 7 | 6 | 7 | 6 | 139 |
|  |  | 8 | 7 | 7 | 6 | 8 | 6 | 7 | 6 | 139 |
| Zn as 2.07 g zinc 10-vanadatocobaltate | $1.49 \times 10^{-3}$ (20% of Cr) | 9 | 9 | 8 | 8 | 7 | 6 | 7 | 6 | 139 |
|  |  | 9 | 8 | 9 | 9 | 7 | 6 | 7 | 6 | 139 |
| Sr as 2.10 g strontium 10-vanadatocobaltate | $1.49 \times 10^{-3}$ (20% of Cr) | 7 | 6 | 6 | 5 | 7 | 6 | 6 | 5 | 139 |
|  |  | 7 | 6 | 6 | 5 | 7 | 6 | 6 | 5 | 139 |

Evaluated by using ASTM D-1654 - Painted or Coated Specimens Subjected to Corrosive Environments.

Table 6 shows the results for a few of the organic valence stabilizers evaluated. Due to low substrate supplies, these pigments were only tested on duplicate 2024-T6 aluminum alloy under both ASTM B-117 and G-85 conditions. The molar concentration of Co+3 in these pigments were also much less than in the standard chromate pigments. Clear progressions in the performance of these pigments as a function of anionic solubility control agents were also observed.

TABLE 6

Organically Stabilized CoIII Wash Primers Formulations

| Stabilizer/ Solubility Control Agent | Inhibitor Conc. (M) | In B-117, ASTM D1654 Proc. A | In B-117, ASTM D1654 Proc. B | In G-85, ASTM D1654 Proc. A | In G-85, ASTM D1654 Proc. B | Hours |
|---|---|---|---|---|---|---|
| $Co^{+3}$/DEDT/sulfate | $1.49 \times 10^{-3}$ (20% of Cr) | 6 | 5 | 7 | 6 | 168 |
| | | 6 | 5 | 6 | 5 | 168 |
| $Co^{+3}$/DEDT/phosphate | $1.49 \times 10^{-3}$ (20% of Cr) | 7 | 5 | 7 | 5 | 168 |
| | | 7 | 5 | 7 | 6 | 168 |
| $Co^{+3}$/DEDT/molybdate | $1.49 \times 10^{-3}$ (20% of Cr) | 7 | 6 | 7 | 5 | 168 |
| | | 7 | 6 | 7 | 5 | 168 |
| $Co^{+3}$/DEDT/tungstate | $1.49 \times 10^{-3}$ (20% of Cr) | 7 | 5 | 7 | 5 | 168 |
| | | 7 | 5 | 7 | 5 | 168 |
| $Co^{+3}$/MBI/sulfate | $1.49 \times 10^{-3}$ (20% of Cr) | 7 | 7 | 6 | 6 | 168 |
| | | 8 | 7 | 6 | 6 | 168 |
| $Co^{+3}$/HQ/sulfate | $1.49 \times 10^{-3}$ (20% of Cr) | 6 | 5 | 6 | 5 | 168 |
| | | 6 | 5 | 6 | 5 | 168 |
| $Co^{+3}$/HQ/phosphate | $1.49 \times 10^{-3}$ (20% of Cr) | 6 | 6 | 6 | 6 | 168 |
| | | 6 | 5 | 7 | 5 | 168 |

DEDT = diethyldithiocarbamate
MBI = mercaptobenzimidazole
HQ = hydroxyquinoline

Chromium-free pigments based on trivalent cobalt which can be used as replacements for the current CrVI pigments can be made. Many synthesis methodologies and procedures are available for those skilled in the art of coordination compound synthesis to produce a multitude of trivalent cobalt corrosion inhibiting pigments. One or two synthesis procedures or solvents are likely to be typical for specific CoIII/valence stabilizer combinations. The methodology described in this specification encompasses the entire range of valence stabilized CoIII pigment formulations.

Pigments formed in accordance with prior art are not competitive with the present invention. Prior art embodiments require the use of application processes and chemical compounds that do not form pigments containing valence stabilized CoIII-based active corrosion inhibitors that perform equivalent to current effective commercial hexavalent chromium-based pigment systems.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A corrosion-inhibiting pigment composition comprising:
   a corrosion-inhibiting pigment comprising cobalt, wherein the cobalt is trivalent cobalt, tetravalent cobalt, or combinations thereof, and a valence stabilizer combined to form a cobalt/valence stabilizer complex, wherein the valence stabilizer forms a shell around the cobalt, and wherein the cobalt in is the trivalent or tetravalent oxidation state in the pigment, wherein the cobalt/valence stabilizer complex has a solubility in water of between about $1 \times 10^{-1}$ and about $5 \times 10^{-5}$ moles per liter at about 25° C. and about 760 Torr;
   an optional solubility control agent; and
   a coating system comprising a carrier system and a binder system, or a carrier system and a resin system, or both;
   with the proviso that none of the valence stabilizer is hydroxide.

2. The pigment composition of claim 1 wherein the solubility of the cobalt/valence stabilizer complex in water is between about $1 \times 10^{-1}$ and about $1 \times 10^{-4}$ moles per liter at about 25° C. and about 760 Torr.

3. The pigment composition of claim 1 wherein there is an electrostatic barrier layer around the cobalt/valence stabilizer complex in aqueous solution.

4. The pigment composition of claim 1 wherein the cobalt/valence stabilizer complex acts as an ion exchange agent towards corrosive ions.

5. The pigment composition of claim 1 wherein the cobalt/valence stabilizer complex decomposes above about 100° C.

6. The pigment composition of claim 1 wherein the cobalt/valence stabilizer complex melts above about 50° C.

7. The pigment composition of claim 1 wherein the valence stabilizer is selected from an inorganic valence stabilizer and an organic valence stabilizer.

8. The pigment composition of claim 7 wherein the valence stabilizer is the inorganic valence stabilizer selected from molybdates; tungstates; vanadates; niobates; tantalates; tellurates; periodates; iodates; carbonates; antimonates; stannates; titanates; zirconates; hafnates; bismuthates; germanates; arsenates; phosphates; borates; aluminates; and silicates; and combinations thereof.

9. The pigment composition of claim 8 wherein the valence stabilizer is the inorganic valence stabilizer selected from molybdates; tungstates; vanadates; niobates; tantalates; tellurates; periodates; iodates; carbonates; antimonates; and stannates; and combinations thereof.

10. The pigment composition of claim 8 wherein the cobalt/valence stabilizer complex has a central cavity containing a cobalt ion and an additional ion.

11. The pigment composition of claim 10 wherein the additional ion is $B^{+3}$, $Al^{+3}$, $Si^{+4}$, $P^{+5}$, $Ti^{+4}$, $V^{+5}$, $V^{+4}$, $Cr^{+6}$, $Cr^{+3}$, $Mn^{+4}$, $Mn^{+3}$, $Mn^{+2}$, $Fe^{+3}$, $Fe^{+2}$, $Co^{+2}$, $Ni^{+2}$, $Ni^{+3}$, $Ni^{+4}$, $Cu^{+2}$, $Cu^{+3}$, $Zn^{+2}$, $Ga^{+3}$, $Ge^{+4}$, $As^{+5}$, $As^{+3}$, $Zr^{+4}$, or $Ce^{+4}$.

12. The pigment composition of claim 1 further comprising the solubility control agent.

13. The pigment composition of claim 12 wherein the solubility control agent is selected from a cationic solubility control agent and an anionic solubility control agent.

14. The pigment composition of claim 13 wherein the solubility control agent is the cationic solubility control agent selected from $H^+$; $Li^+$; $Na^+$; $K^+$; $Rb^+$; $Cs^+$; $NH_4^+$; $Mg^{+2}$; $Ca^{+2}$; $Sr^{+2}$; $Be^{+2}$; $Ba^{+2}$; $Y^{+3}$; $La^{+3}$; $Ce^{+3}$; $Ce^{+4}$; $Nd^{+3}$; $Pr^{+3}$; $Sc^{+3}$; $Sm^{+3}$; $Eu^{+3}$; $Eu^{+2}$; $Gd^{+3}$; $Tb^{+3}$; $Dy^{+3}$; $Ho^{+3}$; $Er^{+3}$; $Tm^{+3}$; $Yb^{+3}$; $Lu^{+3}$; $Ti^{+4}$; $Zr^{+4}$; $Ti^{+3}$; $Hf^{+4}$; $Nb^{+5}$; $Ta^{+5}$; $Nb^{+4}$; $Ta^{+4}$; $V^{+5}$; $V^{+4}$; $V^{+3}$; $Mo^{+6}$; $W^{+6}$; $Mo^{+5}$; $W^{+5}$; $Mo^{+4}$; $W^{+4}$; $Cr^{+3}$; $Mn^{+2}$; $Mn^{+3}$; $Mn;^{+4}$; $Fe^{+2}$; $Fe^{+3}$; $Co^{+2}$; $Co^{+3}$; $Ni^{+2}$; $Ni^{+3}$; $Ni^{+4}$; $Ru^{+2}$; $Ru^{+3}$; $Ru^{+4}$; $Rh^{+3}$; $Ir^{+3}$; $Rh^{+2}$; $Ir^{+2}$; $Pd^{+4}$; $Pt^{+4}$; $Pd^{+2}$; $Pt^{+2}$; $Os^{+4}$; $Cu^+$; $Cu^{+2}$; $Cu^{+3}$; $Ag^+$; $Ag^{+2}$; $Ag^{+3}$; $Au^+$; $Au^{+2}$; $Au^{+3}$; $Zn^{+2}$; $Cd^{+2}$; $Hg^+$; $Hg^{+2}$; $Al^{+3}$; $Ga^{+3}$; $Ga^+$; $In^{+3}$; $In^+$; $Tl^{+3}$; $Tl^+$; $Ge^{+4}$; $Ge^{+2}$; $Sn^{+4}$; $Sn^{+2}$; $Pb^{+4}$; $Pb^{+2}$; $Sb^{+3}$; $Sb^{+5}$; $As^{+3}$; $As^{+5}$; $Bi^{+3}$; $Bi^{+5}$; organic compounds containing at least one $N^+$ site; organic compounds containing at least one phosphonium site; organic compounds containing at least one arsonium site; organic compounds containing at least one stibonium site; organic compounds containing at least one oxonium site; organic compounds containing at least one sulfonium site; organic compounds containing at least one selenonium site; organic compounds containing at least one iodonium site; and quaternary ammonium compounds having a formula $NR_4^+$, where R is an alkyl, aromatic, or acyclic organic constituent; and combinations thereof.

15. The pigment composition of claim 14 wherein the cationic solubility control agent is selected from $H^+$; $Li^+$; $Na^+$; $K^+$; $Rb^+$; $Cs^+$; $NH_4^+$; $Mg^{+2}$; $Ca^{+2}$; $Sr^{+2}$; $Y^{+3}$; $La^{+3}$; $Ce^{+3}$; $Ce^{+4}$; $Nd^{+3}$; $Pr^{+3}$; $Sc^{+3}$; $Sm^{+3}$; $Eu^{+3}$; $Eu^{+2}$; $Gd^{+3}$; $Tb^{+3}$; $Dy^{+3}$; $Ho^{+3}$; $Er^{+3}$; $Tm^{+3}$; $Yb^{+3}$; $Lu^{+3}$; $Ti^{+4}$; $Zr^{+4}$; $Ti^{+3}$; $Hf^{+4}$; $Nb^{+5}$; $Ta^{+5}$; $Nb^{+4}$; $Ta^{+4}$; $Mo^{+6}$; $W^{+6}$; $Mo^{+5}$; $W^{+5}$; $Mo^{+4}$; $W^{+4}$; $Mn^{+2}$; $Mn^{+3}$; $Mn^{+4}$; $Fe^{+2}$; $Fe^{+3}$; $Co^{+2}$; $Co^{+3}$; $Ru^{+2}$; $Ru^{+3}$; $Ru^{+4}$; $Rh^{+3}$; $Ir^{+3}$; $Rh^{+2}$; $Ir^{+2}$; $Pd^{+4}$; $Pt^{+4}$; $Pd^{+2}$; $Pt^{+2}$; $Cu^+$; $Cu^{+2}$; $Cu^{+3}$; $Ag^+$; $Ag^{+2}$; $Ag^{+3}$; $Au^+$; $Au^{+2}$; $Au^{+3}$; $Zn^{+2}$; $Al^{+3}$; $Ga^{+3}$; $Ga^+$; $In^{+3}$; $In^+$; $Ge^{+4}$; $Ge^{+2}$; $Sn^{+4}$; $Sn^{+2}$; $Sb^{+3}$; $Sb^{+5}$; $Bi^{+3}$; $Bi^{+5}$; organic compounds containing at least one $N^+$ site; organic compounds containing at least one phosphonium site; organic compounds containing at least one stibonium site; organic compounds containing at least one oxonium site; organic compounds containing at least one sulfonium site; organic compounds containing at least one iodonium site; and quaternary ammonium compounds having a formula $NR_4^+$, where R is an alkyl, aromatic, or acyclic organic constituent; and combinations thereof.

16. The pigment composition of claim 13 wherein the solubility control agent is the anionic solubility control agent selected from fluorotitanates; chlorotitanates; fluorozirconates; chlorozirconates; fluoroniobates; chloroniobates; fluorotantalates; chlorotantalates; molybdates; tungstates; permanganates; fluoromanganates; chloromanganates; fluoroferrates; chloroferrates; fluorocobaltates; chlorocobaltates; fluorozincates; chlorozincates; borates; fluoroborates; fluoroaluminates; chloroaluminates; carbonates; silicates; fluorosilicates; fluorostannates; nitrates; nitrites; azides; cyanamides; phosphates; phosphites; phosphonates; phosphinites; thiophosphates; thiophosphites; thiophosphonates; thiophosphinites; fluorophosphates; fluoroantimonates; chloroantimonates; sulfates; sulfites; sulfonates; thiosulfates; dithionites; dithionates; fluorosulfates; tellurates; fluorides; chlorides; chlorates; perchlorates; bromides; bromates; iodides; iodates; periodates; heteropolyanions; ferricyanides; ferrocyanides; cyanocobaltates; cyanocuprates; cyanomanganates; cyanates; cyanatoferrates; cyanatocobaltates; cyanatocuprates; cyanatomanganates; thiocyanates; thiocyanatoferrates; thiocyanatocobaltates; thiocyanatocuprates; thiocyanatomanganates; cyanamides; cyanamidoferrates; cyanamidocobaltates; cyanamidocuprates; cyanamidomanganates; nitritoferrates; nitritocobaltates; (thio)carboxylates; di(thio)carboxylates; tri(thio)carboxylates; tetra(thio)carboxylates; (thio)phenolates; di(thio)phenolates; tri(thio)phenolates; tetra(thio)phenolates; (thio)phosphonates; di(thio)phosphonates; tri(thio)phosphonates; (thio)phosphonamides; di(thio)phosphonamides; tri(thio)phosphonamides; amino (thio)phosphonates; diamino(thio)phosphonates; triamino(thio)phosphonates; imino(thio)phosphonates; diimino(thio)phosphonates; (thio)sulfonates; di(thio)sulfonates; tri(thio)sulfonates; (thio)sulfonamides; di(thio)sulfonamides; tri(thio)sulfonamides; amino(thio)sulfonates; diamino(thio)sulfonates; triamino(thio)sulfonates; imino(thio)sulfonates; diimino(thio)sulfonates; (thio)borates; di(thio)borates; (thio)boronates; organic silicates; stibonates; cyanides; cyanochromates; cyanonickelates; cyanatochromates; cyanatonickelates; thiocyanatochromates; thiocyanatonickelates; cyanamidochromates; cyanamidonickelates; nitritonickelates; arsonates; diarsonates; triarsonates; organic selenates; diselenates; triselenates; arsenates; arsenites; fluoroarsenates; chloroarsenates; selenates; selenites; fluorothallates; chlorothallates; iodomercury anions; chloromercurates; bromomercurates; osmates; fluoronickelates; chromates; Reinecke's salt; and vanadates; and combinations thereof.

17. The pigment composition of claim 16 wherein the anionic solubility control agent is selected from fluorotitanates; chlorotitanates; fluorozirconates; chlorozirconates; fluoroniobates; chloroniobates; fluorotantalates; chlorotantalates; molybdates; tungstates; permanganates; fluoromanganates; chloromanganates; fluoroferrates; chloroferrates; fluorocobaltates; chlorocobaltates; fluorozincates; chlorozincates; borates; fluoroborates; fluoroaluminates; chloroaluminates; carbonates; silicates; fluorosilicates; fluorostannates; nitrates; nitrites; azides; cyanamides; phosphates; phosphites; phosphonates; phosphinites; thiophosphates; thiophosphites; thiophosphonates; thiophosphinites; fluorophosphates; fluoroantimonates; chloroantimonates; sulfates; sulfites; sulfonates; thiosulfates; dithionites; dithionates; fluorosulfates; tellurates; fluorides; chlorides; chlorates; perchlorates; bromides; bromates; iodides;

iodates; periodates; heteropolyanions; ferricyanides; ferrocyanides; cyanocobaltates; cyanocuprates; cyanomanganates; cyanates; cyanatoferrates; cyanatocobaltates; cyanatocuprates; cyanatomanganates; thiocyanates; thiocyanatoferrates; thiocyanatocobaltates; thiocyanatocuprates; thiocyanatomanganates; cyanamides; cyanamidoferrates; cyanamidocobaltates; cyanamidocuprates; cyanamidomanganates; nitritoferrates; nitritocobaltates; (thio)carboxylates; di(thio)carboxylates; tri(thio)carboxylates; tetra(thio)carboxylates; (thio)phenolates; di(thio)phenolates; tri(thio)phenolates; tetra(thio)phenolates; (thio)phosphonates; di(thio)phosphonates; tri(thio)phosphonates; (thio)phosphonamides; di(thio)phosphonamides; tri(thio)phosphonamides; amino(thio)phosphonates; diamino(thio)phosphonates; triamino(thio)phosphonates; imino(thio)phosphonates; diimino(thio)phosphonates; (thio)sulfonates; di(thio)sulfonates; tri(thio) sulfonates; (thio)sulfonamides; di(thio)sulfonamides; tri(thio)sulfonamides; amino(thio)sulfonates; diamino(thio)sulfonates; triamino(thio)sulfonates; imino(thio)sulfonates; diimino(thio)sulfonates; (thio)borates; di(thio)borates; (thio)boronates; organic silicates; and stibonates; and combinations thereof.

18. The pigment composition of claim 1 wherein the pigment is colored.

19. The pigment composition of claim 1 wherein the pigment exhibits a color change between cobalt oxidation states.

20. The pigment composition of claim 1 wherein the pigment is light-fast.

* * * * *

UNITED STATES PATENT AND TRADEMARK OFFICE
CERTIFICATE OF CORRECTION

| | | |
|---|---|---|
| PATENT NO. | : 7,833,331 B2 | Page 1 of 1 |
| APPLICATION NO. | : 11/832704 | |
| DATED | : November 16, 2010 | |
| INVENTOR(S) | : Jeffrey A. Sturgill et al. | |

It is certified that error appears in the above-identified patent and that said Letters Patent is hereby corrected as shown below:

Col. No 288, Claim 16 Line No. 14 - nitrates; nitrites; azides, should read -- nitrates; nitrites --

Col. No. 288, Claim 17 Line No. 61 - nitrates; nitrites; azides, should read -- nitrates; nitrites --

Signed and Sealed this
Third Day of May, 2011

David J. Kappos
*Director of the United States Patent and Trademark Office*